US006115690A

United States Patent [19]

Wong

[11] Patent Number: 6,115,690

[45] Date of Patent: Sep. 5, 2000

[54] INTEGRATED BUSINESS-TO-BUSINESS WEB COMMERCE AND BUSINESS AUTOMATION SYSTEM

[76] Inventor: Charles Wong, 14250 Miranda Rd., Los Altos Hills, Calif. 94022

[21] Appl. No.: 08/995,591

[22] Filed: Dec. 22, 1997

[51] Int. Cl.[7] .......... G06F 17/60

[52] U.S. Cl. .......... 705/7; 705/1; 705/8; 705/30; 705/34; 364/709.06; 364/479.07

[58] Field of Search .......... 235/380; 364/468.02, 364/468.14, 468.21, 479.06, 479.07, 479.08, 705.06, 709.06; 705/34, 1, 30, 7, 8

[56] References Cited

U.S. PATENT DOCUMENTS

| | | | |
|---|---|---|---|
| 5,101,352 | 3/1992 | Rembert | 705/8 |
| 5,191,522 | 3/1993 | Bosco et al. | 705/4 |
| 5,224,034 | 6/1993 | Katz et al. | 705/7 |
| 5,311,438 | 5/1994 | Sellers et al. | 364/468.02 |
| 5,450,317 | 9/1995 | Lu et al. | 705/10 |
| 5,528,490 | 6/1996 | Hill | 395/712 |
| 5,557,515 | 9/1996 | Abbruzzese et al. | 705/9 |
| 5,592,378 | 1/1997 | Cameron et al. | 705/27 |
| 5,596,502 | 1/1997 | Koski et al. | 364/468.01 |
| 5,615,109 | 3/1997 | Eder | 705/8 |
| 5,621,201 | 4/1997 | Langhans et al. | 235/380 |
| 5,638,519 | 6/1997 | Haluska | 705/28 |
| 5,666,493 | 9/1997 | Wojcik et al. | 705/26 |

*Primary Examiner*—Edward R. Cosimano
*Assistant Examiner*—Raquel Alvarez
*Attorney, Agent, or Firm*—Burns, Doane, Swecker & Mathis, LLP

[57] ABSTRACT

A software system business-to-business Web commerce (Web business, or e-business) and automates to the greatest degree possible, in a unified and synergistic fashion and using best proven business practices, the various aspects of running a successful and profitable business. Web business and business automation are both greatly facilitated using a computing model based on a single integrated database management system (DBMS) that is either Web-enabled or provided with a Web front-end. The Web provides a window into a "seamless" end-to-end internal business process. The effect of such integration on the business cycle is profound, allowing the sale of virtually anything in a transactional context (goods, services, insurance, subscriptions, etc.) to be drastically streamlined.

85 Claims, 395 Drawing Sheets

Microfiche Appendix Included
(5 Microfiche, 20 Pages)

1. Secured and authority check.
2. Best practice, possible outcome, expected input parameters affecting downstream.
3. Process is reversible until posted.
4. Track discrepancy and allow improvement from feedback.
5. Trigger one event to allow other event happens.

External influence

Key

→ Electronic, non-manual original process

→ Electronic, non-manual reversible process

Fig. 2C

Figure 10:
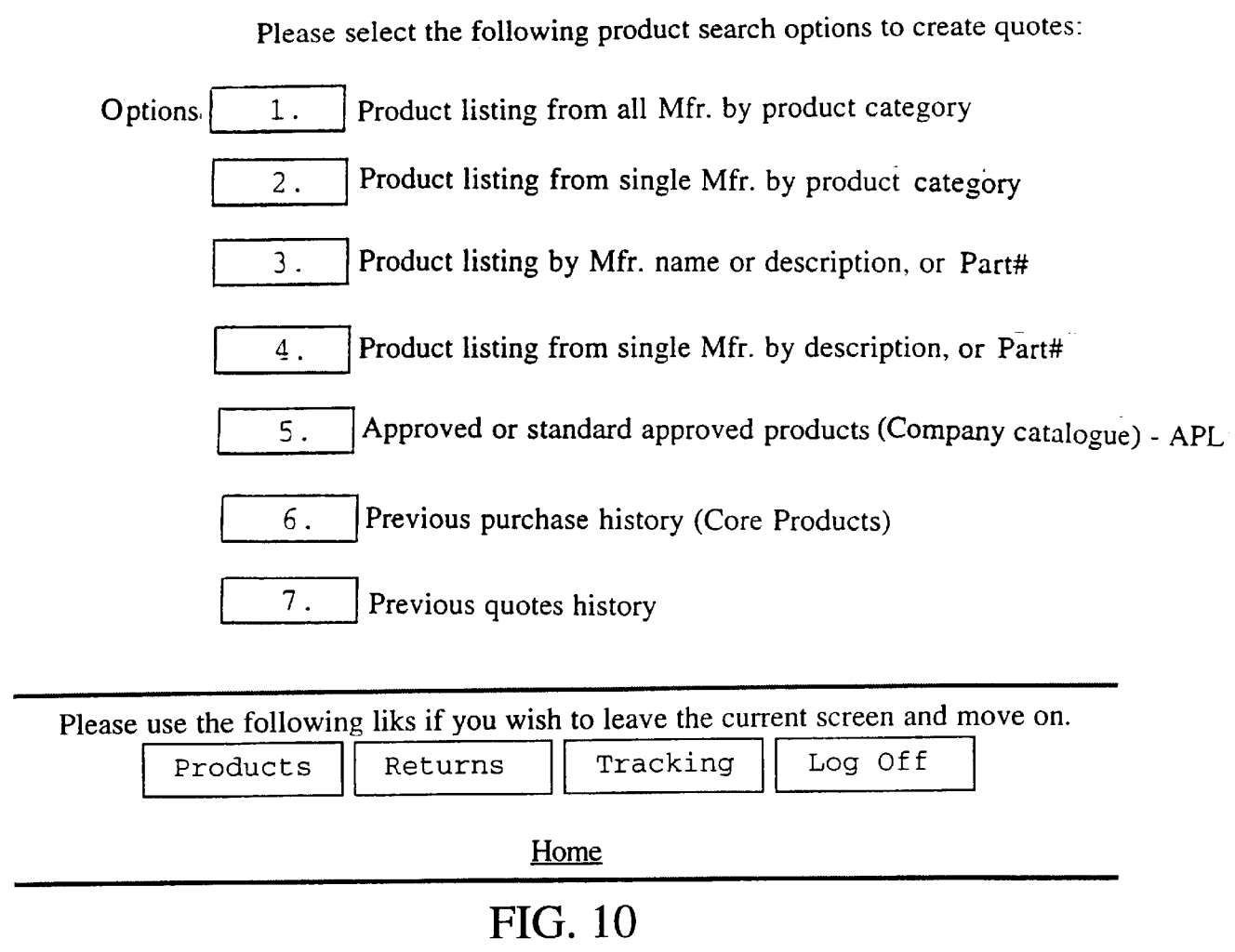

Please select the following product search options to create quotes:

Options [1.] Product listing from all Mfr. by product category

[2.] Product listing from single Mfr. by product category

[3.] Product listing by Mfr. name or description, or Part#

[4.] Product listing from single Mfr. by description, or Part#

[5.] Approved or standard approved products (Company catalogue) - APL

[6.] Previous purchase history (Core Products)

[7.] Previous quotes history

---

Please use the following liks if you wish to leave the current screen and move on.

[Products] [Returns] [Tracking] [Log Off]

Home

Find Quotes

| Select One | Quote Number | Quote Date | Customer PO Number |
|---|---|---|---|
| ○ | Q97-24633 | 12/11/97 | |
| ○ | Q97-24634 | 12/11/97 | |
| ○ | Q97-24635 | 12/11/97 | |
| ○ | Q97-24636 | 12/13/97 | 123 |
| ○ | Q97-24637 | 12/13/97 | 123 |
| ○ | Q97-24638 | 12/16/97 | 123 |
| ○ | Q97-24639 | 12/15/97 | |
| ○ | Q97-24640 | 12/16/97 | |
| ○ | Q97-24641 | 12/16/97 | 123 |
| ○ | Q97-24642 | 12/16/97 | 123 |
| ○ | Q97-24643 | 12/16/97 | 123 |
| ○ | Q97-24644 | 12/17/97 | |
| ○ | Q97-24645 | 12/17/97 | 123 |
| ○ | Q97-24646 | 12/17/97 | 123 |
| ○ | Q97-24647 | 12/17/97 | |
| ○ | Q97-24648 | 12/17/97 | |

FIG. 17A

Figure 17B:
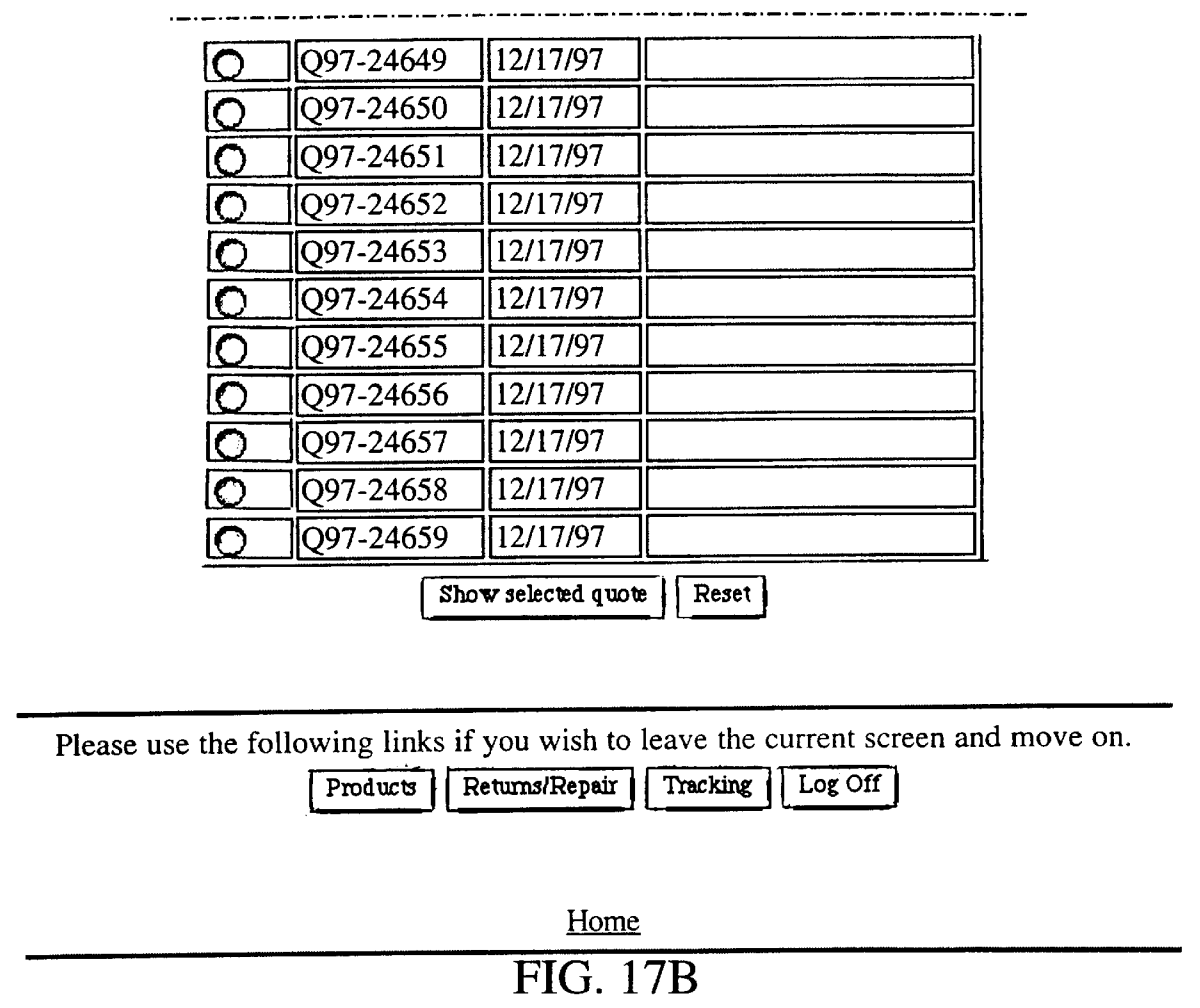

| | | | |
|---|---|---|---|
| ○ | Q97-24649 | 12/17/97 | |
| ○ | Q97-24650 | 12/17/97 | |
| ○ | Q97-24651 | 12/17/97 | |
| ○ | Q97-24652 | 12/17/97 | |
| ○ | Q97-24653 | 12/17/97 | |
| ○ | Q97-24654 | 12/17/97 | |
| ○ | Q97-24655 | 12/17/97 | |
| ○ | Q97-24656 | 12/17/97 | |
| ○ | Q97-24657 | 12/17/97 | |
| ○ | Q97-24658 | 12/17/97 | |
| ○ | Q97-24659 | 12/17/97 | |

[Show selected quote] [Reset]

Please use the following links if you wish to leave the current screen and move on.

[Products] [Returns/Repair] [Tracking] [Log Off]

Home

| | |
|---|---|
| FIG. 18A | FIG. 18B |
| FIG. 18C | FIG. 18D |
| FIG. 18E | FIG. 18F |

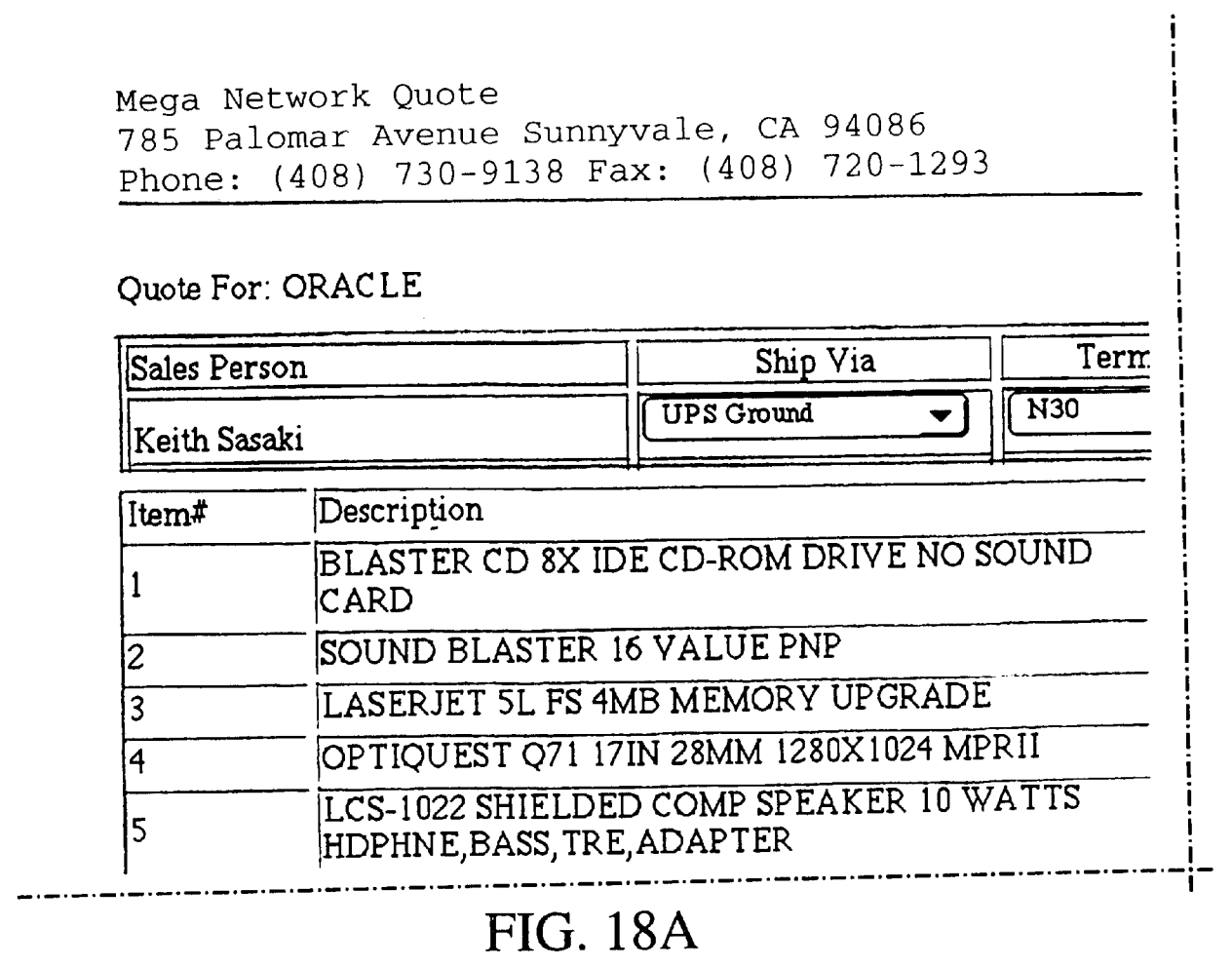

Mega Network Quote
785 Palomar Avenue Sunnyvale, CA 94086
Phone: (408) 730-9138 Fax: (408) 720-1293

Quote For: ORACLE

| Sales Person | Ship Via | Term |
|---|---|---|
| Keith Sasaki | UPS Ground | N30 |

| Item# | Description |
|---|---|
| 1 | BLASTER CD 8X IDE CD-ROM DRIVE NO SOUND CARD |
| 2 | SOUND BLASTER 16 VALUE PNP |
| 3 | LASERJET 5L FS 4MB MEMORY UPGRADE |
| 4 | OPTIQUEST Q71 17IN 28MM 1280X1024 MPRII |
| 5 | LCS-1022 SHIELDED COMP SPEAKER 10 WATTS HDPHNE,BASS,TRE,ADAPTER |

FIG. 18A

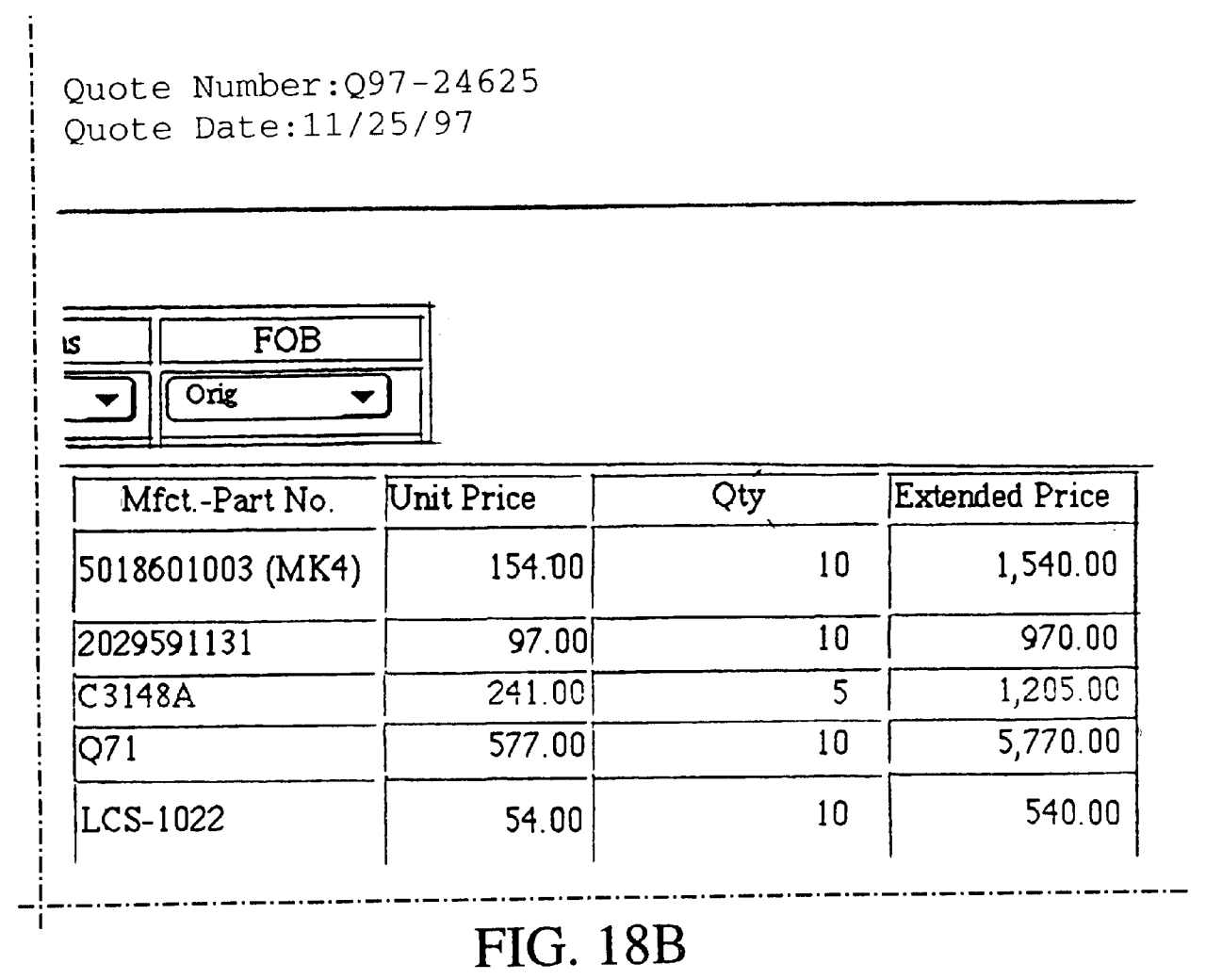

Quote Number:Q97-24625
Quote Date:11/25/97

| ...s | FOB |
|---|---|
| ▼ | Orig ▼ |

| Mfct.-Part No. | Unit Price | Qty | Extended Price |
|---|---|---|---|
| 5018601003 (MK4) | 154.00 | 10 | 1,540.00 |
| 2029591131 | 97.00 | 10 | 970.00 |
| C3148A | 241.00 | 5 | 1,205.00 |
| Q71 | 577.00 | 10 | 5,770.00 |
| LCS-1022 | 54.00 | 10 | 540.00 |

FIG. 18B

| | |
|---|---|
| 6 | VECTRA VL5 PENT-166 MMX 1.6GB-HD 16MB ISA/PCI SVGA W/WFW OR W95 |
| 7 | LASERJET 5L-FS 4PPM 600DPI |
| 8 | 32MB MEM. EXP. KIT F/HP VE2, VL4, VA, XM4, XA, (2X16MB) 60NS |
| 9 | LASERJET 5L SUPPORT PACK |
| 10 | 5.25 DRIVE RAILS 5 PAIRS (FOR 3RD PARTY DEVICES) |
| 11 | SPORTSTER, 28.8/33.6, INT., MODEM DATA FAX, ISA. |
| 12 | FAST ETHERLINK XL PCI 10/100 |

New notes:

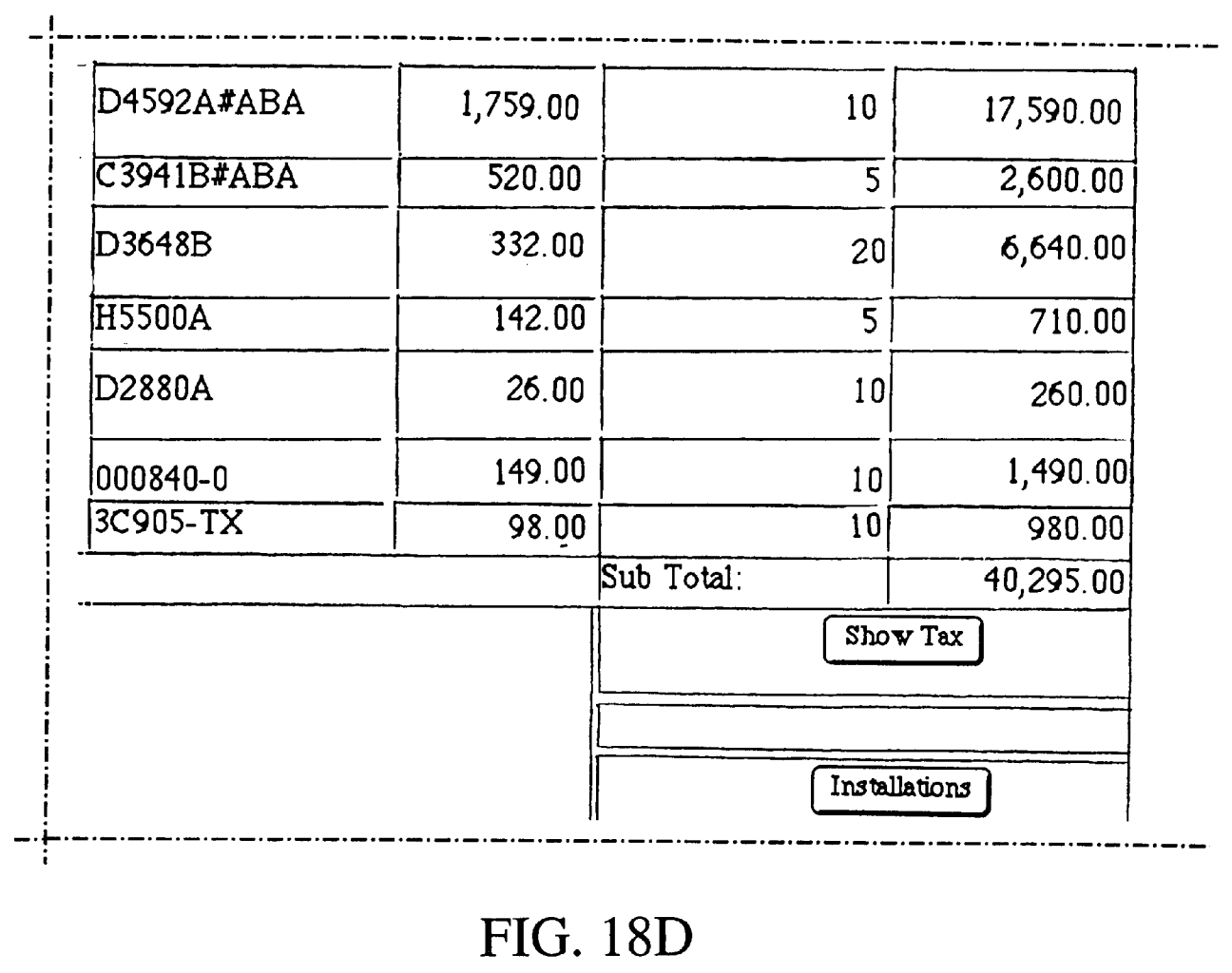

| | | | |
|---|---|---|---|
| D4592A#ABA | 1,759.00 | 10 | 17,590.00 |
| C3941B#ABA | 520.00 | 5 | 2,600.00 |
| D3648B | 332.00 | 20 | 6,640.00 |
| H5500A | 142.00 | 5 | 710.00 |
| D2880A | 26.00 | 10 | 260.00 |
| 000840-0 | 149.00 | 10 | 1,490.00 |
| 3C905-TX | 98.00 | 10 | 980.00 |
| | | Sub Total: | 40,295.00 |

Show Tax

Installations

FIG. 18D

Select one system that you wish to give instructions for installation configuration.
Or click on the appropriate button for the action you wish to take.

| Part# | Manufacturer | Description | Price | Total Qty Ordered | Qty Installed |
|---|---|---|---|---|---|
| 3C905-TX | 3-COM | FAST ETHERLINK XL PCI 10/100 | 98.00 | 10 | 0 |
| 000840-0 | U.S ROBOTICS | SPORTSTER ,28.8/33.6,INT..MODEM DATA FAX, ISA. | 149.00 | 10 | 0 |
| D2880A | HEWLETT PACKARD (SYSTEM) | 5.25 DRIVERAILS 5 PAIRS (FOR 3RD PARTY DEVICES) | 26.00 | 10 | 0 |
| H5500A | HP PRINTERS | LASERJET 5L SUPPORT PACK | 142.00 | 5 | 0 |
| D3648B | HEWLETT PACKARD | 32MB MEM. EXP. KIT F/HP VE2. VL4, VA, XM4, XA. (2X16MB) 60NS | 332.00 | 20 | 0 |
| C3941B#ABA | HP PRINTERS | LASERJET 5L-FS 4PPM 600DPI | 520.00 | 5 | 0 |

FIG. 19A

| Qty Available For installation | Select |
|---|---|
| 10 | O |
| 10 | O |
| 10 | O |
| 5 | O |
| 20 | O |
| 5 | O |

FIG. 19B

| | | | | | |
|---|---|---|---|---|---|
| D4592A#ABA | HEWLETT PACKARD (SYSTEMS) | VECTRA VL5 PENT-166 MMX 1.6GB-HD 16MB ISA/PCI SVGA W/WFW OR W95 | 1,759.00 | 10 | 0 |
| LCS-1022 | LABTEC | LCS-1022 SHIELDED COMP SPEAKER 10 WATTS HDPHNE. BASS. TRE ADAPTER | 54.00 | 10 | 0 |
| Q71 | VIEWSONIC | OPTIQUEST Q71 17IN 28MM 1280X1024 MPRII | 577.00 | 10 | 0 |
| C3148A | HP PRINTERS | LASERJET 5L FS 4MB MEMORY UPGRADE | 241.00 | 5 | 0 |
| 2029591131 | CREATIVE | SOUND BLASTER 16 VALUE PNP | 97.00 | 10 | 0 |
| 5018601003 (MK4 | CREATIVE LABS | BLASTER CD 8X IDE CD-ROM DRIVE NO SOUND CARD | 154.00 | 10 | 0 |

Continue

Reset

Finish Installation

FIG. 19C

Figure 20:
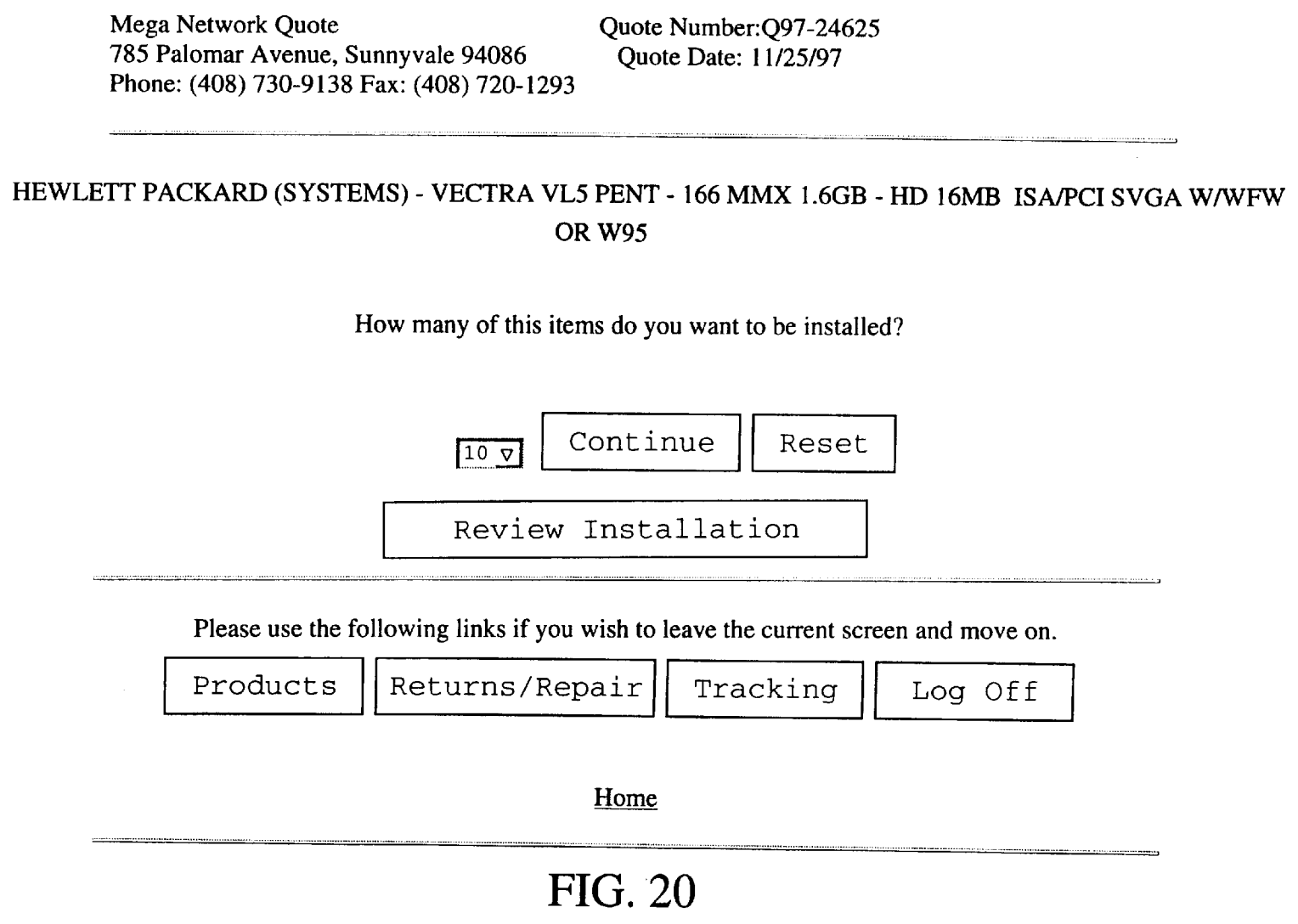

Mega Network Quote
785 Palomar Avenue, Sunnyvale 94086
Phone: (408) 730-9138 Fax: (408) 720-1293

Quote Number:Q97-24625
Quote Date: 11/25/97

---

HEWLETT PACKARD (SYSTEMS) - VECTRA VL5 PENT - 166 MMX 1.6GB - HD 16MB ISA/PCI SVGA W/WFW OR W95

How many of this items do you want to be installed?

[10 ▽] [Continue] [Reset]

[Review Installation]

---

Please use the following links if you wish to leave the current screen and move on.

[Products] [Returns/Repair] [Tracking] [Log Off]

Home

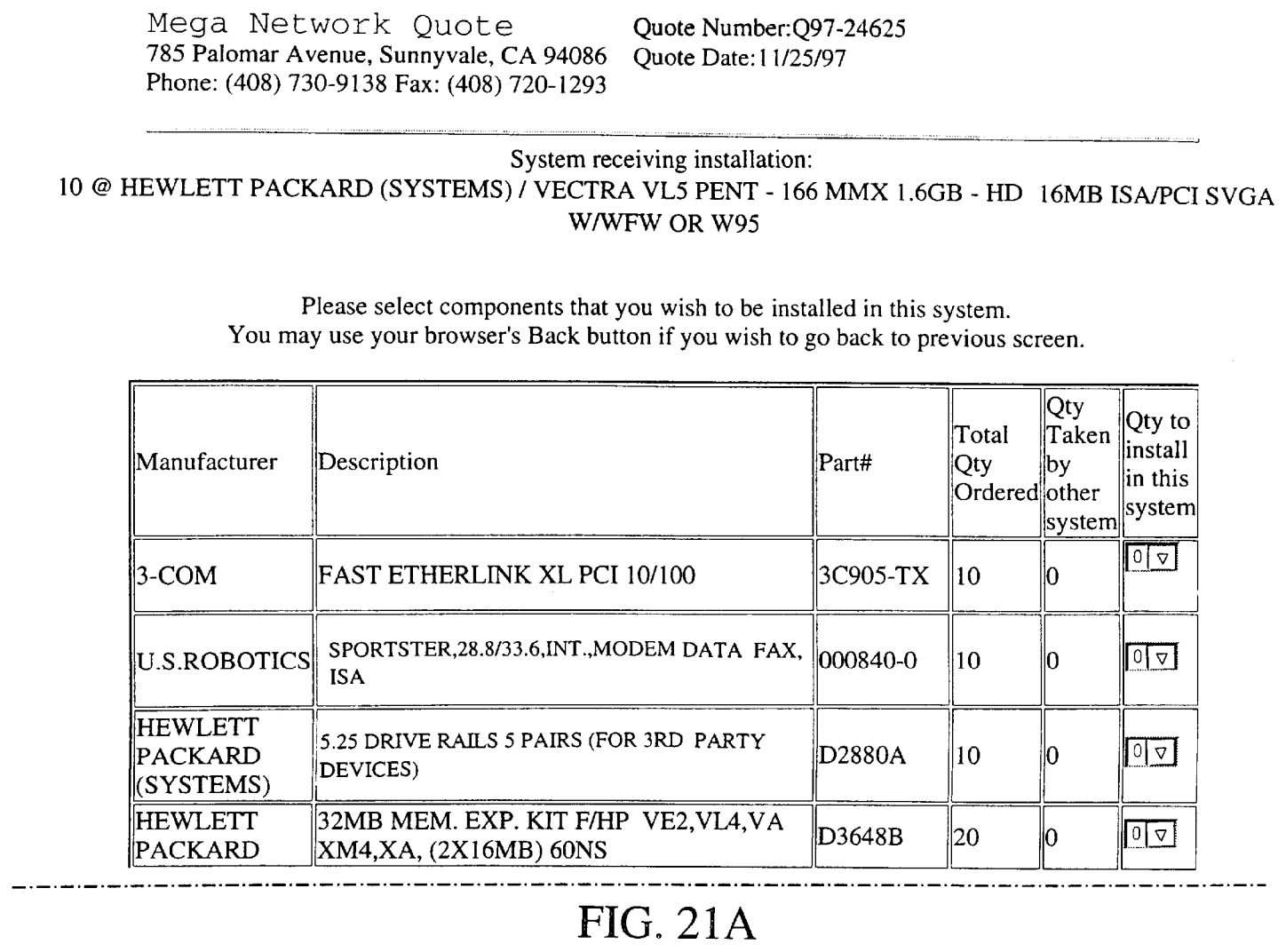

Mega Network Quote
785 Palomar Avenue, Sunnyvale, CA 94086
Phone: (408) 730-9138 Fax: (408) 720-1293

Quote Number:Q97-24625
Quote Date:11/25/97

System receiving installation:
10 @ HEWLETT PACKARD (SYSTEMS) / VECTRA VL5 PENT - 166 MMX 1.6GB - HD 16MB ISA/PCI SVGA W/WFW OR W95

Please select components that you wish to be installed in this system.
You may use your browser's Back button if you wish to go back to previous screen.

| Manufacturer | Description | Part# | Total Qty Ordered | Qty Taken by other system | Qty to install in this system |
|---|---|---|---|---|---|
| 3-COM | FAST ETHERLINK XL PCI 10/100 | 3C905-TX | 10 | 0 | 0 ▽ |
| U.S.ROBOTICS | SPORTSTER,28.8/33.6,INT.,MODEM DATA FAX, ISA | 000840-0 | 10 | 0 | 0 ▽ |
| HEWLETT PACKARD (SYSTEMS) | 5.25 DRIVE RAILS 5 PAIRS (FOR 3RD PARTY DEVICES) | D2880A | 10 | 0 | 0 ▽ |
| HEWLETT PACKARD | 32MB MEM. EXP. KIT F/HP VE2,VL4,VA XM4,XA, (2X16MB) 60NS | D3648B | 20 | 0 | 0 ▽ |

FIG. 21A

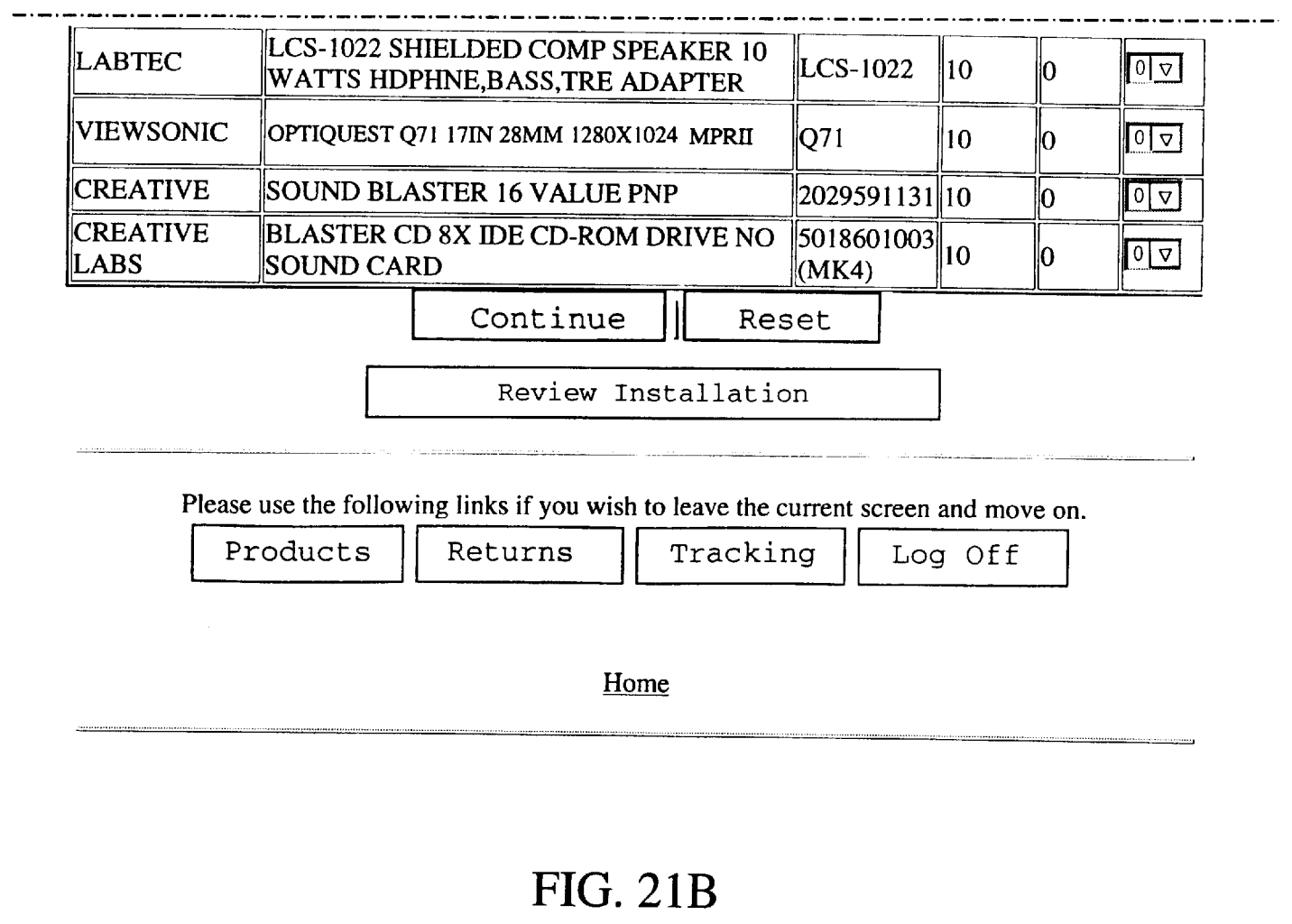

| | | | | | |
|---|---|---|---|---|---|
| LABTEC | LCS-1022 SHIELDED COMP SPEAKER 10 WATTS HDPHNE,BASS,TRE ADAPTER | LCS-1022 | 10 | 0 | 0 ▽ |
| VIEWSONIC | OPTIQUEST Q71 17IN 28MM 1280X1024 MPRII | Q71 | 10 | 0 | 0 ▽ |
| CREATIVE | SOUND BLASTER 16 VALUE PNP | 2029591131 | 10 | 0 | 0 ▽ |
| CREATIVE LABS | BLASTER CD 8X IDE CD-ROM DRIVE NO SOUND CARD | 5018601003 (MK4) | 10 | 0 | 0 ▽ |

Continue | Reset

Review Installation

Please use the following links if you wish to leave the current screen and move on.

Products | Returns | Tracking | Log Off

Home

FIG. 21B

Figure 22A:
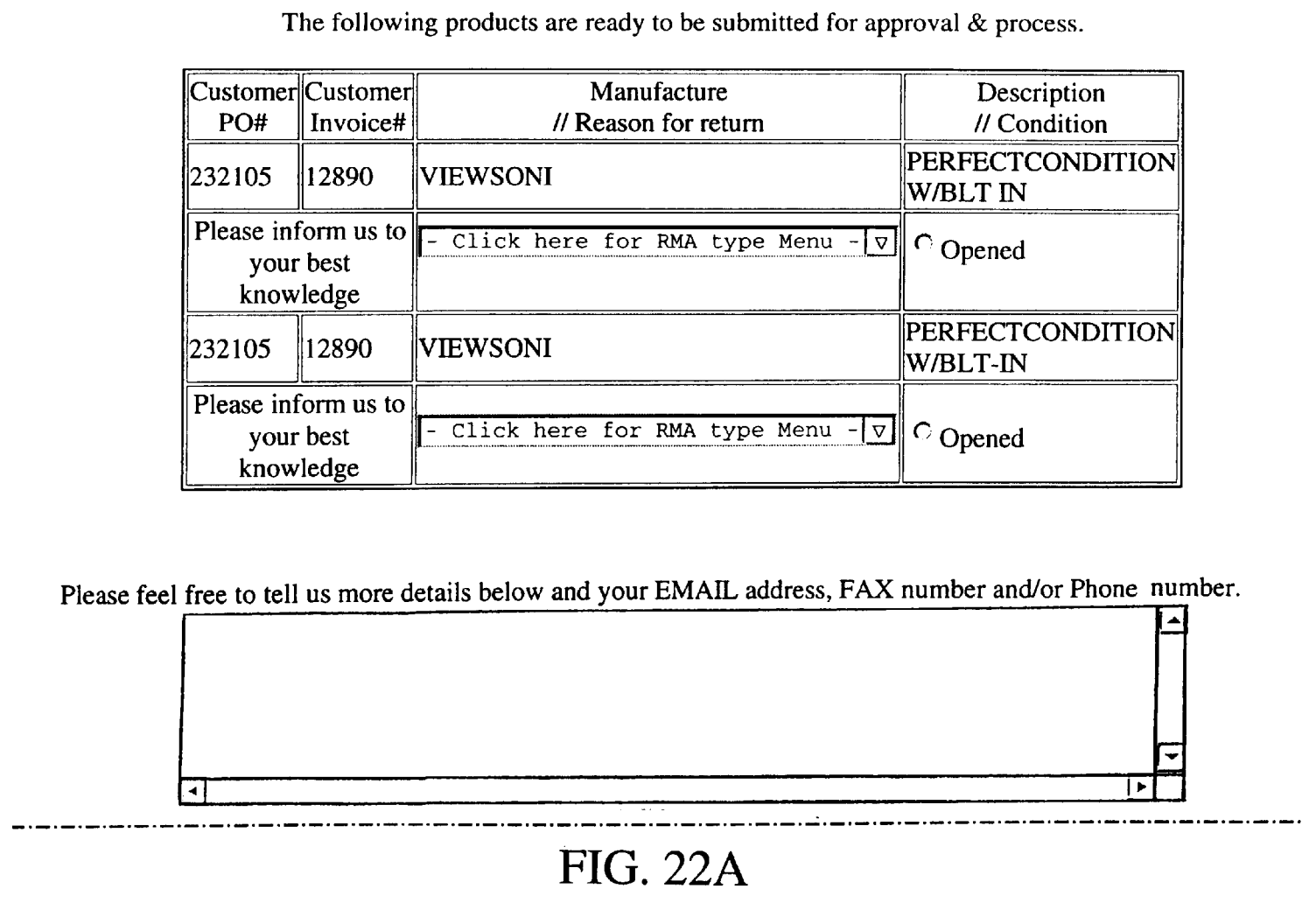

The following products are ready to be submitted for approval & process.

| Customer PO# | Customer Invoice# | Manufacture // Reason for return | Description // Condition |
|---|---|---|---|
| 232105 | 12890 | VIEWSONI | PERFECTCONDITION W/BLT IN |
| Please inform us to your best knowledge | | - Click here for RMA type Menu - ▽ | ○ Opened |
| 232105 | 12890 | VIEWSONI | PERFECTCONDITION W/BLT-IN |
| Please inform us to your best knowledge | | - Click here for RMA type Menu - ▽ | ○ Opened |

Please feel free to tell us more details below and your EMAIL address, FAX number and/or Phone number.

| | |
|---|---|
| FIG. 27A | FIG. 27B |
| FIG. 27C | FIG. 27D |
| FIG. 27E | FIG. 27F |

Preparing data for display.

| Check | Date Shipped | PO# | Invoice# | Manufacturer | Part# |
|---|---|---|---|---|---|
| ☑ | Mar 14, 1997 | PO#232222 | 13154 | VST POWER SYSTEMS | BAT1403 |
| ☑ | Mar 3, 1997 | 236108 | 13082 | USROBOTICS PALM COMP | 10104U |
| ☑ | Mar 3, 1997 | 236167 | 13130 | CYBEX | CURC-8 |
| ☑ | Mar 11, 1997 | 235714 | 13129 | KINGSTON TECHNOLOGY | KTH5L/4 |
| ☑ | Mar 5, 1997 | 236581 | 13090 | BELKIN COMPONENTS | F2A036-10 |
| ☑ | Mar 5, 1997 | 236581 | 13090 | BELKIN COMPONENTS | F2A036-10 |

FIG. 27A

| Description | Serial# | Asset# |
|---|---|---|
| CHARGER 1400 SERIES POWERBOOK W/AC ADAPTER | unknown | unknown |
| PILOT CABLE PC HOTSYNC ACCESSORY | unknown | unknown |
| CABLE SET | unknown | unknown |
| 4MB MEMORY CARD FOR HP LASERJET 5L, 5L-FS | unknown | unknown |
| 10FT PARALLEL PRINTER CABLE DB25M TO CENT36M STANDARD | unknown | unknown |
| 10FT PARALLEL PRINTER CABLE DB25M TO CENT36M STANDARD | unknown | unknown |

FIG. 27B

| | | | | | |
|---|---|---|---|---|---|
| ☑ | Mar 11, 1997 | 237159 | 13132 | SIGMA | 45150 |
| ☑ | Mar 11, 1997 | 236796 | 13127 | PENSTOCK | CD1035E |
| ☐ | Mar 11, 1997 | 236796 | 13127 | PENSTOCK | CD1035E |
| ☐ | Mar 11, 1997 | 236796 | 13127 | PENSTOCK | CD1035E |
| ☐ | Mar 11, 1997 | 236796 | 13127 | PENSTOCK | CD1035E |

FIG. 27C

| | | |
|---|---|---|
| 45150 REALMAGIC ULTRA TV/NTSC MPEG | unknown | unknown |
| CD1035E VEIWMAGIC 10" COLOR .26 DPI MONITOR | unknown | unknown |
| CD1035E VEIWMAGIC 10" COLOR .26 DPI MONITOR | unknown | unknown |
| CD1035E VEIWMAGIC 10" COLOR .26 DPI MONITOR | unknown | unknown |
| CD1035E VEIWMAGIC 10" COLOR .26 DPI MONITOR | unknown | unknown |

FIG. 27D

| | | |
|---|---|---|
| CD1035E VEIWMAGIC 10" COLOR .26 DPI MONITOR | unknown | unknown |

FIG. 27F

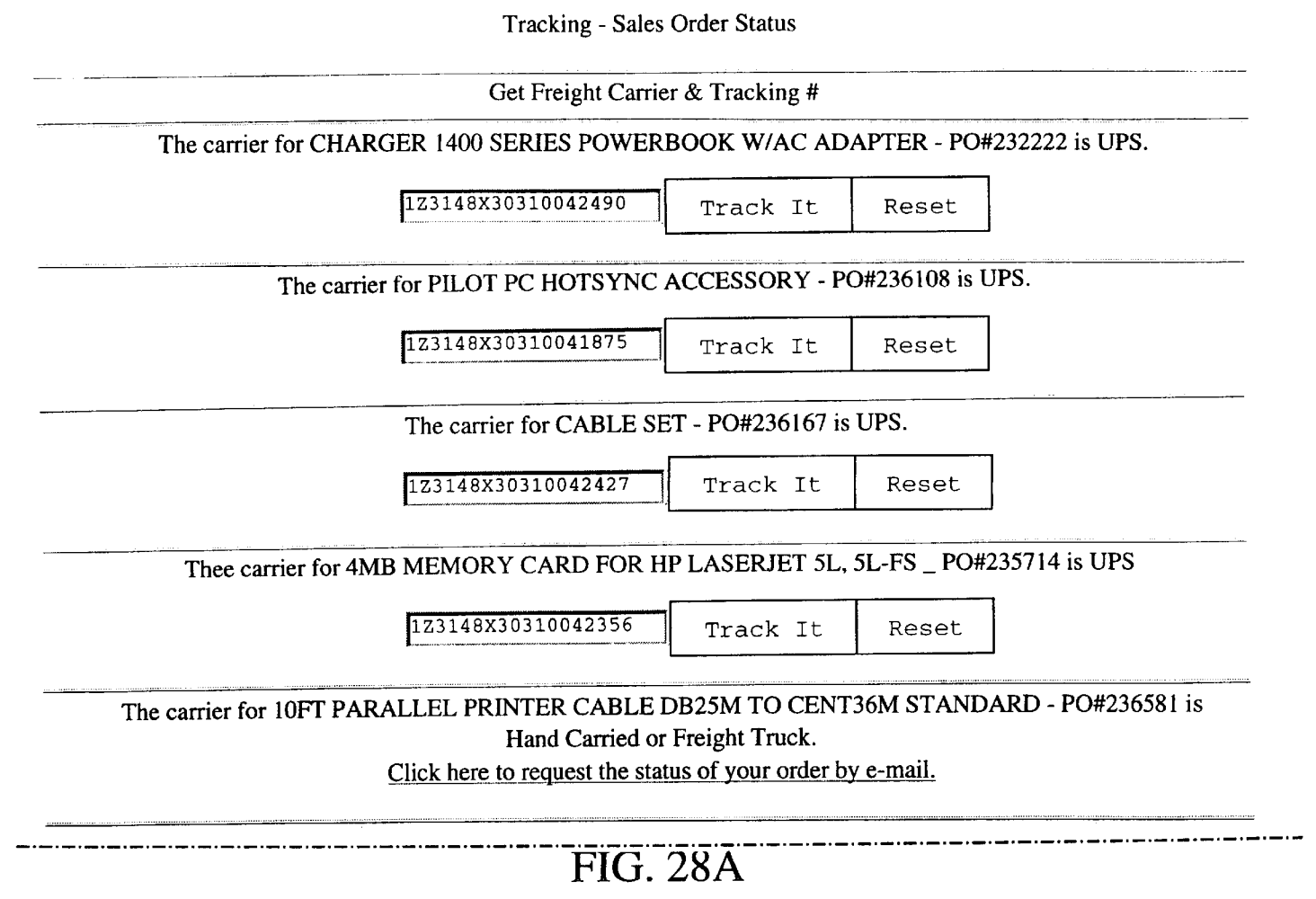

Tracking - Sales Order Status

Get Freight Carrier & Tracking #

The carrier for CHARGER 1400 SERIES POWERBOOK W/AC ADAPTER - PO#232222 is UPS.

1Z3148X30310042490 | Track It | Reset

The carrier for PILOT PC HOTSYNC ACCESSORY - PO#236108 is UPS.

1Z3148X30310041875 | Track It | Reset

The carrier for CABLE SET - PO#236167 is UPS.

1Z3148X30310042427 | Track It | Reset

Thee carrier for 4MB MEMORY CARD FOR HP LASERJET 5L, 5L-FS _ PO#235714 is UPS

1Z3148X30310042356 | Track It | Reset

The carrier for 10FT PARALLEL PRINTER CABLE DB25M TO CENT36M STANDARD - PO#236581 is Hand Carried or Freight Truck.

Click here to request the status of your order by e-mail.

FIG. 28A

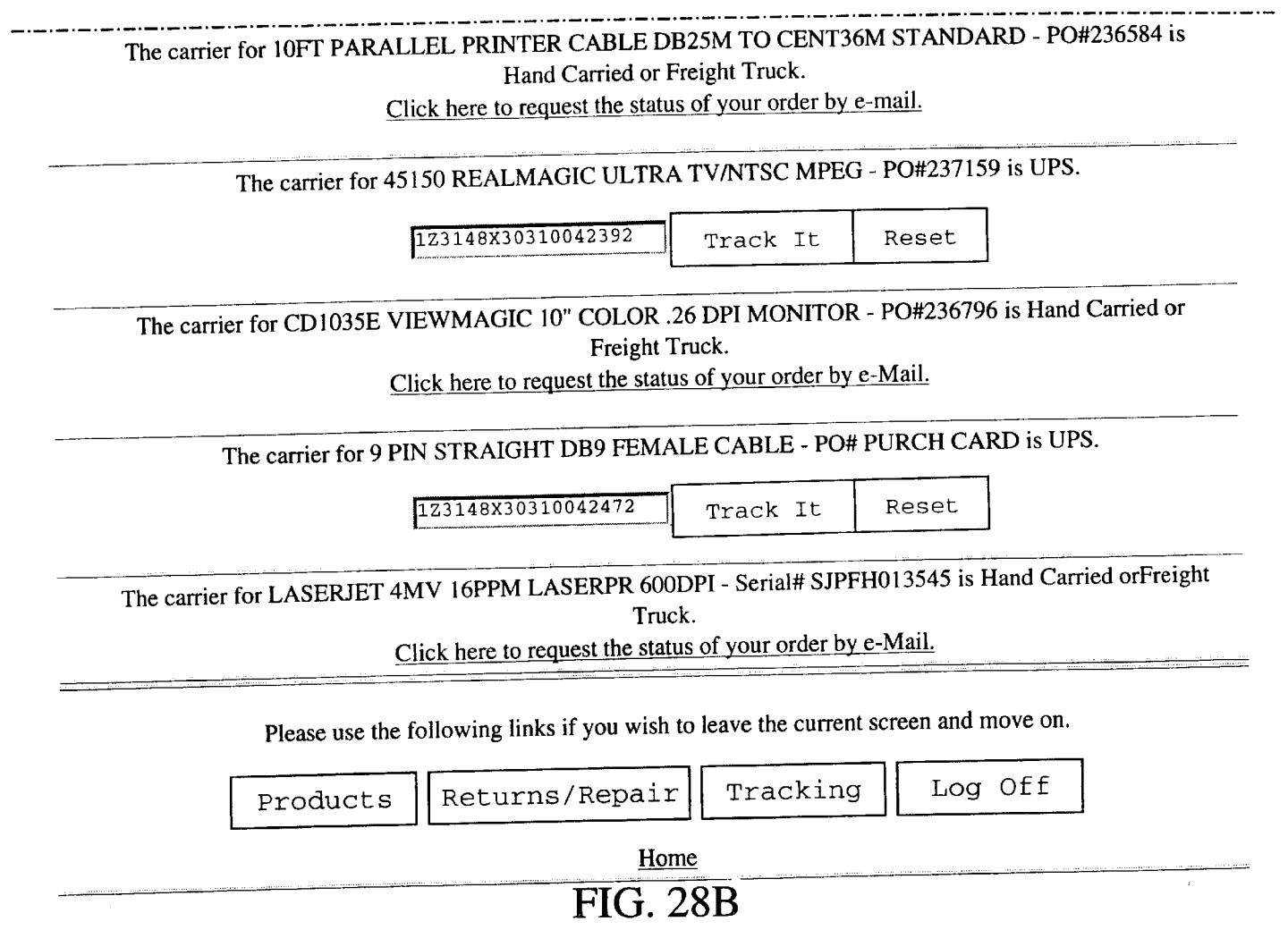

The carrier for 10FT PARALLEL PRINTER CABLE DB25M TO CENT36M STANDARD - PO#236584 is Hand Carried or Freight Truck.

Click here to request the status of your order by e-mail.

---

The carrier for 45150 REALMAGIC ULTRA TV/NTSC MPEG - PO#237159 is UPS.

1Z3148X30310042392 | Track It | Reset

---

The carrier for CD1035E VIEWMAGIC 10" COLOR .26 DPI MONITOR - PO#236796 is Hand Carried or Freight Truck.

Click here to request the status of your order by e-Mail.

---

The carrier for 9 PIN STRAIGHT DB9 FEMALE CABLE - PO# PURCH CARD is UPS.

1Z3148X30310042472 | Track It | Reset

---

The carrier for LASERJET 4MV 16PPM LASERPR 600DPI - Serial# SJPFH013545 is Hand Carried orFreight Truck.

Click here to request the status of your order by e-Mail.

---

Please use the following links if you wish to leave the current screen and move on.

Products | Returns/Repair | Tracking | Log Off

Home

FIG. 28B

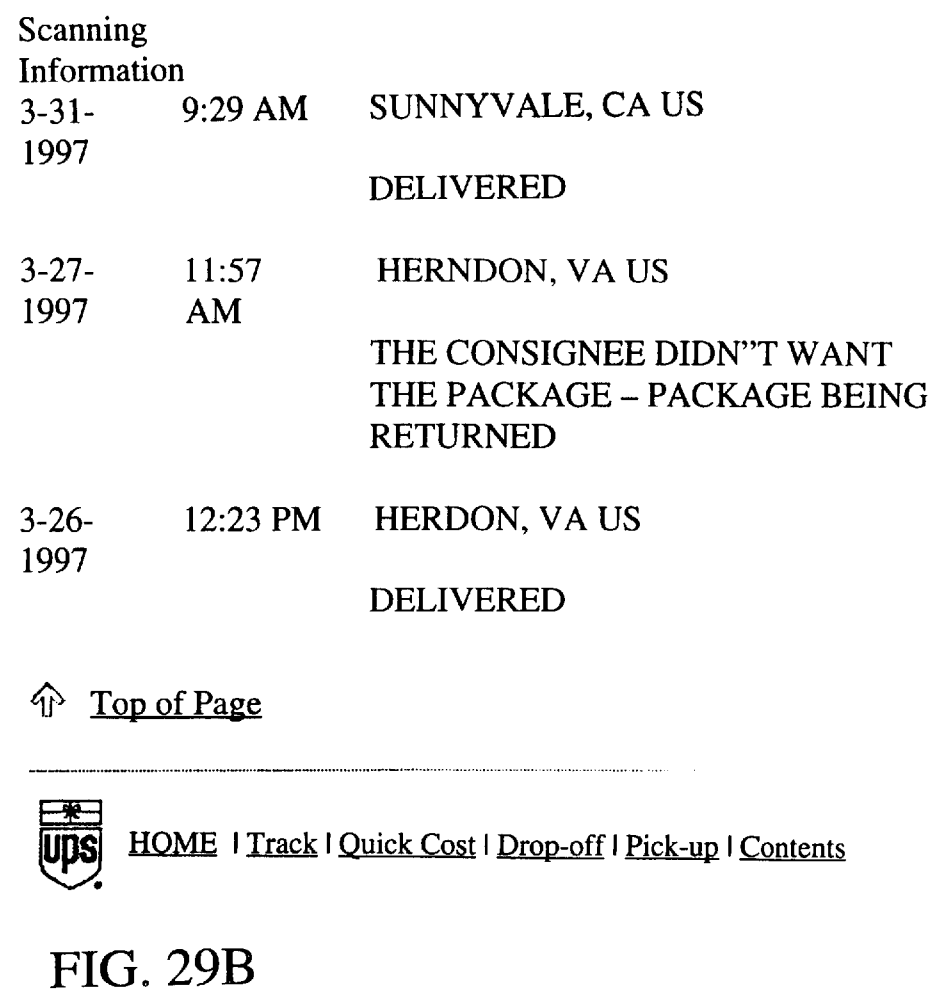

Scanning Information

| | | |
|---|---|---|
| 3-31-1997 | 9:29 AM | SUNNYVALE, CA US |
| | | DELIVERED |
| 3-27-1997 | 11:57 AM | HERNDON, VA US |
| | | THE CONSIGNEE DIDN"T WANT THE PACKAGE – PACKAGE BEING RETURNED |
| 3-26-1997 | 12:23 PM | HERDON, VA US |
| | | DELIVERED |

⇧ Top of Page

HOME | Track | Quick Cost | Drop-off | Pick-up | Contents

FIG. 29B

Figure 30:
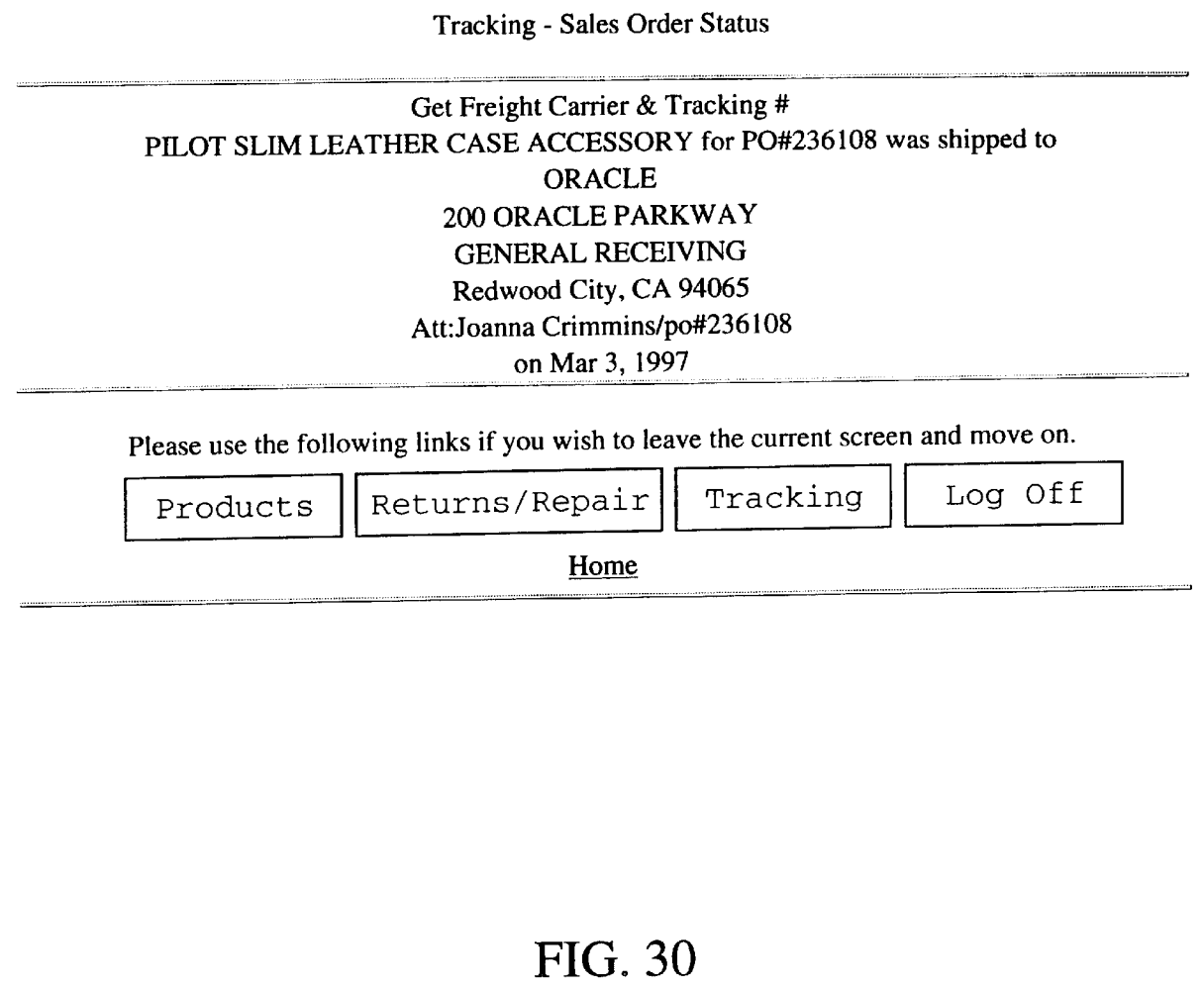

Tracking - Sales Order Status

---

Get Freight Carrier & Tracking #
PILOT SLIM LEATHER CASE ACCESSORY for PO#236108 was shipped to
ORACLE
200 ORACLE PARKWAY
GENERAL RECEIVING
Redwood City, CA 94065
Att:Joanna Crimmins/po#236108
on Mar 3, 1997

---

Please use the following links if you wish to leave the current screen and move on.

[Products] [Returns/Repair] [Tracking] [Log Off]

Home

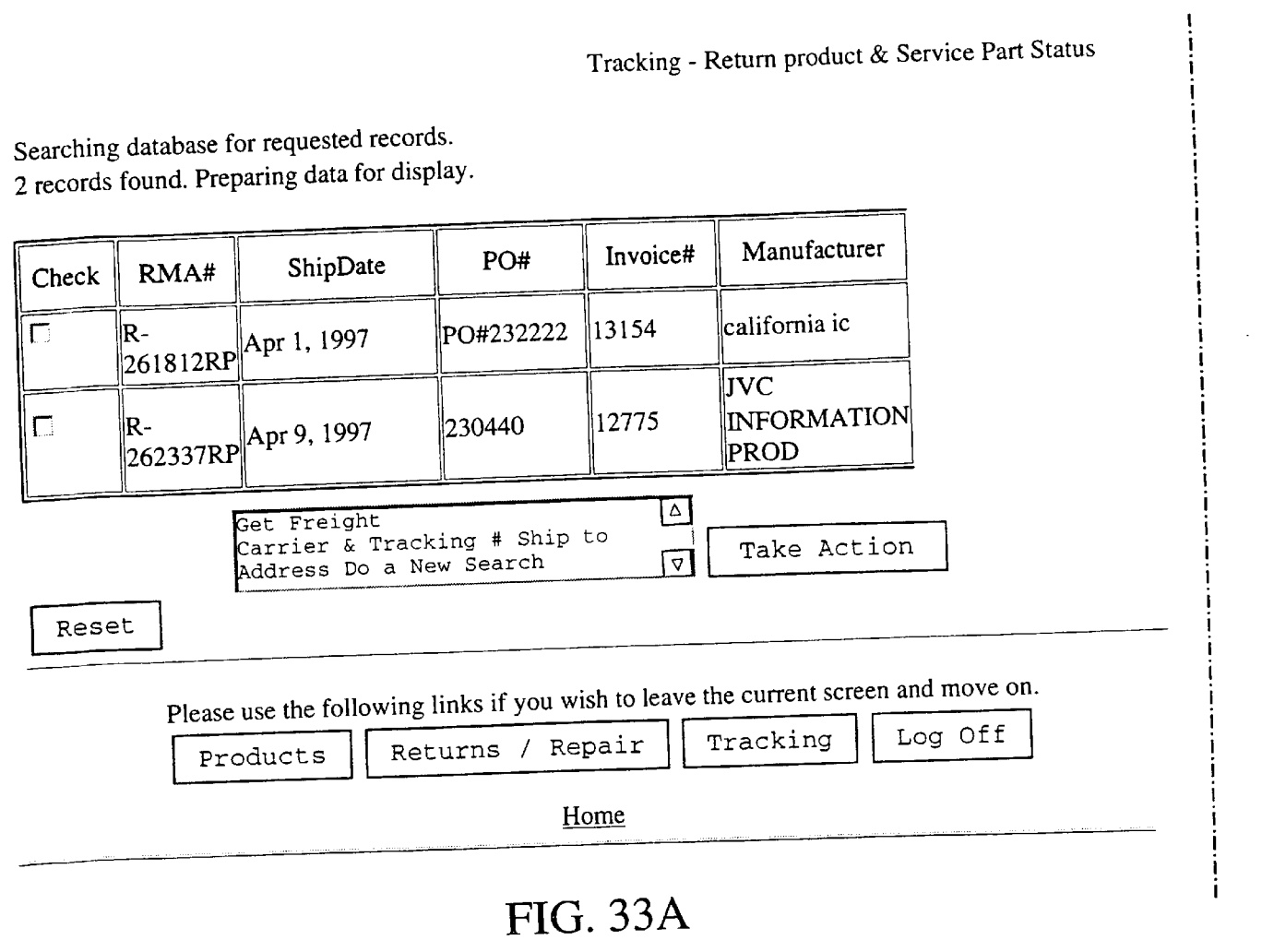

Tracking - Return product & Service Part Status

Searching database for requested records.
2 records found. Preparing data for display.

| Check | RMA# | ShipDate | PO# | Invoice# | Manufacturer |
|---|---|---|---|---|---|
| ☐ | R-261812RP | Apr 1, 1997 | PO#232222 | 13154 | california ic |
| ☐ | R-262337RP | Apr 9, 1997 | 230440 | 12775 | JVC INFORMATION PROD |

Get Freight
Carrier & Tracking # Ship to
Address Do a New Search

Take Action

Reset

Please use the following links if you wish to leave the current screen and move on.

Products | Returns / Repair | Tracking | Log Off

Home

FIG. 33A

| Part# | Description | RMA Qty | Qty Recvd | Notes |
|---|---|---|---|---|
| | 24MB APPLE PWRBK 1400 SERIES | 2 | 2 | |
| BC-CR2100B-2X4 | MINITOWER EXT 5X4X4 CDR TOWER 5 BAY 4X RECORD 4X READ SCSI2 | 1 | 1 | |

FIG. 33B

Tracking – Product Purchase History

Searching database. If this takes too long, please narrow down your search.earch.
Search has completed. 27 records found.

| Date Shipped | PO# | Manufacturer | Part# |
|---|---|---|---|
| Mar 14, 1997 | PO#232222 | VST POWER SYSTEMS | BAT1403 |
| Mar 19, 1997 | PO#232222 | BELKI COMPONENTS | F2N983-02 |
| Mar 14, 1997 | PO#232222 | GLOBAL VILLAGE | 30-3100 |
| Mar 14, 1997 | PO#232222 | calofornia ic | |
| Mar 14, 1997 | PO#232222 | APPLE | M5576LL/A |
| Mar 3, 1997 | 236108 | USROBOTICS PALM COMPUTING | 10104U |
| Mar 3, 1997 | 236108 | USROBOTICS PALM COMPUTING | 10100U |
| Mar 3, 1997 | 236108 | USROBOTICS PALM COMPUTING | 10111U |
| Mar 3, 1997 | 236108 | USROBOTICS PALM COMPUTING | 10101U |

FIG. 35A

| Description | Qty |
|---|---|
| CHARGER 1400 SERIES POWERBOOK W/AC ADAPTER | 1 |
| POWERBK SCSI2 CABLE HDI-30M:M DB50M 2" | 1 |
| POWERPORT PLANTINUM PRO ETH PCCARD&MODEM | 1 |
| 24MB APPLE PWRBK 1400 SERIES | 2 |
| POWER BOOK 1400C/133 16MG 1GB W/6X CD | 1 |
| PILOT CABLE PC HOTSYNC ACCESSORY | 1 |
| PILOT IMB UPG FOR DT ORGANIZER | 1 |
| PILOT MODEM CABLE | 1 |
| PILOT SLIM LEATHER CASE ACCESSORY | 1 |

FIG. 35B

| | | | |
|---|---|---|---|
| Mar 3, 1997 | 236108 | USROBOTICS | 10108U |
| Mar 3, 1997 | 236108 | USROBOTICS | 80101U |
| Mar 11, 1997 | 236167 | CYBEX | CURC-8 |
| Mar 11, 1997 | 235714 | KINGSTONTECHNOLOGY (MEMORY) | KTH5L/4 |
| Mar 11, 1997 | 236581 | BELKI COMPONENTS | F2A036-10 |
| Mar 5, 1997 | 236581 | HP PRINTERS | C3941B#ABA |
| Mar 5, 1997 | 236584 | BELKIN COMPONENTS | F2A036-10 |
| Mar 5, 1997 | 236584 | HP PRINTERS | C3941B#ABA |
| Mar 11, 1997 | 237159 | SIGMA | 45150 |
| Mar 11, 1997 | 236796 | PENSTOCK | CD1035E |
| Mar 13, 1997 | PURCH CARD | WORTHINGTON | F36 |
| Mar 12, 1997 | 237488 | HP PRINTERS | C3142A#ABA |

FIG. 35C

| | |
|---|---|
| 10108U PILOT STYLUS 3-PAK | 1 |
| 80101U PILOT 5000 ORGANIZER PKG. | 1 |
| CABLE SET | 1 |
| MAGNUN COMMANDER 16 PORT | 1 |
| 4MB MEMORY CARD FOR HP LASERJET 5L,5L-FS | 1 |
| 10FT PARALLEL PRINTER CABLE DB25M TO CENT36M STANDARD | 1 |
| LASERJET 5L-FS 4PPM LASERPR 1MB 600DPI | 1 |
| 10FT PARALLEL PRINTER CABLE DB25M TO CENT36M STANDARD | 1 |
| LASERJET 5L-FS 4PPM LASERPR 1MB 600DPI | 1 |
| 45150 REALMAGIC ULTRA TV/NTSC MPEG | 1 |
| CD1035E VIEWMAGIC 10" COLOR .26DPI MONITOR | 5 |
| 9 PIN STRAIGHT DB9 FEMALE CABLE | 1 |
| LASERJET 4MV 16PPM LASERPR 600DPI | 1 |

FIG. 35D

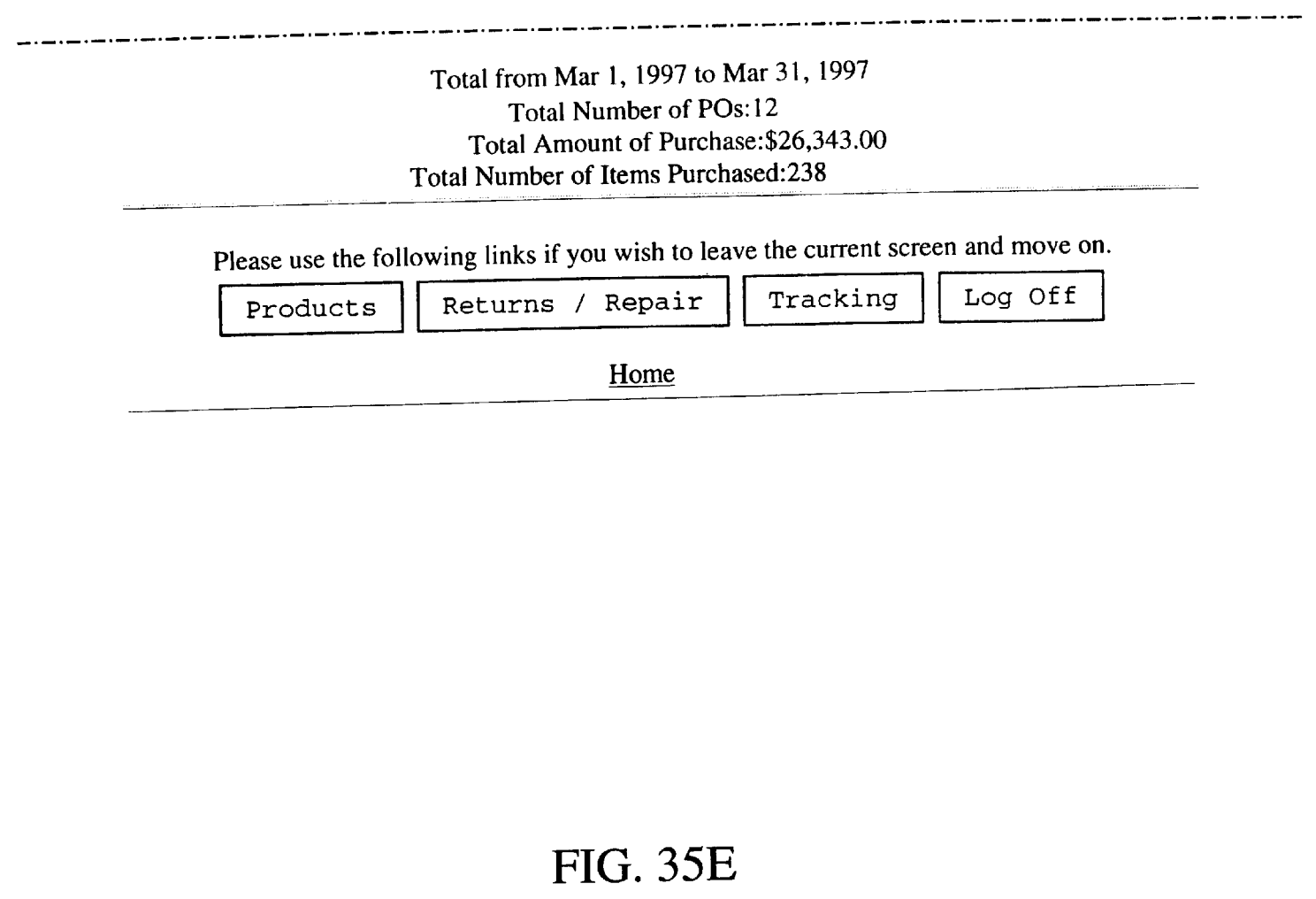

Total from Mar 1, 1997 to Mar 31, 1997

Total Number of POs:12

Total Amount of Purchase:$26,343.00

Total Number of Items Purchased:238

Please use the following links if you wish to leave the current screen and move on.

Products | Returns / Repair | Tracking | Log Off

Home

FIG. 35E

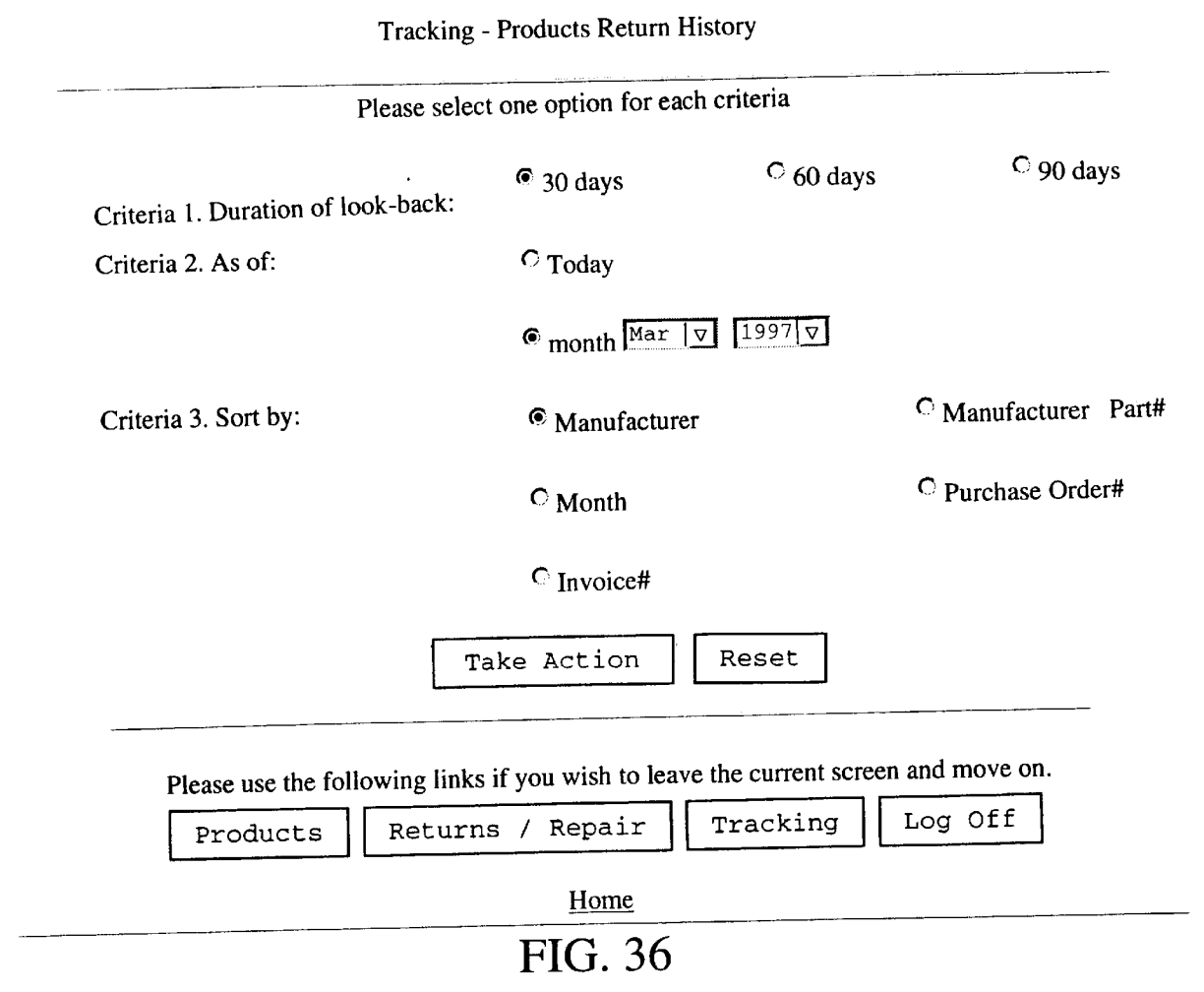

Tracking - Products Return History

Please select one option for each criteria

Criteria 1. Duration of look-back: (•) 30 days ( ) 60 days ( ) 90 days

Criteria 2. As of: ( ) Today (•) month [Mar ▽] [1997 ▽]

Criteria 3. Sort by: (•) Manufacturer ( ) Manufacturer Part#

( ) Month ( ) Purchase Order#

( ) Invoice#

[Take Action] [Reset]

Please use the following links if you wish to leave the current screen and move on.

[Products] [Returns / Repair] [Tracking] [Log Off]

Home

FIG. 36

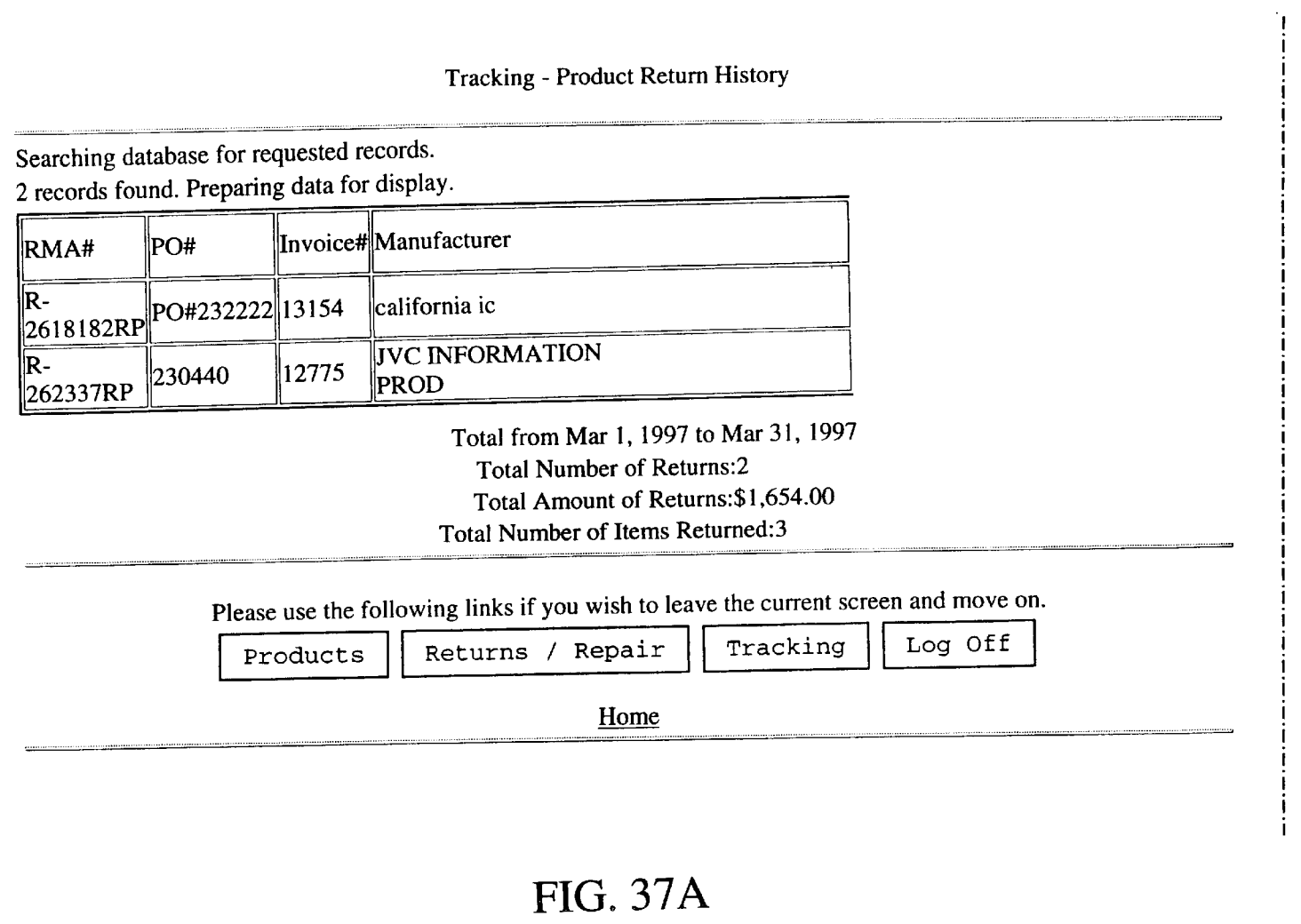

Tracking - Product Return History

Searching database for requested records.

2 records found. Preparing data for display.

| RMA# | PO# | Invoice# | Manufacturer |
|---|---|---|---|
| R-2618182RP | PO#232222 | 13154 | california ic |
| R-262337RP | 230440 | 12775 | JVC INFORMATION PROD |

Total from Mar 1, 1997 to Mar 31, 1997
Total Number of Returns:2
Total Amount of Returns:$1,654.00
Total Number of Items Returned:3

Please use the following links if you wish to leave the current screen and move on.

Products | Returns / Repair | Tracking | Log Off

Home

FIG. 37A

| Part# | Description | RMA Qty |
|---|---|---|
| | 24MB APPLE PWRBK 1400 SERIES | 2 |
| BC-CR2100B-2x4 | MINITOWER EXT 5X4X4 TOWER CDR TOWER 5 BAY 4X RECORD 4X READ SCSI2 | 1 |

FIG. 37B

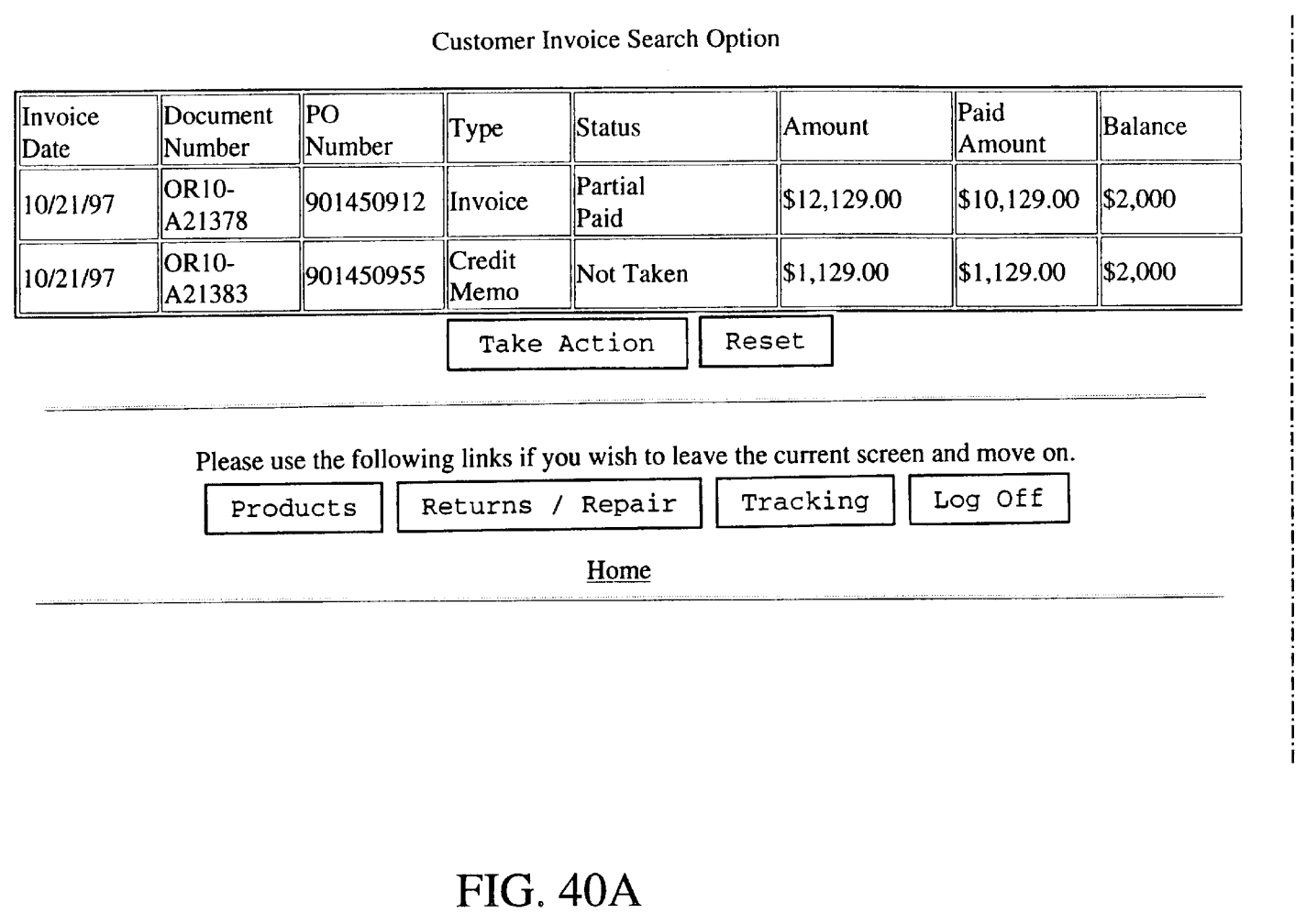

Customer Invoice Search Option

| Invoice Date | Document Number | PO Number | Type | Status | Amount | Paid Amount | Balance |
|---|---|---|---|---|---|---|---|
| 10/21/97 | OR10-A21378 | 901450912 | Invoice | Partial Paid | $12,129.00 | $10,129.00 | $2,000 |
| 10/21/97 | OR10-A21383 | 901450955 | Credit Memo | Not Taken | $1,129.00 | $1,129.00 | $2,000 |

Take Action | Reset

Please use the following links if you wish to leave the current screen and move on.

Products | Returns / Repair | Tracking | Log Off

Home

FIG. 40A

| Check Number | Check Date | Show Detail |
| --- | --- | --- |
| #495 | 11/21/97 | ☐ |
| #595 | 11/21/97 | ☐ |

FIG. 40B

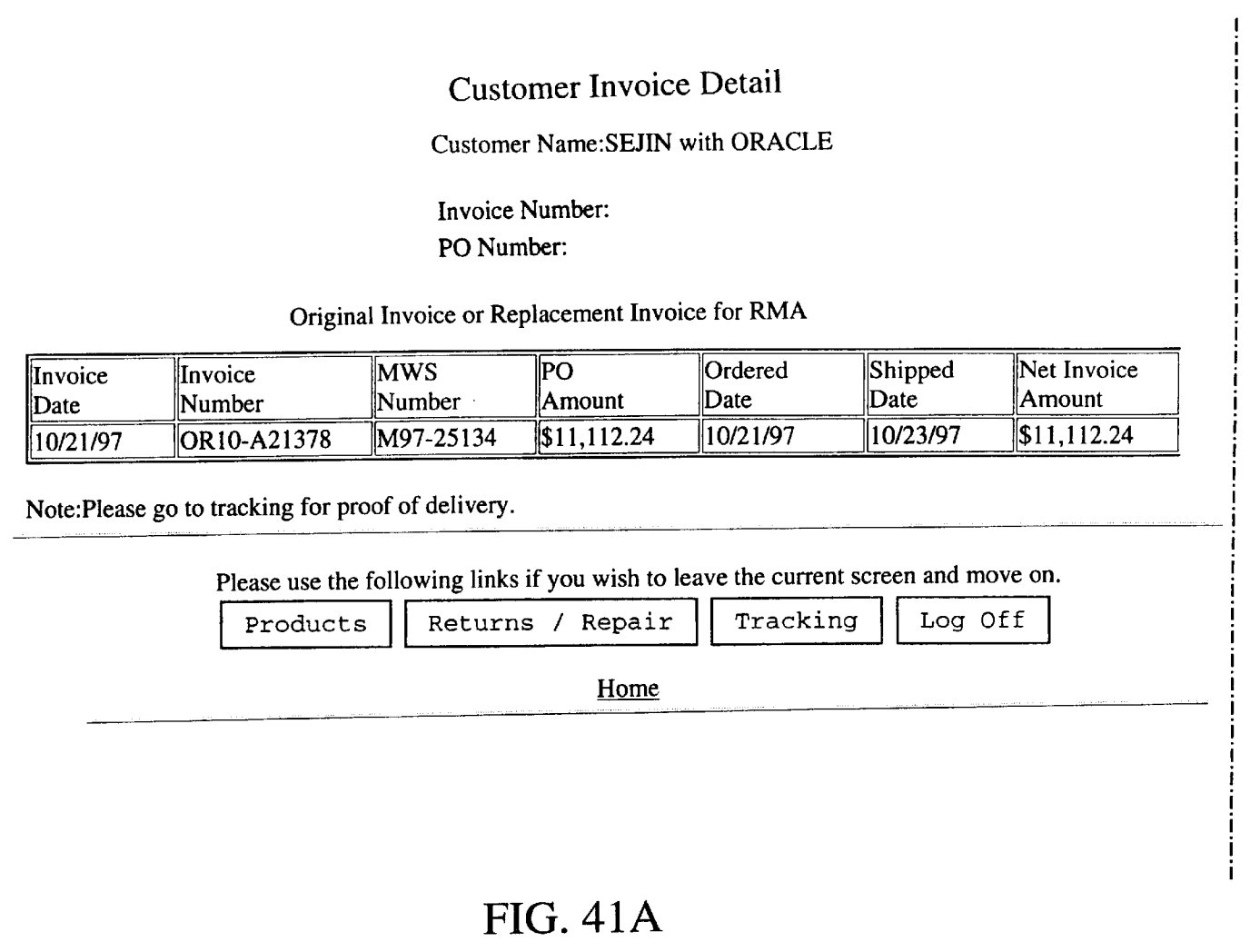

Customer Invoice Detail

Customer Name:SEJIN with ORACLE

Invoice Number:
PO Number:

Original Invoice or Replacement Invoice for RMA

| Invoice Date | Invoice Number | MWS Number | PO Amount | Ordered Date | Shipped Date | Net Invoice Amount |
|---|---|---|---|---|---|---|
| 10/21/97 | OR10-A21378 | M97-25134 | $11,112.24 | 10/21/97 | 10/23/97 | $11,112.24 |

Note:Please go to tracking for proof of delivery.

Please use the following links if you wish to leave the current screen and move on.

`Products` `Returns / Repair` `Tracking` `Log Off`

Home

FIG. 41A

| Tax Amount | Freight Amount | Other Amount | RMA |
| --- | --- | --- | --- |
| $1,000.76 | $100.00 | | |

| FIG. 43A | FIG. 43B |
|---|---|

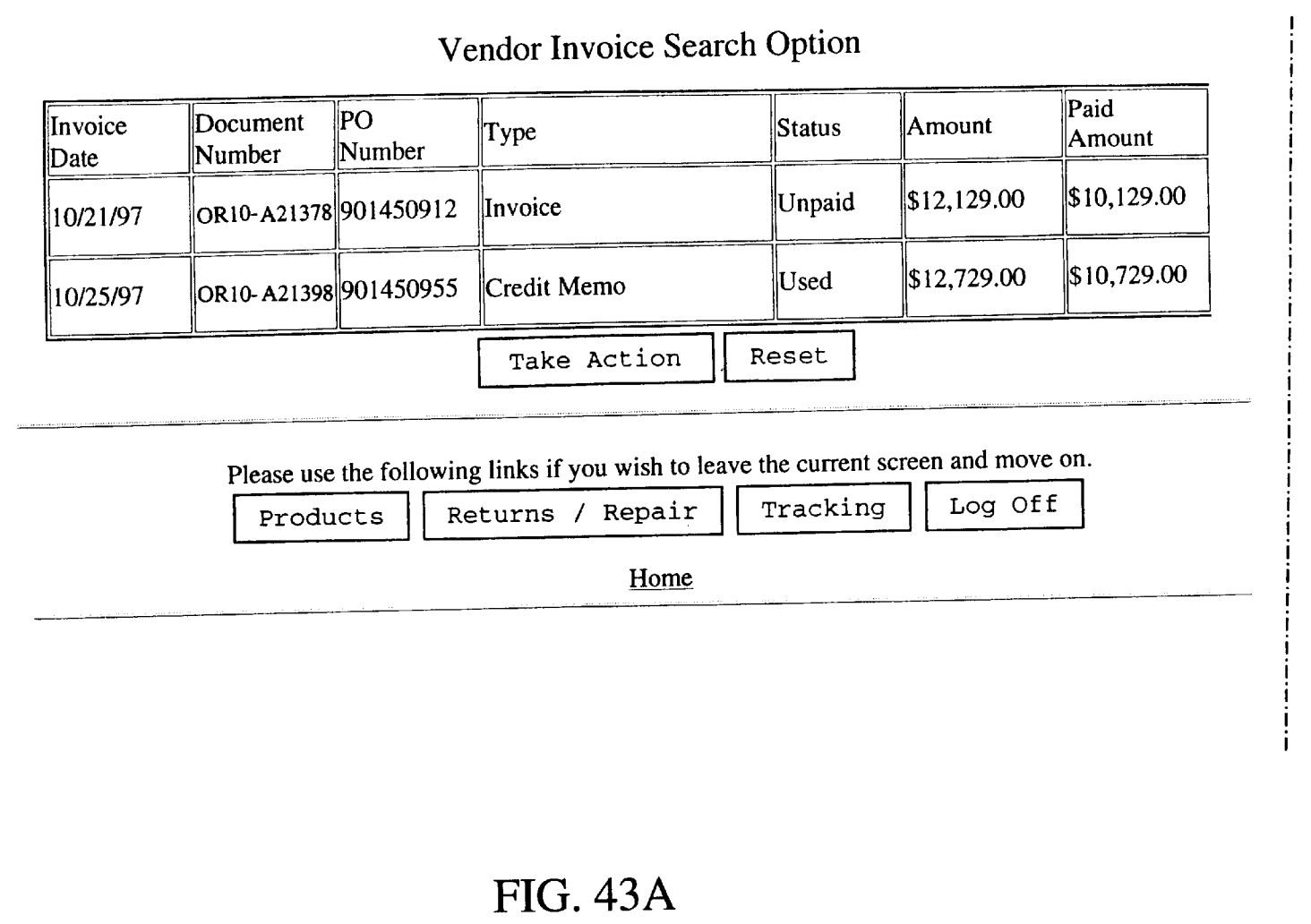

Vendor Invoice Search Option

| Invoice Date | Document Number | PO Number | Type | Status | Amount | Paid Amount |
|---|---|---|---|---|---|---|
| 10/21/97 | OR10-A21378 | 901450912 | Invoice | Unpaid | $12,129.00 | $10,129.00 |
| 10/25/97 | OR10-A21398 | 901450955 | Credit Memo | Used | $12,729.00 | $10,729.00 |

Take Action | Reset

Please use the following links if you wish to leave the current screen and move on.

Products | Returns / Repair | Tracking | Log Off

Home

FIG. 43A

| Balance | Check Number | Check Date | Show Detail |
|---|---|---|---|
| $2,000 | #495 | 11/21/97 | ☐ |
| $2,000 | #534 | 11/21/97 | ☐ |

FIG. 43B

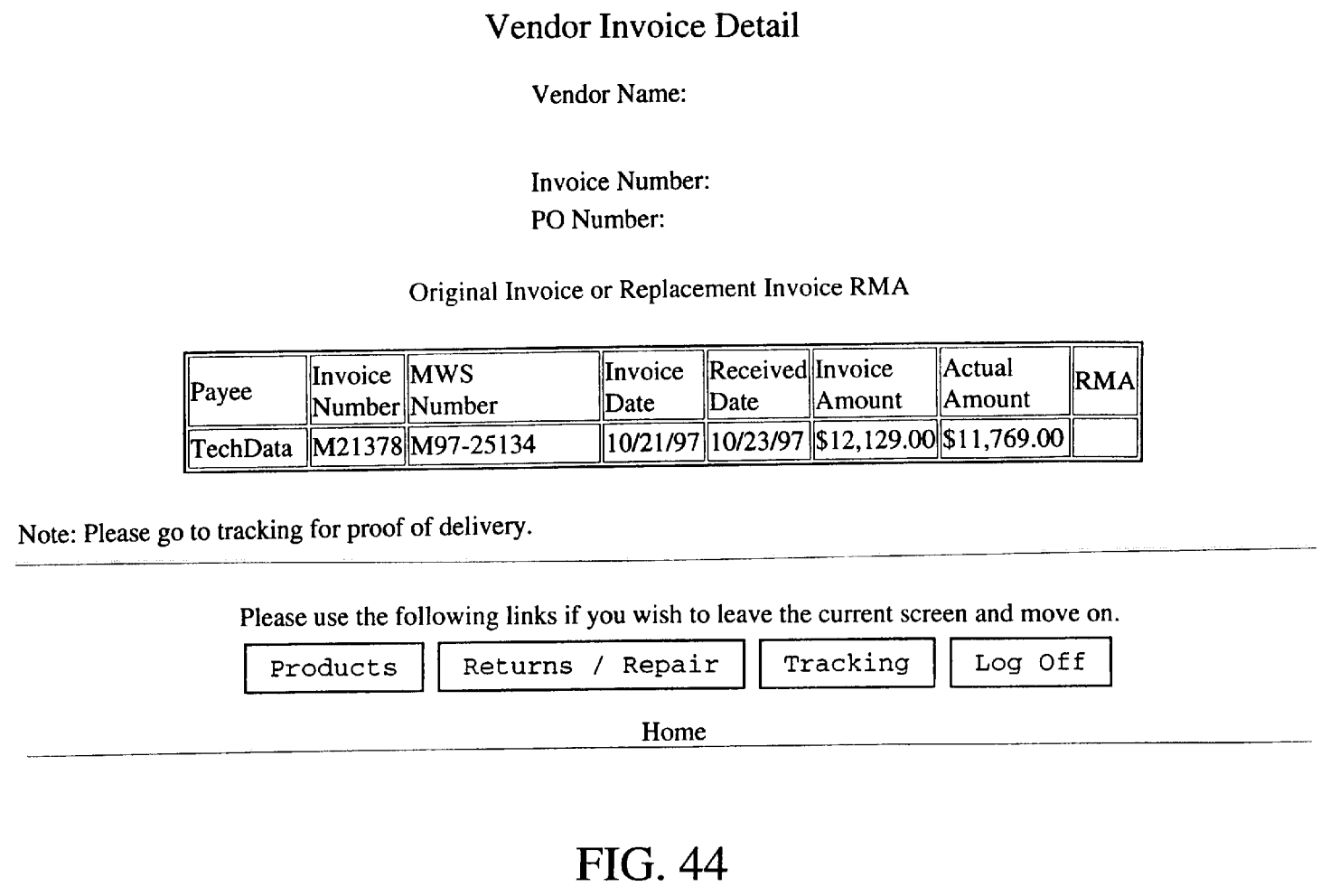

Vendor Invoice Detail

Vendor Name:

Invoice Number:
PO Number:

Original Invoice or Replacement Invoice RMA

| Payee | Invoice Number | MWS Number | Invoice Date | Received Date | Invoice Amount | Actual Amount | RMA |
|---|---|---|---|---|---|---|---|
| TechData | M21378 | M97-25134 | 10/21/97 | 10/23/97 | $12,129.00 | $11,769.00 | |

Note: Please go to tracking for proof of delivery.

Please use the following links if you wish to leave the current screen and move on.

Products | Returns / Repair | Tracking | Log Off

Home

FIG. 44

| | | Sales | | CSR | | Acct. | | Supervisor | | Mgnt. | |
|---|---|---|---|---|---|---|---|---|---|---|---|
| | | U | A | U | A | U | A | U | A | U | A |
| 1. Add names. | | V | V | V | V | V | V | V | V | V | V |
| 2. Delete/change names. | | V | O | V | O | V | O | V | O | V | V |
| 3. Authority to post own quotes. | | + | + | + | + | + | + | + | V | + | V |
| 4. Authority to post others' quotes. | | + | + | + | + | + | + | + | + | + | V |
| 5. Authority to track own sales status. | | + | V | + | V | + | V | + | V | + | V |
| 6. Authority to track own RMA status. | | + | V | + | V | + | V | + | V | + | V |
| 7. Authority to track own sales history. | | + | V | + | V | + | V | + | V | + | V |
| 8. Authority to track own RMA history. | | + | V | + | V | + | V | + | V | + | V |

FIG.45A

| | | | | | | | | | | | |
|---|---|---|---|---|---|---|---|---|---|---|---|
| 9. Authority to track for others' sales status. | N | + | + | + | + | + | + | + | + | V | V |
| 10. Authority to track for others' sales status. | N | + | + | + | + | + | + | + | + | V | V |
| 11. Authority to track for others' RMA status. | N | + | + | + | + | + | + | + | + | V | V |
| 12. Authority to track for others' sales history. | N | + | + | + | + | + | + | + | + | V | V |
| 13. Authority to track for others' RMA history. | N | + | + | + | + | + | + | + | + | V | V |
| 14. Maximum # of ship to per user. | N | + | + | + | + | + | + | + | + | V | V |
| 15. Maximum # of PO/day/user. | N | + | + | + | + | + | + | + | + | V | V |
| 16. Maximum $ of PO/day/user. | N | + | + | + | + | + | + | + | + | V | V |
| 17. Maximum $ of PO/day/company. | N | + | + | + | + | + | + | + | + | V | V |
| 18. Overall credit limit. | N | O | O | O | O | O | O | + | + | V | V |

FIG.45B

| | | | | | | | | | | | |
|---|---|---|---|---|---|---|---|---|---|---|---|
| 19. Default maximum PO $ amount. (Send alert & stop MWS posting) | N | + | + | + | + | + | + | + | + | V | V |
| 20. Authority to use credit card purchase | N | + | + | + | + | + | + | + | + | v | v |

N = Blocked view, only management has view.
+ = Add, but cannot activate web acitivity.
v = Add, and activate web activity.
O = Block out, not applicable.

FIG.45C

Typical Lineage (Authority) Tree

Entity Diagram Index

Fig. 60

| | |
|---|---|
| Fig.60A | Fig.60C |
| Fig.60B | Fig.60D |

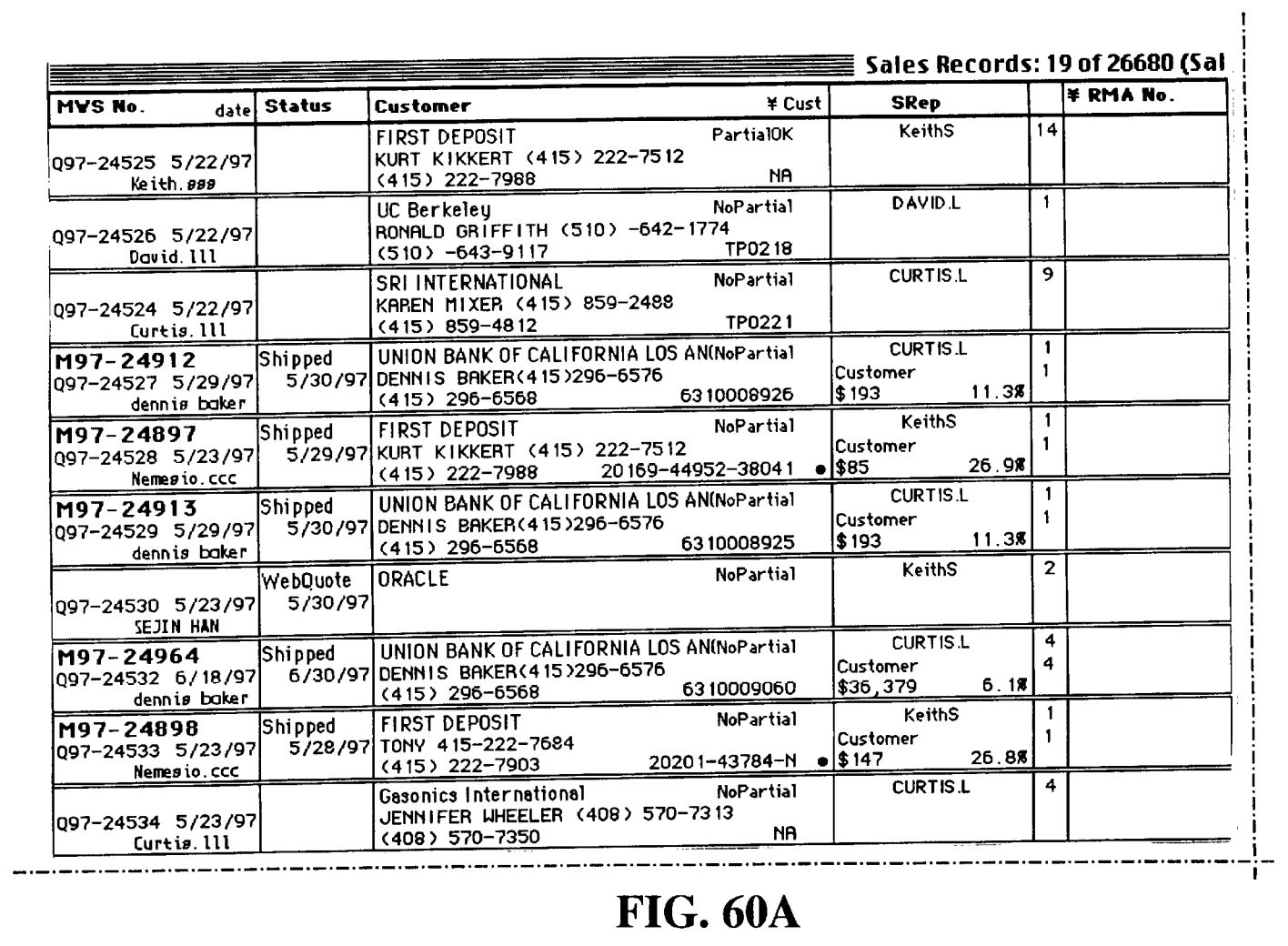

Sales Records: 19 of 26680 (Sal

| MVS No. date | Status | Customer ¥ Cust | SRep | | ¥ RMA No. |
|---|---|---|---|---|---|
| Q97-24525 5/22/97<br>Keith.ggg | | FIRST DEPOSIT Partial0K<br>KURT KIKKERT (415) 222-7512<br>(415) 222-7988 NA | KeithS | 14 | |
| Q97-24526 5/22/97<br>David.lll | | UC Berkeley NoPartial<br>RONALD GRIFFITH (510) -642-1774<br>(510) -643-9117 TP0218 | DAVID.L | 1 | |
| Q97-24524 5/22/97<br>Curtis.lll | | SRI INTERNATIONAL NoPartial<br>KAREN MIXER (415) 859-2488<br>(415) 859-4812 TP0221 | CURTIS.L | 9 | |
| **M97-24912**<br>Q97-24527 5/29/97<br>dennis baker | Shipped<br>5/30/97 | UNION BANK OF CALIFORNIA LOS AN(NoPartial<br>DENNIS BAKER(415)296-6576<br>(415) 296-6568 6310008926 | CURTIS.L<br>Customer<br>$193 11.3% | 1<br>1 | |
| **M97-24897**<br>Q97-24528 5/23/97<br>Nemesio.ccc | Shipped<br>5/29/97 | FIRST DEPOSIT NoPartial<br>KURT KIKKERT (415) 222-7512<br>(415) 222-7988 20169-44952-38041 ● | KeithS<br>Customer<br>$85 26.9% | 1<br>1 | |
| **M97-24913**<br>Q97-24529 5/29/97<br>dennis baker | Shipped<br>5/30/97 | UNION BANK OF CALIFORNIA LOS AN(NoPartial<br>DENNIS BAKER(415)296-6576<br>(415) 296-6568 6310008925 | CURTIS.L<br>Customer<br>$193 11.3% | 1<br>1 | |
| Q97-24530 5/23/97<br>SEJIN HAN | WebQuote<br>5/30/97 | ORACLE NoPartial | KeithS | 2 | |
| **M97-24964**<br>Q97-24532 6/18/97<br>dennis baker | Shipped<br>6/30/97 | UNION BANK OF CALIFORNIA LOS AN(NoPartial<br>DENNIS BAKER(415)296-6576<br>(415) 296-6568 6310009060 | CURTIS.L<br>Customer<br>$36,379 6.1% | 4<br>4 | |
| **M97-24898**<br>Q97-24533 5/23/97<br>Nemesio.ccc | Shipped<br>5/28/97 | FIRST DEPOSIT NoPartial<br>TONY 415-222-7684<br>(415) 222-7903 20201-43784-N ● | KeithS<br>Customer<br>$147 26.8% | 1<br>1 | |
| Q97-24534 5/23/97<br>Curtis.lll | | Gasonics International NoPartial<br>JENNIFER WHEELER (408) 570-7313<br>(408) 570-7350 NA | CURTIS.L | 4 | |

FIG. 60A

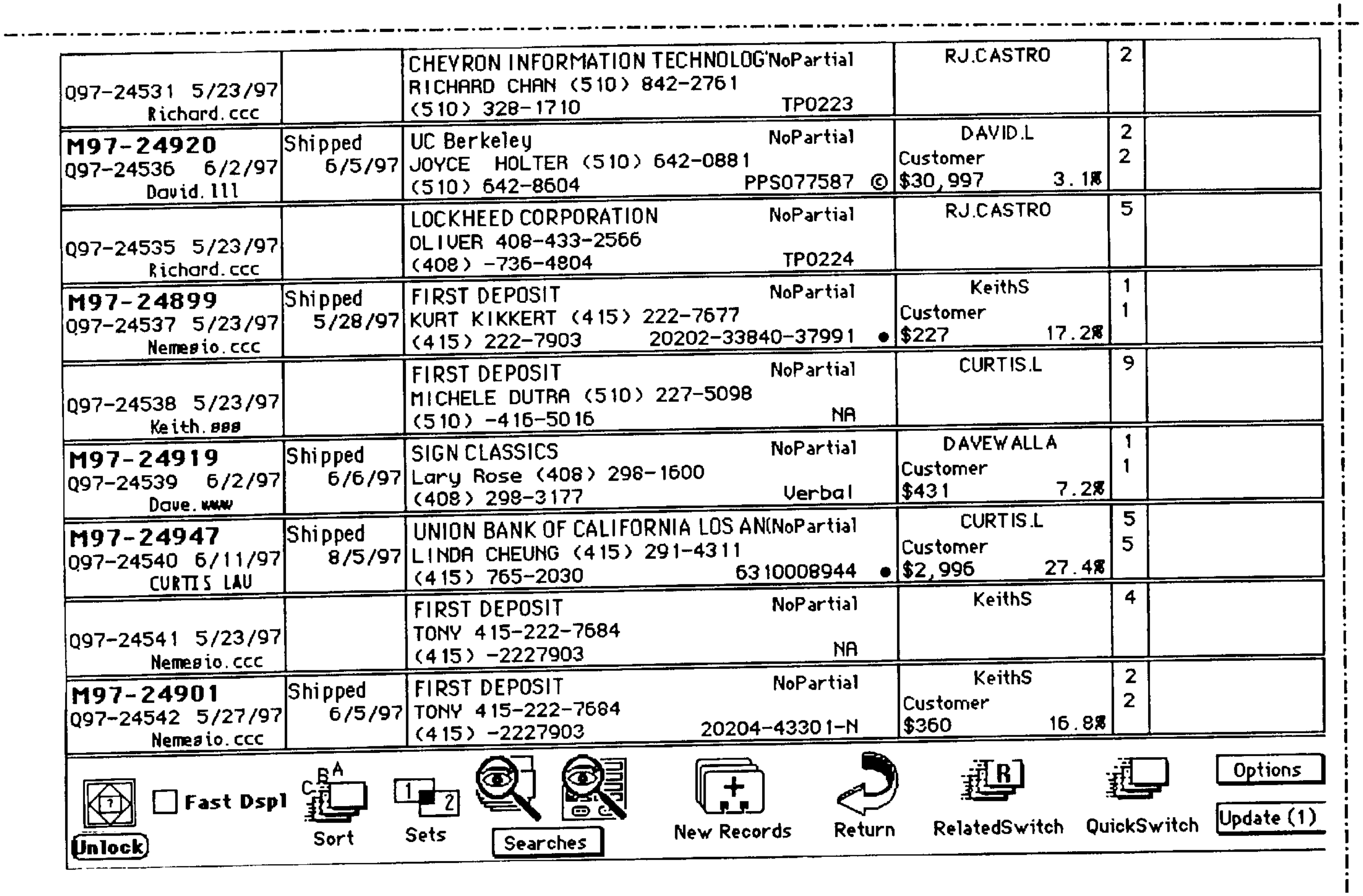

| | | | | | |
|---|---|---|---|---|---|
| Q97-24531 5/23/97<br>Richard.ccc | | CHEVRON INFORMATION TECHNOLOG NoPartial<br>RICHARD CHAN (510) 842-2761<br>(510) 328-1710 TP0223 | RJ.CASTRO | 2 | |
| M97-24920<br>Q97-24536 6/2/97<br>David.111 | Shipped<br>6/5/97 | UC Berkeley NoPartial<br>JOYCE HOLTER (510) 642-0881<br>(510) 642-8604 PPS077587 © | DAVID.L<br>Customer<br>$30,997 3.1% | 2<br>2 | |
| Q97-24535 5/23/97<br>Richard.ccc | | LOCKHEED CORPORATION NoPartial<br>OLIVER 408-433-2566<br>(408) -736-4804 TP0224 | RJ.CASTRO | 5 | |
| M97-24899<br>Q97-24537 5/23/97<br>Nemesio.ccc | Shipped<br>5/28/97 | FIRST DEPOSIT NoPartial<br>KURT KIKKERT (415) 222-7677<br>(415) 222-7903 20202-33840-37991 • | KeithS<br>Customer<br>$227 17.2% | 1<br>1 | |
| Q97-24538 5/23/97<br>Keith.sss | | FIRST DEPOSIT NoPartial<br>MICHELE DUTRA (510) 227-5098<br>(510) -416-5016 NA | CURTIS.L | 9 | |
| M97-24919<br>Q97-24539 6/2/97<br>Dave.www | Shipped<br>6/6/97 | SIGN CLASSICS NoPartial<br>Lary Rose (408) 298-1600<br>(408) 298-3177 Verbal | DAVEWALLA<br>Customer<br>$431 7.2% | 1<br>1 | |
| M97-24947<br>Q97-24540 6/11/97<br>CURTIS LAU | Shipped<br>8/5/97 | UNION BANK OF CALIFORNIA LOS AN NoPartial<br>LINDA CHEUNG (415) 291-4311<br>(415) 765-2030 6310008944 • | CURTIS.L<br>Customer<br>$2,996 27.4% | 5<br>5 | |
| Q97-24541 5/23/97<br>Nemesio.ccc | | FIRST DEPOSIT NoPartial<br>TONY 415-222-7684<br>(415) -2227903 NA | KeithS | 4 | |
| M97-24901<br>Q97-24542 5/27/97<br>Nemesio.ccc | Shipped<br>6/5/97 | FIRST DEPOSIT NoPartial<br>TONY 415-222-7684<br>(415) -2227903 20204-43301-N | KeithS<br>Customer<br>$360 16.8% | 2<br>2 | |

FIG. 60B

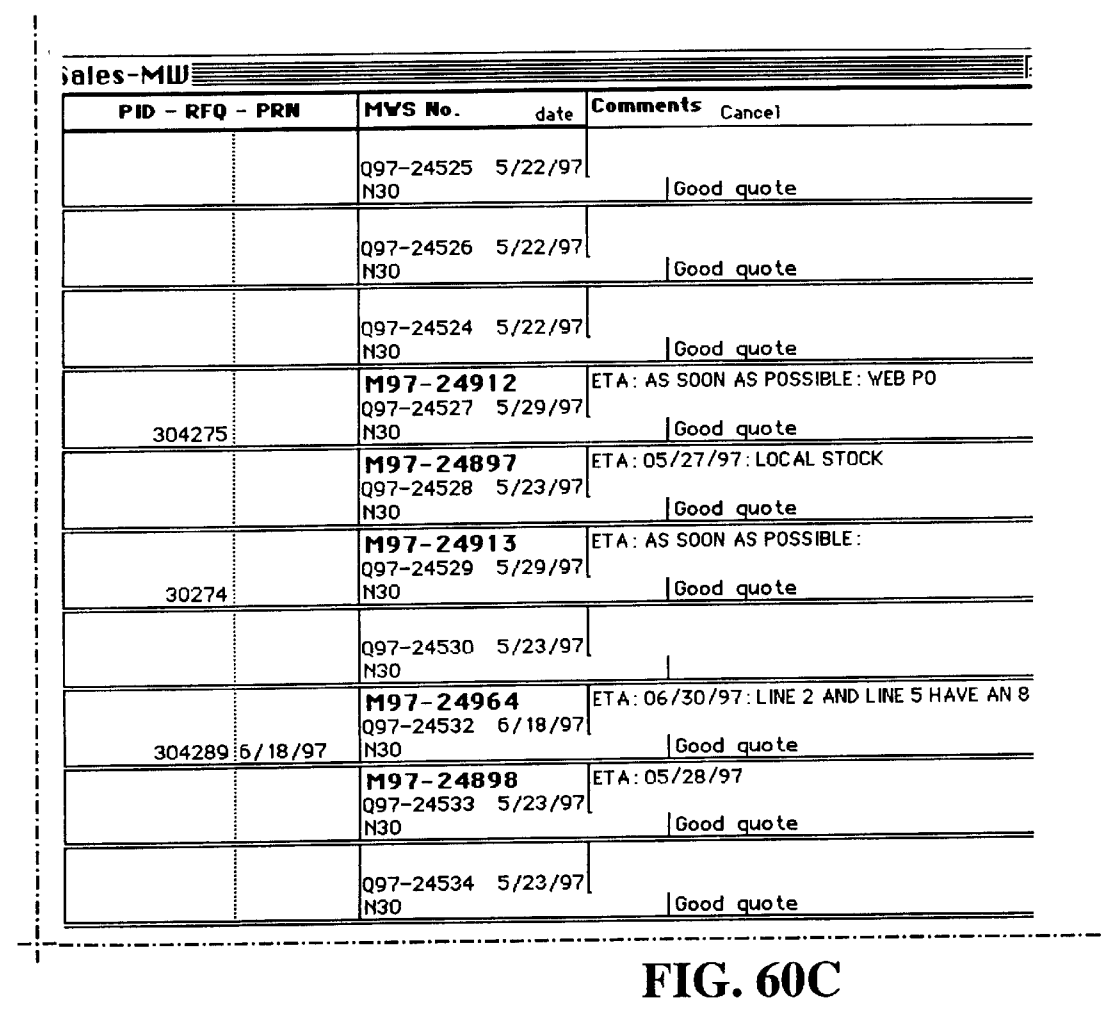

Sales-MW

| PID - RFQ - PRN | | MVS No. | date | Comments | Cancel |
|---|---|---|---|---|---|
| | | Q97-24525 N30 | 5/22/97 | Good quote | |
| | | Q97-24526 N30 | 5/22/97 | Good quote | |
| | | Q97-24524 N30 | 5/22/97 | Good quote | |
| 304275 | | M97-24912 Q97-24527 N30 | 5/29/97 | ETA : AS SOON AS POSSIBLE : WEB PO Good quote | |
| | | M97-24897 Q97-24528 N30 | 5/23/97 | ETA : 05/27/97 : LOCAL STOCK Good quote | |
| 30274 | | M97-24913 Q97-24529 N30 | 5/29/97 | ETA : AS SOON AS POSSIBLE : Good quote | |
| | | Q97-24530 N30 | 5/23/97 | | |
| 304289 | 6/18/97 | M97-24964 Q97-24532 N30 | 6/18/97 | ETA : 06/30/97 : LINE 2 AND LINE 5 HAVE AN 8 Good quote | |
| | | M97-24898 Q97-24533 N30 | 5/23/97 | ETA : 05/28/97 Good quote | |
| | | Q97-24534 N30 | 5/23/97 | Good quote | |

FIG. 60C

Figure 60D:
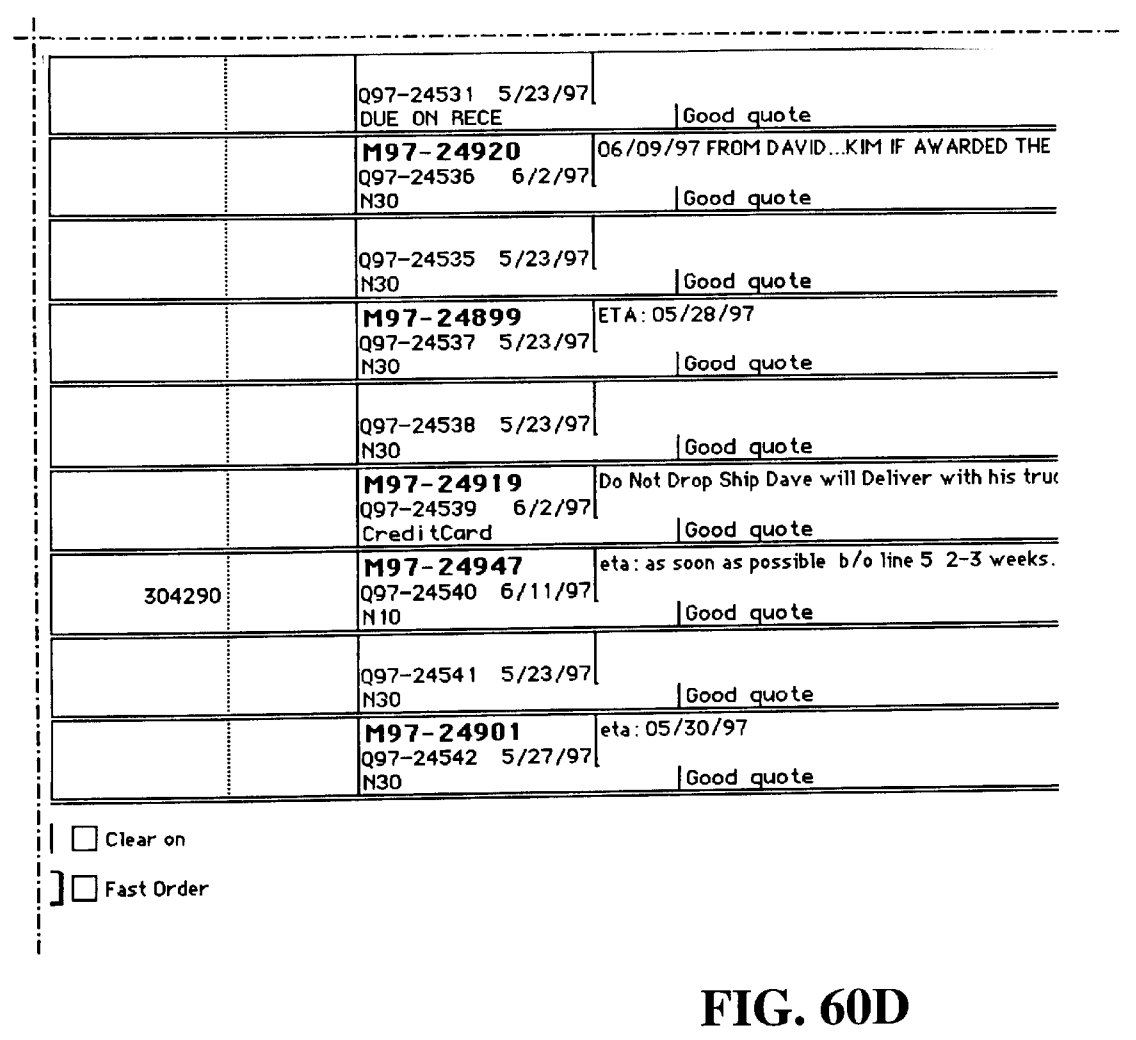

| | | | | |
|---|---|---|---|---|
| | | Q97-24531 5/23/97<br>DUE ON RECE | | Good quote |
| | | **M97-24920**<br>Q97-24536 6/2/97<br>N30 | 06/09/97 FROM DAVID...KIM IF AWARDED THE | Good quote |
| | | Q97-24535 5/23/97<br>N30 | | Good quote |
| | | **M97-24899**<br>Q97-24537 5/23/97<br>N30 | ETA: 05/28/97 | Good quote |
| | | Q97-24538 5/23/97<br>N30 | | Good quote |
| | | **M97-24919**<br>Q97-24539 6/2/97<br>CreditCard | Do Not Drop Ship Dave will Deliver with his truc | Good quote |
| 304290 | | **M97-24947**<br>Q97-24540 6/11/97<br>N10 | eta: as soon as possible b/o line 5 2-3 weeks. | Good quote |
| | | Q97-24541 5/23/97<br>N30 | | Good quote |
| | | **M97-24901**<br>Q97-24542 5/27/97<br>N30 | eta: 05/30/97 | Good quote |

☐ Clear on

☐ Fast Order

| | |
|---|---|
| Fig.62A | Fig.62B |
| Fig.62C | Fig.62D |

Products: 180719 of 18(

● = new product or special offer — Dealer price

| Description | | | | | |
|---|---|---|---|---|---|
| **Ven** | **Ven Part No.** | **Media Cd** | **Platform** | **Manufacturer** | **Mfct Part No.** |
| ACCEL GRAPHICS AG500-010 | | | | | |
| CmpInd | ACCL-404072 | INTL | PC/AT | WYLE LABORATORY | AG500-010 |
| 16MB KIT F/HP VECTRA VL/4 | | | | | |
| CmpInd | ADMO-B0416 | | | ADMOR MEMORY LTD | ADH16-3647 |
| 32MB F/HP OMINBOOK 5000 | | | | | |
| CmpInd | ADMO-B1136 | | | ADMOR MEMORY LTD | ADH32-1136 |
| PHOTOSHOP 3.0 MAC/POWERPC DISK/CD * DROP SHIP ONLY TO BRANCH #0091 ** | | | | | |
| CmpInd | ADOB-023702 | | | DOUGLAS STEWART COMPAN | 23702 |
| FRAMEMAKER UPGRADE FOR WIN 5.1.1 *SERIAL NUMBER REQUIRED* | | | | | |
| CmpInd | ADOB-N1294 | | | ADOBE SYSTEMS, INC. | 2791-0017 |
| 8MB LP486 SIMM KIT W/GOLD LEAD | | | | | |
| CmpInd | AMG -B7040 | | | ATLANTIC MEMORY GROUP II | 10170040 |
| 32MB UPGRADE F/LP486 W/GOLD LEAD | | | | | |
| CmpInd | AMG -B7050 | | | ATLANTIC MEMORY GROUP II | 10170050 |
| 8MB KIT F/LP486 WITH TIN TEAD | | | | | |
| CmpInd | AMG -B7100 | | | ATLANTIC MEMORY GROUP II | 10170100 |
| 8MB CLASSIC R+ MODULE | | | | | |
| CmpInd | AMG -B7222 | | | ATLANTIC MEMORY GROUP II | 10170222 |
| SAFEJACK ADAPTER DUAL RJ11 | | | | | |
| CmpInd | ANGI-J0194 | | | ANGIA CORPORATION | SJADP |
| UPS MONITORING BOARD W/CABLE, ISA | | | | | |
| CmpInd | APC -C677U | | | AMERICAN POWER CONVERSI | AP9500 |

FIG. 62A 180719 (Sales-MU s include reseller markup

| Dealer Price | Retail Price | Base Price | |
|---|---|---|---|
| 2,889.09 | 3,495.00<br>12/1/96 | 2,804.95<br>Import | ☒ Distinct |
| 108.50 | 149.00<br>12/1/96 | 105.34<br>Import | ☒ Distinct |
| 284.15 | 349.00<br>12/1/96 | 275.88<br>Import | ☒ Distinct |
| 188.00 | 279.00<br>12/1/96 | 182.53<br>Import | ☒ Distinct |
| 205.62 | 205.00<br>12/1/96 | 199.64<br>Import | ☒ Distinct |
| 113.66 | 170.00<br>12/1/96 | 110.35<br>Import | ☒ Distinct |
| 309.98 | 465.00<br>12/1/96 | 300.96<br>Import | ☒ Distinct |
| 92.99 | 139.00<br>12/1/96 | 90.29<br>Import | ☒ Distinct |
| 77.49 | 115.00<br>12/1/96 | 75.24<br>Import | ☒ Distinct |
| 12.40 | 19.00<br>12/1/96 | 12.04<br>Import | ☒ Distinct |
| 47.53 | 89.00<br>12/1/96 | 46.15<br>Import | ☒ Distinct |

FIG. 62B

| | | | | | | | | | | | | | | | | |
|---|---|---|---|---|---|---|---|---|---|---|---|---|---|---|---|---|
| 1 | 10/11/97 | 1556-WX | 28515 | Compaq SCSI HD<br>Critical | | 5 | | B/O | 12/11/97 | Credit card | NP | Techdata | 12345 | Compaq | 121-001 | 1 |
| 2 | 10/11/97 | 1556-WX | 28515 | Compaq proliant<br>Track | | 24 | | B/O | | | P | Techdata | 13554 | Compaq | 121-002 | 1 |
| 3 | 10/11/97 | 1556-WX | 28515 | Compaq memory | | 10 | | stock | | | NP | Merisel | 13554 | Compaq | 121-003 | 1 |
| 4 | 10/11/97 | 1444PA | 28415 | HP Vectra | | 3 | | short stock | | COD | P | Ingram Micro | 13554 | HP | HR-001 | 2 |
| 5 | 10/11/97 | 1444PA | 28415 | HP memory | | 4 | | Inventory | | | P | Microage | 13554 | HP | 1F-001 | 2 |
| 6 | 10/11/97 | 1444PA | 28415 | HP Printer<br>Drop Ship | | 200 | | B/O | | | NP | Computer land | 13554 | HP | H1-0Aa | 2 |

[box symbol] = All headings are sortable.

* All items are selectable and expand (double click) into item deails.

* Replacement MWS = Red color

FIG.64B

| | | | | | | | | | | | | | | | |
|---|---|---|---|---|---|---|---|---|---|---|---|---|---|---|---|
| 1 | 10/11/97 | 1556-WX | 28515 | | Compaq SCSI HD<br>Critical | 5 | 11/20/97 | Credit card | Hold<br>Note | Techdata | 12345 | Compaq | | | |
| 2 | 10/11/97 | 1556-WX | 28515 | | Compaq proliant<br>Track | 24 | 11/20/97 | | Refuse | Techdata | 13554 | Compaq | | | |
| 3 | 10/11/97 | 1556-WX | 28515 | | Compaq memory | 10 | 11/19/97 | | stock | Merisel | 13554 | Compaq | | | |
| 4 | 10/11/97 | 1444PA | 28415 | | HP Vectra | 3 | 11/20/97 | COD | OK | Ingram Micro | 13554 | HP | | | |
| 5 | 10/11/97 | 1444PA | 28415 | | HP memory | 4 | 11/21/97 | | OK | Microage | 13554 | HP | | | |
| 6 | 10/11/97 | 1444PA | 28415 | | HP Printer<br>Drop Ship | 200 | 11/12/97 | | OK<br>Note | Computer land | 13554 | HP | | | |

= All headings are sortable.

* All items are selectable and expand (double click) into item deails. * Replacement MWS = Red color

FIG.65B

Actions:

Receiving

1. Expected to receive will exclude refusal items.
2. Expected to ship will exclude refusal items, hold items and items with COD/cash term.
3. Batch input for all packing slips and items. The system automatically match input with items that existing in the system to all items that received.

| | | | | | | | | | | | | | | | |
|---|---|---|---|---|---|---|---|---|---|---|---|---|---|---|---|
| 1 | 10/11/97 | 1556-WX | 28515 | | Compaq SCSI HD<br>Critical | 5 | B/O<br>Notes | 12/25/97 | Y | | | Techdata | 12345 | Compaq | |
| 2 | 10/11/97 | 1556-WX | 28515 | | Compaq proliant<br>Track | 24 | B/O<br>Notes | 12/11/97 | N | | | Techdata | 13554 | Compaq | |
| 3 | 10/11/97 | 1556-WX | 28515 | | Compaq memory | 10 | stock<br>Notes | - | Y | | | Merisel | 13554 | Compaq | |
| 4 | 10/11/97 | 1444PA | 28415 | | HP Vectra | 3 | Short stock<br>Notes | - | Y | | | Ingram Micro | 13554 | HP | |
| 5 | 10/11/97 | 1444PA | 28415 | | HP memory | 4 | stock<br>Notes | - | Y | | | Microage | 13554 | HP | |
| 6 | 10/11/97 | 1444PA | 28415 | | HP Printer<br>Drop Ship | 200 | B/O<br>Notes | 12/5/97 | Y | | | Computer land | 13554 | HP | |

= All headings are sortable.

* All items are selectable and expand (double click) into item deails.

* Replacement MWS = Red color

Option:
1. Show all need installation
2. Show only need to be installed with received date

FIG.66B

| | | | | | | | | | | | | | | | |
|---|---|---|---|---|---|---|---|---|---|---|---|---|---|---|---|
| 1 | 10/11/97 | 1556-WX | 28515 | | Compaq SCSI HD<br>Critical | 5 | 11/20/97 | | Hold<br>Note | Techdata | 12345 | Compaq | | | |
| 2 | 10/11/97 | 1556-WX | 28515 | | Compaq proliant<br>Track | 24 | 11/20/97 | | Refuse | Techdata | 13554 | Compaq | | | |
| 3 | 10/11/97 | 1556-WX | 28515 | | Compaq memory | 10 | 11/19/97 | | stock | Merisel | 13554 | Compaq | | | |
| 4 | 10/11/97 | 1444PA | 28415 | | HP Vectra | 3 | 11/20/97 | | OK | Ingram Micro | 13554 | HP | | | |
| 5 | 10/11/97 | 1444PA | 28415 | | HP memory | 4 | 11/21/97 | | OK | Microage | 13554 | HP | | | |
| 6 | 10/11/97 | 1444PA | 28415 | | HP Printer<br>Drop Ship | 200 | 11/12/97 | | OK<br>Note | Computer land | 13554 | HP | | | |

= All headings are sortable.

* All items are selectable and expand (double click) into item deails.

* Replacement MWS = Red color

FIG.67B

Actions:

Shipping

1. Expected to receive will exclude refusal items.
2. Expected to ship will exclude refusal items, hold items and items with COD/cash term.
3. Batch input for all packing slips and items. The system automatically match input with items that existing in the system to all items that received.

Item

Select (highlight)

Item d

| Line # | Date | Cust.PO No. | MWS No. | Cust./Ven RMA# | Item sold Description | Qty |
|---|---|---|---|---|---|---|
| 1 | 10/11/97 | 1556-WX | 28515 | | Compaq SCSI HD<br>Critical | 1 |
| 2 | 10/11/97 | 1556-WX | 28515 | | Compaq SCSI HD<br>Critical | 1 |
| 3 | 10/11/97 | 1556-WX | 28515 | | Compaq SCSI HD<br>Critical | 1 |
| 4 | 10/11/97 | 1556-WX | 28515 | | Compaq SCSI HD<br>Critical | 1 |
| 5 | 10/11/97 | 1556-WX | 28515 | | Compaq SCSI HD<br>Critical | 1 |

Fig. 68 A details input to group etail Dispaly

| Existing Satus | Cust. Inv. | Ven. Inv. | Serial# | Vendor | mfr | Install Group | Ship Group |
|---|---|---|---|---|---|---|---|
| B/O | | | | | | | |
| B/O | | | | | | | |
| B/O | | | | | | | |
| B/O | | | | | | | |
| B/O | | | | | | | |

Fig. 68 B

| | | | | | | | | | | | | | | | |
|---|---|---|---|---|---|---|---|---|---|---|---|---|---|---|---|
| 1 | 10/11/97 | 1556-WX | 28515 | | Compaq SCSI HD<br>Critical | 5 | 11/20/97 | <br>Credit card | Hold<br>Note | | Techdata | 12345 | Compaq | | |
| 2 | 10/11/97 | 1556-WX | 28515 | | Compaq proliant<br>Track | 24 | 11/20/97 | | Refuse | | Techdata | 13554 | Compaq | | |
| 3 | 10/11/97 | 1556-WX | 28515 | | Compaq memory | 10 | 11/19/97 | | stock | | Merisel | 13554 | Compaq | | |
| 4 | 10/11/97 | 1444PA | 28415 | | HP Vectra | 3 | 11/20/97 | <br>COD | OK | | Ingram Micro | 13554 | HP | | |
| 5 | 10/11/97 | 1444PA | 28415 | | HP memory | 4 | 11/21/97 | | OK | | Microage | 13554 | HP | | |
| 6 | 10/11/97 | 1444PA | 28415 | | HP Printer<br>Drop Ship | 200 | 11/12/97 | | OK<br>Note | | Computer land | 13554 | HP | | |

= All headings are sortable.

* All items are selectable and expand (double click) into item deails.

* Replacement MWS = Red color

FIG.69B

Actions:

1. Expected to receive will exclude refusal items.
2. Expected to ship will exclude refusal items, hold items and items with COD/cash term.
3. Batch input for all packing slips and items. The system automatically match input with items that existing in the system to all items that received.

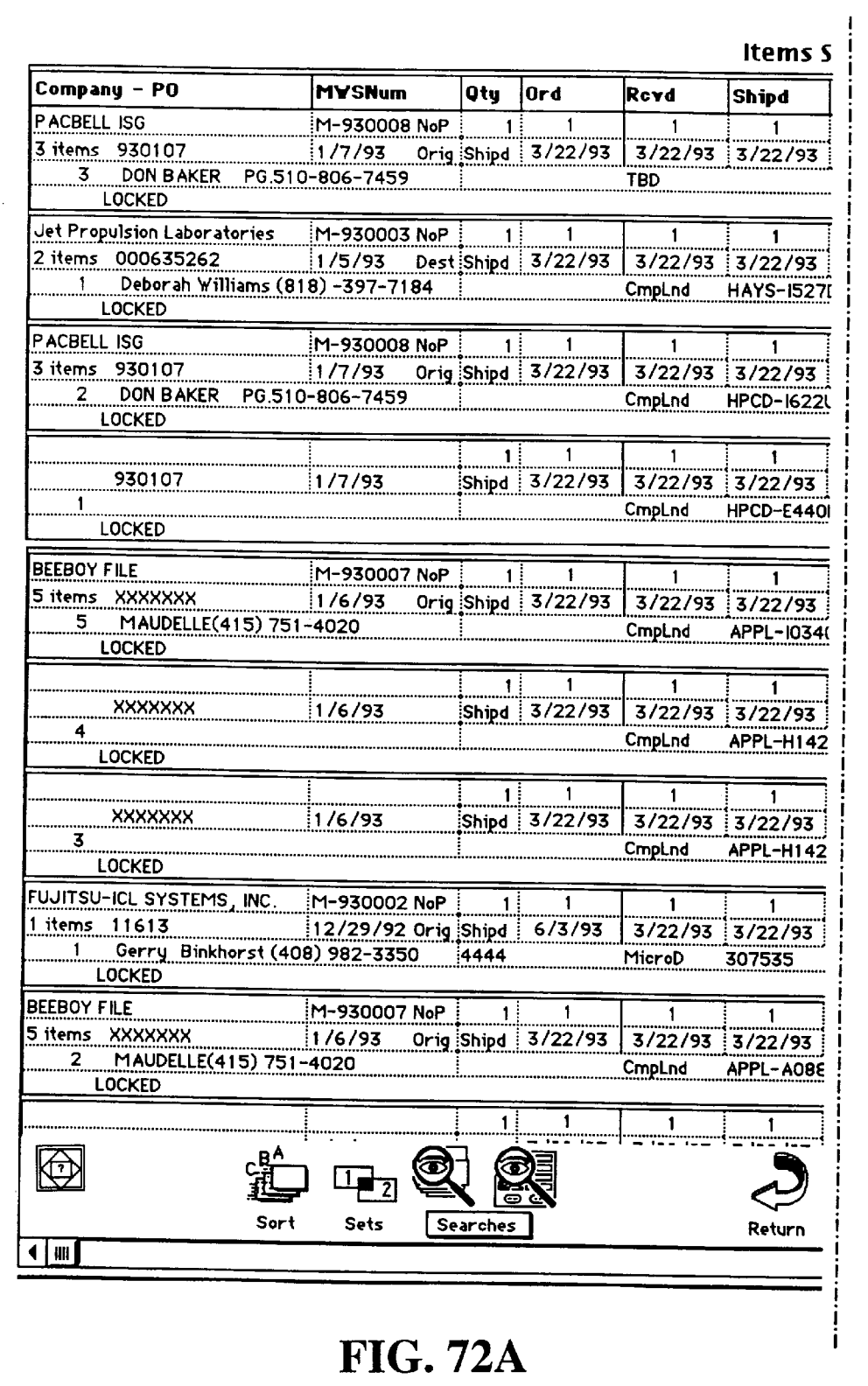

Items S

| Company - PO | MYSNum | Qty | Ord | Rcvd | Shipd |
|---|---|---|---|---|---|
| PACBELL ISG | M-930008 NoP | 1 | 1 | 1 | 1 |
| 3 items 930107 | 1/7/93 Orig | Shipd | 3/22/93 | 3/22/93 | 3/22/93 |
| 3 DON BAKER PG.510-806-7459 | | | | TBD | |
| LOCKED | | | | | |
| Jet Propulsion Laboratories | M-930003 NoP | 1 | 1 | 1 | 1 |
| 2 items 000635262 | 1/5/93 Dest | Shipd | 3/22/93 | 3/22/93 | 3/22/93 |
| 1 Deborah Williams (818) -397-7184 | | | | CmpLnd | HAYS-1527I |
| LOCKED | | | | | |
| PACBELL ISG | M-930008 NoP | 1 | 1 | 1 | 1 |
| 3 items 930107 | 1/7/93 Orig | Shipd | 3/22/93 | 3/22/93 | 3/22/93 |
| 2 DON BAKER PG.510-806-7459 | | | | CmpLnd | HPCD-1622( |
| LOCKED | | | | | |
| | | 1 | 1 | 1 | 1 |
| 930107 | 1/7/93 | Shipd | 3/22/93 | 3/22/93 | 3/22/93 |
| 1 | | | | CmpLnd | HPCD-E440I |
| LOCKED | | | | | |
| BEEBOY FILE | M-930007 NoP | 1 | 1 | 1 | 1 |
| 5 items XXXXXXX | 1/6/93 Orig | Shipd | 3/22/93 | 3/22/93 | 3/22/93 |
| 5 MAUDELLE(415) 751-4020 | | | | CmpLnd | APPL-1034( |
| LOCKED | | | | | |
| | | 1 | 1 | 1 | 1 |
| XXXXXXX | 1/6/93 | Shipd | 3/22/93 | 3/22/93 | 3/22/93 |
| 4 | | | | CmpLnd | APPL-H142 |
| LOCKED | | | | | |
| | | 1 | 1 | 1 | 1 |
| XXXXXXX | 1/6/93 | Shipd | 3/22/93 | 3/22/93 | 3/22/93 |
| 3 | | | | CmpLnd | APPL-H142 |
| LOCKED | | | | | |
| FUJITSU-ICL SYSTEMS, INC. | M-930002 NoP | 1 | 1 | 1 | 1 |
| 1 items 11613 | 12/29/92 Orig | Shipd | 6/3/93 | 3/22/93 | 3/22/93 |
| 1 Gerry Binkhorst (408) 982-3350 | | 4444 | | MicroD | 307535 |
| LOCKED | | | | | |
| BEEBOY FILE | M-930007 NoP | 1 | 1 | 1 | 1 |
| 5 items XXXXXXX | 1/6/93 Orig | Shipd | 3/22/93 | 3/22/93 | 3/22/93 |
| 2 MAUDELLE(415) 751-4020 | | | | CmpLnd | APPL-A08E |
| LOCKED | | | | | |
| | | 1 | 1 | 1 | 1 |

Sort Sets Searches Return

FIG. 72A

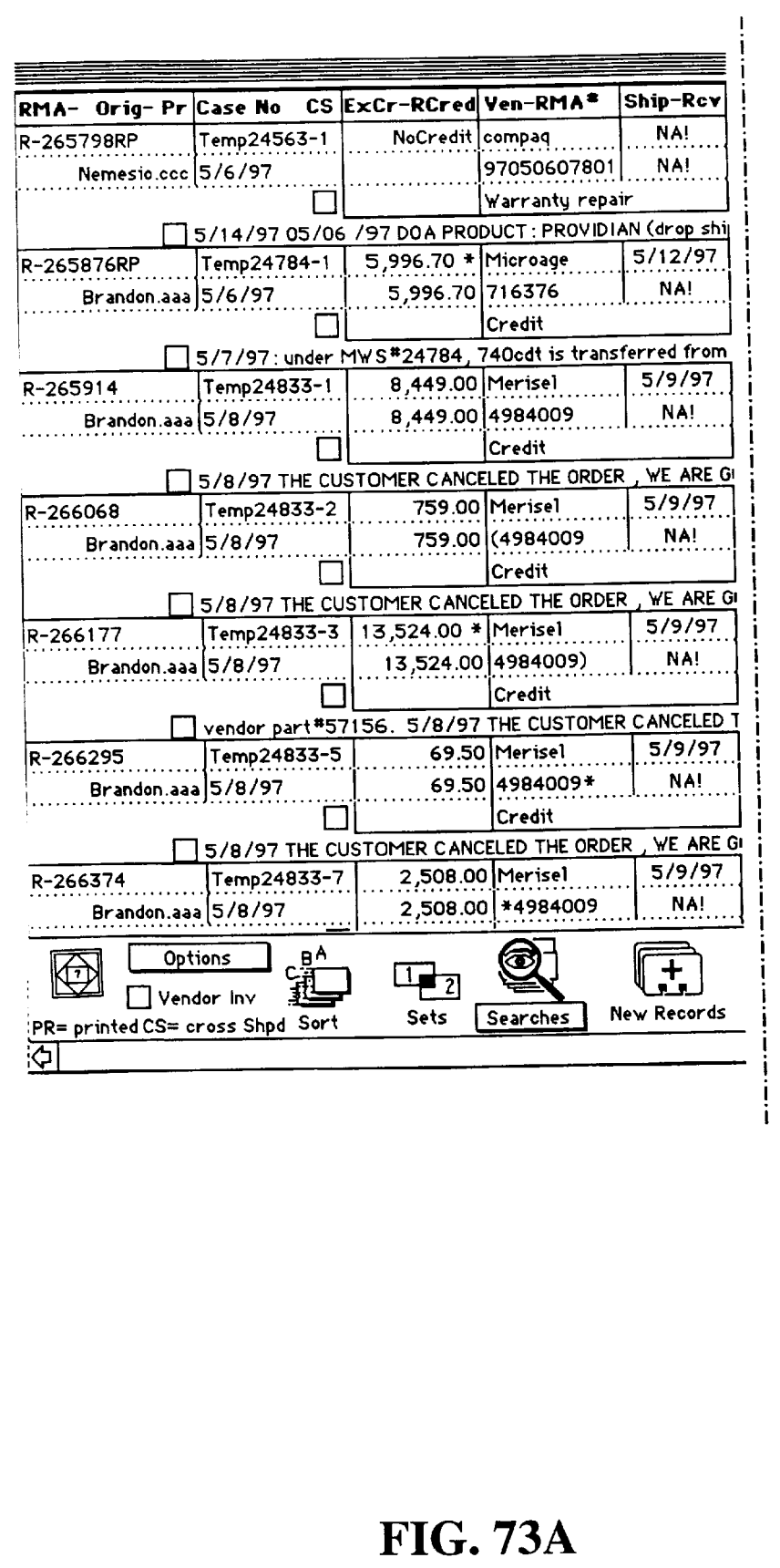

| RMA- Orig- Pr | Case No CS | ExCr-RCred | Ven-RMA* | Ship-Rcv |
|---|---|---|---|---|
| R-265798RP | Temp24563-1 | NoCredit | compaq | NA! |
| Nemesio.ccc | 5/6/97 | | 97050607801 | NA! |
| | ☐ | | Warranty repair | |
| ☐ 5/14/97 05/06 /97 DOA PRODUCT : PROVIDIAN (drop shi | | | | |
| R-265876RP | Temp24784-1 | 5,996.70 * | Microage | 5/12/97 |
| Brandon.aaa | 5/6/97 | 5,996.70 | 716376 | NA! |
| | ☐ | | Credit | |
| ☐ 5/7/97 : under MWS*24784, 740cdt is transferred from | | | | |
| R-265914 | Temp24833-1 | 8,449.00 | Merisel | 5/9/97 |
| Brandon.aaa | 5/8/97 | 8,449.00 | 4984009 | NA! |
| | ☐ | | Credit | |
| ☐ 5/8/97 THE CUSTOMER CANCELED THE ORDER , WE ARE GI | | | | |
| R-266068 | Temp24833-2 | 759.00 | Merisel | 5/9/97 |
| Brandon.aaa | 5/8/97 | 759.00 | (4984009 | NA! |
| | ☐ | | Credit | |
| ☐ 5/8/97 THE CUSTOMER CANCELED THE ORDER , WE ARE GI | | | | |
| R-266177 | Temp24833-3 | 13,524.00 * | Merisel | 5/9/97 |
| Brandon.aaa | 5/8/97 | 13,524.00 | 4984009) | NA! |
| | ☐ | | Credit | |
| ☐ vendor part*57156. 5/8/97 THE CUSTOMER CANCELED T | | | | |
| R-266295 | Temp24833-5 | 69.50 | Merisel | 5/9/97 |
| Brandon.aaa | 5/8/97 | 69.50 | 4984009* | NA! |
| | ☐ | | Credit | |
| ☐ 5/8/97 THE CUSTOMER CANCELED THE ORDER , WE ARE GI | | | | |
| R-266374 | Temp24833-7 | 2,508.00 | Merisel | 5/9/97 |
| Brandon.aaa | 5/8/97 | 2,508.00 | *4984009 | NA! |

Options

☐ Vendor Inv

PR= printed CS= cross Shpd

Sort

Sets

Searches

New Records

FIG. 73A

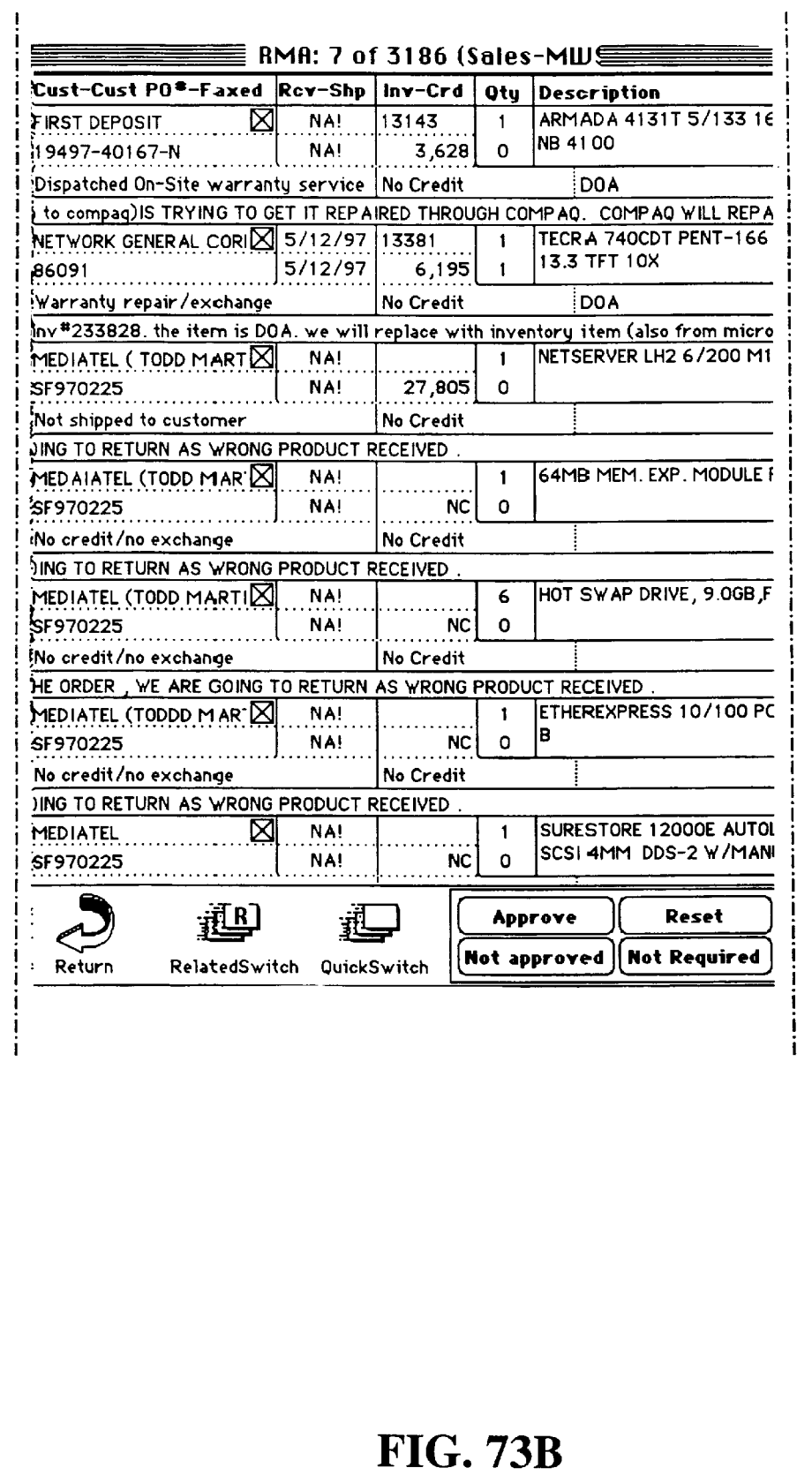

RMA: 7 of 3186 (Sales-MW

| Cust-Cust PO#-Faxed | Rcv-Shp | Inv-Crd | Qty | Description |
|---|---|---|---|---|
| FIRST DEPOSIT ☒ | NA! | 13143 | 1 | ARMADA 4131T 5/133 16 |
| 19497-40167-N | NA! | 3,628 | 0 | NB 4100 |
| Dispatched On-Site warranty service | | No Credit | | DOA |
| to compaq)IS TRYING TO GET IT REPAIRED THROUGH COMPAQ. COMPAQ WILL REPA | | | | |
| NETWORK GENERAL CORI ☒ | 5/12/97 | 13381 | 1 | TECRA 740CDT PENT-166 |
| 86091 | 5/12/97 | 6,195 | 1 | 13.3 TFT 10X |
| Warranty repair/exchange | | No Credit | | DOA |
| Inv#233828. the item is DOA. we will replace with inventory item (also from micro | | | | |
| MEDIATEL ( TODD MART ☒ | NA! | | 1 | NETSERVER LH2 6/200 M1 |
| SF970225 | NA! | 27,805 | 0 | |
| Not shipped to customer | | No Credit | | |
| ING TO RETURN AS WRONG PRODUCT RECEIVED . | | | | |
| MEDAIATEL (TODD MAR ☒ | NA! | | 1 | 64MB MEM. EXP. MODULE F |
| SF970225 | NA! | NC | 0 | |
| No credit/no exchange | | No Credit | | |
| ING TO RETURN AS WRONG PRODUCT RECEIVED . | | | | |
| MEDIATEL (TODD MARTI ☒ | NA! | | 6 | HOT SWAP DRIVE, 9.0GB,F |
| SF970225 | NA! | NC | 0 | |
| No credit/no exchange | | No Credit | | |
| HE ORDER , WE ARE GOING TO RETURN AS WRONG PRODUCT RECEIVED . | | | | |
| MEDIATEL (TODDD MAR ☒ | NA! | | 1 | ETHEREXPRESS 10/100 PC |
| SF970225 | NA! | NC | 0 | B |
| No credit/no exchange | | No Credit | | |
| )ING TO RETURN AS WRONG PRODUCT RECEIVED . | | | | |
| MEDIATEL ☒ | NA! | | 1 | SURESTORE 12000E AUTOL |
| SF970225 | NA! | NC | 0 | SCSI 4MM DDS-2 W/MANI |

Return RelatedSwitch QuickSwitch

Approve | Reset | Not approved | Not Required

FIG. 73B

V = Vendor whom we bought from or mfr of product.
C = Customer

Spectrum of N/A

1. If received, ship, claim & credit = NA, then return type must be equal to Not Applicable.

| Return type/Action (C & V) | | Active | Repair/ replace part # Y/N | Service On-site Y/N | $ On-site Charge | $ Additional repair Charge | Mfr. or vendor | | RMA# | Rec'd V | Ship V | Credit V | Claim V | Cust.Orig. ship date req'd | Fax return Form (PR) | E-mail notification | Show web | Repl MWS | |
|---|---|---|---|---|---|---|---|---|---|---|---|---|---|---|---|---|---|---|---|
| | | | | | | | Drop Ship | Cross Ship | | | | | | | | | | | |
| 1. Credit | Check | Y<br>Y | N/A<br>N/A | N/A<br>N/A | N/A<br>N/A | N/A<br>N/A | N/A<br>N/A | N/A<br>N/A | | N/A | N/A | | N/A<br>N/A | N/A<br>Y | Y<br>Y | Y<br>Y | Y<br>Y | N | V<br>C |
| | Credit card | Y<br>Y | N/A<br>N/A | N/A<br>N/A | N/A<br>N/A | N/A<br>N/A | N/A<br>N/A | N/A<br>N/A | | N/A | N/A | | N/A<br>N/A | N/A<br>Y | Y<br>Y | Y<br>Y | Y<br>Y | N | V<br>C |
| | Credit memo | Y<br>Y | N/A<br>N/A | N/A<br>N/A | N/A<br>N/A | N/A<br>N/A | N/A<br>N/A | N/A<br>N/A | | N/A | N/A | | N/A<br>N/A | N/A<br>Y | Y<br>Y | Y<br>Y | Y<br>Y | N | V<br>C |
| 2. Exchange Mirror C & V | | Y | N/A | N/A | N/A | N/A | Y/N | Y/N | | N/A | N/A | | N/A<br>N/A | N/A<br>Y | Y | Y | Y | Y | V<br>C |
| 3.Repair/replace (on/off site) | | | | | | | | | | | | | | | | | | | |

FIG.76A

| | | | | | | | | | | | | | | | | | | | |
|---|---|---|---|---|---|---|---|---|---|---|---|---|---|---|---|---|---|---|---|
| Mirror C & V | Under warranty part/exchange required | Y<br>Y | Y/N<br>Y/N | Y/N<br>Y/N | Y/N<br>Y/N | N/A<br>N/A | Y/N<br>Y/N | Y/N<br>Y/N | | | | N/A | N/A<br>N/A | N/A<br>Y | Y<br>Y | Y<br>Y | Y<br>Y | N | V<br>C |
| | Under warranty part not req'd | Y<br>Y | Y/N<br>Y/N | Y/N<br>Y/N | Y/N<br>Y/N | N/A<br>N/A | N/A<br>N/A | N/A<br>N/A | N/A | N/A<br>N/A | N/A<br>N/A | N/A<br>N/A | N/A<br>N/A | N/A<br>Y | N/A<br>N/A | Y<br>Y | Y<br>Y | N | V<br>C |
| | Out of warranty part required | Y<br>Y | Y/N<br>Y/N | Y/N<br>Y/N | Y/N<br>Y/N | Y/N<br>Y/N | Y/N<br>Y/N | Y/N<br>Y/N | N/A | N/A | N/A | N/A<br>N/A | N/A<br>N/A | N/A<br>Y | Y<br>Y | Y<br>Y | Y<br>Y | Y | V<br>C |
| | Out of warranty part not req'd | Y<br>Y | Y/N<br>Y/N | Y/N<br>Y/N | Y/N<br>Y/N | Y/N<br>Y/N | N/A<br>N/A | N/A<br>N/A | N/A | N/A<br>N/A | N/A<br>N/A | N/A<br>N/A | N/A<br>N/A | N/A<br>Y | N/A<br>N/A | Y<br>Y | Y<br>Y | Y | V<br>C |
| 4. Ship | wrong address | Y<br>Y | N/A<br>N/A | N/A<br>N/A | N/A<br>N/A | N/A<br>N/A | Y/N<br>Y/N | N/A<br>N/A | | N/A | N/A | N/A<br>N/A | N/A<br>N/A | N/A<br>Y | Y<br>Y | N/A<br>N/A | N/A<br>N/A | N | V<br>C |
| | Refused | Y<br>Y | N/A<br>N/A | N/A<br>N/A | N/A<br>N/A | N/A<br>N/A | N/A<br>N/A | N/A<br>N/A | | N/A | N/A | | N/A<br>N/A | N/A<br>Y | N/A<br>N/A | N/A<br>N/A | N/A<br>N/A | N | V<br>C |
| | Lost | Y<br>Y | N/A<br>N/A | N/A<br>N/A | N/A<br>N/A | N/A<br>N/A | Y/N<br>Y/N | Y/N<br>Y/N | N/A<br>N/A | N/A<br>N/A | N/A<br>N/A | N/A | | N/A<br>Y | N/A<br>N/A | N/A<br>N/A | N/A<br>N/A | Y | V<br>C |
| | Ship damaged | Y<br>Y | N/A<br>N/A | N/A<br>N/A | N/A<br>N/A | N/A<br>N/A | Y/N<br>Y/N | Y/N<br>Y/N | | | | | | N/A<br>Y | Y<br>Y | Y<br>Y | N/A<br>N/A | Y | V<br>C |

FIG.76B

| | | | | | | | | | | | | | | | | | | | |
|---|---|---|---|---|---|---|---|---|---|---|---|---|---|---|---|---|---|---|---|
| | missing components | Y<br>Y | Y/N<br>Y/N | Y/N<br>Y/N | Y/N<br>Y/N | Y/N<br>Y/N | Y/N<br>Y/N | Y/N<br>Y/N | N/A | N/A<br>N/A | N/A | N/A<br>N/A | N/A<br>N/A | N/A<br>Y | N/A<br>N/A | N/A<br>N/A | N/A<br>N/A | Y | V<br>C |
| | Duplicate ship | Y<br>Y | N/A<br>N/A | N/A<br>N/A | N/A<br>N/A | N/A<br>N/A | Y/N<br>Y/N | N/A<br>N/A | | N/A | N/A | | N/A<br>N/A | N/A<br>Y | Y<br>Y | Y<br>Y | N/A<br>N/A | N | V<br>C |
| | Inventory | Y<br>Y | N/A<br>N/A | N/A<br>N/A | N/A<br>N/A | N/A<br>N/A | N/A<br>N/A | N/A<br>N/A | | N/A<br>N/A | N/A | N/A | N/A<br>N/A | N/A<br>N | N/A<br>N/A | N/A<br>N/A | N/A<br>N/A | N | V<br>C |
| 5. **Never ship, stay in ware-house** | Cancel order/shipment | Y<br>Y | N/A<br>N/A | N/A<br>N/A | N/A<br>N/A | N/A<br>N/A | N/A<br>N/A | N/A<br>N/A | | N/A<br>N/A | N/A | | N/A<br>N/A | N/A<br>N | N/A<br>N/A | N/A<br>N/A | N/A<br>N/A | N | V<br>C |
| | Transferred order | Y<br>Y | N/A<br>N/A | N/A<br>N/A | N/A<br>N/A | N/A<br>N/A | N/A<br>N/A | N/A<br>N/A | N/A | N/A<br>N/A | N/A<br>N/A | N/A<br>N/A | N/A<br>N/A | N/A<br>N | N/A<br>N/A | N/A<br>N/A | N/A<br>N/A | N | V<br>C |
| | Never ship to customer | Y<br>Y | N/A<br>N/A | N/A<br>N/A | N/A<br>N/A | N/A<br>N/A | N/A<br>N/A | N/A<br>N/A | | N/A<br>N/A | N/A | N/A | N/A<br>N/A | N/A<br>N | N/A<br>N/A | N/A<br>N/A | N/A<br>N/A | N | V<br>C |
| 6. Not applicable | | Y<br>Y | N/A<br>N/A | N/A<br>N/A | N/A<br>N/A | N/A<br>N/A | N/A<br>N/A | N/A<br>N/A | N/A<br>N/A | N/A<br>N/A | N/A<br>N/A | N/A<br>N/A | N/A<br>N/A | N/A<br>N | N/A<br>N/A | N/A<br>N/A | N/A<br>N/A | N | V<br>C |
| 7. Other | | Y<br>Y | Y/N<br>Y/N | Y/N<br>Y/N | Y/N<br>Y/N | Y/N<br>Y/N | Y/N<br>Y/N | Y/N<br>Y/N | | | | | | N/A<br>N/A | Y<br>Y | Y<br>Y | Y<br>Y | | V<br>C |

FIG.76C

Limit File (Customer or Vendor)

Auotmatic Approval Intelligence

| Return type/Action (C & V) | | Allow auto Approval | Groups: Mfr.: Mfr. Allow Return | Groups: Mfr.: Mfr. allow Open Box | Groups: Mfr.: Exceed Mfr. allow max Time Duration | Groups: Vendor: Exceed Vendor allow max.time Duration | Groups: Vendor: Vendor Restock Fee | Groups: Customer: Exceed Customer Allow time duration | Groups: Customer: Charge Restock fee | Groups: Customer: exceed Sprice limit | Groups: Customer: Charge Service fee |
|---|---|---|---|---|---|---|---|---|---|---|---|
| 1. Credit | Check | Y | Y | Y | N | N | N/A | N | N | N | N/A |
| | Credit card | Y | Y | N | Y | N | N/A | N | N | N | N/A |
| | Credit memo | N | N | N/A | N/A | N/A | N/A | N/A | N/A | N/A | N/A |
| 2. Exchange Mirror C & V | | Y<br>Y | Y | N<br>N | N<br>N | N<br>N | N/A<br>N/A | N | N<br>Y | N<br>N | N/A<br>N/A |

FIG.77A

| | | | | | | | | | | | |
|---|---|---|---|---|---|---|---|---|---|---|---|
| 3.Repair/replace (on/off site) | | | | | | | | | | | |
| Mirror C & V | Under warranty part/exchange required | Y | N/A | N/A | N | N/A | N/A | N/A | N/A | N/A | N |
| | Under warranty part not req'd | Y | N/A | N/A | N | N/A | N/A | N/A | N/A<br>N/A | N/A | Y |
| | Out of warranty part required | Y | N/A | N/A | N | N/A | N/A | N/A | N/A<br>N/A | N/A | Y |
| | Out of warranty part not req'd | Y | N/A | N/A | N | N/A | N/A | N/A | N/A<br>N/A | N/A | Y |
| 4. Ship | wrong address | Y | N/A | N/A | N/A | N | N/A | N/A | N/A | N/A | N/A |
| | Refused | Y | N/A | N/A | N/A | N | N/A | N/A | N/A | N/A | N/A |
| | Lost | Y | N/A | N/A | N/A | N | N/A | N/A | N/A | N/A | N/A |

FIG.77B

| | | | | | | | | | | | |
|---|---|---|---|---|---|---|---|---|---|---|---|
| | Ship damaged | Y | N/A | N/A | N | N | N/A | N | N/A | N/A | N/A |
| | missing components | Y | N/A | N/A | N | N/A | N/A | N | N/A | N/A | N/A |
| | Duplicate ship | Y | N/A | N/A | Y | N/A<br>N | N/A | N/A | Y | N/A | N/A |
| | Inventory | Y | N/A | N/A | N/A | N | N/A | N/A | N/A | N/A | N/A |
| 5. **Never ship, stay in ware-house** | Cancel order/shipment | Y | N/A | N/A | N/A | N | N/A | N/A | N/A | N/A | N/A |
| | Transferred order | Y | N/A | N/A | N/A | N | N/A | N/A | N/A | N/A | N/A |
| | Never ship to customer | Y | N/A | N/A | N/A | N | N/A | N/A | N/A | N/A | N/A |
| 6. Not applicable | | Y | N/A | N/A | N/A | N | N/A | N/A | N/A | N/A | N/A |
| 7. Other | | | | | | | | | | | |

FIG.77C

Customer File Auto RMA Approval

Automatic Approval Criteria

| Return type/Action (C & V) | | Preset time allow between Orig. ship date & RMA request date | Restock Fee | Max allow time = Vendor max time | S price max | Service fee for On-site | Excced $ return limit | Excced agreed return period |
|---|---|---|---|---|---|---|---|---|
| 1. Credit | Check | Range | Range | N/A | Range | Range/Y/N | Amount | Days |
| | Credit card | Range | Range | N/A | Range | Range/Y/N | Amount | Days |
| | Credit memo | Range | Range | N/A | Range | Range/Y/N | Amount | Days |
| 2. Exchange Mirror C & V | | Range | Range | N/A | Range | Range/Y/N | Amount | Days |
| 3.Repair/replace (on/off site) | | Range | Range | N/A | N/A | Range/Y/N | Amount | Days |
| Mirror C & V | Under warranty part/exchange | N/A | N/A | N/A | N/A | Range/Y/N | N/A | N/A |

FIG.78A

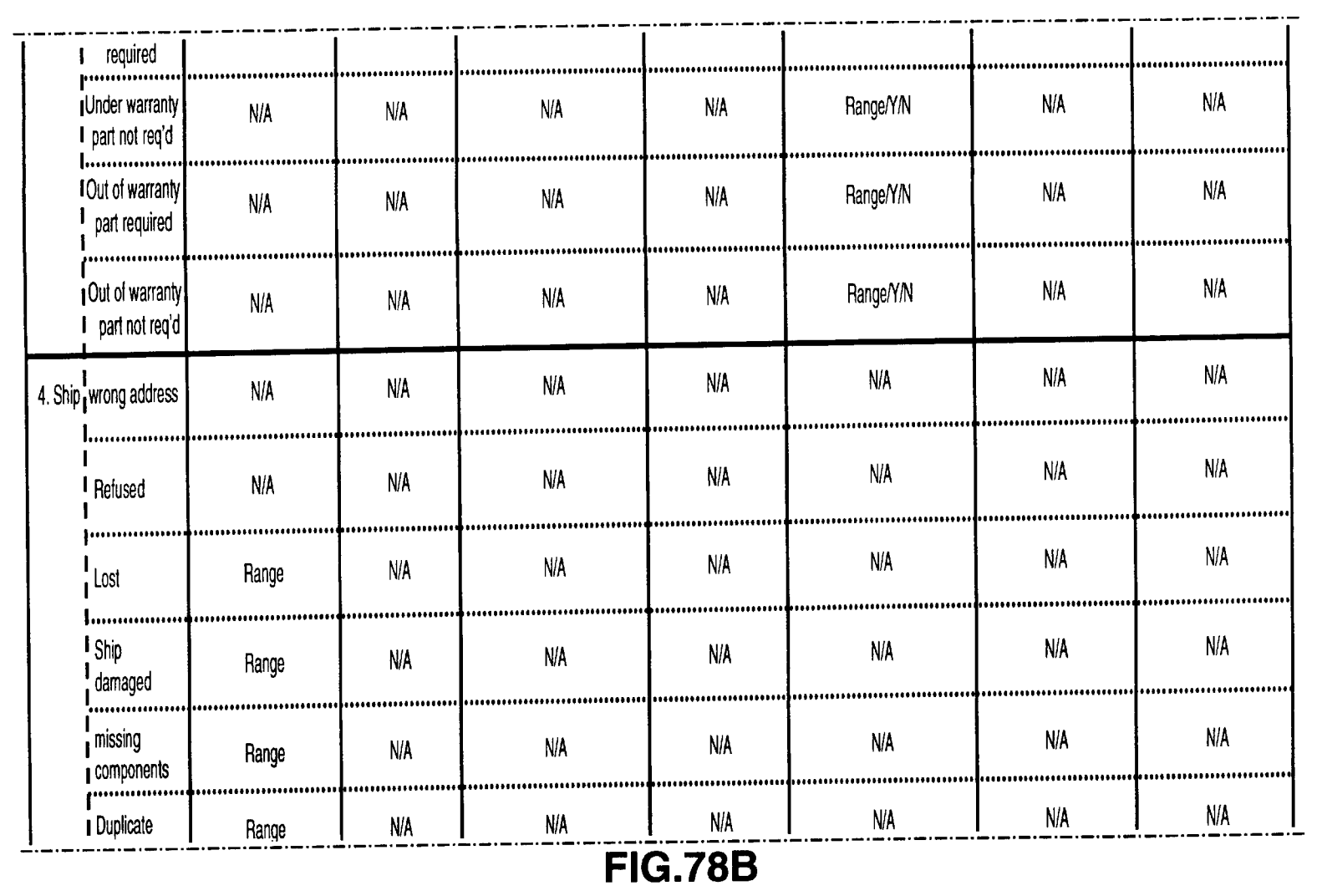

| | | | | | | | | |
|---|---|---|---|---|---|---|---|---|
| | required | | | | | | | |
| | Under warranty part not req'd | N/A | N/A | N/A | N/A | Range/Y/N | N/A | N/A |
| | Out of warranty part required | N/A | N/A | N/A | N/A | Range/Y/N | N/A | N/A |
| | Out of warranty part not req'd | N/A | N/A | N/A | N/A | Range/Y/N | N/A | N/A |
| 4. Ship | wrong address | N/A | N/A | N/A | N/A | N/A | N/A | N/A |
| | Refused | N/A | N/A | N/A | N/A | N/A | N/A | N/A |
| | Lost | Range | N/A | N/A | N/A | N/A | N/A | N/A |
| | Ship damaged | Range | N/A | N/A | N/A | N/A | N/A | N/A |
| | missing components | Range | N/A | N/A | N/A | N/A | N/A | N/A |
| | Duplicate | Range | N/A | N/A | N/A | N/A | N/A | N/A |

FIG.78B

| | | | | | | | | |
|---|---|---|---|---|---|---|---|---|
| | ship | | | | | | | |
| | Inventory | N/A | N/A | N/A | N/A | N/A | N/A | N/A |
| 5. Never ship, stay in ware-house | Cancel order/shipment | N/A | N/A | N/A | N/A | N/A | N/A | N/A |
| | Transferred order | N/A | N/A | N/A | N/A | N/A | N/A | N/A |
| | Never ship to customer | N/A | N/A | N/A | N/A | N/A | N/A | N/A |
| 6. Not applicable | | N/A | N/A | N/A | N/A | N/A | N/A | N/A |
| 7. Other | | | | | | | | |

New rules:
1. Return type must be create in duplicate (pair) for Vendor & Customer (V & C).
2. Allow changes only of return detail on either V or C. One return detail must remain unchanged (creation keys).
3. Return type can be different for vendor & customer on the same RMA.
4. Option to block use of any return type.
5. Original ship date as guide for proper selection of return type.
6. Create default setup initially.

FIG.78C

Vendor File Auto RMA Approval

Automatic Approval Criteria

| Return type/Action (C & V) | | Return allowed | Allowable Max date vendor time | Restock Fee |
|---|---|---|---|---|
| 1. Credit | Check | Y/N | Limit | Range |
| | Credit card | Y/N | Limit | Range |
| | Credit memo | Y/N | Limit | Range |
| 2. Exchange Mirror C & V | | Y/N | Limit | Range |
| 3.Repair/replace (on/off site) | | Y/N | N/A | N/A |
| Mirror C & V | Under warranty part/exchange required | Y/N | N/A | N/A |
| | Under warranty part not req'd | Y/N | N/A | N/A |
| | Out of warranty part required | Y/N | N/A | N/A |
| | Out of warranty part not req'd | Y/N | N/A | N/A |
| 4. Ship | wrong address | Y/N | Limit | Range |
| | Refused | Y/N | Limit | Range |
| | Lost | Y/N | N/A | N/A |
| | Ship damaged | Y/N | Limit | Limit |

FIG.79A

| | | | | |
|---|---|---|---|---|
| | missing components | Y/N | N/A | N/A |
| | Duplicate ship | Y/N | N/A | N/A |
| | Inventory | Y/N | N/A | N/A |
| 5. **Never ship, stay in ware-house** | Cancel order/shipment | Y/N | N/A | N/A |
| | Transferred order | Y/N | N/A | N/A |
| | Never ship to customer | Y/N | Limit | Limit |
| 6. Not applicable | | Y/N | N/A | N/A |
| 7. Other | | | | |

New rules:

1. Return type must be create in duplicate (pair) for Vendor & Customer (V & C).
2. Allow changes only of return detail on either V or C. One return detail must remain unchanged (crea
3. Return type can be different for vendor & customer on the same RMA.
4. Option to block use of any return type.
5. Original ship date as guide for proper selection of return type.
6. Create default setup initially.

FIG.79B

Mfr. File Auto RMA Approval

Automatic Approval Criteria

| Return type/Action (C & V) | | Return allowed | Open return allowed | Max time to return | Max time to Warranty service on-site | Max time to Warranty service off-site |
|---|---|---|---|---|---|---|
| 1. Credit | Check | Y | Y/N | Limit | N/A | N/A |
| | Credit card | Y | Y/N | Limit | N/A | N/A |
| | Credit memo | Y | Y/N | Limit | N/A | N/A |
| 2. Exchange Mirror C & V | | Y | Y/N | Limit | N/A | N/A |
| 3.Repair/replace (on/off site) | | Y | | Limit | N/A | N/A |
| Mirror C & V | Under warranty part/exchange required | Y | N/A | N/A | Limit | Limit |
| | Under warranty part not req'd | Y | N/A | N/A | Limit | Limit |
| | Out of warranty part required | Y | N/A | N/A | N/A | N/A |
| | Out of warranty part not req'd | Y | N/A | N/A | N/A | N/A |
| 4. Ship | wrong address | Y | N/A | Limit | N/A | N/A |
| | Refused | Y | N/A | Limit | N/A | N/A |
| | Lost | Y | N/A | Limit | N/A | N/A |
| | Ship damaged | Y | N/A | Limit | N/A | N/A |

FIG.80A

| | | | | | | |
|---|---|---|---|---|---|---|
| | missing components | Y | N/A | N/A | N/A | N/A |
| | Duplicate ship | Y | N/A | Limit | N/A | N/A |
| | Inventory | Y | N/A | Limit | N/A | N/A |
| 5. **Never ship, stay in ware-house** | Cancel order/shipment | Y | N/A | Limit | N/A | N/A |
| | Transferred order | Y | N/A | N/A | N/A | N/A |
| | Never ship to customer | Y | N/A | Limit | N/A | N/A |
| 6. Not applicable | | Y | N/A | Limit | N/A | N/A |
| 7. Other | | Y | N/A | Limit | N/A | N/A |

New rules:

1. Return type must be create in duplicate (pair) for Vendor & Customer (V & C).
2. Allow changes only of return detail on either V or C. One return detail must remain unchanged (creation keys
3. Return type can be different for vendor & customer on the same RMA.
4. Option to block use of any return type.
5. Original ship date as guide for proper selection of return type.
6. Create default setup initially.

FIG.80B your return request(s) have been approved.

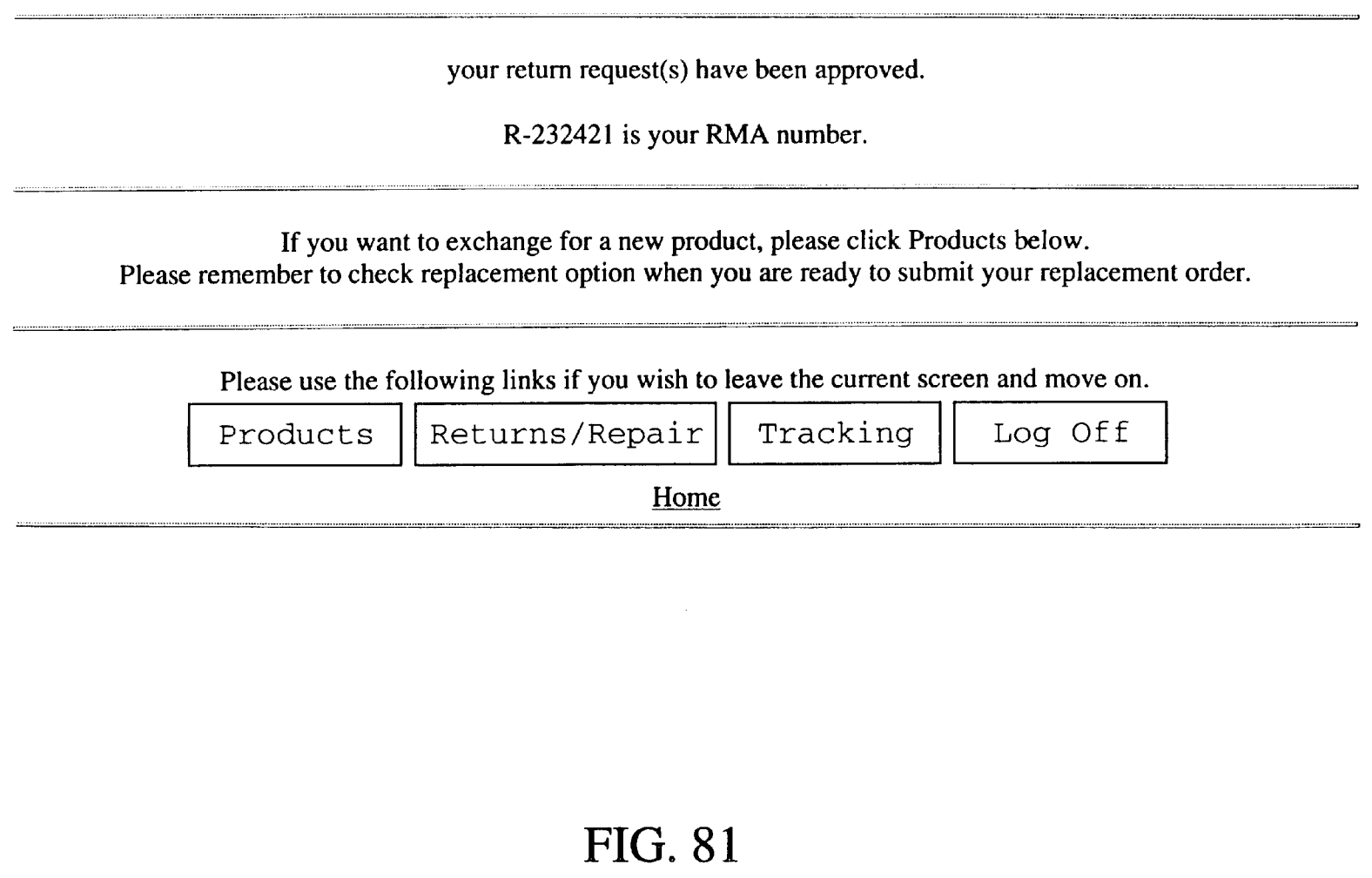

R-232421 is your RMA number.

---

If you want to exchange for a new product, please click Products below.
Please remember to check replacement option when you are ready to submit your replacement order.

---

Please use the following links if you wish to leave the current screen and move on.

[Products] [Returns/Repair] [Tracking] [Log Off]

Home

FIG. 81

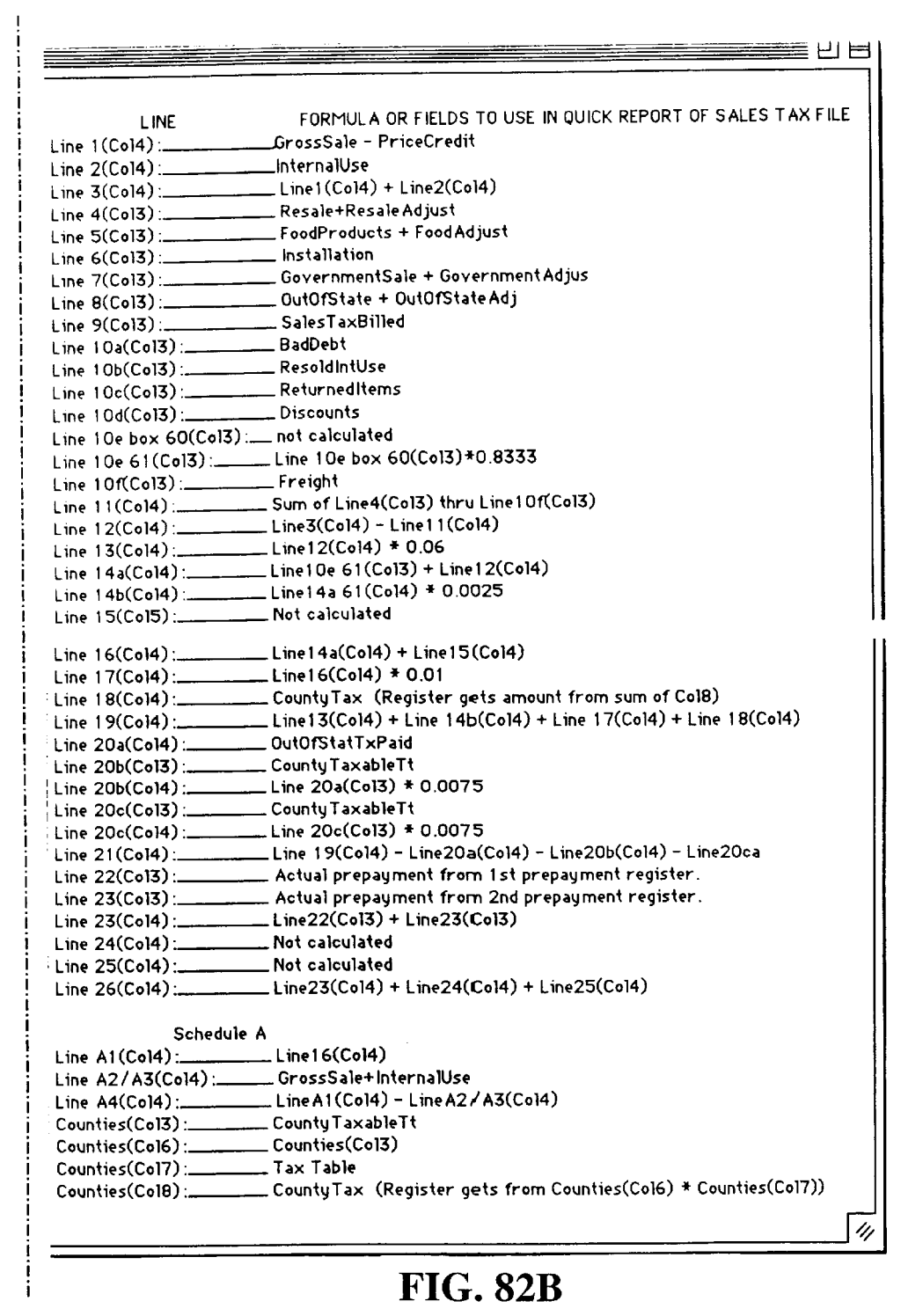

| LINE | FORMULA OR FIELDS TO USE IN QUICK REPORT OF SALES TAX FILE |
|---|---|
| Line 1(Col4): | GrossSale - PriceCredit |
| Line 2(Col4): | InternalUse |
| Line 3(Col4): | Line1(Col4) + Line2(Col4) |
| Line 4(Col3): | Resale+ResaleAdjust |
| Line 5(Col3): | FoodProducts + FoodAdjust |
| Line 6(Col3): | Installation |
| Line 7(Col3): | GovernmentSale + GovernmentAdjus |
| Line 8(Col3): | OutOfState + OutOfStateAdj |
| Line 9(Col3): | SalesTaxBilled |
| Line 10a(Col3): | BadDebt |
| Line 10b(Col3): | ResoldIntUse |
| Line 10c(Col3): | ReturnedItems |
| Line 10d(Col3): | Discounts |
| Line 10e box 60(Col3): | not calculated |
| Line 10e 61(Col3): | Line 10e box 60(Col3)*0.8333 |
| Line 10f(Col3): | Freight |
| Line 11(Col4): | Sum of Line4(Col3) thru Line10f(Col3) |
| Line 12(Col4): | Line3(Col4) - Line11(Col4) |
| Line 13(Col4): | Line12(Col4) * 0.06 |
| Line 14a(Col4): | Line10e 61(Col3) + Line12(Col4) |
| Line 14b(Col4): | Line14a 61(Col4) * 0.0025 |
| Line 15(Col5): | Not calculated |
| Line 16(Col4): | Line14a(Col4) + Line15(Col4) |
| Line 17(Col4): | Line16(Col4) * 0.01 |
| Line 18(Col4): | CountyTax (Register gets amount from sum of Col8) |
| Line 19(Col4): | Line13(Col4) + Line 14b(Col4) + Line 17(Col4) + Line 18(Col4) |
| Line 20a(Col4): | OutOfStatTxPaid |
| Line 20b(Col3): | CountyTaxableTt |
| Line 20b(Col4): | Line 20a(Col3) * 0.0075 |
| Line 20c(Col3): | CountyTaxableTt |
| Line 20c(Col4): | Line 20c(Col3) * 0.0075 |
| Line 21(Col4): | Line 19(Col4) - Line20a(Col4) - Line20b(Col4) - Line20ca |
| Line 22(Col3): | Actual prepayment from 1st prepayment register. |
| Line 23(Col3): | Actual prepayment from 2nd prepayment register. |
| Line 23(Col4): | Line22(Col3) + Line23(Col3) |
| Line 24(Col4): | Not calculated |
| Line 25(Col4): | Not calculated |
| Line 26(Col4): | Line23(Col4) + Line24(Col4) + Line25(Col4) |

Schedule A

| | |
|---|---|
| Line A1(Col4): | Line16(Col4) |
| Line A2/A3(Col4): | GrossSale+InternalUse |
| Line A4(Col4): | LineA1(Col4) - LineA2/A3(Col4) |
| Counties(Col3): | CountyTaxableTt |
| Counties(Col6): | Counties(Col3) |
| Counties(Col7): | Tax Table |
| Counties(Col8): | CountyTax (Register gets from Counties(Col6) * Counties(Col7)) |

FIG. 82B

| Invoice-Date-Term-Type | | Customer | ¥ Customer PO |
|---|---|---|---|
| 13195 | | ORACLE | |
| 3/24/97 | N30 | C. RODRIGUEZ | (415) 506-3209 |
| Customer | | (415) 633-2945 | 238078 |
| Printed | STxPaid | AR Posted *R-263436CR (Temp24620-1) Approved:* | |
| 13204 | | FIRST DEPOSIT | |
| 3/26/97 | N30 | LINDA | (415) 222-7669 |
| Customer | DS | (415) 278-6045 | 19620-43935-N |
| Printed | STxPaid | AR Posted *R-263681RP (Temp24646-1) Approved:* | |
| 13231 | | APPLIED MATERIALS | |
| 3/31/97 | N30 | Denise Fritsch | (408) 563-1240 |
| Customer | | (408) 563-5504 | 4500020574 |
| Printed | STxPaid | AR Posted *5/8/97: faxed inv. list to denise. 5/* | |
| 13261 | | CHEVRON INFORMATION TECHNOLOGY | |
| 4/3/97 | N/30 | Melane Nock-Salgado | 510) 842-0710 |
| Customer | DS | 510) 328-1710 | FSRA 2006326 |
| Printed | STxPaid | *R-264144RP (Temp24618-3) Closed: 6/* | |
| 13300 | | Gasonics International | |
| 4/9/97 | N30 | Dana Sengeush | (408) 570-7366 |
| Customer | | (408) 570-7350 | 31646 |
| Printed | STxPaid | *R-264277XDM (Temp24712-1) Approve* | |
| 13307 | | NETWORK GENERAL CORP. | |
| 4/10/97 | N30 | WIN ROHDES | (415) 473-2061 |
| Customer | | (415) 327-3961 | 86035 |
| Printed | STxPaid | | |
| 13359 | | APPLIED MATERIALS | |
| 4/17/97 | N30 | Denise Fritsch | (408) 563-1240 |
| Replacement | | (408) 563-5504 | 4500020574 |
| Printed | STxPaid | *R-263744XSM (Temp24625-1) 6/6/9* | |

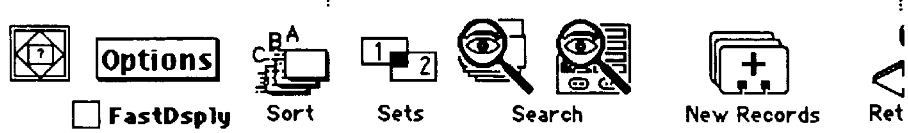

FIG. 83A

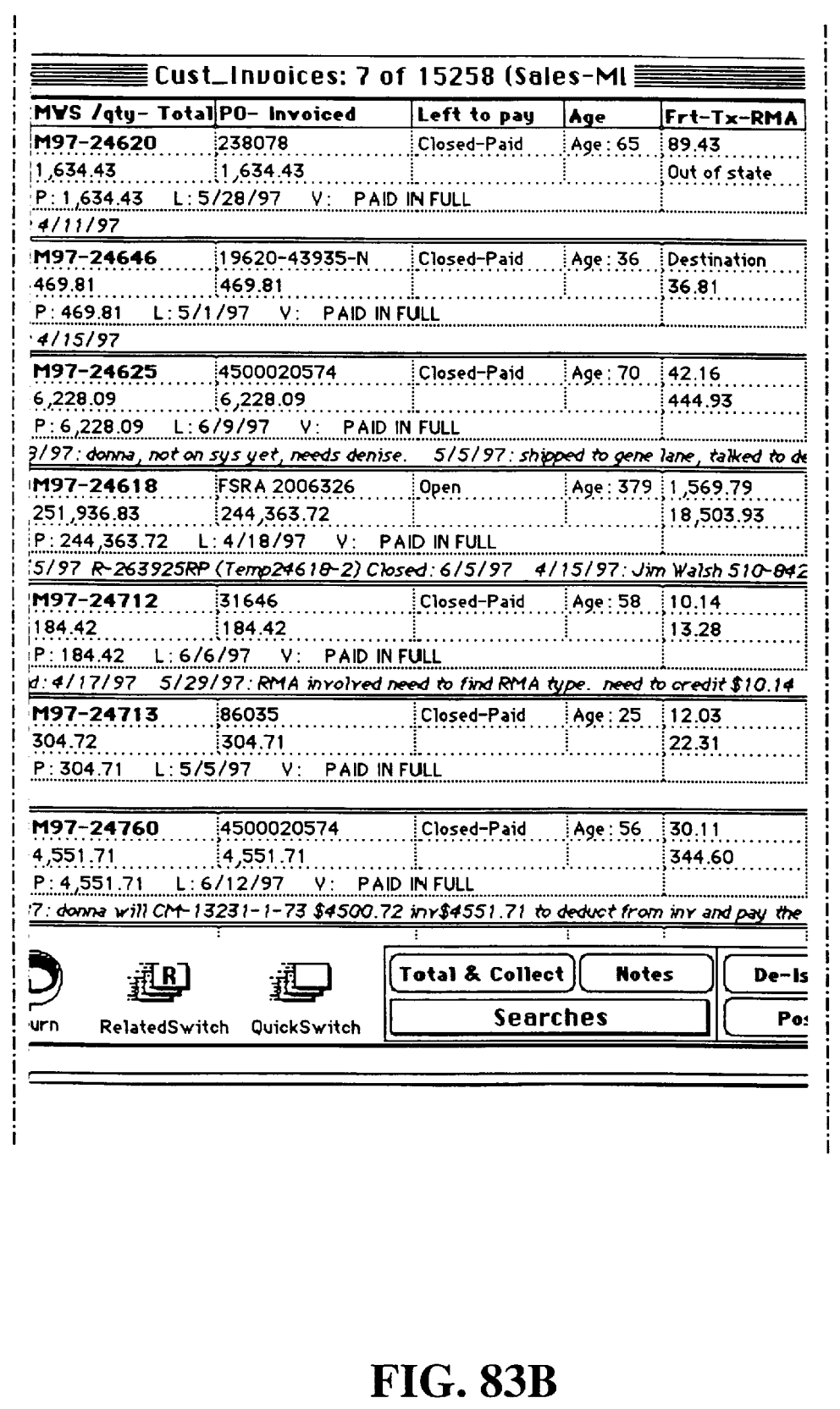

Cust_Invoices: 7 of 15258 (Sales-Ml

| MVS /qty- Total | PO- Invoiced | Left to pay | Age | Frt-Tx-RMA |
|---|---|---|---|---|
| M97-24620 | 238078 | Closed-Paid | Age : 65 | 89.43 |
| 1,634.43 | 1,634.43 | | | Out of state |
| P: 1,634.43 L: 5/28/97 V: PAID IN FULL | | | | |
| 4/11/97 | | | | |
| M97-24646 | 19620-43935-N | Closed-Paid | Age : 36 | Destination |
| 469.81 | 469.81 | | | 36.81 |
| P: 469.81 L: 5/1/97 V: PAID IN FULL | | | | |
| 4/15/97 | | | | |
| M97-24625 | 4500020574 | Closed-Paid | Age : 70 | 42.16 |
| 6,228.09 | 6,228.09 | | | 444.93 |
| P: 6,228.09 L: 6/9/97 V: PAID IN FULL | | | | |
| 9/97: donna, not on sys yet, needs denise. 5/5/97: shipped to gene lane, talked to de | | | | |
| M97-24618 | FSRA 2006326 | Open | Age : 379 | 1,569.79 |
| 251,936.83 | 244,363.72 | | | 18,503.93 |
| P: 244,363.72 L: 4/18/97 V: PAID IN FULL | | | | |
| 5/97 R-263925RP (Temp24618-2) Closed: 6/5/97 4/15/97: Jim Walsh 510-842 | | | | |
| M97-24712 | 31646 | Closed-Paid | Age : 58 | 10.14 |
| 184.42 | 184.42 | | | 13.28 |
| P: 184.42 L: 6/6/97 V: PAID IN FULL | | | | |
| d: 4/17/97 5/29/97: RMA involved need to find RMA type. need to credit $10.14 | | | | |
| M97-24713 | 86035 | Closed-Paid | Age : 25 | 12.03 |
| 304.72 | 304.71 | | | 22.31 |
| P: 304.71 L: 5/5/97 V: PAID IN FULL | | | | |
| M97-24760 | 4500020574 | Closed-Paid | Age : 56 | 30.11 |
| 4,551.71 | 4,551.71 | | | 344.60 |
| P: 4,551.71 L: 6/12/97 V: PAID IN FULL | | | | |
| 7: donna will CM-13231-1-73 $4500.72 inv$4551.71 to deduct from inv and pay the | | | | |

urn RelatedSwitch QuickSwitch

Total & Collect | Notes | De-Is

Searches | Po

FIG. 83B

Daily Vendor Verification

| Found | 10/16/97 3:13PM | Done |
|---|---|---|
| 62 | Miscelaneous invoices (includes pre-approved) | |
| | ------------------------------------------------------------ | |
| | Clean with RMA full credit) - cRMA | |
| 2 | Clean with Credit Memos (not RMA) - cCred | |
| | Clean reconciled by Credit - cRBCr | |
| 2 | Clean inventory - cInvent | |
| 2 | Clean internal use - cInt | |
| 20 | Clean manually reconciled - cMan | |
| 3 | Clean replacements - cRpl | |
| | Clean drop shipments - cDS | |
| 24 | Completely Clean invoices - cC | |
| **53** | **Total clean invoices** | |
| | ------------------------------------------------------------ | |
| 2 | No MWS - NoMWS | |
| 65 | Not reconciled (includes pre-approved) - NR | |
| 11 | Replacement/RMA without credit - Cred | |
| | Not received discrepencies - Rcvd | |
| | Not shipped discrepencies - Shpd | |
| | No customer invoices - CustInv | |
| 8 | Freight/tax charges - FrTx | |
| 14 | Order date discrepencies - Ord | |
| | Cost/Price discrepencies - CP | |
| **99** | **Total invoices with discrepencies** | |
| | ------------------------------------------------------------ | |
| 120 | Not reconciled (not including pre-approved) | |
| 86 | Reconciled | |
| | Pre-approved | |
| | Approved | |
| 7 | Scheduled | |
| **215** | **Total not paid** | |
| | | |

Reverify Print Cancel Show

FIG.92

| Acct Code | Account Red = not opened | Account Type |
|---|---|---|
| BA 1010 | Cash in Bank #1 | Asset |
| BA 1210 | Trade Acct Receivables | Asset |
| BA 1220 | Notes Receivable | Asset |
| BA 1240 | Other Receivables | Asset |
| BA 1250 | Employer's Loans and Advances | Asset |
| BA 1410 | Merchandise Inventory | Asset |
| BA 1510 | Prepaid Expense | Asset |
| BA 1520 | Pepaid Fed. Corp. Tax | Asset |
| BA 1530 | Prepaid Franchise Tax | Asset |
| BA 1610 | Furniture and Fixtures | Asset |
| BA 1620 | Office Equipment | Asset |
| BA 1630 | Class Room Equipment | Asset |
| BA 1640 | Vehicles | Asset |
| BA 1650 | Leasehold improvement | Asset |
| BA 1710 | ACC. Depreciation - F&F | Contra Asset |
| BA 1720 | Acc. Depreciation - Office Equip. | Contra Asset |
| BA 1730 | Acc. Depreciation - Class Room | Contra Asset |
| BA 1740 | Acc. Depreciation - Lease Hold | Contra Asset |
| BA 1750 | Loans to Shareholder | Asset |
| BL 2010 | Trade Accounts Payable | Liability |
| BL 2020 | Auto Loan - Current | Liability |
| BL 2030 | Loans Payable | Liability |
| BL 2040 | Interest Payable | Liability |
| BL 2050 | Accrued Payable | Liability |

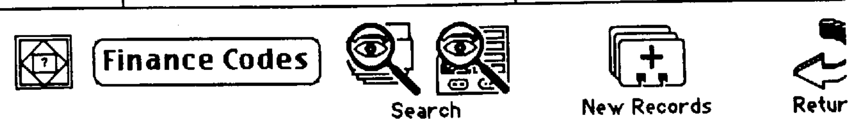

FIG. 97A

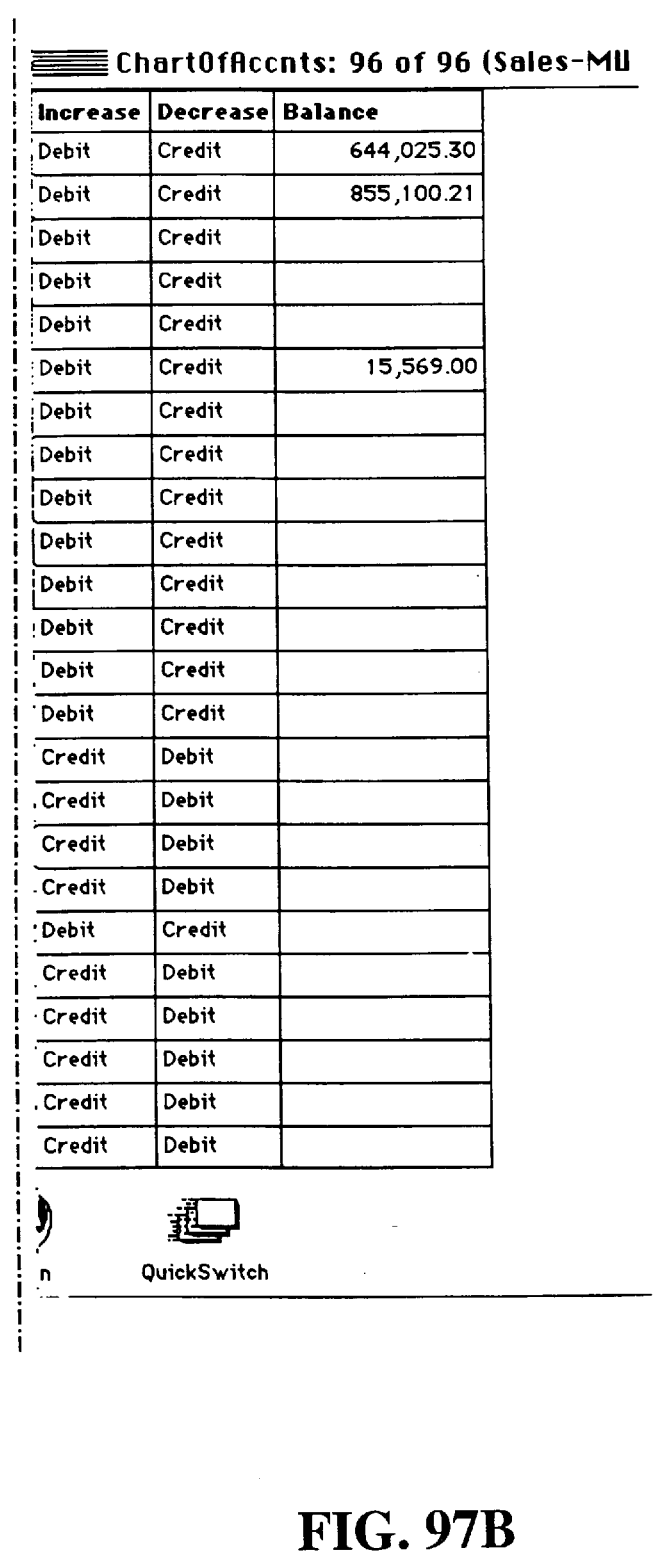

ChartOfAccnts: 96 of 96 (Sales-MU

| Increase | Decrease | Balance |
|---|---|---|
| Debit | Credit | 644,025.30 |
| Debit | Credit | 855,100.21 |
| Debit | Credit | |
| Debit | Credit | |
| Debit | Credit | |
| Debit | Credit | 15,569.00 |
| Debit | Credit | |
| Debit | Credit | |
| Debit | Credit | |
| Debit | Credit | |
| Debit | Credit | |
| Debit | Credit | |
| Debit | Credit | |
| Debit | Credit | |
| Credit | Debit | |
| Credit | Debit | |
| Credit | Debit | |
| Credit | Debit | |
| Debit | Credit | |
| Credit | Debit | |
| Credit | Debit | |
| Credit | Debit | |
| Credit | Debit | |
| Credit | Debit | |

n QuickSwitch

FIG. 97B

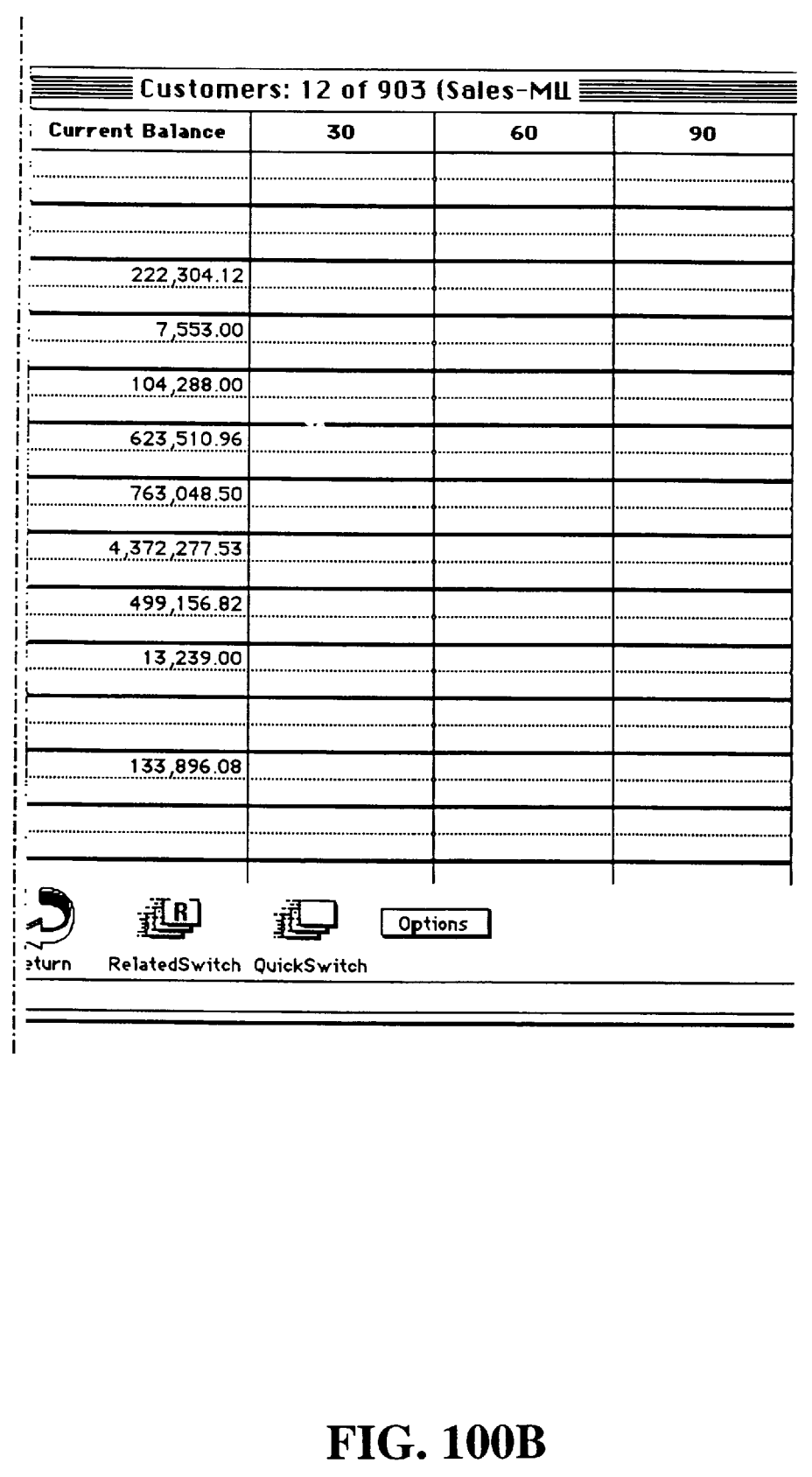

Customers: 12 of 903 (Sales-MU

| Current Balance | 30 | 60 | 90 |
|---|---|---|---|
| | | | |
| | | | |
| 222,304.12 | | | |
| 7,553.00 | | | |
| 104,288.00 | | | |
| 623,510.96 | | | |
| 763,048.50 | | | |
| 4,372,277.53 | | | |
| 499,156.82 | | | |
| 13,239.00 | | | |
| | | | |
| 133,896.08 | | | |
| | | | |

eturn RelatedSwitch QuickSwitch Options

FIG. 100B

| Code | Partner Name | Red= BaseLine vendor |
|---|---|---|
| MicroD | Ingram MicroD | 1 |
| ☒ Aprvd | (800) 274-4800 | ☒ Ven ☐ Mfgr ☐ Car ☒ Payee |
| CmpLnd | Computerland | 1 |
| ☒ Aprvd | (800) 354-9368 | ☒ Ven ☐ Mfgr ☐ Car ☒ Payee |
| Merisel | Merisel | 1 |
| ☒ Aprvd | (800) 462-5241 | ☒ Ven ☒ Mfgr ☐ Car ☒ Payee |
| Mega1 | Mega Network, Inc. | |
| ☒ Aprvd | (408) 730-9138 | ☒ Ven ☐ Mfgr ☐ Car ☒ Payee |
| WordMarc | WordMARC International Corporation | |
| ☒ Aprvd | 800-835-2400 | ☒ Ven ☐ Mfgr ☐ Car ☒ Payee |
| MICROCNTRL | MICRO CENTRAL, INC | |
| ☒ Aprvd | 800-836-4276 | ☒ Ven ☐ Mfgr ☐ Car ☒ Payee |
| VMI | VMI CORP | |
| ☒ Aprvd | 408-745-1700 | ☒ Ven ☐ Mfgr ☐ Car ☒ Payee |
| IBM | IBM CORPORATION | |
| ☒ Aprvd | 408-452-4810 | ☒ Ven ☒ Mfgr ☐ Car ☒ Payee |
| ICG | International Computer Graphics | |
| ☒ Aprvd | (800) 659-4244 | ☒ Ven ☐ Mfgr ☐ Car ☒ Payee |
| compaq | compaq | |
| ☒ Aprvd | (800) 231-9977 | ☒ Ven ☒ Mfgr ☐ Car ☒ Payee |
| WARDBAGY | WARD-BAGY PKG INC. | |
| ☒ Aprvd | (408) -262-2111 | ☒ Ven ☐ Mfgr ☐ Car ☒ Payee |
| AZERTY | AZERTY INC. | |
| ☒ Aprvd | (800) -888-8080 | ☒ Ven ☐ Mfgr ☐ Car ☒ Payee |

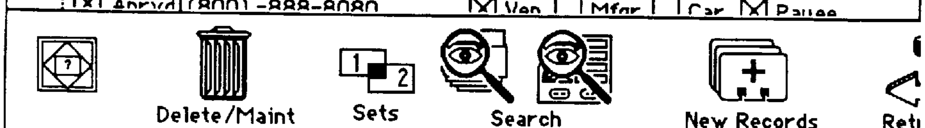

FIG. 103A

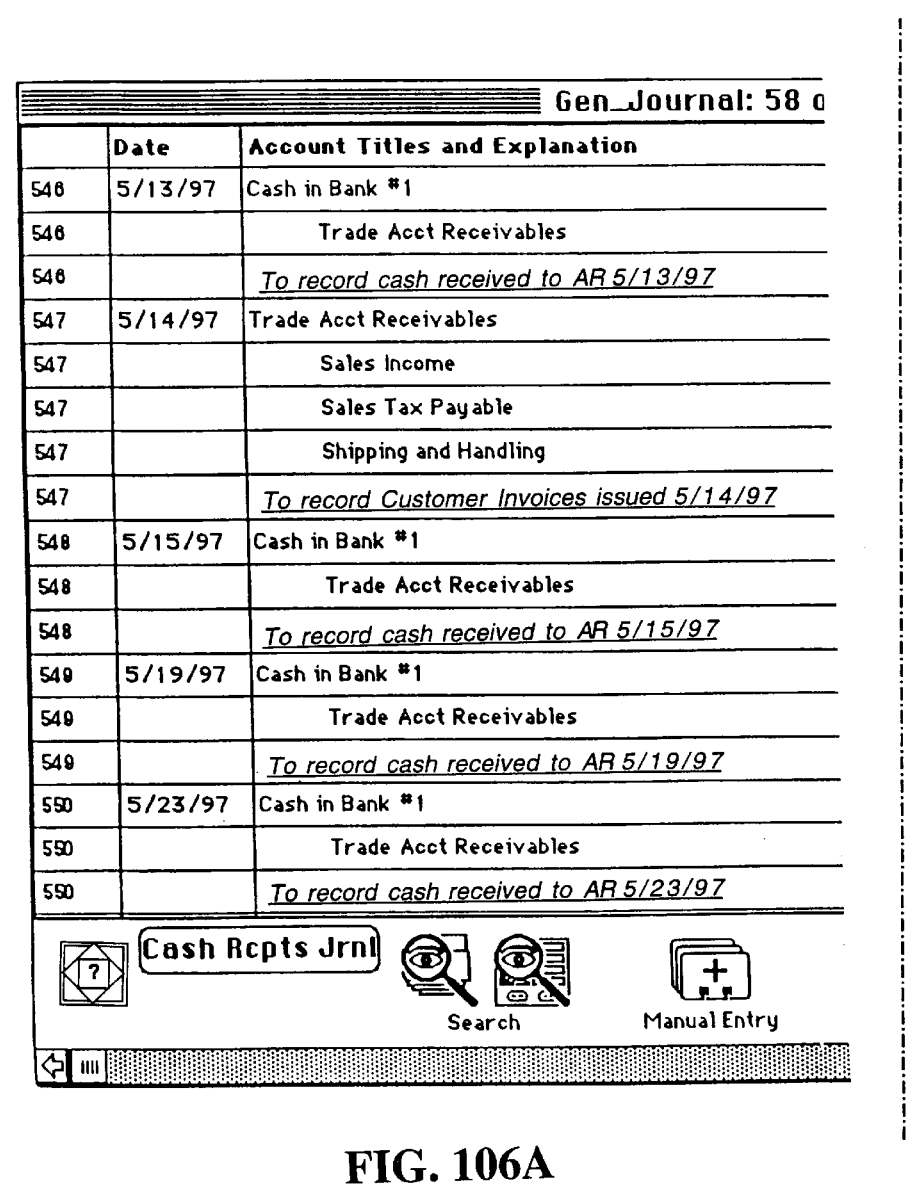

Gen_Journal: 58 o

| | Date | Account Titles and Explanation |
|---|---|---|
| 546 | 5/13/97 | Cash in Bank #1 |
| 546 | | Trade Acct Receivables |
| 546 | | *To record cash received to AR 5/13/97* |
| 547 | 5/14/97 | Trade Acct Receivables |
| 547 | | Sales Income |
| 547 | | Sales Tax Payable |
| 547 | | Shipping and Handling |
| 547 | | *To record Customer Invoices issued 5/14/97* |
| 548 | 5/15/97 | Cash in Bank #1 |
| 548 | | Trade Acct Receivables |
| 548 | | *To record cash received to AR 5/15/97* |
| 549 | 5/19/97 | Cash in Bank #1 |
| 549 | | Trade Acct Receivables |
| 549 | | *To record cash received to AR 5/19/97* |
| 550 | 5/23/97 | Cash in Bank #1 |
| 550 | | Trade Acct Receivables |
| 550 | | *To record cash received to AR 5/23/97* |

?
Cash Rcpts Jrnl
Search
Manual Entry

FIG. 106A

Figure 106B:
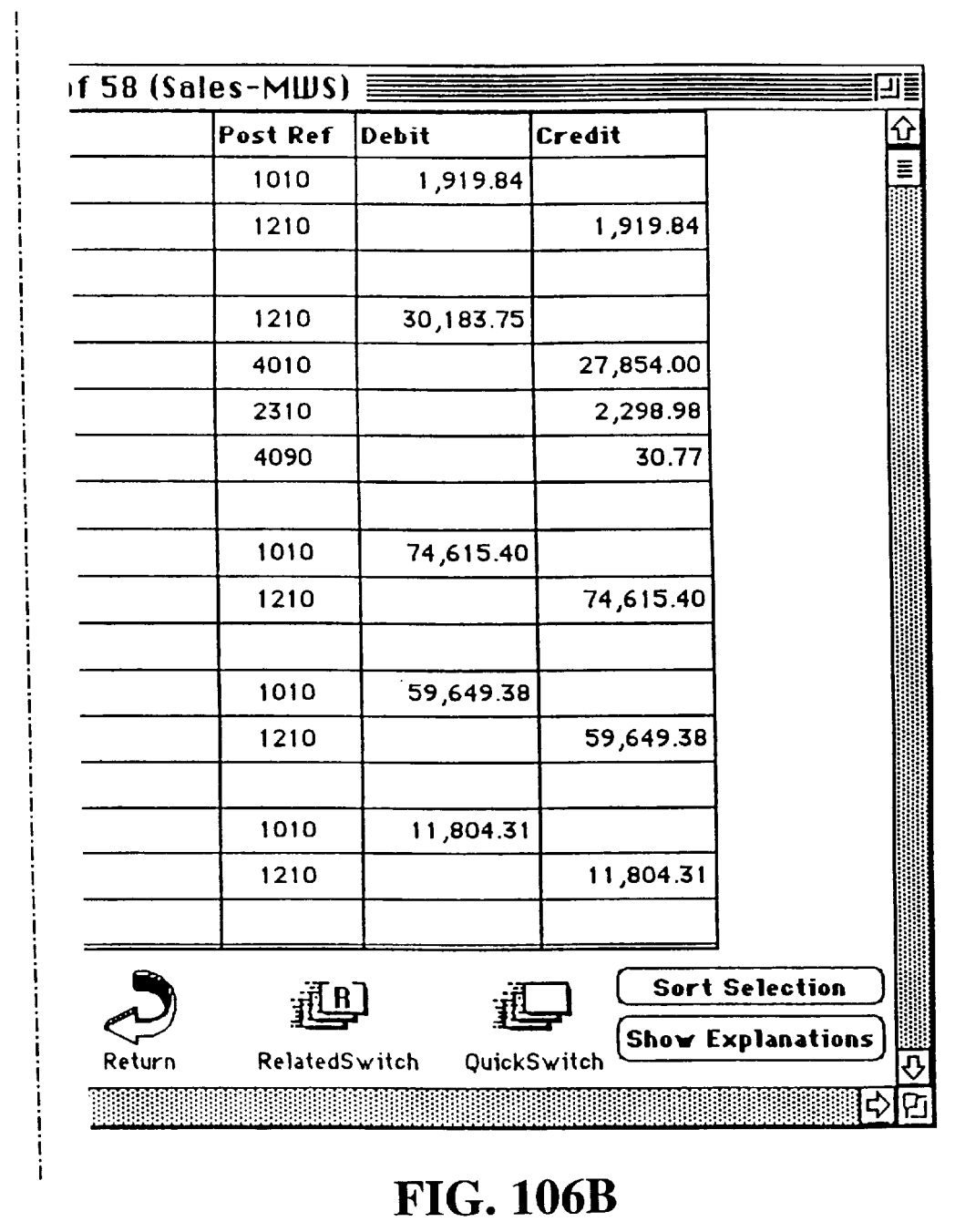

ıf 58 (Sales-MWS)

| | Post Ref | Debit | Credit |
|---|---|---|---|
| | 1010 | 1,919.84 | |
| | 1210 | | 1,919.84 |
| | | | |
| | 1210 | 30,183.75 | |
| | 4010 | | 27,854.00 |
| | 2310 | | 2,298.98 |
| | 4090 | | 30.77 |
| | | | |
| | 1010 | 74,615.40 | |
| | 1210 | | 74,615.40 |
| | | | |
| | 1010 | 59,649.38 | |
| | 1210 | | 59,649.38 |
| | | | |
| | 1010 | 11,804.31 | |
| | 1210 | | 11,804.31 |
| | | | |

Return RelatedSwitch QuickSwitch

Sort Selection

Show Explanations

| | |
|---|---|
| FIG. 108A | FIG. 108B |
| FIG. 108C | FIG. 108D |

| | | | | |
|---|---|---|---|---|
| Selling expense | | | | |
| Sales salaries and commission expense | | B-Multiple Acts | | |
| Advertising expense | | B-Advertising and M | | |
| Rent expense | | B-Rent | | |
| Supplies expense | | B-Office Expense | | |
| Utilities expense | | B-Utilities | | |
| Depreciation expense | | B-Depreciation | | |
| Other selling expense | | B-Msc. Expenses | Calculated | |
| Adminstrative expense | | | | |
| Salaries expense exacutive | | B-Officer wages | | |
| Insurance expense | | B-Insurance | | |
| Supplies expense | | B-Computer Expens | Calculated | |
| Total operating expense | | | | Calculated |
| Income from operations | | | | Calculated |
| Blank | | | | |
| Non Operation revenue and expense | | | | |
| Non operating revenue | | | | |
| Interest revenue | | | | B-Interest Income |
| | | | | Calculated |
| Non operating expense | | | | |
| Interest expense | | | | B-Interest Expense |
| Net Income | | | | Calculated |

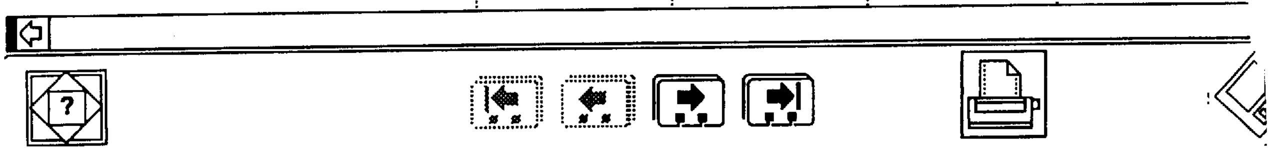

FIG. 108C

| | | | | |
|---|---|---|---|---|
| Operating revenue | | | | |
| Gross sales | | | | 100,000.00 |
| Less:Sales discounts | | | 100,000.00 | |
| Sales returns and allowances | | | 100,000.00 | 200,000.00 |
| Net sales | | | | -100,000.00 |
| | | | | |
| Cost of good sold | | | | |
| Merchandise inventory, start of period | | | 100,000.00 | |
| Purchases | | 100,000.00 | | |
| Less: Purchase discounts | 100,000.00 | | | |
| Purchase returns and allowances | 100,000.00 | 200,000.00 | | |
| Net purchases | | -100,000.00 | | |
| Add: Transportation-in | | 100,000.00 | | |
| Net cost of purchases | | | | |
| Cost of goods available for sale | | | 100,000.00 | |
| Less:Merchandise Inventory - end of period | | | 100,000.00 | |
| Cost of goods sold | | | | |
| Gross Margin | | | | -100,000.00 |

FIG. 109A

| | | | |
|---|---|---|---|
| Operating expenses: | | | |
| Selling expences | | | |
| Sales salaries and commissions expenses | 100,000.00 | | |
| Advertising expenses | 100,000.00 | | |
| Rent expenses | 100,000.00 | | |
| Supplies expenses | 100,000.00 | | |
| Utilities expenses | 100,000.00 | | |
| Depreciation expenses | 100,000.00 | | |
| Other selling expenses | 100,000.00 | 700,000.00 | |
| Administrative expenses | | | |
| Salaries expenses, executive | 100,000.00 | | |
| Insurance expenses | 100,000.00 | | |
| Supplies expenses | 100,000.00 | 300,000.00 | |
| Total operating expenses | | | 300,000.00 |
| Income from operations | | | -400,000.00 |
| Nonoperating revenues and expenses | | | |
| Nonoperating revenues | | | |
| Interest revenue | | | 100,000.00 |
| | | | -300,000.00 |
| Nonoperating expenses | | | |
| Interest expenses | | | 100,000.00 |
| Net Income | | | -400,000.00 |

| | |
|---|---|
| Fig.110A | Fig.110C |
| Fig.110B | Fig.110D |

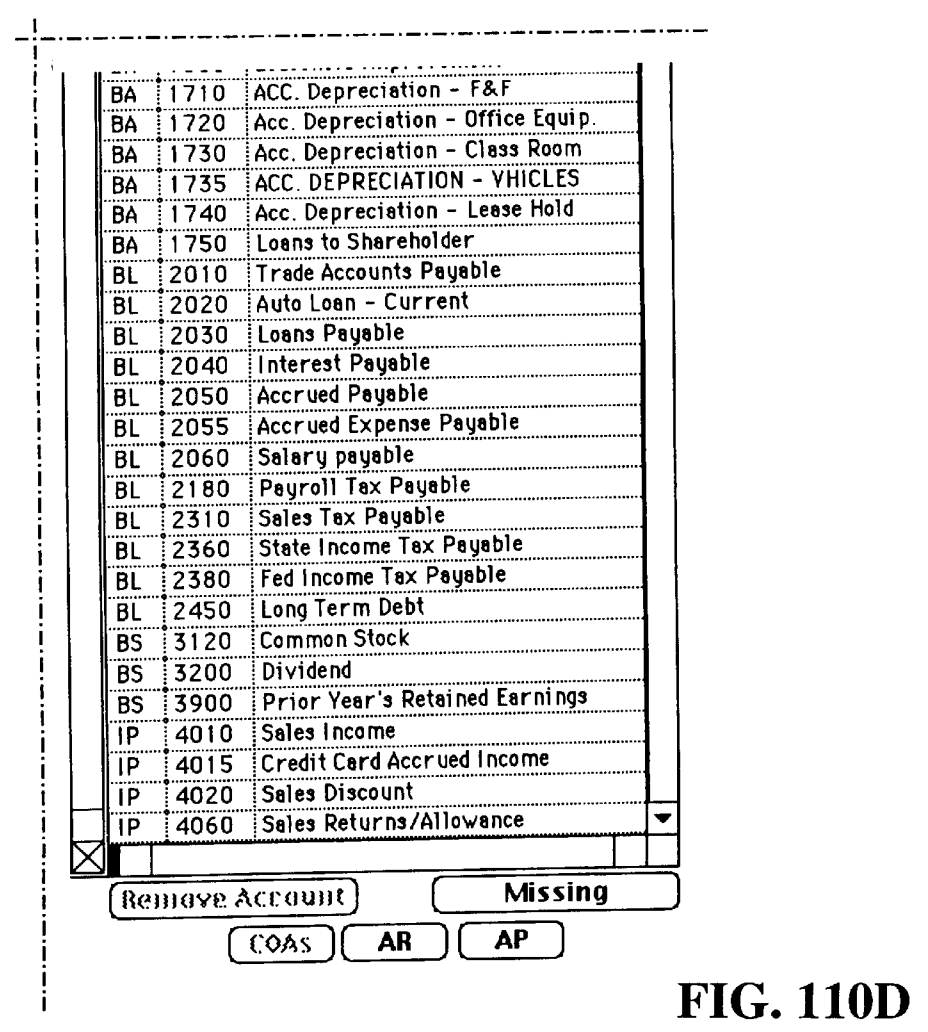

| | | |
|---|---|---|
| BA | 1710 | ACC. Depreciation - F&F |
| BA | 1720 | Acc. Depreciation - Office Equip. |
| BA | 1730 | Acc. Depreciation - Class Room |
| BA | 1735 | ACC. DEPRECIATION - VHICLES |
| BA | 1740 | Acc. Depreciation - Lease Hold |
| BA | 1750 | Loans to Shareholder |
| BL | 2010 | Trade Accounts Payable |
| BL | 2020 | Auto Loan - Current |
| BL | 2030 | Loans Payable |
| BL | 2040 | Interest Payable |
| BL | 2050 | Accrued Payable |
| BL | 2055 | Accrued Expense Payable |
| BL | 2060 | Salary payable |
| BL | 2180 | Payroll Tax Payable |
| BL | 2310 | Sales Tax Payable |
| BL | 2360 | State Income Tax Payable |
| BL | 2380 | Fed Income Tax Payable |
| BL | 2450 | Long Term Debt |
| BS | 3120 | Common Stock |
| BS | 3200 | Dividend |
| BS | 3900 | Prior Year's Retained Earnings |
| IP | 4010 | Sales Income |
| IP | 4015 | Credit Card Accrued Income |
| IP | 4020 | Sales Discount |
| IP | 4060 | Sales Returns/Allowance |

Remove Account | Missing

COAs | AR | AP

FIG. 110D

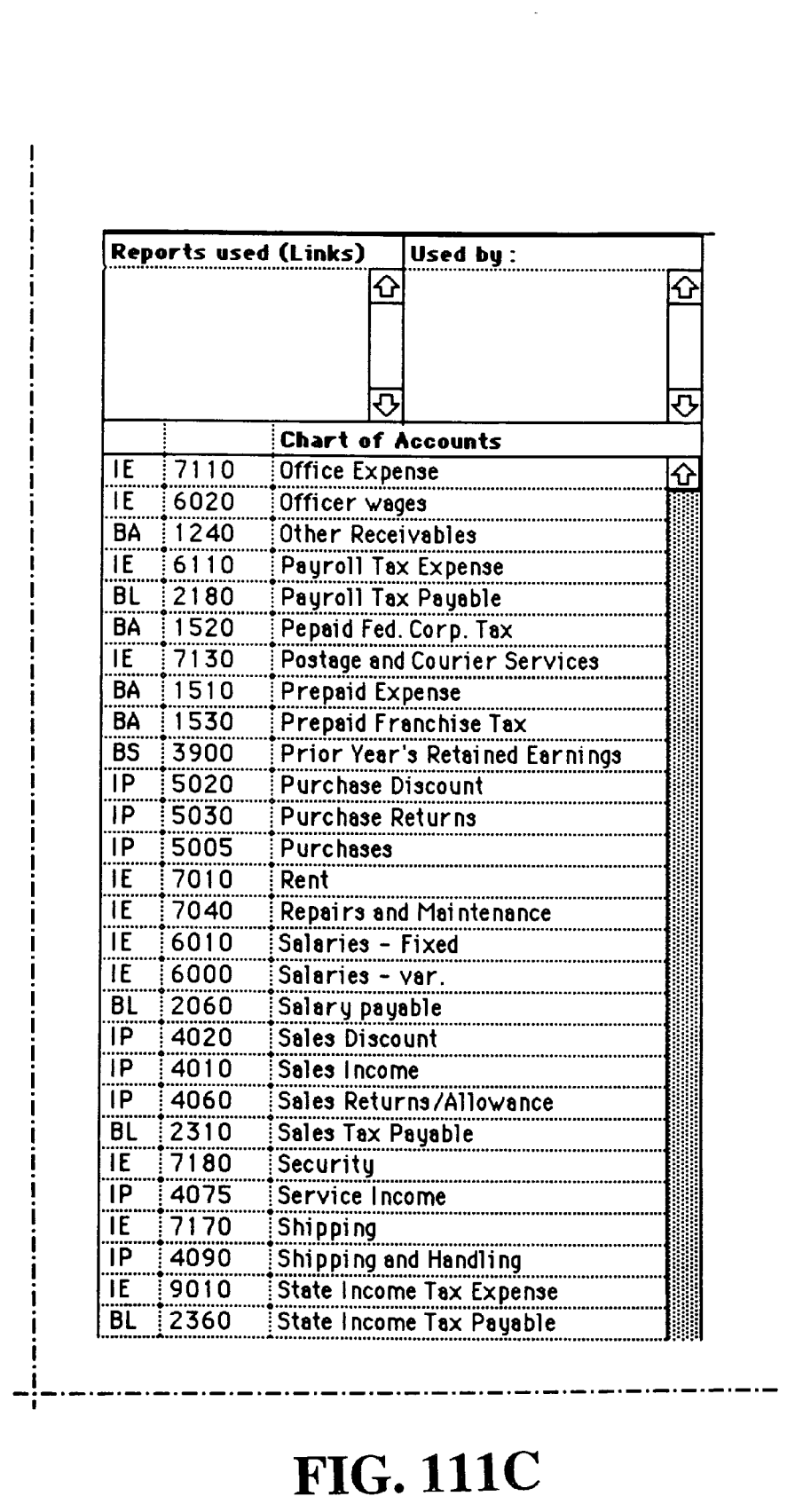

| Reports used (Links) | Used by : |
|---|---|
| | |

| | | Chart of Accounts |
|---|---|---|
| IE | 7110 | Office Expense |
| IE | 6020 | Officer wages |
| BA | 1240 | Other Receivables |
| IE | 6110 | Payroll Tax Expense |
| BL | 2180 | Payroll Tax Payable |
| BA | 1520 | Pepaid Fed. Corp. Tax |
| IE | 7130 | Postage and Courier Services |
| BA | 1510 | Prepaid Expense |
| BA | 1530 | Prepaid Franchise Tax |
| BS | 3900 | Prior Year's Retained Earnings |
| IP | 5020 | Purchase Discount |
| IP | 5030 | Purchase Returns |
| IP | 5005 | Purchases |
| IE | 7010 | Rent |
| IE | 7040 | Repairs and Maintenance |
| IE | 6010 | Salaries - Fixed |
| IE | 6000 | Salaries - var. |
| BL | 2060 | Salary payable |
| IP | 4020 | Sales Discount |
| IP | 4010 | Sales Income |
| IP | 4060 | Sales Returns/Allowance |
| BL | 2310 | Sales Tax Payable |
| IE | 7180 | Security |
| IP | 4075 | Service Income |
| IE | 7170 | Shipping |
| IP | 4090 | Shipping and Handling |
| IE | 9010 | State Income Tax Expense |
| BL | 2360 | State Income Tax Payable |

FIG. 111C

Algorithm of Activity Data

| Major Measuring Category | | | | | | | | |
|---|---|---|---|---|---|---|---|---|
| **Assignment** | Qty by period | $ by period | Time between date | Responsible Dept. | RMA | | Upstream | Downstream |
| | | | | | Day between date | Amt. by period | | |
| **Quotes** | No.,<br>No. convert to MWS | Total amt.<br>Pcost,Scost<br>Install cost<br>Freight cost | Create date<br>Post date<br>Quote date | Sales | V. rec.date<br>V. Ship<br>C.rec.date<br>C. ship<br>Create date<br>Fax | Exp. V.cr.<br>V. cr.<br>C. cr.<br>Rec. cr | Customer | Customer Service |
| **MWS** | Total iems,<br>Total amt | Total amt.,<br>Pcost, Scost,<br>Install cost,<br>Freight cost | Create date<br>Reviewed<br>post date | Sales<br>Customer Service | V. rec.date<br>V. Ship<br>C.rec.date<br>C. ship<br>Create date<br>Fax | Exp. V.cr.<br>V. cr.<br>C. cr.<br>Rec. cr | Customer Service | Purchase |
| **Cust.Inv.** | Total Inv.,<br>Total RMA, # of<br>30days, 45 days, | Total amt.<br>Sprice,<br>Install cost, | Issue date<br>Printed date<br>Paid date | Account<br>Receivable<br>Shipping | V. rec.date<br>V. Ship<br>C.rec.date<br>C. ship | Exp. V.cr.<br>V. cr.<br>C. cr. | Purchase | A/R |

FIG.116A

| | etc. | Freight, Tax | Input | | Create date<br>Fax | Rec. cr | | |
|---|---|---|---|---|---|---|---|---|
| **Ven.Inv.** | Total Inv #,<br>Past due # of<br>invoices - 30, 60,<br>90 days | Total amt.,<br>Vcost,<br>Pcost,<br>Freight,<br>Tax | Received from ven.<br>Ship to cust.<br>Due date<br>Paid date<br>Approved<br>Scheduled<br>Reviewed<br>Entry<br>Create date | Account<br>Payable<br>Engineering | V. rec.date<br>V. Ship<br>C.rec.date<br>C. ship<br>Create date<br>Fax | Exp. V.cr.<br>V. cr.<br>C. cr.<br>Rec. cr | Purchase | A/P |
| **Cust.Cr.** | Total items<br>Credit memo | Total cr.,<br>Sprice,<br>Pcost,<br>Restock, Tax | Create date<br>Issue date | Account<br>Receivable<br>Sales<br>Engineering | V. rec.date<br>V. Ship<br>C.rec.date<br>C. ship<br>Create date<br>Fax | Exp. V.cr.<br>V. cr.<br>C. cr.<br>Rec. cr | Sales | A/R |
| **Ven.Cr.** | Total items<br>Ven.cr. | Total ven. cr.,<br>Pcost, Vcost, | Ven.cr. memo<br>Rcv'd date | Account<br>Payable | V. rec.date<br>C.rec.date<br>V. Ship C. ship | Exp. V.cr.<br>V. cr. | Sales | A/P |

FIG.116B

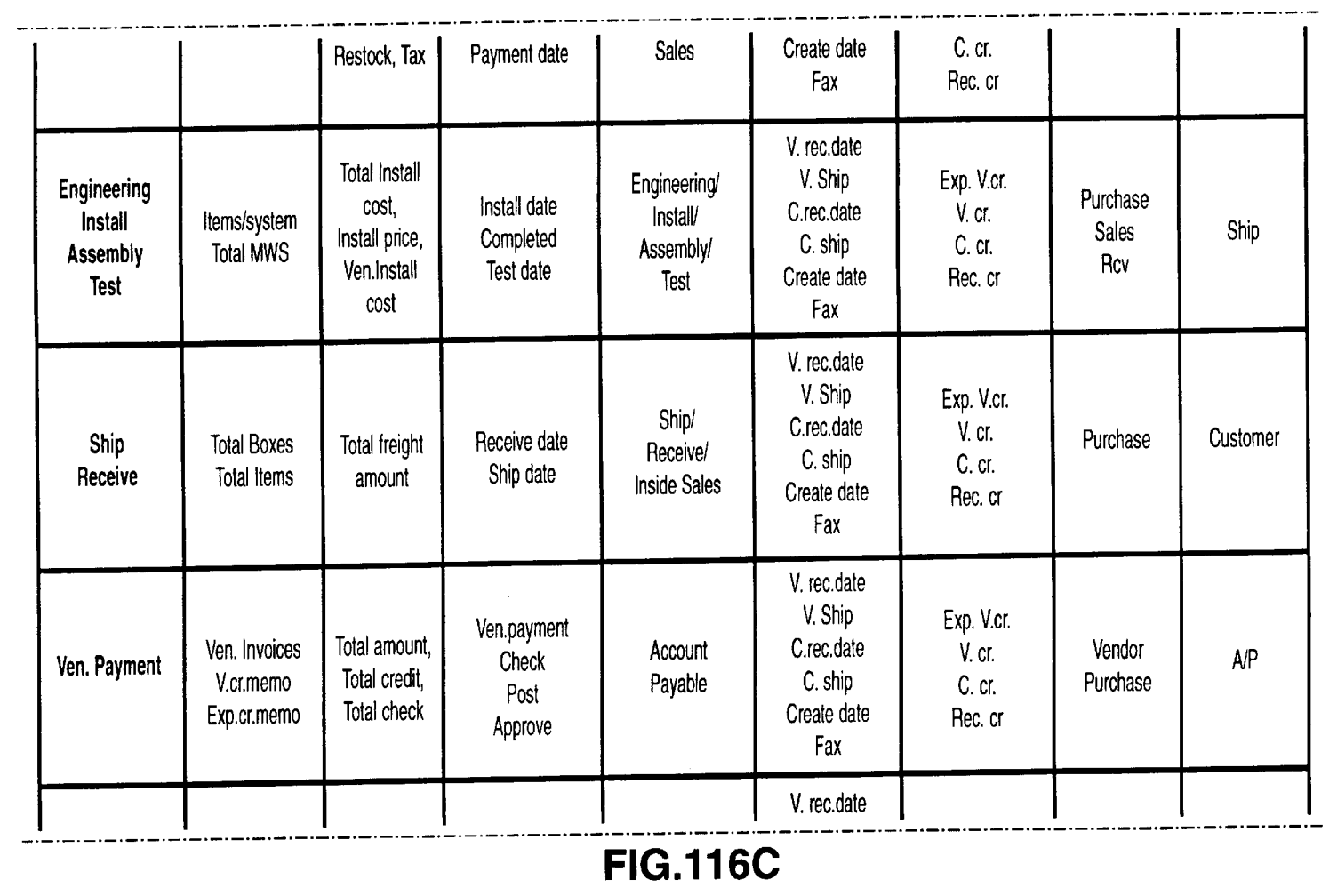

| | | Restock, Tax | Payment date | Sales | Create date<br>Fax | C. cr.<br>Rec. cr | | |
|---|---|---|---|---|---|---|---|---|
| **Engineering<br>Install<br>Assembly<br>Test** | Items/system<br>Total MWS | Total Install cost,<br>Install price,<br>Ven.Install cost | Install date<br>Completed<br>Test date | Engineering/<br>Install/<br>Assembly/<br>Test | V. rec.date<br>V. Ship<br>C.rec.date<br>C. ship<br>Create date<br>Fax | Exp. V.cr.<br>V. cr.<br>C. cr.<br>Rec. cr | Purchase<br>Sales<br>Rcv | Ship |
| **Ship<br>Receive** | Total Boxes<br>Total Items | Total freight amount | Receive date<br>Ship date | Ship/<br>Receive/<br>Inside Sales | V. rec.date<br>V. Ship<br>C.rec.date<br>C. ship<br>Create date<br>Fax | Exp. V.cr.<br>V. cr.<br>C. cr.<br>Rec. cr | Purchase | Customer |
| **Ven. Payment** | Ven. Invoices<br>V.cr.memo<br>Exp.cr.memo | Total amount,<br>Total credit,<br>Total check | Ven.payment<br>Check<br>Post<br>Approve | Account<br>Payable | V. rec.date<br>V. Ship<br>C.rec.date<br>C. ship<br>Create date<br>Fax | Exp. V.cr.<br>V. cr.<br>C. cr.<br>Rec. cr | Vendor<br>Purchase | A/P |
| | | | | | V. rec.date | | | |

FIG.116C

| | | | | | | | | |
|---|---|---|---|---|---|---|---|---|
| **Cust. Payment** | Cust. Invoices<br>C.cr.memo | Total amount | C.payment<br>Check<br>Post<br>Approve | Account<br>Receivable | V. Ship<br>C.rec.date<br>C. ship<br>Create date<br>Fax | Exp. V.cr.<br>V. cr.<br>C. cr.<br>Rec. cr | Ship<br>Sales | A/R |
| **RMA** | Total RMA items | Total RMA<br>credit | RMA V. rcv'd<br>RMA V. ship<br>RMA C. rcv'd<br>RMA C. ship | CSR<br>Sales<br>Ship/Rcv<br>Engineering | V. rec.date<br>V. Ship<br>C.rec.date<br>C. ship<br>Create date<br>Fax | Exp. V.cr.<br>V. cr.<br>C. cr.<br>Rec. cr | Sales<br>Rcv | A/P<br>A/R |
| **Customer** | # of customer | Total $<br>Total $ per<br>cust.<br>% of Avg. of<br>margin | Duration/customer<br>Rate of growth/<br>period | Sales<br>Account | V. rec.date<br>V. Ship<br>C.rec.date<br>C. ship<br>Create date<br>Fax | Exp. V.cr.<br>V. cr.<br>C. cr.<br>Rec. cr | Sales | Purchase<br>Customer<br>Service |
| **Vendor** | # of vendor | Unclear inv.<br>Inv. $<br>Clear inv., % | Duration/customer<br>Rate of growth/<br>period | Sales<br>Account | V. rec.date<br>V. Ship<br>C.rec.date<br>C. ship<br>Create date | Exp. V.cr.<br>V. cr.<br>C. cr.<br>Rec. cr | Purchase | Ship/Rcv<br>Install/<br>Engineering |

FIG.116D

| | | | | | | | | |
|---|---|---|---|---|---|---|---|---|
| | | | | | Fax | | | |
| **Purchase** | Total items<br>Total MWS<br>B/O items | Scost<br>Pcost | Order date,<br>MWS date,<br>Rec'd date,<br>B/O rec'd date,<br>Item order date | A/P<br>Buyer<br>Sales | V. rec.date<br>V. Ship<br>C.rec.date<br>C. ship<br>Create date<br>Fax | Exp. V.cr.<br>V. cr.<br>C. cr.<br>Rec. cr | Sales | Ship/Rcv<br>Install/<br>Engineering |
| **Commission/ earning** | # of format | $<br>Rate of<br>increase | $/period | Sales<br>Purchasing | V. rec.date<br>V. Ship<br>C.rec.date<br>C. ship<br>Create date<br>Fax | Exp. V.cr.<br>V. cr.<br>C. cr.<br>Rec. cr | Vendor<br>Customer<br>Purchase | Customer<br>Service |
| **Financial** | Total V. inv.<br>Total C. inv | Total A/P<br>Total A/R | | Accounting<br>Purchasing | V. rec.date<br>V. Ship<br>C.rec.date<br>C. ship<br>Create date<br>Fax | Exp. V.cr.<br>V. cr.<br>C. cr.<br>Rec. cr | NA | NA |

FIG.116E

Factual Performance Analysis

Single Period

Sales department
Large Acct group
John Doe

☐ Static data - double click for static personal data
☐ Per period (daily)(weekly)(monthly)(quarterly)

| | Productivity (A) | | | Quality (B) | | Profitability (C) | Upstream | Downstream |
|---|---|---|---|---|---|---|---|---|
| Measuring Parameter | Qty/period (A1) | $/period (A2) | % profit/period (A3) | Time period (B1) | Accounting C.Cr. memo (B2) | Gross Margin | | |
| Quotes | | | | PO date<br>Quote date | NA | NA | Customer | Customer Service |
| MWS | | | | Create date<br>Review date | # of invoice /cr.memo | Commission earned<br>Gross margin | Customer | Purchasing |
| RMA | | | | Create date<br>Cust. rec'd date | # RMA return for credit<br># RMA return for exchange | Restocking fee<br>Partial vendor cr.memo | Inside Sales | Purchasing<br>Receiving |

FIG.119A

| Measuring Parameter | A/B/C | A/B/C | A/B/C | A/B/C | A/B/C | A/B/C | | | | | | |
|---|---|---|---|---|---|---|---|---|---|---|---|---|
| Quotes | A/B/C | A/B/C | A/B/C | A/B/C | A/B/C | A/B/C | | | | | | |
| MWS | A/B/C | A/B/C | A/B/C | A/B/C | A/B/C | A/B/C | | | | | | |
| RMA | A/B/C | A/B/C | A/B/C | A/B/C | A/B/C | A/B/C | | | | | | |

Select: A1, A2, A3, B1, B2, C

FIG.119C

Factual Performance Analysis

Sales department
Large Acct group
John Doe

☐ Static data - double click for static personal data
☐ Per period (daily)(weekly)(monthly)(quarterly)
(Choose a period)

| | Period #1 | Period #2 | Period #3 | Period #4 | Period #5 | Period #6 | % growth between period | Avg | Goal | History | Grade | Forecast |
|---|---|---|---|---|---|---|---|---|---|---|---|---|
| Measuring Parameter | A/B/C | | | | | | | | | | | |
| Quotes | | | | | | | | | | | | |
| MWS | | | | | | | | | | | | |
| RMA | | | | | | | | | | | | |

FIG.120A

Update invoice

Mark ready for review

Get ready to review
Mark reviewed
Get reviewed

Get Tracking
Mark for Tracking
Remove tracking
Tracking notes

FIG. 125D

Get AR Report selection
Get Not Issued
Get not paid
Get no charge
Get pre-paid

Close - No charge

Split Invoice

Join 2 Invoices

Issue Invoices

FIG. 126B

INTEGRATED BUSINESS-TO-BUSINESS WEB COMMERCE AND BUSINESS AUTOMATION SYSTEM

BACKGROUND OF THE INVENTION

This application include a microfiche appendix containing a database structure diagram made up of 50 sheets 20 frames.

1. Field of the Invention

The present invention relates to business-to-business Web commerce and to business automation systems.

2. State of the Art

Web commerce may be defined as the use of a computer network, such as the Internet, to do business, such as buy and sell products or services. Although Web commerce is still in its infancy, relatively speaking, Web commerce is predicted by some to soon become the dominant mode of business practice. Web commerce allows business to move much more quickly, without the burden and cost of paperwork.

Despite the promise of Web commerce, current Web commerce software is typically of very limited capability. Most Web commerce is consumer-oriented rather than business-oriented. The tacit assumption is that the purpose of the Internet should be to enrich people's personal lives more than to enable business to move at light speed. Furthermore, typically each transaction is treated in isolation. No on-going course of business is assumed or facilitated.

Material management functions such as procurement represent a substantial expense and burden for medium and large businesses. Purchases are typically subject to approval at multiple levels. In the case of the purchase of a computer, for example, an employee might submit a purchase request to the employee's supervisor, who might approve the request and forward it to the MIS (Management Information Systems) department, which might approve the request and forward it to accounting for budgetary approval. The real cost of such a process is estimated to be as much as $100 per purchase request. Furthermore, the time required for such a process to be completed may be weeks or months. In the meantime, productivity may suffer.

Purchasing, moreover, is only part of the larger problem of material management. Once materials have been procured, typically they must be tagged, tracked and accounted for, both physically and in accounting terms such as depreciation, etc. The latter activities may either be conducted in an organized fashion, often at considerable expense, or haphazardly, with marginal effectiveness.

Existing Web commerce software is likewise fraught with problems for the selling company. When an order is placed through the Web, it typically results in a fax or email, information from which must be manually entered into an internal sales system that may or may not be linked to other closed systems such as accounting, human resources, purchasing, assembly, etc. Hence, once the entry is made, depending on the degree of automation, additional manual intervention may be required to achieve the desired final result, e.g., ship a product to a customer. The purchaser is typically unable to determine the status of an order without placing a call or sending an email. Moreover, order fulfillment is again only a part of the larger problem of total customer satisfaction (which is in turn only a part of the larger problem of running a successful, profitable business). Returns are bound to occur and must typically be handled manually, typically by a Return Merchandise Authorization (RMA) or traffic department. Also, some fraction of shipments are bound to be lost or damaged. Related insurance claims typically must also be handled manually both by the traffic and accounting departments. Even though the foregoing activities are closely related functionally, the mechanisms for handling these activities, whether manual or automated, are often ad hoc.

On a business-wide scale, the same is largely true: the various activities of the business, while they may be separately automated, are not automated in a unified, synergistic fashion. Most often, different departments each have separate database systems with the departments being linked by a local- or wide-area network. A person in one department obtains information from a different department by sending an email and requesting a report. Referring more particularly to FIG. 1, in accordance with a typical model of business automation, various departments (e.g., sales, sales support, customer service, accounting, purchasing, receiving, engineering, assembly, shipping) are separately automated but linked together by a computer network (e.g, LAN, WAN). Each department interfaces to multiple different departments in an essentially manual fashion but using modern electronic communications tools—phone, fax, email, computer hardcopy, etc. Comparison of the resulting overall business process to a Rube Goldberg invention is apt, if mildly exaggerated. The process entails repeated transmission of duplicate information to different departments and repeated transmission of additional information and instructions to different departments on an as-needed basis. The party transmitting the information controls the amount and quality of information conveyed. The party receiving the information has no control over the information or the quality of the instructions received but rather is entirely dependent on the party transmitting the information. Duplication occurs both within departments and between departments. An external influence to the system (a call from a customer or vendor, a new customer account, a ruffled employee) can and often does cause a flurry of activities, but often produces less-than-commensurate positive results because of the inherent inefficiency of the system. The process, because it is ill-defined, is not easily reversible when an error has been made.

The foregoing model results in the fragmentation of information—"the right hand does not know what the left hand is doing." Information is transported from one place to another, either in hardcopy form, necessitating re-entry, or in such electronic form as to require substantial massaging, and with substantial latency such that by the time the information is to be used it is already outdated. A business executive, for lack of readily-available, accurate, verifiable information in usable form, must then rely heavily on subordinates to obtain a picture (hopefully accurate) of what is happening inside the company. Considerably employee time may be spent gathering historical data to satisfy the need for management information. The same factors that hamper management performance may also cause performance at lower levels within the company to suffer. Employees may lack timely information regarding critical tasks that need to be performed. For lack of timely information regarding returns, for example, or some other aspects of operations, accounting personnel may pay invoices that should in fact not be paid.

The lack of readily-available, verifiable information in usable form is most pronounced in relation to financial information. In the case of a sales company doing a substantial volume of business, for example, preparation of a state sales tax return may take ten man-days or more. An audit may take a similar amount of preparation. Closing the books on an accounting period is itself an arduous task. The time requirements and challenges posed by month-end and year-end closings are all-too-familiar to virtually all in-house accountants. Despite these heroics, the inherent latency of the process diminishes the value of the results. A finalized June statement, for example, might be received at the end of July or the beginning of August, hampering the ability to react quickly to changing business conditions.

For lack of readily-available, verifiable information in usable form, employee evaluation is often performed more on the basis of perception than objective reality. The appearance of performance then becomes at least as important as real performance. Employee performance and employee morale may suffer as a result.

Numerous "high-power" database application software packages exist in the marketplace, from such industry leaders as SAP, Peoplesoft, BAAN, and Oracle. The solutions of each of these vendors have strengths and weaknesses. SAP, for example, although strong in the area of fixed asset management and financials, does not provide shipping and receiving functions. To automate these functions requires the use of separate software. Furthermore, Web integration is problematic. BAAN is strong in the areas of shipping/receiving, manufacture and assembly, but is limited in the areas of fixed asset management and material handling. In particular, BAAN is bound by conventional notions of real inventory—an item must physically be in stock before it can be ordered (as contrasted with the concept of virtual inventory, explained more fully hereinafter). Peoplesoft offers strong human relations functions but is not strong in "back-end" functions. Software packages from Peoplesoft and BAAN are therefore often linked together to provided a more complete solution. Similarly, software from SAP may be linked to software from BAAN. Oracle offers discrete modules for almost all of the functions offered by the other software packages. The modules must be linked together in a laborious process, however. None of these software packages have a Web-centric design, nor has any been used to successfully implement an automatic ene-to-end business process, even in large corporations having no lack of resources.

Web-centric "e-business solutions" are offered by Pandesic (Intel and SAP), Actra (Netscape) and other (typically early-stage) companies. In the case of Pandesic, early promotional materials indicate a distinct consumer orientation as opposed to business-to-business. A conventional real inventory model is followed in which product must be warehoused and on-hand in order to allow the product to be ordered. Furthermore, Web operations are segregated from non-Web operations, necessitating duplication. In the case of Actra, a portfolio of commerce software, including legacy application integration modules, are designed to "bridge gaps between enterprises and applications," enabling business-to-business transactions, buyer-side and seller-side procurement, consumer on-line Internet storefronts, and commercial Internet publishing. This "gap-bridging" approach likewise entails substantial duplication.

Dell and Cisco each sells computer and networking equipment directly to consumers over the Web using configuration and order software developed by outside third parties. Business-to-business features, such as invoices, RMAs (particularly automatic "instant" RMAs) are lacking. The software does not provide an end-to-end Web-business solution.

A need therefore exists for software that enables end-to-end, business-to-business Web commerce and that automates to the greatest degree possible, in a unified and synergistic fashion, the various aspects of running a successful and profitable business. The present invention addresses this need.

SUMMARY OF THE INVENTION

The present invention, generally speaking, provides software that enables end-to-end, business-to-business Web commerce (Web business, or e-business) and that automates to the greatest degree possible, in a unified and synergistic fashion and using best proven business practices, the various aspects of running a successful and profitable business. Web business and business automation are both greatly facilitated using a computing model based on a single integrated database management system (DBMS) that is either Web-enabled or provided with a Web front-end. The Web provides a window into a "seamless" end-to-end internal business process. The effect of such integration on the business cycle is profound, allowing the sale of virtually anything in a transactional context (goods, services, insurance, subscriptions, etc.) to be drastically streamlined. In the case of a just-in-time product reseller, for example, a comprehensive product list is updated electronically in real time or at regular intervals from various sources (e.g., by file download, over the Web, or from CD or floppy distributions or other media or even manual input). A graphical Web interface allows a user to obtain a quote based on the product list. The quote is assigned a quote number and saved in the DBMS and may be retrieved and viewed at a later date. Based on the quote, a user with appropriate Web-verifiable authority may place an order on behalf of a company in accordance with a pre-existing agreement with the company. An employee of the seller, using the same DBMS, purchases product to fill the order. When the product is received, information regarding receipt of the product is entered into the DBMS. Orders are assembled, shipped and billed, all using the same DBMS. Customers can retrieve previous quote records and view order and shipment status via the Web. Customer invoices are automatically generated upon shipment. When a customer payment is received, details concerning the payment are entered into the DBMS. Vendor invoices and payments are also handled using the DBMS, and both customers and vendors can view payment status—invoice, credit (from returns), etc.—via the Web, allowing paper invoice copies to be dispensed with if desired. Returns are provided for and may be return of an entire piece of equipment or replacement of a warranted component part, and replacements may be electronically tracked. Parts tracking saves employee time that would otherwise be spent responding to customer inquiries, and also contributes to customer satisfaction through the convenient availability of timely information.

Throughout the foregoing process, a nightly update process is performed in which consistency checks are performed and in which accounting information (including sales tax information) is collected, journal entries made, and general-ledger entries posted. When records are edited, they are flagged to be checked during the nightly update so that adjusting entries may be made if necessary. At any time, the update process may be run and an accounting period closed. Real-time, audit-ready financial information accurate up to the day or up to the hour is available within minutes at the touch of a button without the need for a highly-trained accountant. A novice can perform many of functions typically performed by accountants, with periodic review and supervision by an accountant. Because the DBMS is Web-enabled, given the appropriate privileges, a complete up-tothe-minute view of every aspect of a business is available from anywhere in the world. Telecommuting is greatly facilitated, with its attendant cost savings. Furthermore, factual evaluation of employee performance, whether of a telecommuting employee or an office-based employee, is greatly facilitated by statistical analysis of accumulated historical performance data (tasks, projects, assignments, reports).

Driven by the goals of enabling widespread telecommuting and global cyberspace trading, the single database business process software provides parallel information access to all users. All users have access to all information except information determined by management to be of a confidential nature. The system provides built-in assurance of prioritized workflow and best business practice (the optimum known way that a business process should flow) based on self-correcting business knowledge algorithms. The system draws upon a knowledge base to prevent mistakes anticipated by the software designer as well as mistakes that have occurred in the past and have been corrected for by adding to the knowledge base, which is continually accumulating. (In the case of conventional programs, program rewrites often result in both improvements and decided slips backward.) The system lists and prioritizes uncompleted work that needs to be followed up. All user activities are tracked, and users are held accountable. Every activity performed by users are tracked statistically. Problem sources may therefore be identified. Precision training and factual performance review are made possible, significantly empowering users in their assignments.

The software provides for business scalability (as opposed to mere data processing scalability), minimizing the growing pains experienced by rapidly growing companies. In growing companies, as the responsibility for a process becomes divided among more and more people, becoming more and more diffuse, communication between group members becomes more and more difficult and the process becomes increasing difficult to manage. The present invention, in particular, makes workflow and work quality substantially immune to changes in the number of employees and the experience level of employees. Work discipline and organization is enforced by, and teamwork and communication between users facilitated by, the database. The ease of use of the database system and the knowledge base incorporated within the system minimizes the need for extensive employee training and allows for flexible employee roles. Business scalability also entails dramatically increased productivity through automated computer assistance, allowing business growth to greatly outstrip personnel growth. One example of business scalability is in the area of purchasing. Orders are grouped for purposes of purchasing such that the number of purchase orders to vendors does not increase as the number of orders received.

Conceptually, the invention allows for the integration and time-scale compression of what have heretofore been largely independent, human-dependent business processes. Business processes have typically been organized into separate business domains, chiefly including a products domain (e.g., engineering, manufacturing, purchasing, shipping, receiving, returns), a payments domain (e.g., accounts receivable, accounts payable), a financial performance domain (e.g, general ledger, financial statements, tax returns) and a personnel domain (e.g., employee evaluation). In accordance with one aspect of the invention, files for the automation of these various business domains are integrated as part of a single database schema within a single database management system run on one or multiple servers. There results a very tight integration of the foregoing activities and other derivatives of those activities such as product forecasting and cash-flow analysis. In particular, a universal financial report and trend report generator provides for general single or multiple General Ledger (GL) account code analysis including sales, cash flow and material.

Time-scale compression of the resulting integrated business automation process is achieved in two ways. First, the single database management system is Web-enabled, providing access anytime, anywhere. Second, triggers within the single database management system propagate activity from one business domain to a succeeding business domain (e.g., from shipping in the products domain to accounts payable in the payments domain) without duplication of human efforts. Data can only be entered once and is not ordinarily allowed to be changed or re-entered. Data entry is guided by a built-in best-practice knowledge base.

The integrated business automation process may be easily modularized if desired by restricting access to only files belonging to selected business domains. Hence, unlike conventional business automation suites that provide separate software modules that may be acquired separately and linked together, in the case of the present integrated business automation process, a customer receives everything but may only pay for be given access to a subset of files—e.g. AP/AR files. Later the customer may decide to pay for added capabilities. Such a change in capabilities may be readily administered remotely through the Web. In this manner, the customer is able to “pick and choose” the capabilities that the customer wants to use.

An outside Web user may also pick and choose the capabilities that the user wants to use. For example, orders may be placed by phone or fax but tracked via the Web. Or a user may use the Web only to check the amount owed on open invoices. Others user may use the Web from start to finish, to order products, track orders, track payments, etc.

Extensive measures are taken to ensure that the integrated business process is, to the greatest extent possible, error-free. Only a limited number of controlled entry points to the system are provided. At each entry point, entry validation is performed at the time of entry. Because the business process is integrated, validation may be more extensive and hence more effective than in typical systems. A nightly update process is also performed is which checks are made, including cross-checks between records of files belonging to different business domains. The system is in effect a closed system where all entries must balance appropriately. The nightly update is able to catch and flag errors (or possible errors) that may have occurred despite entry validation, including hardware or system errors, software bugs, and human errors. As errors become apparent that have escaped detection by the system, the foregoing mechanisms may be readily revised to prevent future such occurrences. Programmed process intelligence therefore continually increases as errors are detected, flagged, and trouble-shooted so as to add to the wealth of the knowledge base and improve the process methodology.

The integrated processes also automates returns and credits both on the customer side and the vendor side. Returns and credits may be necessitated by user errors that go undetected by the system, by overcharges for freight, or numerous other circumstances. Return requests, Return Merchandise Authorizations, credit memos and accounting adjustments may all be handled electronically.

BRIEF DESCRIPTION OF THE DRAWING

The present invention may be further understood from the following description in conjunction with the appended drawing. In the drawing:

FIG. 7, including

FIG. 10 is an illustration of a Products and Quotes screen display in accordance with an alternative Web user interface design;

FIG. 20 is an illustration of a further installation screen display;

FIG. 30 is an illustration of a further Tracking screen display displaying ship-to address information;

FIG. 36 is an illustration of a Tracking—Product Return History screen display;

FIG. 43 is an illustration of a Vendor Invoice Search Option screen display;

FIG. 44 is an illustration of a Vendor Invoice Detail screen display;

FIG. 60 is an illustration of a Sales-MWS screen display;

FIG. 81 is an illustration of a Web page used to automatically provide a customer with an RMA number in accordance with the foregoing automatic approval process;

FIG. 92 is an illustration of a Daily Vendor Verification screen display;

FIG. 119 is an illustration of screen displays used to display factual performance analysis results in accordance with an exemplary embodiment of the invention;

FIG. 120 is an expanded view of the multiple period screen display of FIG. 119;

FIG. 121 is an illustration of a dialog displayed as a result of qualification of user inputs during the course of adding invoices;

FIG. 122 is an illustration of a further dialog of a similar type as that of FIG. 121;

FIG. 123 is an illustration of yet a further dialog of a similar type as that of FIG. 121;

FIG. 124 is a partial illustration of a pop-up menu of options available during vendor invoice display;

FIG. 125 is a partial illustration of a pop-up menu of options available during vendor invoice display, showing options not shown in FIG. 124;

FIG. 126 is an illustration of a pop-up menu of options available during customer invoice display;

FIG. 127 is an illustration of a pop-up menu of options available during display of items sold;

FIG. 128 is an illustration of a pop-up menu of options available during display of sales records; and FIG. 129 is a block diagram illustrating a knowledge base, the expression of the knowledge base in screen displays of the present system, and a manner in which the knowledge base is increased.

DETAILED DESCRIPTION OF THE PREFERRED EMBODIMENTS

Architecture

Figure 2:
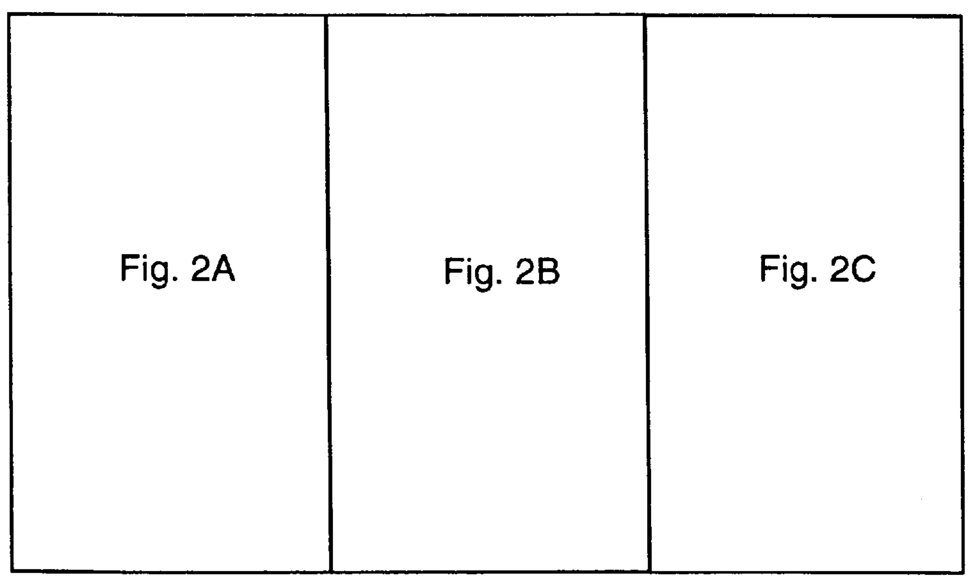
FIG. 2 is a block diagram illustrating conceptually an automated business process in accordance with the present invention.
Figure 2A:
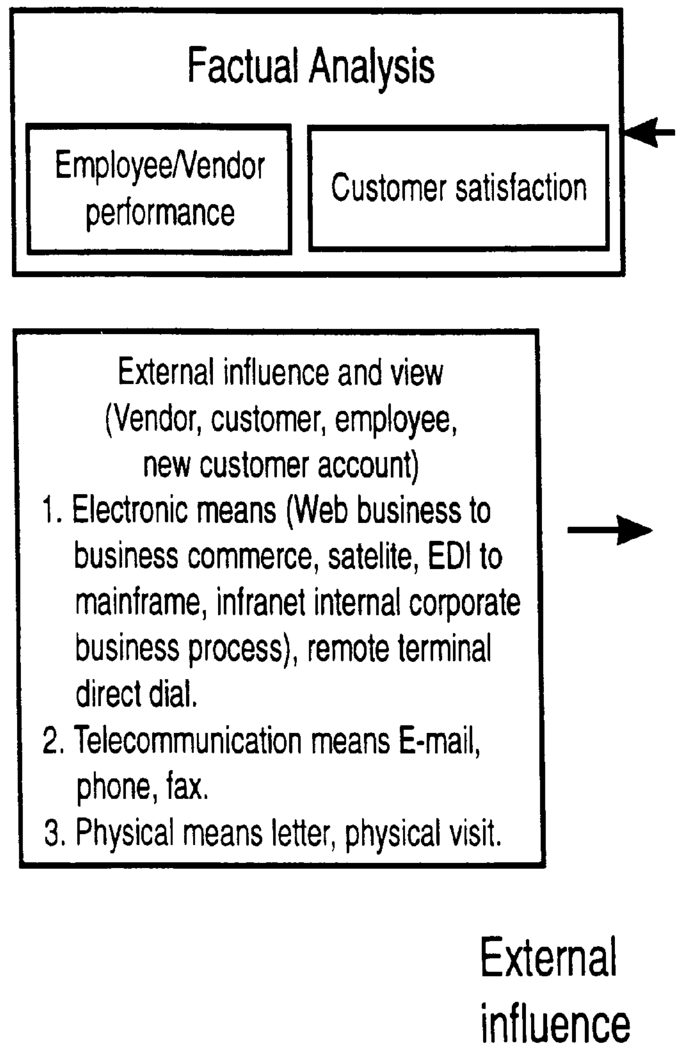
Figure 2B:
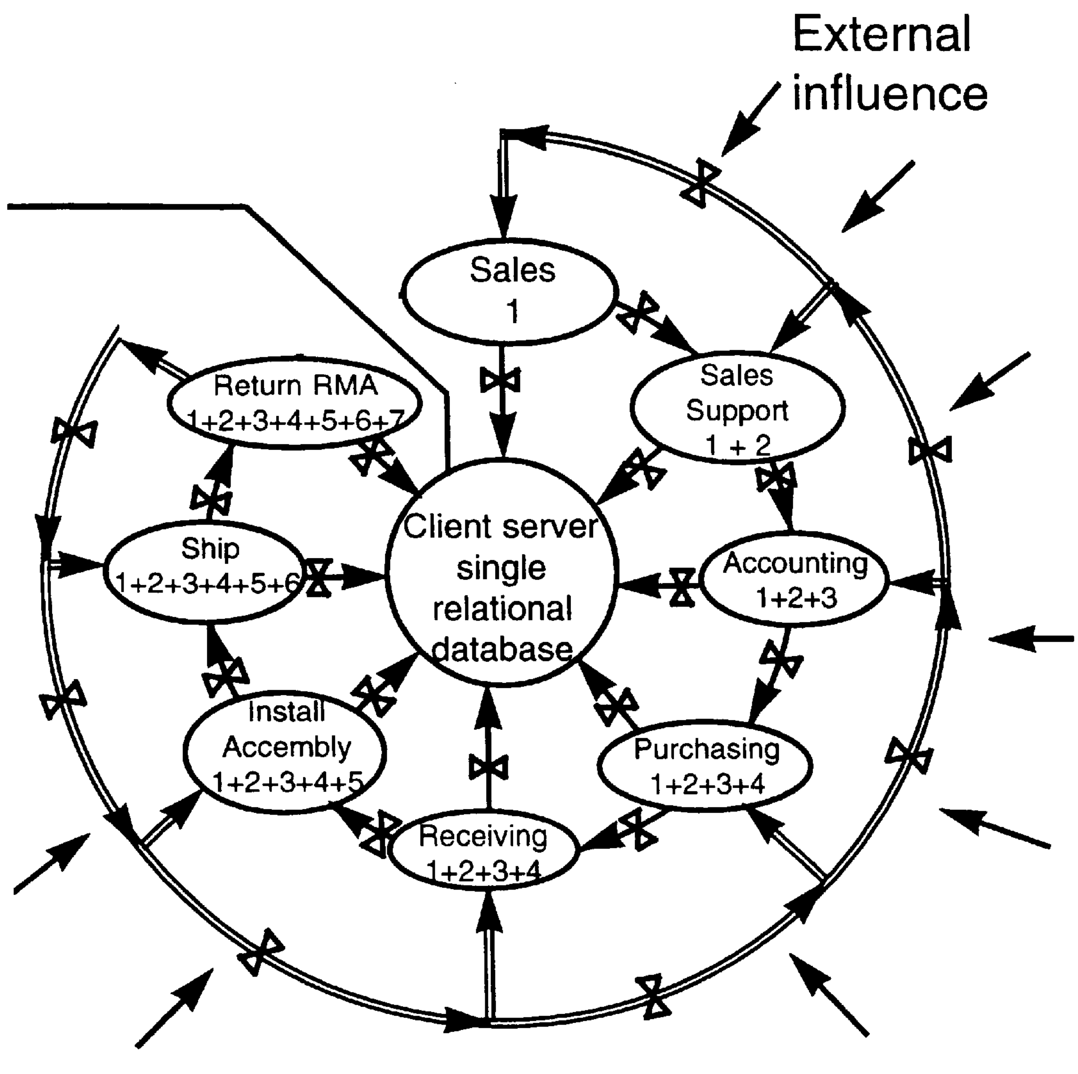

Referring now to FIG. 2, the present automated business process may be imagined as a kind of information assembly line. A first system user, or "information worker," having for example a Sales assignment or activity focus, initiates an automated, end-to-end business process by entering information into a client/server single relational database, which forms a common hub of the automated business process. The user's entry is qualified, or "quality checked," as represented by a checkvalve. Such qualification is "experiential," i.e., derived from actual business experience, and differs qualitatively from the type of data validation typically performed in database systems. If the user's entry fails scrutiny by the system, it cannot be committed to the database. Similarly, the business process cannot continue to the next user. As a result in part of such experiential qualification, verifiable and usable management and enterprise information may be made readily available.

In the case of conventional systems, by contrast, a team of software engineers write an application based on input from groups of users from different departments. The users, however, cannot anticipate the need for various features prior to using the software. Furthermore, the conception of the programmers may often differ significantly from that of the users. The result often leaves much to be desired. Updates are delayed until the next version of the software, at which point the same cycle repeats. Meanwhile, users suffer. Furthermore, because different users have different concerns, little consideration is given to the up-stream and down-stream effects of different user's actions. There results a "disconnect" between the behavior of the system and day-to-day real-world needs.

In the present system, qualification of user inputs has multiple facets. First, each user is accorded limited access privileges. An authority check is therefore performed to ensure that the user is authorized to make the entry being attempted. Second, the entry is checked in accordance with business rules that embody best practice as determined from an analysis of expected parameters and how various values of those parameters affect possible outcomes downstream. Thirdly, entries, even after then are committed to the database, are subjected to intelligent consistency checks in order to detect discrepancies and provide feedback to allow for correction. If input qualification is successful, then succeeding events in the sequential business process are triggered.

Each worker in turn builds upon the information base established by preceding workers, and each workers entries are rigorously qualified. For example, following sales, process flow may continue to Sales Support, Accounting, Purchasing, Receiving, Assembly, and Shipping.

During the process external influences occur. An external influence may be a communication from a customer or vendor, for example, to either convey information or to view information stored in the central database. Information may be conveyed by electronic means (e.g., Internet, intranet, EDI, satellite, remote terminal direct-dial), human-mediated telecommunications (e.g., email, phone, fax), or by physical means (letter, visit, etc.).

Figure 1:
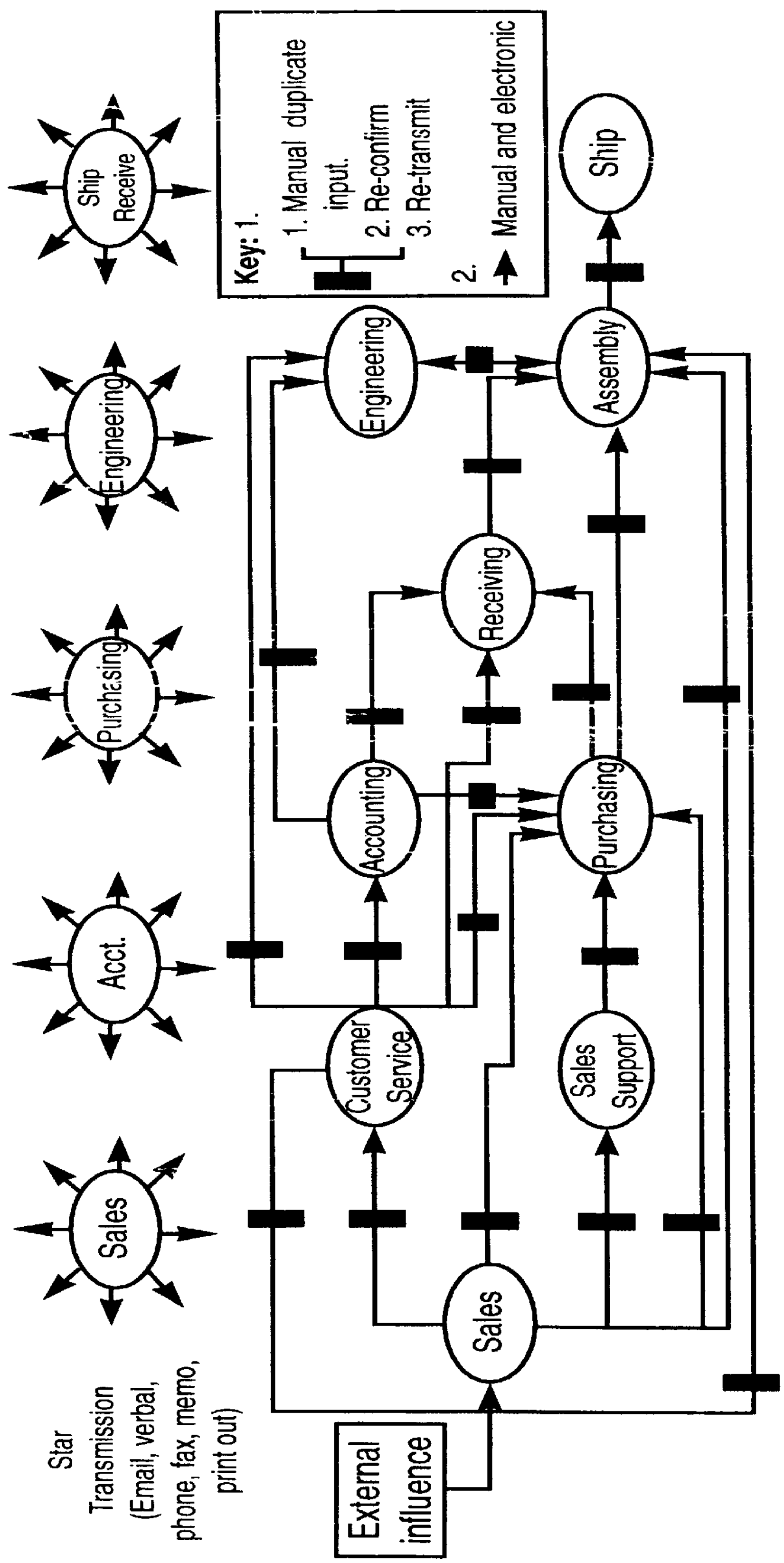
FIG. 1 is a block diagram illustrating conceptually a conventional business process.

As compared with the conventional business process of FIG. 1, the circular automated business process of FIG. 2 revolves around a single integrated database that accumulates information regarding every important activity of every user and defines a non-repetitive process. Furthermore, as compared to the essentially non-reversible process of FIG. 1, the process of FIG. 2 is reversible. As seen in FIG. 2, following Shipping is a Return/RMA (Return Merchandise Authorization) activity. This activity enables the forward process to be reversed, or backed out of step-by-step, as part of the overall automated business process.

The cumulative nature of the database of FIG. 2 and the sequential nature of the business process enables incisive factual analysis in the areas of employee/vendor performance and customer satisfaction, promoting fairness and personal responsibility. Whereas a human supervisor may effectively supervise only a limited number of employees, the database-implemented business methodology of FIG. 2 provides for each employee what may be regarded as a "virtual mentor." the user is guided during use of the system to prevent common mistakes (in fact, all mistakes made collectively by the all of the user's predecessors functioning in the same assignment), and the user's performance is continuously tracked and made accessible. Strengths and weaknesses in the employees performance may recommend certain changes in assignments—which changes may be made relatively easily by the employee because of the intuitiveness and intelligence of the system. This virtual mentoring process, described in greater detail hereinafter, promises to make the virtual office and telecommuting, with all its attendant advantages, a practical reality for a much wider segment of the workforce.

Figure 3:
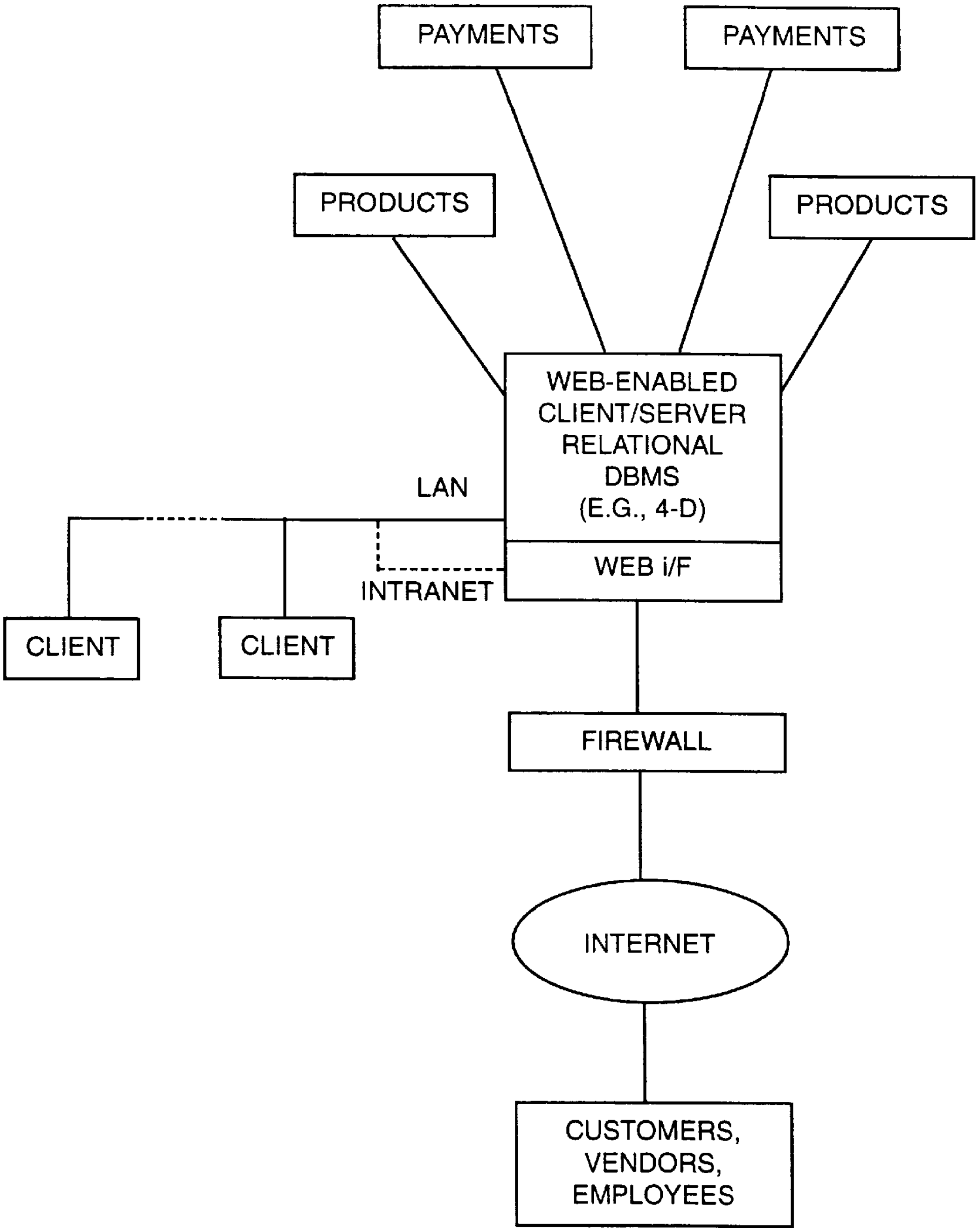
FIG. 3 is a generalized block diagram of a system for business-to-business Web commerce in accordance with an exemplary embodiment of the invention.

Referring now to FIG. 3, a block diagram is shown of a computing environment in which the present invention may be used. A Web-enabled, client/server relational database management system (DBMS) is provided storing a database including files belonging to different business domains, e.g. a products domain, a payments domain, a financial performance domain and a personnel domain. (The term "product" is used generically herein to refer to items sold and may be tangible goods, financial products, subscriptions—anything that may be bought and sold in a discrete transaction.) Also provided are code modules pertaining to each of the different domains. Customers and vendors may obtain access to the database through the Internet or the like. The physical location of the database therefore becomes irrelevant—the database can be everywhere in the world, either through wired communications or wireless communications. A firewall (or other security scheme, such as encryption, implemented in either hardware or software) may be provided between the Internet and the Web interface of the DBMS. Internal clients may be connected to the DBMS through a local area network (LAN) or through an intranet, using the Web interface.

Web User Interface

The Web interface to the database, particularly as seen by the customer, will presently be described in greater detail.

Figure 4:
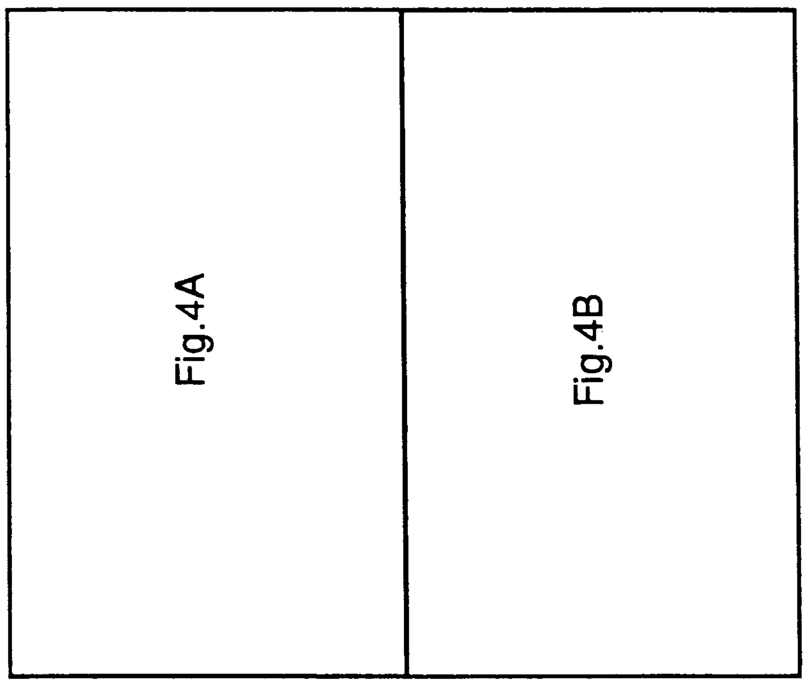
FIG. 4 is an illustration of a Web Products Search screen display.
Figure 4A:
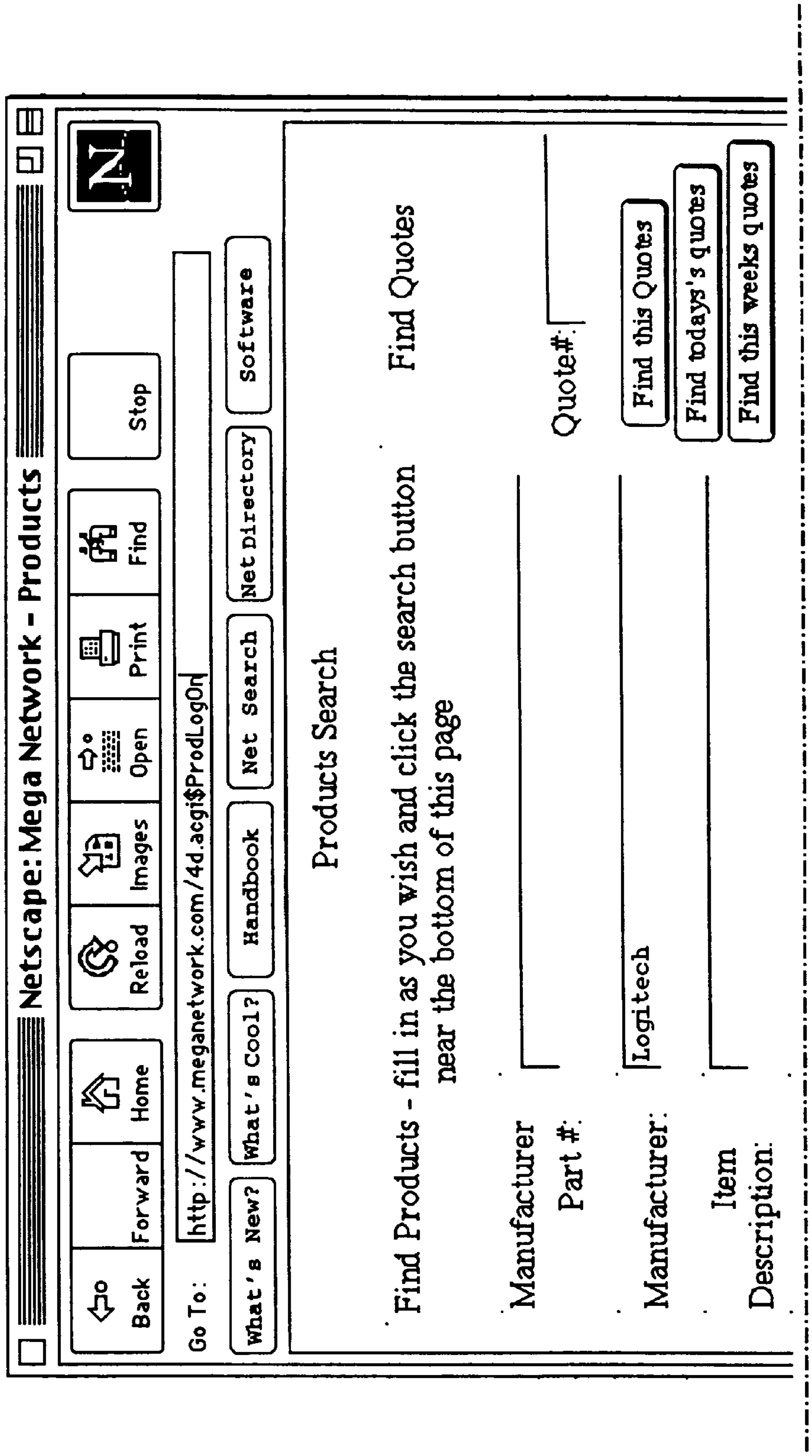
Figure 4B:
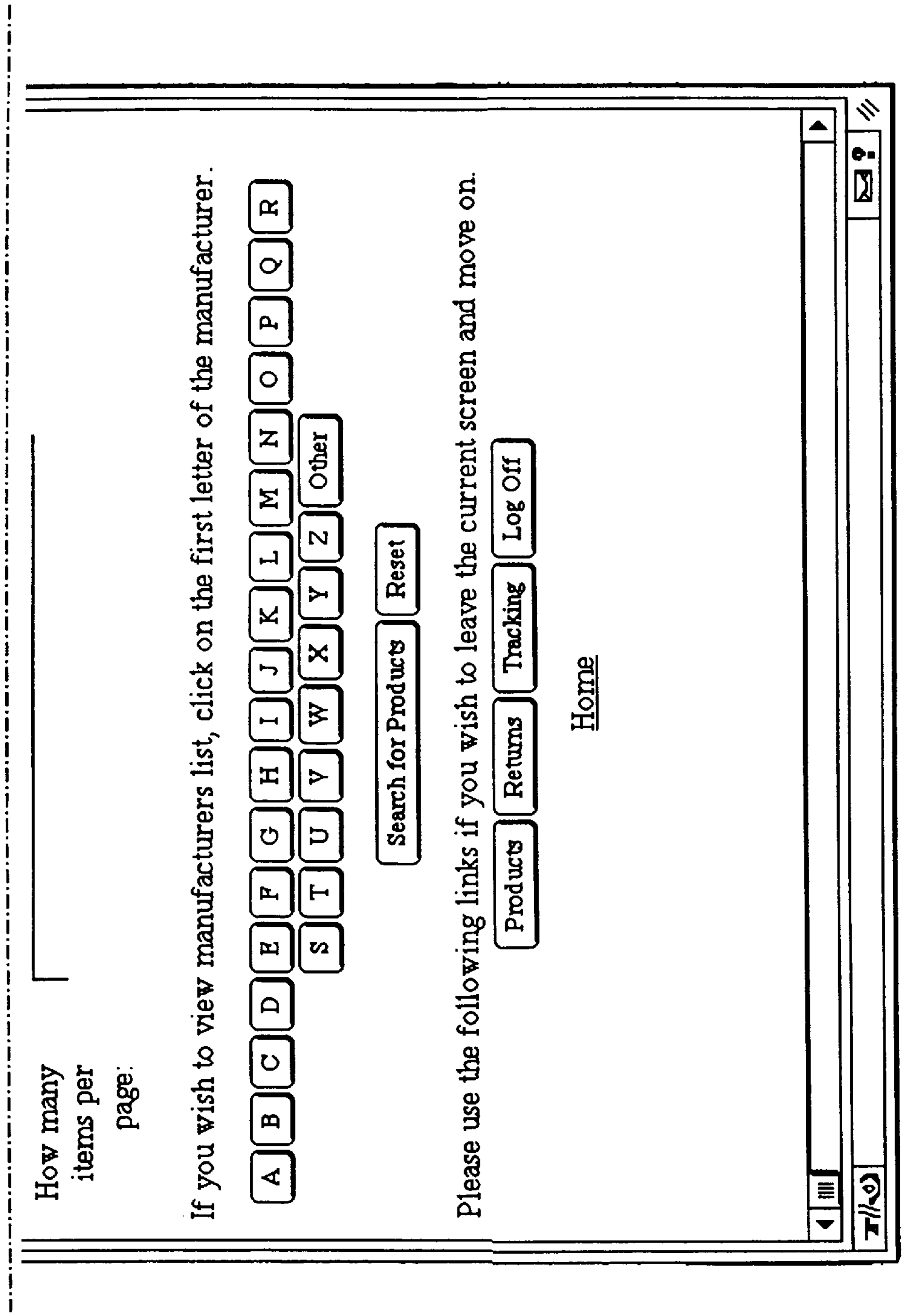

Referring now to FIG. 4, an illustration is shown of a products search screen display. From the products search screen display, the user is able to fill in various fields (e.g., Manufacturer, Manufacturer Part#, Item Description) to find products within the database. To view a manufacturers list, the user clicks on the first letter of the name of the manufacturer.

The user is also able to find earlier quotes. A user obtains a quote in a manner described below. Buttons are provided to find a quote by quote number, to find quotes for the current day, or to find quotes for the current week.

Figure 5:
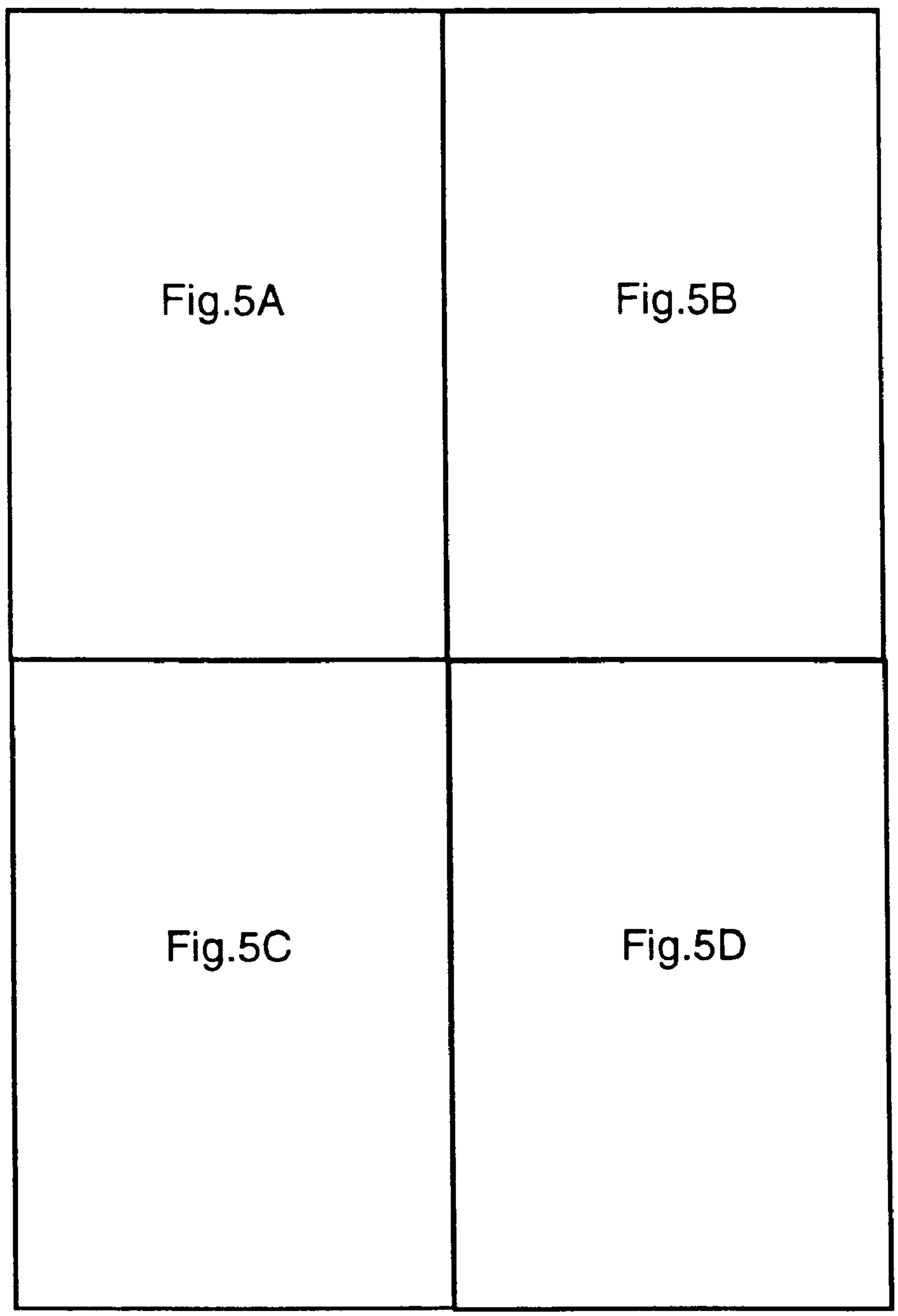
FIG. 5 is an illustration of a Web Product List screen display.
Figure 5A:
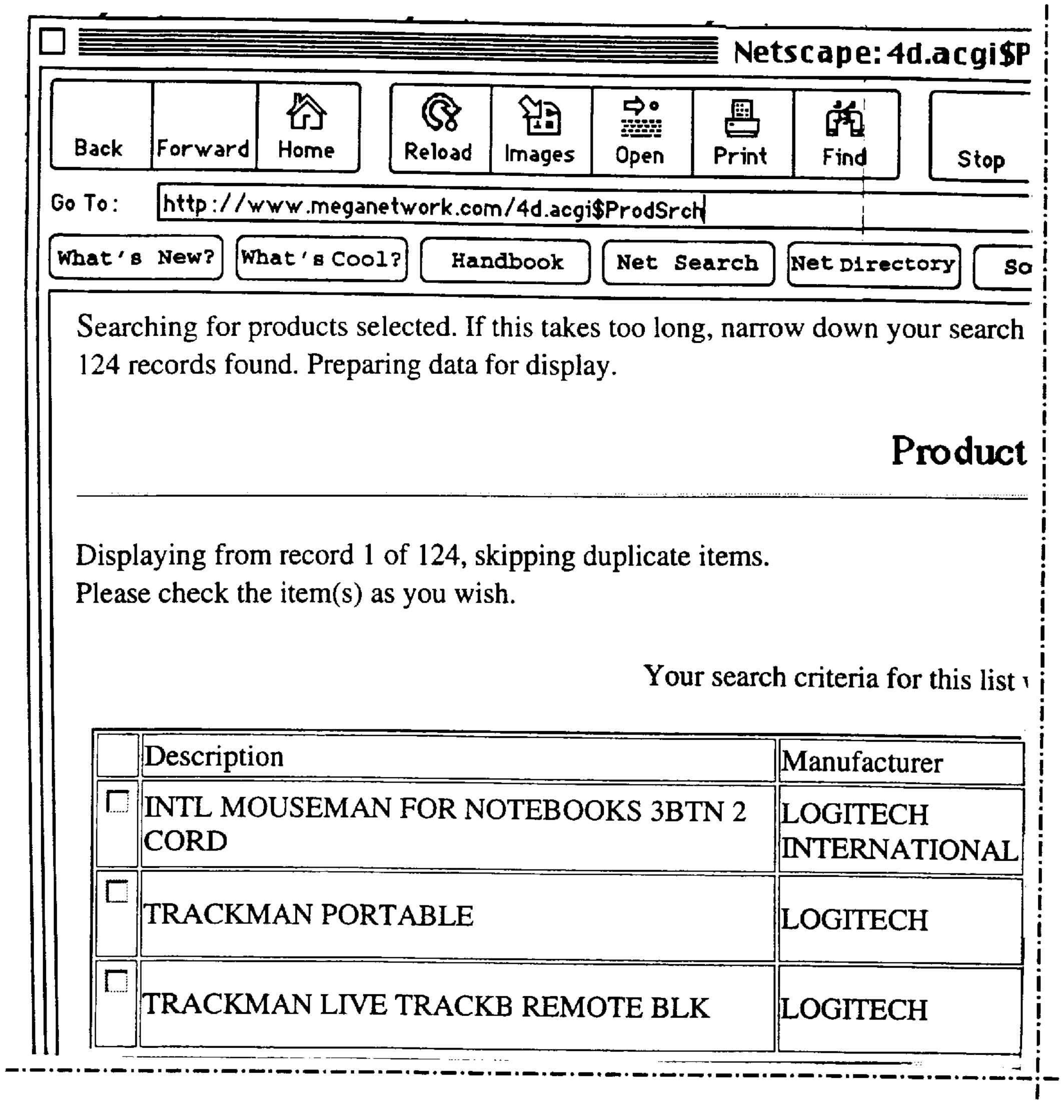
Figure 5B:
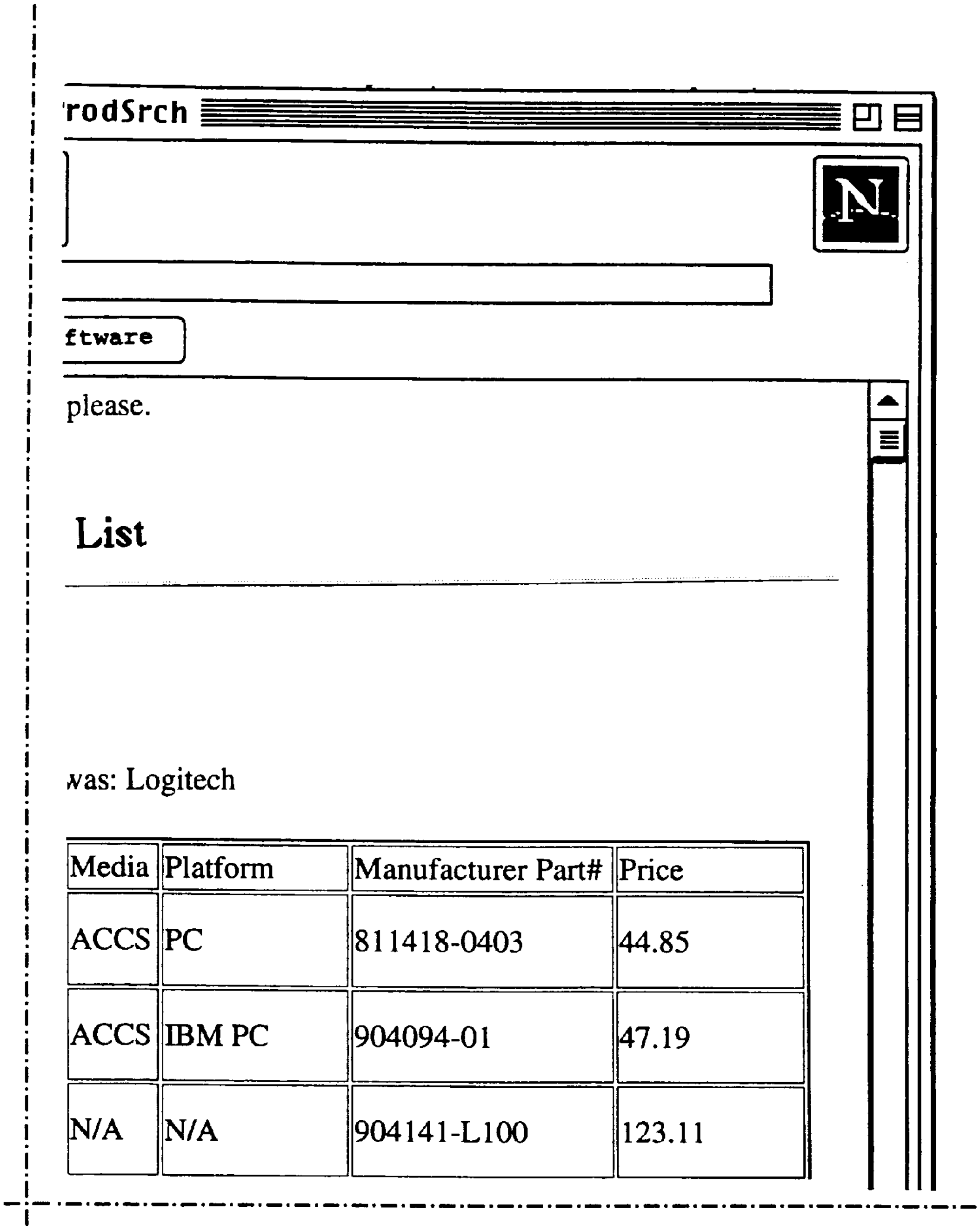
Figure 5C:
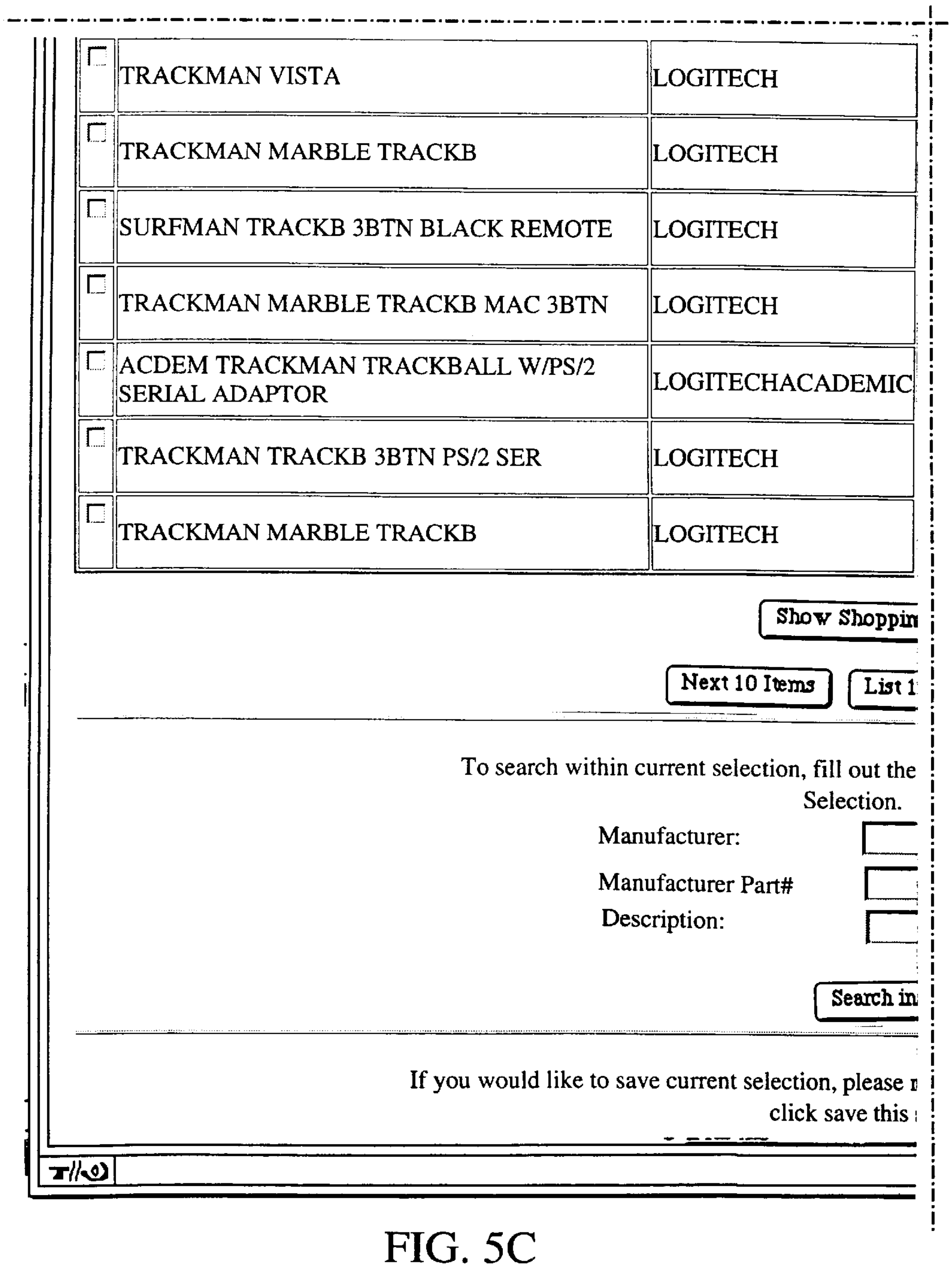
Figure 5D:
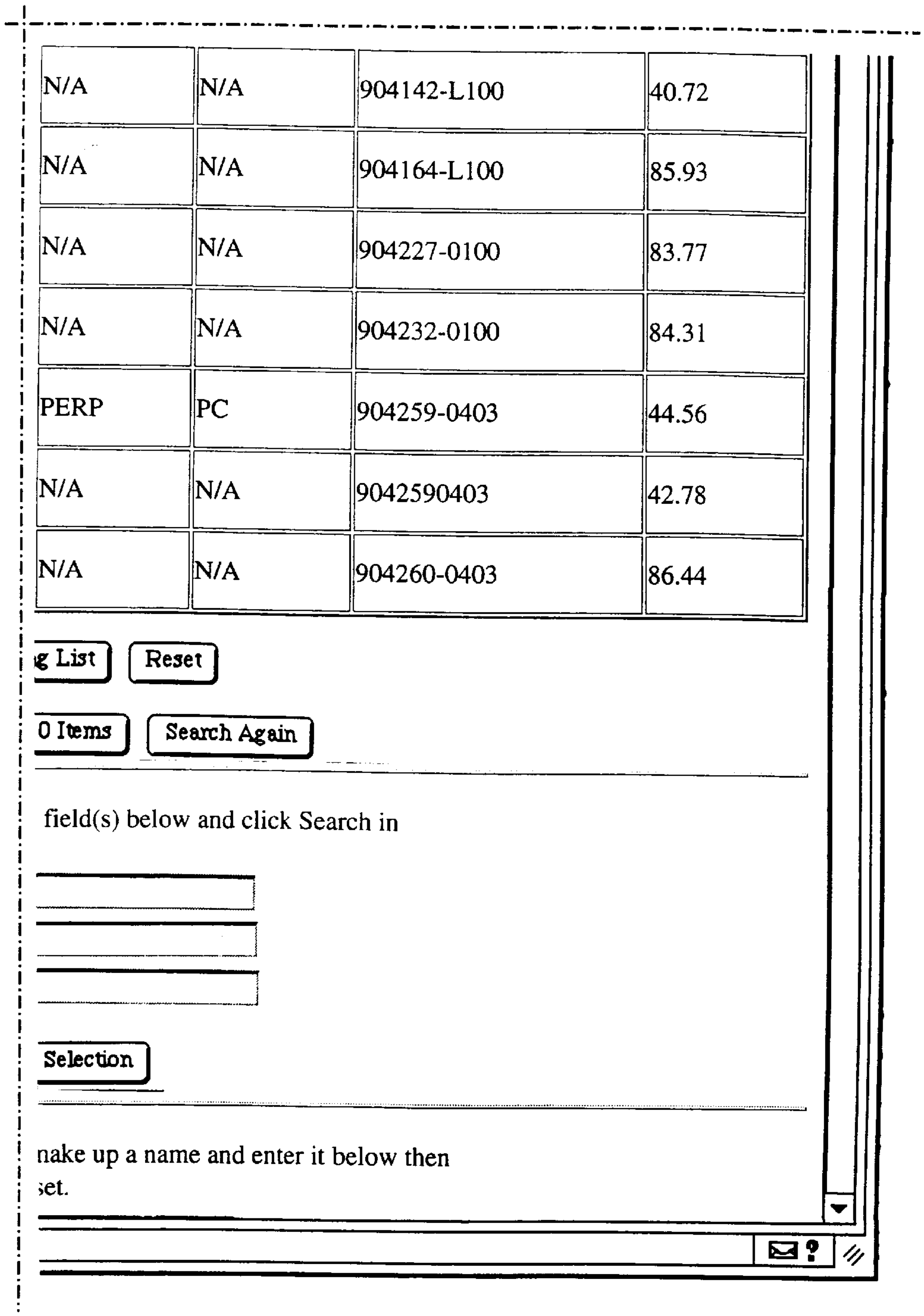

Assume for purposes of illustration that the user wishes to find products. Having entered product search parameters, the user then clicks on the button Search for Products. A product list within the database is then searched for products matching the specified parameters, and a Product List such as that of FIG. 5 is displayed, including a product description, the manufacturer, the media (if applicable), the platform, the manufacturer part number, and the unit price. Items are displayed ten at a time unless some other number is specified from the Product Search screen. The Product List can be further searched by manufacturer, manufacturer part number, or description. At any time, the user may save the Product List as a set by entering a name for the set or may search again.

Figure 6:
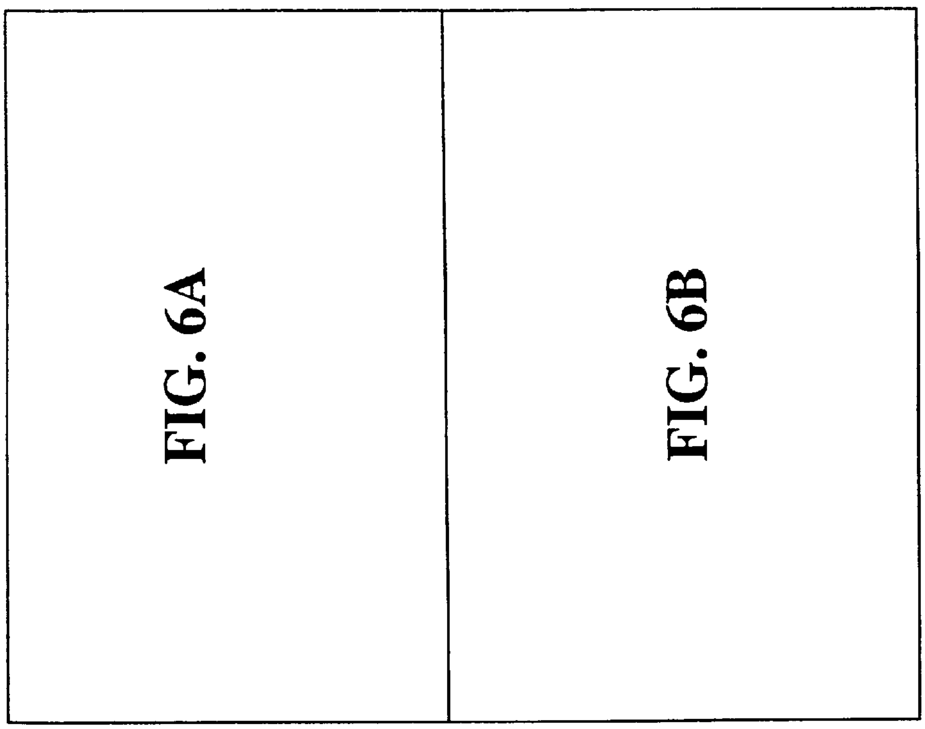
FIG. 6 is an illustration of a Web Product Shopping screen display.
Figure 6A:
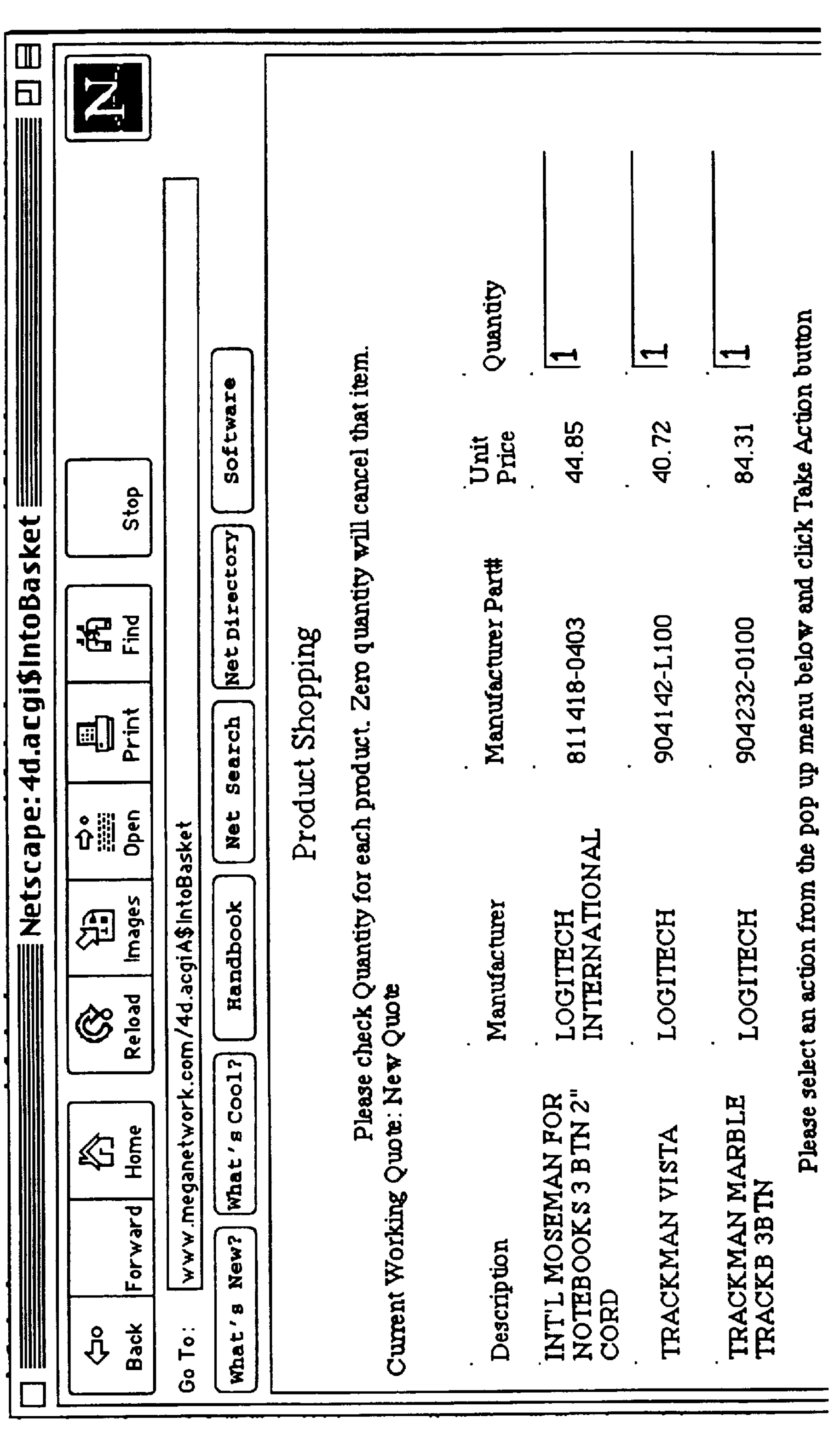
Figure 6B:
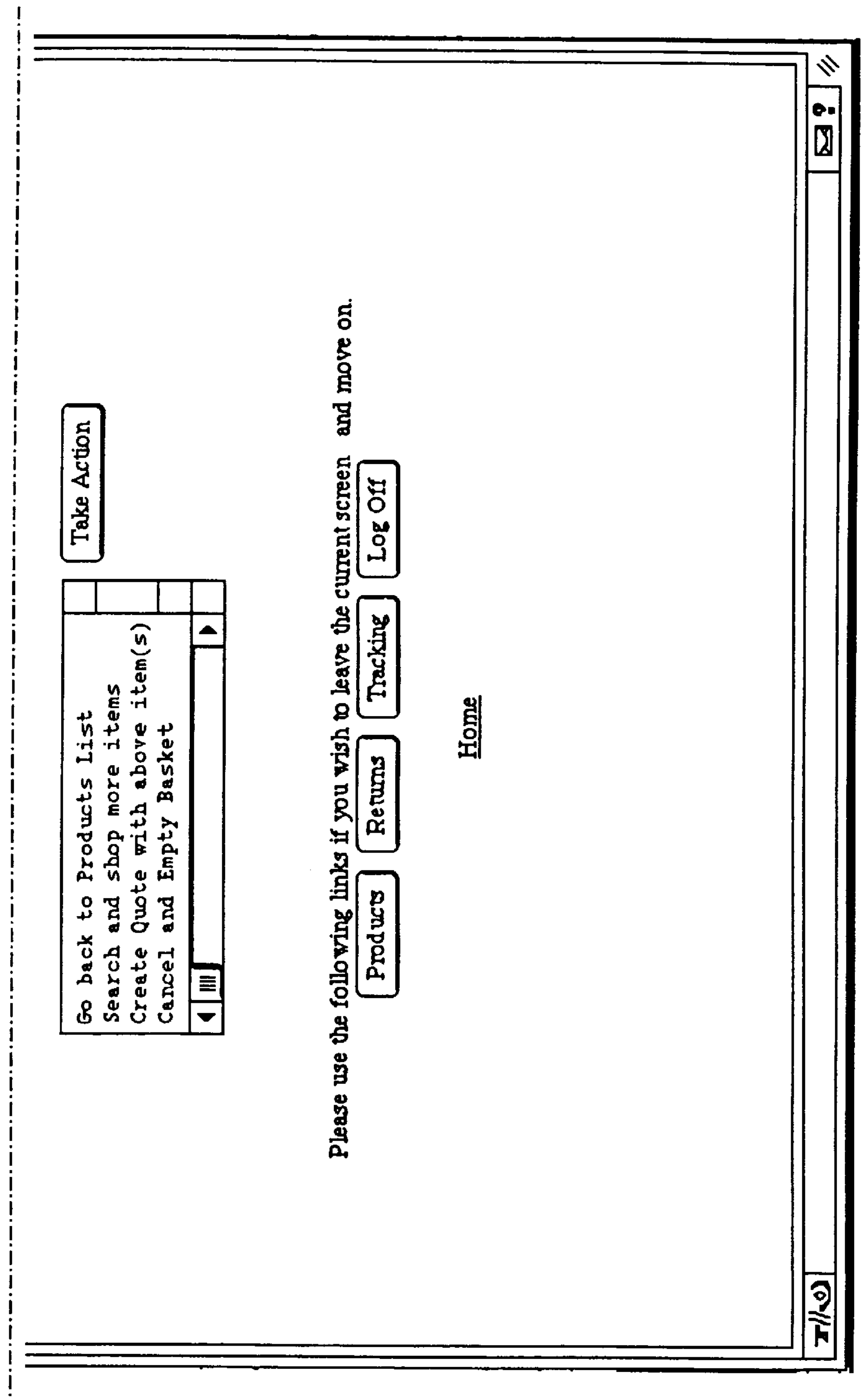

When the user sees an item of interest displayed on the Product List, the user checks the item. When all of the items of interest have been checked, the user clicks the button Show Shopping List, causing a Product Shopping screen to be displayed as illustrated in FIG. 6. The products checked previously are displayed, including a product description, the manufacturer, the manufacturer part number, and the unit price. Within a quantity column, ones are automatically entered for each item. Zeroing the quantity cancels that item such that it is not included in any quote that is created.

Figure 7A:
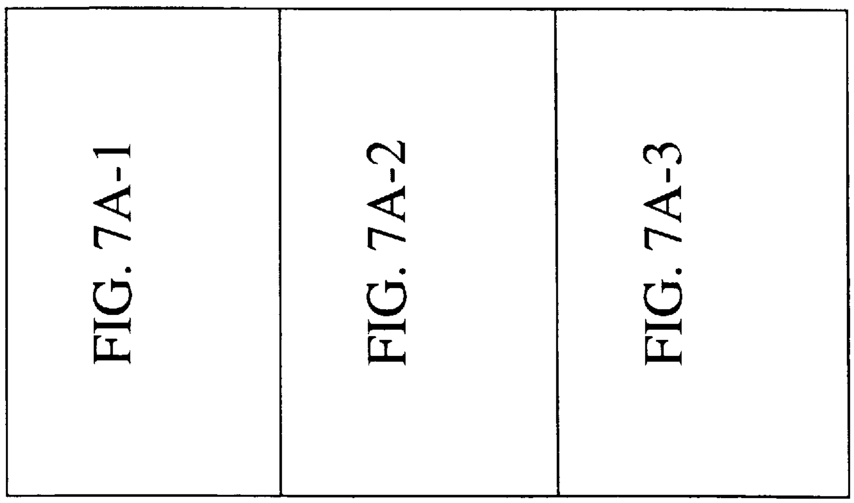
FIG. 7A, FIG. 7B and FIG. 7C, is an illustration of a Web Quote screen display.
Figures 1, 7A:
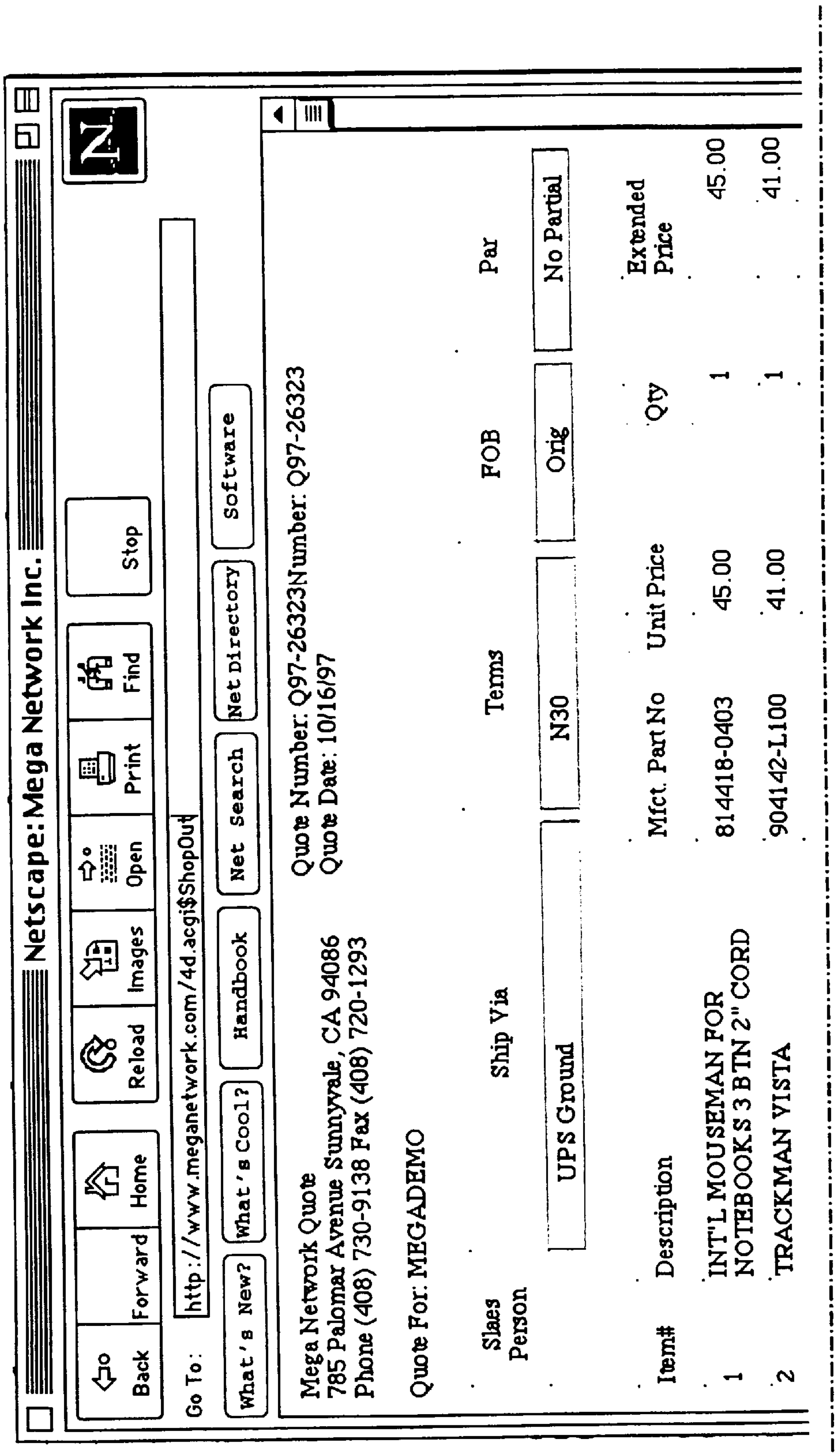
Figures 2, 7A:
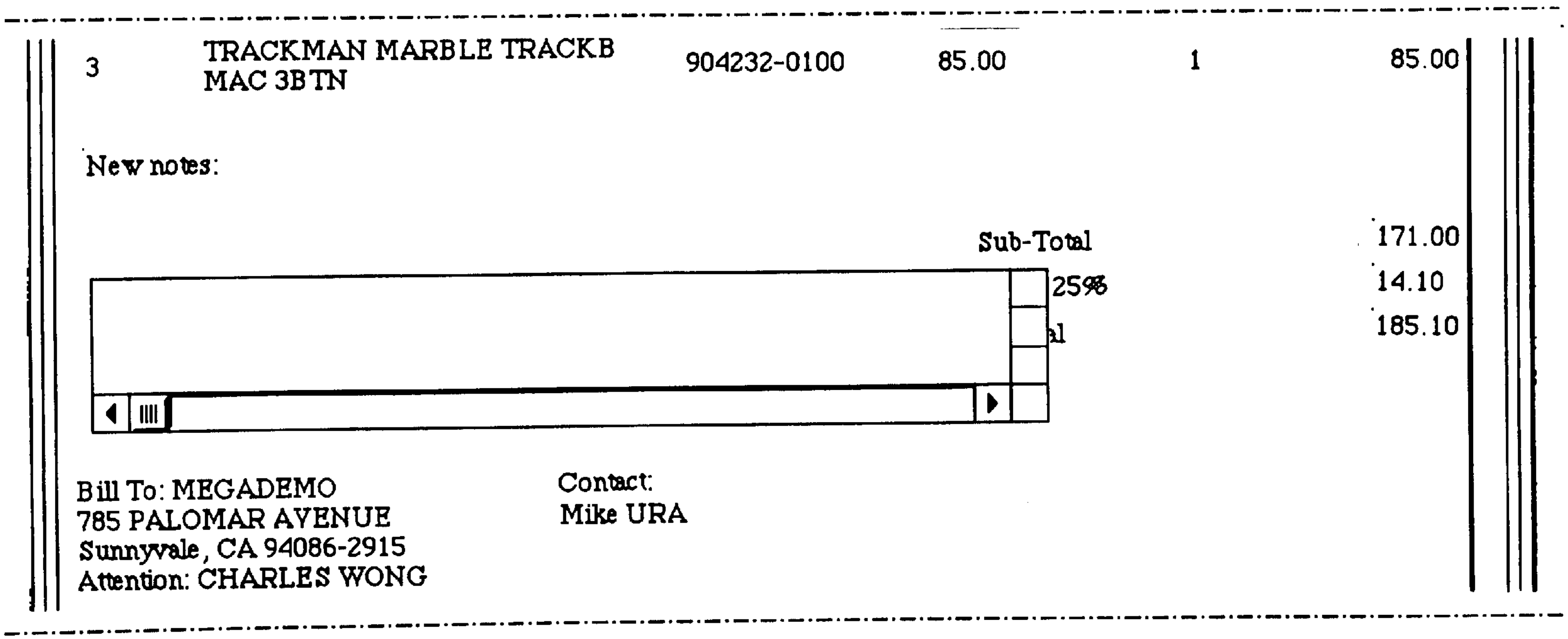
Figures 3, 7A:
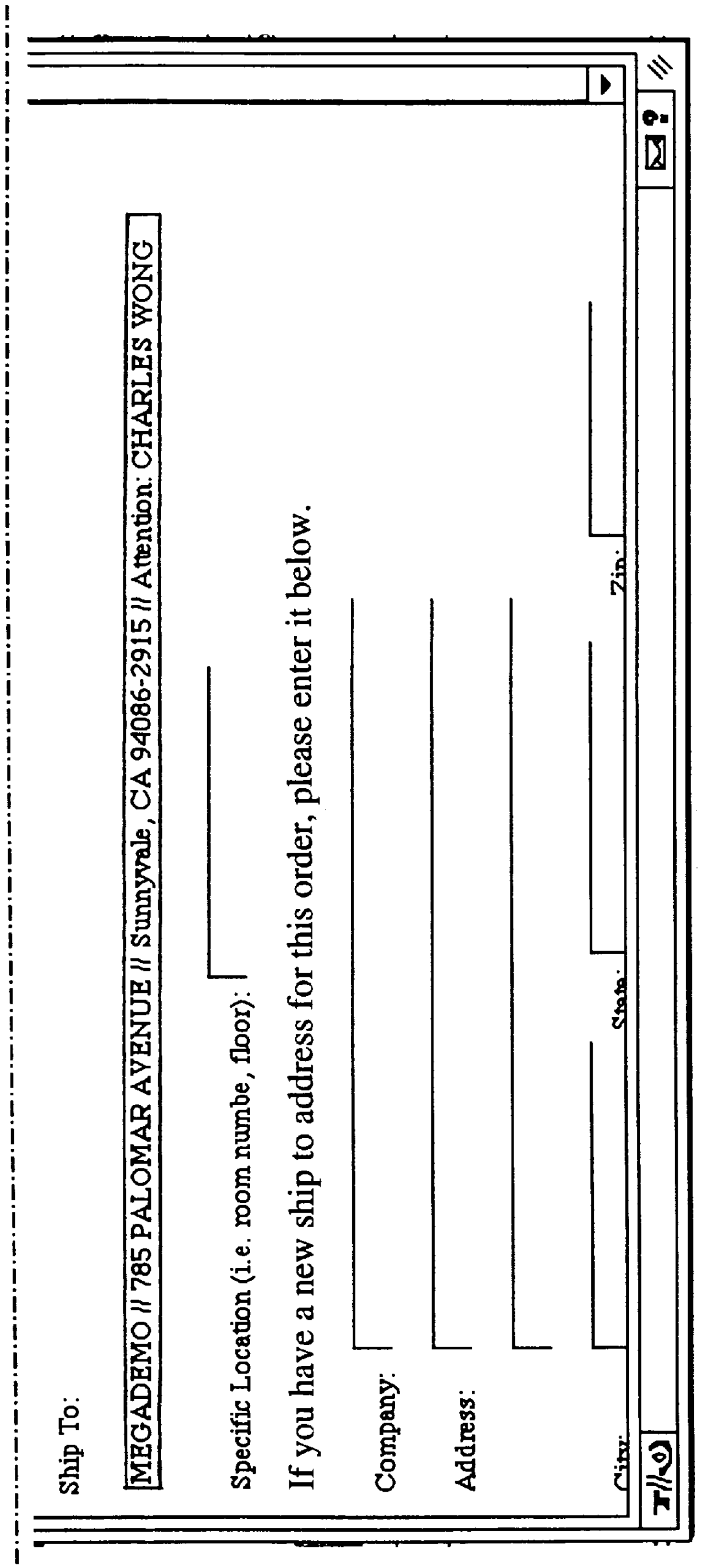
Figure 7B:
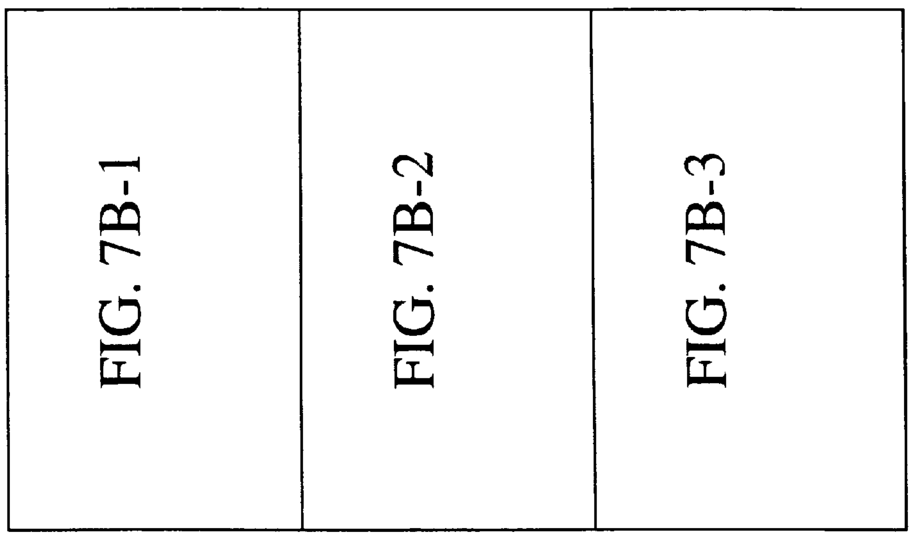
Figures 1, 7B:
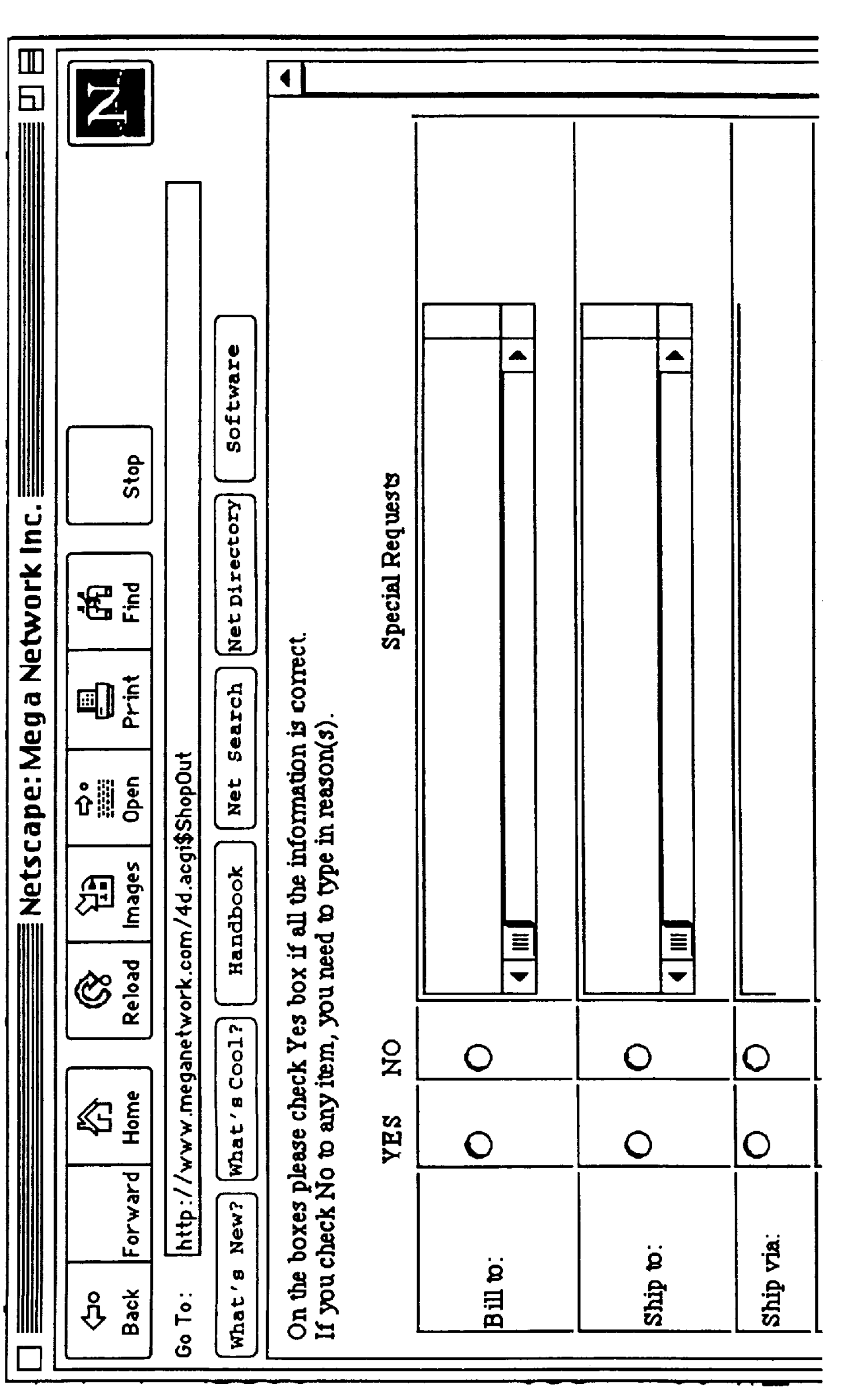
Figures 2, 7B:
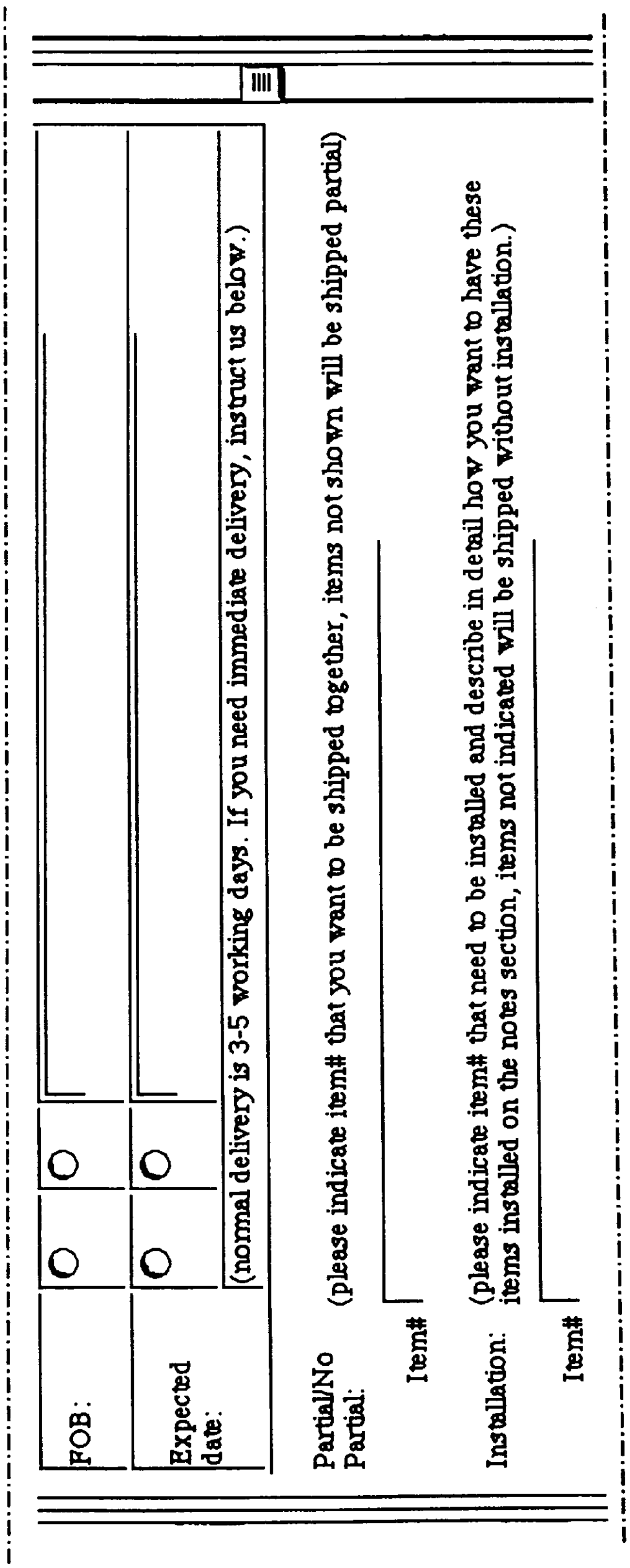
Figures 3, 7B:
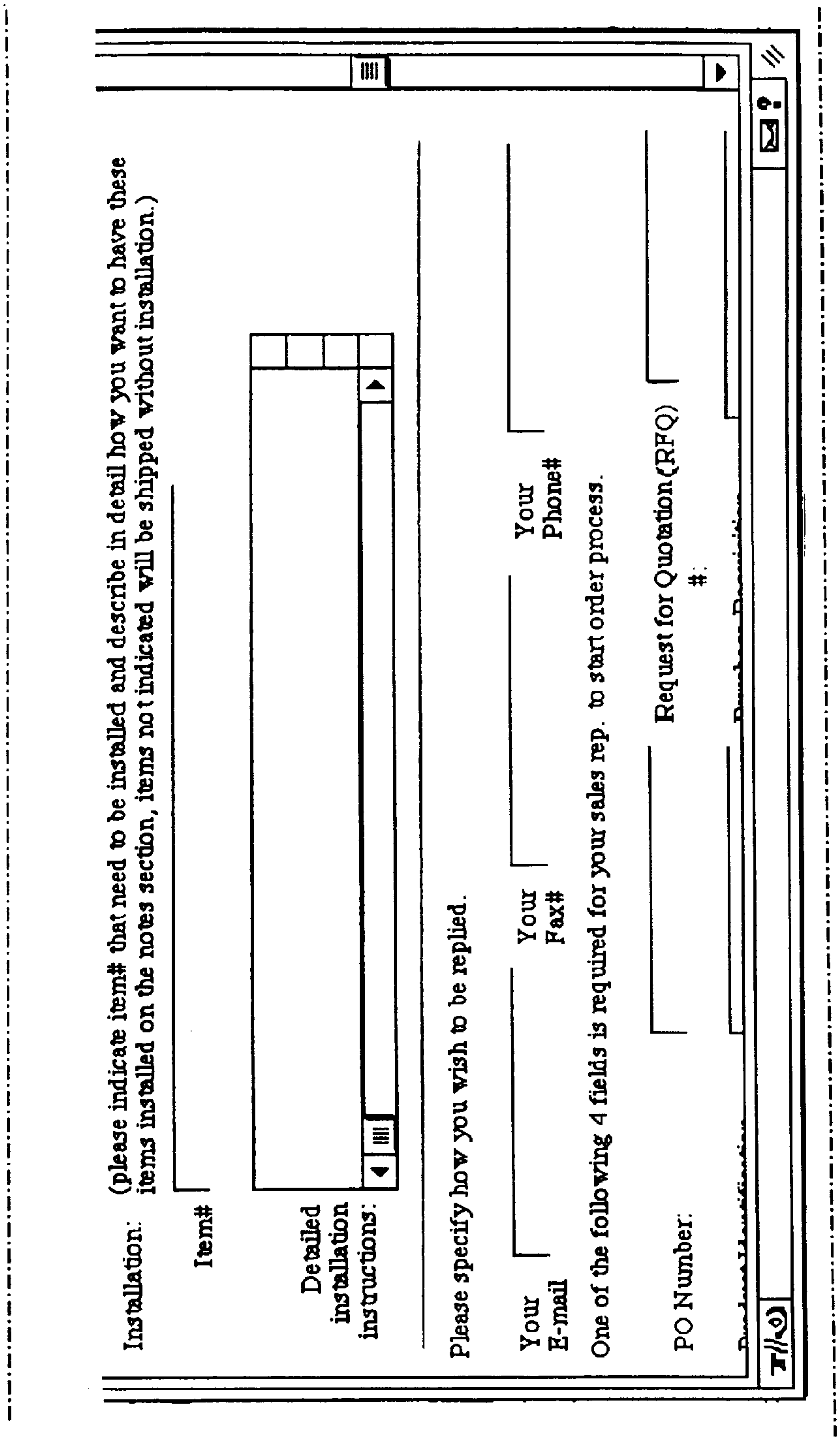
Figure 7C:
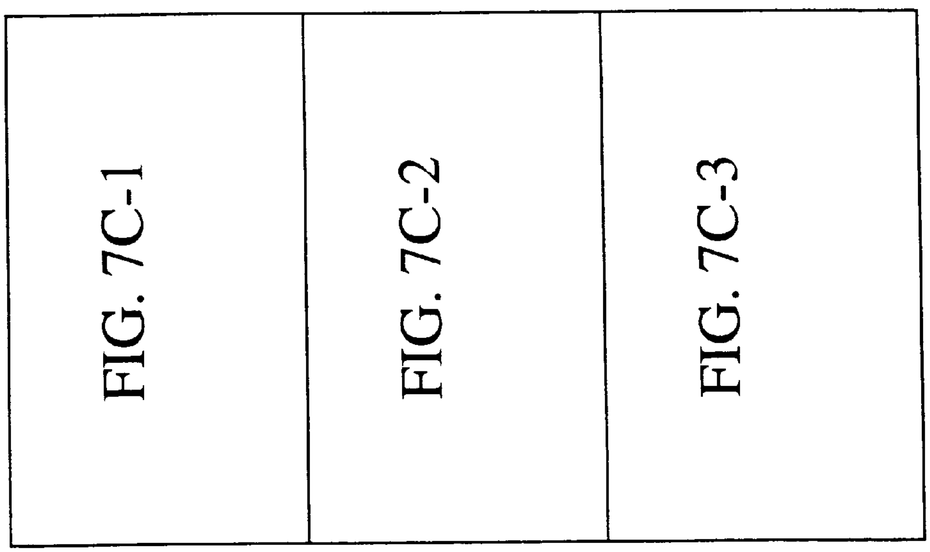
Figures 1, 7C:
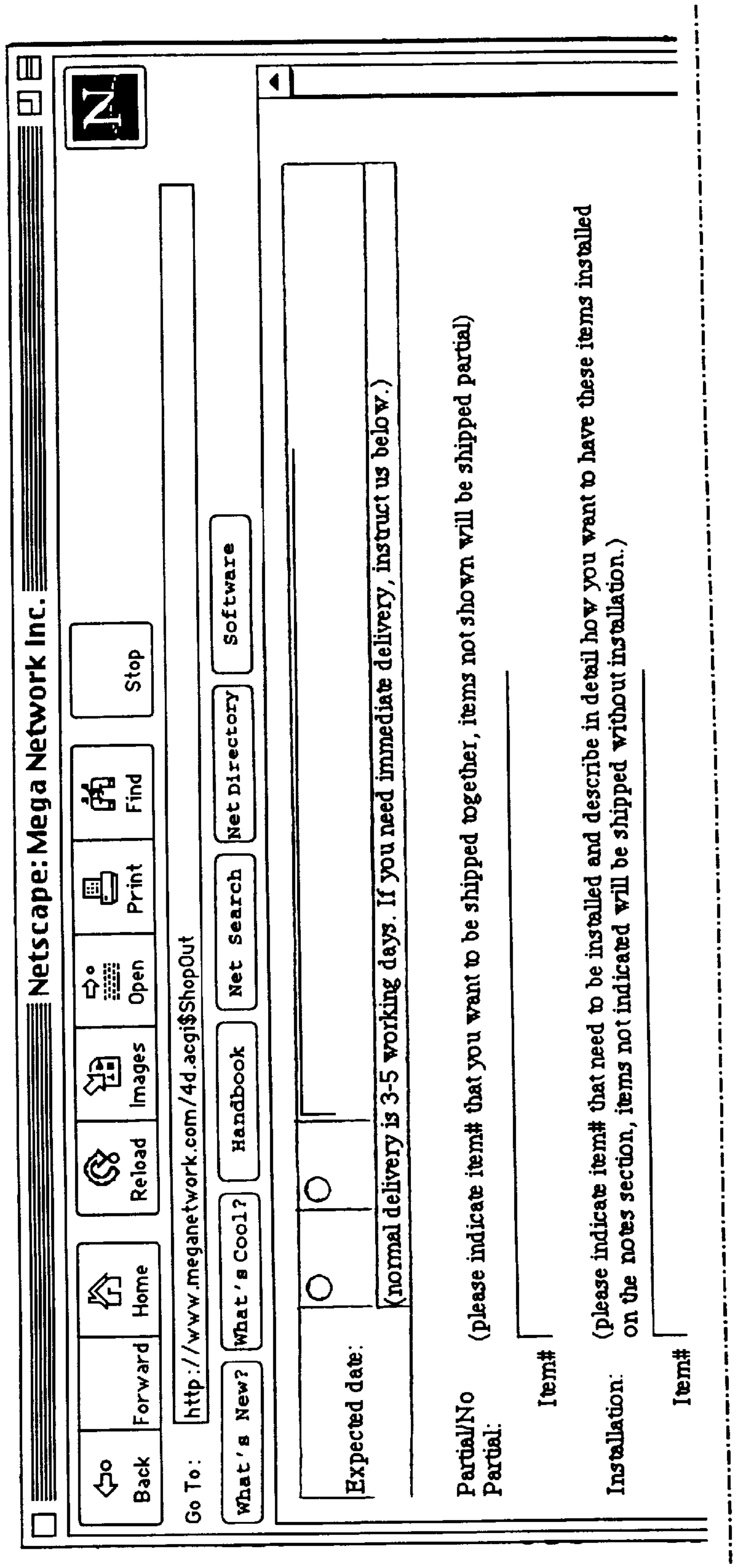
Figures 2, 7C:
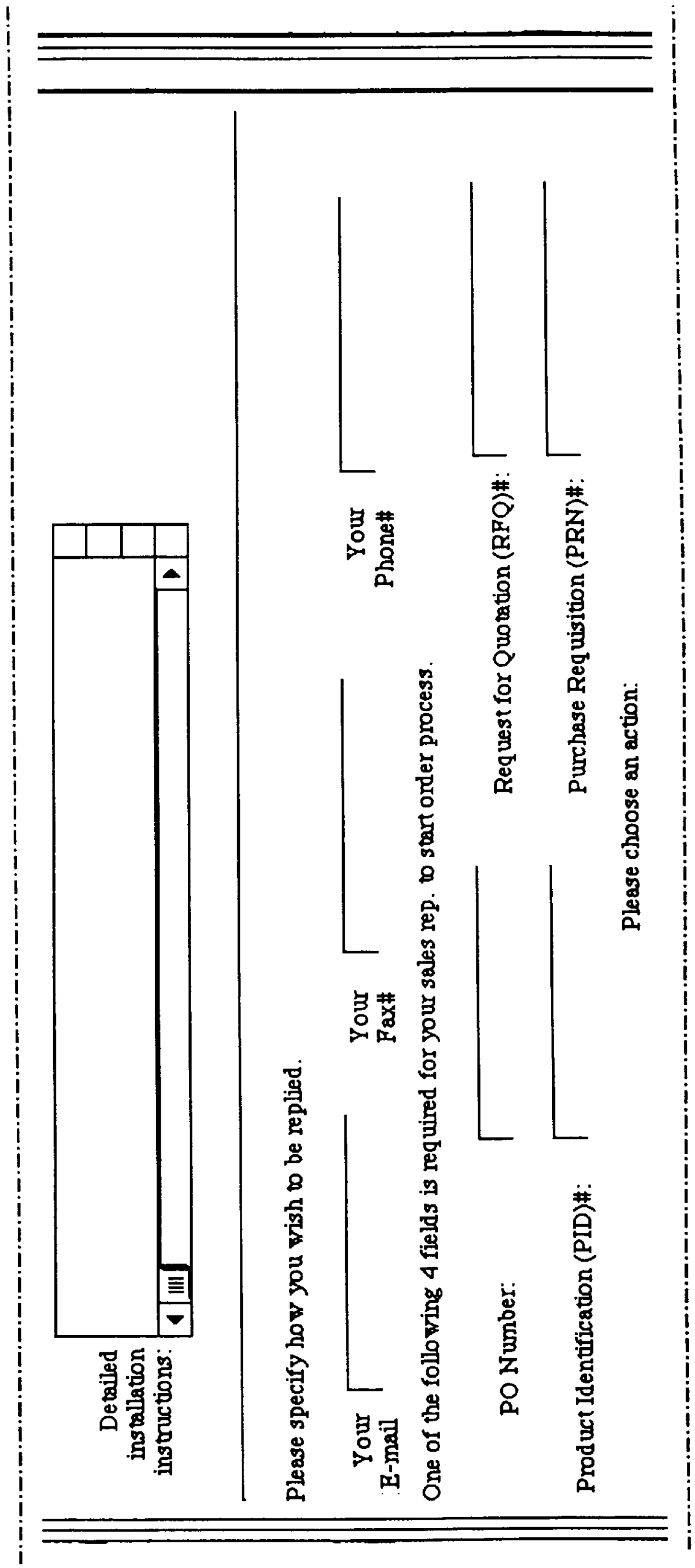
Figures 3, 7C:
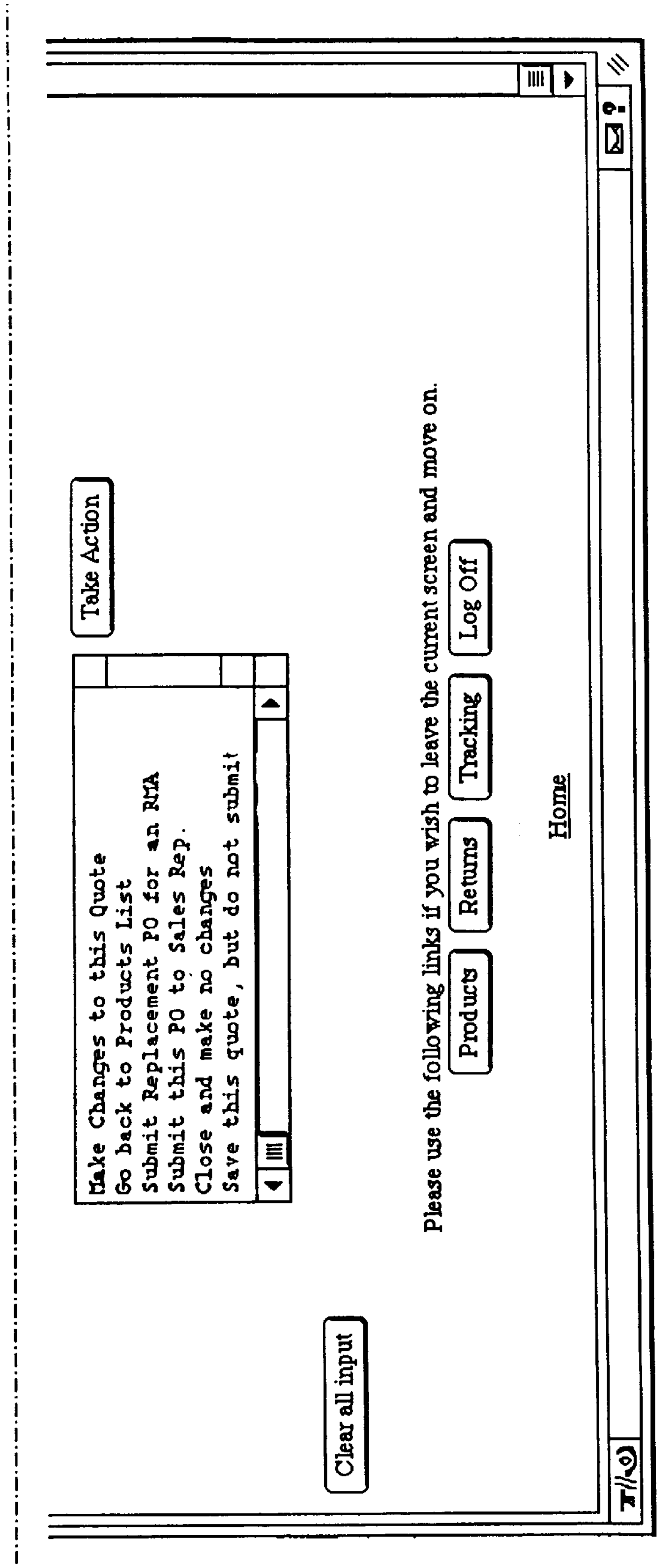

The user by choosing the appropriate action within the pop-up menu can create a quote for the specified items and quantities, can cancel and empty the "shopping basket," can go back to the Products List, or can go back to the Search for Products screen. When a quote is created, it is displayed as shown, for example, in FIGS. 7A–7C. A quote number and the quote date are displayed at the top of the quote. The salesman assigned to the account is displayed, together with account-specific defaults concerning shipping and payment terms. Then the items quoted are displayed, including description, manufacturer part number, unit price, quantity, and extended price. The sub-total, applicable tax, and total are calculated and displayed. A notes box is also provided for the user to enter notes regarding the quote.

A pre-arranged bill-to address and ship-to address are automatically displayed. The user may request that the ship-to address be changed for this order. Typically, for security reasons, such a request would be required to be confirmed in writing or by some other means.

Figure 8:
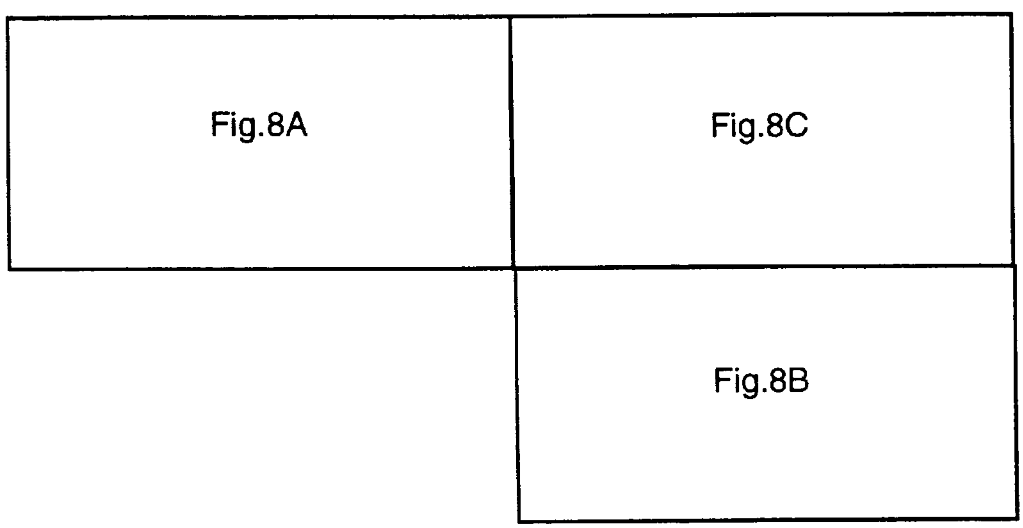
FIG. 8 is an illustration of a Quote screen display wherein a window containing any Web user special request is displayed.
Figure 8A:
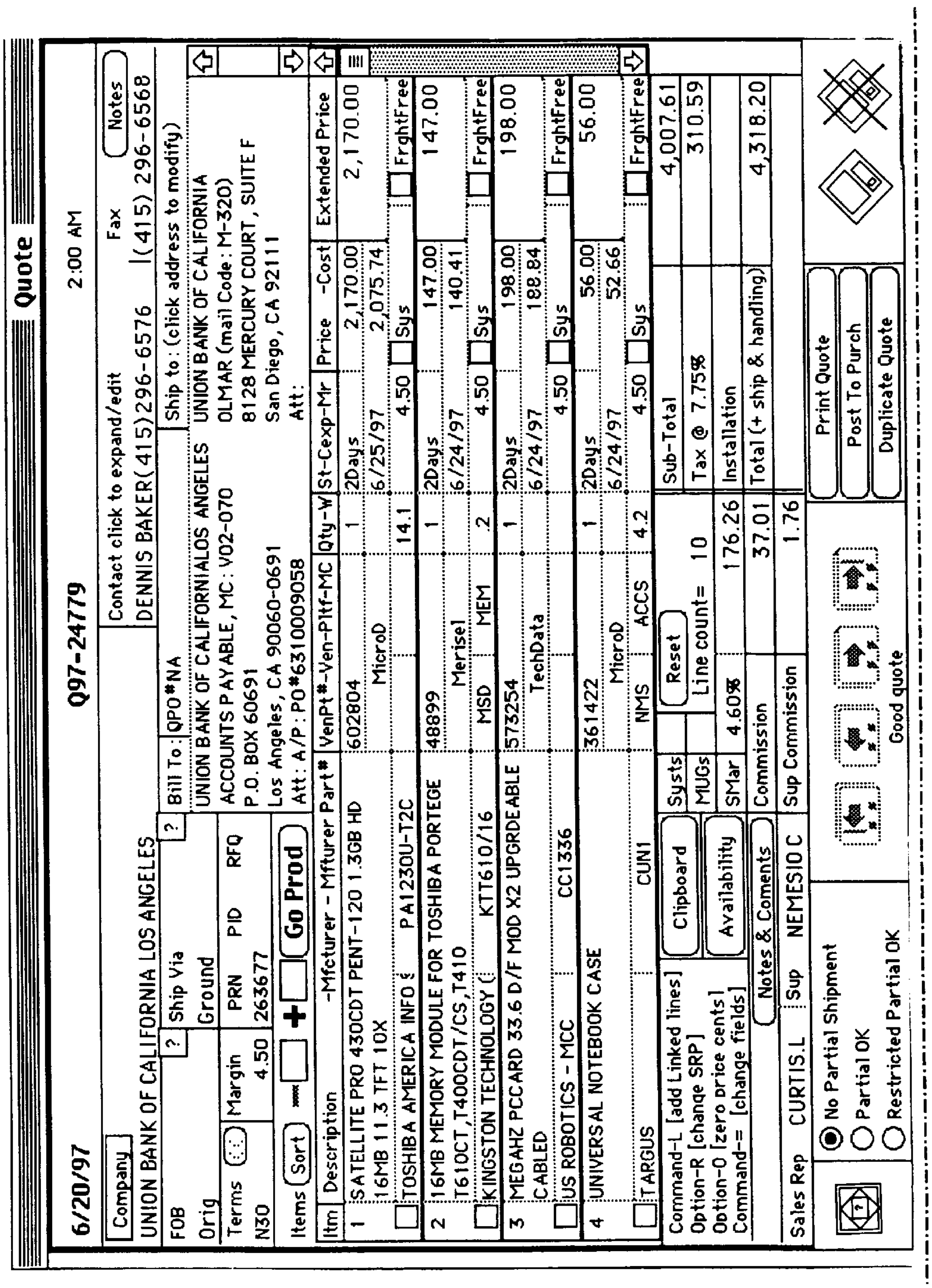
Figure 8B:
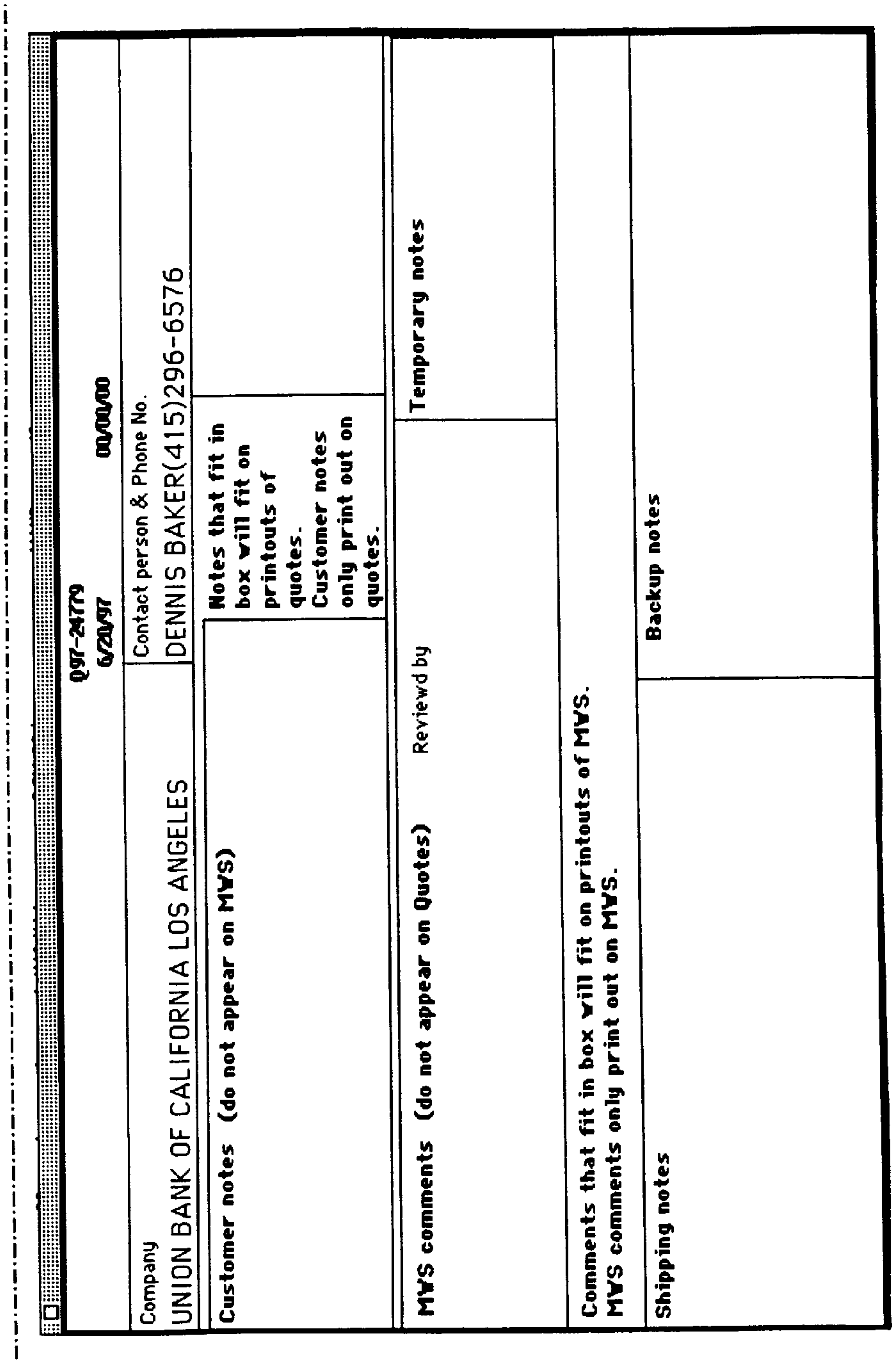
Figure 8C:
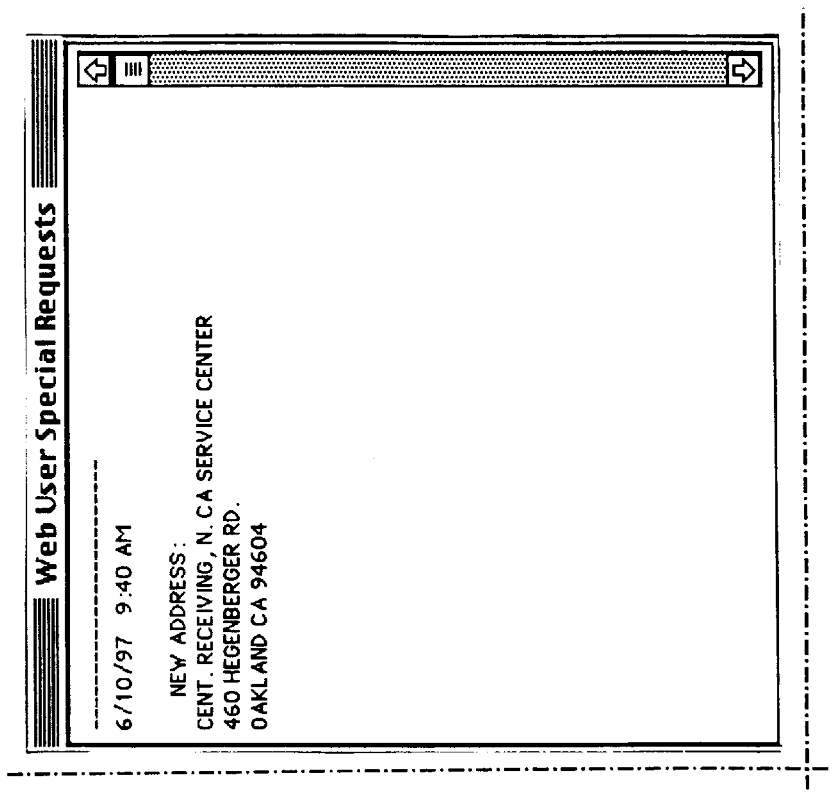
Figure 9:
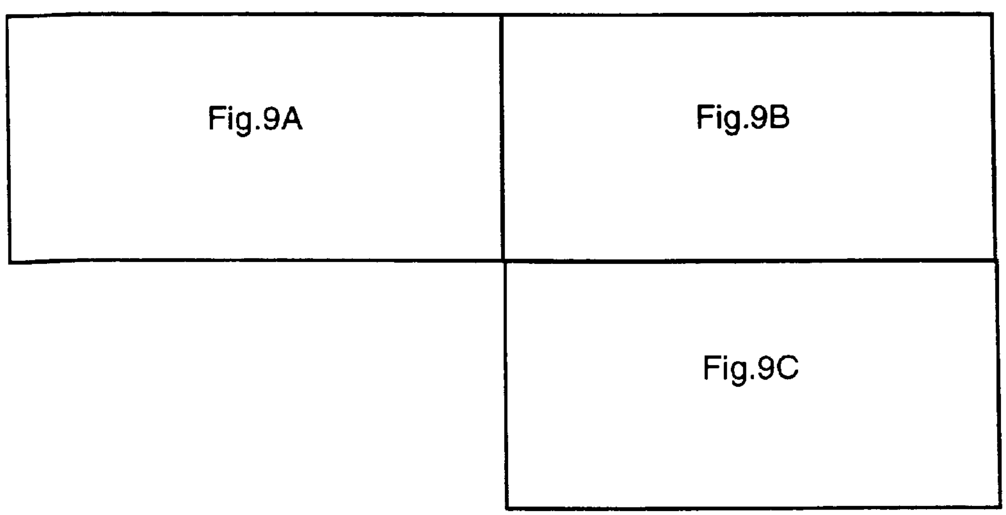
FIG. 9 is an illustration of a corresponding MWS screen display wherein the same window containing Web user special requests is displayed.
Figure 9A:
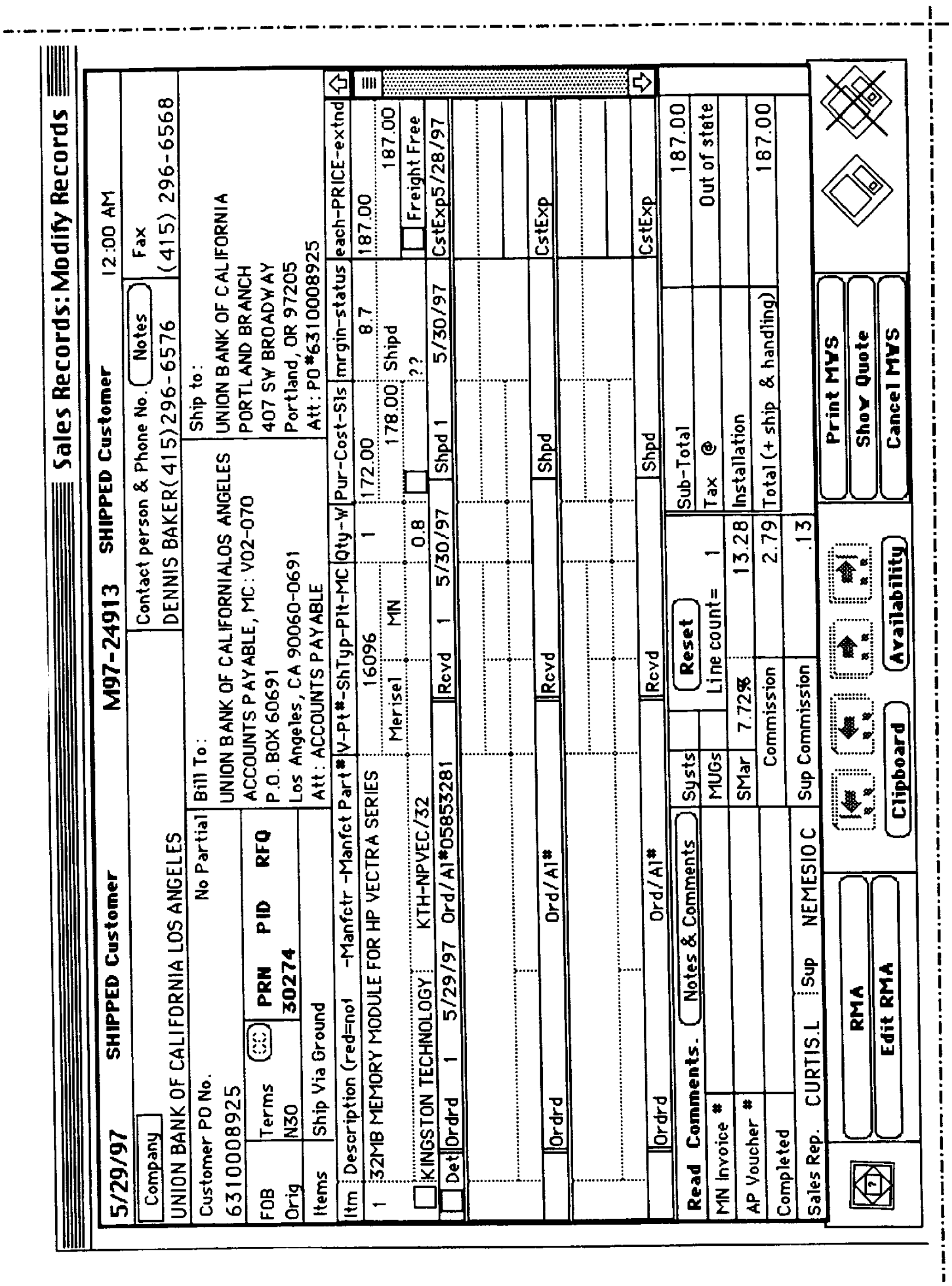
Figure 9B:
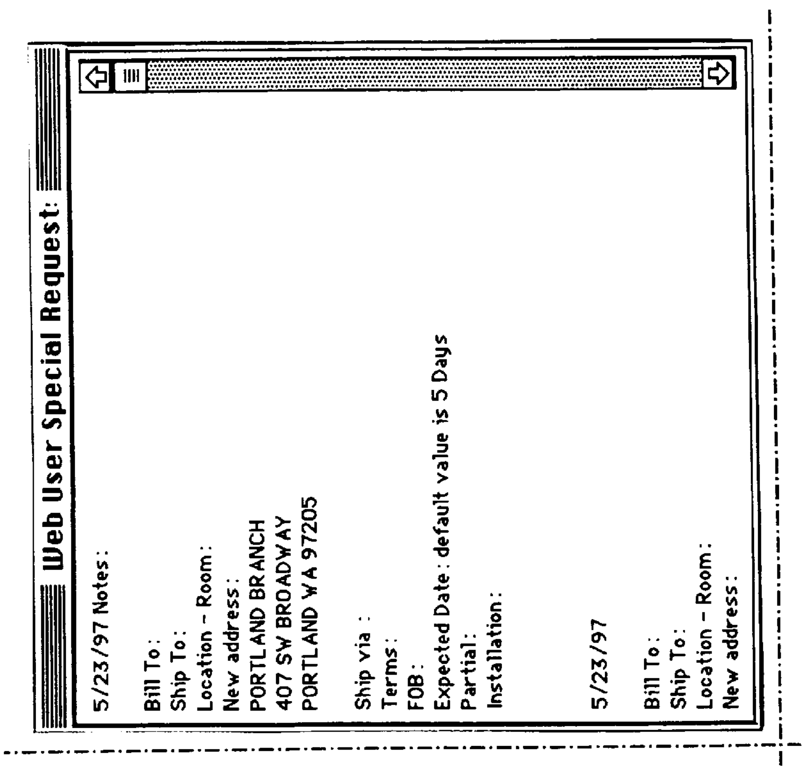
Figure 9C:
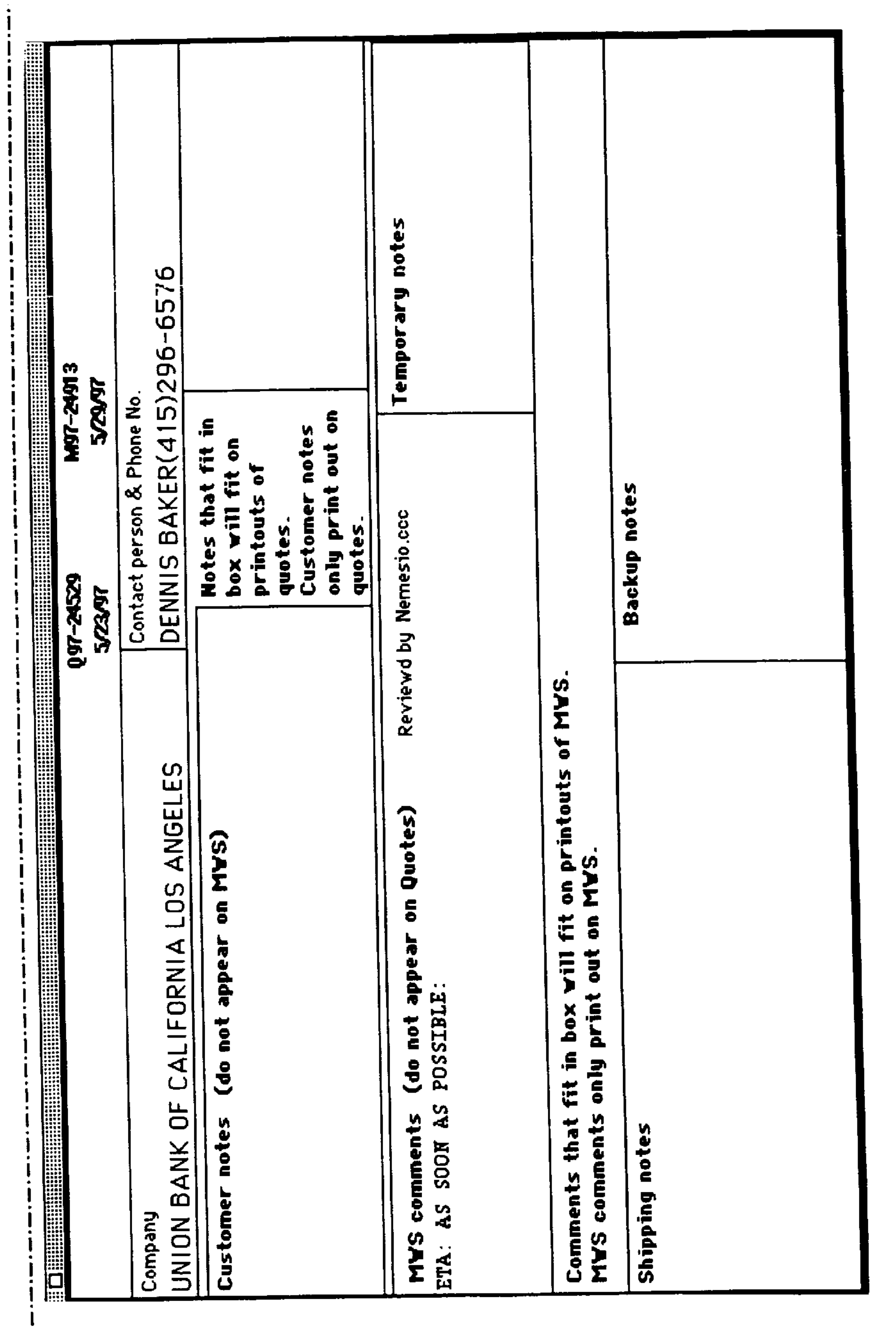

Within the following portion of the screen display, the user is requested to confirm various details of the quote or to disconfirm and provide clarification. (Yes or No must be checked for each detail or the quote cannot be submitted to the sales representative.) A text box is provided for the user to enter special requests. As may be seen in FIG. 8 and FIG. 9, respectively, these special requests are presented in a window whenever a corresponding quote or purchase order is displayed. Referring again to FIG. 7B, a box is also provided to request installation and provide installation instructions. Alternatively, an advantageous method of specifying installation instructions via the Web, by selecting a primary system and then specifying secondary components to be installed in that system is described hereinafter. Shipping instructions may also be conveyed "phones free" via the Web. In case further clarification is required, the user is requested to enter an email address, fax number or phone number according to the user's preference.

In contrast to consumer-oriented Web commerce, in the present business-to-business Web commerce system, an authorization number is required. The number may be a Purchase Order (PO) number, a Product Identification (PID) number, a Request for Quotation (RFQ) number, a Purchase Requisition (PRN) number, or may be based on unique requirements of the customer specified by a user with proper authority. By arrangement with each customer, one of these various numbers may be singled out as being required for purchase authorization, the remaining numbers being used for reference purposes only. The particular number required for purchase authorization may vary from customer to customer.

Once all of the requested information has been provided, the user then chooses from among possible actions, including making changes to the quote, going back to the Products List, submitting the quote to the sale representative, close the quote without saving any changes that the user may have made, or save the quote without submitting it. Note that a particular user, however, may have authority only to obtain quotes but not to submit quotes (place orders), or may have a purchase limit for a single purchase or for a predetermined time period (e.g., weekly, monthly, quarterly). If the user attempts to exceed his authority, the system will display a dialog informing the user that the selected action cannot be taken.

In practice, if a user is allowed to obtain quotes but not submit quotes, the user will obtain and save a quote, note the quote number, and notify a superior having purchasing authority (e.g., via email) of the quote number. The person having purchasing authority may then use the quote number to retrieve and review the quote and submit the quote if it is in order.

When a quote has been submitted, a confirmation screen is displayed thanking the user for the order, displaying the quote number, and confirming that the quote has been submitted as an order.

The Web user interface should be made as inviting and as convenient as possible to induce customers to convert to doing business on the Web exclusively insofar as possible. Convenience may be furthered by presenting to the user additional options for listing, searching and displaying product information. The Web user interface may therefore be modified as shown in FIG. 10 to present a variety of options relating to products and quotes.

Figure 11:
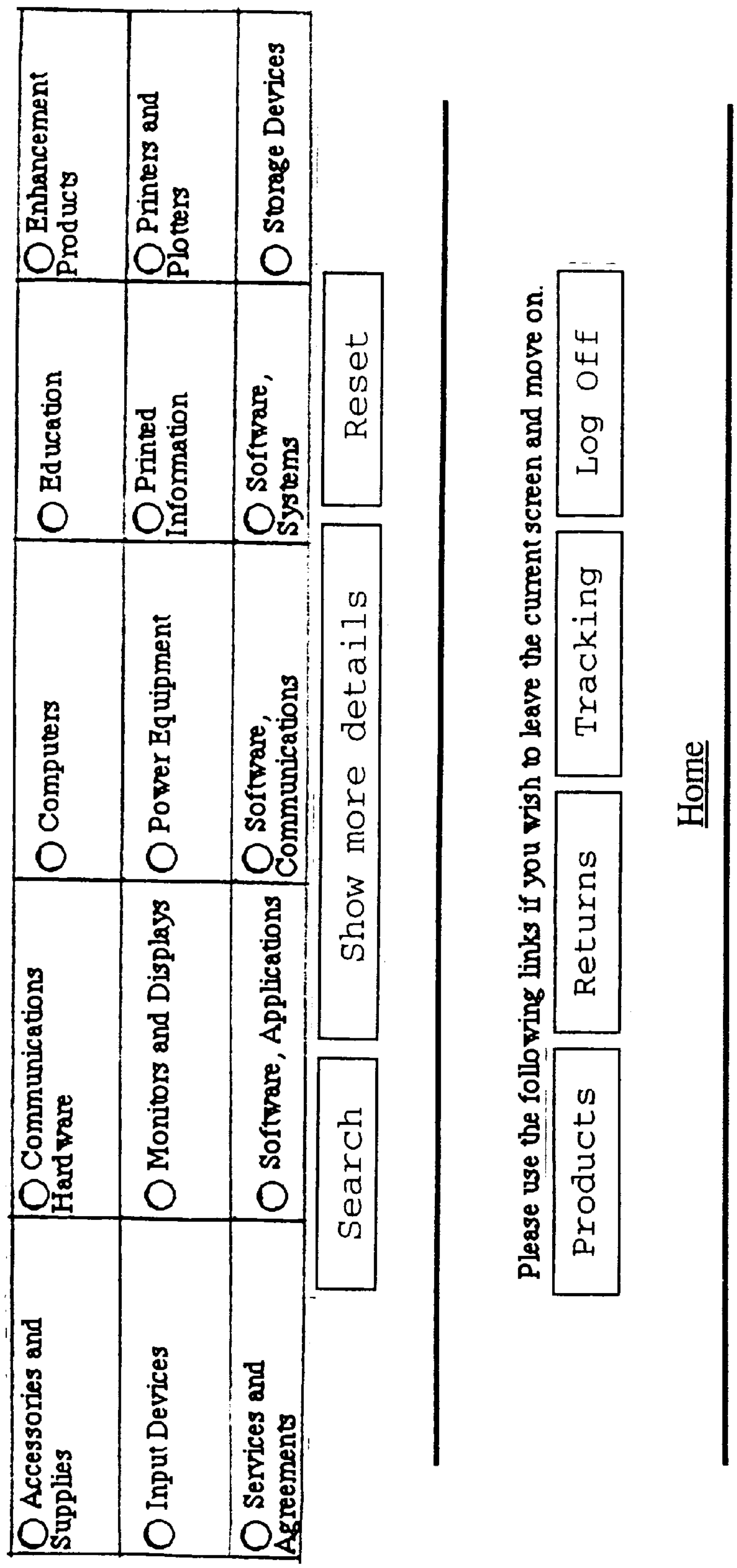
FIG. 11 is an illustration of a Products—Groups and Categories screen display.
Figure 12:
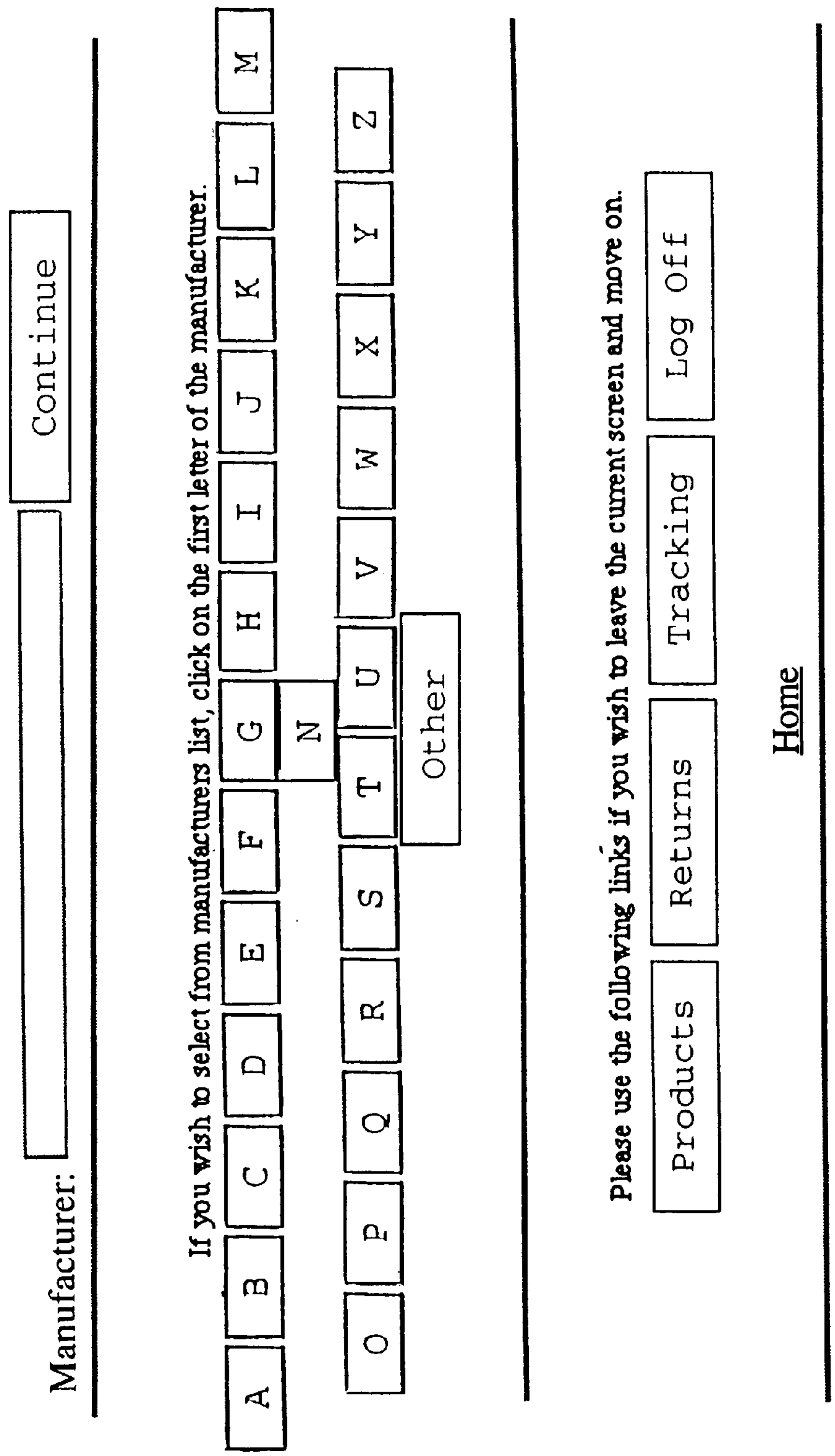
FIG. 12 is an illustration of a Products—Single Manufacturer Input screen display.

To display a product listing from all manufacturers by product category, option 1 is selected. A page such as that shown in FIG. 11 is then displayed. The user may check product groups and categories of interest, e.g., accessories and supplies, input devices, etc. To display a product listing from a single manufacturer by product category, option 2 is selected. A page such as that shown in FIG. 12 is then displayed, prompting the user to enter a manufacturer name by either typing in the name or selecting the first letter of the manufacturer's name and then further selecting from a list of manufacturer names beginning with that letter. When the manufacturer has been specified, the Continue button is pressed, and a page like that of FIG. 11 is then displayed, whereby the user may specify product groups or categories of interest.

Figure 13:
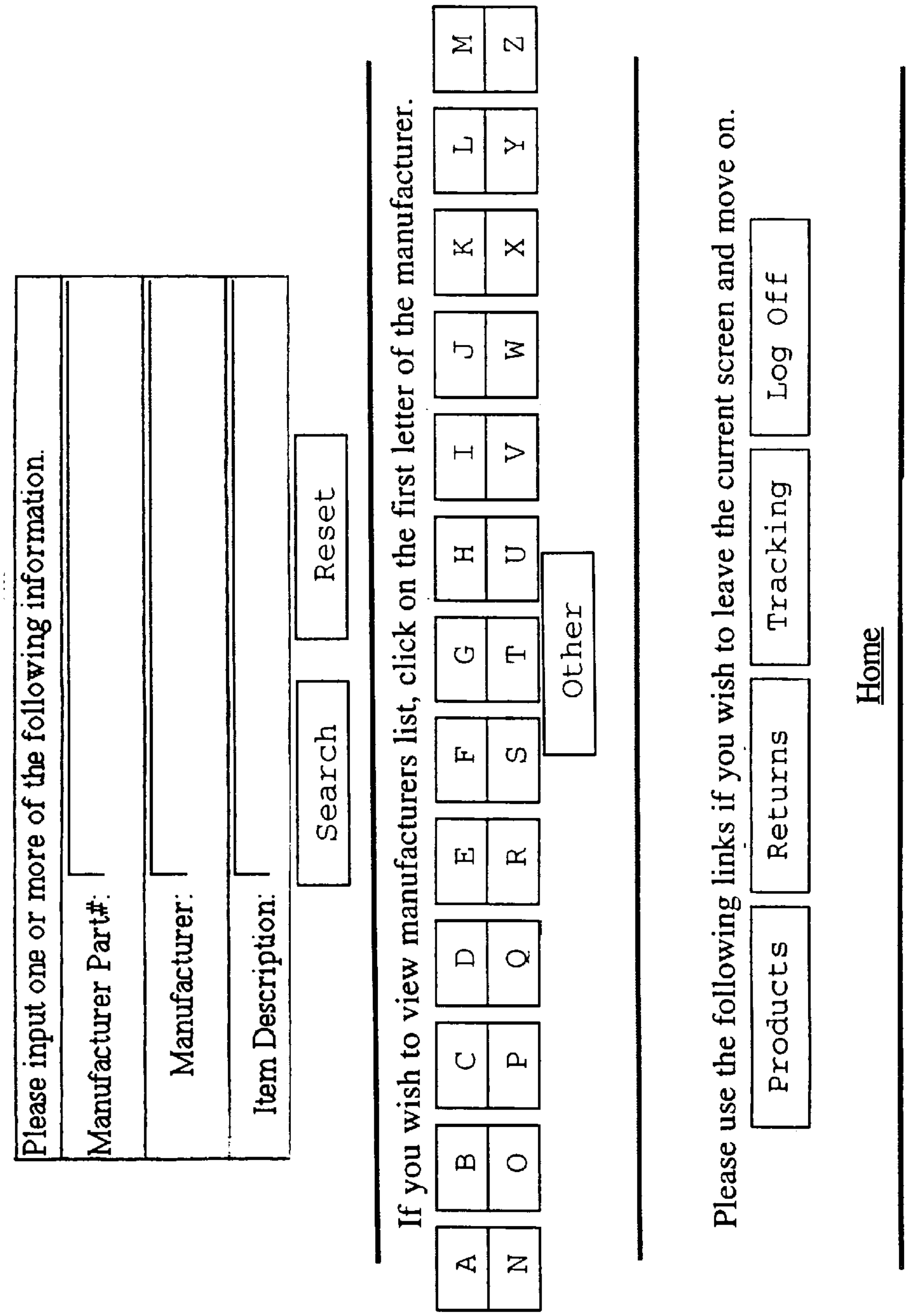
FIG. 13 is an illustration of a Products Search screen display.

Product listings may also be produced by manufacturer name, description or part number (option 3) or for a single manufacturer by description or part number (option 4). These options cause a page such as that of FIG. 13 to be displayed.

Figure 14:
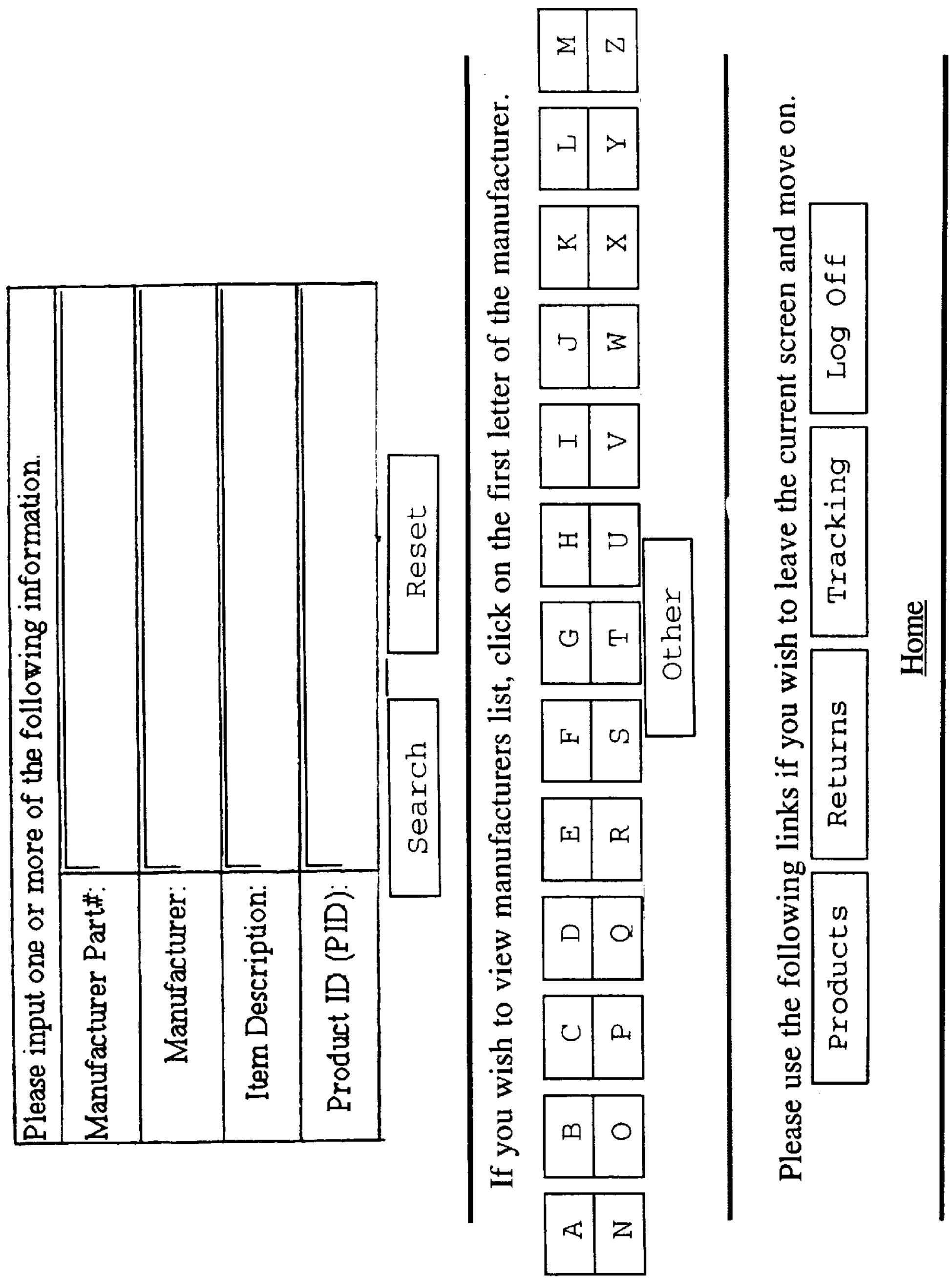
FIG. 14 is an illustration of a Products Search/APL screen display.
Figure 15:
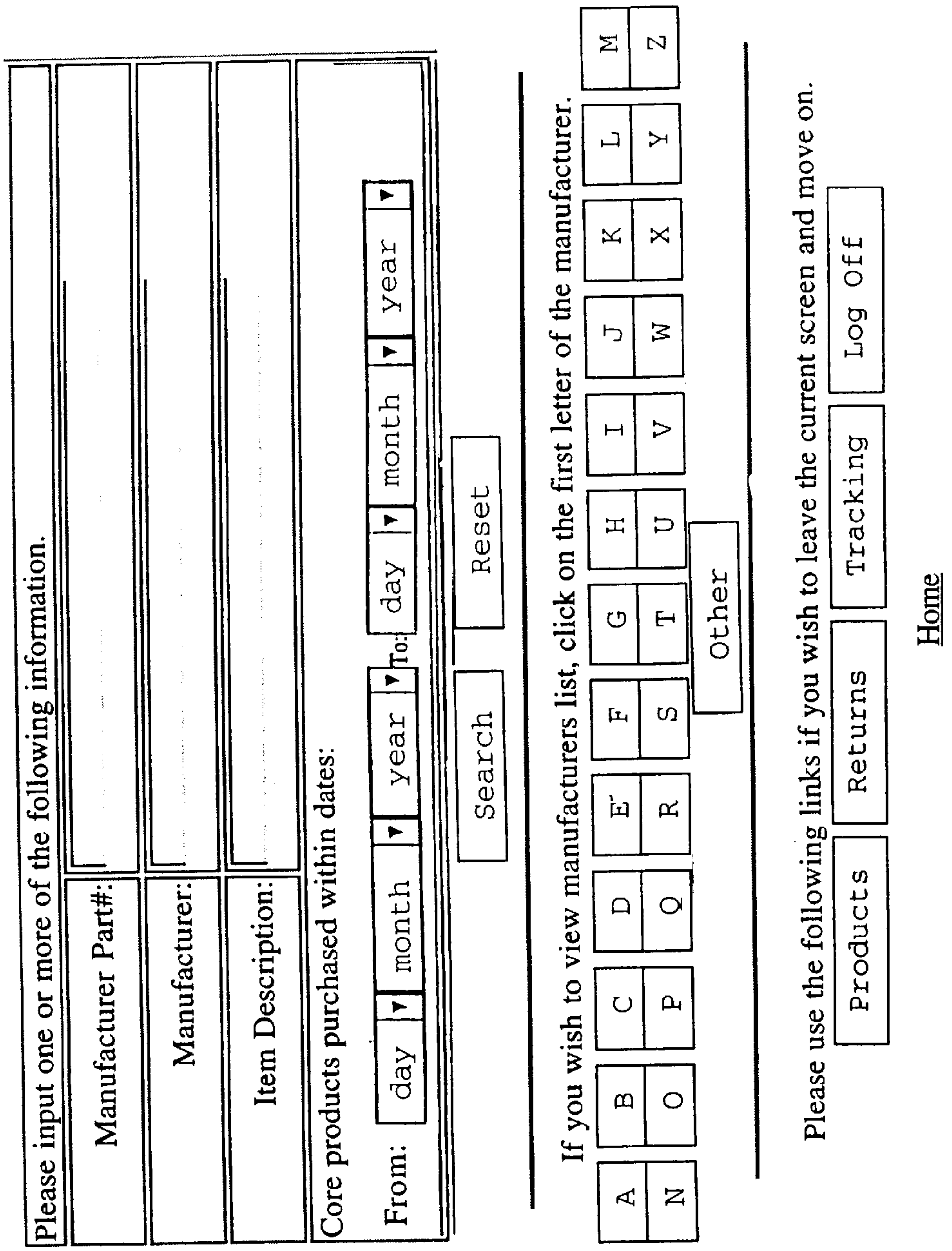
FIG. 15 is an illustration of a Products Search/Core Products screen display.

Each customer may have each own Approved Products List (APL) in which products are identified by a Product ID (PID). The APL constitutes in effect a company catalog. To search the APL, option 5 is selected, whereupon a page such as that of FIG. 14 is displayed. Instead, products may be searched by purchase history. A customer may have established buying patterns but may not have arranged for an APL. To search "core products," i.e., products purchased before by that company, option 6 is selected. A page such as that of FIG. 15 is then displayed.

Figure 16:
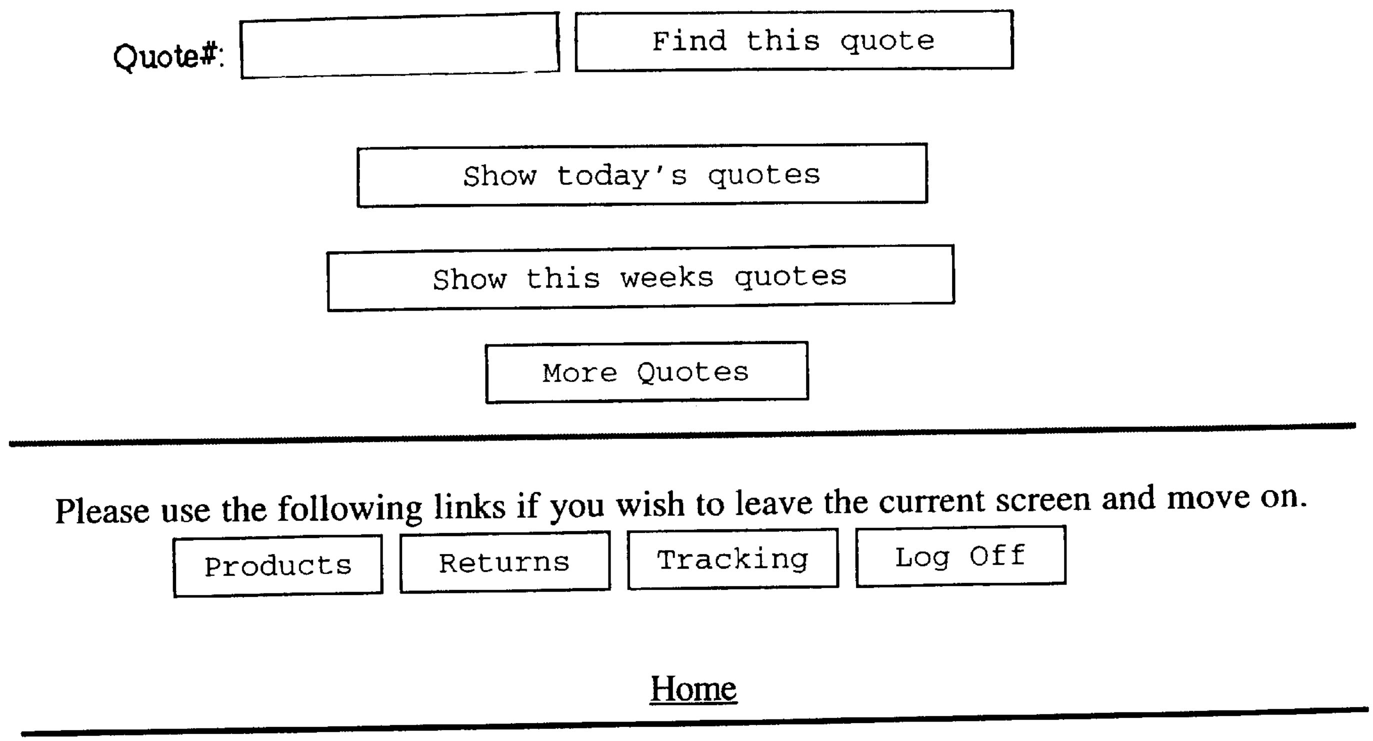
FIG. 16 is an illustration of a Quote Lookup screen display.
Figure 17:
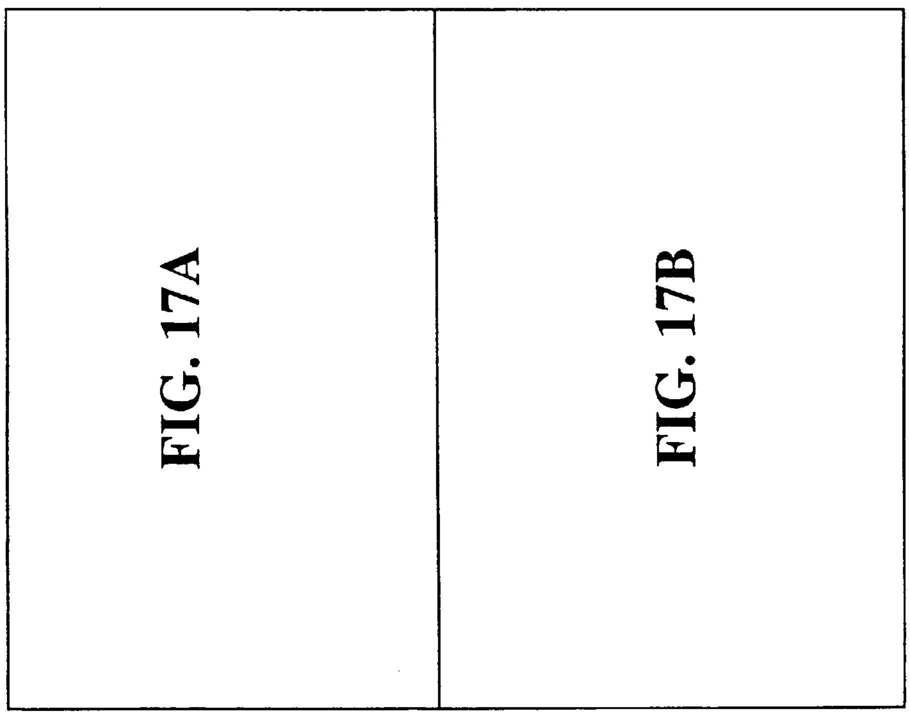
FIG. 17 is an illustration of a Find Quote screen display.

To view previous quotes, option 7 is selected. A page such as that of FIG. 16 is then displayed. The user can find a quote by quote number, show today's quotes, show this week's quotes, etc. Quote information for a particular period may be displayed as shown in FIG. 17, allowing the user to select a particular quote for viewing.

Figure 18C:
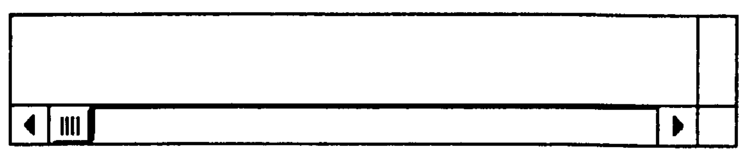
FIG. 18 is an illustration of a Quote screen display in accordance with an alternative Web user interface design.
Figure 18E:
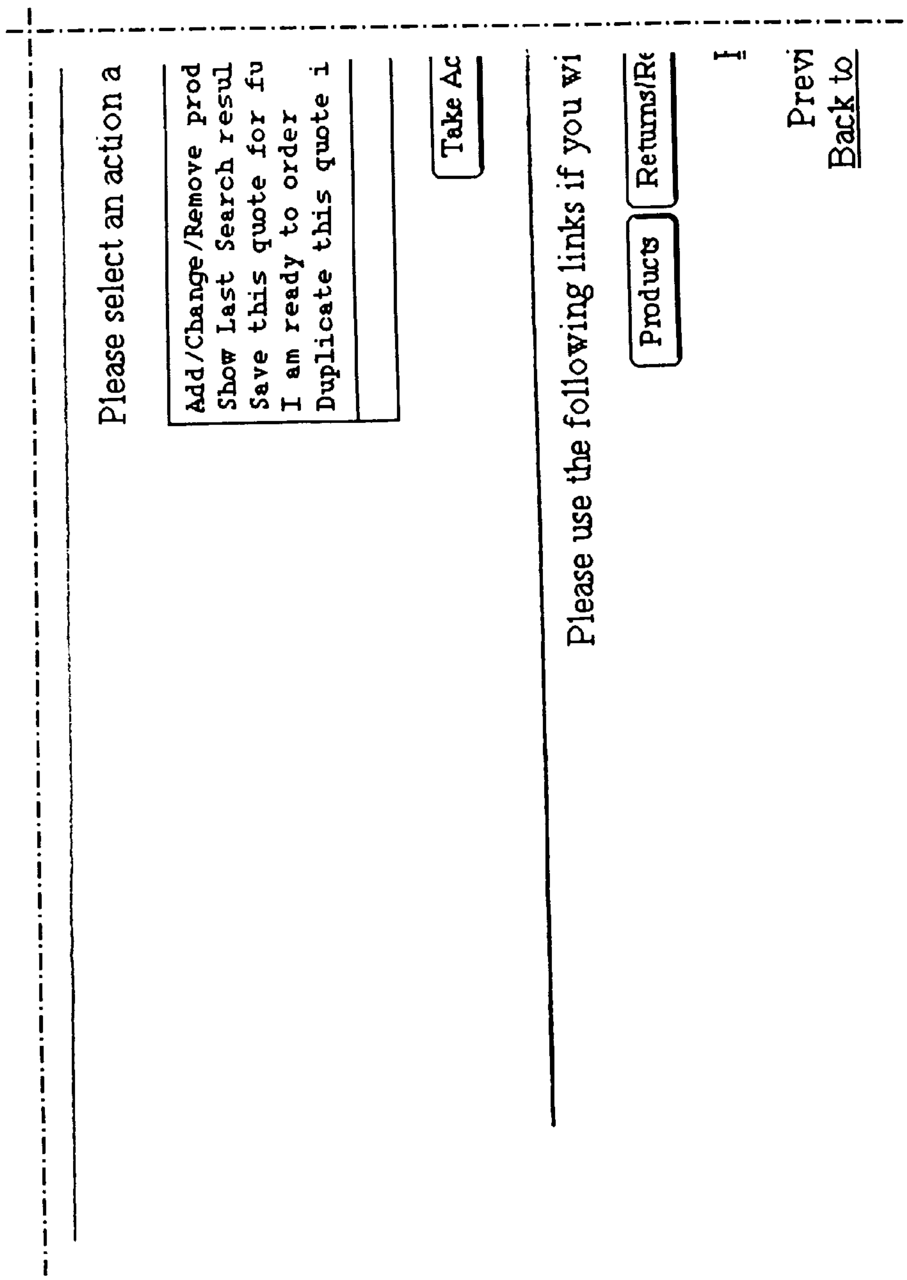
Figure 18F:
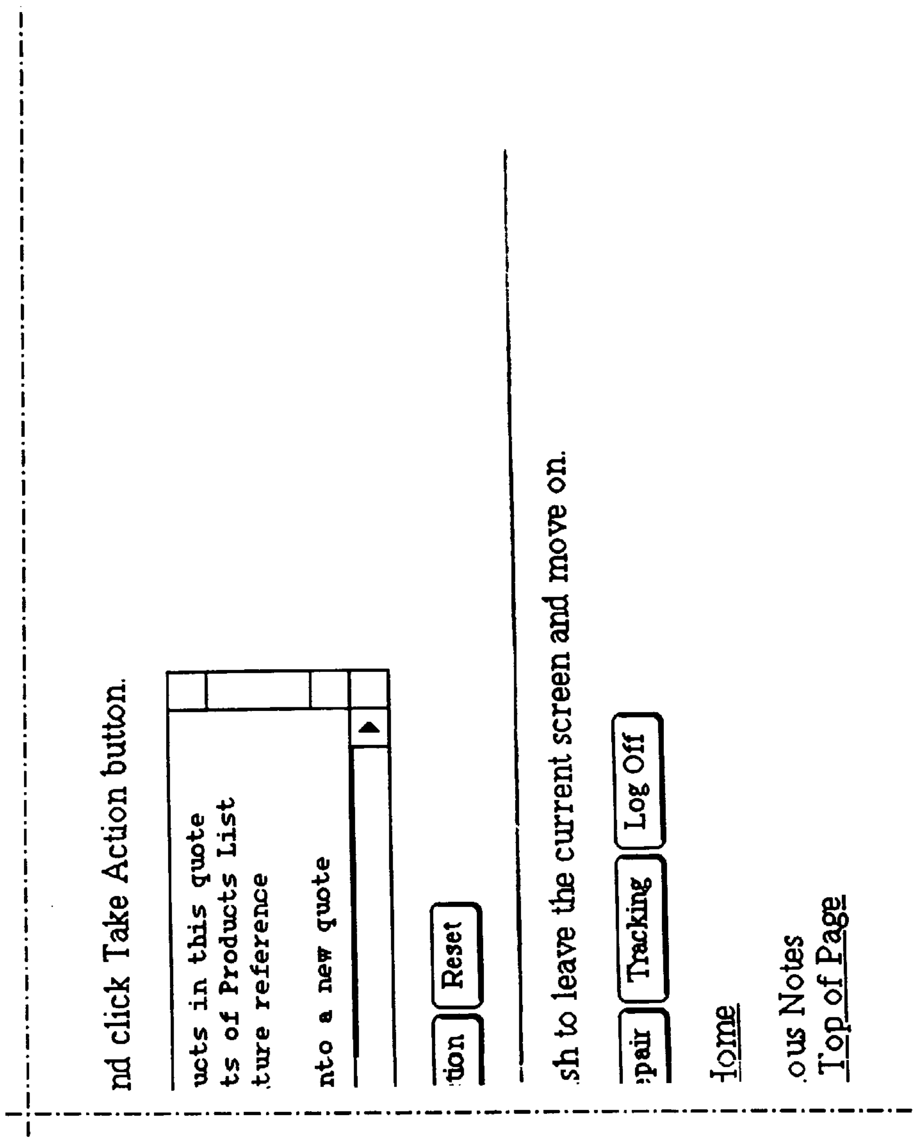
Figure 19:
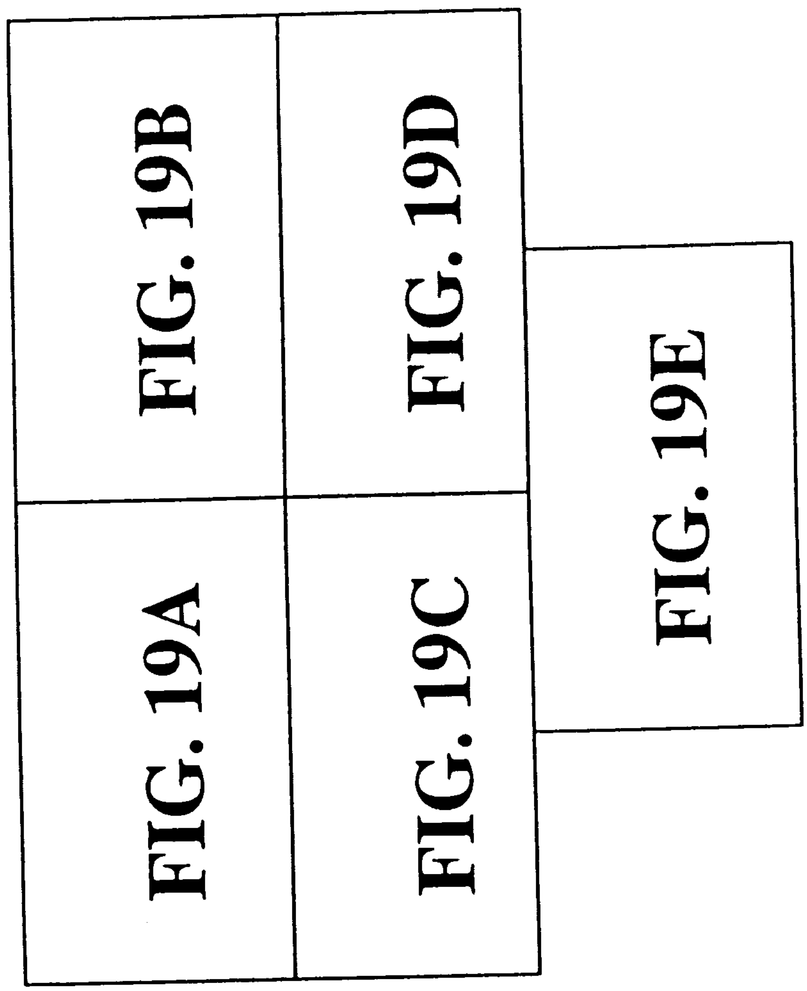
FIG. 19 is an illustration of an Installation—Selection screen display.
Figure 19D:
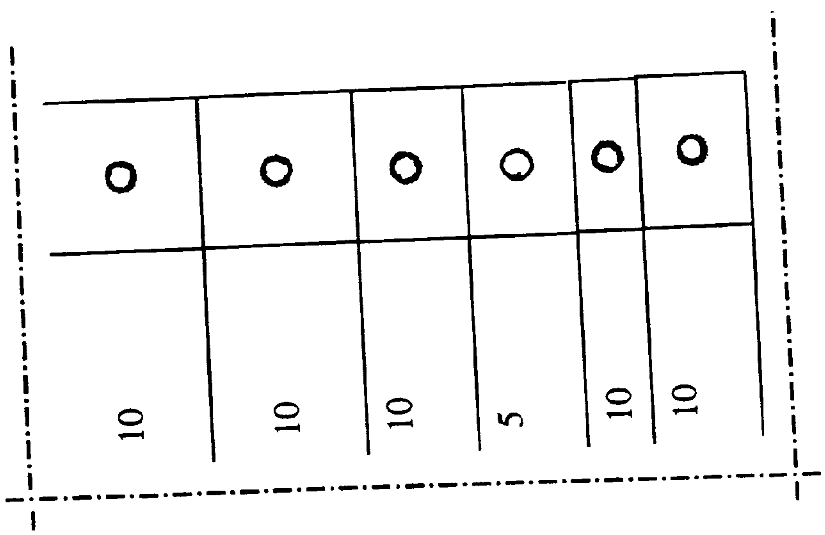
Figure 19E:
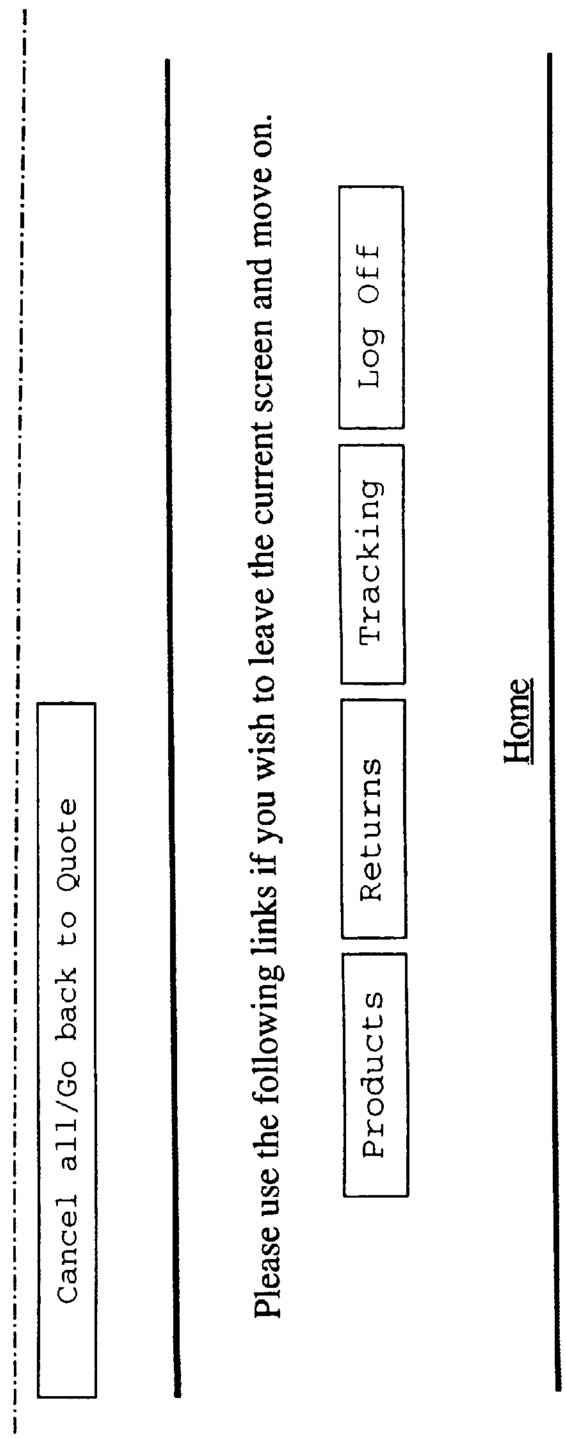
Figure 21:
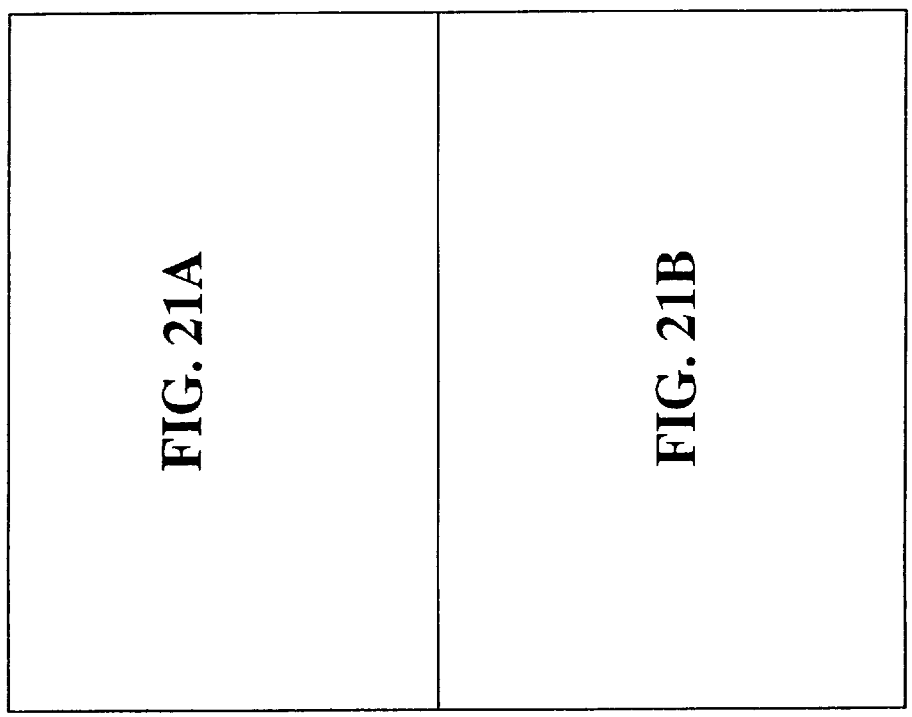
FIG. 21 is an illustration of still a further installation screen display.

A large and complex order may require detailed installation instructions. Consistent with the "phones free" philosophy of the present software, even complicated installation instructions may be conveniently conveyed using the Web. Referring more particularly to FIG. 18, showing a display of a quote, an installation button is provided. When the user clicks the installation button, a page such as that of FIG. 19 is displayed, affording the user an opportunity to select a system for which installation instructions are to be specified. The user selects a system ("primary item") and clicks the continue button. A page such as that of FIG. 20 is then displayed. An item may have multiple item details, some or all of which are to have installation performed. The user selects the number of systems to have installation performed, then clicks continue. A page such as that of FIG. 21 is then displayed, showing the other quoted items ("secondary items" available as components to be installed within the foregoing primary item). The user selects items to be installed in the system, specifying quantity (i.e., multiple item details may be installed in a single system).

In the embodiment described, a single configuration is specified for all 10 systems. In other embodiments, different configurations may be specified for different numbers of the total number of systems.

Figure 22:
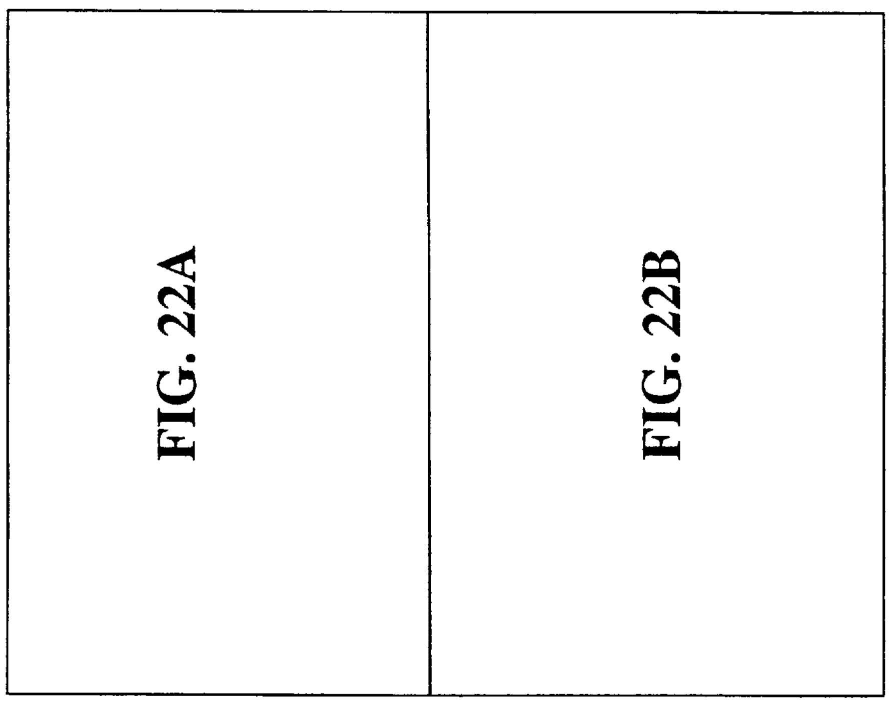
FIG. 22 is an illustration of a Return Merchandise Request screen display.
Figure 22B:
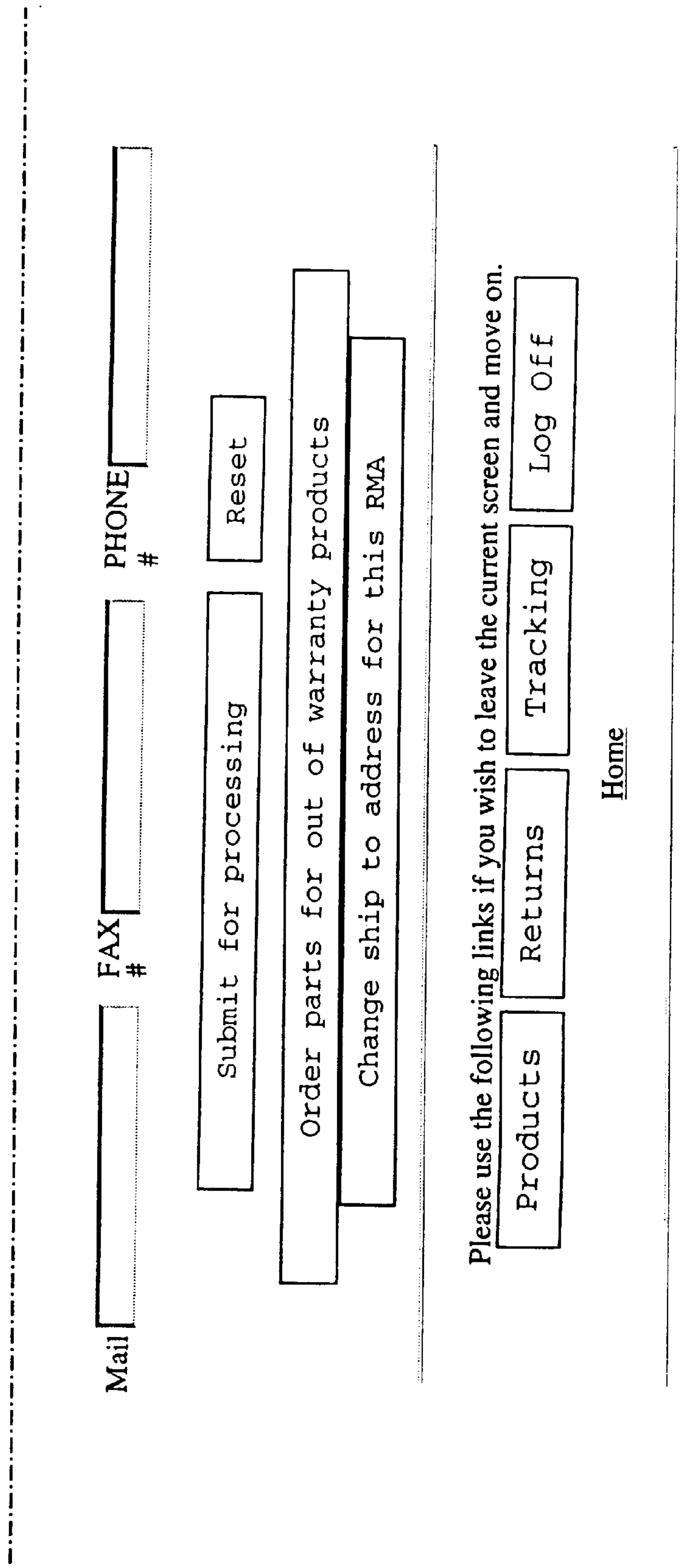
Figure 23:
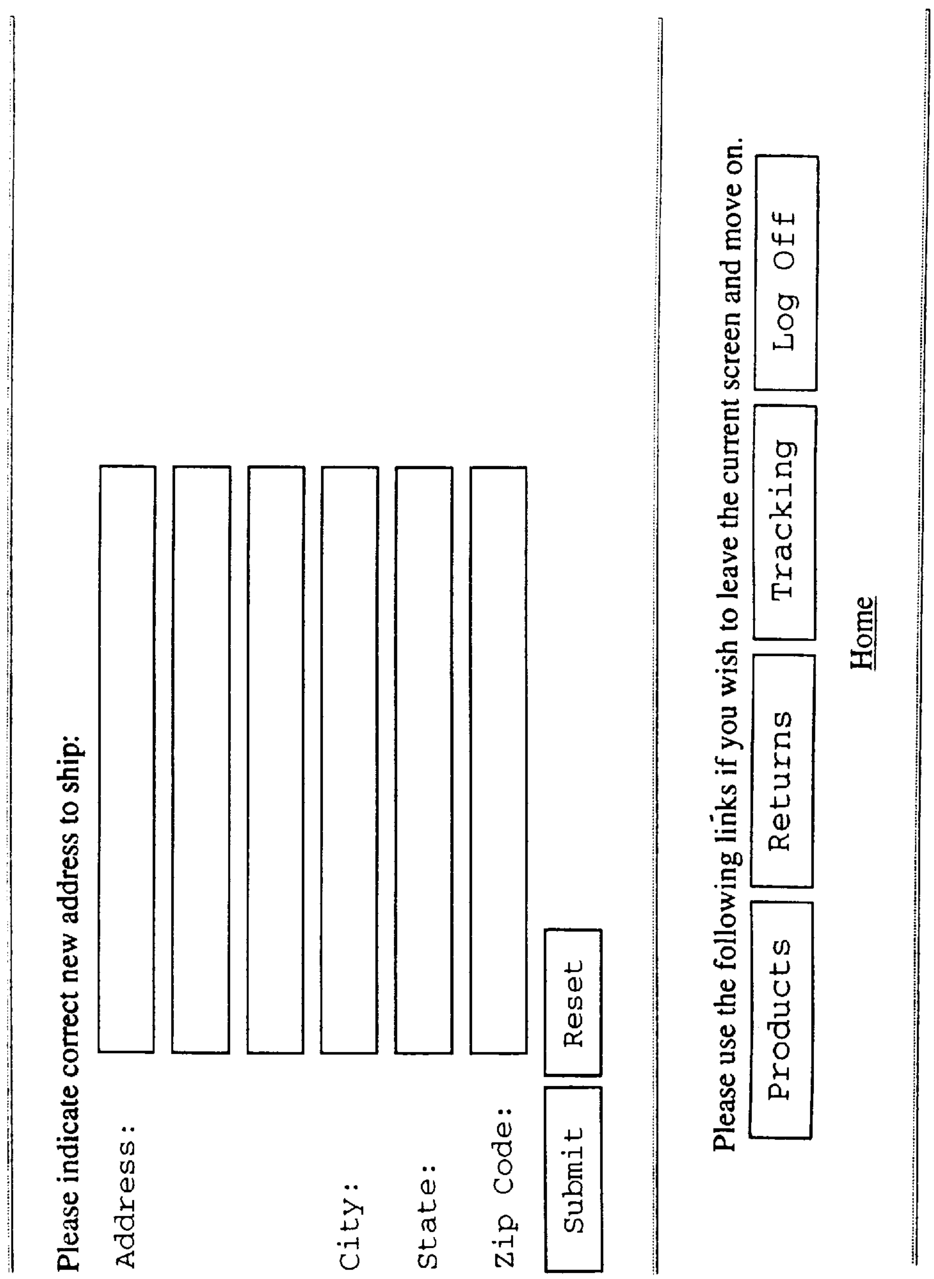
FIG. 23 is an illustration of a Change RMA Ship-To Address screen display.

Besides product display, ordering, and installation, returns and tracking are vital capabilities provided as part of the same Web user interface. Selecting Returns from a home page or a Returns link from any of the previously described pages causes a page such as that of FIG. 22 to be displayed. The user enters identifying information about a product to be returned (e.g., Customer PO#, Customer Invoice#, manufacturer), checks a "radio button" to specify the product's condition (unopened, used, etc.) and select a return type from a menu (e.g., wrong product, defective product, etc.). The seller, with the help of the system, assumes the responsibility of identifying the product based on whatever piece or pieces of information the user is able to provide. For example, the user may know the asset tag number of a product by looking at the product but may have not further information about the product. A text box is provided for the user to enter addition details, if necessary, and fields are provided for the user to enter phone and fax numbers and the user's email address. The page also calls for the user to provide information concerning the condition of the product (opened, unopened, etc.) The RMA request may then be submitted for processing. Prior to submitting an RMA request, the user may wish to change the ship-to address if a replacement product is to be shipped. When the corresponding button is pressed, a page such as that of FIG. 23 is displayed for this purpose.

Figure 24:
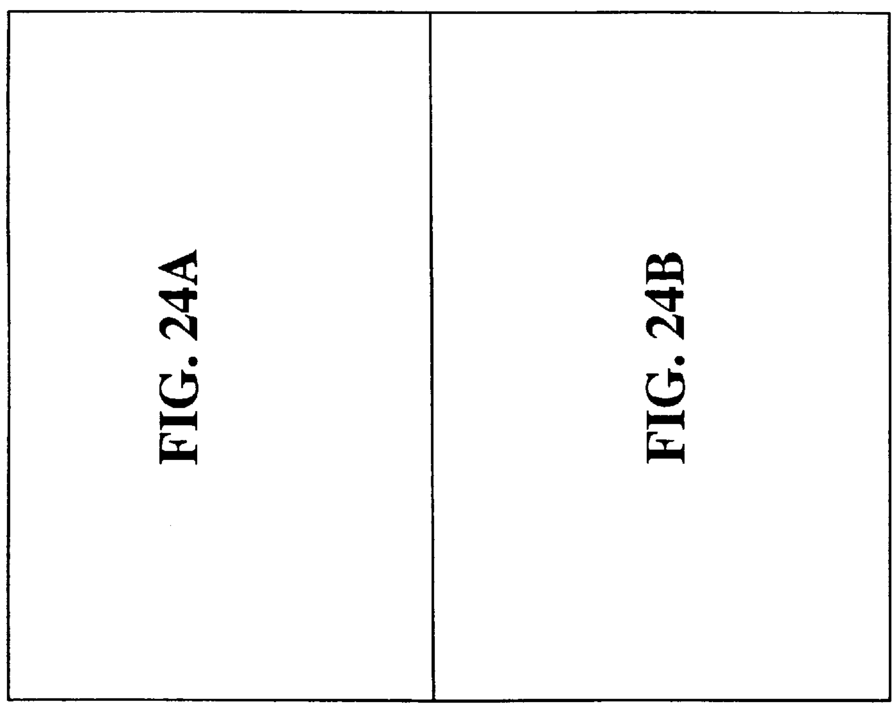
FIG. 24 is an illustration of a Returns—Order Parts screen display.
Figure 24A:
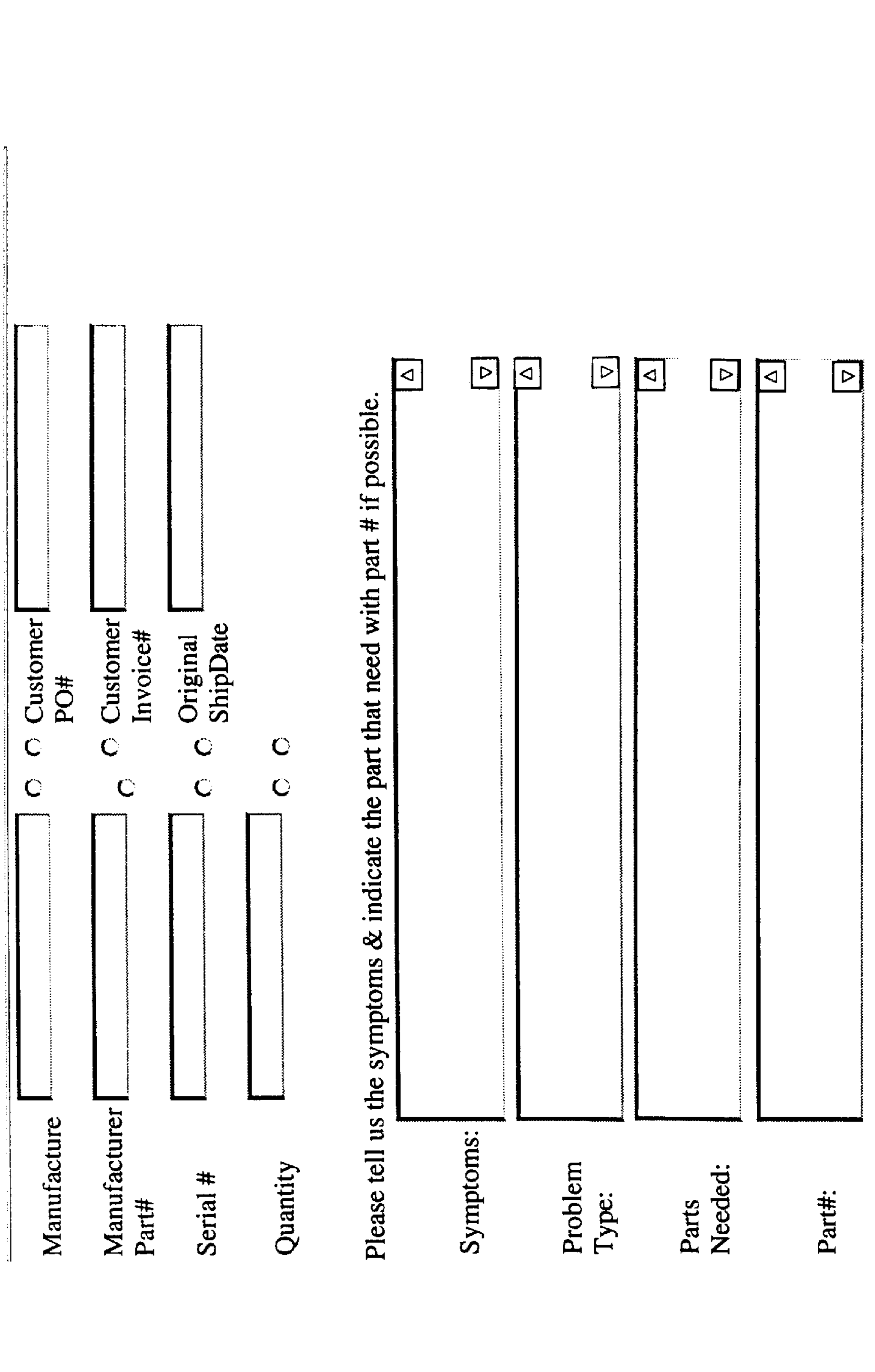
Figure 24B:
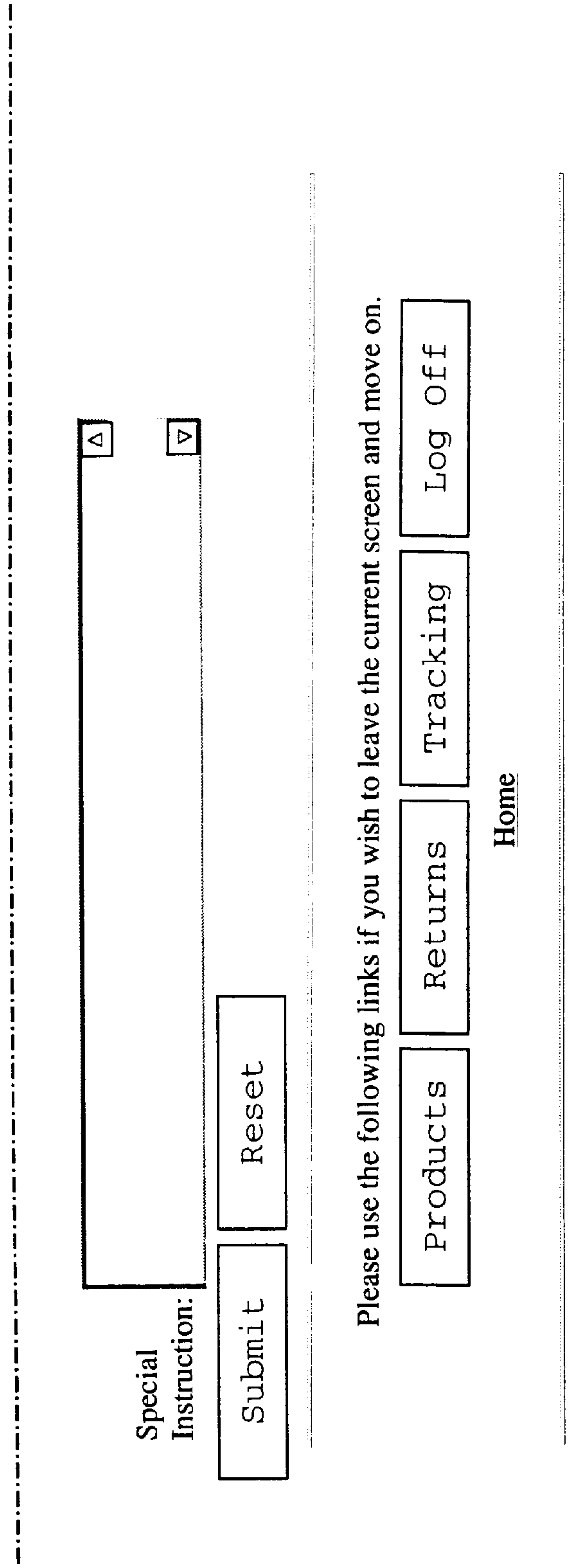

Referring again to FIG. 22, ordering parts for out-of-warranty products is provided for on the same page as RMAs, inasmuch as a transaction is needed that relates back to a previous transaction. When the user presses the corresponding button, a page such as that of FIG. 24 is displayed. As with an RMA request, the user enters identifying information about the previously-purchased product. Text boxes are then provided for the user to describe the product malfunction, type of problem, parts needed, etc.

Figure 25:
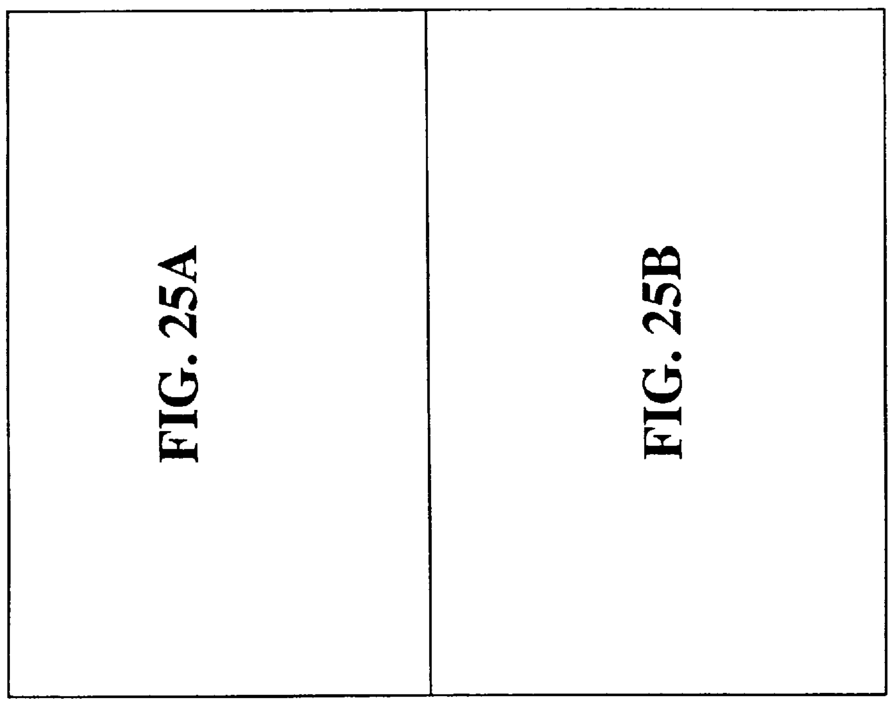
FIG. 25 is an illustration of a first-level Tracking screen display.
Figure 25A:
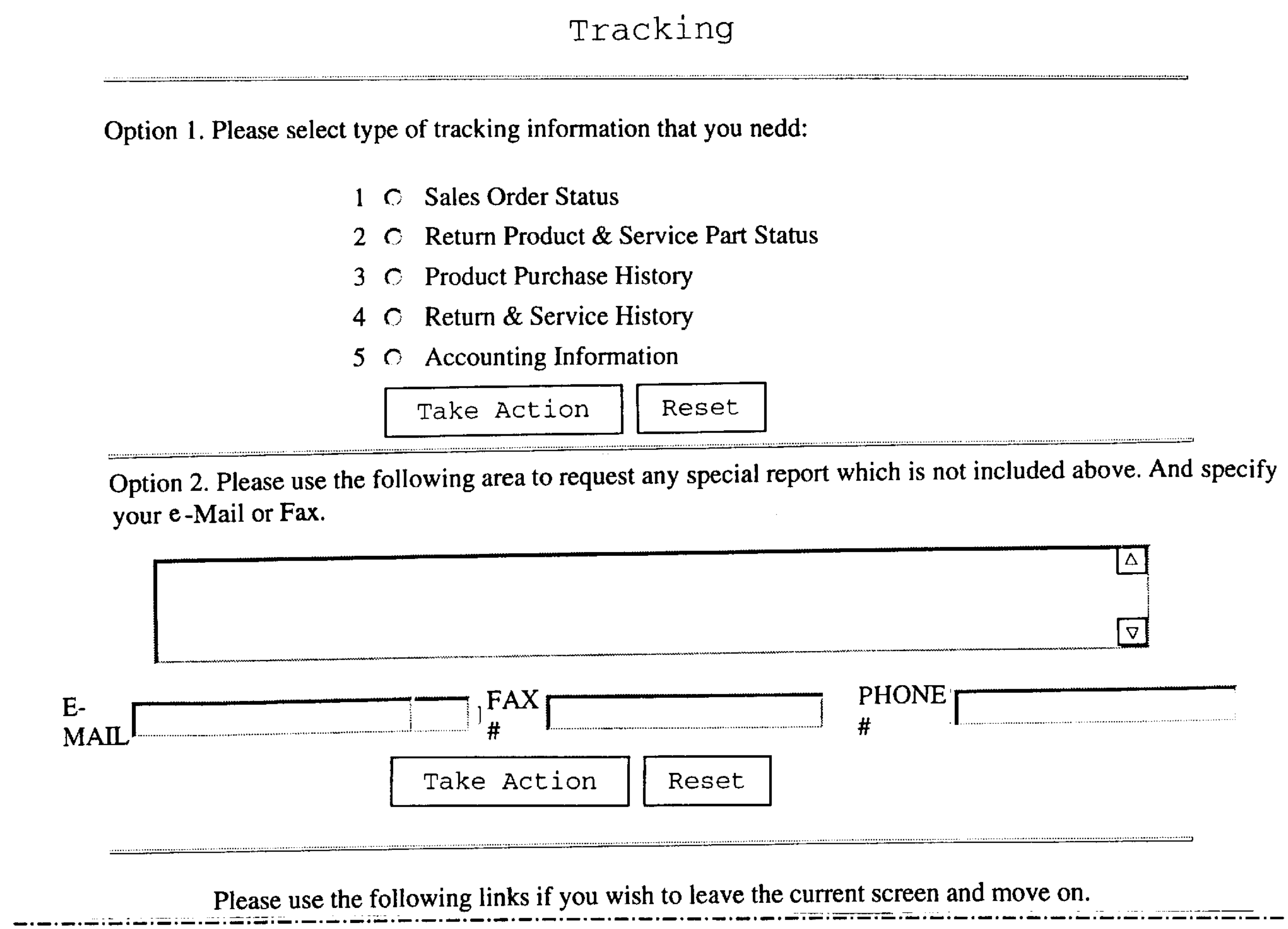
Figure 25B:
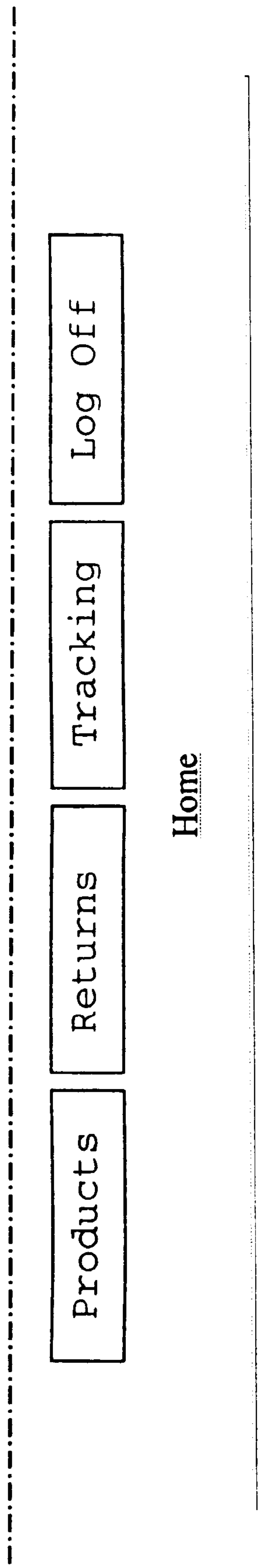

Most often, parts will not be ordered by the customer but rather by service personnel. Nevertheless, customers are able to track the status of the part order themselves. Navigating to a Tracking page, FIG. 25, causes this option and various other tracking options to be displayed. From this page, the customer can track sales order status, RMA and service part status as just described, product purchase history, return and service history, customer invoice and credit memo status, etc. A text box for special comments and phone/fax/email fields are provided as before.

Figure 26:
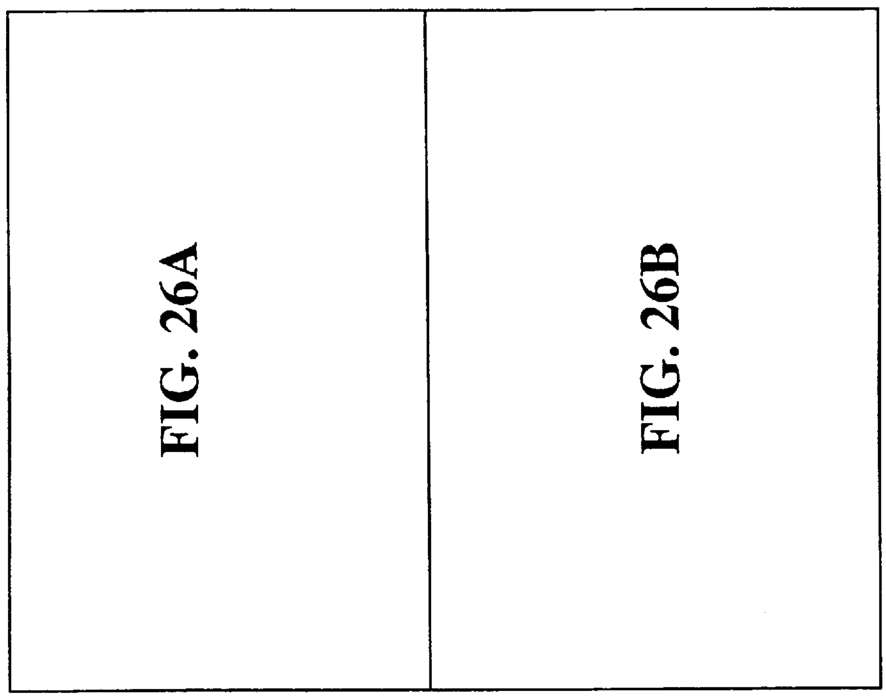
FIG. 26 is an illustration of a Tracking—Sales Order Status screen display.
Figure 26A:
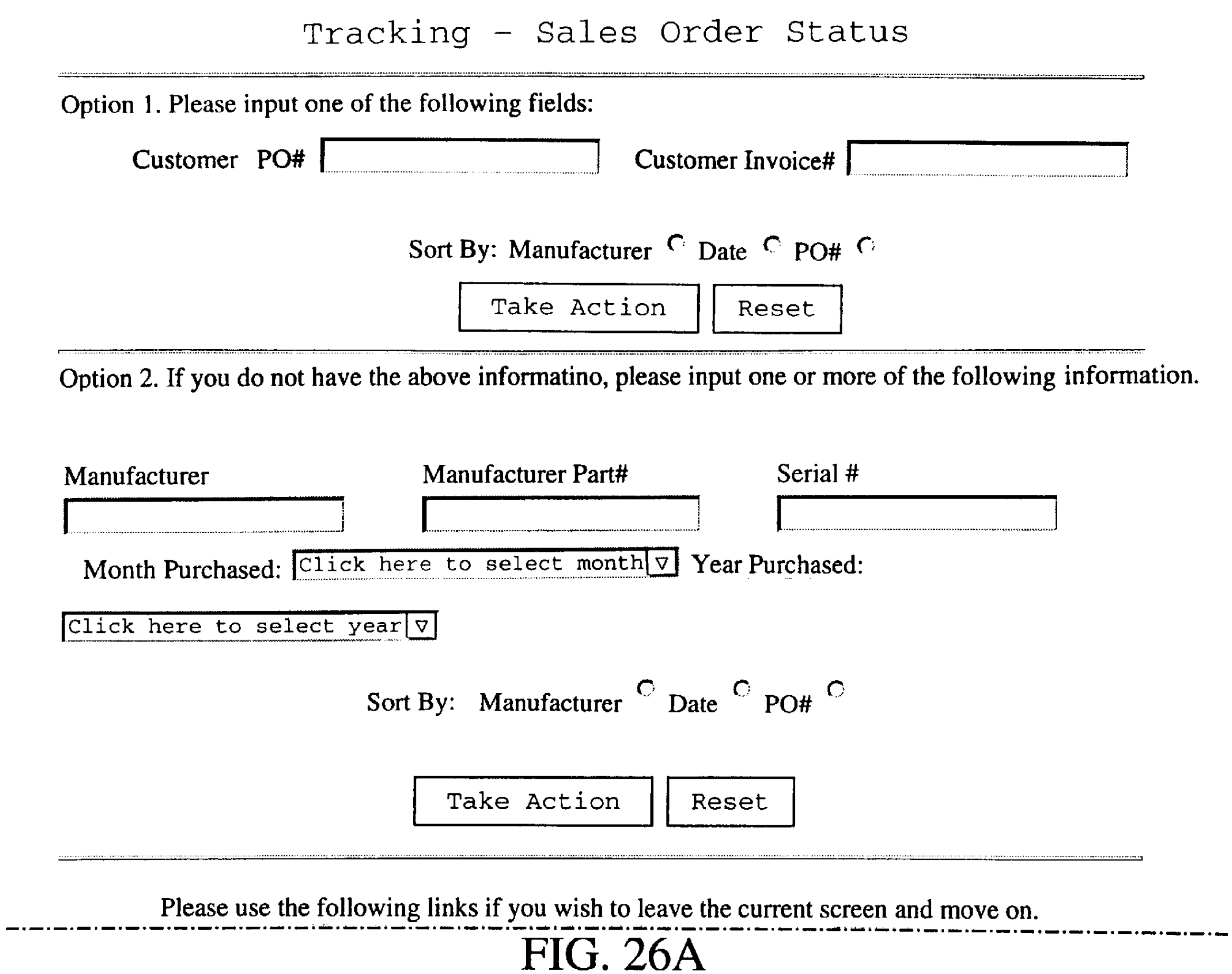
Figure 26B:
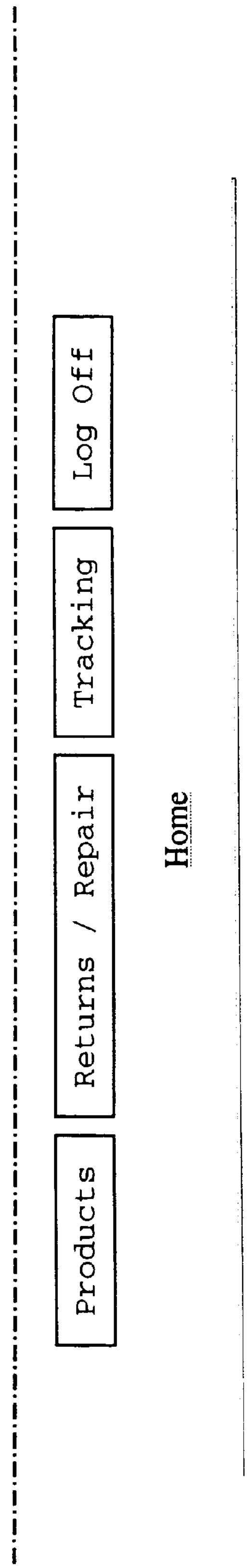
Figure 27E:
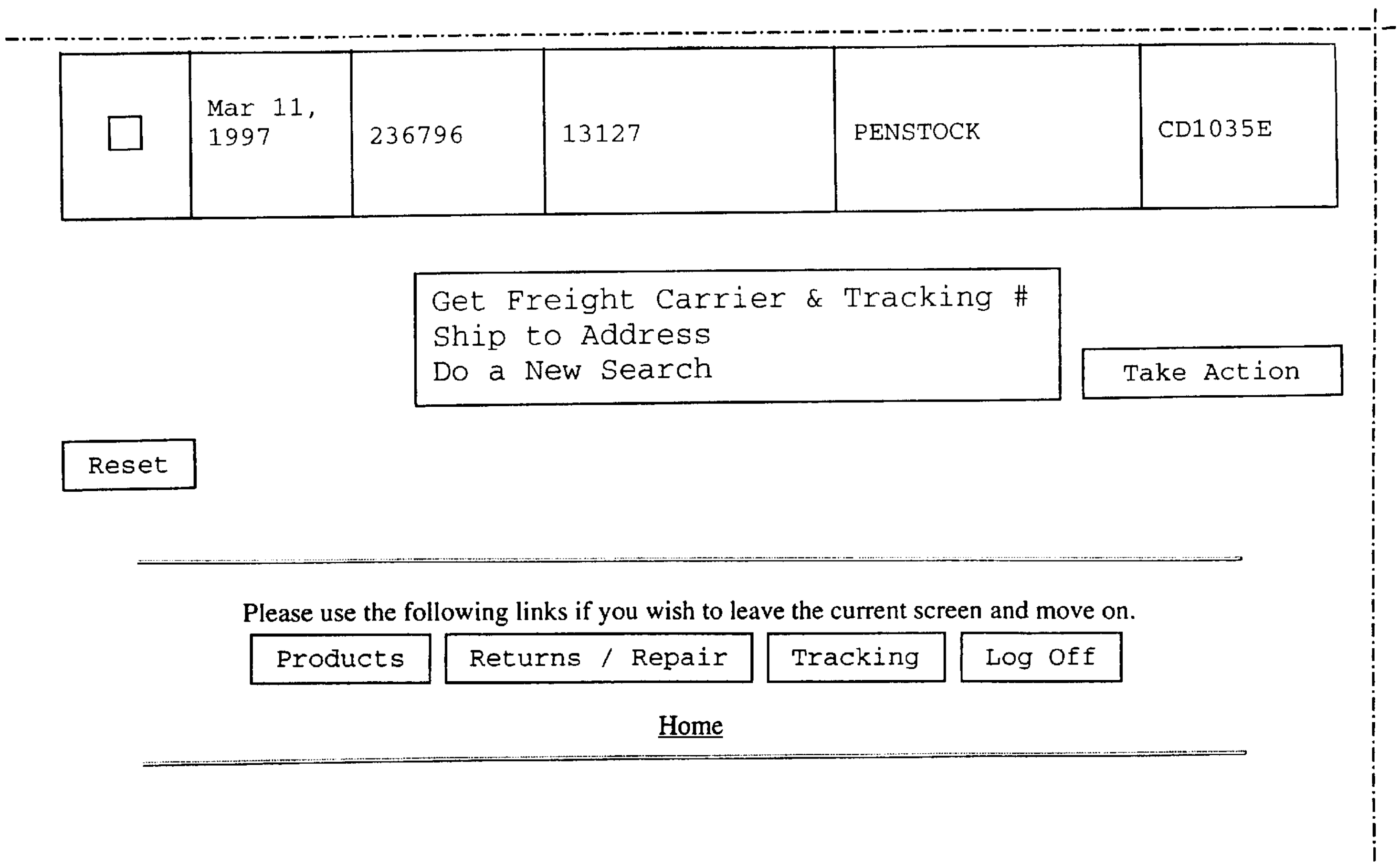
FIG. 27 is an illustration of a search results screen display.
Figure 27F:
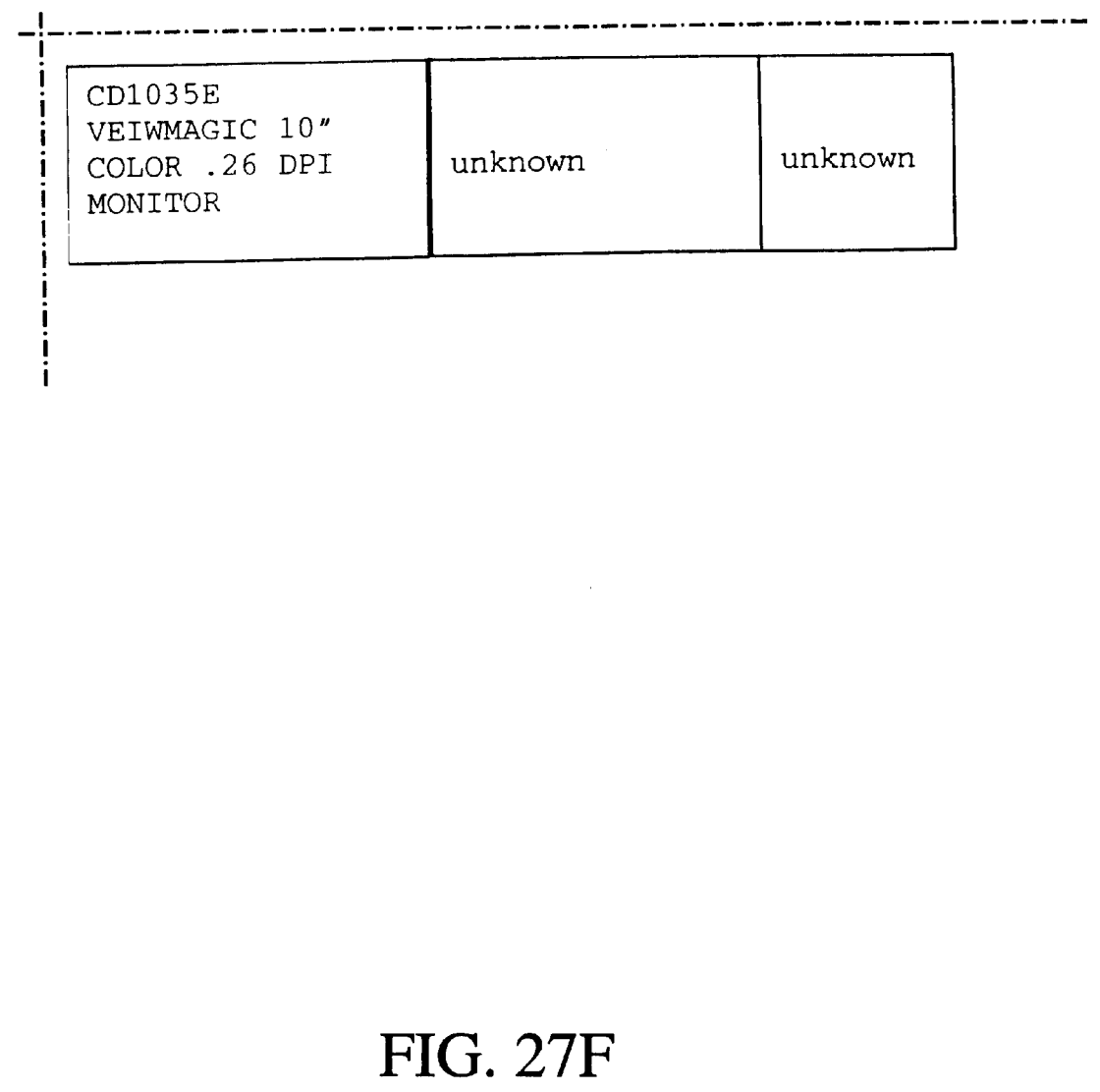

Selecting Option 1, Sales Order Status, causes a page such as that of FIG. 26 to be displayed. Two different methods are provided for retrieving sales order status information. The first method involves the user inputting either a customer PO number or customer invoice number. The second method involves the user inputting one or more of various other identifying pieces of information, e.g., manufacturer, manufacturer part number, serial number, month purchased, etc. Both methods allow for the resulting records to be sorted in various way in accordance with the user's preference. FIG. 27, for example, shows search results sorted by manufacturer.

Figure 28:
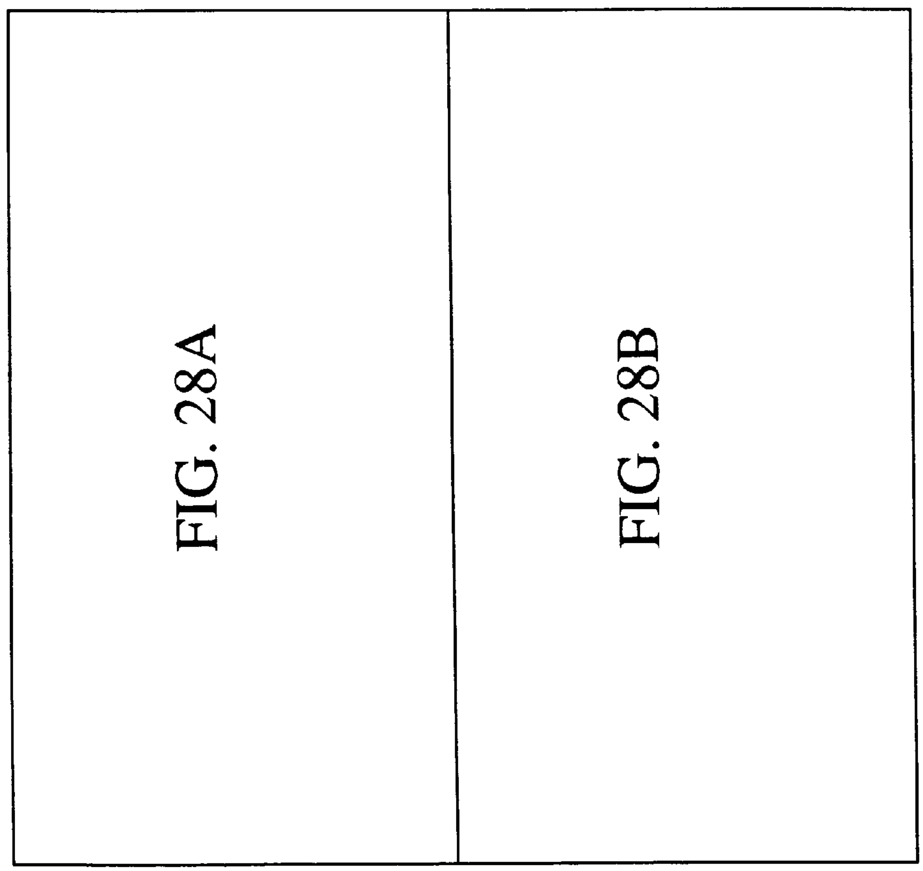
FIG. 28 is an illustration of a further Tracking screen display displaying freight carrier and tracking information.
Figure 29:
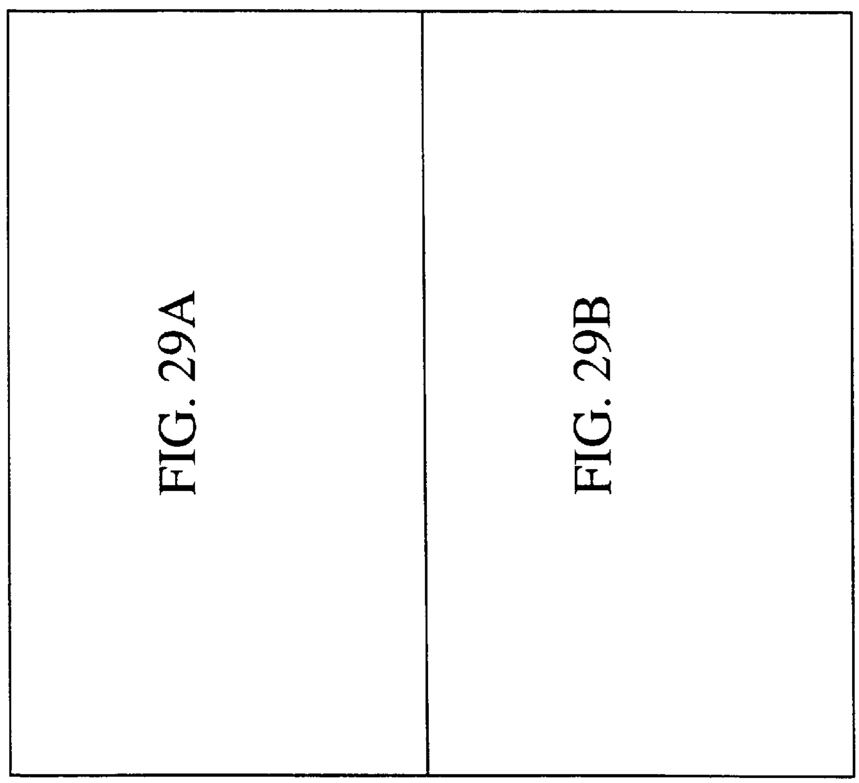
FIG. 29 is an illustration of a linked-to UPS tracking screen display.
Figure 29A:
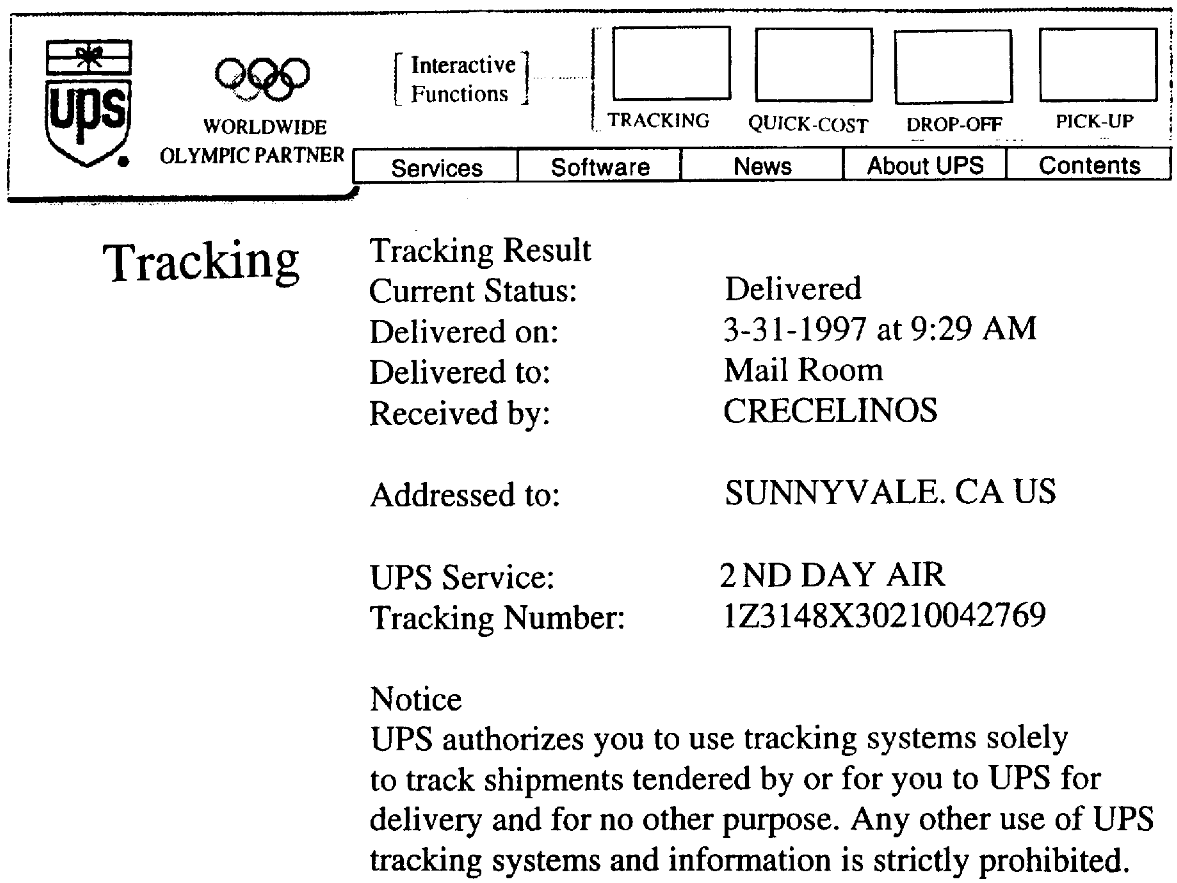

By checking selected items and selecting a Get Freight Carrier and Tracking Number menu item, a display such as that of FIG. 28 results. By clicking the Track It button, a link is followed to a tracking page of the carrier used to ship the item, United Parcel Service (UPS) for example. A UPS tracking screen is shown in FIG. 29. Referring again to FIG. 27, by checking selected items and selecting a Ship to Address button, a display such as that of FIG. 30 results.

Figure 31:
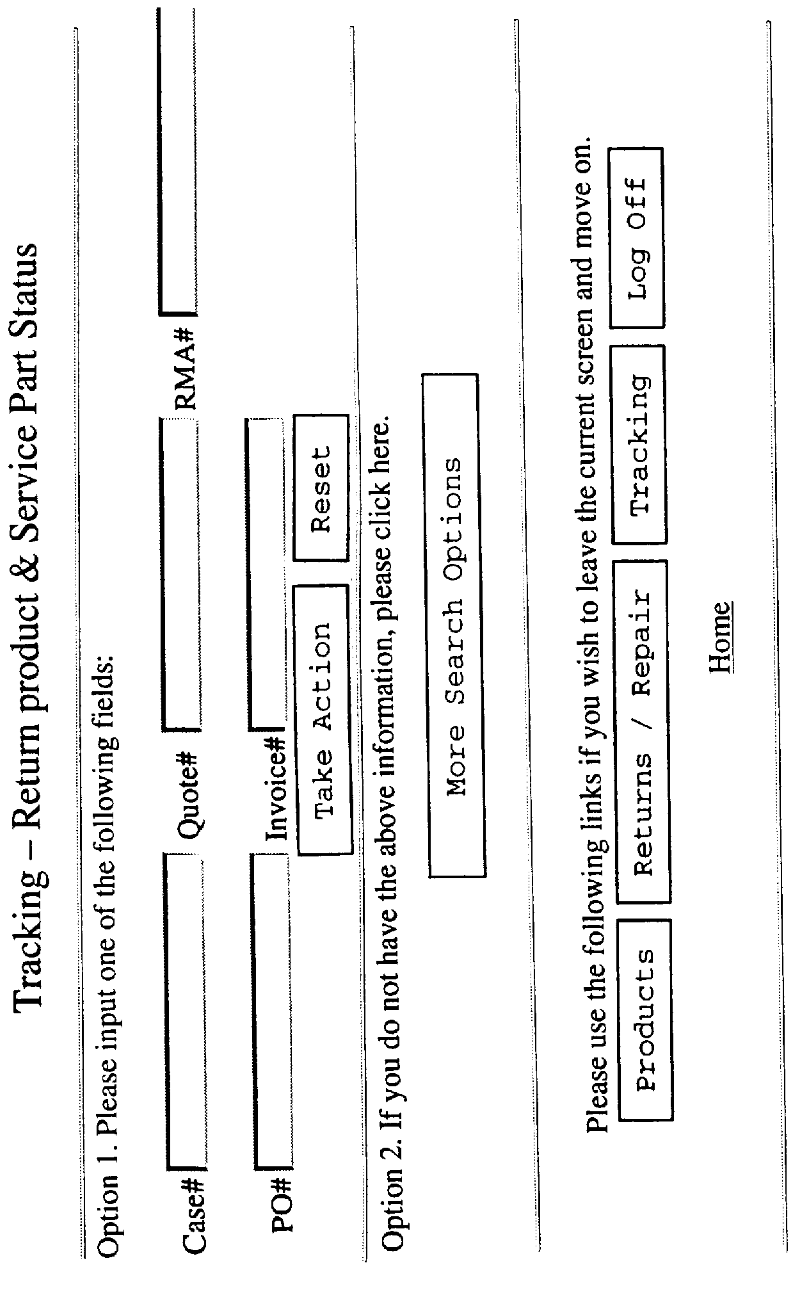
FIG. 31 is an illustration of a Tracking—Return Product and Service Part Status screen display.
Figure 32:
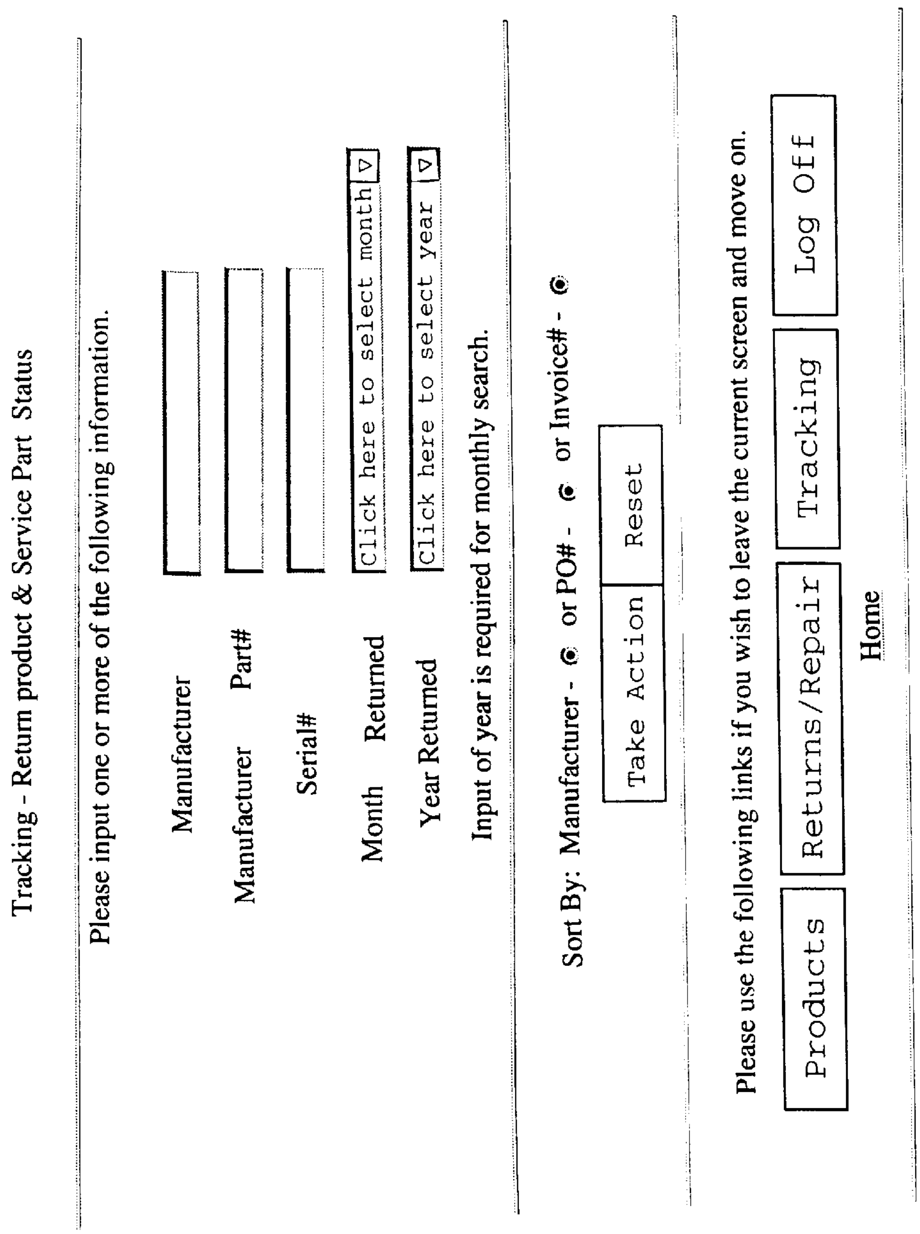
FIG. 32 is an illustration of a further Tracking screen display displaying more search options.
Figure 33:
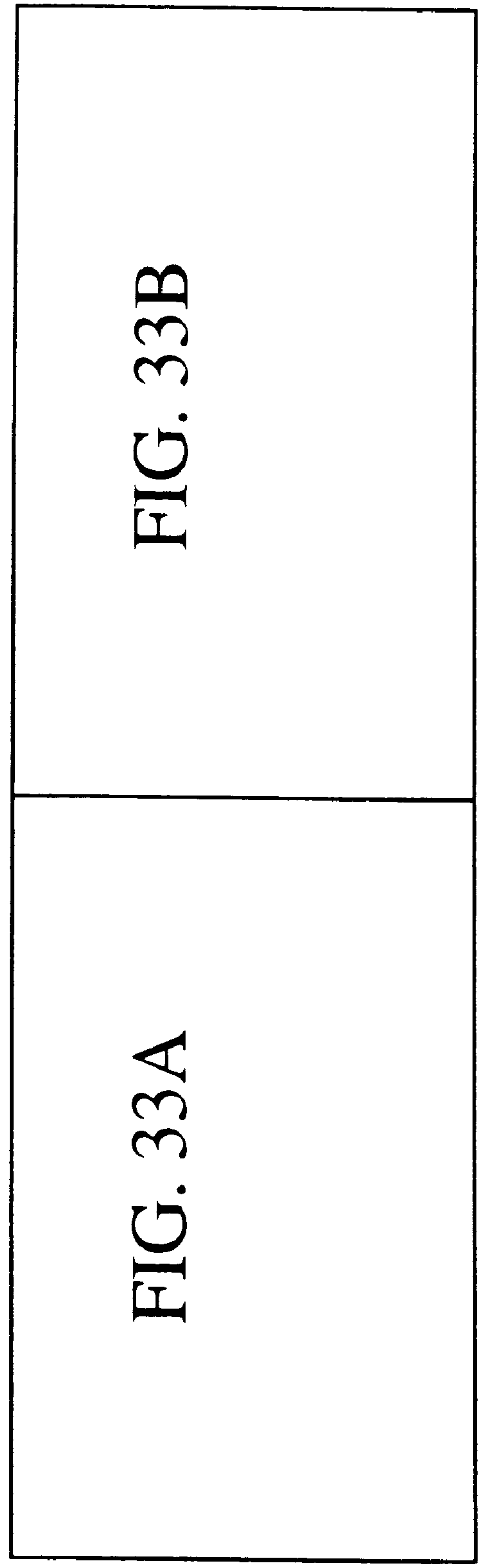
FIG. 33 is an illustration of still a further Tracking screen display displaying search results.

Referring again to FIG. 25, selecting Option 2, Return Product and Service Part Status, causes a page such as that of FIG. 31 to be displayed. By means of this page, the user can search by case number, quote number, RMA number, PO number or invoice number, for example (Option 1) or can request more search options (Option 2). Clicking for more search options causes a page such as that of FIG. 32 to be displayed. When the requested search has been completed, the resulting records are displayed as shown in FIG. 33.

The ability to track parts on the Web has far-reaching implications. A large corporation may have hundreds or thousands of computer technicians working continuously to many thousands of networked computers working properly. When a user's machine goes down, the user might notify a person in the user's department having computer responsibilities, who might in turn contact the MIS department, which would then contact the technician to do the actual work. The technician, once he or she ascertains where the computer was purchased, might then contact the appropriate sales representative within that company for a replacement part. Within the company, other personnel having responsibilities for customer service, RMAs, and shipping and receiving, as well as supervisory personnel and ultimately the equipment vendor, may then become involved. Because many people are involved on both on the customer side and the seller side, absent the present system, the result is a flurry of activity, emails, phone calls, etc. The user, impatient for his computer to be fixed, call the department computer person, who calls, MIS, which calls the technician, which calls the seller's salesman, etc. When the part is received, it may be shipped to the technician, to the department or to the end user, perhaps without a clear understanding on the part of all parties involved.

Using the present system, on the other hand, all parties have simultaneous access to up-to-date information about the status of the part, whether it has been ordered, received, shipped, the ship-to address, etc.

Figure 34:
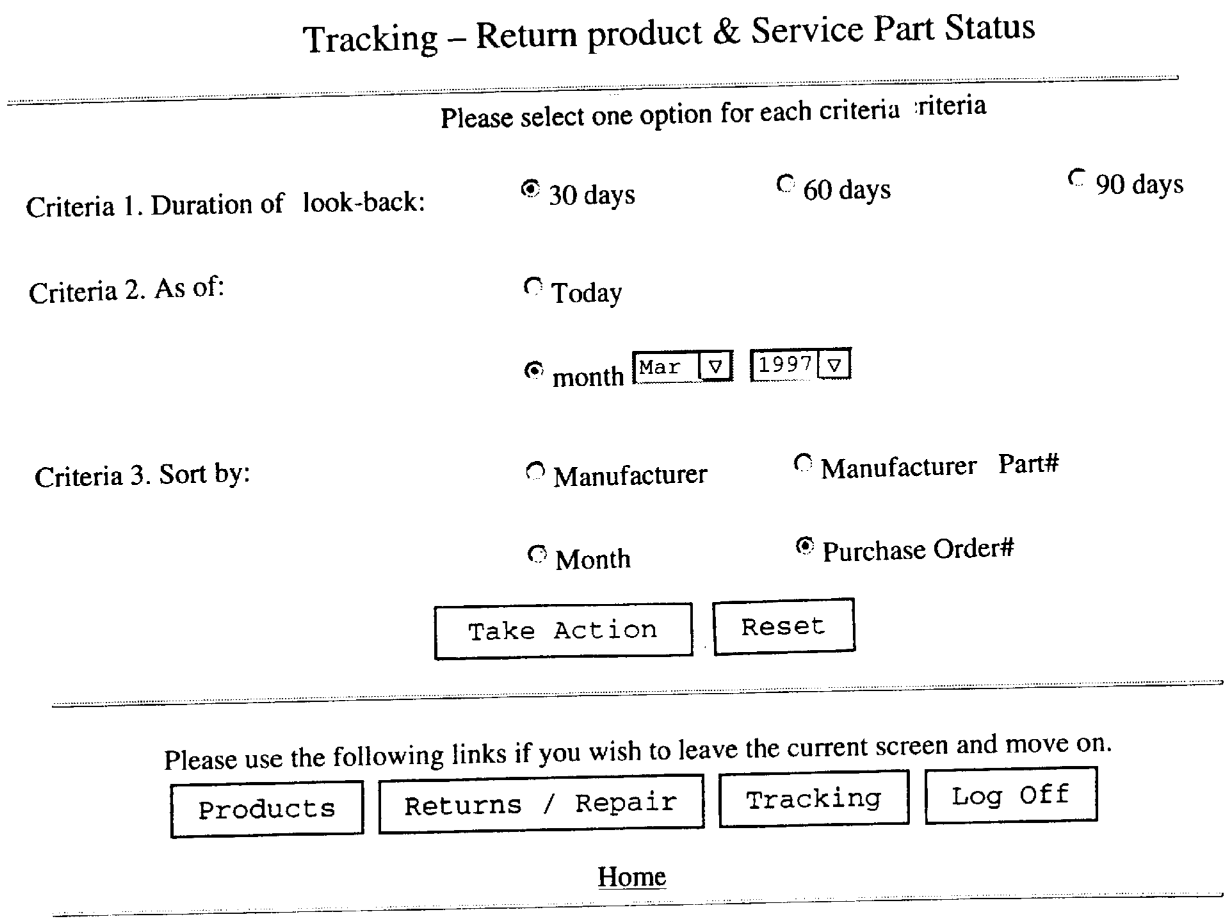
FIG. 34 is an illustration of a Tracking—Product Purchase History screen display.
Figure 35:
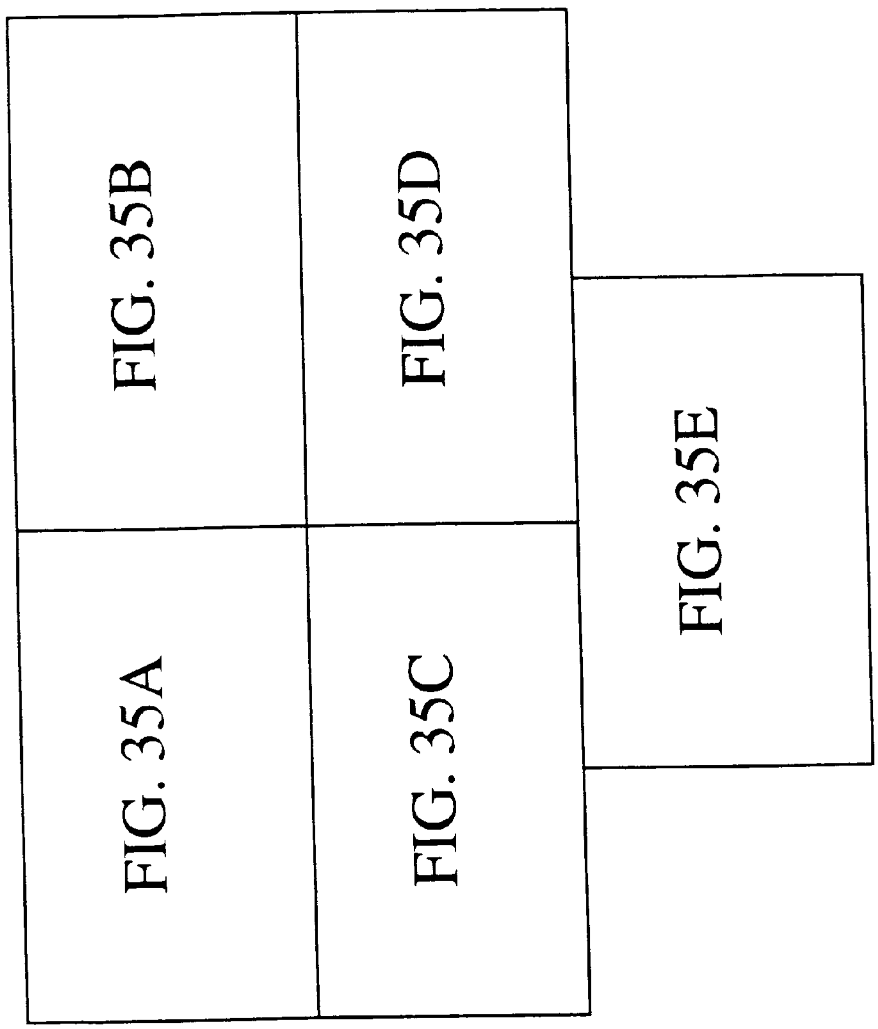
FIG. 35 is an illustration of a further Tracking screen display displaying search results.
Figure 37:
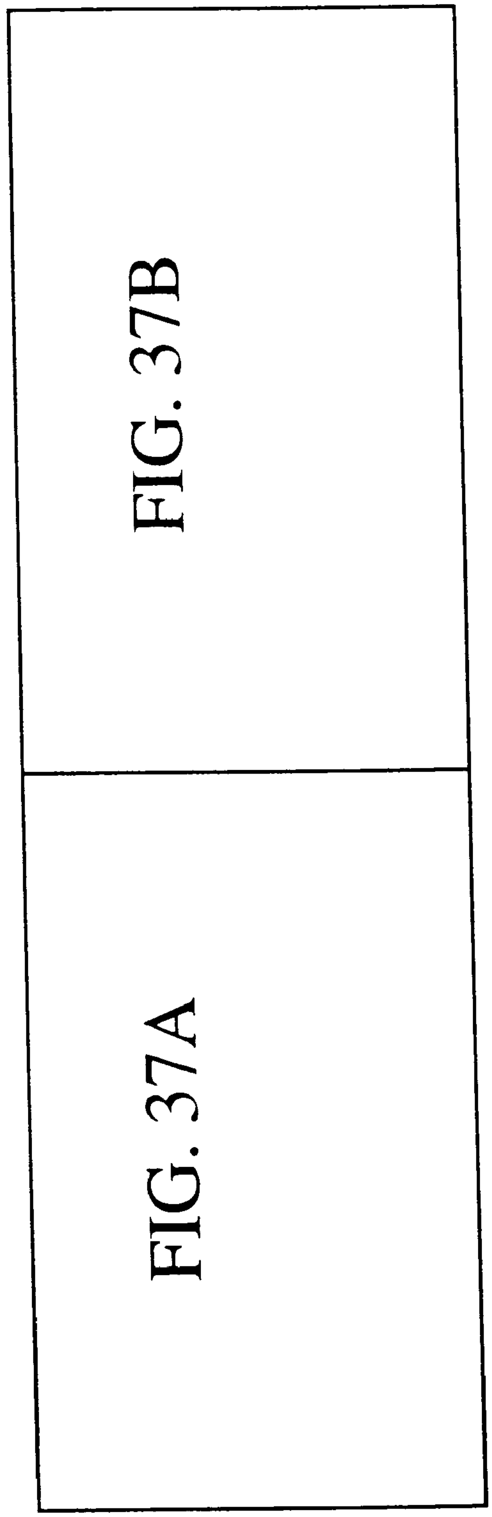
FIG. 37 is an illustration of a further Tracking screen display displaying search results.

Referring again to FIG. 25, selecting Option 3, Product Purchase History, causes a page such as that of FIG. 34 to be displayed. By selecting one option for each criterion, products purchased within a specified time window of a specified date may be found and displayed in sorted order according to the user's preference. FIG. 35, for example, shows a display of products purchased within a 30-day window up to and including March 1997, i.e., products purchased within the month of March 1997. Corresponding pages as those for Product Purchase History (FIG. 34 and FIG. 35) are also provided for Return and Service History (Option 4) as shown in FIG. 36 and FIG. 37, respectively.

Figure 38:
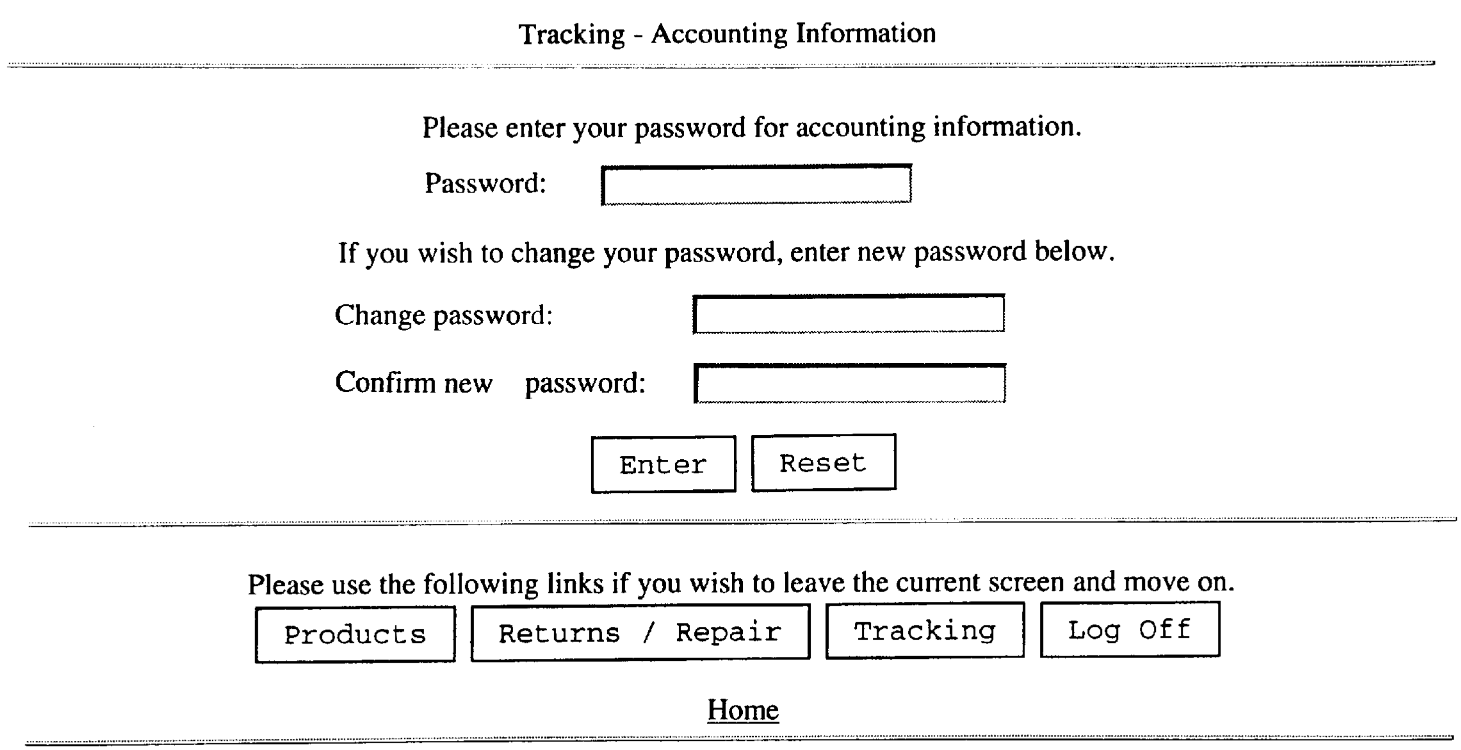
FIG. 38 is an illustration of a Tracking—Accounting Information screen display.

The last option, Option 5 in the illustrated embodiment, is an Accounting Information option. Selecting this option causes a page such as that shown in FIG. 38 to be displayed. Accounting information is password protected. If the correct password is supplied then one of two possible pages are displayed according to whether the user is a customer or a vendor.

Figure 39:
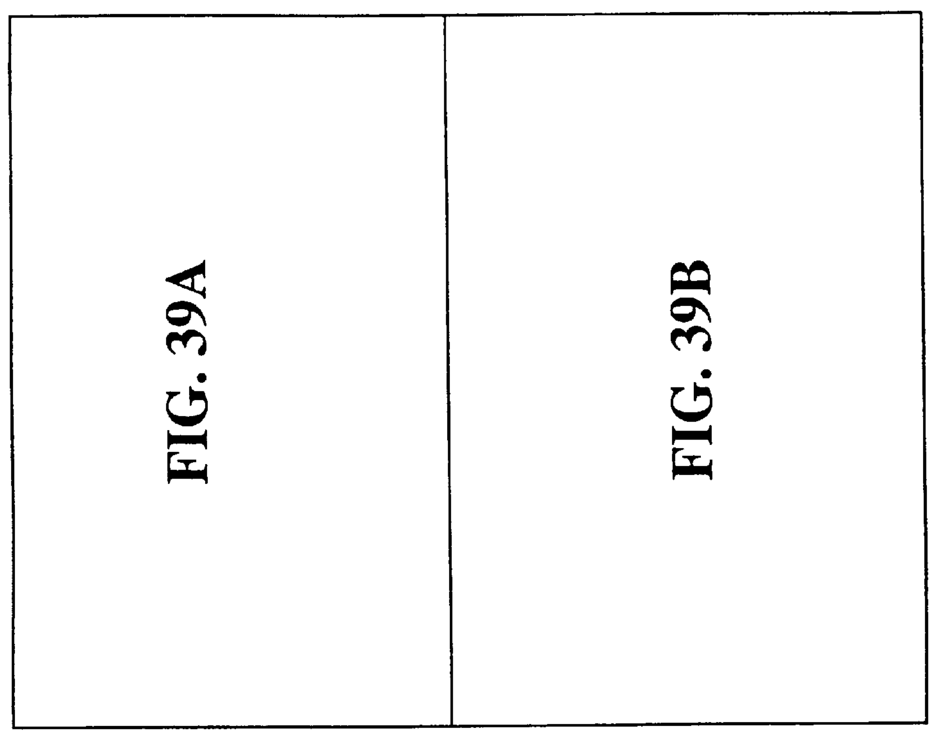
FIG. 39 is an illustration of a Customer Invoice screen display.
Figure 39A:
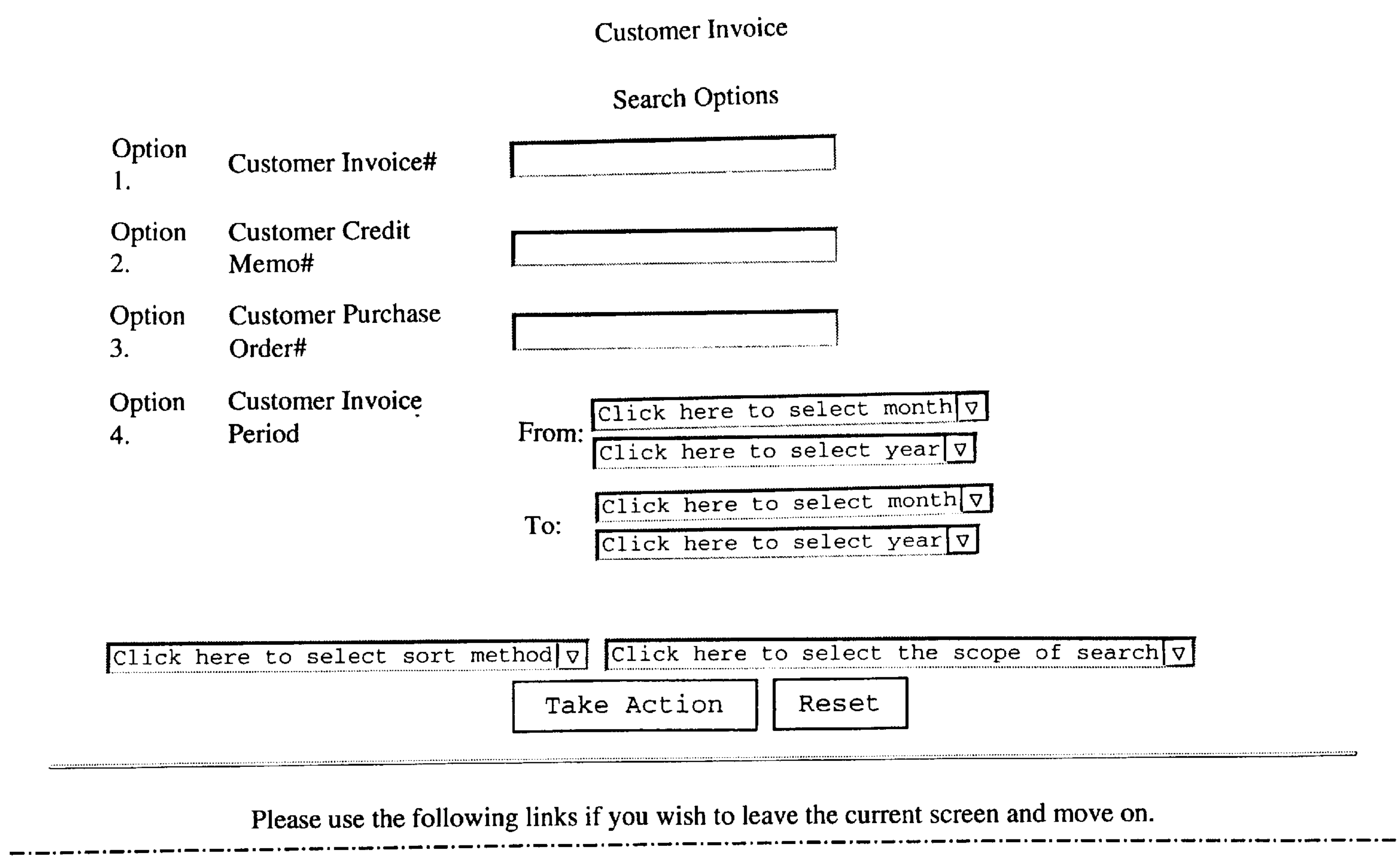
Figure 39B:
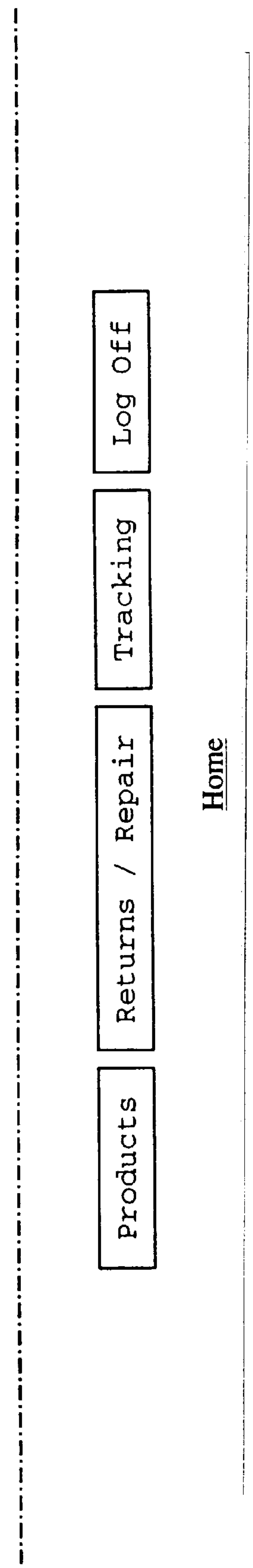
Figure 40:
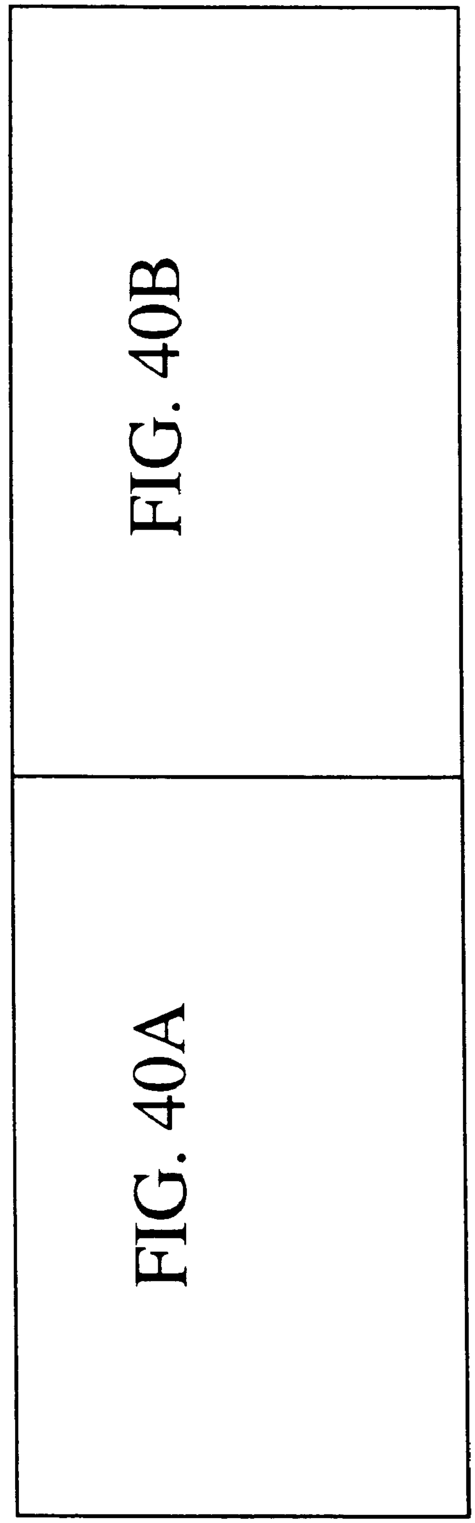
FIG. 40 is an illustration of a Customer Invoice Search Option screen display.
Figure 41:
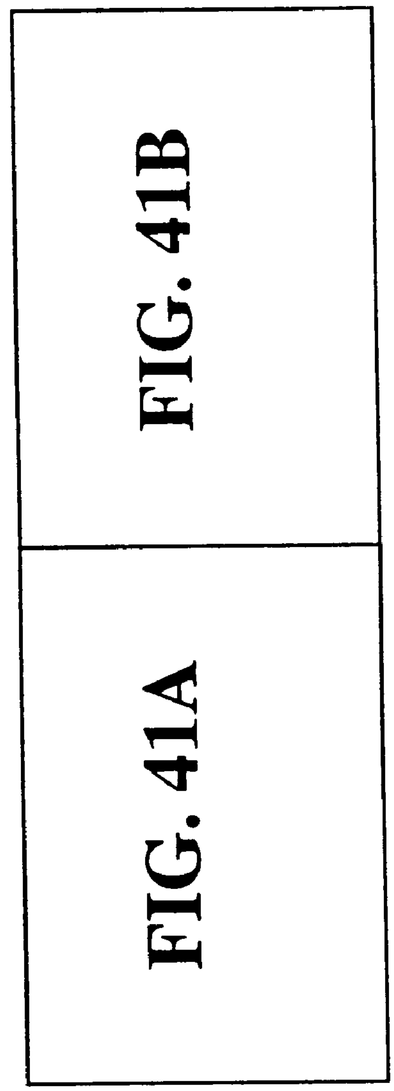
FIG. 41 is an illustration of a Customer Invoice Detail screen display.

If the user is a customer, then customer invoice search options are displayed as shown, for example, in FIG. 39. FIG. 40 shows a display of customer invoice records resulting from a search, in this example a customer invoice that was partially paid and a credit memo the credit of which has not been fully taken. Further details regarding a record may be shown by checking the corresponding box and clicking the Take Action button. A display such as that of FIG. 41 then results.

Figure 42:
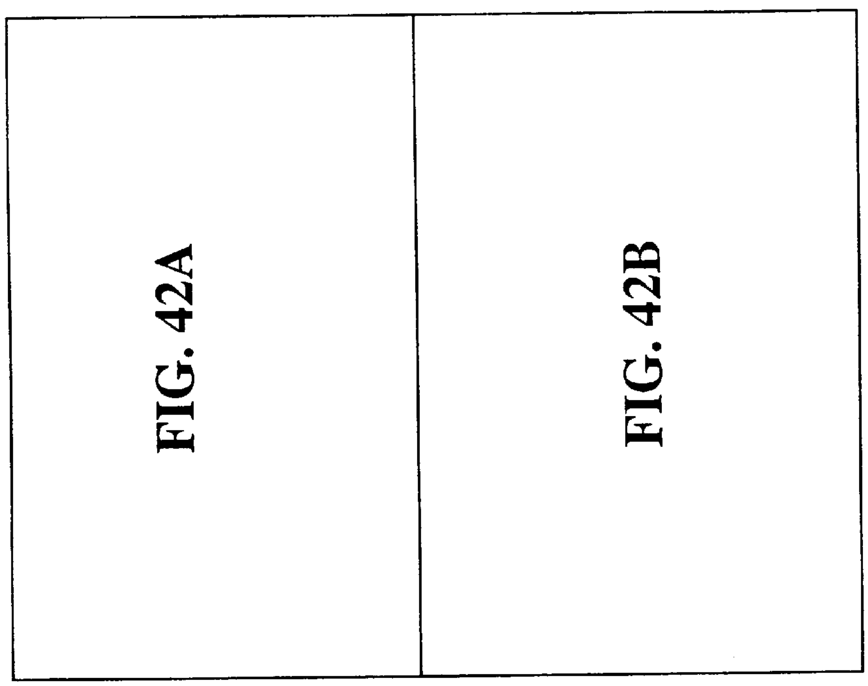
FIG. 42 is an illustration of a Vendor Invoice screen display.
Figure 42A:
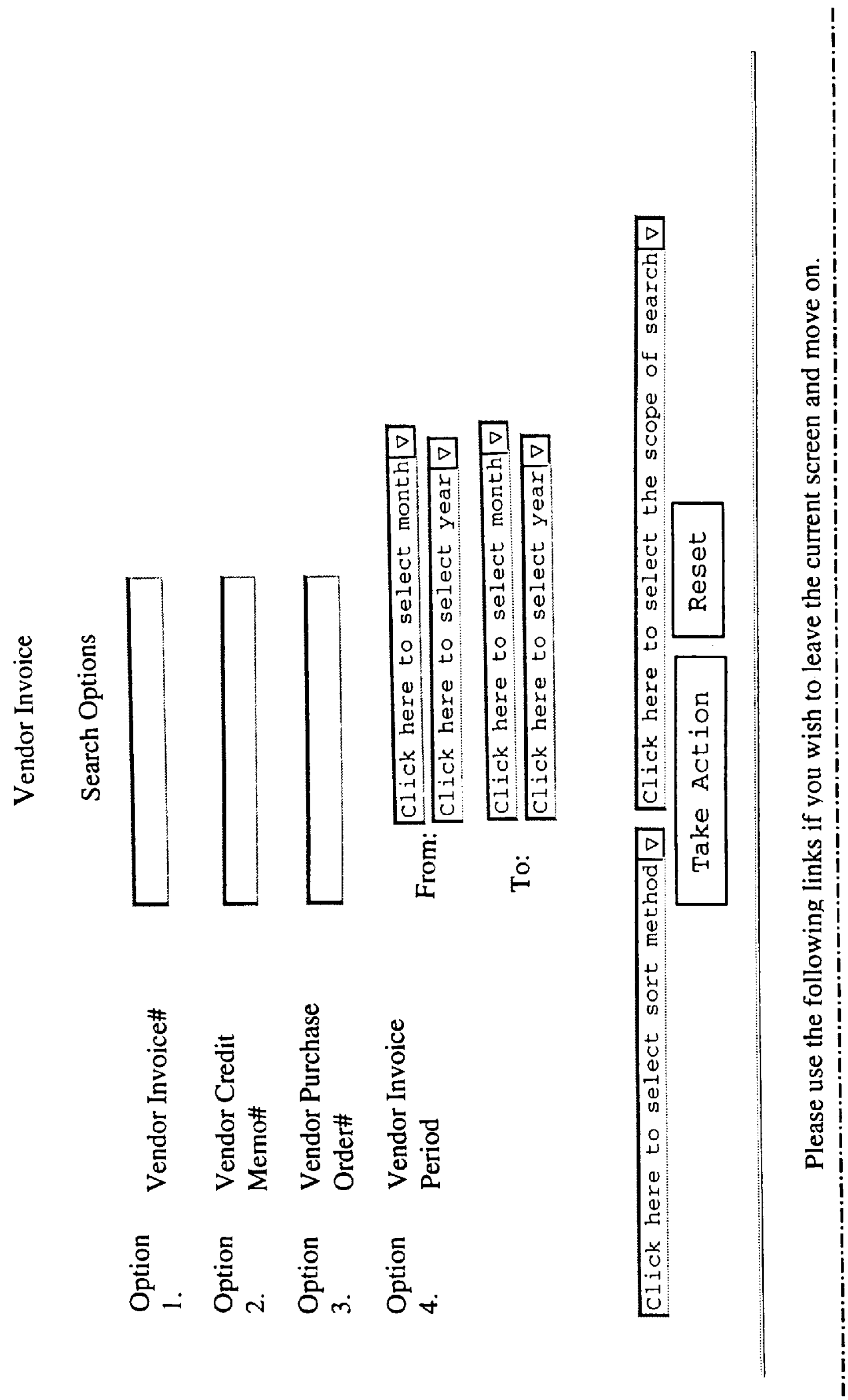
Figure 42B:
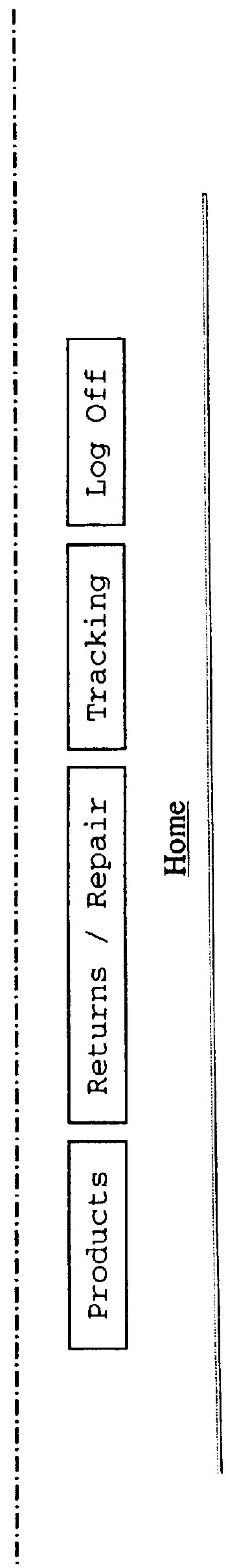
Figures 43, 43A:
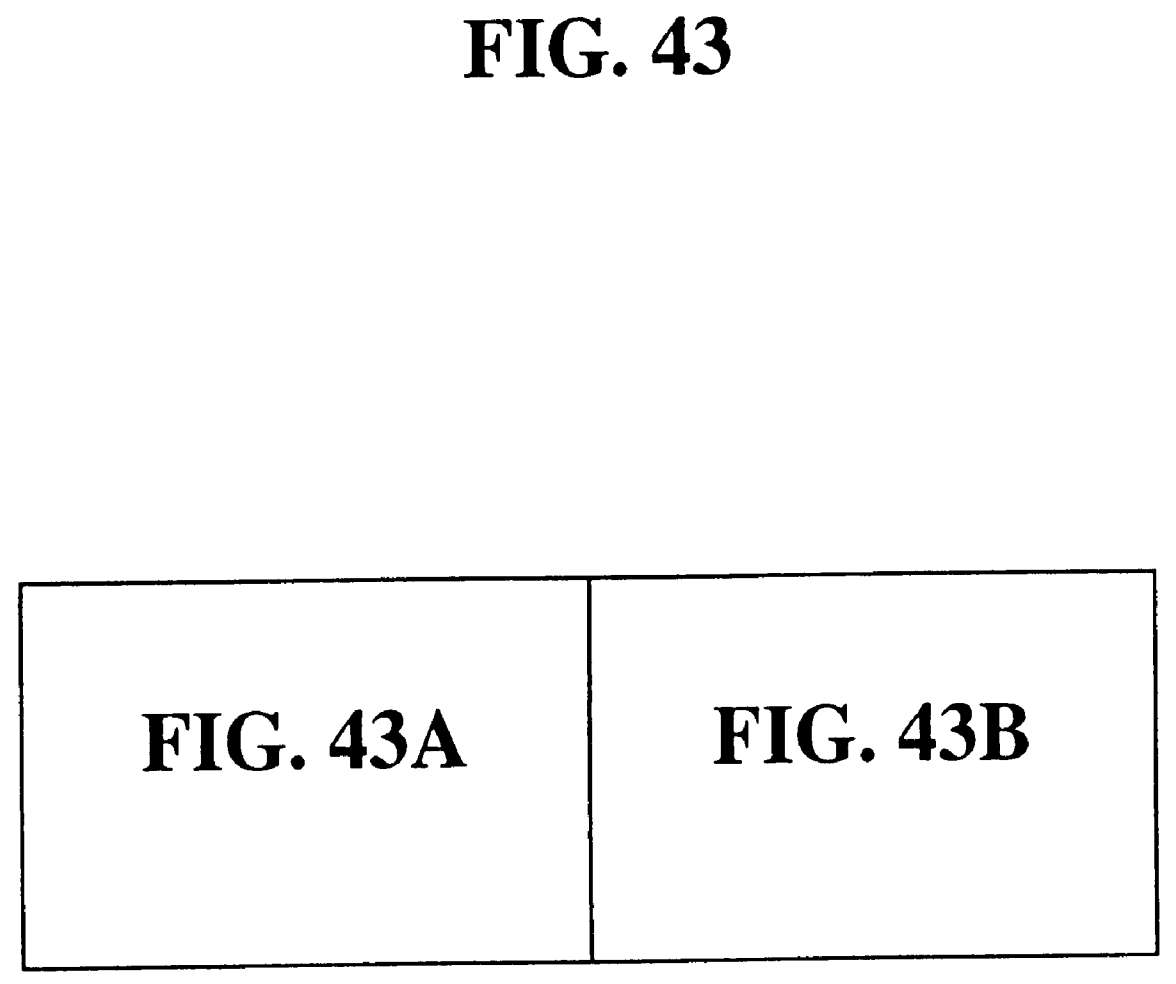

If the user is a vendor, then vendor invoice search options are displayed. Vendor invoice pages corresponding to the customer invoice pages previously described are shown in FIG. 42, FIG. 43 and FIG. 44, respectively.

As may be appreciated from the foregoing description, the system provides for "information-rich" invoice payment status tracking and display. The simple knowledge that an invoice is open (has not been paid) is of little value. The more pressing question is why a customer invoice should be paid (e.g, has a return question been resolved?) or why vendor invoice has not been paid (e.g., was sales tax incorrectly charged?). The present system is designed to track such invoice payment status information. Because the database is Web-enabled, the same information may be readily displayed to customers and vendors, avoiding the need for telephone calls, "telephone tag," etc.

Web Security

Doing business electronically poses various security risks. In the case of consumer-oriented Web commerce, much attention has been focused on secure transmission of credit card numbers and various security mechanism have been made available. In the case of business-to-business Web commerce of the type described, payment is usually not by credit card except for very small transactions. Instead, security risks involve potential abuse of the system by external parties or even internal parties. The present invention implements various security mechanisms to eliminate or minimize the potential for such abuse. Fundamentally, the security mechanisms are based on concepts of authority and lineage. A simple example is that the ship-to address for an order cannot be changed on-line. This prevents someone from ordering products and having them sent to their home or elsewhere.

Lineage relates authority to organizational hierarchy. The organizational hierarchy of Web users for a particular customer may be represented in tree fashion. A user at the leaf level may be given authority to get quotes but not to place orders. A user at a next-higher level may be given authority to view the quotes of users within a limited sub-tree and may be given limited authority to place orders. A user at the root of the tree may be given unlimited authority, from the standpoint of the customer, to view quotes of any user and place orders in any amount.

Figure 46:
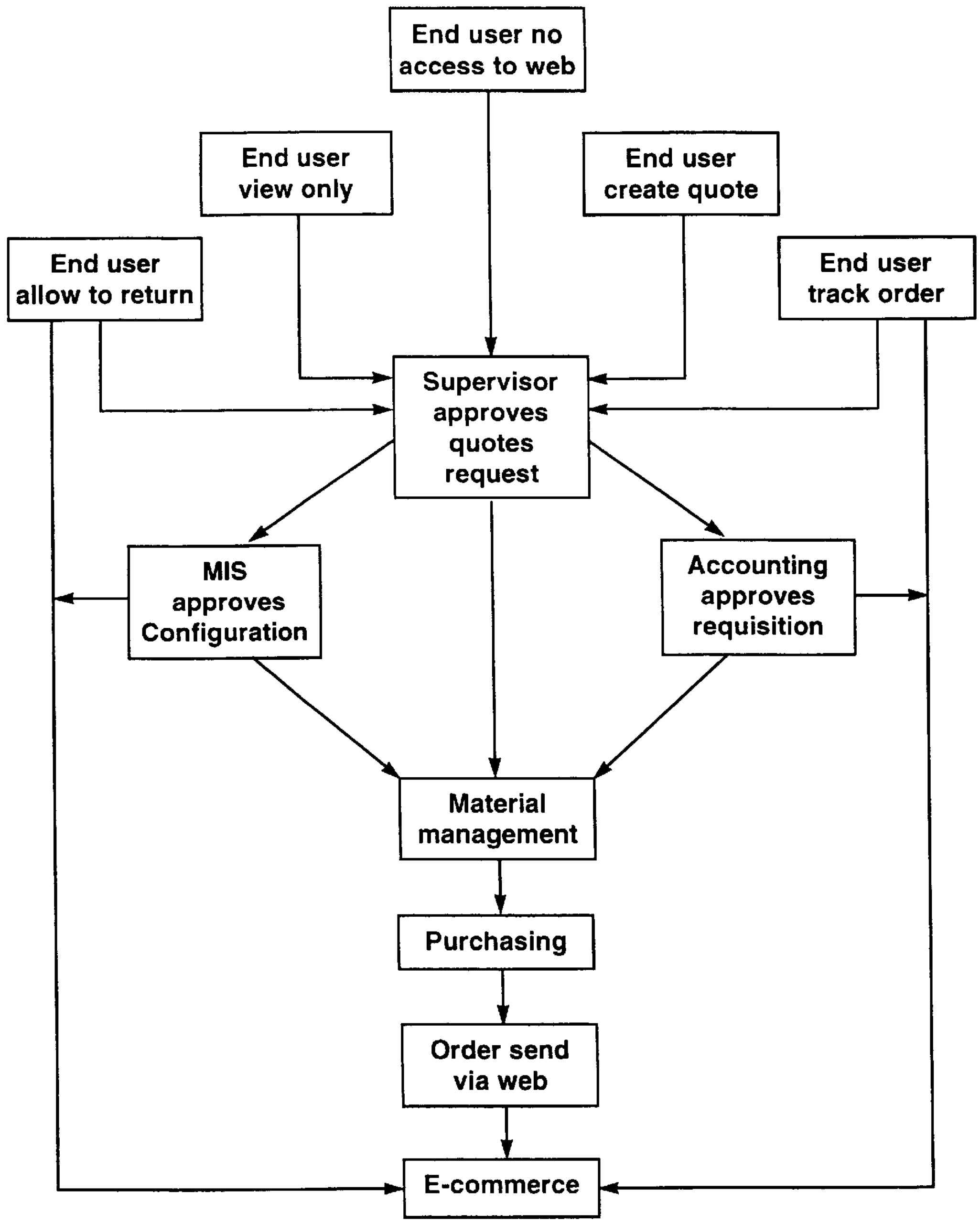
FIG. 46 is a diagram of a typical lineage (authority) tree.

Referring generally to FIG. 46, in the case of a typical company, various end users will be given different levels of authority, e.g., to create quotes but not purchase, to track orders, to perform returns, to view order information via the Web, or, in the most limited case, to have no access to Web purchasing information. To initiate the purchase process, an end user makes a quote request to his or her supervisor, who must approve the request. The request may require multiple further approvals, for example of an MIS department, an accounting department, a material management department, etc. In a typical scenario, the material management department will forward an approved request to a purchasing department Authorized persons within the purchasing department may then send an order via the Web. In every instance, when Web access is attempted (and in fact every time a TCP packet is received), a user's authority is checked and that user's interaction via the Web is limited to the scope of that authority.

Figure 47:
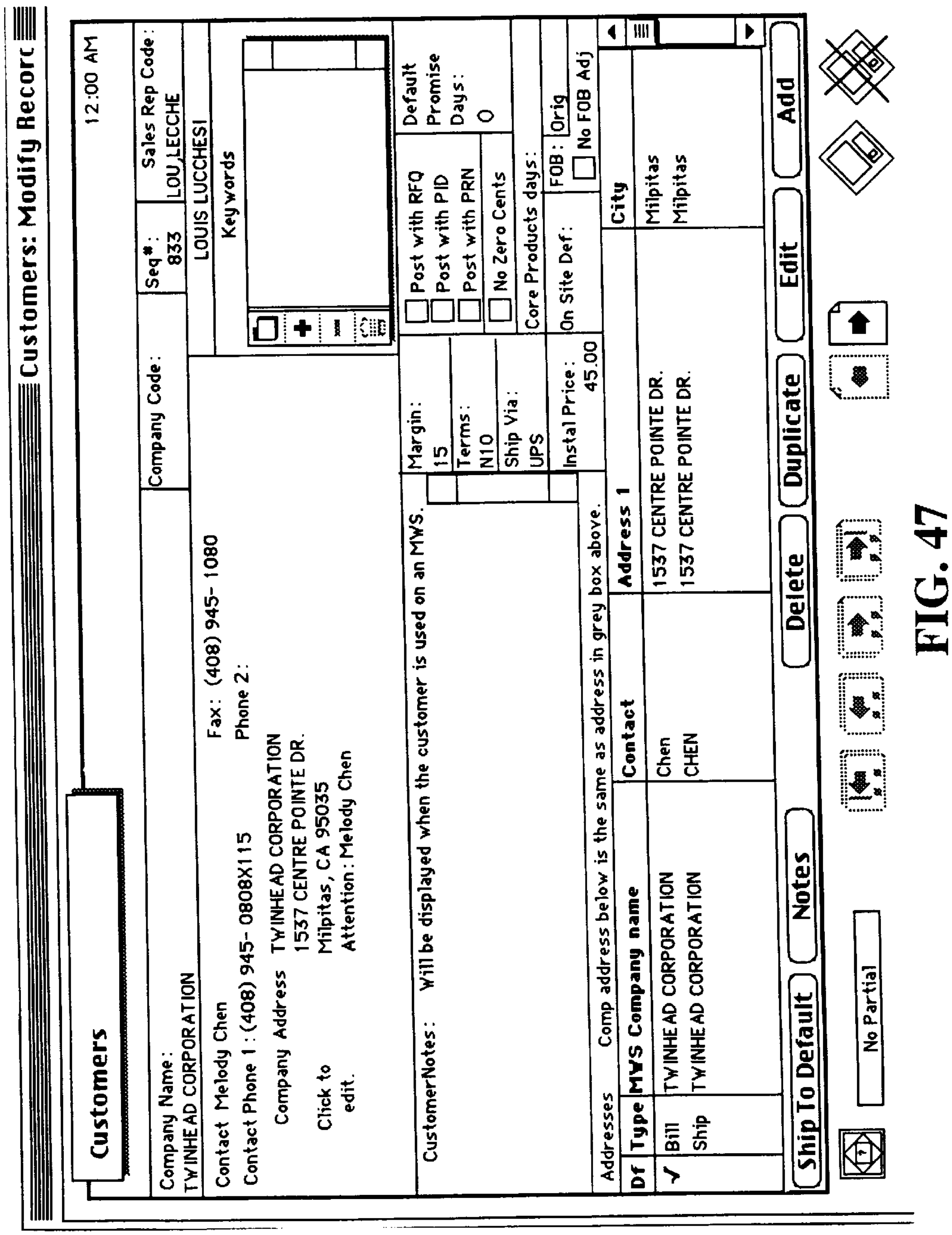
FIG. 47 is an illustration of a database customer screen display.
Figure 48:
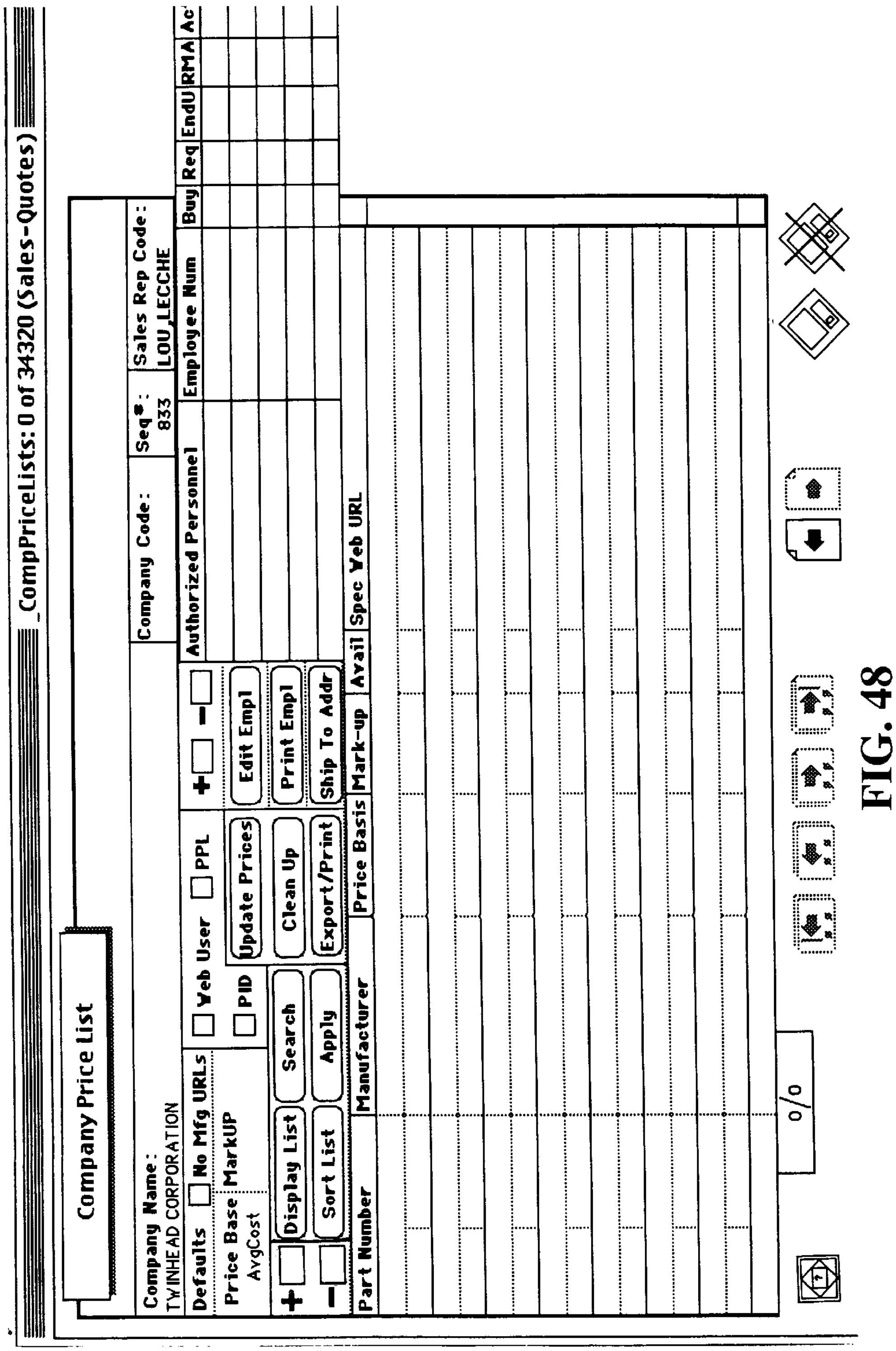
FIG. 48 is an illustration of a company price list screen display.

External Web authority information is stored for each customer in a customer file. An example of a customer record is shown in FIG. 47. From the customer file, a company price list record such as that of FIG. 48 may be displayed. For each customer, a price basis may be agreed upon for items that the customer buys regularly. External Web authority information is stored as part of the customer price list.

Figure 49:
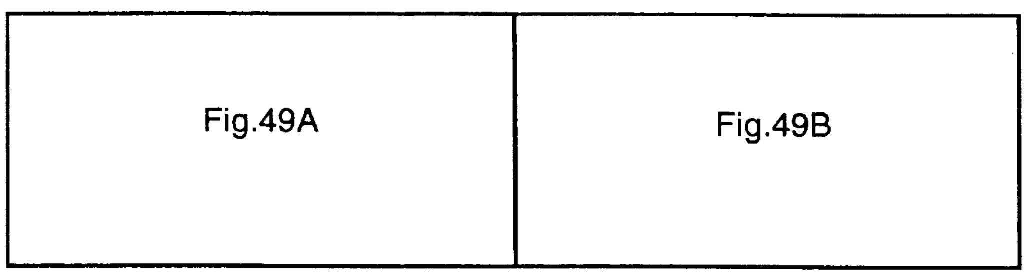
FIG. 49 is an illustration of one of a series of dialogs used to set Web authority for an employee of a customer.
Figure 49A:
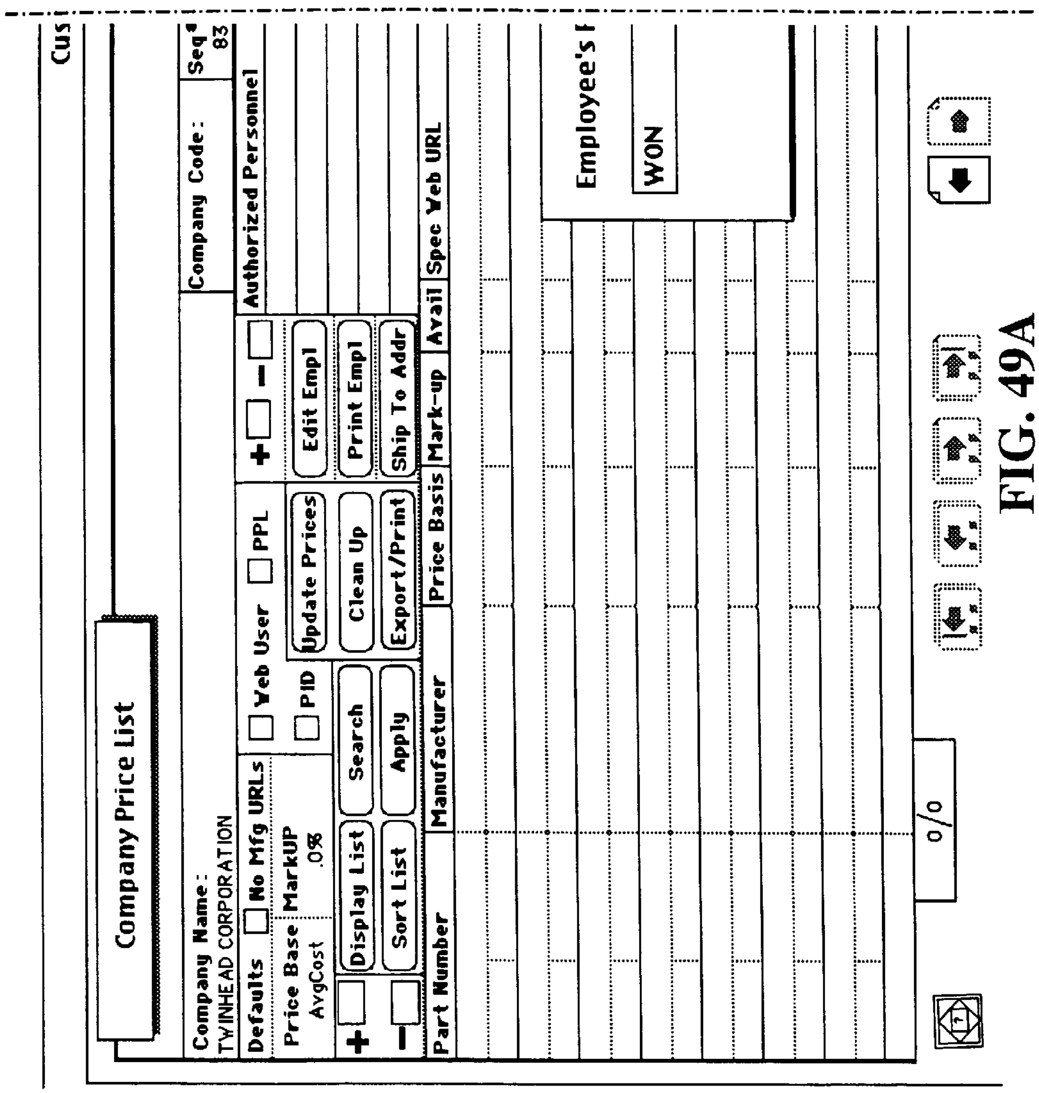
Figure 49B:
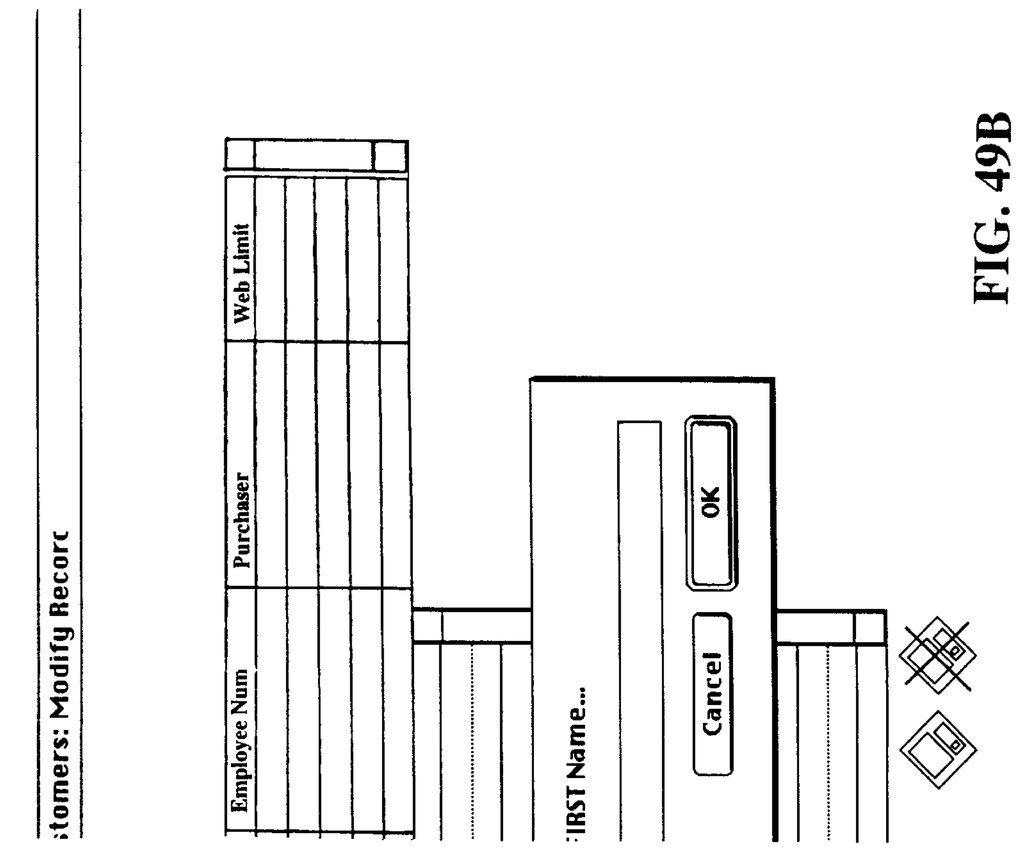
Figure 50:
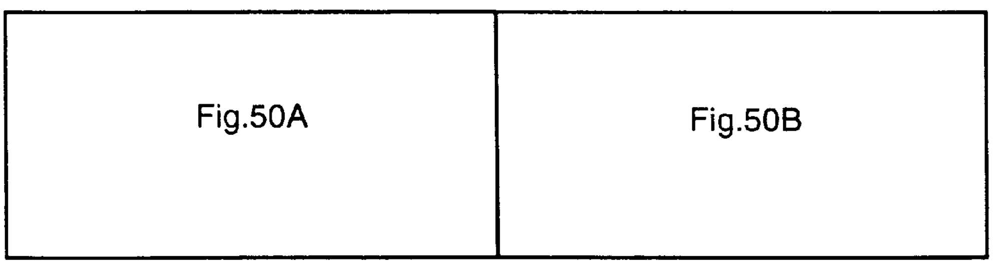
FIG. 50 is an illustration of another of a series of dialogs used to set Web authority for an employee of a customer.
Figure 50A:
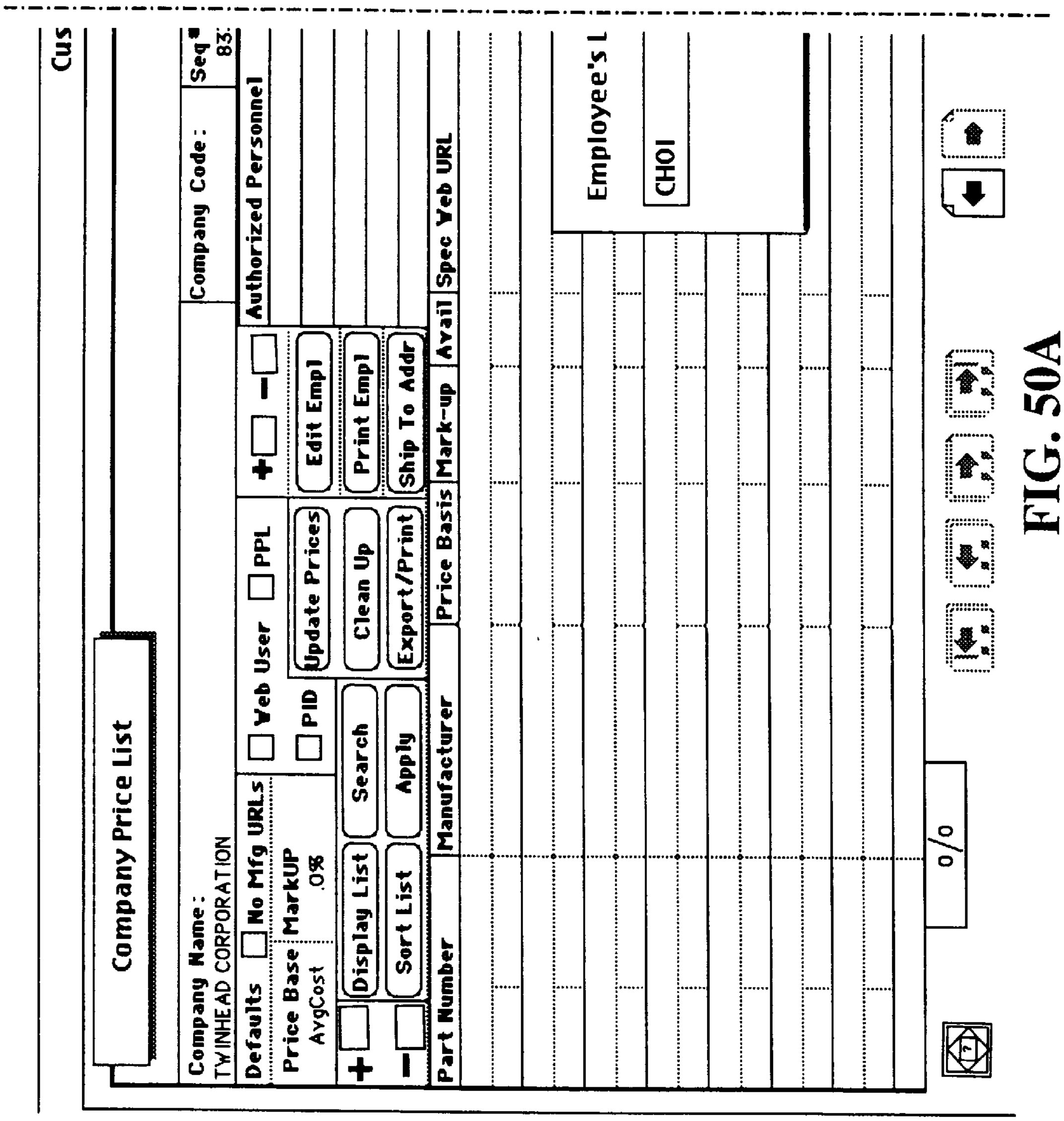
Figure 50B:
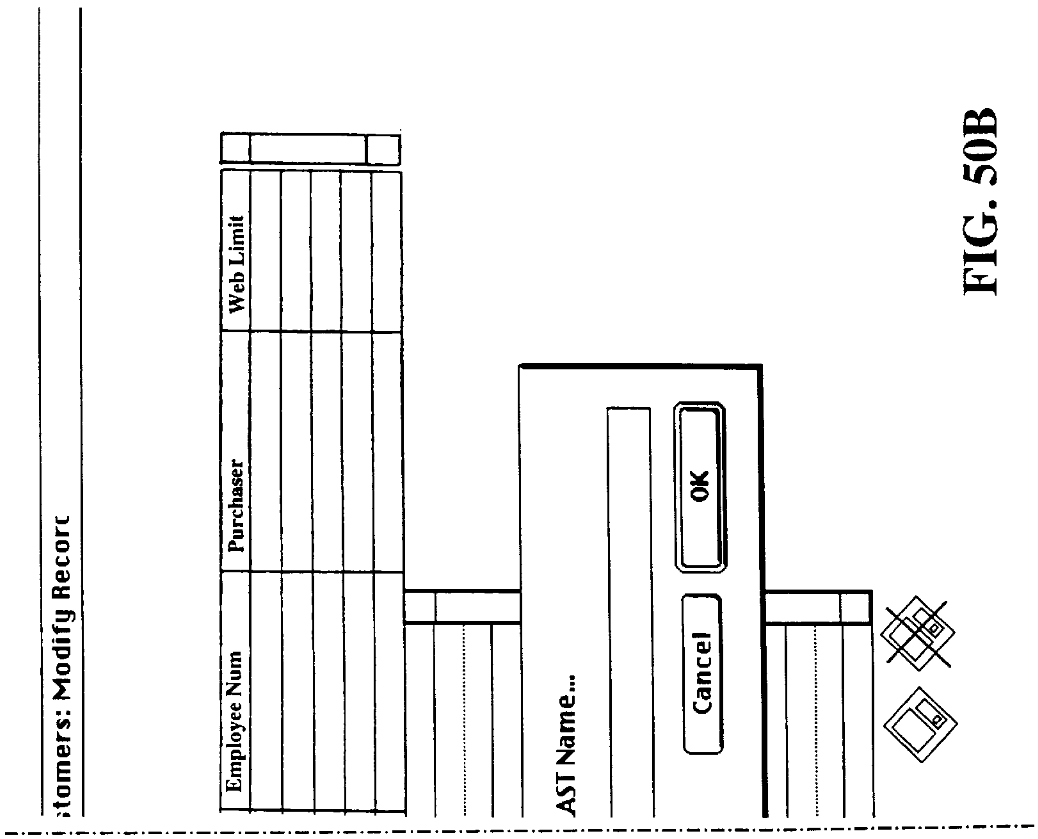
Figure 51:
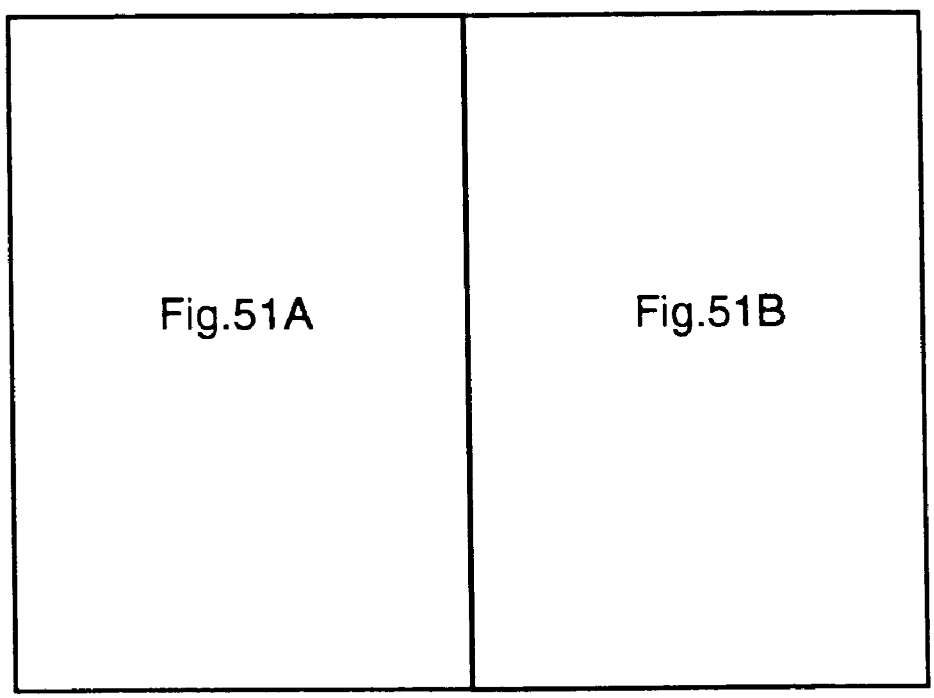
FIG. 51 is an illustration of another of a series of dialogs used to set Web authority for an employee of a customer.
Figure 51A:
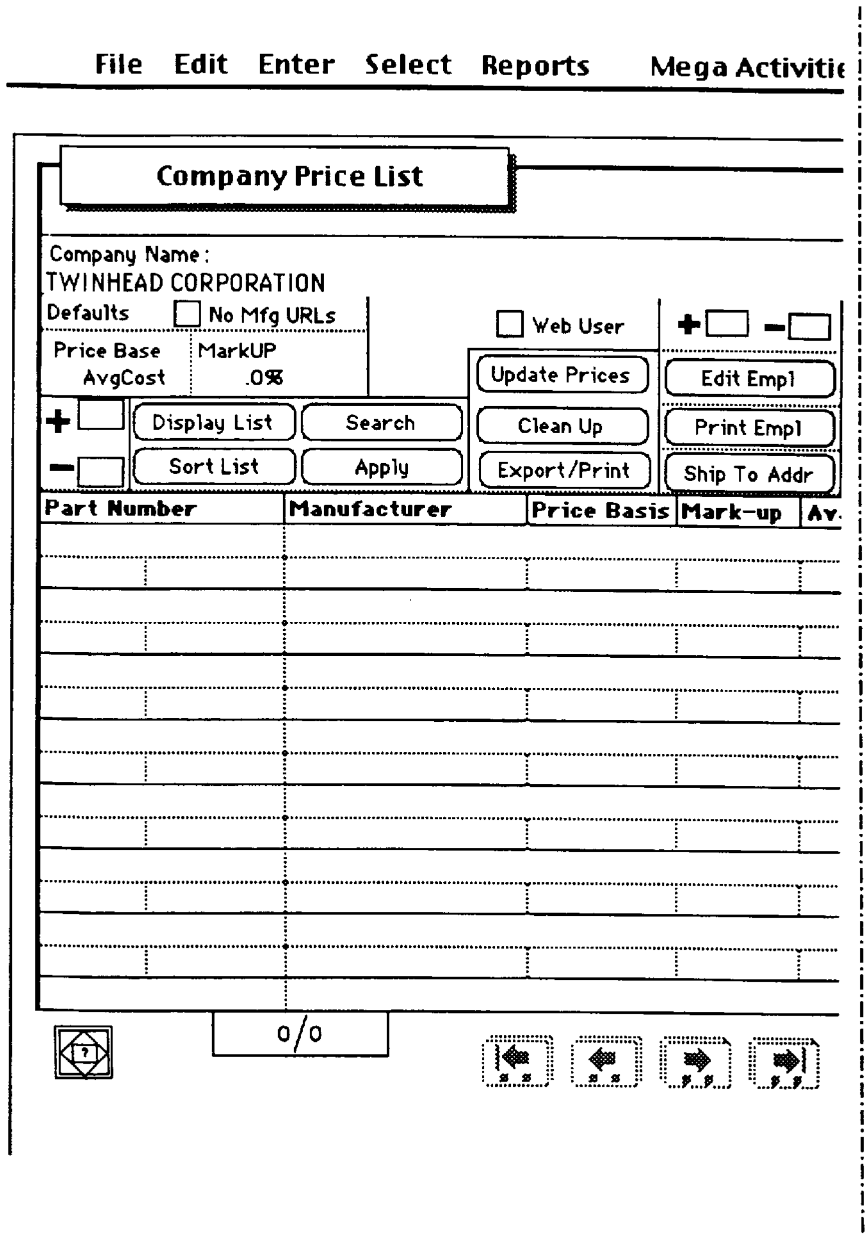
Figure 51B:
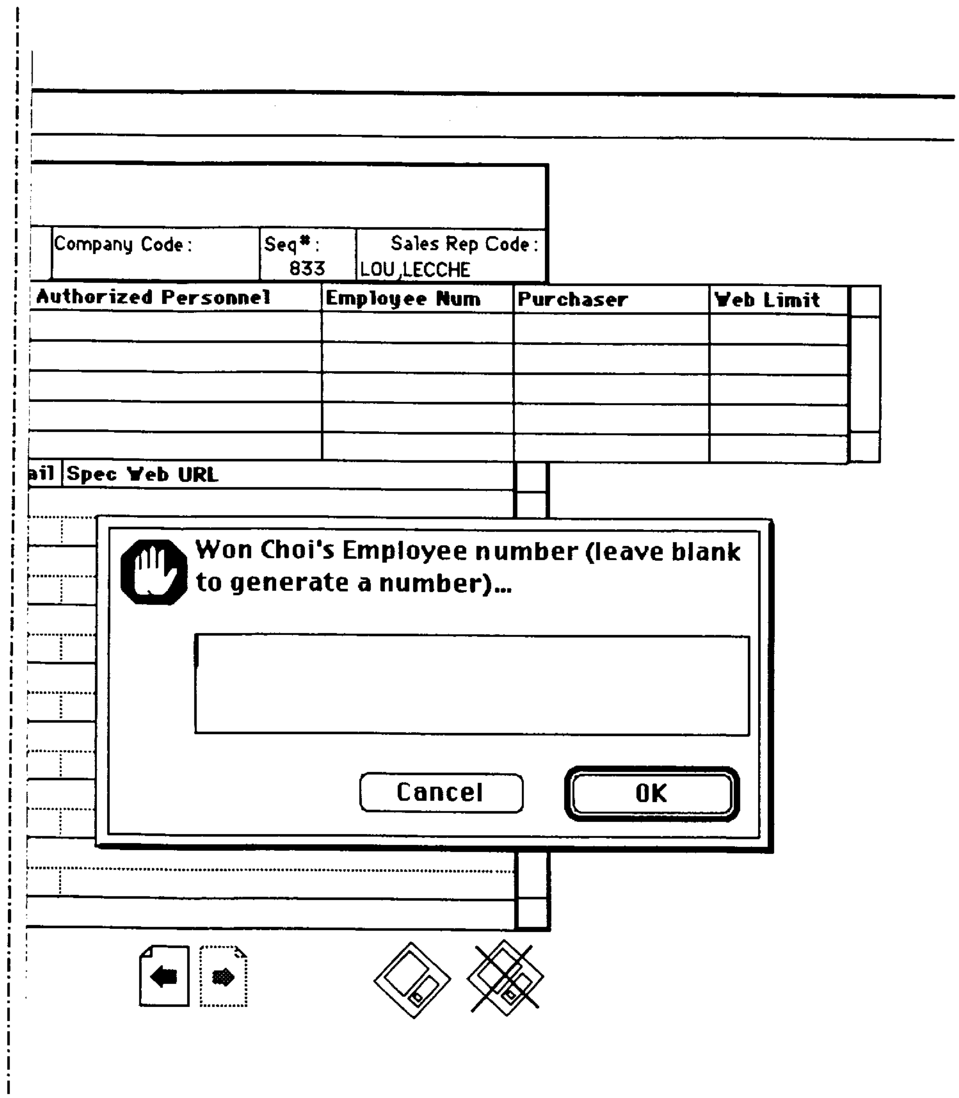
Figure 52:
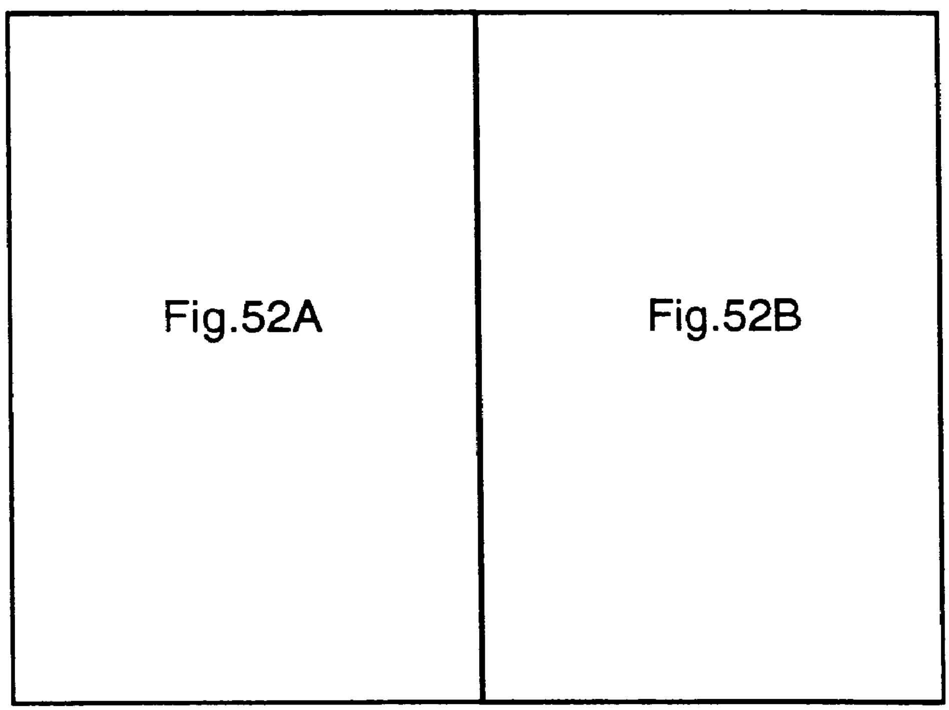
FIG. 52 is an illustration of another of a series of dialogs used to set Web authority for an employee of a customer.
Figure 52A:
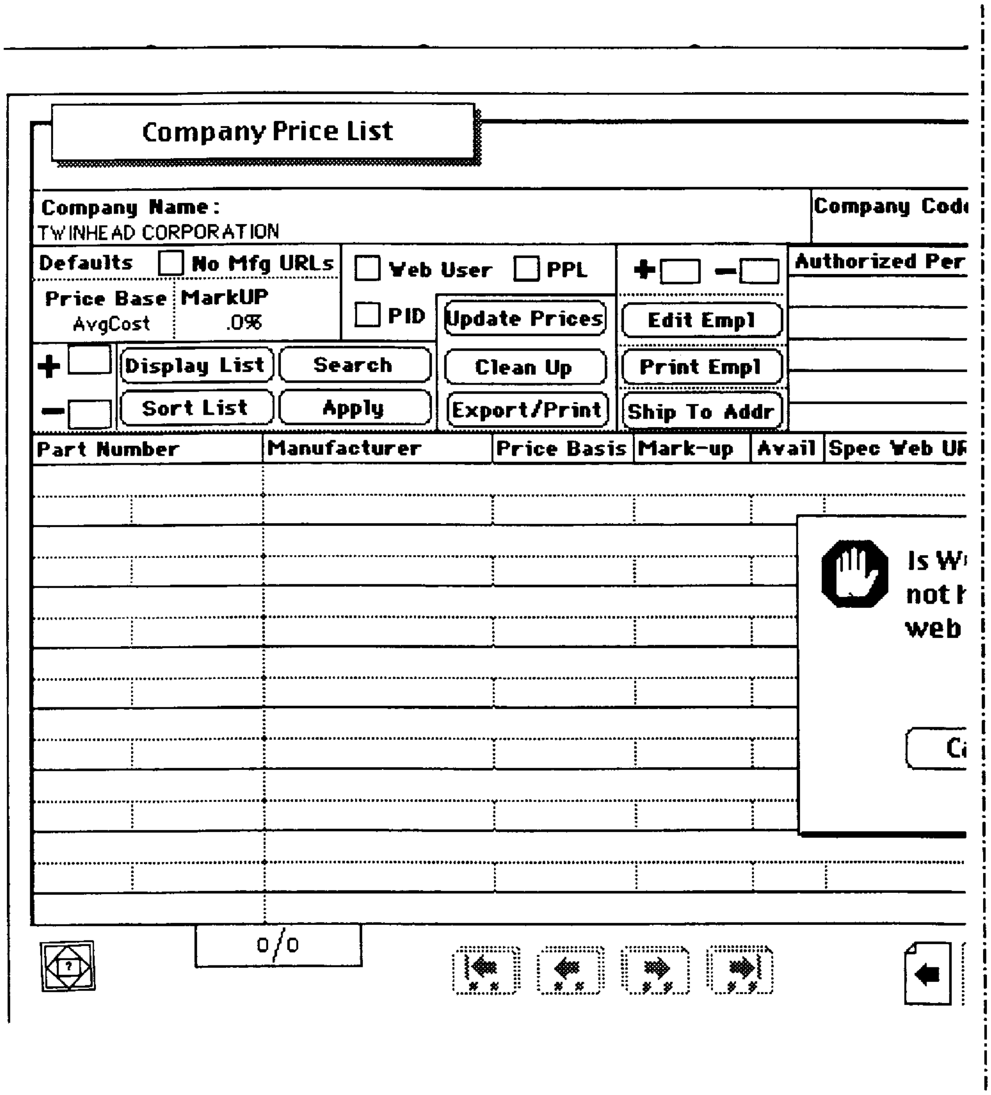
Figure 52B:
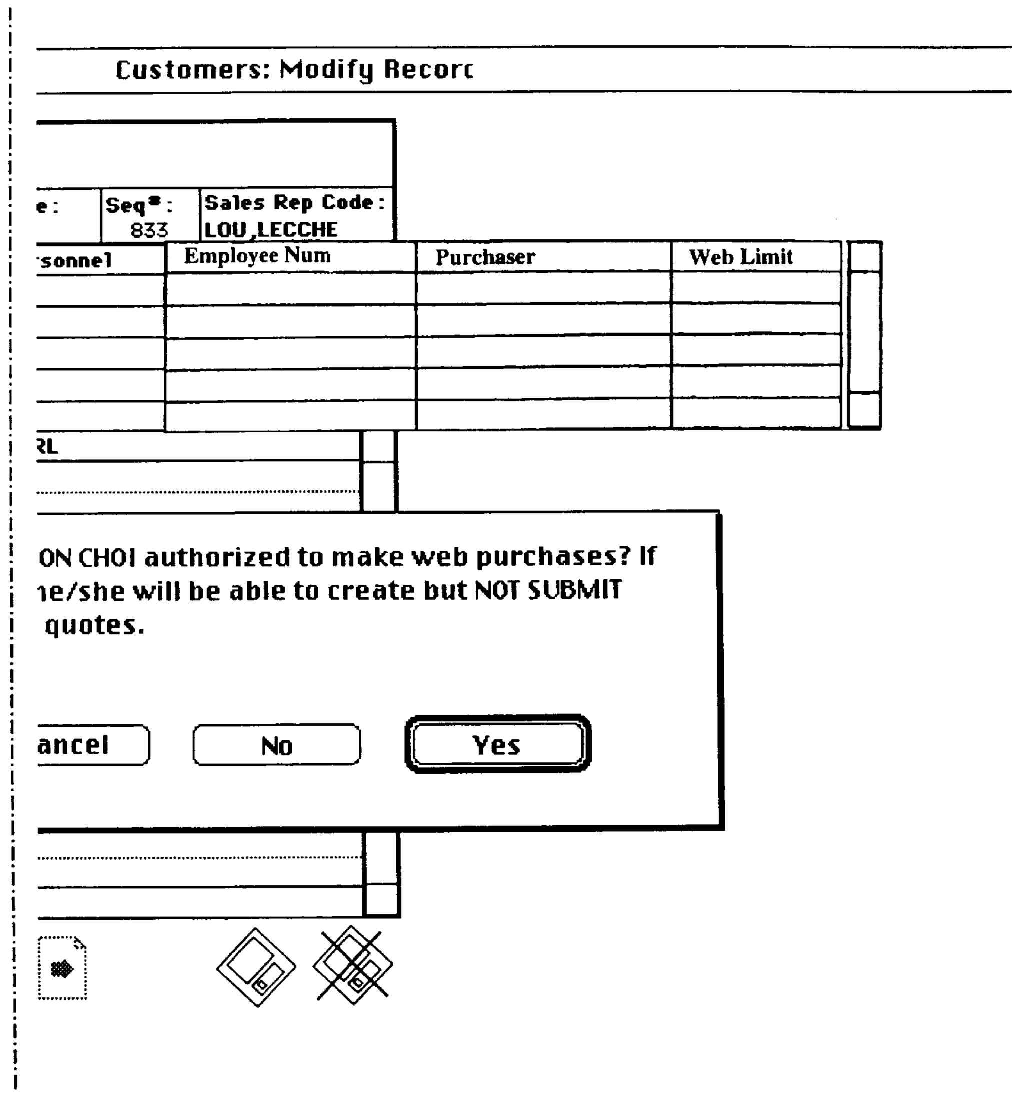
Figure 53:
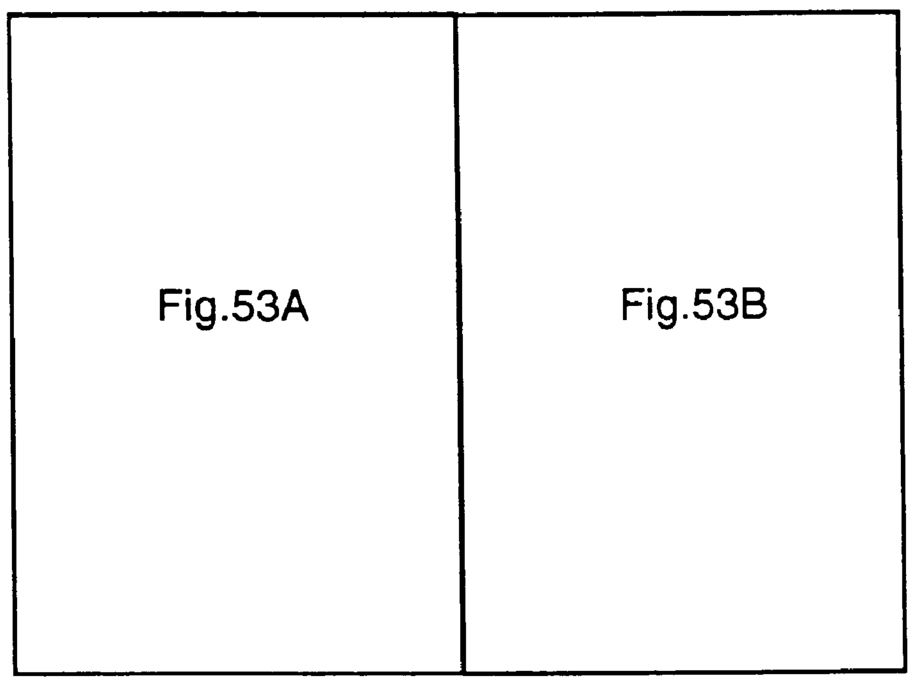
FIG. 53 is an illustration of another of a series of dialogs used to set Web authority for an employee of a customer.
Figure 53A:
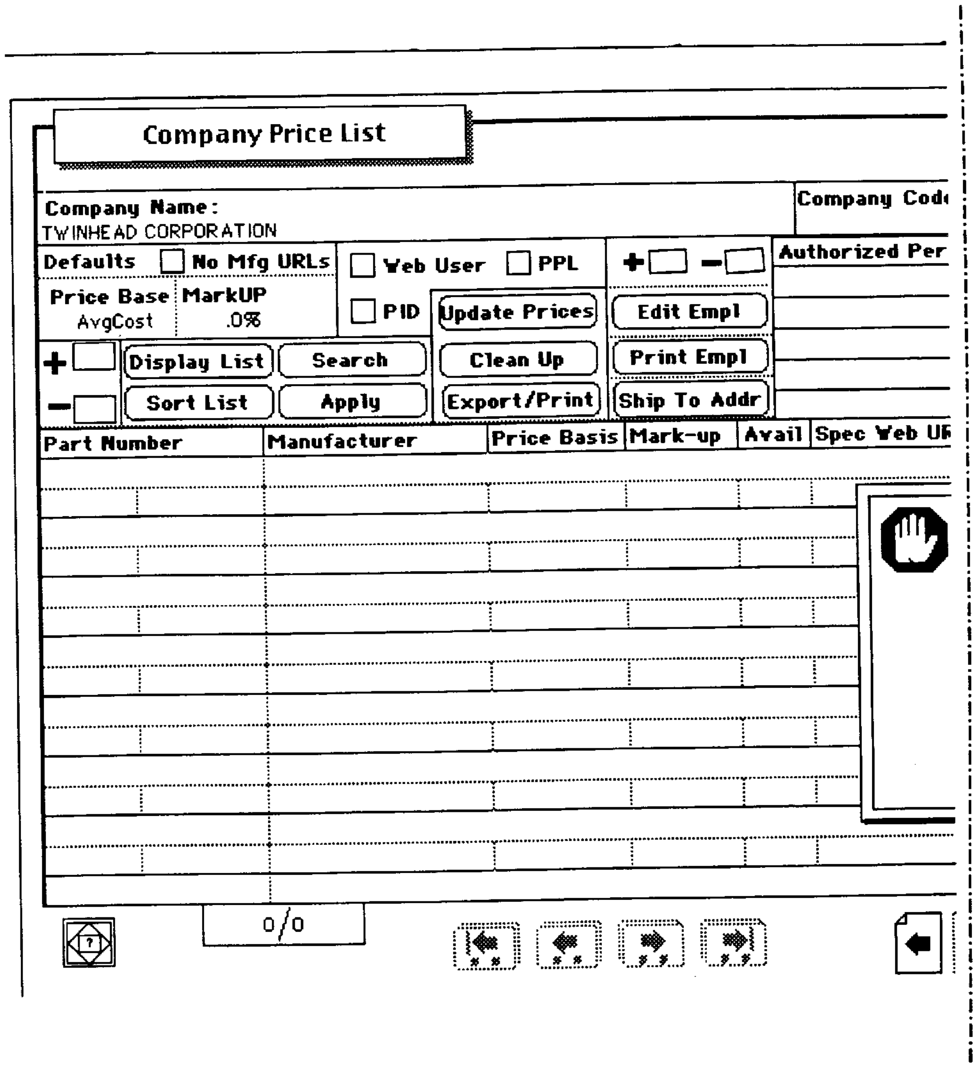
Figure 53B:
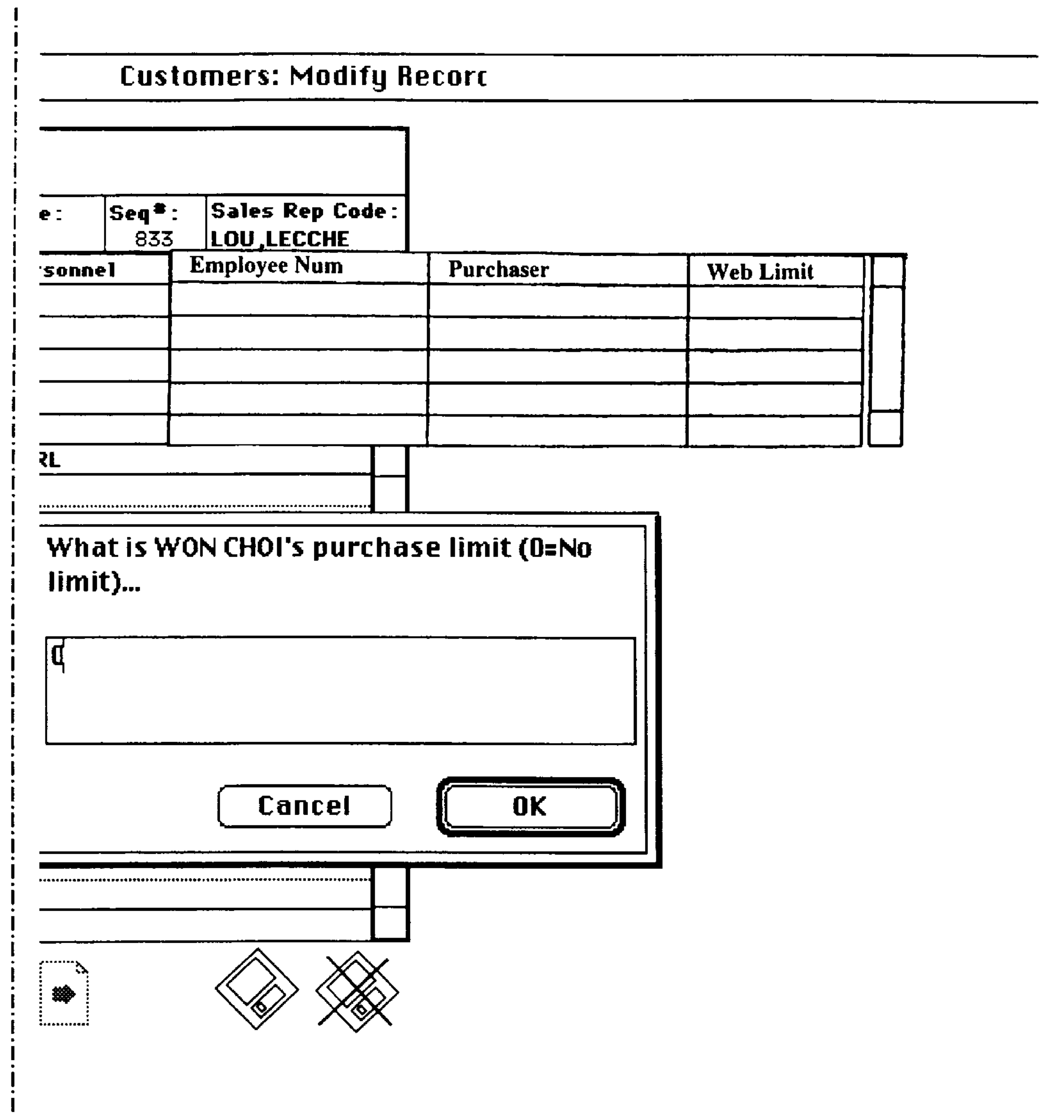
Figure 54:
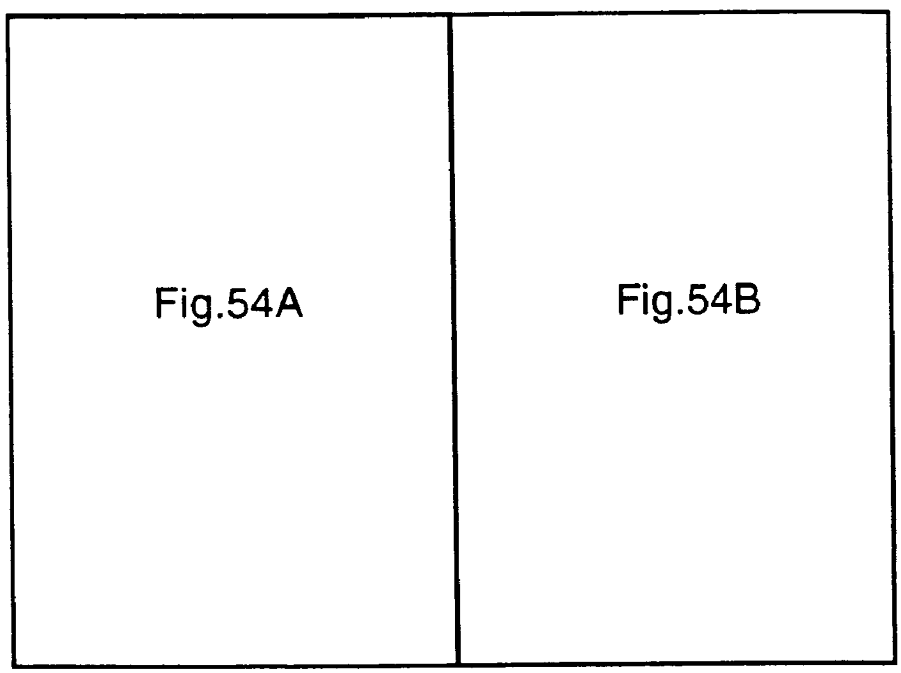
FIG. 54 is an illustration of a dialog used to confirm employee information at the conclusion of Web authorization.
Figure 54A:
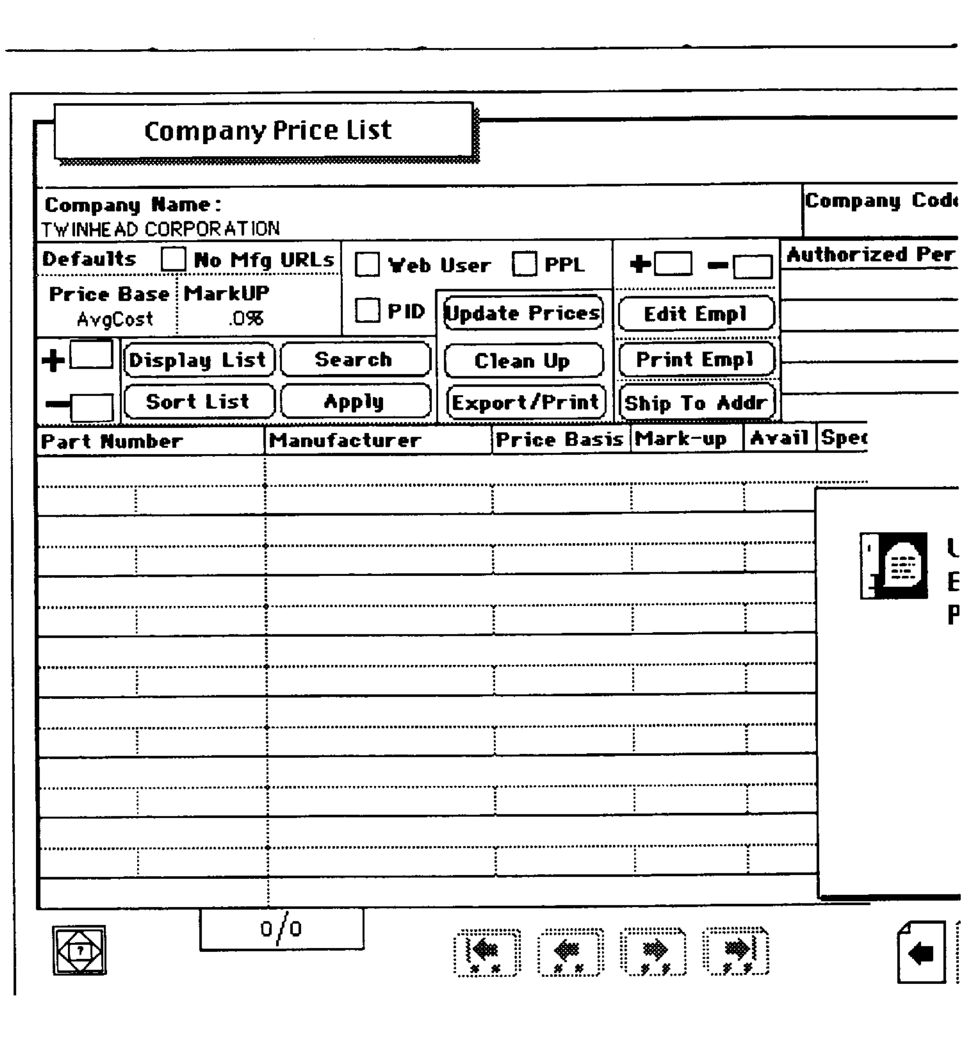
Figure 54B:
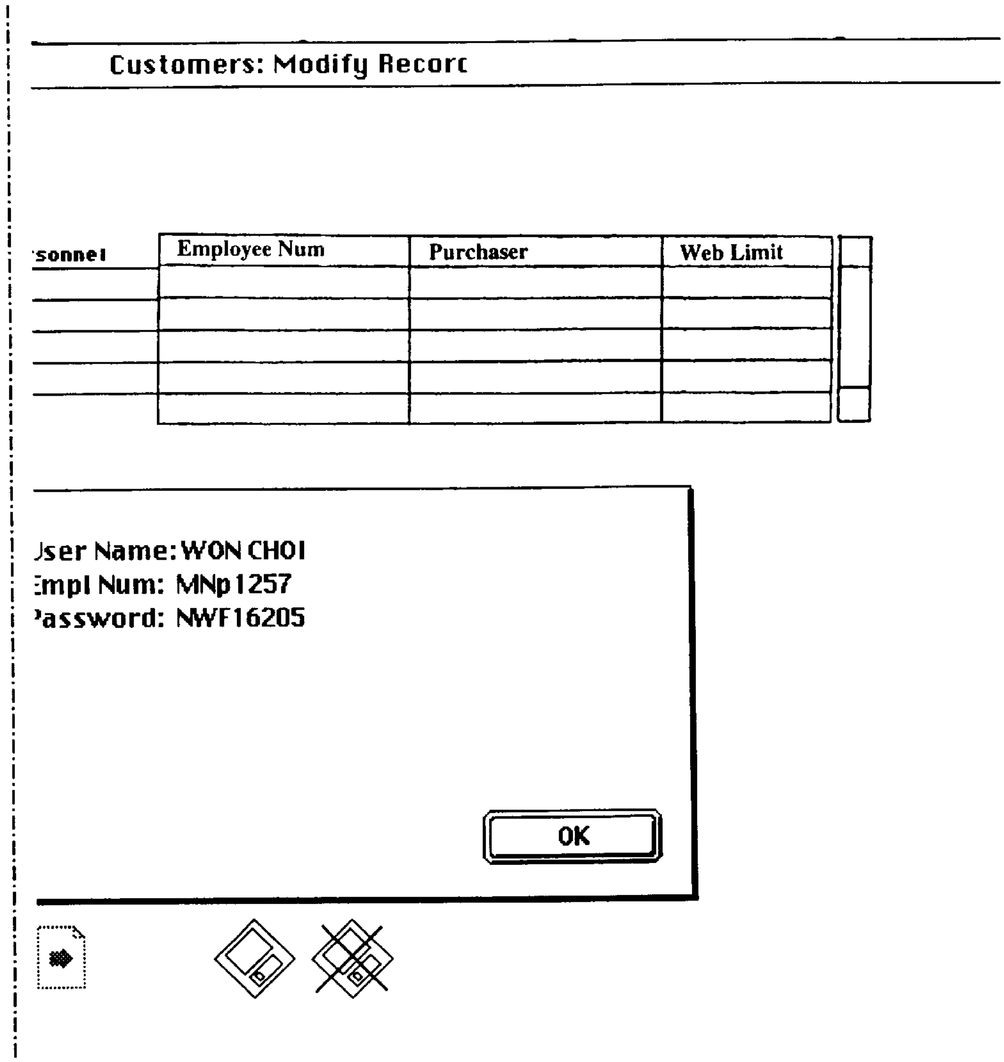
Figure 55:
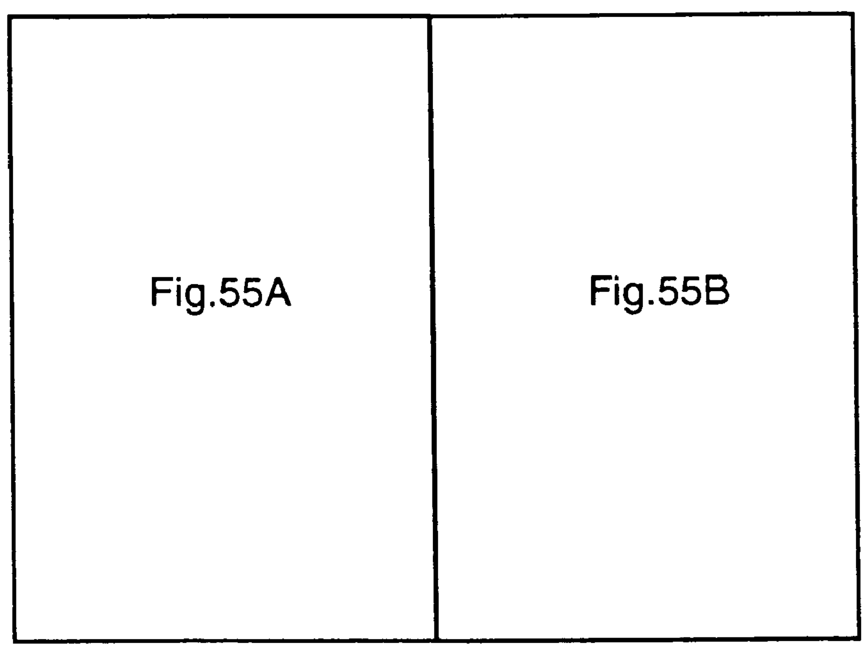
FIG. 55 is an illustration of the corresponding screen display as shown in FIG. 48, following Web authorization.
Figure 55A:
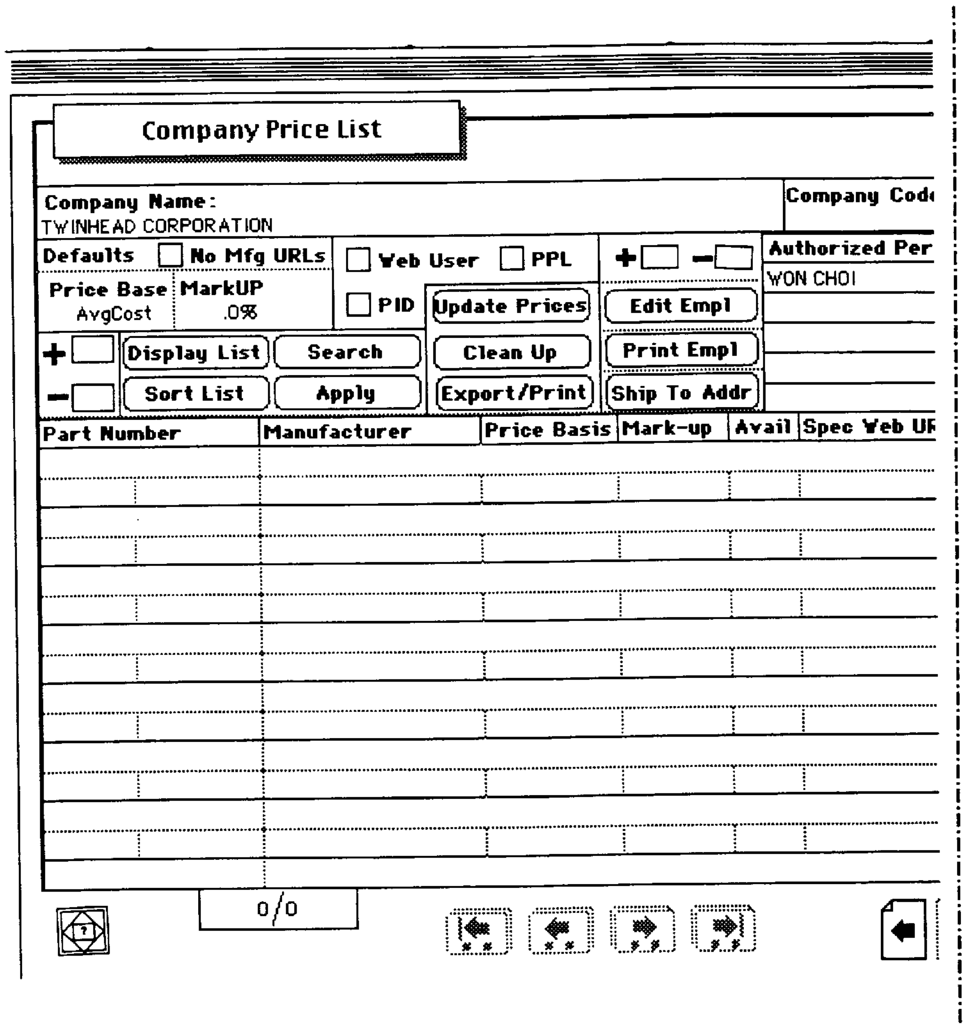
Figure 55B:
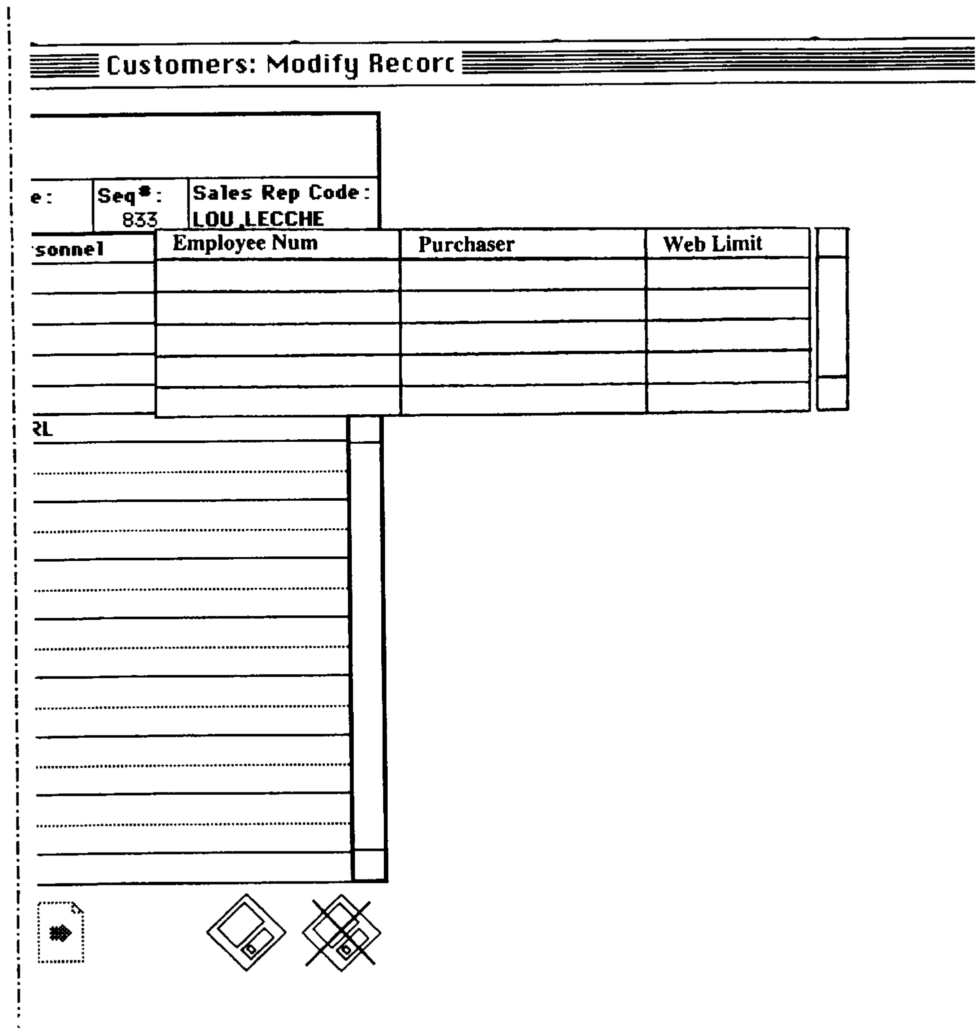

The manner in which a external Web user's authority is specified is illustrated in a series of figures beginning with FIG. 49. First, the user's name is entered, first name (FIG. 49) then last name (FIG. 50). An employee number may then be entered (FIG. 51), absent which an arbitrary employee number is generated automatically. A dialog then asks whether the user is authorized to make Web purchases (FIG. 52). If the user is authorized to make Web purchases, then a further dialog calls for a purchase limit, if any, to be specified (FIG. 53). A confirmation dialog is then displayed (FIG. 54). The customer price list record following addition of the Web user with specified authority is shown in FIG. 55.

The specific limits placed on a user's purchase authority may vary. Other examples of limits that may be desired by some companies are a limit on the number of purchase orders per day, a limit on the total amount of purchase orders per day, a time-of-day limitation as to when orders may be placed, etc. Various other security parameters may be added.

Figure 45:
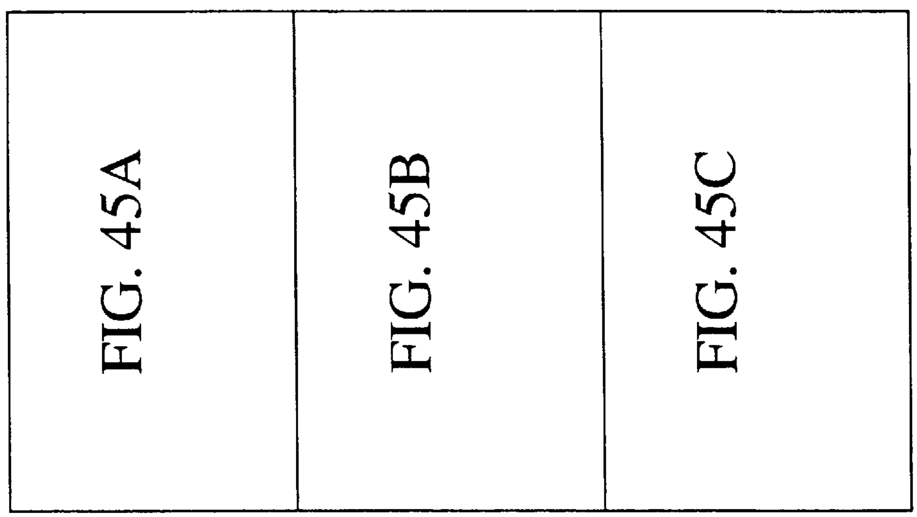
FIG. 45 is an illustration detailing the authority of various internal users with respect to security parameters in accordance with an exemplary embodiment.

Limits are also placed on internal users access to security parameters so as to provide customer assurance that there exists no potential for internal abuse of the system (e.g, authorizing a crony to make illicit purchases on a customer account). A user may have authority to use (view) but not approve changes to certain security parameters, and may have authority to use and approve changes to other security parameters. In an exemplary embodiment, the authority of various users is set as illustrated in FIG. 45.

Catalog Management

In the case of a company based on the conventional model of real inventory, Web catalog management is relatively straightforward. In the case of a company based on the model of virtual inventory, "the world is your warehouse." Intelligent catalog management is therefore of vital importance. Intelligent catalog management, in an exemplary embodiment, is based on a concept of "baseline." A baseline is a collection of products that functions as a standard of comparison. In an exemplary embodiment, there is both a vendor baseline and a customer baseline. Using the baseline concept, a product list without duplicates may be displayed. Furthermore, there may be displayed to the customer only products that there is some reasonable likelihood of the customer buying.

On the vendor side, one vendor is selected to serve as the baseline vendor. The baseline vendor will typically be a vendor found to have the most comprehensive inventory, the most useful categorization scheme, etc., and may be varied as often as desired. To create an update baseline, product listings of vendors are compared with the current baseline. If a product is already part of the baseline, as determined by manufacturer part number, then the product is grouped under the same baseline listing. For example, the same computer may be available through multiple different vendors. Rather than creating multiple product listings for the same product, these multiple product listing are consolidated under a single baseline product listing. If a product is not in the baseline, it may be added to a "supplemental baseline." If the baseline vendor does not carry a particular product but one or more alternate vendors carry the product, then the product will be listed in the supplemental baseline, again without duplicates.

After an updated baseline has been compiled, it is compared with the previous baseline. A product listing may be found: 1) in the old baseline only; 2) in the new baseline only; or 3) in both. Product listings in categories 1 and 2 are flagged as discontinued products and new products, respectively.

During the foregoing process, product cost and customer pricing information is updated. Also updated are URLs to vendor and manufacturer Web sites. These URLs may be used to refer Web users to these sites for product information. Product list updating may occur continuously or at regular intervals using "pull" technology, "push" technology, some combination of the two, or some other information retrieval technology or combination of technologies.

On the customer side, a customer baseline is formed by combining: 1) customer APLs (Approved Product Lists) for all customers or some subset of customers; and 2) historical purchase information, taking into account such factors as purchase date, volume, etc. There results a non-duplicative list of products customers have bought or are presently approved to buy. Products in the vendor baseline may be flagged as belonging or not belonging to the customer baseline.

As a result of the baseline concept and the power of the DBMS, great flexibility is provided in the manner in which products may be displayed. A user may search the product file and request to see new products, discontinued products, vendor baseline products, without duplicates, vendor baseline products expanded to show duplicates, customer baseline products, customer-specific APL products, etc. In this manner, the seeming chaos that would otherwise result from the "infinitude" of products embraced by the notion of virtual inventory is tamed and made manageable.

Figure 56:
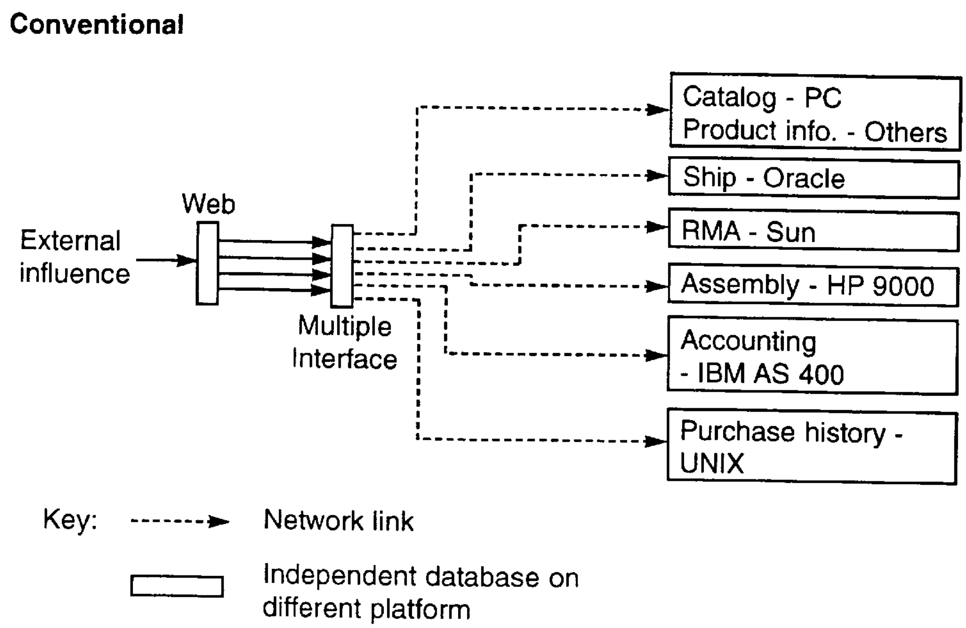
FIG. 56 is a block diagram of a conventional Web commerce computer architecture in which different functions are automated on different computing platforms, necessitating multiple interfaces.

Much of the difficulty of successfully implementing a cohesive business-to-business Web commerce solution has resulted from different aspects of a company's business being automated on different computing platforms. As illustrated in FIG. 56, for example, a product catalog may be implemented on one platform, shipping implemented on another platform, accounting implemented on still another platform, etc. To interface all of these different functions to the Web requires multiple interfaces.

Figure 57:
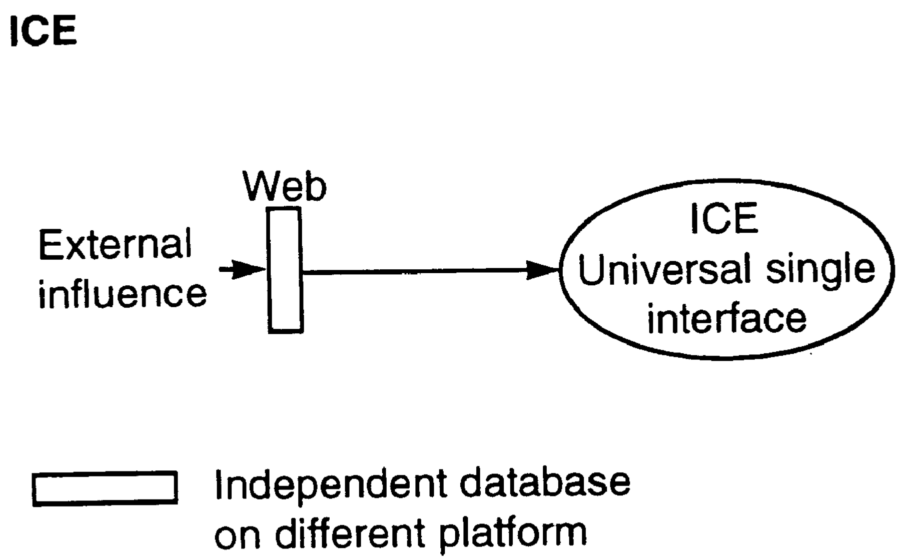
FIG. 57 is a block diagram of the present Web commerce computer architecture in which all functions are automated on a single Web-enabled database, necessitating only a single interface.

By using a single Web-enabled database and providing for all necessary functions within a single database schema, the present Web commerce solution avoids the daunting complexity characteristic of the prior art. Referring to FIG. 57, a single universal interface may be used to place the entire contents of the database, or as much of those contents as desired, on the Web.

Database Schema

Figure 58:
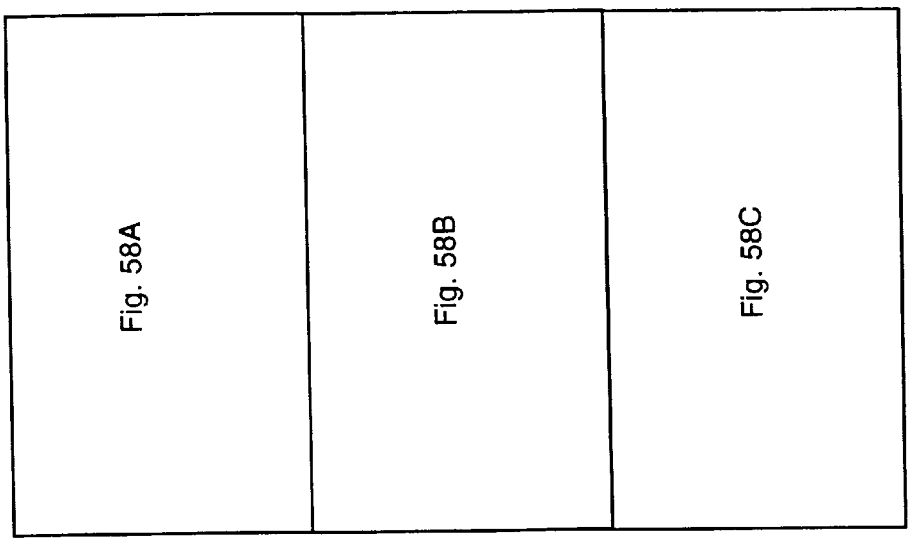
FIG. 58 is an illustration of a partial database schema of one implementation of the system of FIG. 3, showing primary files and relationships.
Figure 58A:
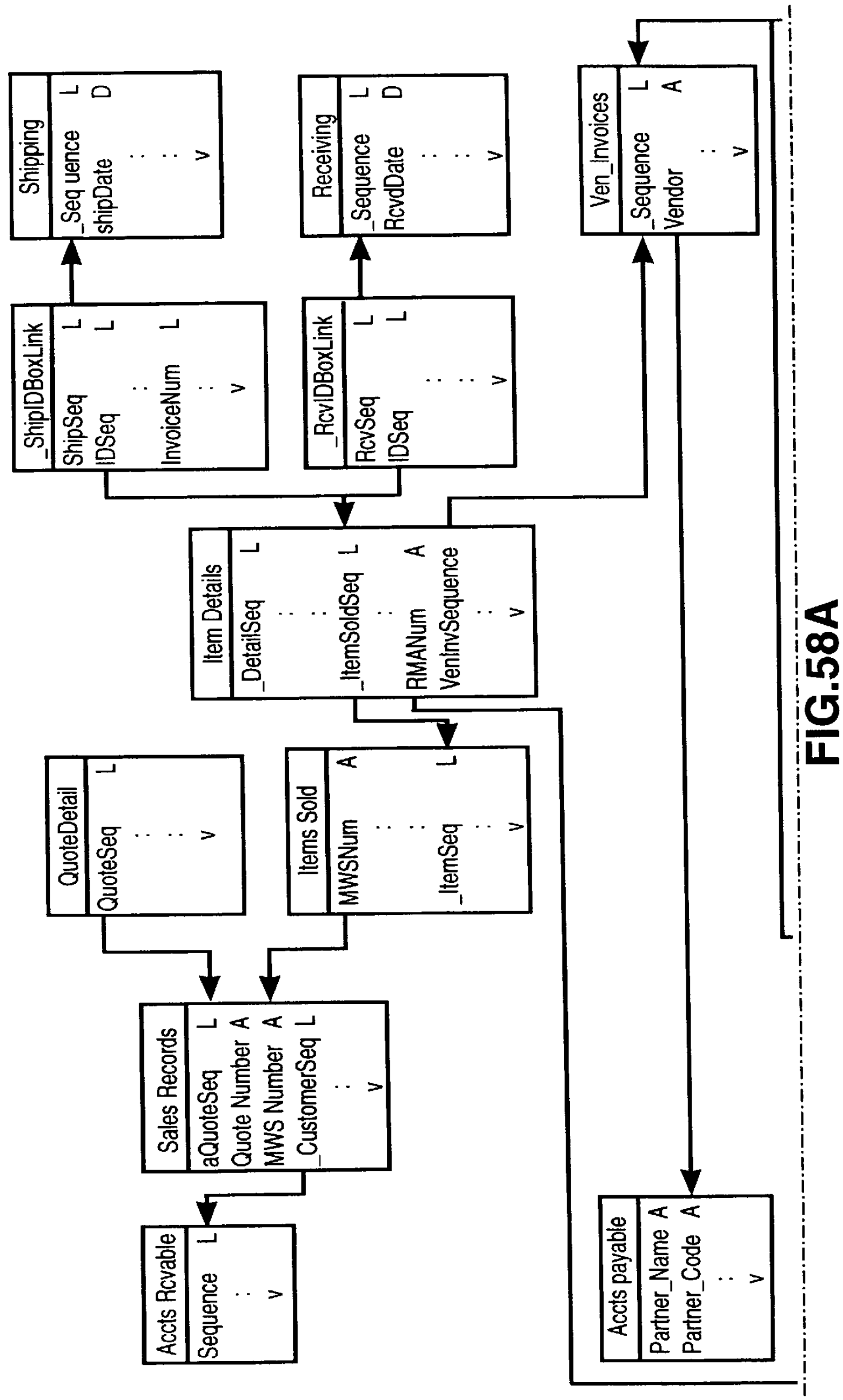
Figure 58B:
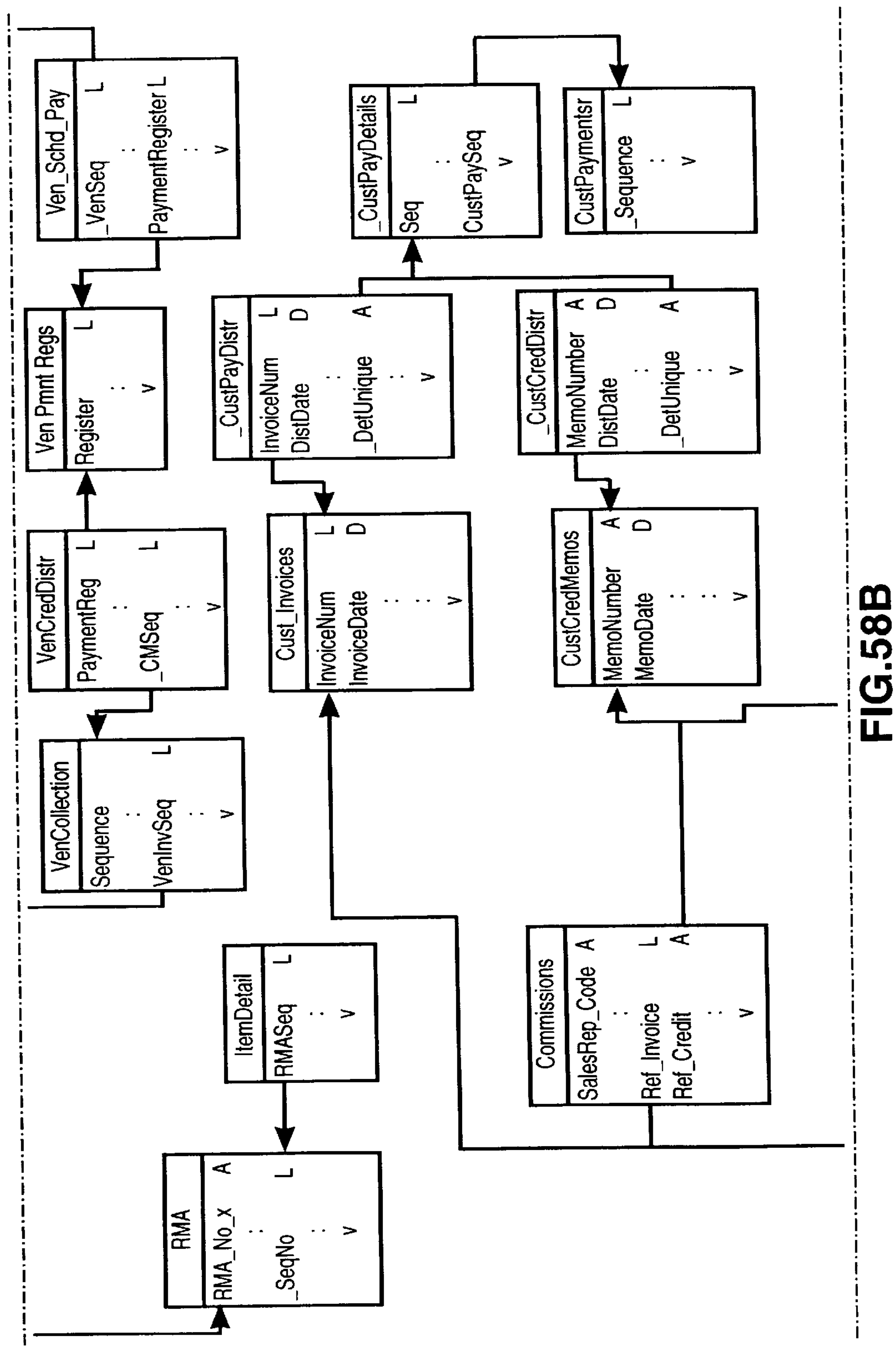
Figure 58C:
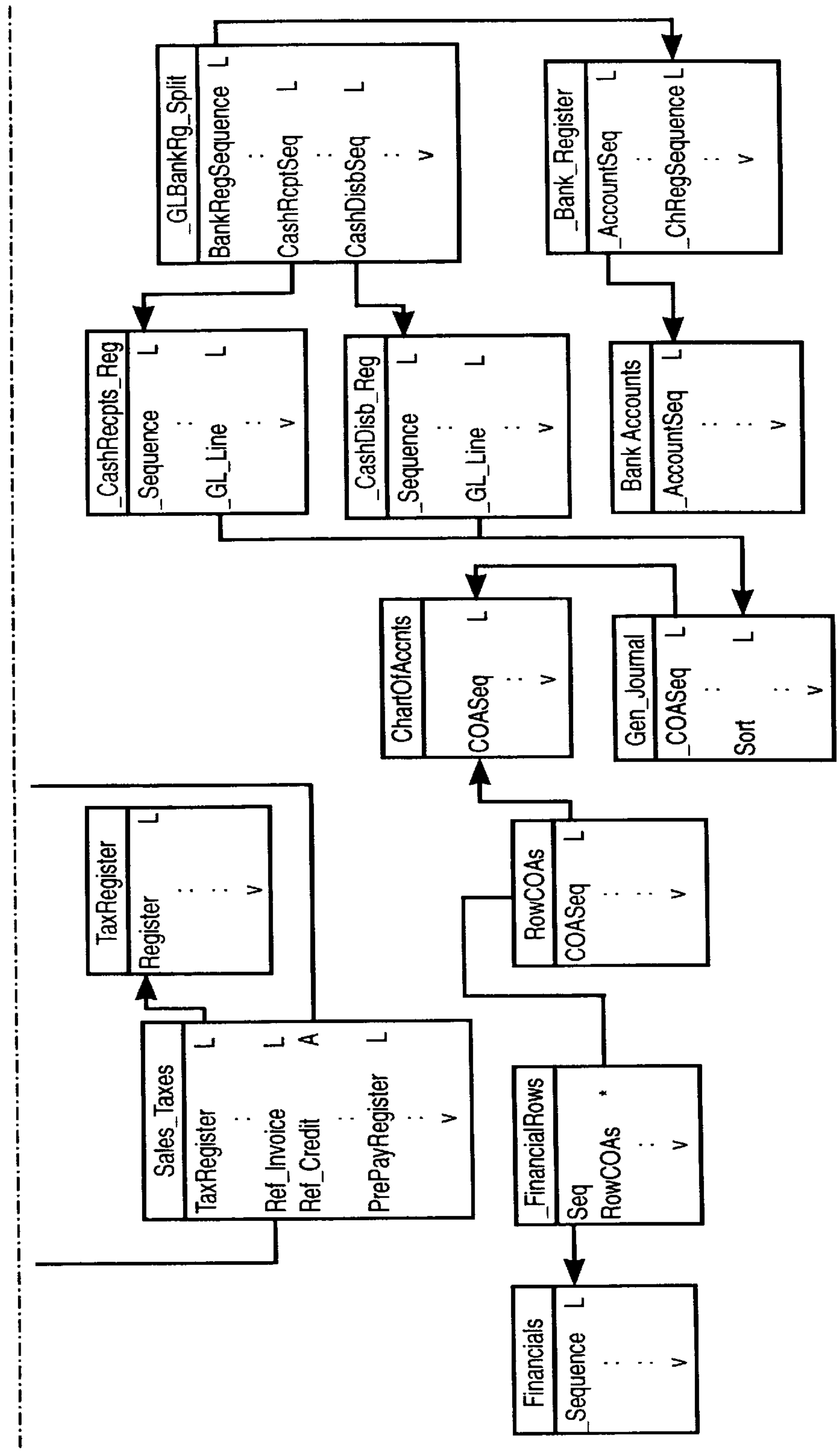

An important feature of the present system is that a single database, described by a single database schema, is used to automate an overall business process, end-to-end. To do so, the schema must, understandably, be quite complex. A general outline of the schema is shown in FIG. 58. The complete schema, or structure diagram, is set forth in the microfiche appendix filed herewith.

Referring to FIG. 58, the manner in which various automation processes relate on an inter-domain basis may be appreciated. The products domain is represented in approximately the upper third of FIG. 58 and includes sales functions (5801) and shipping/receiving functions (5803). Purchasing and installation functions, now shown in FIG. 58, are shown in the microfiche appendix. The payments domain is represented in approximately the middle third of FIG. 58 and includes AP functions (5805), AR functions (5807) and return functions (5809). The financial performance domain is represented in approximately the lower third of FIG. 58 and has financial information automatically posted to it from the payments domain, as described more fully hereinafter. The personnel domain is not shown in FIG. 58 but draws upon information from the other domains in a manner described more fully hereinafter.

In an exemplary embodiment, the relational database management system provides both a "Quick Switch" option whereby any base table may be viewed or a "Related Switch" option (described in greater detail hereinafter) whereby a base table may be selected from which is then displayed a row related to a selected row in a current table. Various user options may be provided programmatically. Table 1 is a list of most of the base tables and corresponding options in an exemplary embodiment of the invention.

TABLE 1

| Base Table | (Options) |
|---|---|
| Addresses | |
| AllocatedIndex | |
| AP_Registers | |
| AR_Registers | |
| Chart of Accnts | |

TABLE 1-continued

| Base Table | (Options) |
|---|---|
| Checking_Acts | |
| Ch Statements | |
| Claims | |
| Commission Reg | Quick invoice lookup |
| | Quick credit lookup |
| | Get register |
| | Get not approved |
| | Get approved but not paid |
| | Approve |
| | Disapprove |
| | Change payment date |
| | Pay |
| Commissions | Quick lookup by period |
| | Quick transaction lookup |
| | Quick PO lookup |
| | Quick MWS lookup |
| | Quick invoice lookup |
| | Quick credit memo lookup |
| | Get not approved |
| | Approve |
| | Get approved |
| | Schedule payment |
| | Notes |
| | Hold |
| | Get hold |
| | Reset back 1 |
| | Check commissions |
| | Recalculate commissions |
| | Change commission Email |
| Contacts File | |
| CustCredMemos | Quick memo lookup |
| | Credits not taken |
| | Credits taken |
| | Credits on hold |
| | Internal credits not taken |
| | Internal credits taken |
| | Hold credit memo |
| | Internal notes |
| | Customer notes |
| | Internal status change |
| Customers | Add employee purchase record |
| | Approve customer |
| | Find employee |
| | List employees |
| CustPayments | Get not approved |
| | Get not posted |
| | Approve |
| | Post |
| Cust_invoices | Quick invoice lookup |
| | Cust invoice summary |
| | Print selection |
| | Comm report |
| | Get AR report selection |
| | Get not issued |
| | Get not paid |
| | Get no charge |
| | Get pre-paid |
| | Close-no charge |
| | Split invoice |
| | Join 2 invoices |
| | Issue invoices |
| | Check for not issued invoices |
| Defaults | |
| DropShipments | |
| FAX Templates | |
| Item Details | |
| Items Sold | Quick MWS# lookup |
| | Add MWS to fast order |
| | Open order reports |
| | Expedite/availability |
| | Customer notes |
| | CSR notes |
| | Status (restricted) |
| | Expand to all items sold |
| | Remove shipped |
| | Check selection again |
| | Update MWSs |

TABLE 1-continued

| Base Table | (Options) |
|---|---|
| | Clear updates |
| | Tech expedite |
| | Clear tech expedite |
| | Get in house not rcvd |
| | Receive in house |
| | Get installation not rcvd |
| | Receive installation |
| MWSLog | |
| OverUnderPay | Get not reconciled |
| | Get not cleared |
| | Get open |
| | Close |
| Packing Slips | |
| Partners | Find by expense account |
| | Vendor priority maintenance |
| Personnel | |
| PID ItemsSold | |
| PIDs | |
| Products | |
| Purchase Stats | |
| Purchasing | |
| Quote Detail | |
| Rcvd Boxes | |
| Receiving | Receive |
| | Installation |
| | Update MWSs |
| | Double, wrong, defective, or no MWS |
| | Fill allocation |
| | Freight check |
| | Recover receiving register |
| Report | |
| RMA | Quick RMA lookup |
| | Quick case lookup |
| | Quick PO/PID/PRN/RFQ |
| | Get Web RMAs |
| | Update RMAs |
| | Expected cred summary |
| | Edit fax cover sheet notes |
| Sales Records | Quick MWS# lookup |
| | Quick quote# lookup |
| | Quick PO/RFQ/PID/PRN LU/conf. |
| | PurchChecks |
| | Update MWSs |
| | Expedite/availability/purch |
| | Urgent |
| | Not Urgent |
| | Daily PO confirmation |
| | Get quotes |
| | Print quote confirmation |
| | Quotes requiring REVIEW |
| | Cancel REVIEW |
| | Get purchasing records |
| | Print purchase summary |
| | Clear updates |
| | Lock |
| | Unlock |
| | Get unlocked |
| | Change TPO to real PO |
| | Get temporary POs |
| | Get Web quotes |
| Sales_Reps | |
| Sales_Support | |
| Sales_Taxes | Recalc selection |
| | Add sales tax |
| Shipping | Quick lookup by period |
| | Quick lookup by pickup number |
| | _Following works in selection |
| | Get not reconciled open |
| | Get not reconciled closed |
| | Get reconciled open |
| | Get reconciled closed |
| | Installation |
| | Update MWSs |
| | Freight check |
| | Reconcile freight |
| | Recover register |
| | Merge registers |

TABLE 1-continued

| Base Table | (Options) |
|---|---|
| TaxRegister | Due dates |
| | Update user selection |
| | Print user selection |
| | Sets window |
| Tax_Tables | |
| Ven Pmnt Regs | Quick invoice lookup |
| | Quick credit lookup |
| | Get register |
| | Get not approved |
| | Get approved but not paid |
| | Approve |
| | Disapprove |
| | Change payment date |
| | Pay |
| | Get regs with credit balances |
| | Vendors with credit balances |
| | Close register |
| | Open register |
| VenCollection | Quick memo lookup |
| | Quick invoice lookup |
| | Quick payment register lookup |
| | Get not used |
| | Get excess/not distributed |
| | Get distributions |
| | Get expected memos |
| | Reconcile expected memo |
| | Get not pre-approved |
| | Pre-approve |
| | Get pre-approved |
| | Approve |
| | Get approved |
| | Schedule |
| | Reset status back 1 |
| | Cancel credit memo |
| VenMultiCred | |
| VenRecExpCred | |
| Ven_Invoices | Quick invoice lookup |
| | Quick voucher lookup |
| | Quick check lookup |
| | Search selection by date |
| | Verify selection |
| | Daily verification |
| | Get all not paid |
| | Get not reconciled |
| | Get reconciled |
| | Reconcile with credit |
| | Pre-approve |
| | Get pre-approved |
| | Remove pre-approved |
| | APPROVE |
| | Get approved |
| | Schedule payments |
| | Schedule pre-paid payments |
| | Close selection |
| | HOLD selection |
| | Get hold |
| | Reset status back 1 |
| | Edit terms/payment/vouchers |
| | Integrity check |
| | Temporary notes |
| | Update invoice |
| | Mark ready for review |
| | Get ready to review |
| | Mark reviewed |
| | Get reviewed |

Various screen displays showing the options pop-up menu for that screen display are shown in FIG. 124 through FIG. 128.

Business Process—Overview

Figure 59:
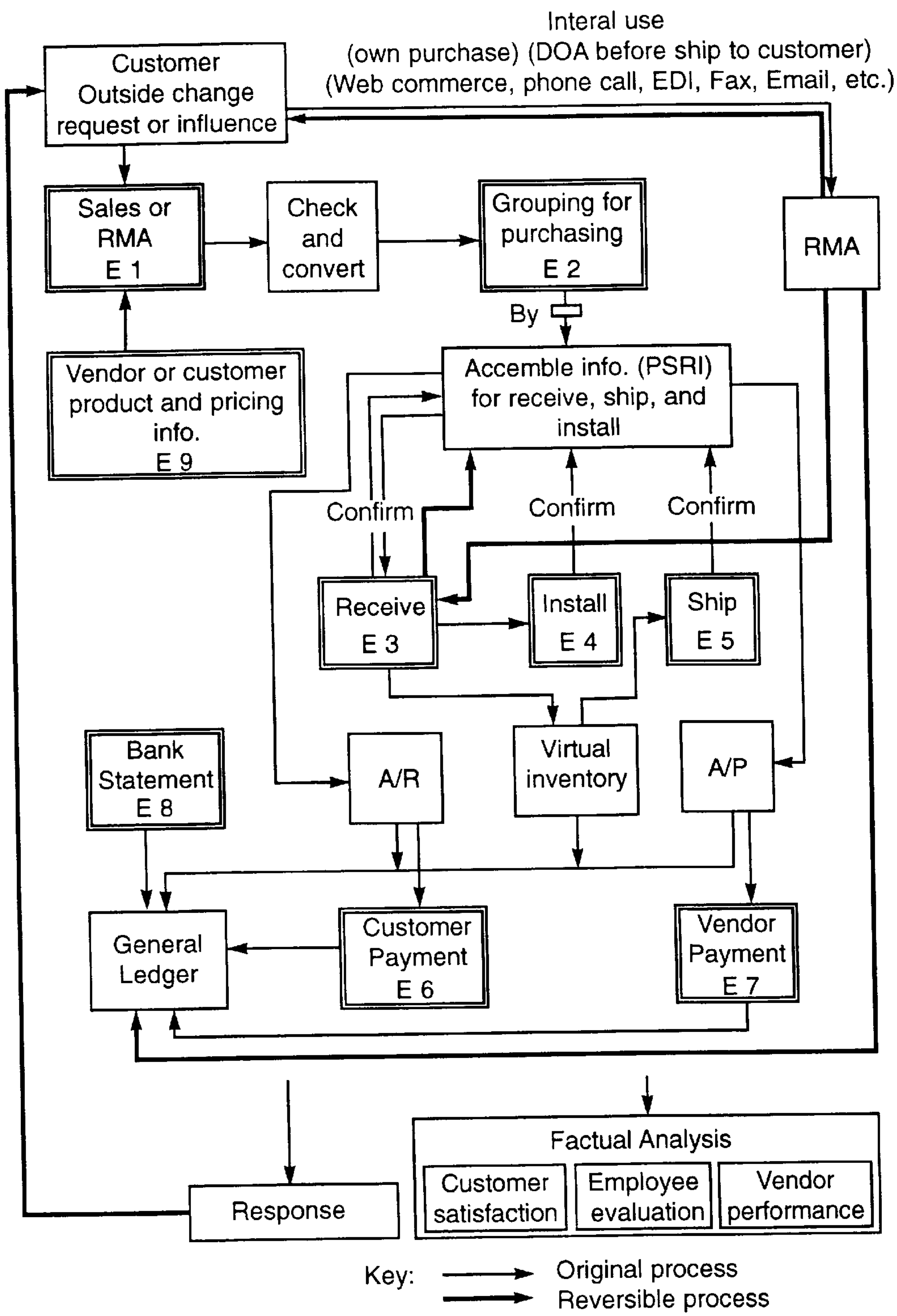
FIG. 59 is a block diagram illustrating an automated business process in accordance with an exemplary embodiment of the invention.

An overview of the present automated business process is shown in FIG. 59. In an illustrated embodiment, the automated business process has nine entry points, designated E1–E9, at which users enter information into the system. Interaction with the system is carefully controlled and user inputs carefully qualified to ensure, to the greatest degree possible, error-free operation.

The business process is customer-driven. The first entry point E1 in the business process is Sales/RMAs. In response to a customer request, a user having responsibility for E1 enters information about the customer request into the database. If the request regards sales, the information is checked and converted to a Master Worksheet (MWS). At an entry point E2, the responsible user groups MWSs for purchasing and places orders. Information is assembled for later use in receiving (E3), installation (E4), and shipping (E5). Respective users at these entry points make entries into the database which as confirmed against the assembled Purchasing/Shipping/Receiving/Installation (PSRI) information to verify correctness.

Unlike prior art systems, the present system is based on the concept of virtual inventory. In accordance with the concept of virtual inventory, all of the goods available for purchase in all of the warehouses throughout the world are regarded as available inventory. Because the Web allows business to take place at light speed, the difference between physical inventory and no physical inventory can be merely the click of a button on a computer screen. As goods are received and shipped, these events are tracked by a virtual inventory process in which all items are presold.

Entry points E6 and E7 relates to customer and vendor payments, respectively. Assembled information is input to A/P and A/R modules. Customer payments are received and entered in conjunction with the A/P module. Vendor payments are made in conjunction with the A/R module.

A general ledger (GL) module tracks transactions and their financial implications in real time. It therefore receives information from the A/P, A/R and virtual inventory modules as well and entry points E6 and E7. Bank statement information is also input to the general ledger module at entry point E8.

The customer request, instead of being for sales, may be an RMA request. Information is then input from E1 to an RMA module. A reverse process in then executed, begun by an RMA number being communicated to the customer. In the typical case, the customer then returns merchandise authorized for return. The returned merchandise is received (entry point E3) in conjunction with the RMA module and receiving information portion of the assembled information. The RMA module communicates with the GL module so that appropriate accounting entries may be made.

The effect of the overall business process is two-fold. First, a response to the customer's input is produced and communicated back to the customer. Second, during the course of the business transaction, a wealth of historical data are accumulated that may then be subjected to factual analysis for purposes of ensuring customer satisfaction, evaluating employee performance, and evaluating vendor performance.

In the following description, the course of an order will be described within each of the domains identified in FIG. 3, as follows: in the product domain, from quote to shipment, as well as return (although rather atypical, returns are nevertheless a common occurrence); in the payments domain, from invoice to payment (both customer and vendor); in the financial performance domain, from cashflow to financial statements; and finally, in the factual performance domain, from parameters such as time, quantity and dollar volume to individual and group employee performance.

Sales

As may be appreciated from the foregoing description, an order may be preceded by a quote. Quotes may be requested and orders may be placed in writing (e.g., by fax), verbally (e.g., by phone), or electronically via the Web. More generally, order information may be conveyed by electronic means (e.g., Internet, intranet, EDI, satellite, remote terminal direct-dial), human-mediated telecommunications (e.g., email, phone, fax), or by physical means (letter, visit, etc.). Regardless of the origin of the quote or order, the quote or order becomes a sales record.

A screen display that may be used to view sales records is shown in FIG. 60. Quotes are each assigned a Quote number having a "Q" prefix. Orders are tracked via records referred to as "Master Work Sheets" (MWS). A Master Worksheet contains all of the vital information related to an order. As seen in FIG. 60, orders are each assigned a MWS number having a MWS prefix. The screen display of FIG. 60 includes a status column in which the status of each quote and order is indicated, e.g., WebSubmit, WebQuote, Purchasing, etc. The status of each record can therefore be readily ascertained and tracked.

Figure 61:
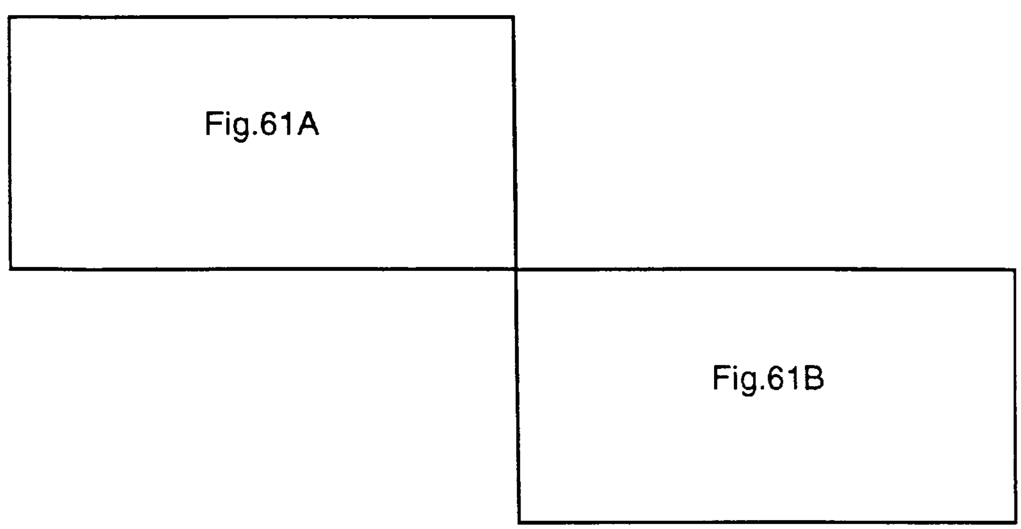
FIG. 61 is an illustration of a Quote screen display.
Figure 61A:
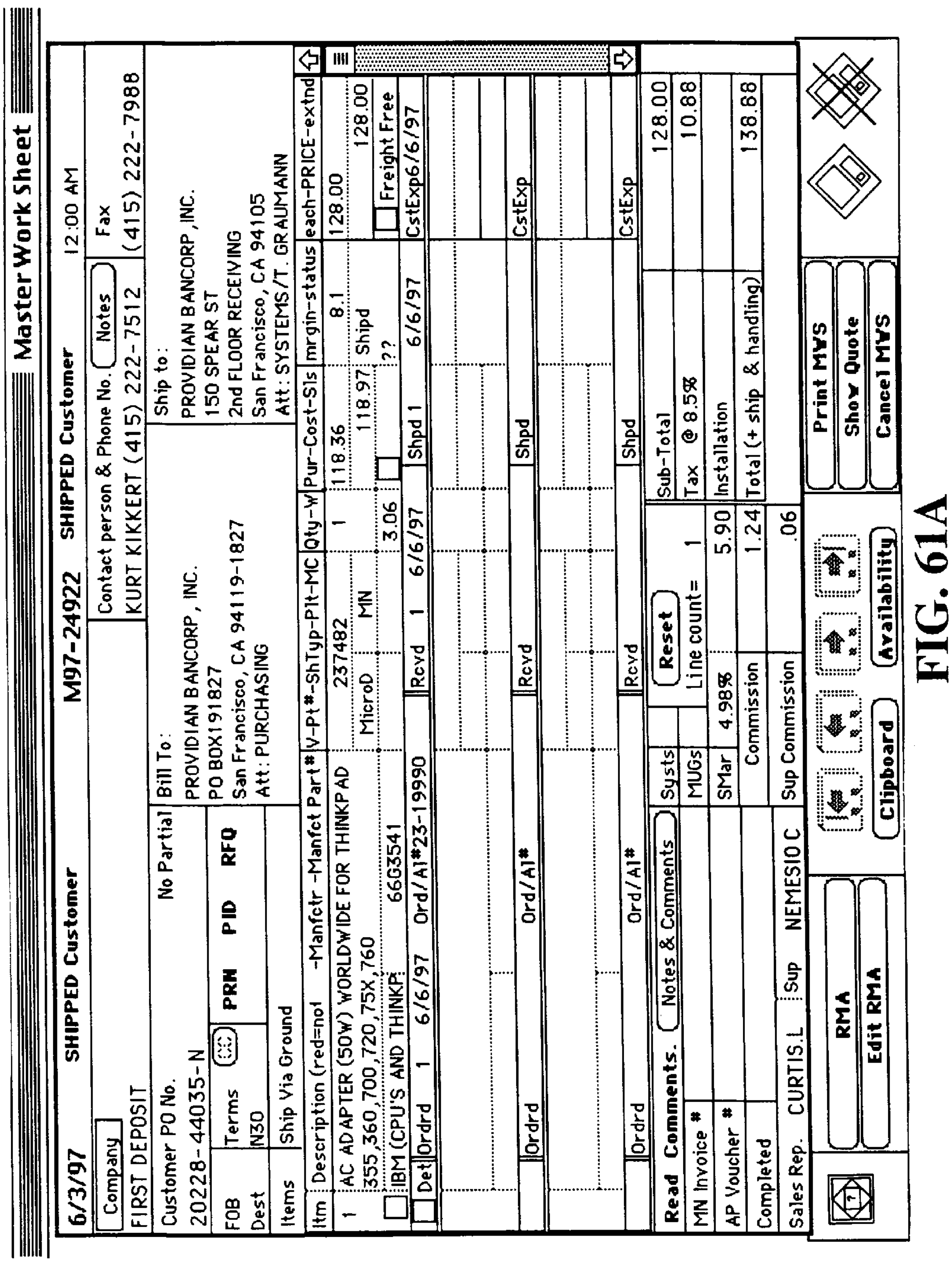
Figure 61B:
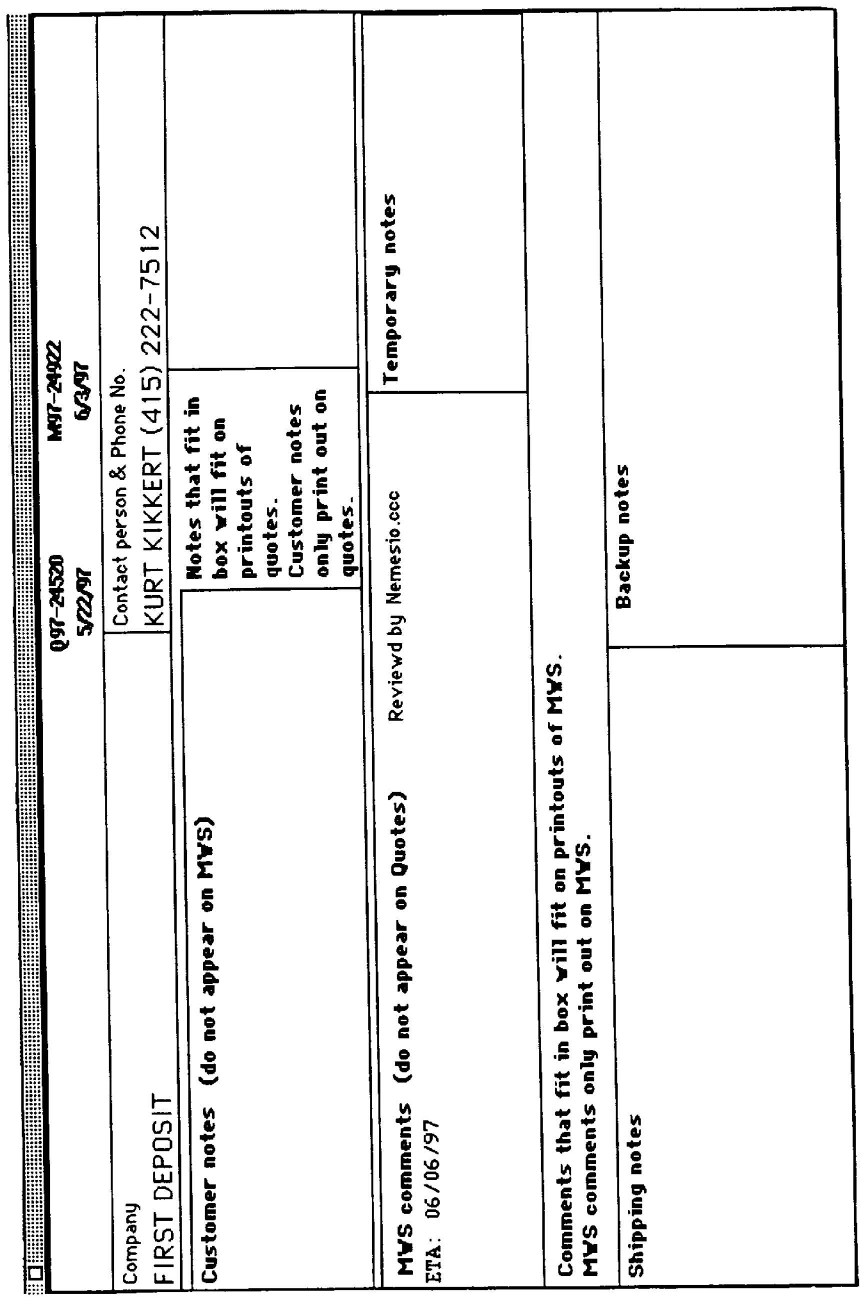

Referring to FIG. 61, the input layout of a quote is shown. During record input, the system prompts the user at every opportunity. For example, when the cursor is placed within the customer field, a list of previous customers is displayed. Assuming the customer is a repeat customer, the user can select the customer from the list. Various fields are then completed from information previously stored for that customer.

Figure 62C:
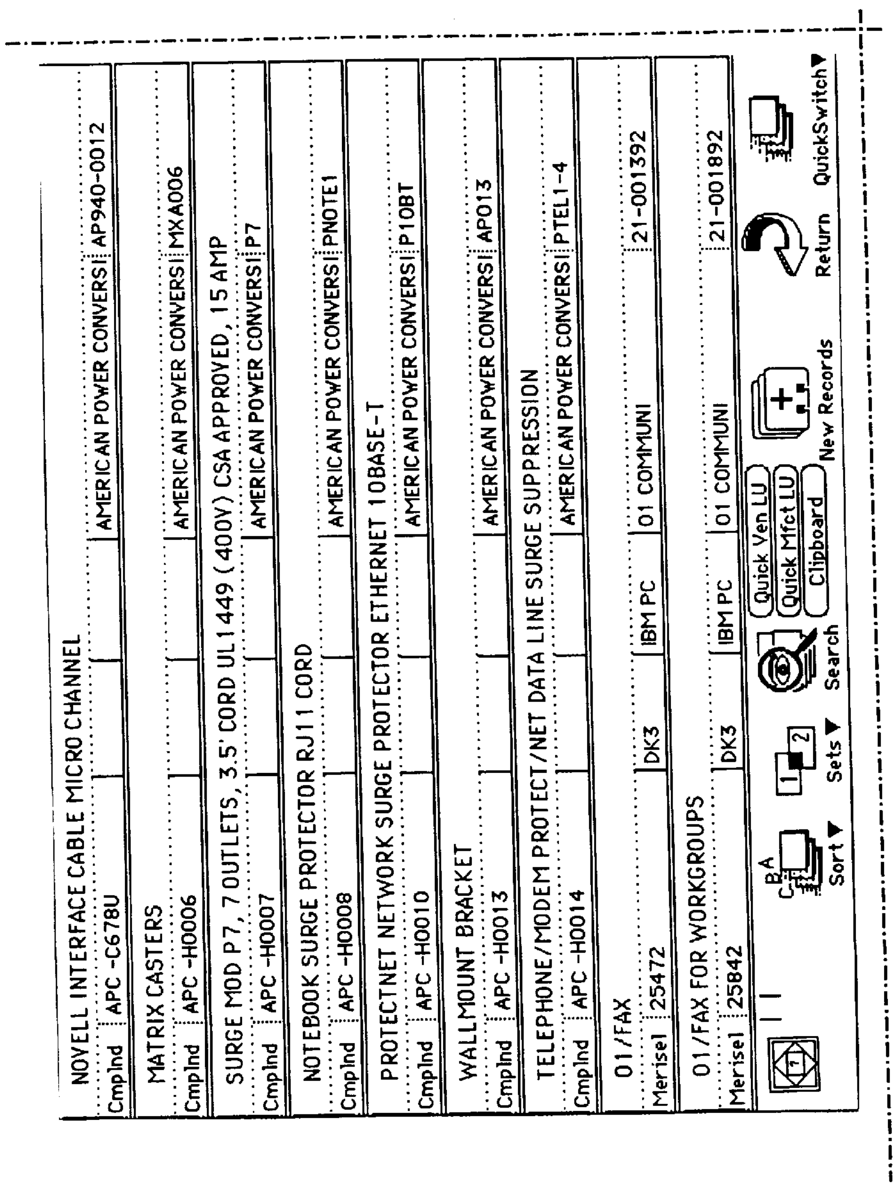
FIG. 62 is an illustration of a Products screen display.
Figure 62D:
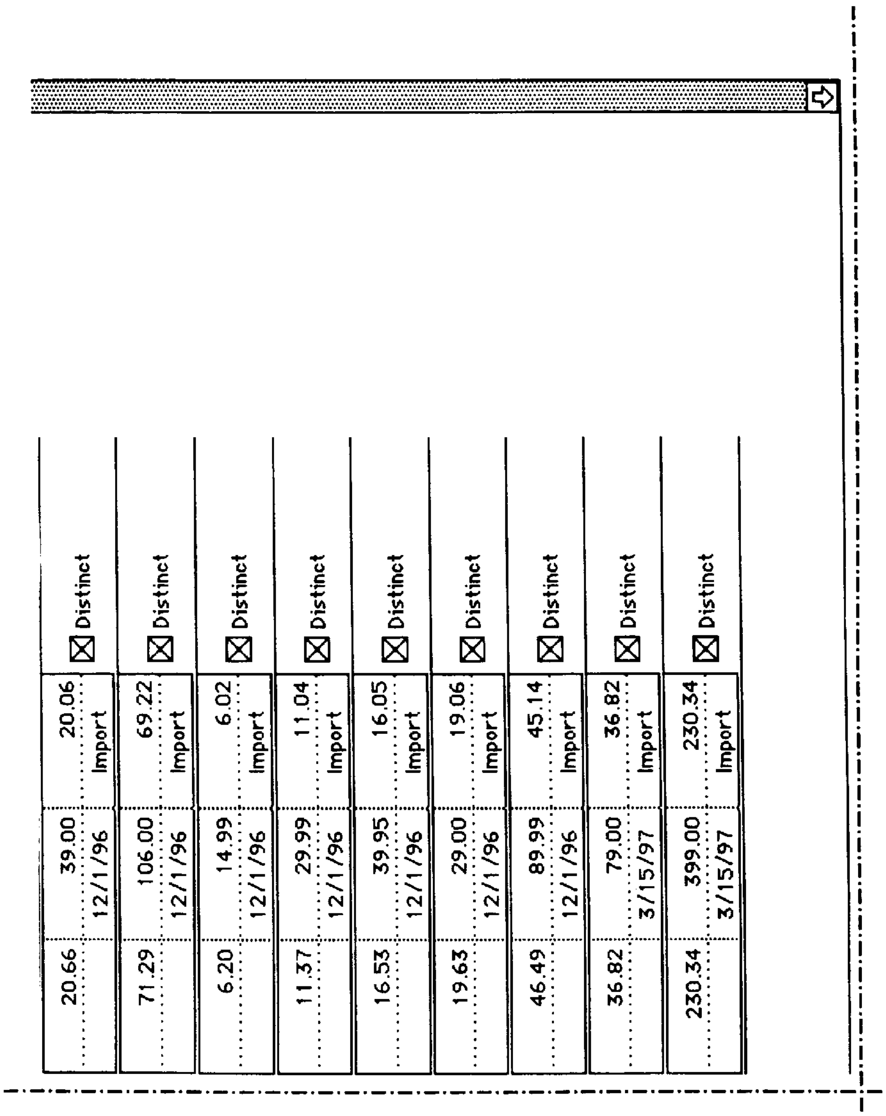

To add an item to a quote, the user clicks the "+" icon, followed by the "Go Prod" button. The Products file is then displayed, as shown in FIG. 62. The Products file may contain hundred of thousands or even millions of product records of products from different vendors. When the user selects a product, the all of the relevant information for that product is transferred to the quote. To facilitate selection, the product file may be searched in various ways, e.g. by vendor, product category, etc. By searching the products file by manufacturer part number, the vendor offering the best price for a particular product may be identified.

When all items have been added, the user is asked to specify partial shipment status. The partial shipment status specifies what items, if any, can be shipped separately and what items, if any, are required to be shipped together. The user is further prompted to enter installation information and to ensure that all required cables, brackets, etc. have been ordered. In the case of computer equipment, for example, installation may involve installing a card or installing memory within a computer, loading software, etc. If installation is specified, installation charges are automatically added to the quote.

During the foregoing process, the user may enter notes within a screen 6101. This screen is displayed whenever the quote or MWS is displayed. If a quote is created on the Web, a separate notes screen is provided for customer notes. A corresponding notes screen for internal use only is provided for all quotes.

When the quote is satisfactory, the user may then save the quote by pressing the post to purchasing button.

Figure 63:
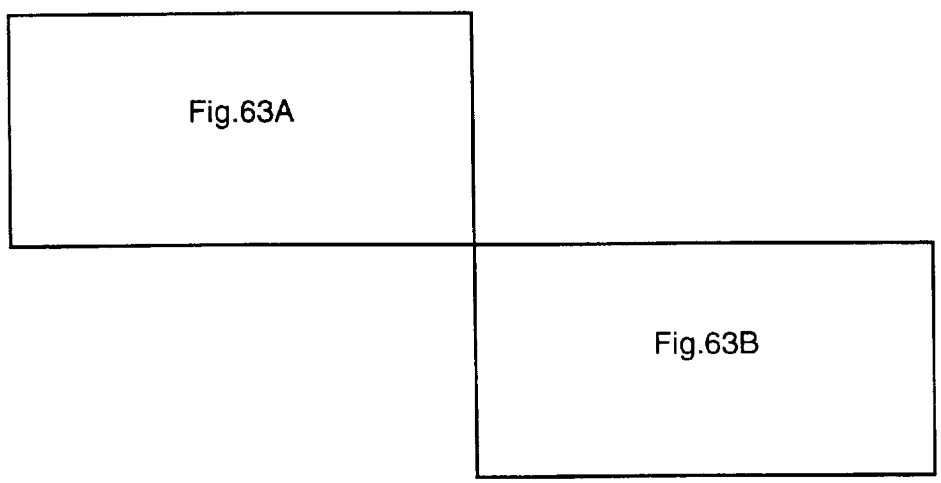
FIG. 63 is an illustration of a MWS screen display.
Figure 63A:
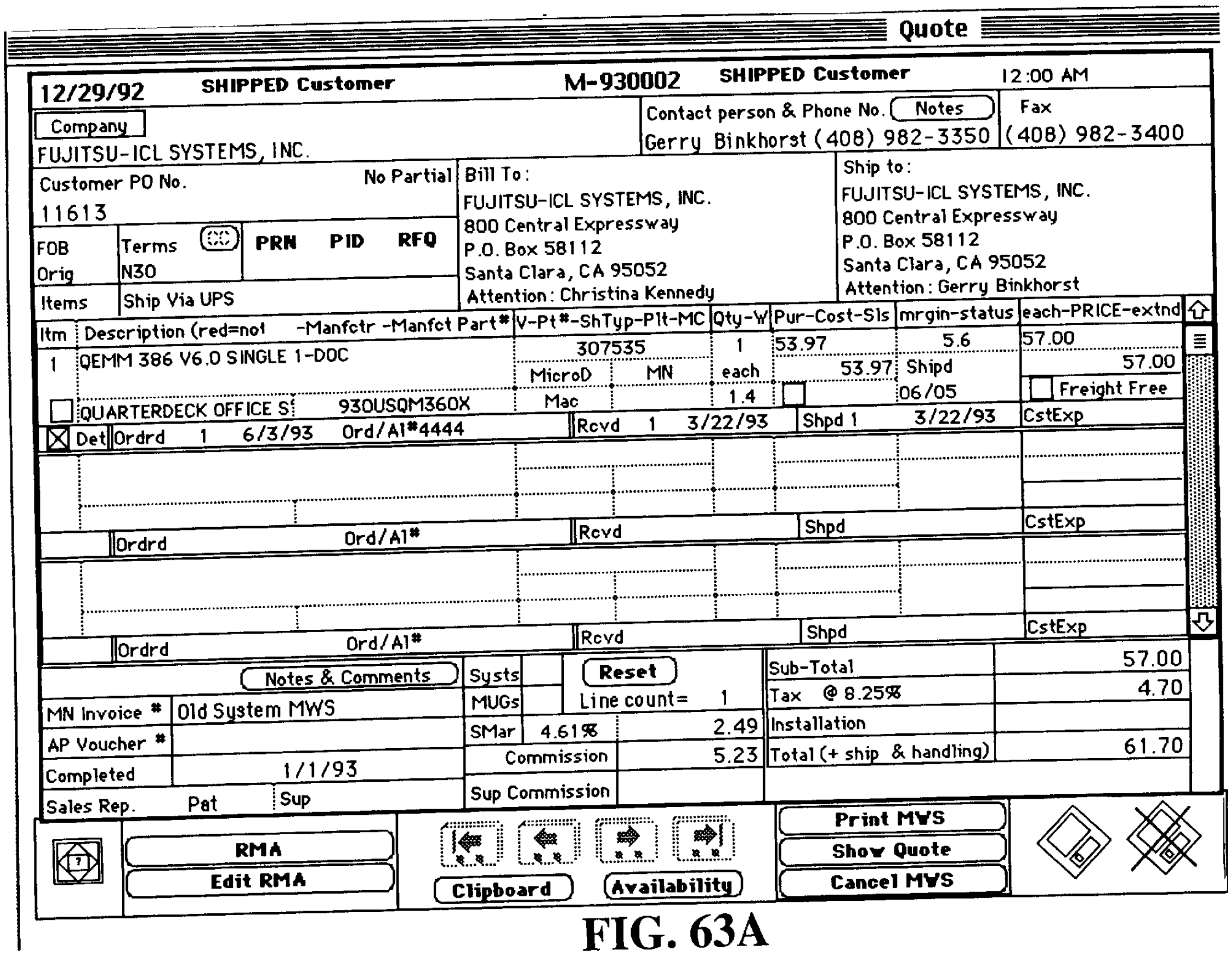
Figure 63B:
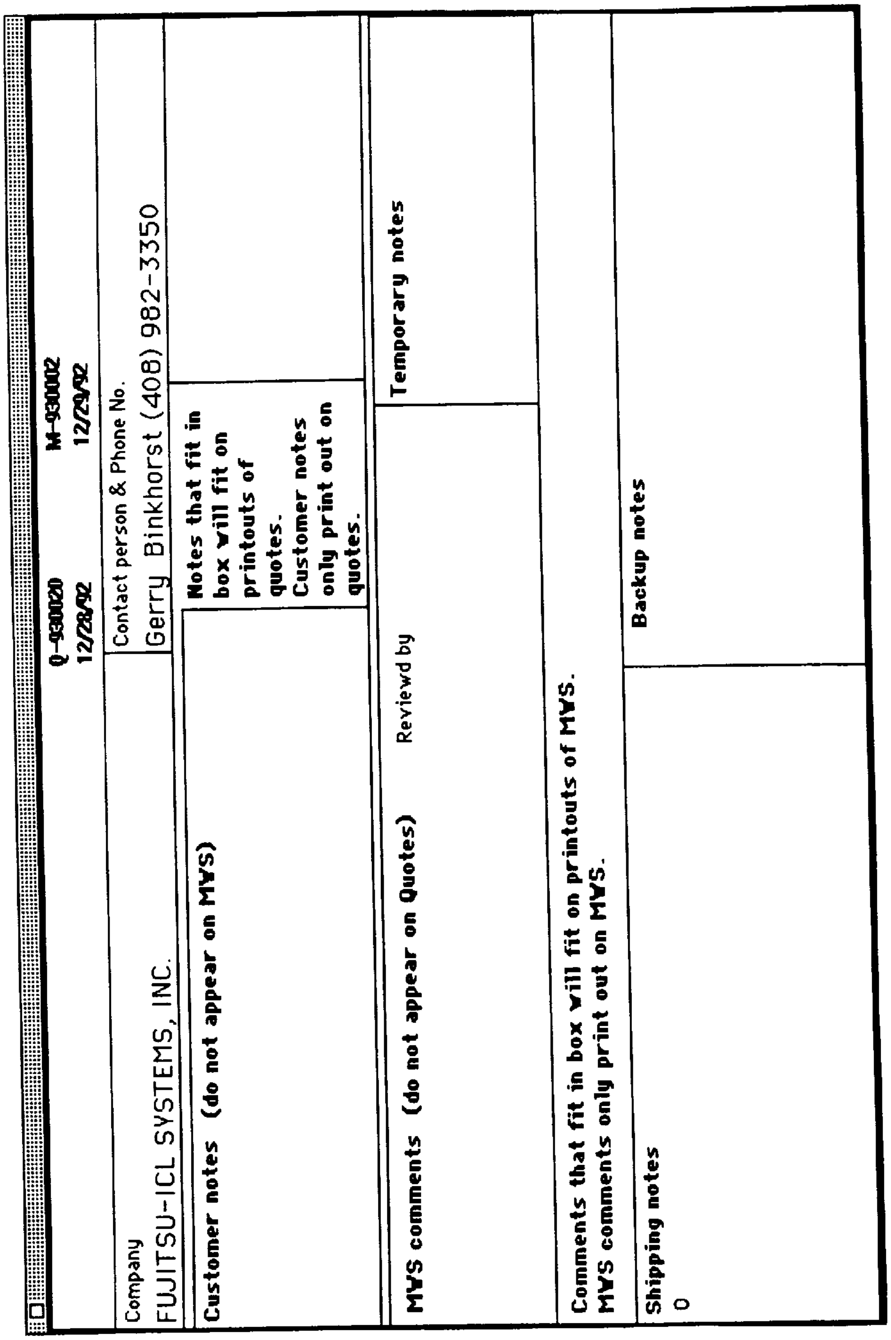

To ensure that a quote is correct, one or more additional review stages may be required before the quote is converted to an MWS for purchasing. For example, the quote may be reviewed by "inside sales" to make sure that any compatibility requirements have been met and that, from a technical viewpoint, there are no errors in the quote. In a further review stage, the quote may be compared to a paper purchase order, if one exists, to make sure there are no discrepancies. When the quote has passed whatever level of review is required, it is then marked reviewed and converted to an MWS. The format of an MWS is shown in FIG. 63.

Note that, during the foregoing process, different people may have different limited privileges. Also, throughout the foregoing process and throughout the system generally, at each information entry point, the user's input is checked for accuracy in order to prevent common mistakes from occurring.

PRIS (Purchasing, Receiving, Installation, Shipping)

Purchasing, receiving, installation and shipping functions are closely interrelated. For this reason, preferably the output display/user interface presented during these different processes preserve a common look and feel.

Purchasing may be based on a real inventory model, a virtual inventory model, or a combination of the two. In the case of the virtual inventory model, automating purchasing functions in such as manner as to 1) scrupulously avoid physical inventory; and 2) achieve business scalability, becomes a challenge. The following description assumes that purchasing is based at least in part on a virtual inventory model.

A simplistic approach to purchasing is to treat each customer purchase order separately. Under this approach, however, the amount of work involved in purchasing is proportional to the number of customer purchase orders; business cannot achieve 100, 200 or 1000% growth in a short period of time without causing severe growing pains.

Instead, the purchasing module of the present system is designed for business scalability and maximum automation, allowing for dramatic growth without a dramatic increase in human effort and with little or no pain. Scalability is achieved by "commingling" customer orders in such as way that what appears to an outside vendor as a single large order is tracked within the system as a multitude of smaller orders.

Figure 64:
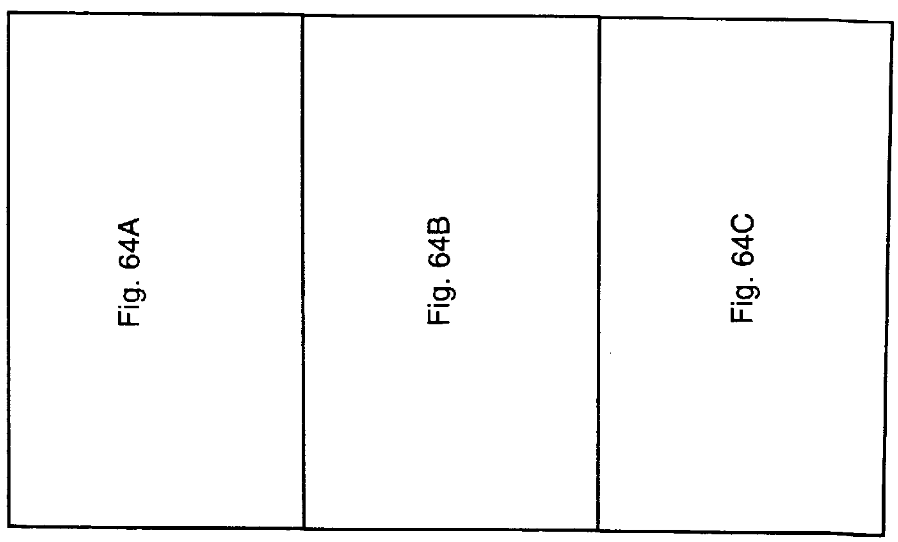
FIG. 64 is an illustration of a Purchasing view of a PSRI (Purchasing/Shipping/Receiving/Installation) screen display.
Figure 64A:
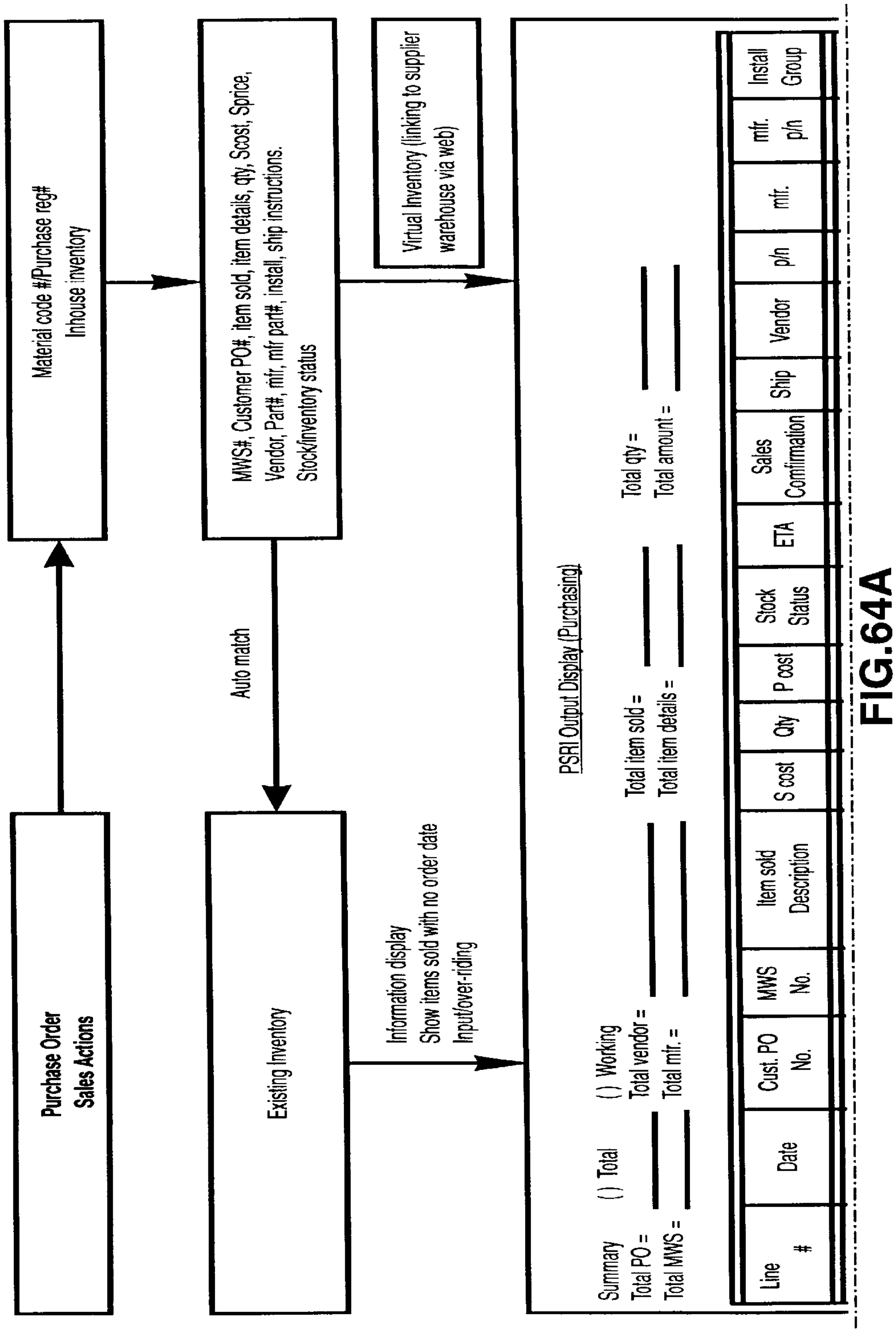
Figure 64C:
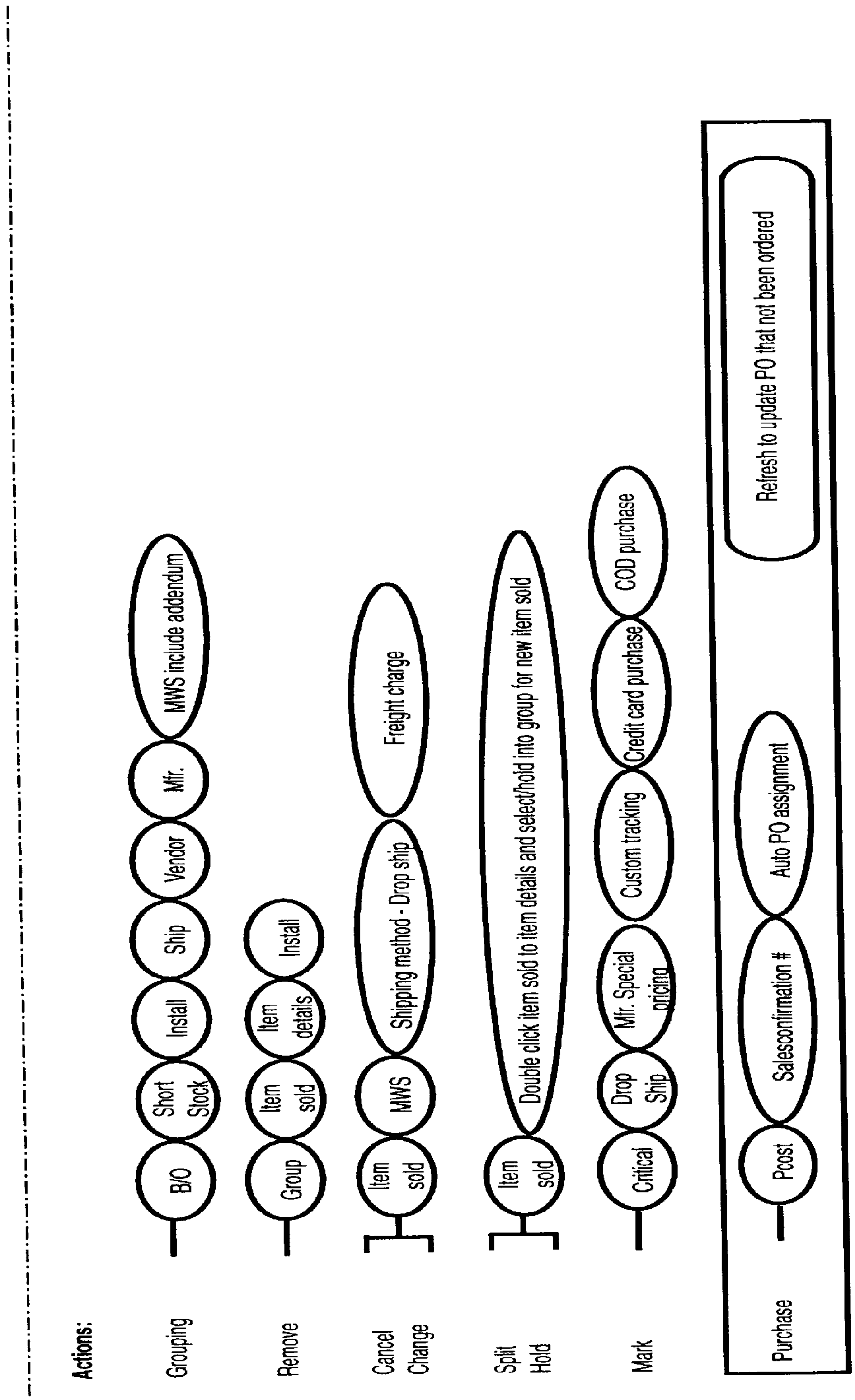

Referring to FIG. 64, purchase order sales actions result in MWS records, each MWS record including all of the relevant information required for purchasing. In an exemplary embodiment, this information includes internal MWS number, customer P.O. number, sales cost, sales price, vendor, part number, manufacturer, manufacturer part number, installation grouping (within a particular MWS), shipping instructions, and stock/inventory status. Each MWS is assigned a unique MWS number which is used throughout the life of a transaction to differentiate distinct purchase orders. Any unique identifier may server the same purpose, including, for example, a material code number, a purchase requisition number, etc.

If a mixed physical/virtual inventory model is followed, then a physical inventory process determines prior to purchasing whether an item is already in inventory and hence need not be purchased, at least for purposes of fulfilling the order. Items not in inventory must then be purchased. The design of a purchasing output display/user interface greatly simplifies the purchasing process. For each item to be purchased, a record is displayed including each of the foregoing pieces of information. Preferably, all of the heading allow for sorting on that heading. Furthermore, all items are selectable and may be expanded (by doubling clicking) into item details.

The user interface allows a variety of actions to be performed, including grouping items within the display, removing items from the display, cancelling or changing various aspects of an order, holding an item or splitting an item (e.g., in order to hold less than all of the items details belonging to an item), etc. In an exemplary embodiment, items may be grouped by stock status (B/O, short stock), by shipping instructions (partial shipment OK, no partial shipment), by vendor, by manufacturer, by MWSs including addendums, etc. Groups of items may be removed from the display, including any of the aforementioned grouping and install groups. An item sold (one or multiple physical items) may be removed or an item detail (a single physical item) may be removed. Cancellations and changes may be made to an item sold, an MWS, shipping method, and freight charges.

In a typical scenario, a purchaser's work might proceed in the following manner.

1. Get all unfinished and new work (all items having no order date).
2. Select a subset of items to work and remove all other items from the output display.
3. Get all back ordered items and purchase them first. Eliminate related "no partial" items from the output display until the corresponding back-ordered item has been received.
4. Group items from different orders and possibly change vendor on some items to obtain quantity discounts, if possible.
5. Place order and repeat.

Various user interface buttons relate to the actual placing of a purchase order. In a telephonic transaction, purchase cost (Pcost) on an item might be negotiated downward below the sales cost (Scost). By selecting an item and clicking on the button, the purchase cost may be input in the course of placing the order. A sales confirmation number may also be input by clicking on the corresponding button. An automatically generated PO number may be assigned by clicking on button. By clicking on the button, the output display is refreshed to remove from the display items that have been ordered. Simultaneously, the system marks the ordered items as ready to receiving, thus preparing the items for receiving.

More preferably, purchase orders, instead of being placed manually, are placed electronically by linking to the seller's network of vendors. Automated purchasing may occur continuously or at regular intervals using "pull" technology, "push" technology, some combination of the two, or some other information retrieval technology or combination of technologies.

Business rules implemented by the purchasing process include the following:

1. Items cannot be ordered before a quote is converted to a MWS.
2. Duplicate orders are not allowed by item or MWS.
3. Items can only be ordered from approved vendors.
4. Purchasing can only be done by authorized personnel.
5. Purchasing notes can only be viewed by authorized personnel.
6. Purchase costs can only be viewed by authorized personnel.

Figure 65:
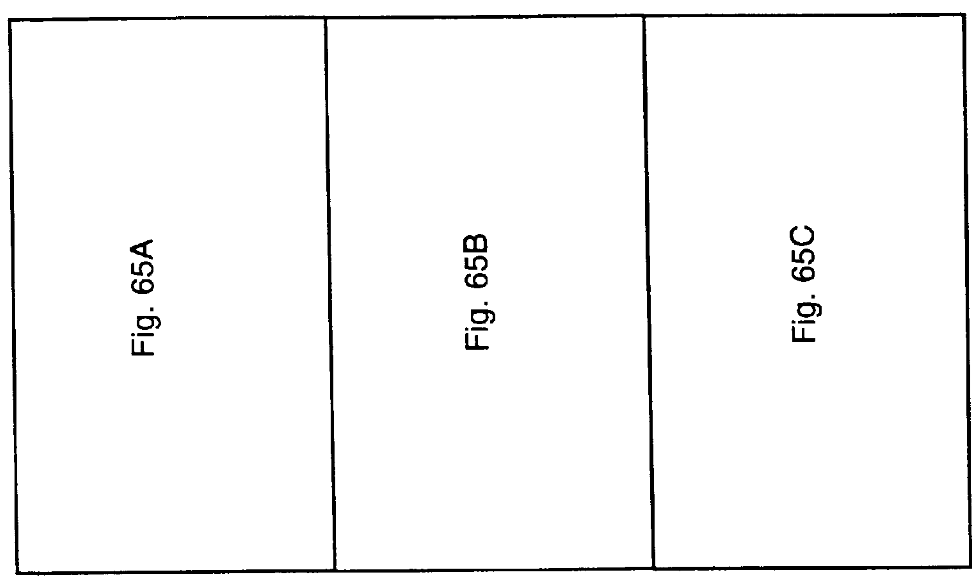
FIG. 65 is an illustration of a Receiving view of the PSRI screen display.
Figure 65A:
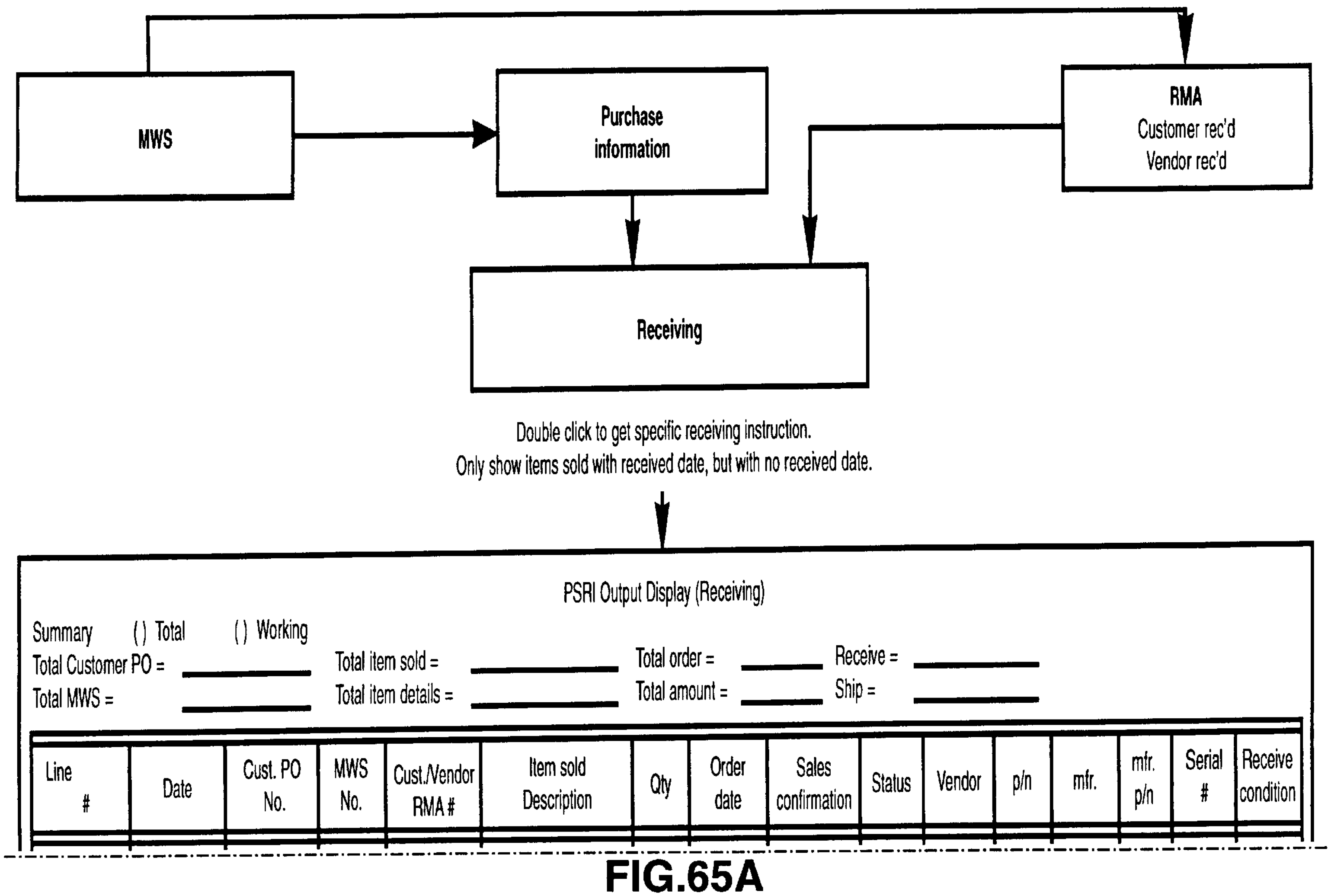
Figure 65C:
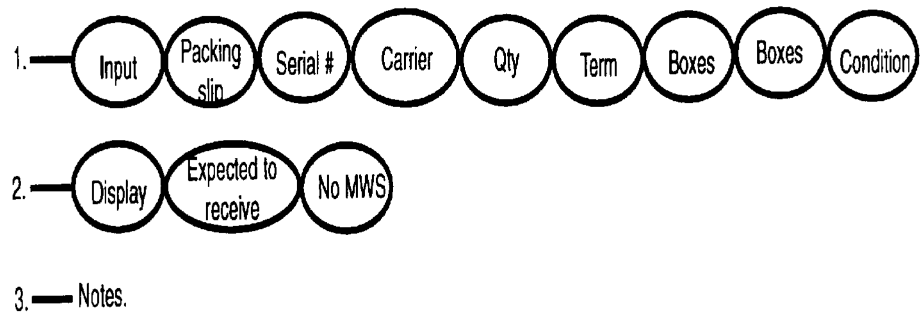

Referring to FIG. 65, purchasing information, derived from MWSs, is used in the receiving process. (An item must have been purchased to be received.) Returns (RMA) information, also derived from MWSs, is also used in the receiving process. (Return items must be received in order to give credit.)

When the receiving process is begun, only items sold having an order date but no receive date are displayed. Double clicking on a item causes specific receiving instructions for that item to be displayed, as described more fully hereinafter. The display format is very similar to that of the purchasing process. The possible actions that may be initiated, however, are particular to receiving. Those actions include 1) input actions; and 2) display actions.

Information input during receiving includes packing slip number, serial number (each physical item, where applicable), carrier, quantity, payment terms, number of boxes, condition upon receipt, etc. Batch input for all packing slips and items. The system automatically matches input with items that exist in the system such that the same item cannot be received twice, the wrong item cannot be received, a cancelled order cannot be received, etc.

Expected to receive will exclude refusal items. For example, a customer may change his or her mind after an order has been placed but before the item has been received. In this instance, a refuse instruction may be placed on the item to prevent it from being received.

As in the case of purchasing, in the case of receiving also, great benefit is obtained from allowing vendor access via the Web to see what products order from that vendor have been received. The vendor then obtains the information it requires to be truly responsive to its customer's needs.

Figure 66:
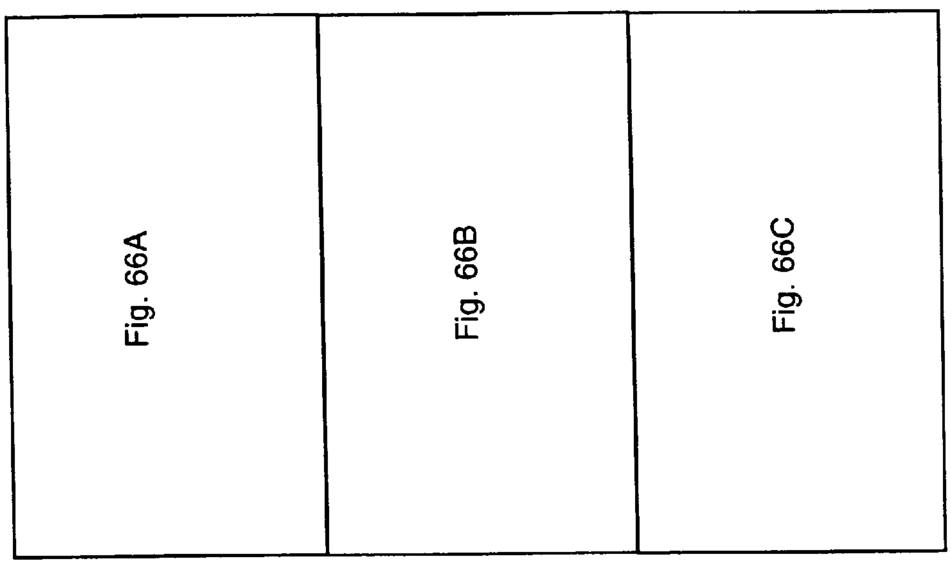
FIG. 66 is an illustration of an Installation view of the PSRI screen display.
Figure 66A:
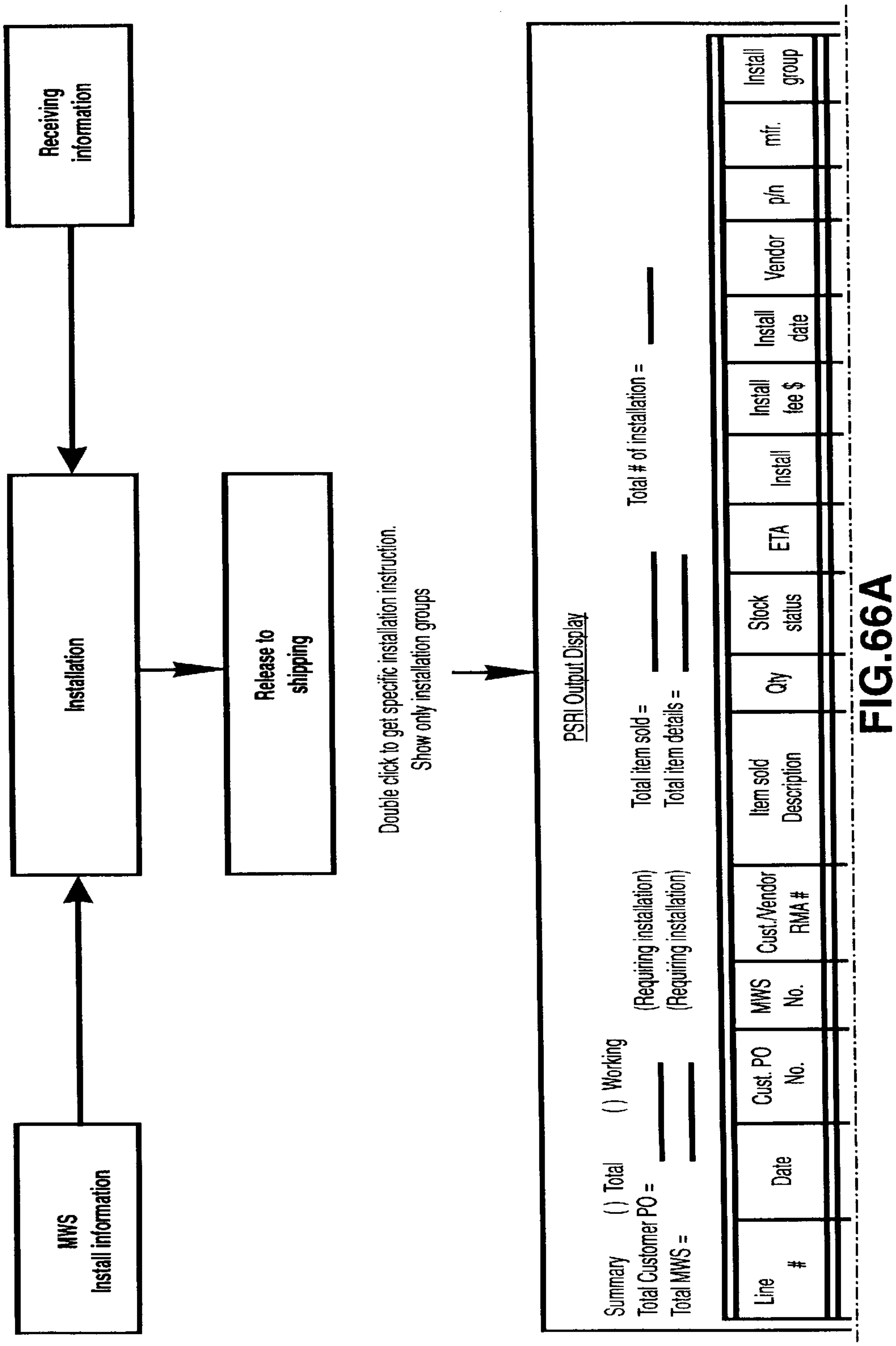
Figure 66C:
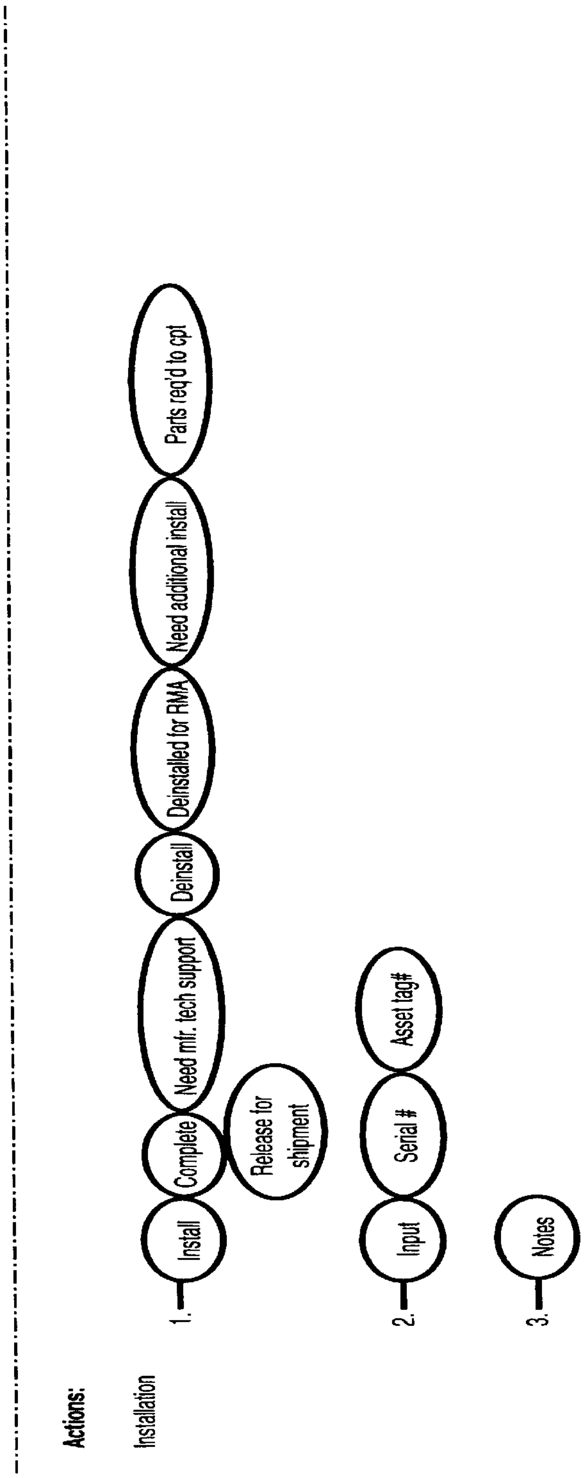

Referring to FIG. 66, installation is based on the same type of output display. However, only installation groups are shown. Items requiring no installation are not displayed. Furthermore, the user has the option to show all items requiring installation or to show only items requiring installation that have been received. The possible actions that may be initiated include 1) actions used to track installation in various different stages of completion; and 2) input actions, namely input of serial number and asset tag number. (Asset tag numbers may be affixed by prearrangement with the customer and retained in the system indefinitely to assist the customer in accounting for equipment.)

An installation, once begun, may have several possible outcomes. In the typical case, the installation will be completed successfully and the installation group may be released for shipment. In other instances, installation may be only partially completed—e.g., manufacturer technical support may be required, additional parts may be required to complete installation, or additional installation may be required for some other reason. In some instances, the appropriate action may be disinstallation, for RMA purposes or for some other reason. All of these different stages of completion are tracked within the system.

Figure 67:
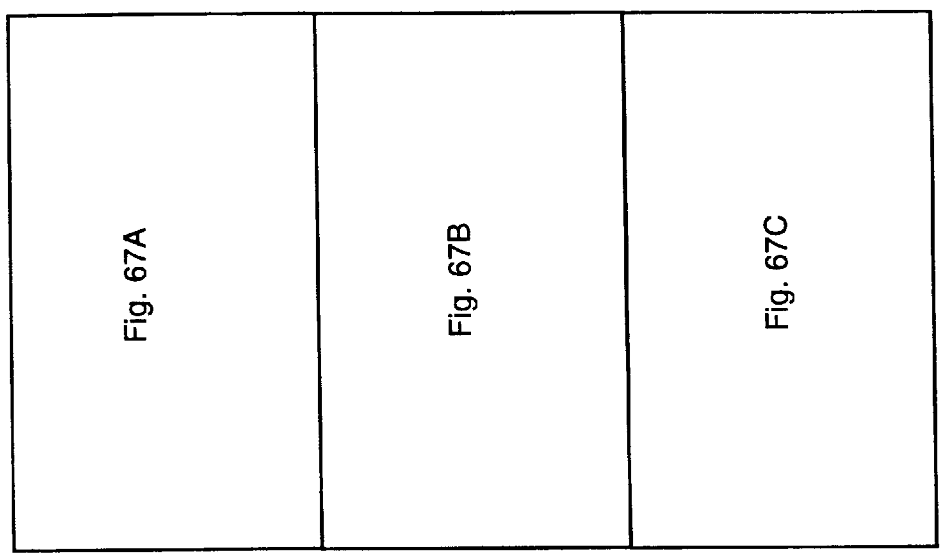
FIG. 67 is an illustration of a Shipping view of the PSRI screen display.
Figure 67A:
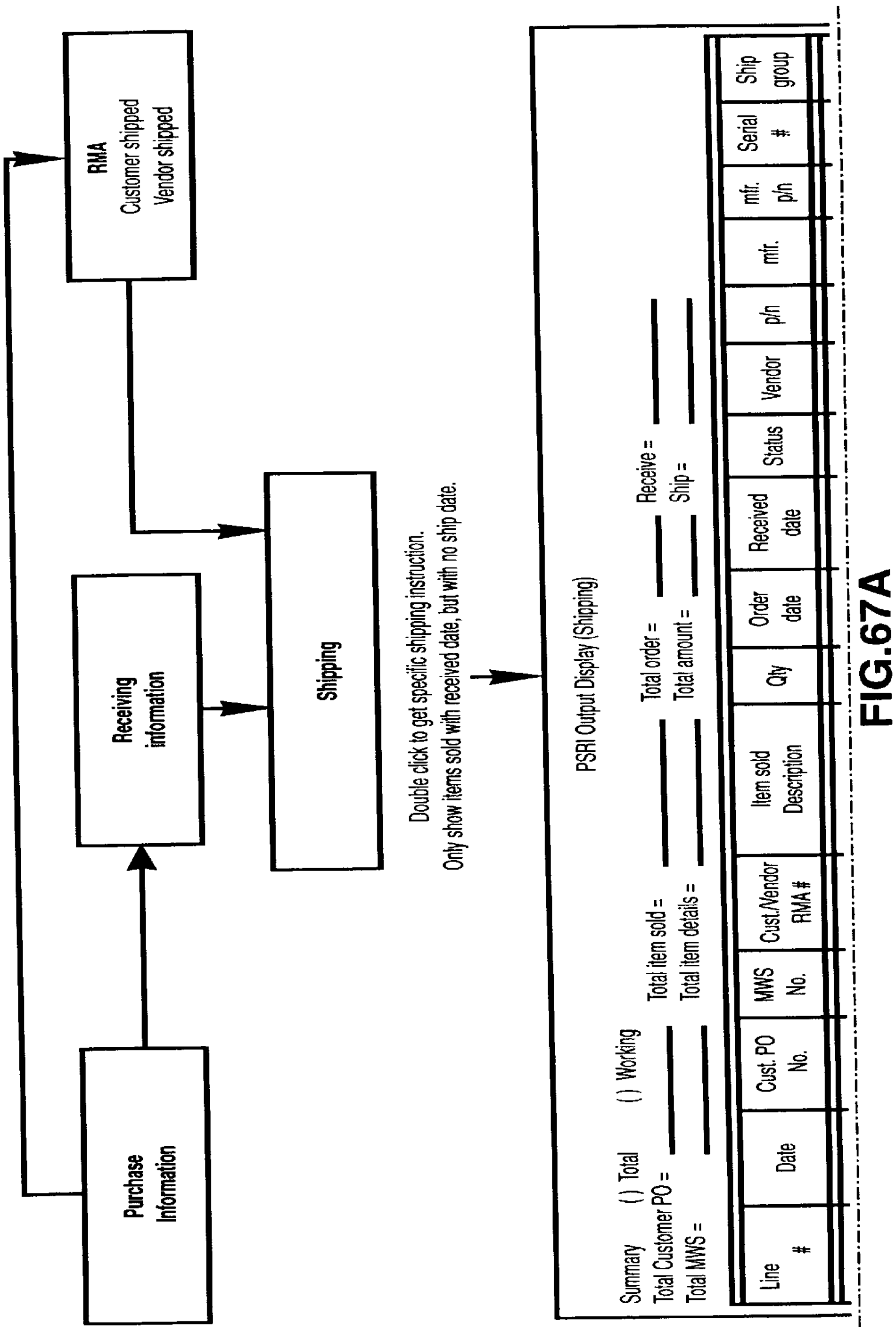
Figure 67C:
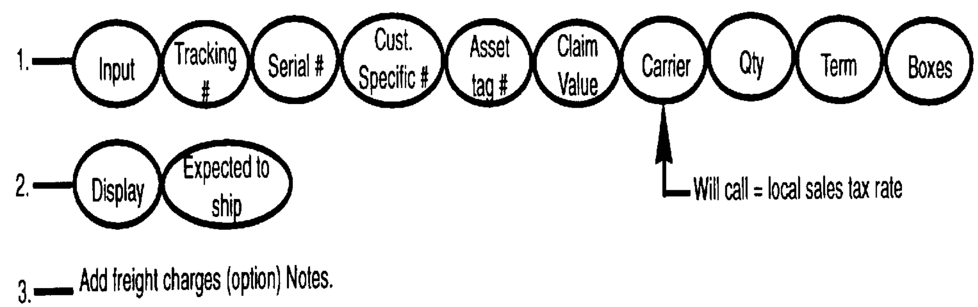

Referring to FIG. 67, the shipping process, like receiving, uses both purchase information and RMA information. The output display displays only items sold having a received date but no ship date. Double clicking on a item causes specific shipping instructions for that item to be displayed, as described more fully hereinafter. Input actions that may be initiated include inputting a shipping tracking number, serial number (if not previously entered), customer specific number or asset tag number, claim value, carrier (or will call, which causes a local sales tax rate to be applied), payment terms, boxes, etc. Provision is also made to display only those items expected to ship, excluding refusal items, hold items and items with COD/cash terms.

Figure 68:
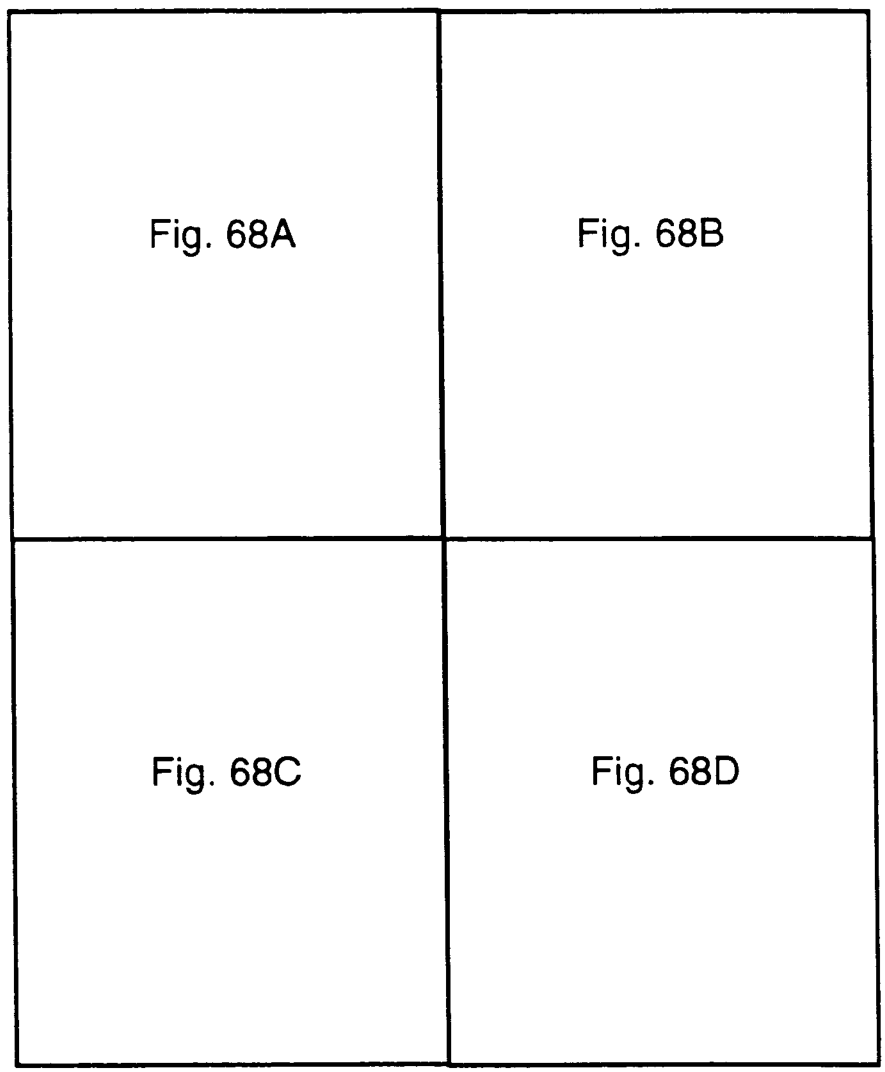
FIG. 68 is an illustration of a PSRI Item Detail screen display.
Figure 68C:
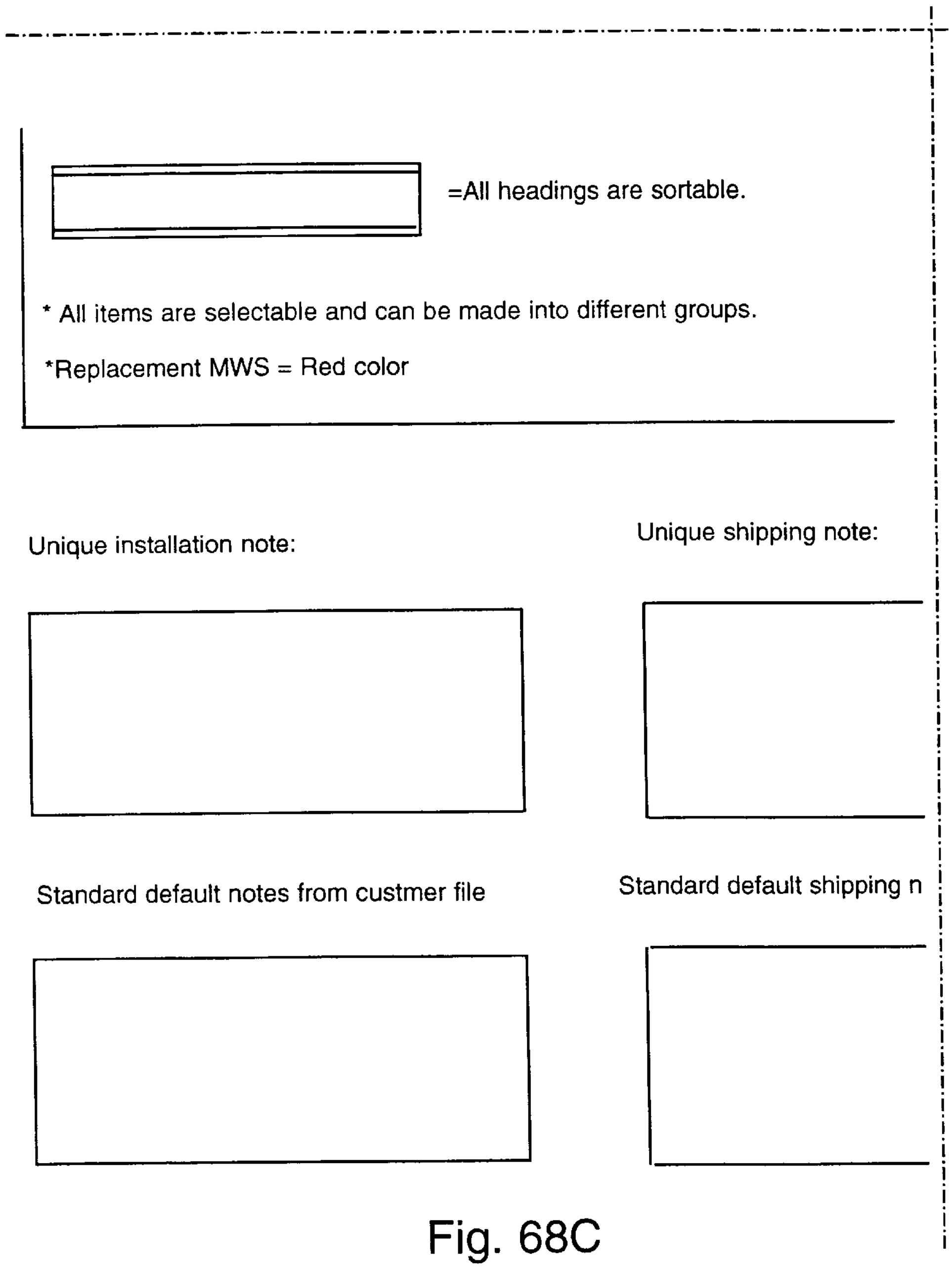
Figure 68D:
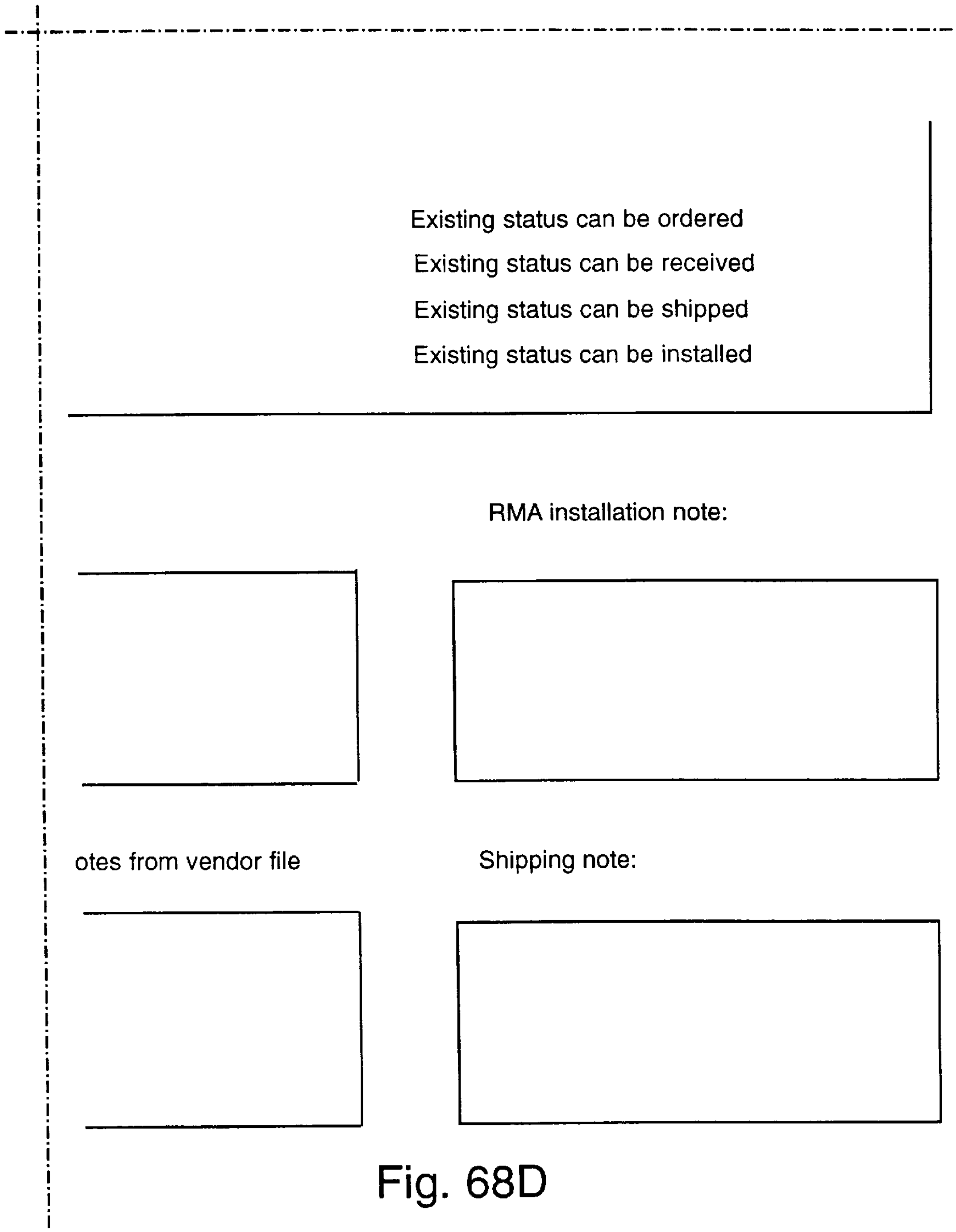

Referring to FIG. 68, throughout the foregoing processes, and in particular receiving, installation and shipping, notes conveying instructions regarding specific items may be displayed by double-clicking an item to cause a item detail display to appear. Included within the item detail display are several notes boxes, including boxes for unique installation notes, standard default notes from the customer file, unique shipping notes, standard default shipping notes from the vendor file (for RMA), RMA installation notes, receiving notes, etc.

Figure 69:
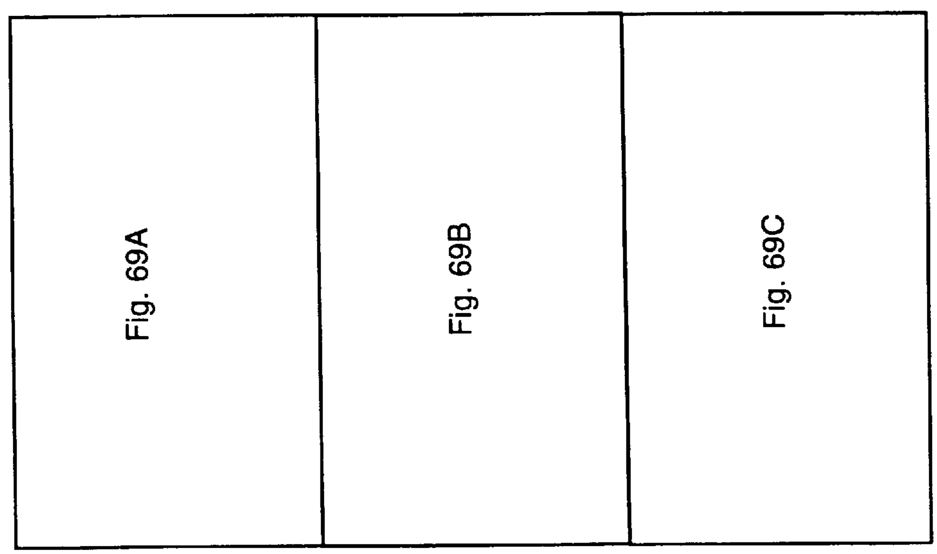
FIG. 69 is an illustration of an Expedite view of the PSRI screen display.
Figure 69A:
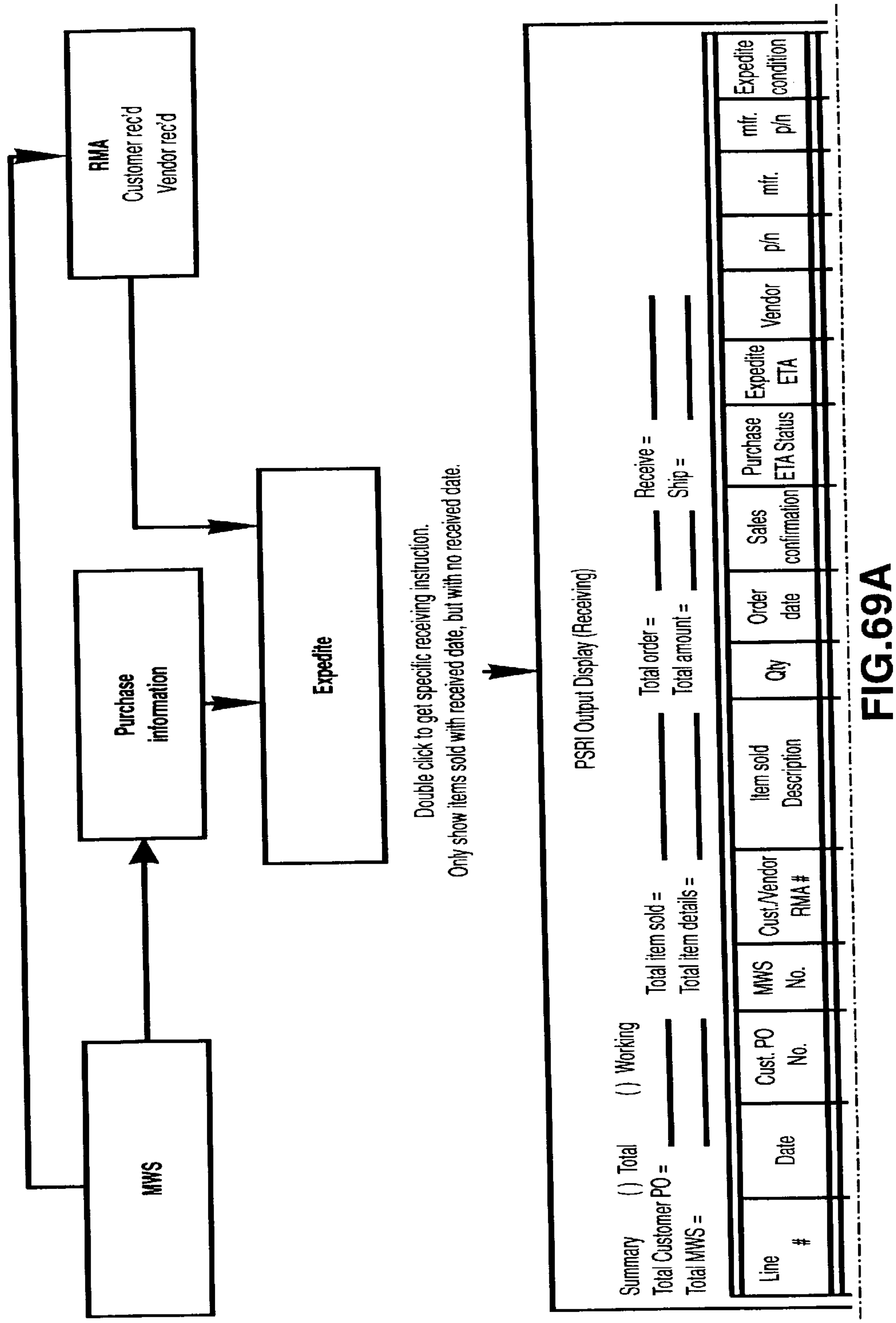
Figure 69C:
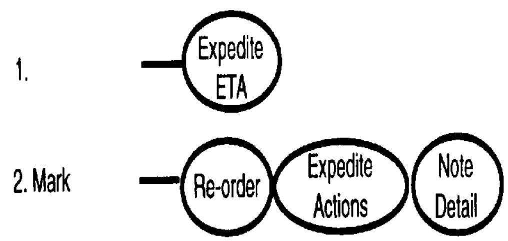

The PSRI output display also includes an "Expedite" view, shown in FIG. 69. The expedite function is to minimize delay in receipt of ordered products. Expedite actions include entering the Estimated Time of Arrival (ETA) of a product based on contact with the vendor and/or shipper and marking items in accordance with various expedite categories, as well as entering notes if necessary concerning the problem and expected solution.

Figure 70:
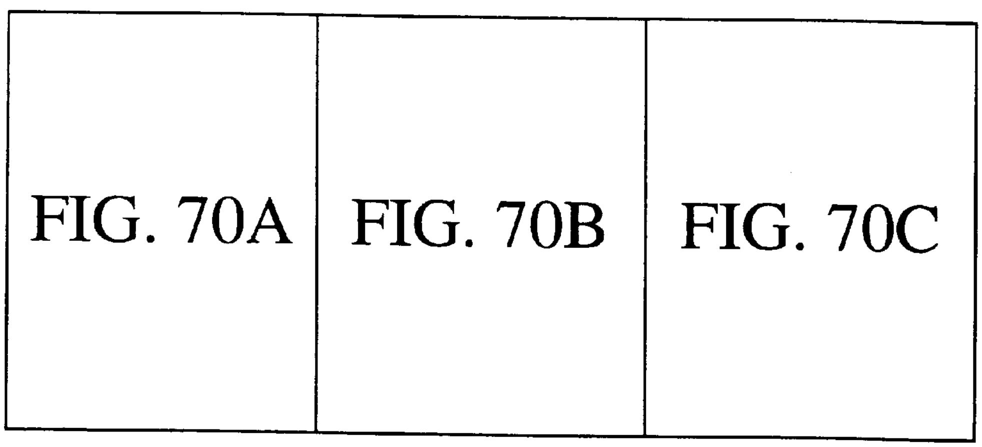
FIG. 70 is an illustration of an Ordered Not Received screen display.
Figure 70A:
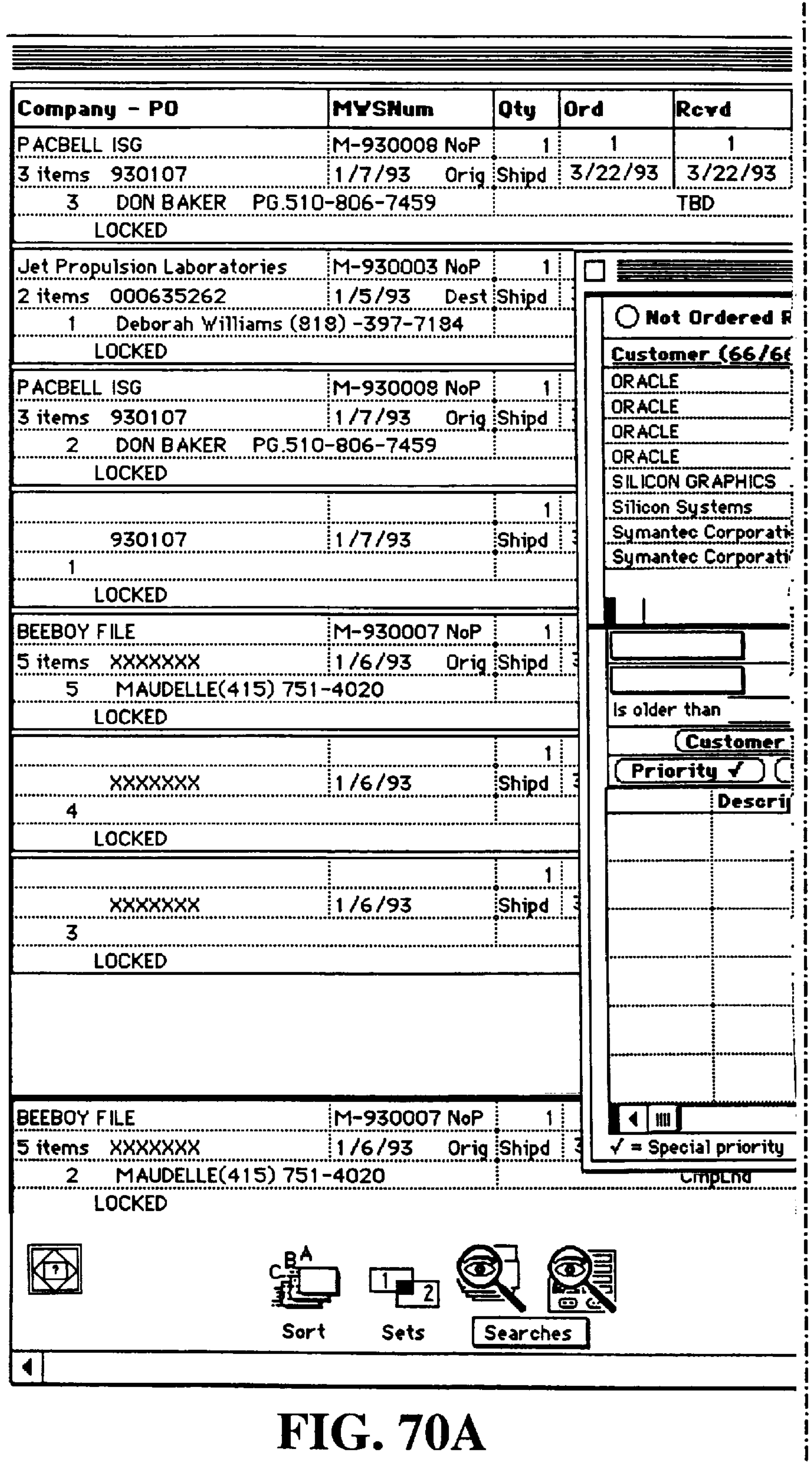
Figure 70B:
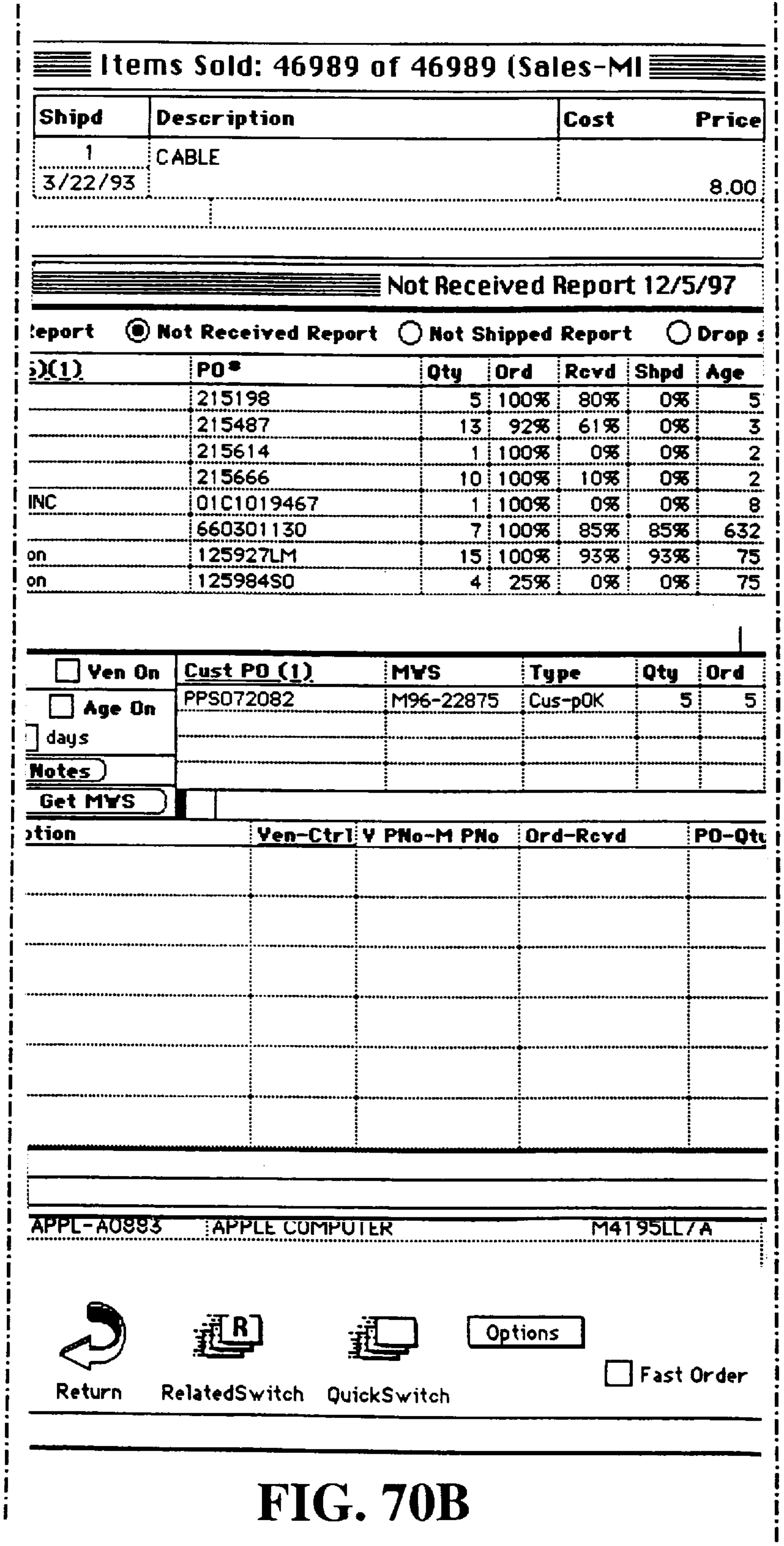
Figure 70C:
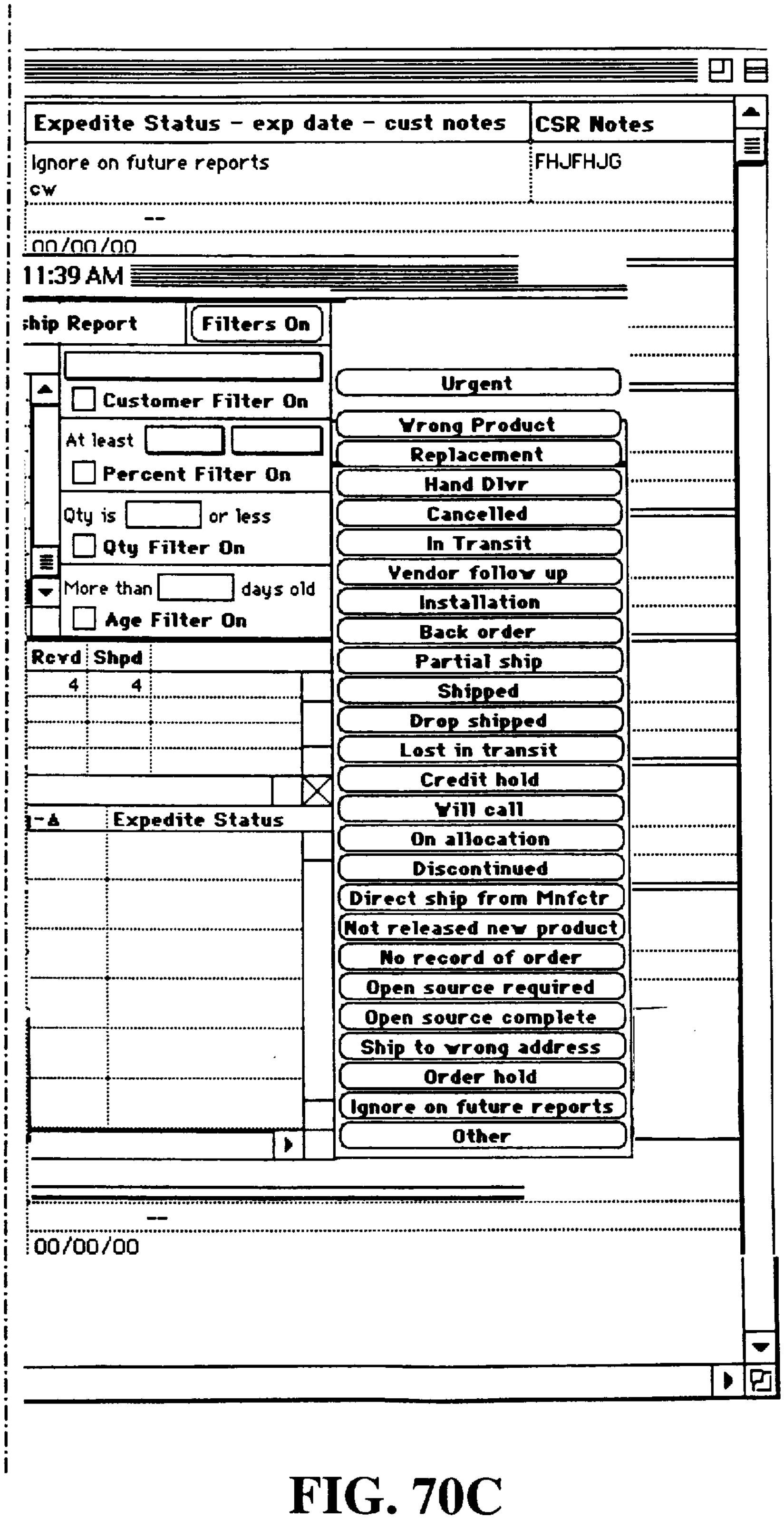
Figure 71:
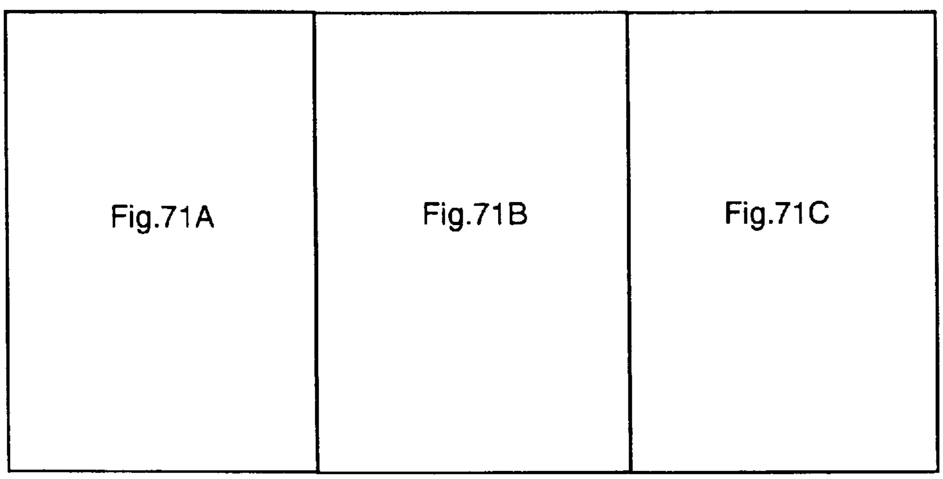
FIG. 71 is an illustration of a Received Not Shipped screen display.
Figure 71A:
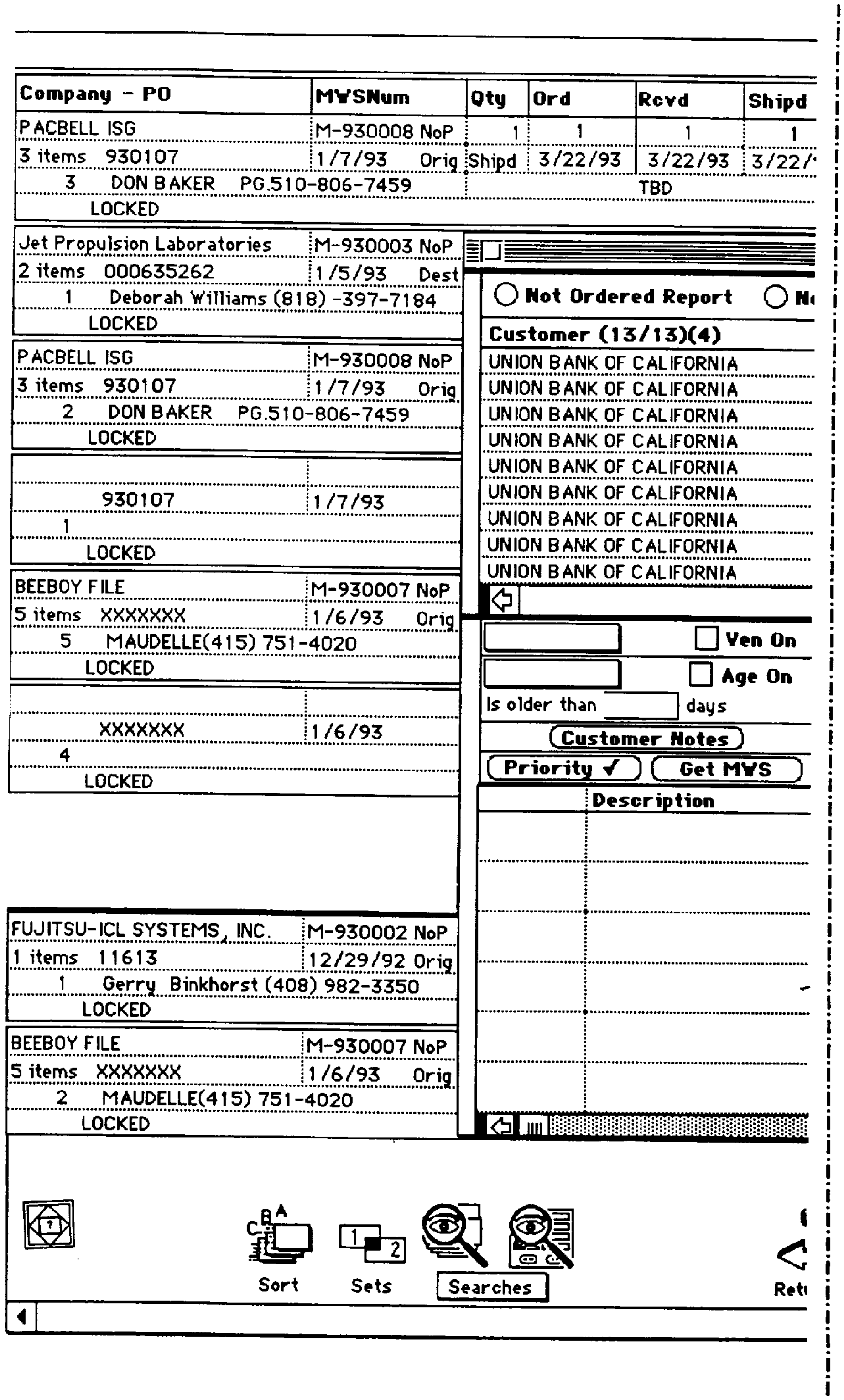
Figure 71B:
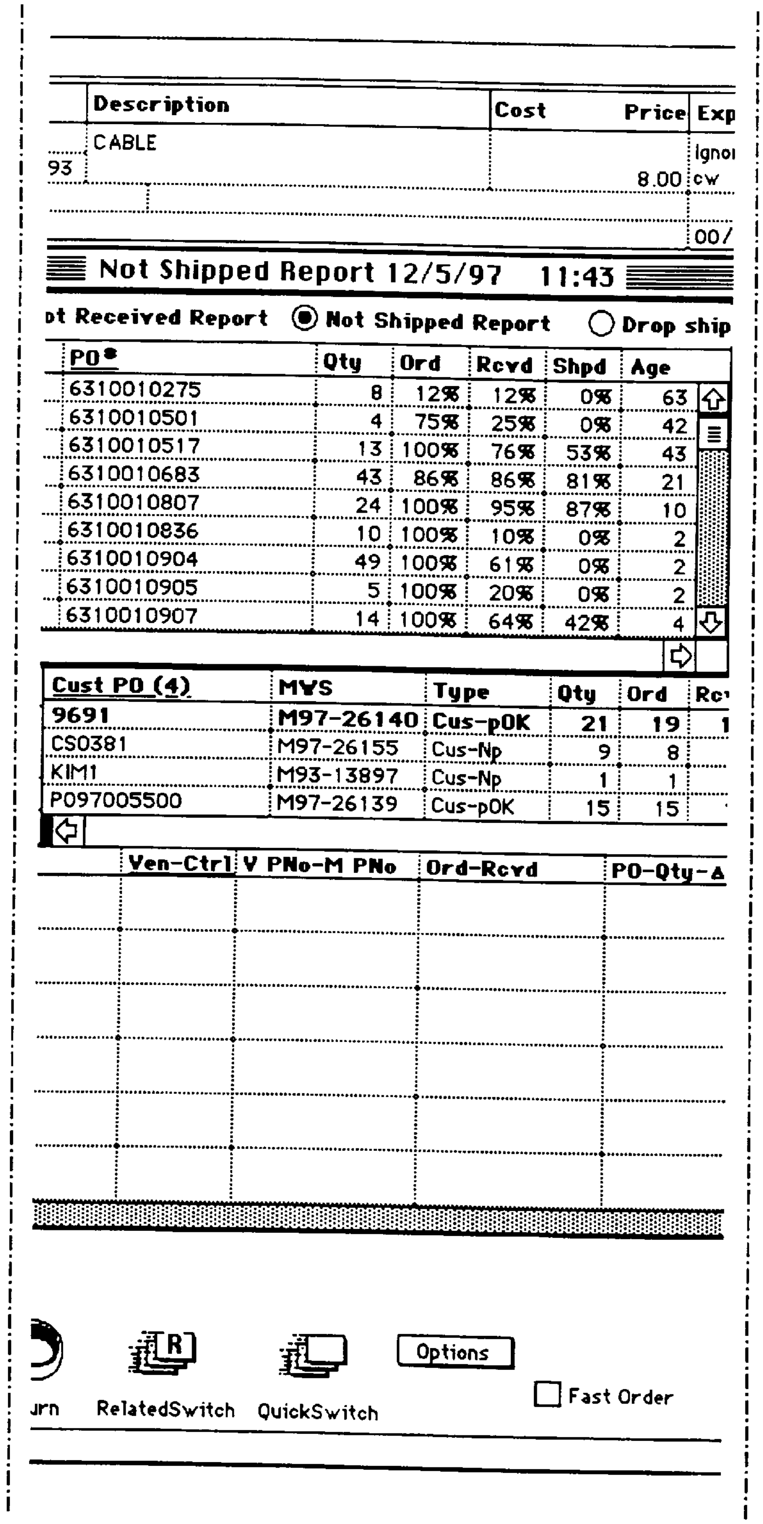
Figure 71C:
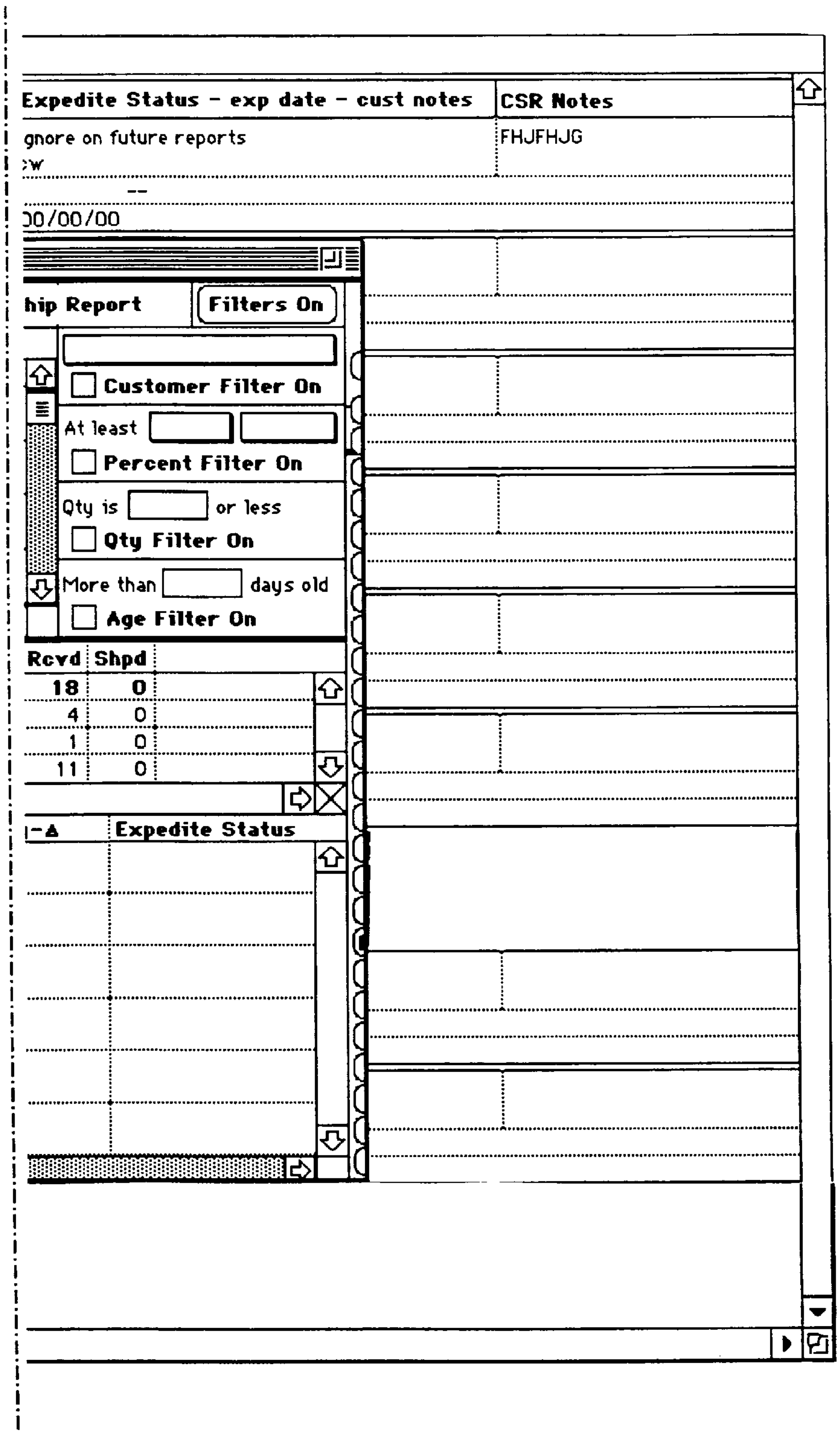

In accordance with one embodiment of the invention, expedite information may be brought up from the MWS screen, as shown in FIG. 70. In FIG. 70, a radio button has been clicked to cause a Not Received Report to be displayed. This report shows percentage of order completion in terms of ordering, receiving and shipping, as well as the age of the order in days. Various filtering options are provided. Expedite status for each item may be entered by clicking on one of a large number of status buttons, e.g., "Urgent," "Wrong Product," etc. A Not Shipped report screen display is shown in FIG. 71.

Figure 72:
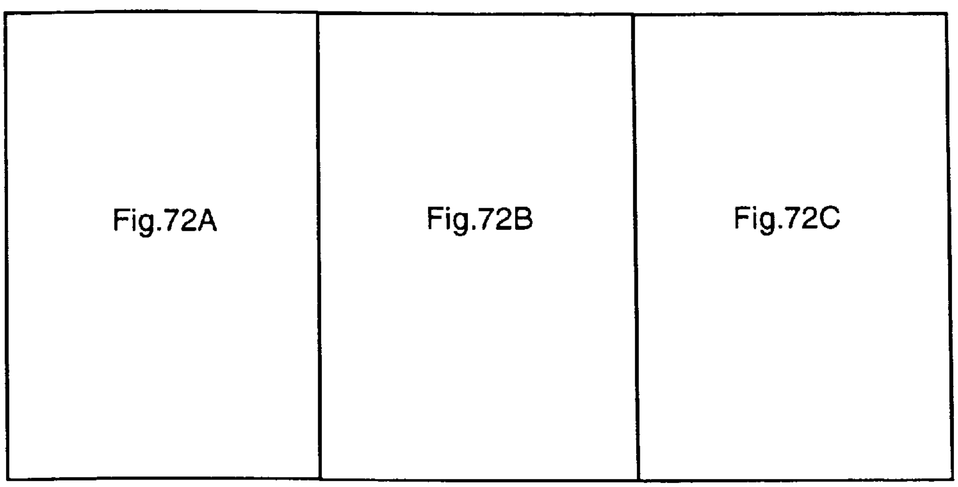
FIG. 72 is an illustration of an Expedite pop-up, allowing expedite status to be set from a MWS screen display.
Figure 72B:
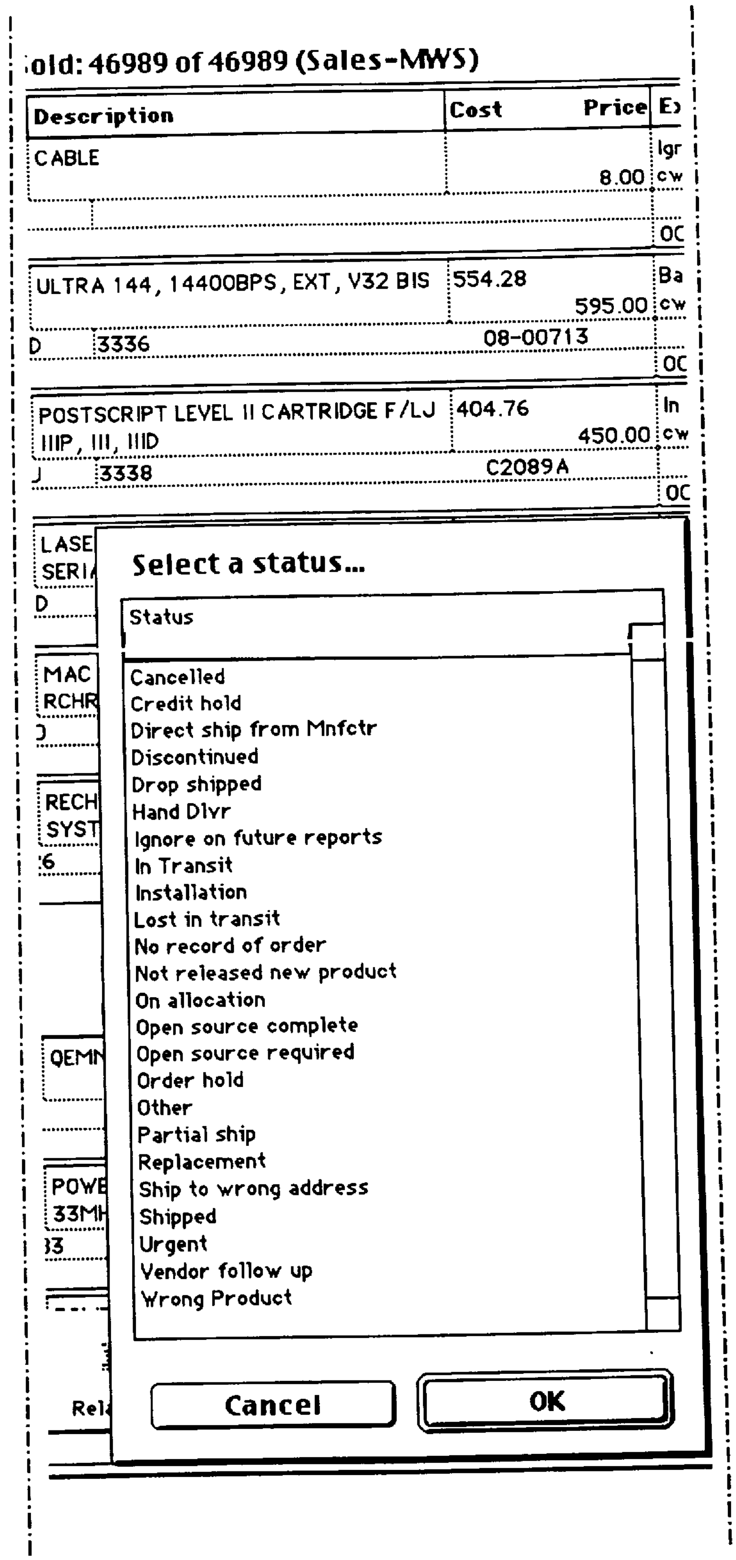
Figure 72C:
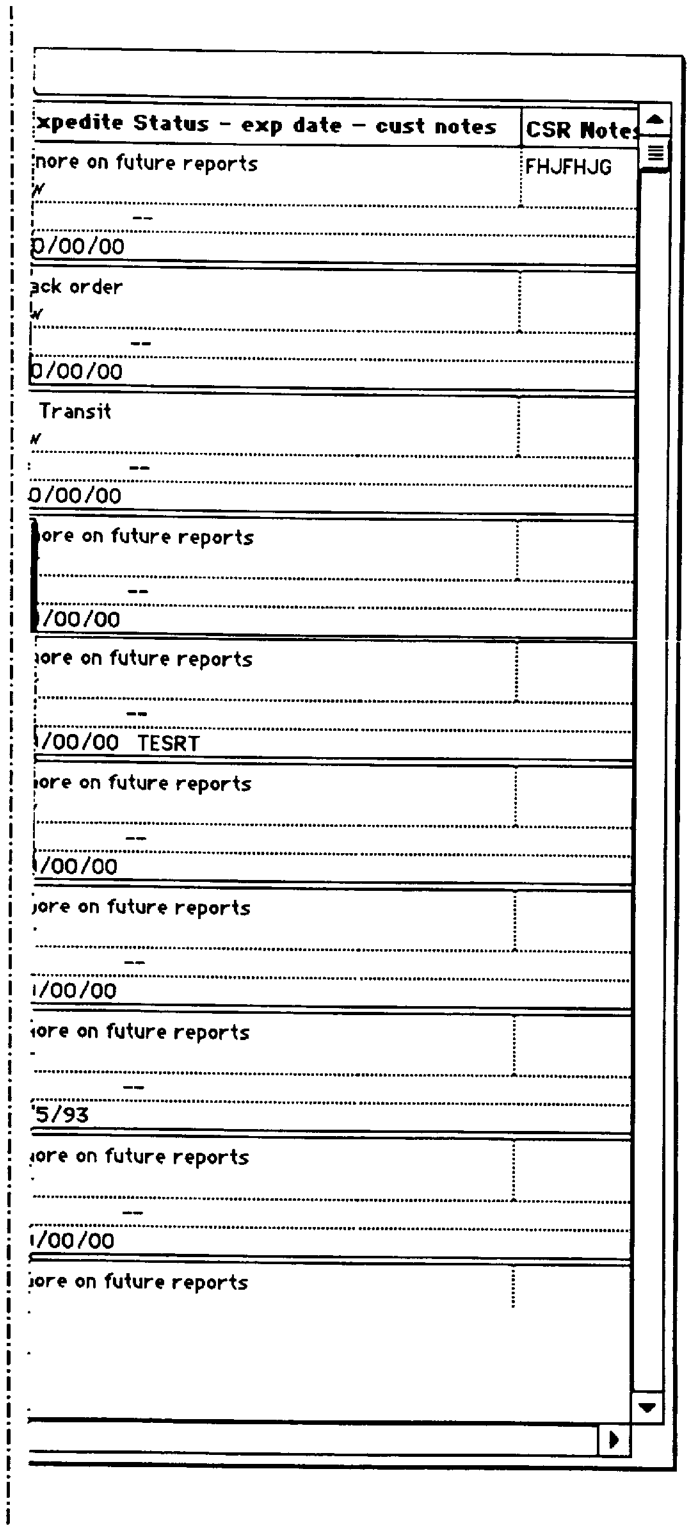

Expedite status may also be set using a more abbreviated expedite pop-up, shown in FIG. 72.

As with both purchasing and receiving, preferably vendors are given access via the Web to expedite information relating to that vendor.

RMAs

Figure 73:
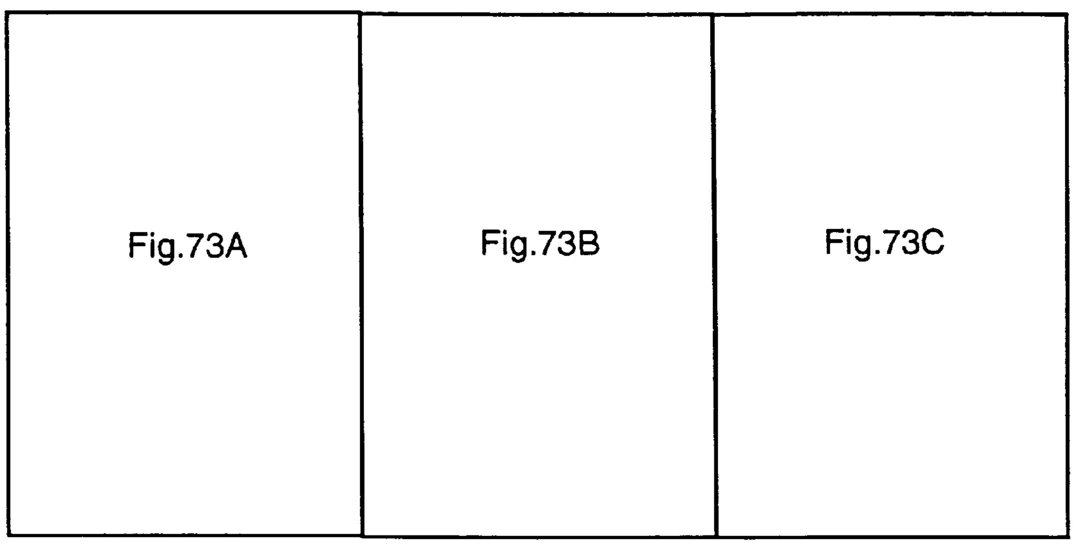
FIG. 73 is an illustration of an RMA screen display.
Figure 73C:
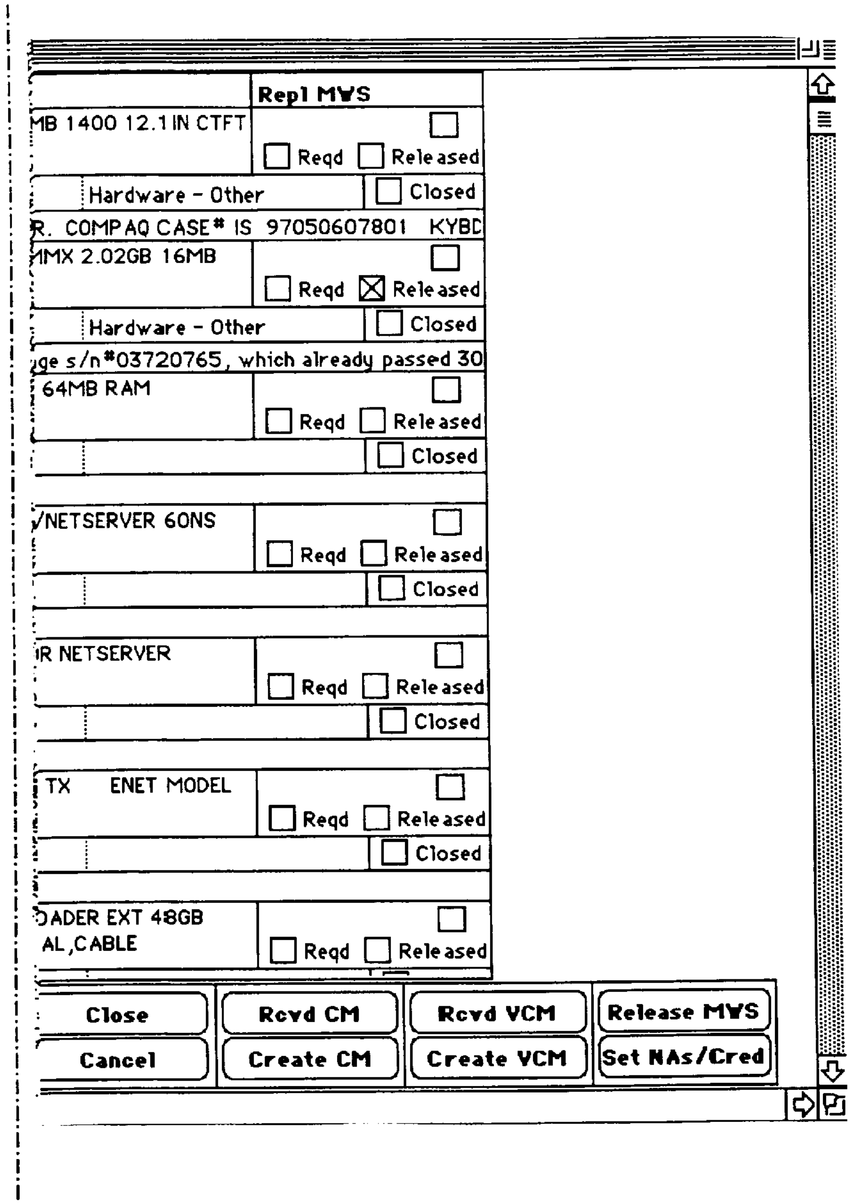

Normally, the order will be successfully shipped to and received by the customer, who would then begin to use the products. In some instances, however, the product may not work as intended, the product may be lost or damaged in shipping, or the customer may change his or her mind, necessitating that a product be returned. Returns are provided for through a Return Merchandise Authorization (RMA) mechanism. The same mechanism may be used for other account adjustments other than actual returns, for example freight adjustments, etc. An RMA may also be used for warranty replacement parts. This feature, coupled with Web access, allows customer's to track replacement parts themselves without contacting a technician or service representative. A customer may request an RMA in any of the ways previously described for obtaining a quote or placing an order. When an RMA request is received, an RMA record is created. An RMA screen display is shown in FIG. 73.

Figure 74:
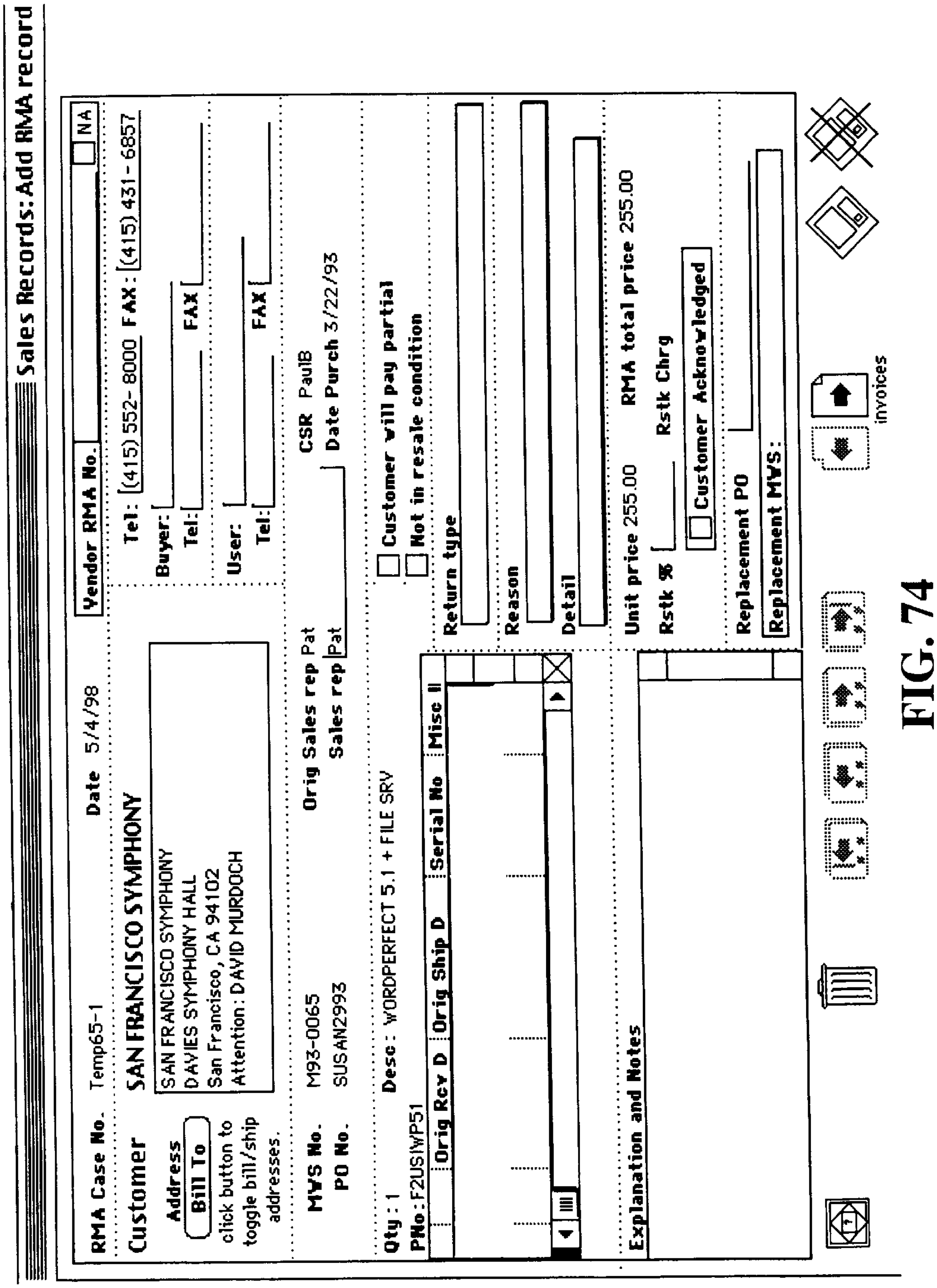
FIG. 74 is an illustration of an Add RMA screen display used to initially create an RMA.
Figure 75:
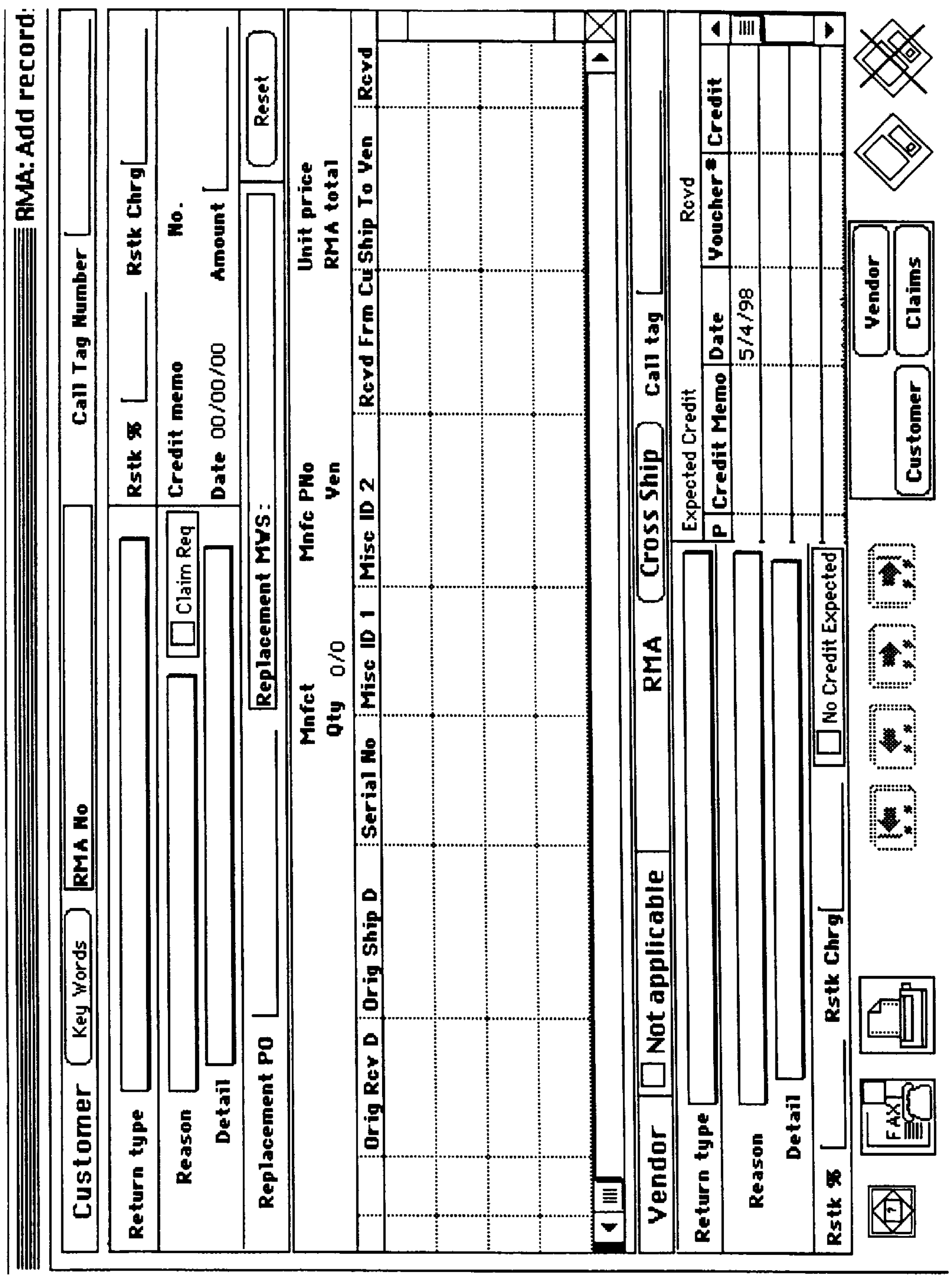
FIG. 75 is an illustration of an RMA add records screen display used to add information to an RMA.

Referring again to FIG. 63, a MWS display includes an RMA button. When this button is clicked, the user is prompted to select an item from the displayed MWS for return. An Add RMA Record screen display such as that of FIG. 74 is then used to specify return type, reason, etc. A typical RMA has two "sides," the customer side and the vendor side. When the item to be returned is selected, preferably both the customer side and the vendor side are filled out by the system. Any changes may be made from a screen display such as that of FIG. 75. By clicking a button, the screen display of FIG. 75 allows for display of the customer side only, the vendor side only, or both sides of the transaction, as well as claims information.

A return may be made for any of a number of different reasons. Different return types are therefore defined. Depending on the return type, some RMA fields will not be applicable. Preferably, the system is provided with sufficient intelligence to automatically fill in these fields as "N/A."

Figure 76:
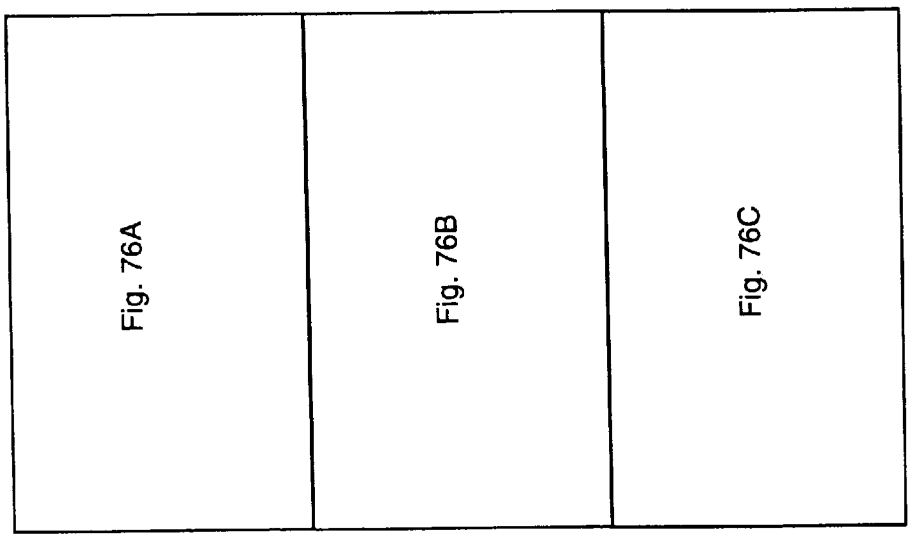
FIG. 76 is an illustration of an RMA Automatic Request Completion file.

As shown in FIG. 76, a lookup table may be used complete various fields of an RMA record based on the selected return type. If a return is for credit, for example, then return type 1 is the corresponding return type. Depending on whether payment was by check, credit card or credit memo, different fields may be applicable. In the present example, however, the mode of payment does not affect the manner in which the RMA is completed. As noted previously, an RMA has both a customer side and a vendor side. In FIG. 76 therefore, each table cell has an upper half corresponding to the vendor side (V) and a lower half corresponding to the customer side (C). To take a few example fields, in the case of a return for credit, no replacement product is called for, hence the Repl MWS column is marked N, for no. Since no replacement product is expected, then on the vendor side, the Rec'd column is N/A, and on the customer side, the Ship column is N/A. Similar logic dictates the way in which the remainder of the table is completed.

Figure 77:
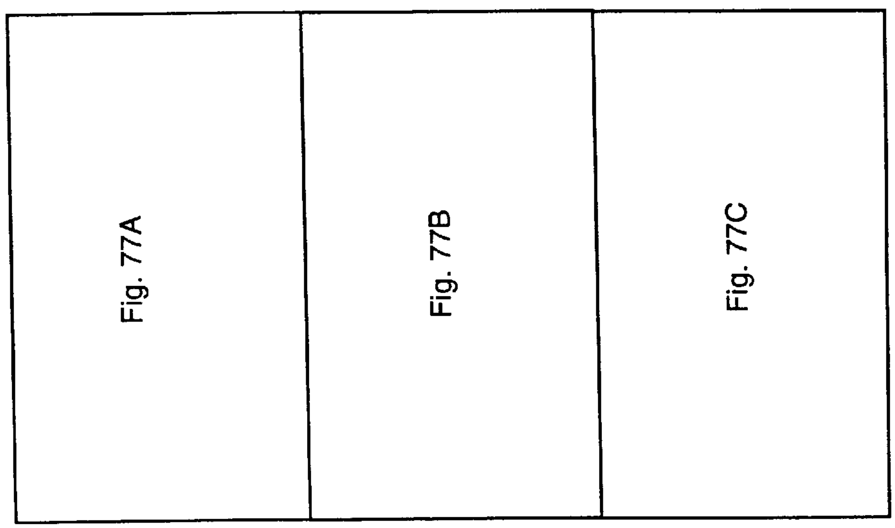
FIG. 77 is an illustration of an RMA Automatic Approval Limit file.
Figure 78:
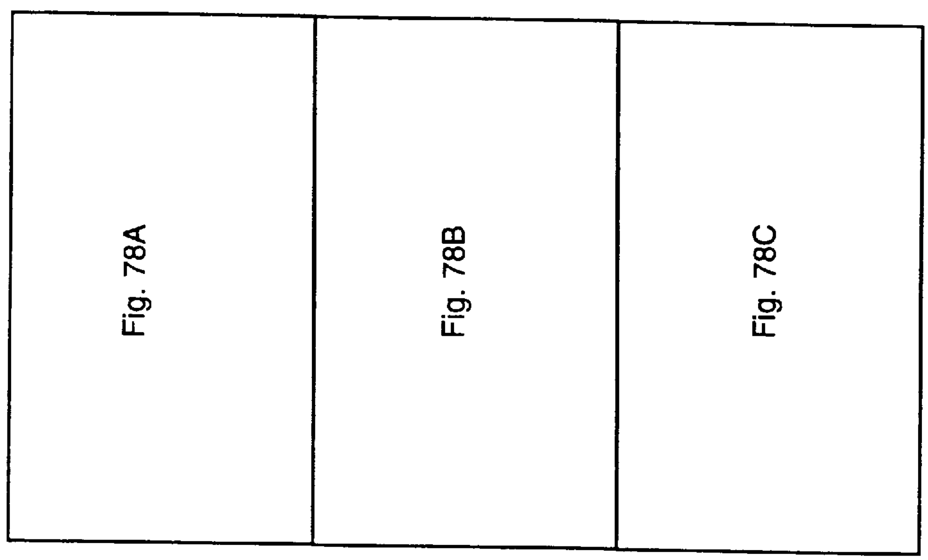
FIG. 78 is an illustration of a Customer RMA Automatic Approval file.

Similar logic tables may be used to automatically approve RMAs and provide an RMA number instantaneously for most RMA requests. Again, approval has a customer side and a vendor or manufacturer side, at least in the case of a virtual inventory model. (RMAs eliminate, or at least minimize, the hazard of accumulating obsolete inventory as a result of returns.) In an exemplary embodiment, a series of limit checks are performed on an RMA request. Referring to FIG. 77, a limit file is shown, having a customer portion, a vendor portion and a manufacturer portion. Assume once again that the return type is return for credit, and assume further that the payment mode was check. The first column has a Y value, indicating that automatic approval of RMAs of this return type are allowed. The next three columns relate to the manufacturer and contain the values Y, Y and N, respectively, indicating that for the RMA to be approved the manufacturer must allow returns, that the manufacturer must further allow open box returns, and that the time to RMA cannot exceed the manufacturer's allowed maximum time duration. For a particular manufacturer, the manufacturer's specific return policies are stored in a table such as that shown in FIG. 78.

Figure 79:
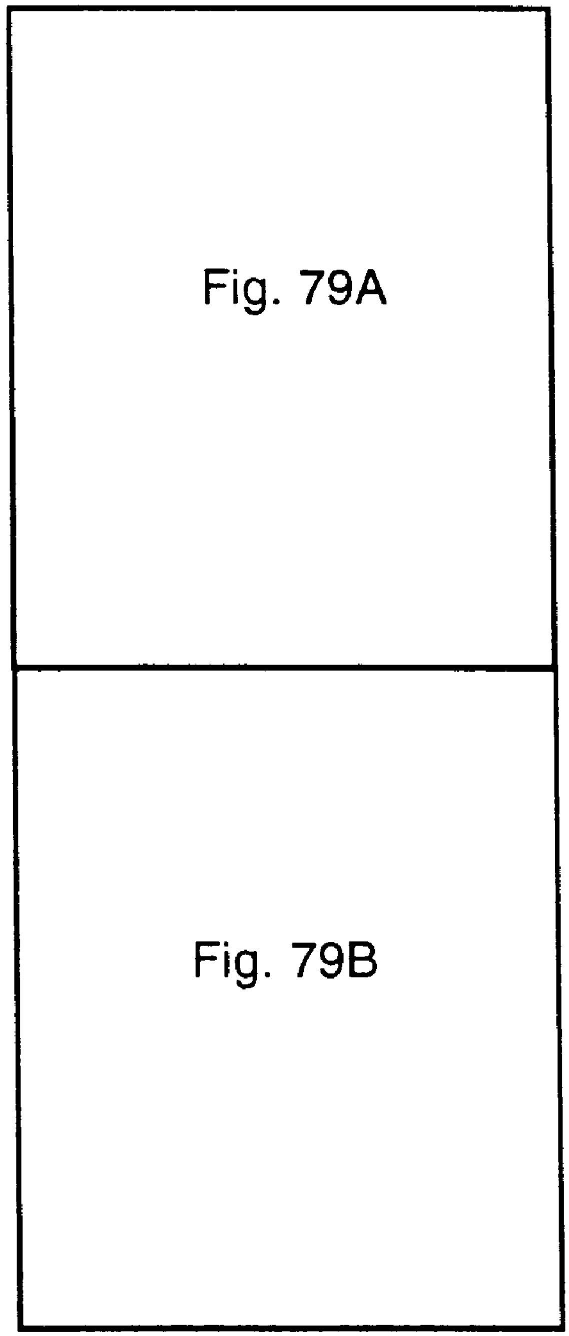
FIG. 79 is an illustration of a Vendor RMA Automatic Approval file.

Referring again to FIG. 77, the next two columns relate to vendor and contain the values N and N/A, respectively, indicating that the time to RMA cannot exceed the vendor's allowed maximum time duration and that the vendor's restocking fee policies are not applicable for this type of return. For a particular vendor, the vendor's specific return policies are stored in a table such as that shown in FIG. 79.

Figure 80:
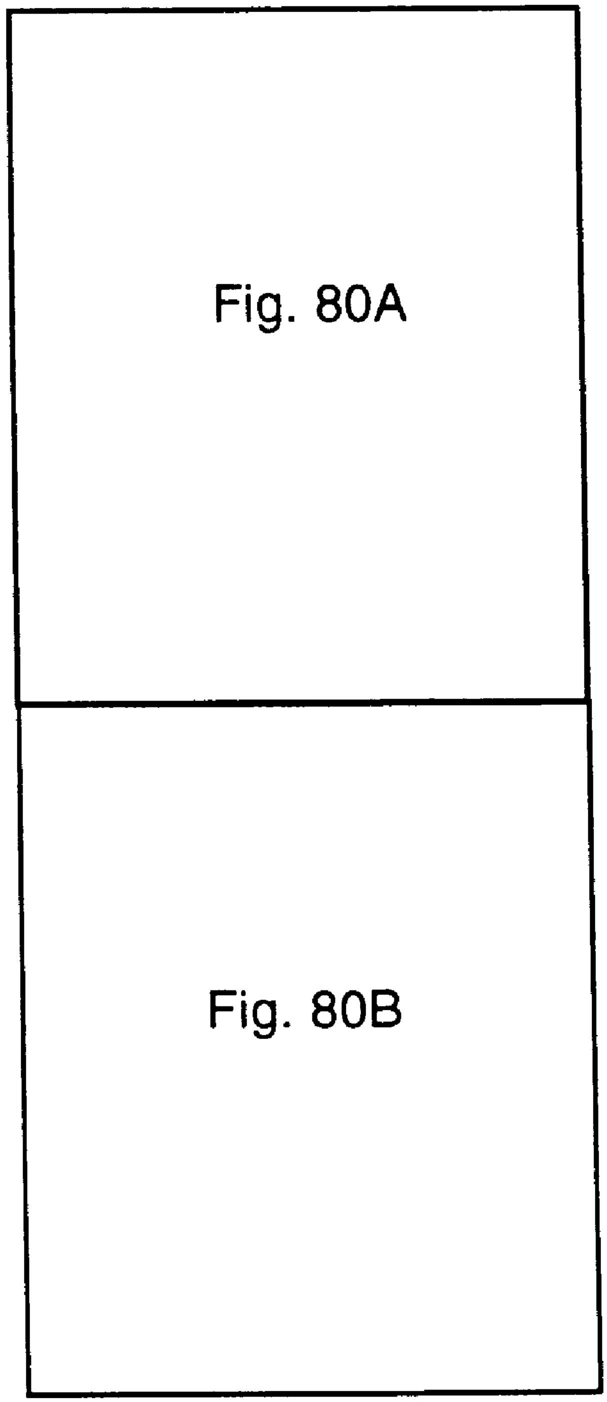
FIG. 80 is an illustration of a Manufacturer RMA Automatic Approval file.

Referring again to FIG. 77, the next four columns relate to customer and contain the values N, N, N and N/A, respectively, indicating that the time to RMA cannot exceed the maximum time duration allowed for this customer, that there must be no restocking fee, that the sales price cannot exceed the maximum allowed for this customer, and that customer service fee policies are not applicable for this type of return. For a particular customer, specific return policies for that customer are stored in a table such as that shown in FIG. 80.

If an RMA request meet all of the applicable automatic approval criteria, then it may be automatically approved, instantly, and an RMA number communicated to the customer as shown, for example, in FIG. 81.

Business rules implemented by the RMA module include the following:

1. RMAs can only be created for items shipped to customer.
2. One item per RMA (quantities are OK).
3. Replacement Quotes are created by the user specifying the appropriate replacement product.
4. Generation of printed/faxed RMAs with Return packing slips for customer use.
5. Receiving can only receive items from customers with valid RMA issued.
6. Wrong or defective products automatically create RMAs.
7. Replacement MWSs can only be shipped after being released by purchasing.

8. Vendor RMAs must have vendor RMA numbers before shipping.

9. Complete control of RMA module by executive group.

One characteristic feature of the present system perhaps most evident in relation to RMAs is the display of information in a very complete way and in such a manner as to allow ready interaction. In conventional database applications, information is presented in simple row format within an output display. Multiple levels of "drill-down" may be required to display a particular detail. Furthermore, entry or manipulation of information can typically only be performed from a separate input screen.

In the case of the present system, by contrast, as exemplified by the RMA display of FIG. 73, records are presented in a very information-rich format. Entry or manipulation of information is enabled within the same screen display. In the case of RMAs, for example, a user with the proper authority is able to approve or cancel an RMA, change an RMA to a different type, release a replacement shipment, etc.

A further important feature also greatly facilitates convenient navigation and ease of use. In most systems, to display related records, a search editor is used to enter a search. In the present system, by contrast, a "related-switch" menu bar is provided within most displays. Using this related switch feature, a user may select one or more records within the output display and select a related file from a pop-up of related files. The system then searches in the related file for records related to the selected records and displays the related records in the output display format of the related file. In the case of RMAs, for example, the related switch capability may be used to switch to related customer invoices, vendor invoices, credit memos, etc. One file may be related to another file but only indirectly, through a third file. In this instance, an intermediate search is required, the results of which are not displayed. Of course, the number of intermediate files may be more than one.

Preferably, vendors are given access via the Web to RMA information pertaining to them. A vendor may then immediately provide an RMA number without requiring any human intervention.

With vendor access to purchasing information, receiving information, expedite information and RMA information pertaining to that vendor, a truly integrated supply chain results. Such an arrangement makes global commerce just as convenient as local commerce. For example, a seller may have ten or hundreds of vendors worldwide, many in locations where the time difference would ordinarily make doing business difficult and tedious. Such difficulty is removed in the case of the present system, because all of the intelligence needed to do business resides in the system and is readily accessible at each party's convenience wherever in the world that party may be.

Design Philosophy: Self-Correcting Knowledge-Based System

Figure 129:
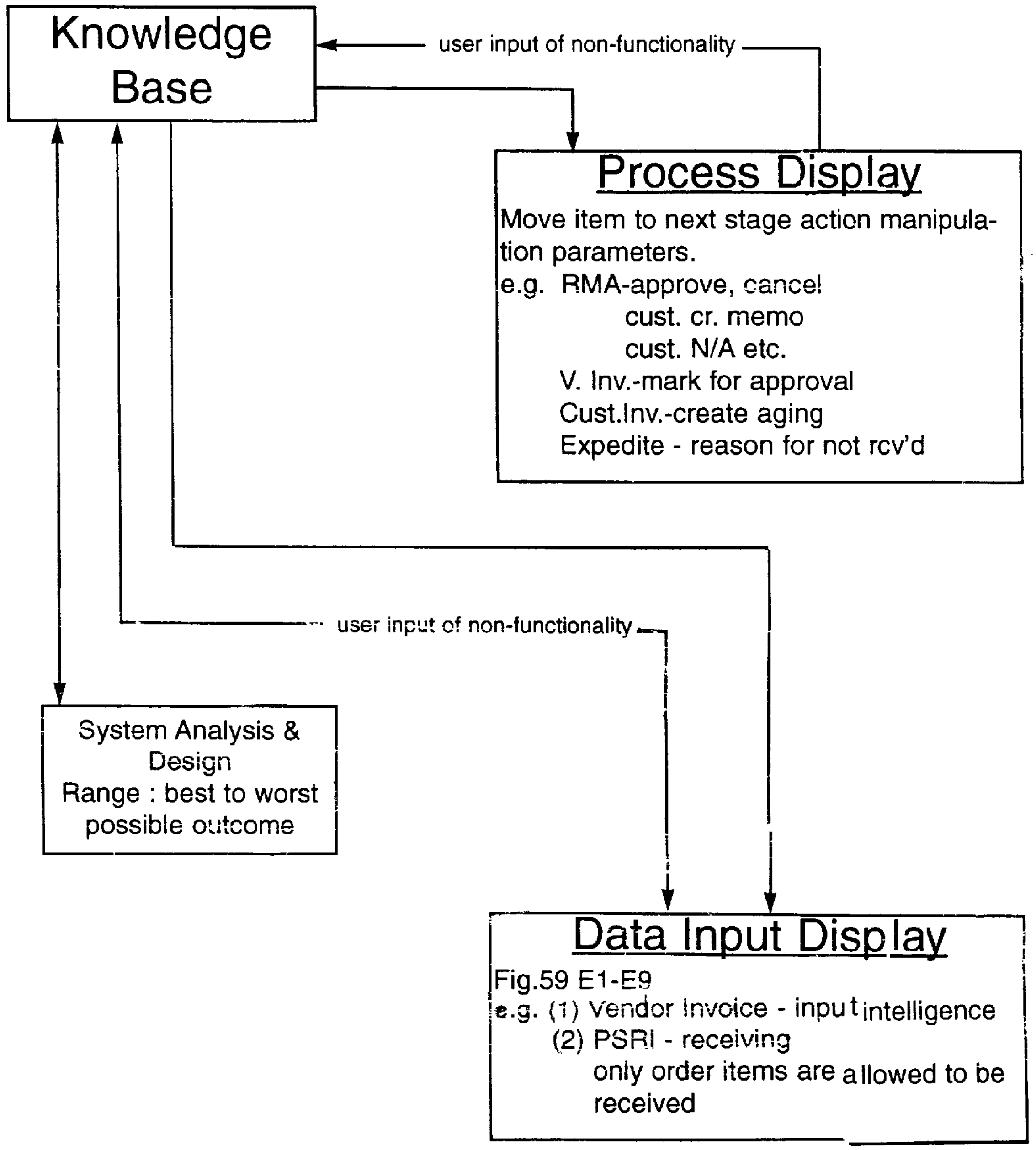

The information-rich action-oriented displays previously mentioned are a manifestation of a design philosophy in which a system knowledge base is continuously expanded with user assistance and reflected in the manner in which users interact with the system. Other manifestations of this design philosophy are found in the options described previously (Table 1 and FIG. 124 through FIG. 128) and the experiential constraints alluded to previously and described in greater detail hereinafter. Referring to FIG. 129, a knowledge base is initially created based on system analysis and design considerations, considering the range of possible outcomes at each stage of the business process, and considering further the goal of total automation, phones free and paper and pencil free.

The knowledge base affects user interaction with the system through two different kinds of displays, a data input display and a process display. The data input display is used to actually enter data into the system. During the course of data entry at entry points E1–E9 (FIG. 59), rigorous entry qualification occurs to eliminate errors. In the case of PSRI, for example, during receiving, only ordered items are allowed to be received. To cite a further example, during vendor invoice entry, described hereinafter in relation to FIG. 121 through FIG. 123, the system detects an attempt to enter a duplicate invoice number and prevents the duplicate from being entered. The process display is used to act on the data within the system to move an item to the next stage, and in the course of such action has the effect of changing the status of records acted upon. In the case of RMAs, for example, the user may easily, with the click of a button, approve or cancel an RMA, issue a customer credit memo, change the N/A settings of the RMA, etc. In the case of expedite, the user may easily, with the click of a button, record the reason that a product has not been received. To cite further examples, in the case of vendor invoices and customer invoices, described hereinafter, the user may easily, with a click of a botton, mark a vendor invoice for approval or cause an aging report window to be displayed for customer invoices.

The knowledge base and the application of it to data input and user actions is what makes an automated, end-to-end, sequential business process possible, by ensuring that there is only one way to get work done—the right way.

During use of the system, unanticipated circumstances are bound to arise in which the user cannot accomplish his or her task (or accomplish it as well) in a phones free, paper and pencil free manner using the current features of the system. In this event, the knowledge base of the system is then added to to solves the user's problem. In some instances, the user may be able to add to the knowledge base directly. For example, the user may wish to add a further return type by adding an entry to the table of FIG. 75. Similarly, in the case of factual performance evaluation, described hereinafter, the user may choose different performance metrics or combinations of metrics to be tracked and displayed. In other instances, adding to the knowledge base may require administrative intervention. In the case of the options of Table 1 and FIG. 124 through FIG. 128, adding further options may require the efforts of a programmer.

Having described for an order the course of events in the product domain, the course of events in the payments domain will now be described, first in relation to sales tax and sales commissions, then in relation to customer payments and finally in relation to vendor payments.

Sales Tax and Sales Commissions

Sales tax and sales commissions are automatically computed and stored in the system based on applicable tax rates and commission rates.

Figure 82:
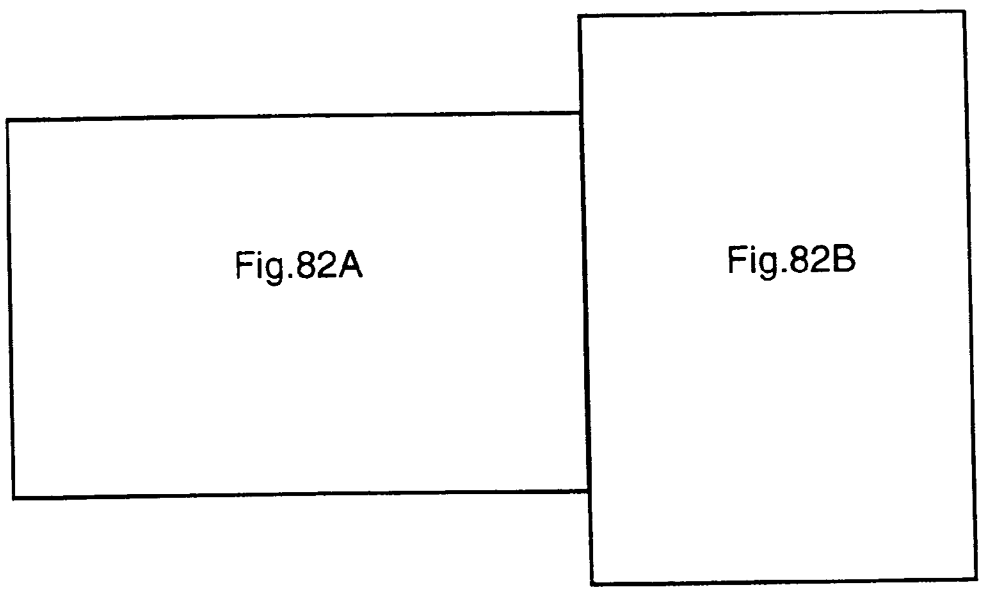
FIG. 82 is an illustration of a Sales Tax Register screen display, including formulas used to calculate figures to be entered within each line of a sales tax return.
Figure 82A:
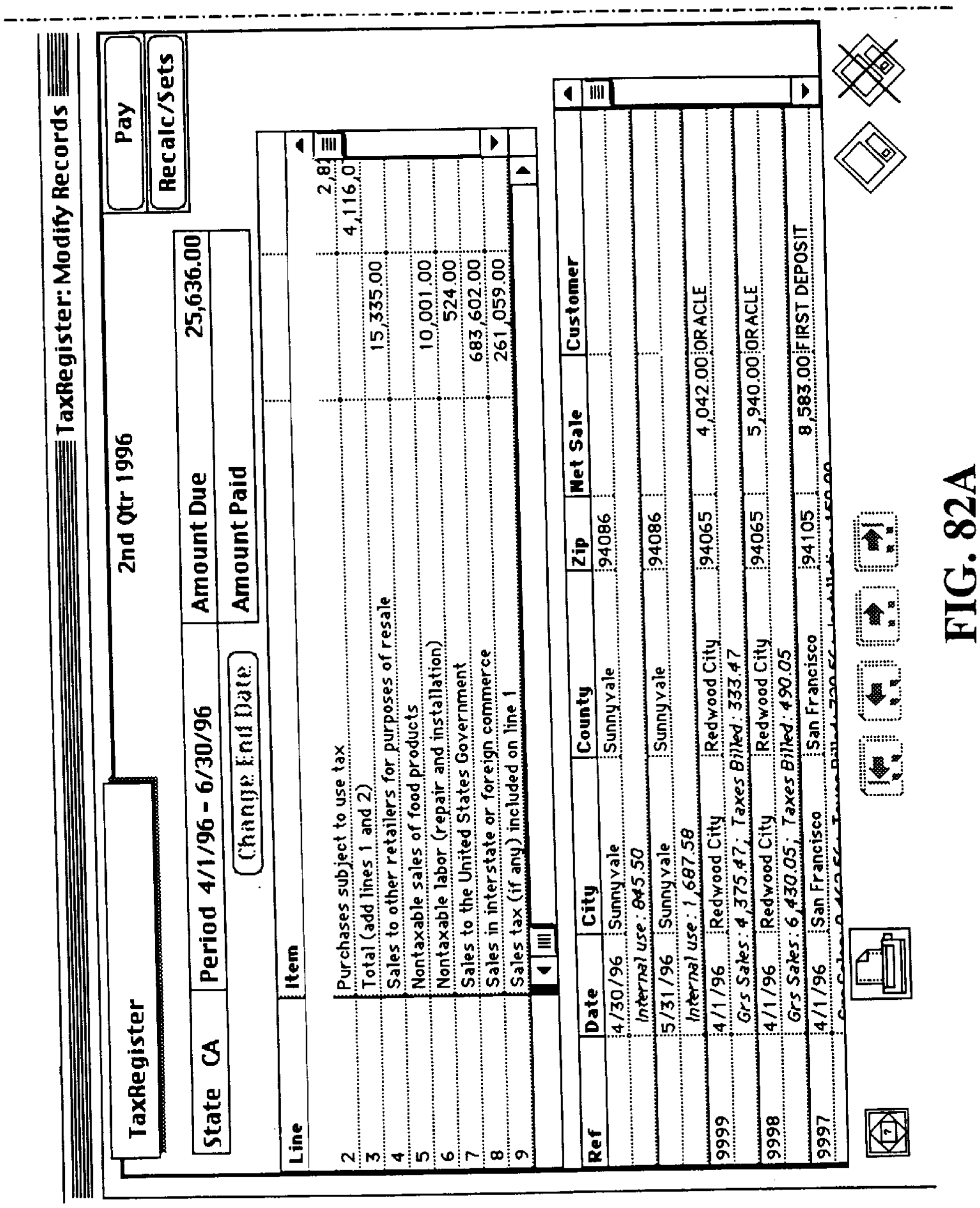

In the case of sales tax, a sales tax table contains state tax rates and local tax rates. For a particular sale, the applicable tax rate is determined based on the ship-to address. Typically, preliminary tax payments are made each month and a final tax payment is made each quarter. Sales tax records are automatically added to a sales tax register (first prepayment, second prepayment, or final quarterly payment) for the appropriate period. As shown in FIG. 82, the sales tax module automatically calculates the figures to be entered on each line of a sales tax return, or may be programmed to print out the actual return.

In the case of commissions, commission rates are stored within a Sales Rep file and a Sales Support file. Because each order is worked on by both outside sales and inside sales, each order will typically have two commissions. Commission records are created at the time a customer invoice is issued. Commissions are then approved and scheduled to a commission register for payment in a similar manner as accounts payable, described hereinafter. Multiple levels of commissions are provided for. A simple example of multiple commissions is where an outside salesperson responsible for customer interface is supported by an inside salesperson that reviews orders for correctness and troubleshoots the order, if necessary, during the fulfillment process. In more complex organization structures (e.g., multi-level marketing), the number of commissions may be greater than two.

Accounts Receivable

Figure 83:
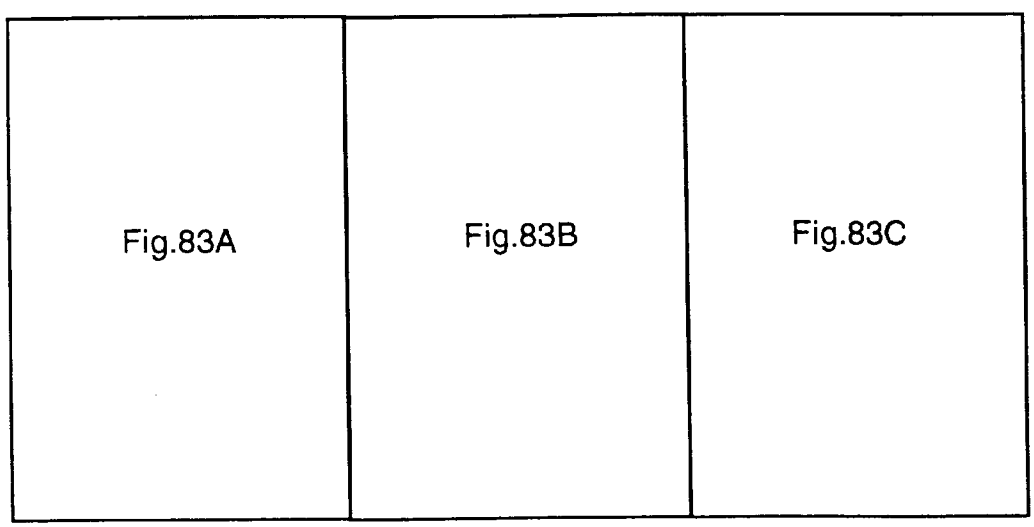
FIG. 83 is an illustration of a Customer Invoices screen display.
Figure 83C:
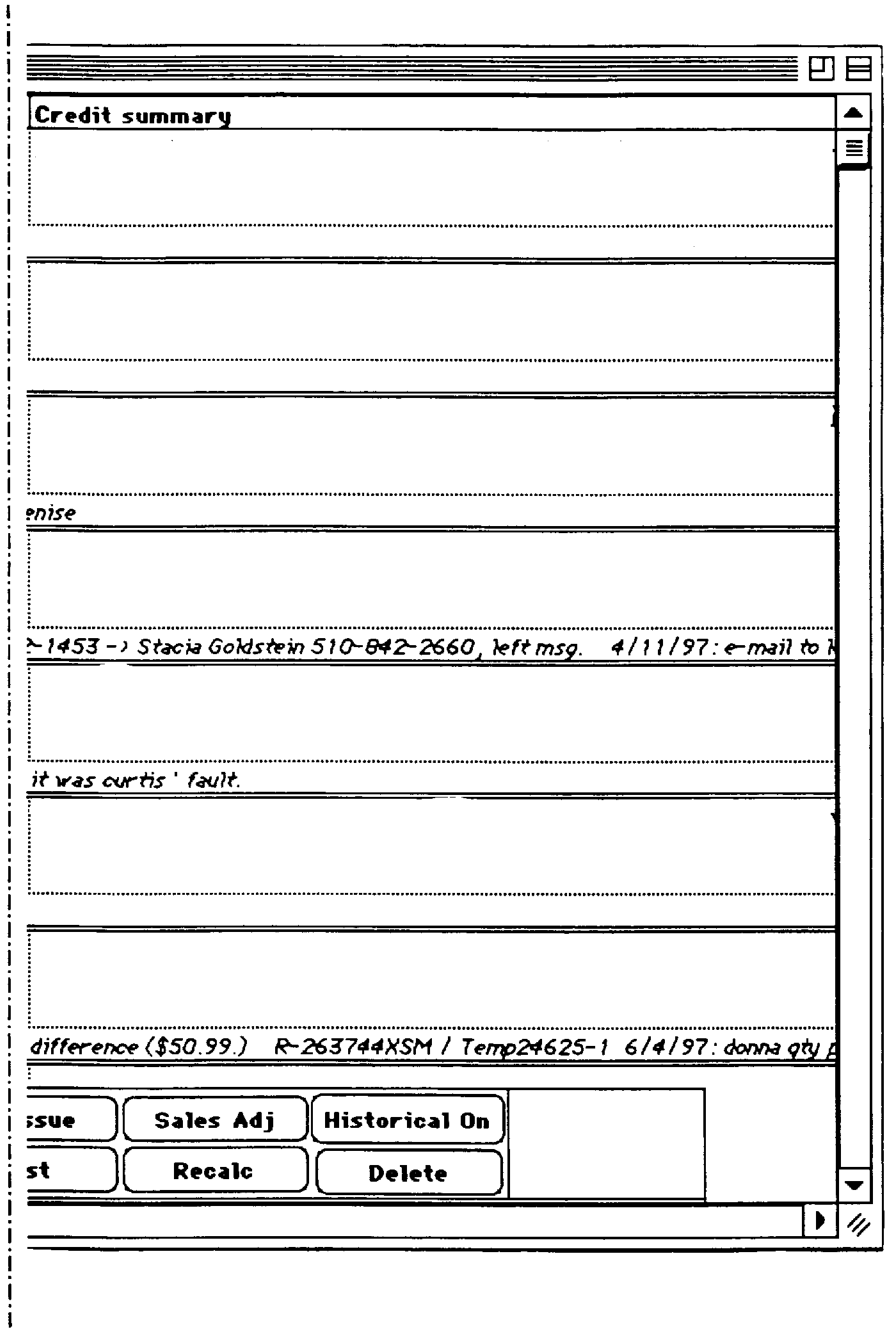

When an order is shipped, a customer invoice is automatically issued, i.e., entered into the computer system. If paper invoices are required, then at regular intervals (each day, for example) an accounts payable clerk prints out, checks and mails customer invoices issued during the preceding interval. (Alternatively, the printing and mailing of customer invoices may also be automated.) In an exemplary embodiment, invoices are issued using the "Issue invoices" option within the customer invoice file. A customer invoice screen display is shown in FIG. 83. With the passage of time from the invoice date, invoices pass from one category to another, e.g., 30 days, 60 days, 90 days, etc. At any time, the accounts payable clerk may view invoices within different categories. Also, as is the case with other output screen displays, the user is able to manipulate information and interact with the system, e.g., to analyze an account, add a comment or note, etc., all without paper and pencil.

Figure 84:
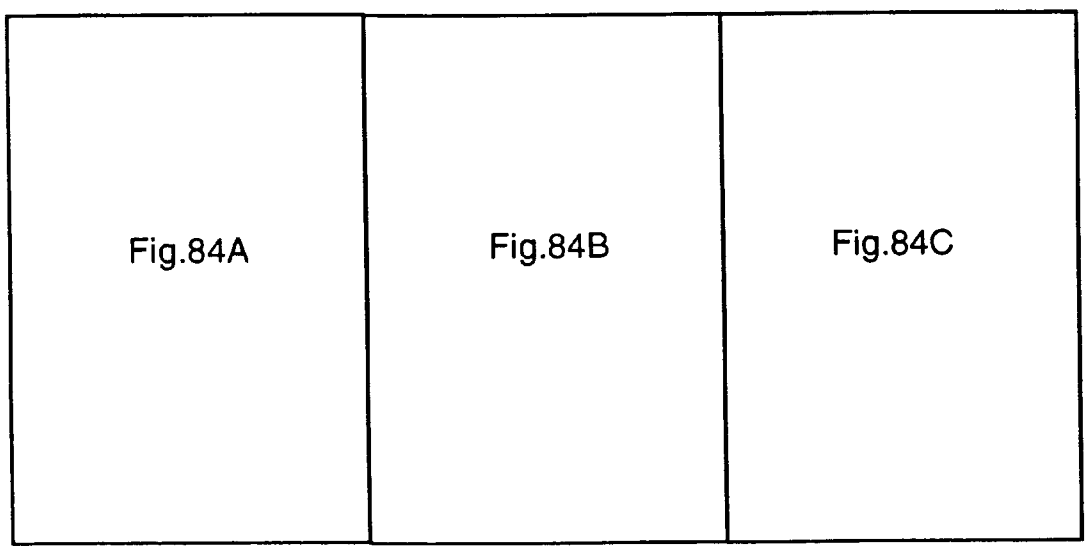
FIG. 84 is an illustration of the Customer Invoices screen display showing collections information within a pop-up window.
Figure 84A:
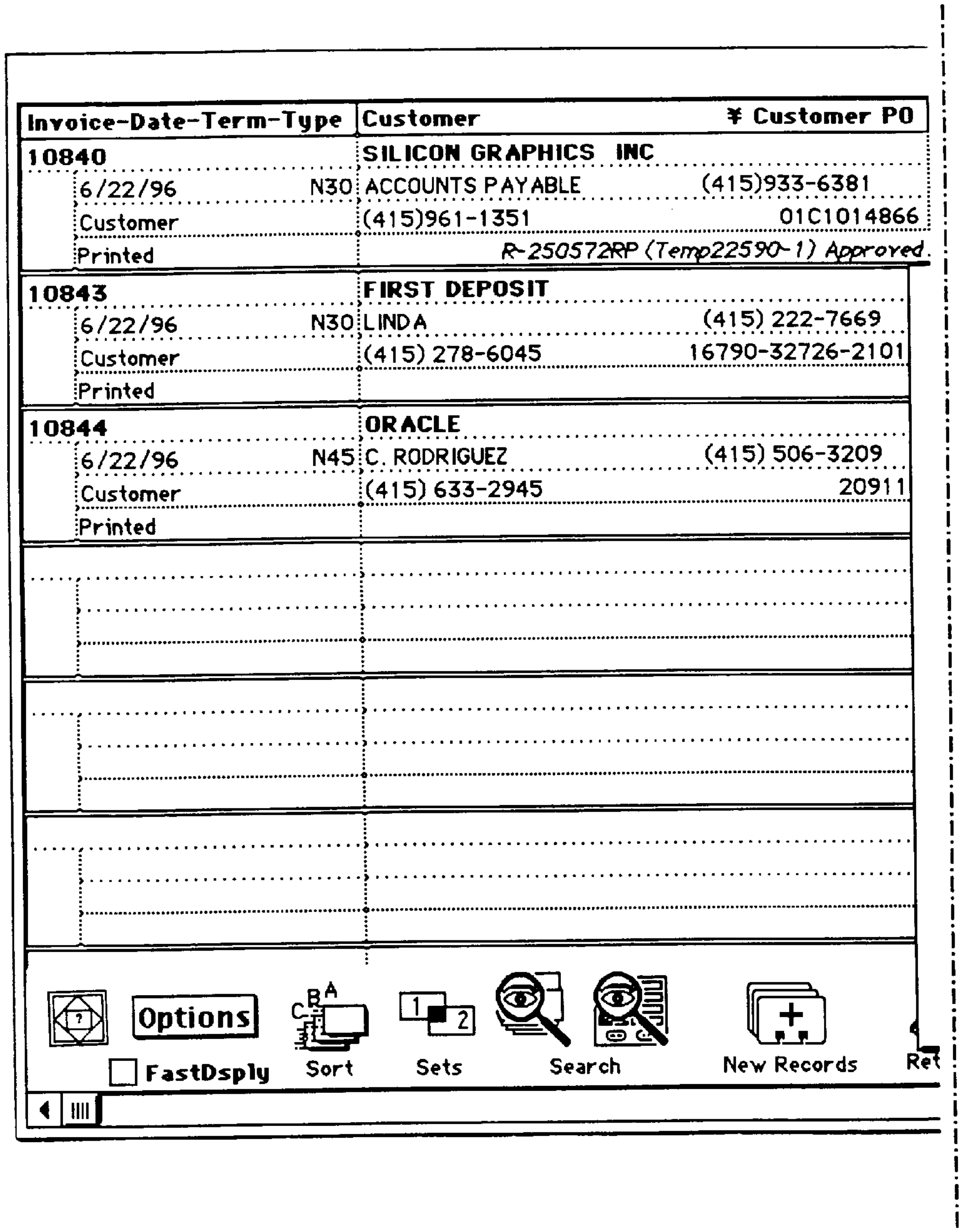
Figure 84B:
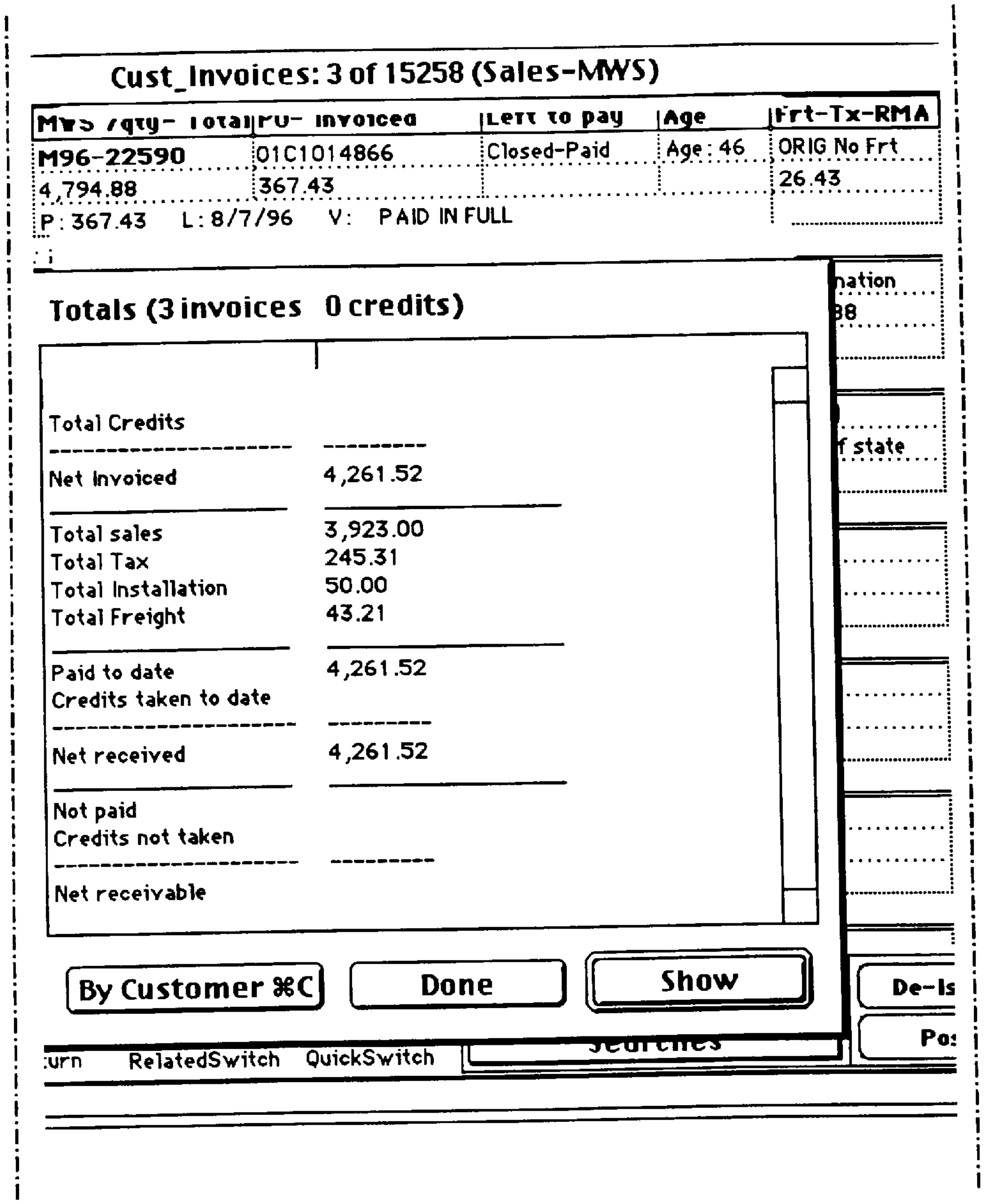
Figure 84C:
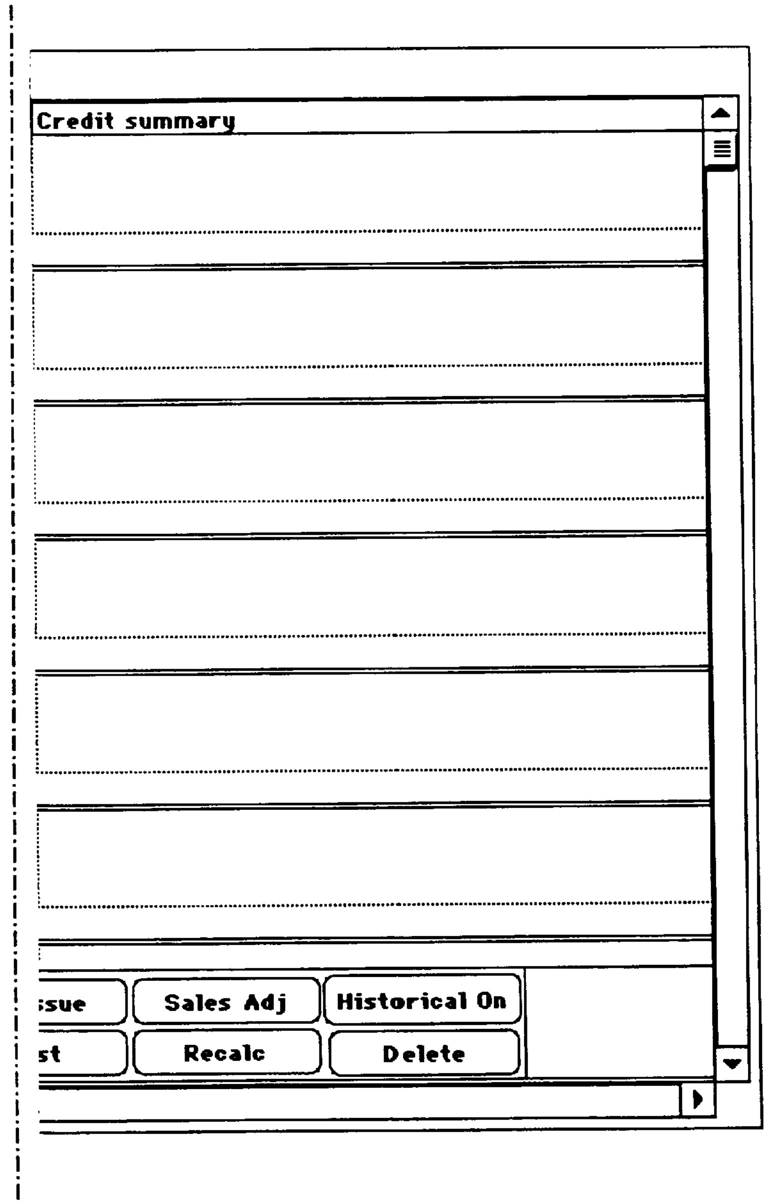
Figure 85:
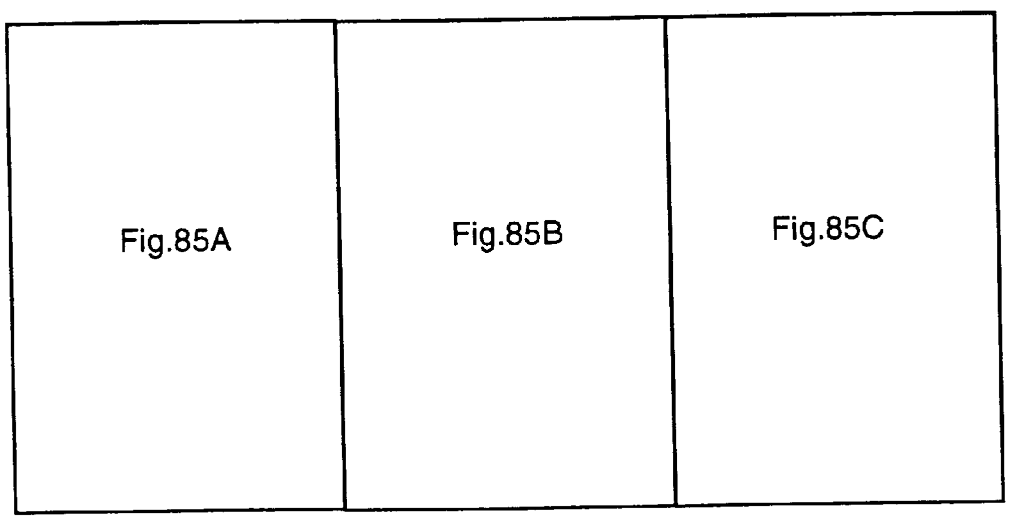
FIG. 85 is an illustration of the Customer Invoices screen display showing collections information by customer within a pop-up window.
Figure 85A:
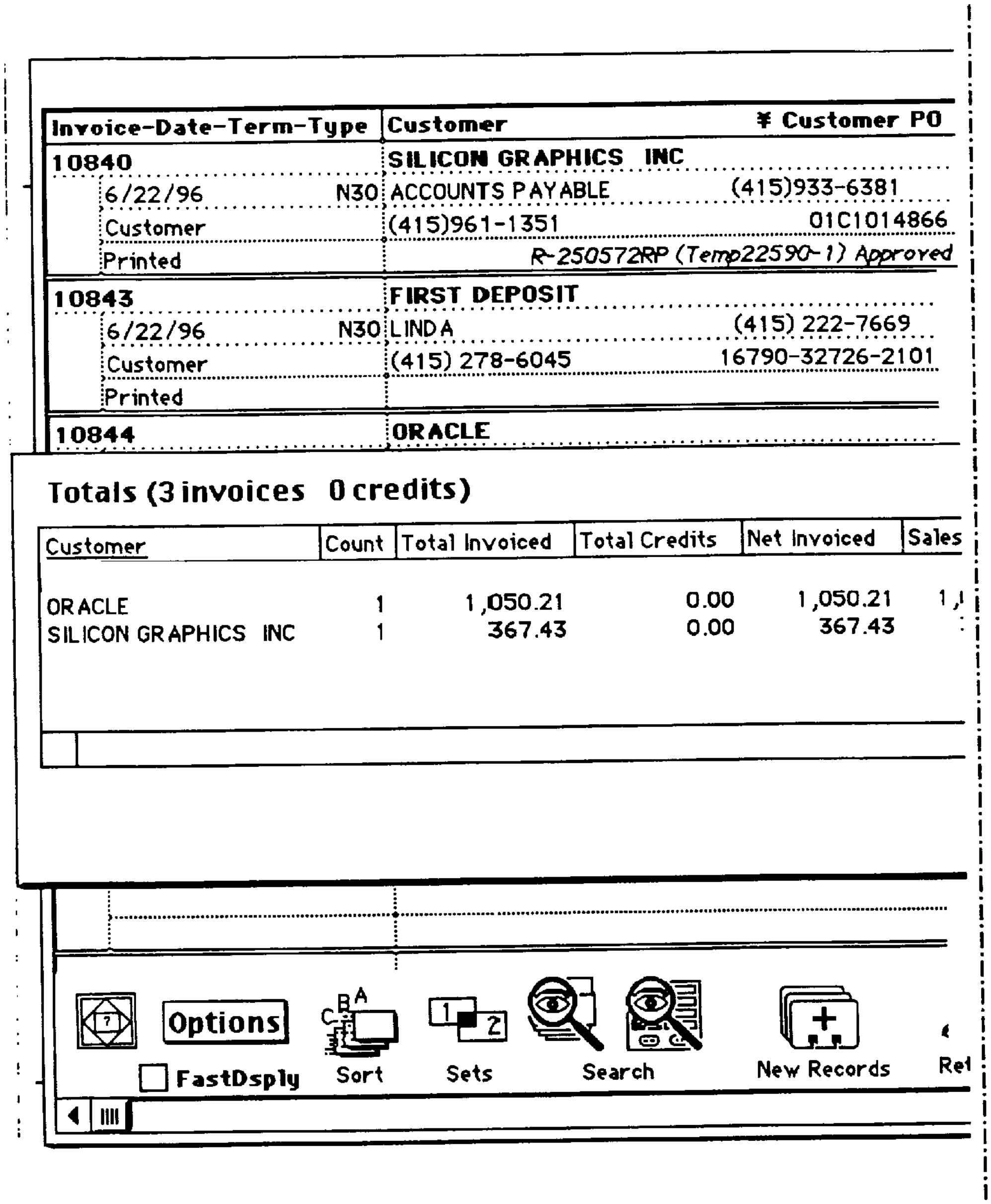
Figure 85B:
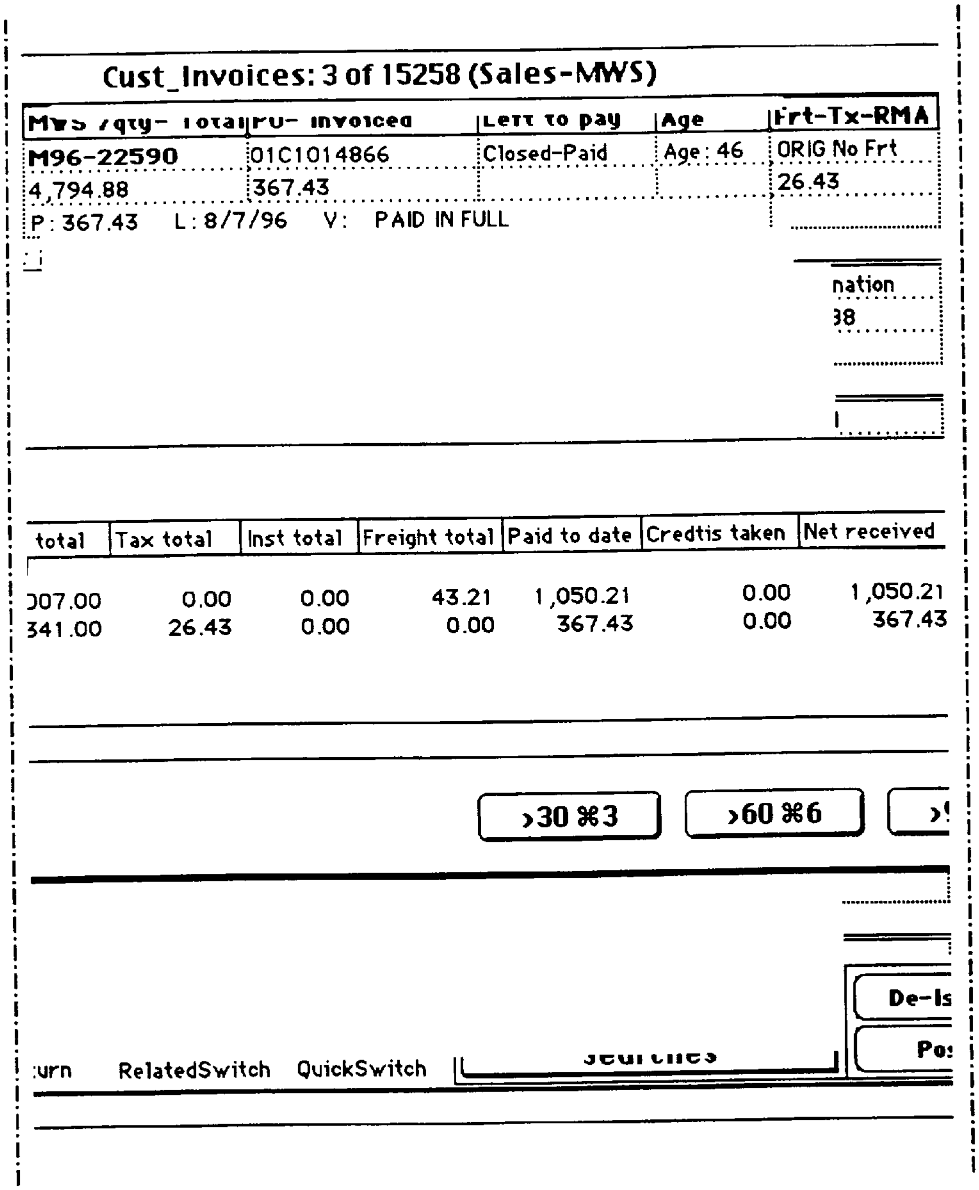
Figure 85C:
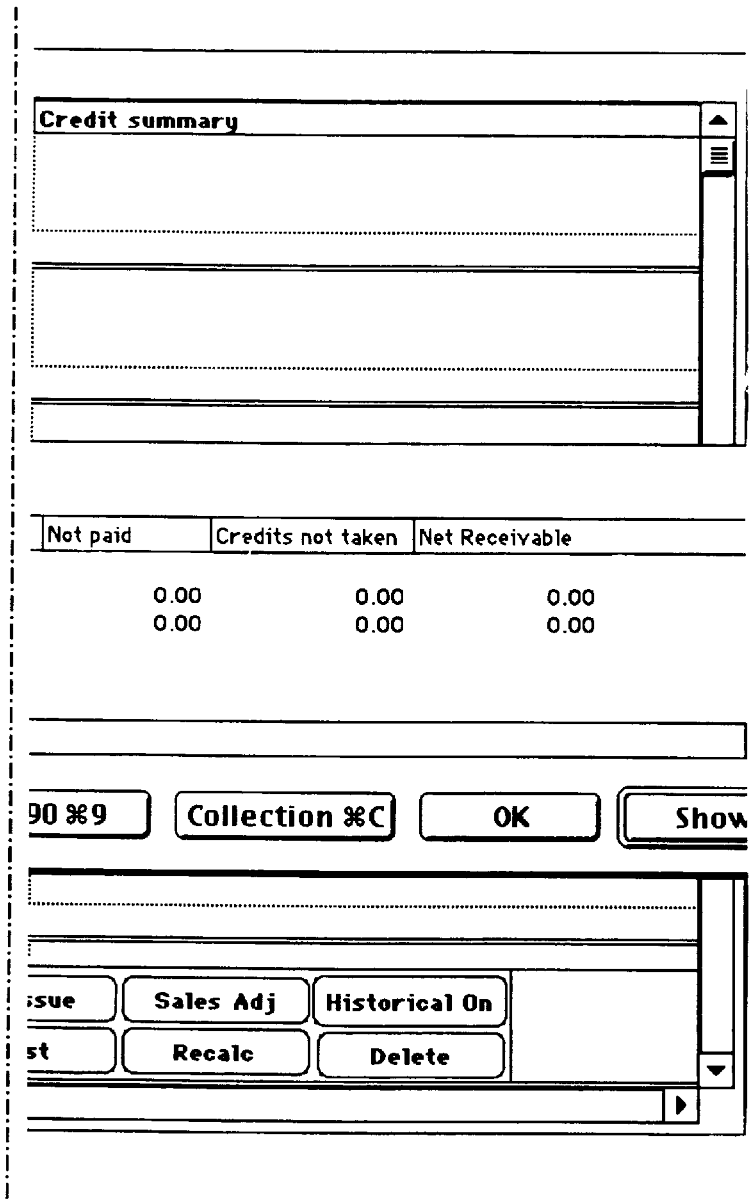

Referring more particularly to FIG. 84, from a MWS output screen display, the user can select a group of invoices and click on a collections button to cause a collections summary to appear. By further clicking on a By Customer button, the selected invoices are broken down by customer as shown in FIG. 85.

Figure 86:
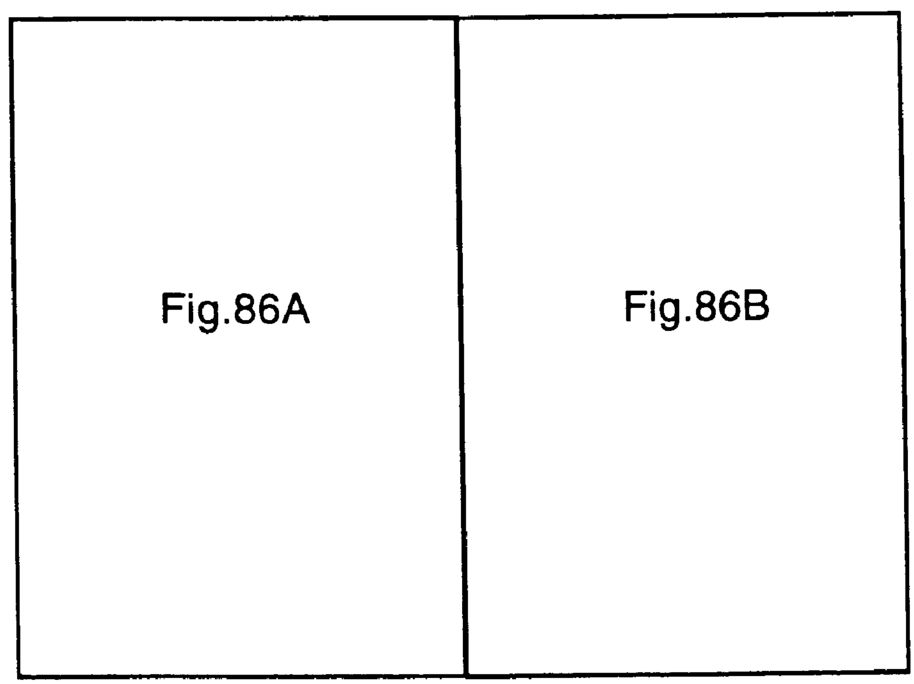
FIG. 86 is an illustration of a Customer Payments screen display.
Figure 86A:
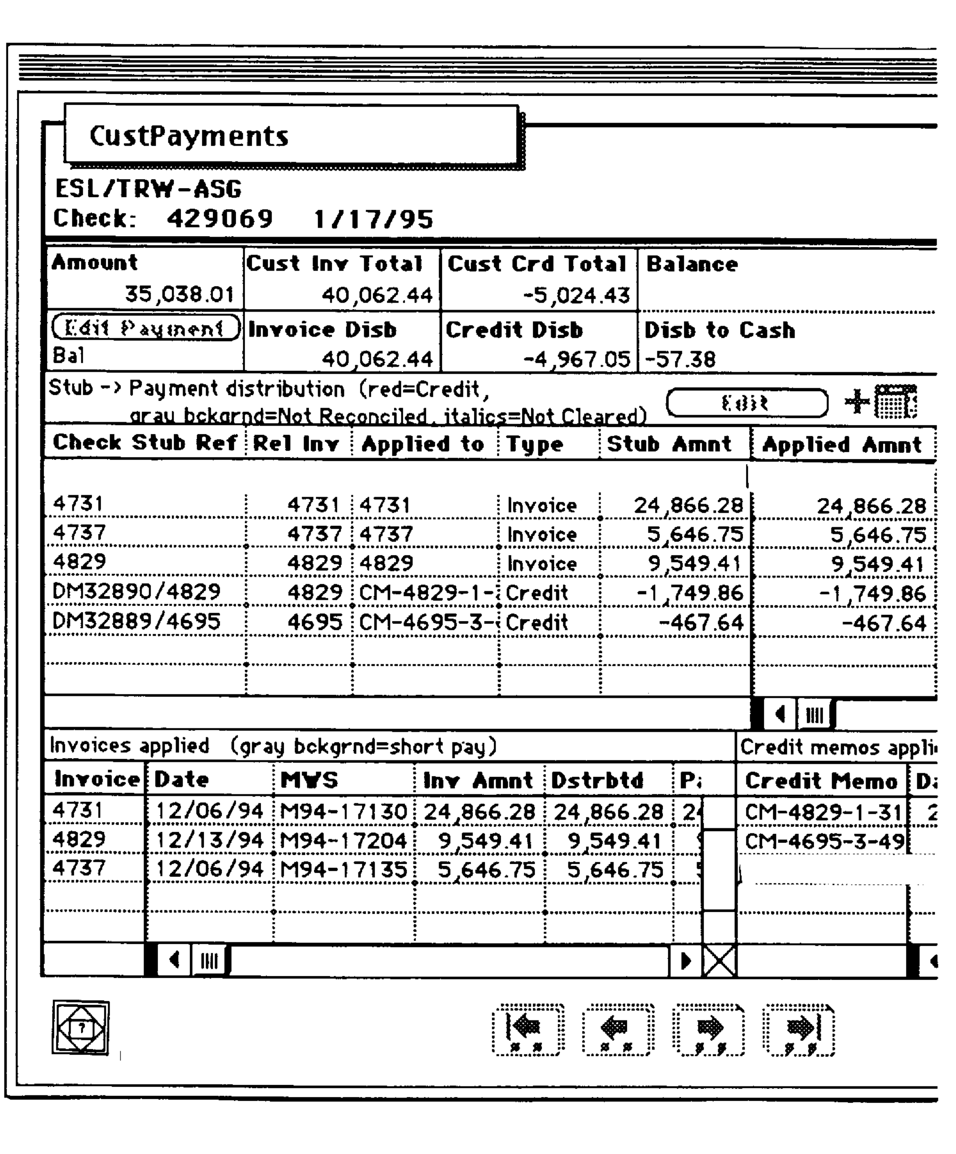
Figure 86B:
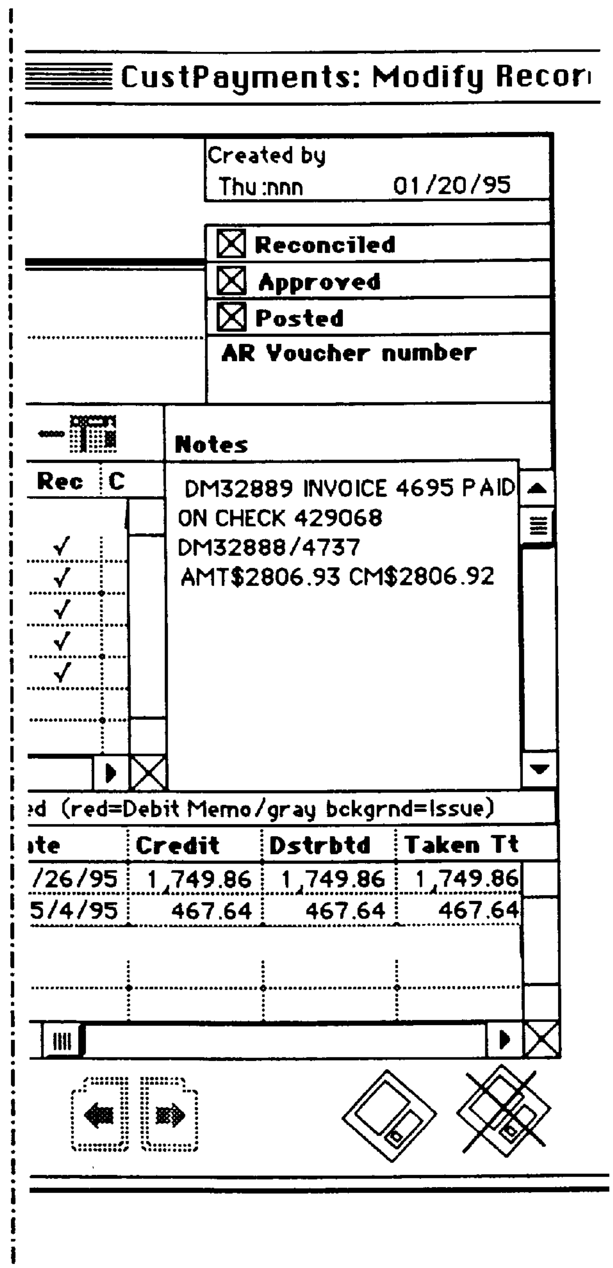

When a customer payment is received, a payables clerk clicks an add record button to add a customer payment record. The clerk is then presented with a pick list of customers. The clerk selects the customer from which the payment has been received. The customer is then prompted in turn to enter the mode of payment (check, cash, etc.) and the payment date. A customer payment record such as that shown in FIG. 86 is created. A payment may correspond to multiple invoices. The clerk enters from the check stub reference numbers and invoice numbers, as well as the respective amounts, for each invoice (or credit) to which the check purportedly applies. Referring to FIG. 86, for example, the check #429069, as indicated on the check stub, pertains to five different items, or reference numbers, the first three of which are invoices and the last two of which (DM32890/4829 and DM32889/4695) are credits.

After the reference and invoice numbers have been entered from the check stub, the system attempts to match the entries to the corresponding invoices within the system. The clerk is prompted to enter the type of each item (e.g., invoice or credit) and the amount indicated on the check stub. The system then checks to see if the amounts indicated coincide with the expected amounts stored within the system and indicates each item as being reconciled or not reconciled. The clerk then saves the record, which may then be approved and posted by supervisory personnel.

Figure 87:
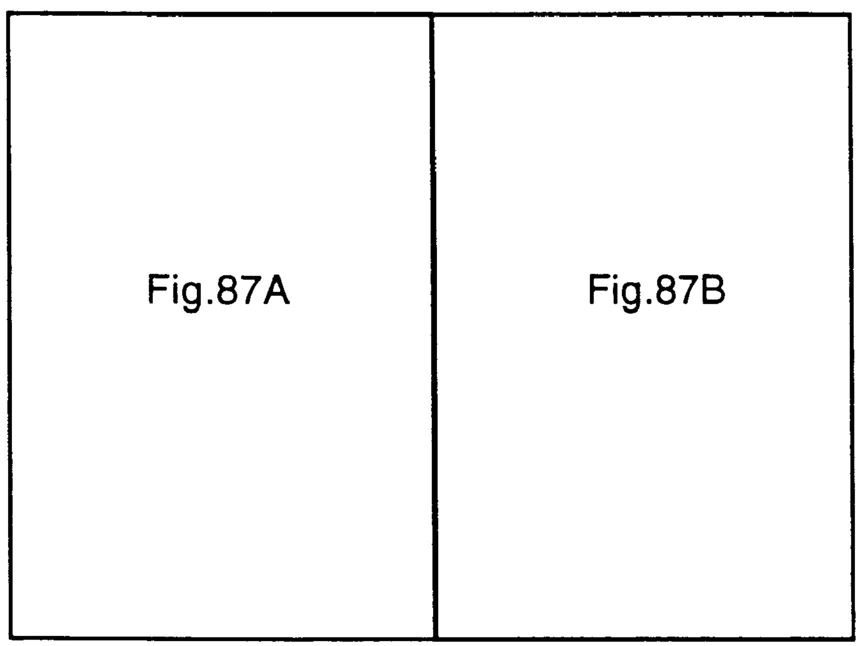
FIG. 87 is an illustration of an OverUnderPay screen display.
Figure 87A:
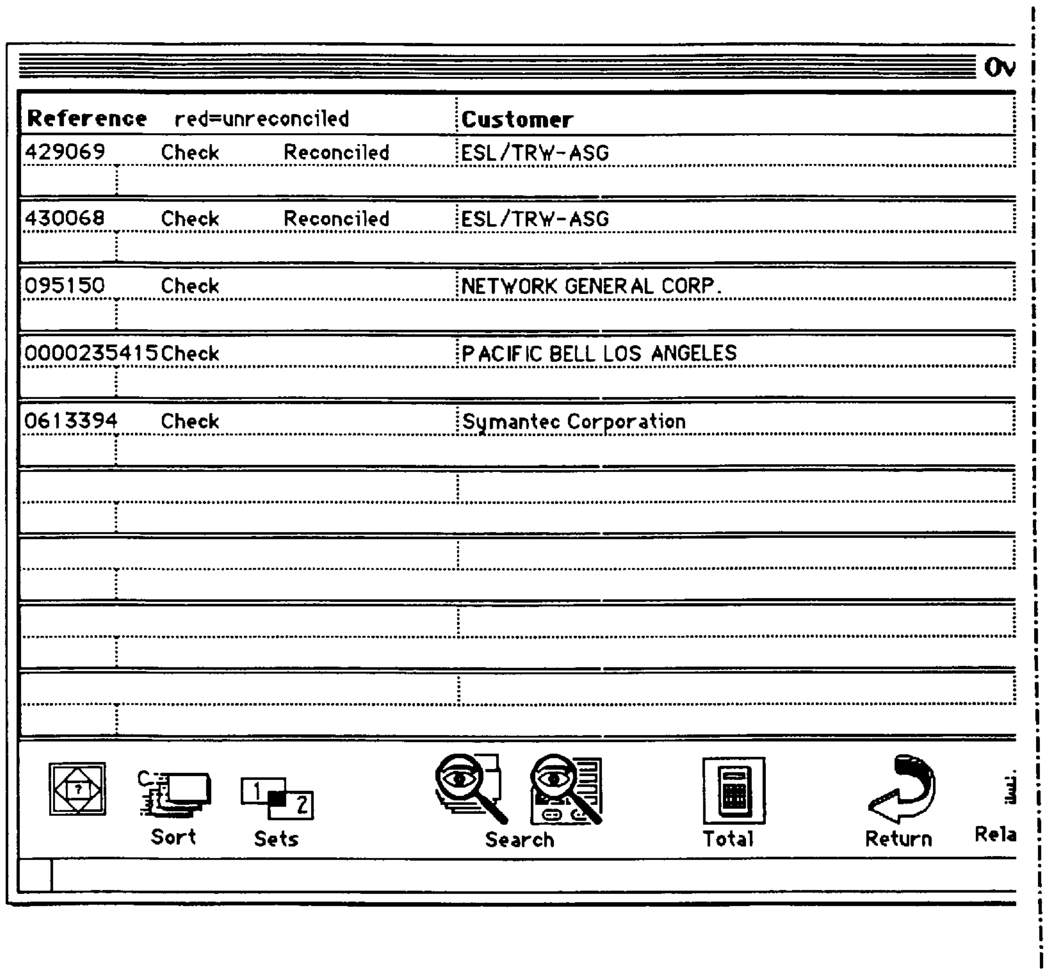
Figure 87B:
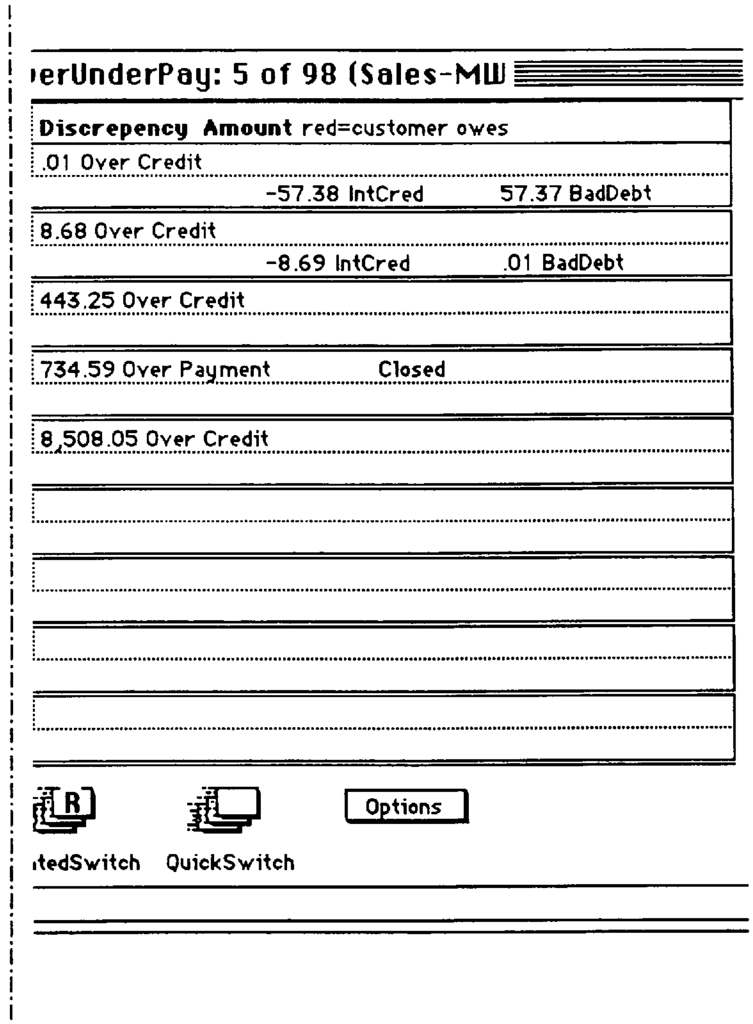
Figure 88:
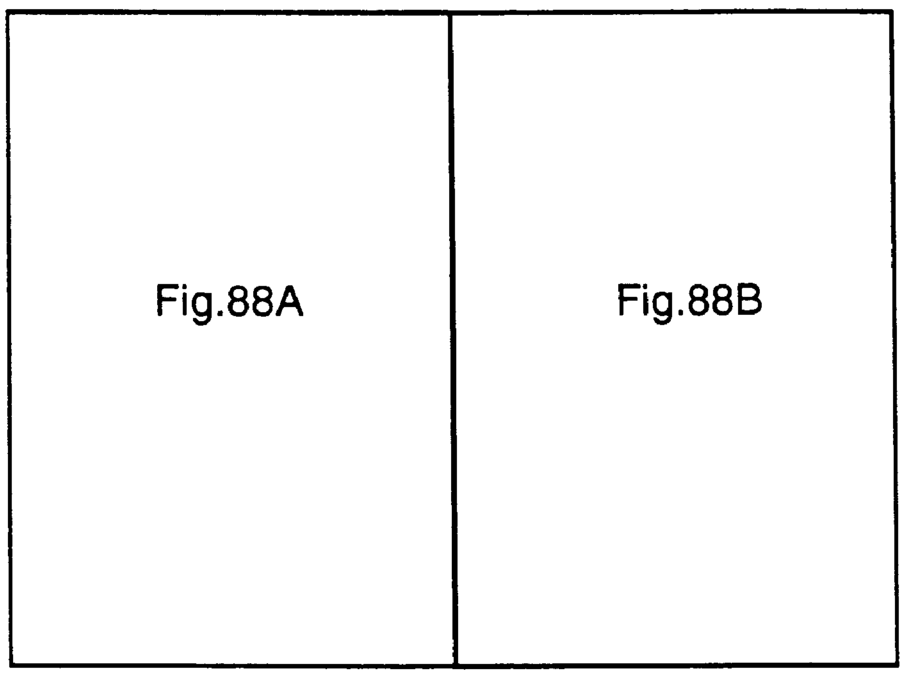
FIG. 88 is an illustration of an OverUnderPay details screen display.
Figure 88A:
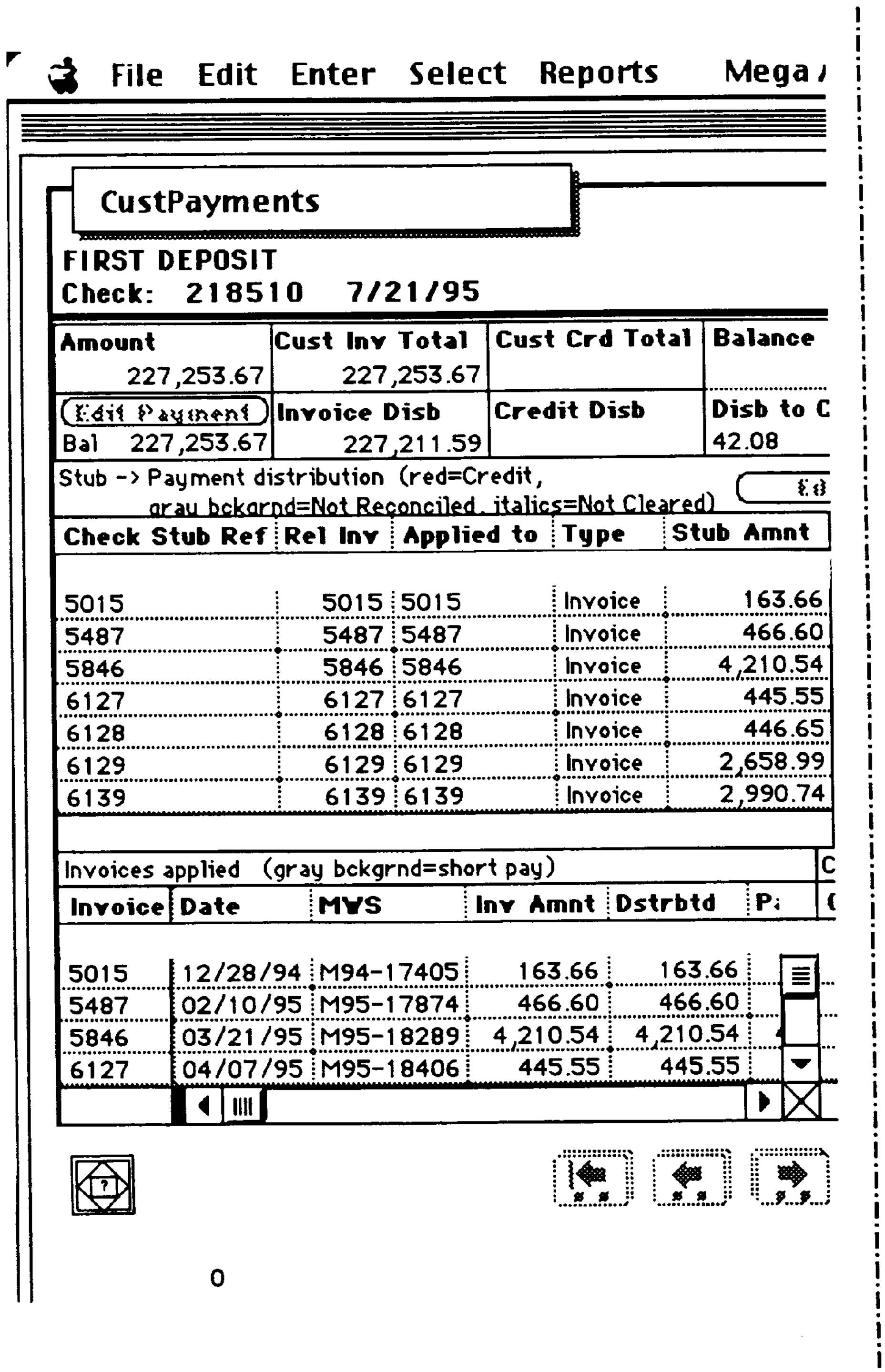
Figure 88B:
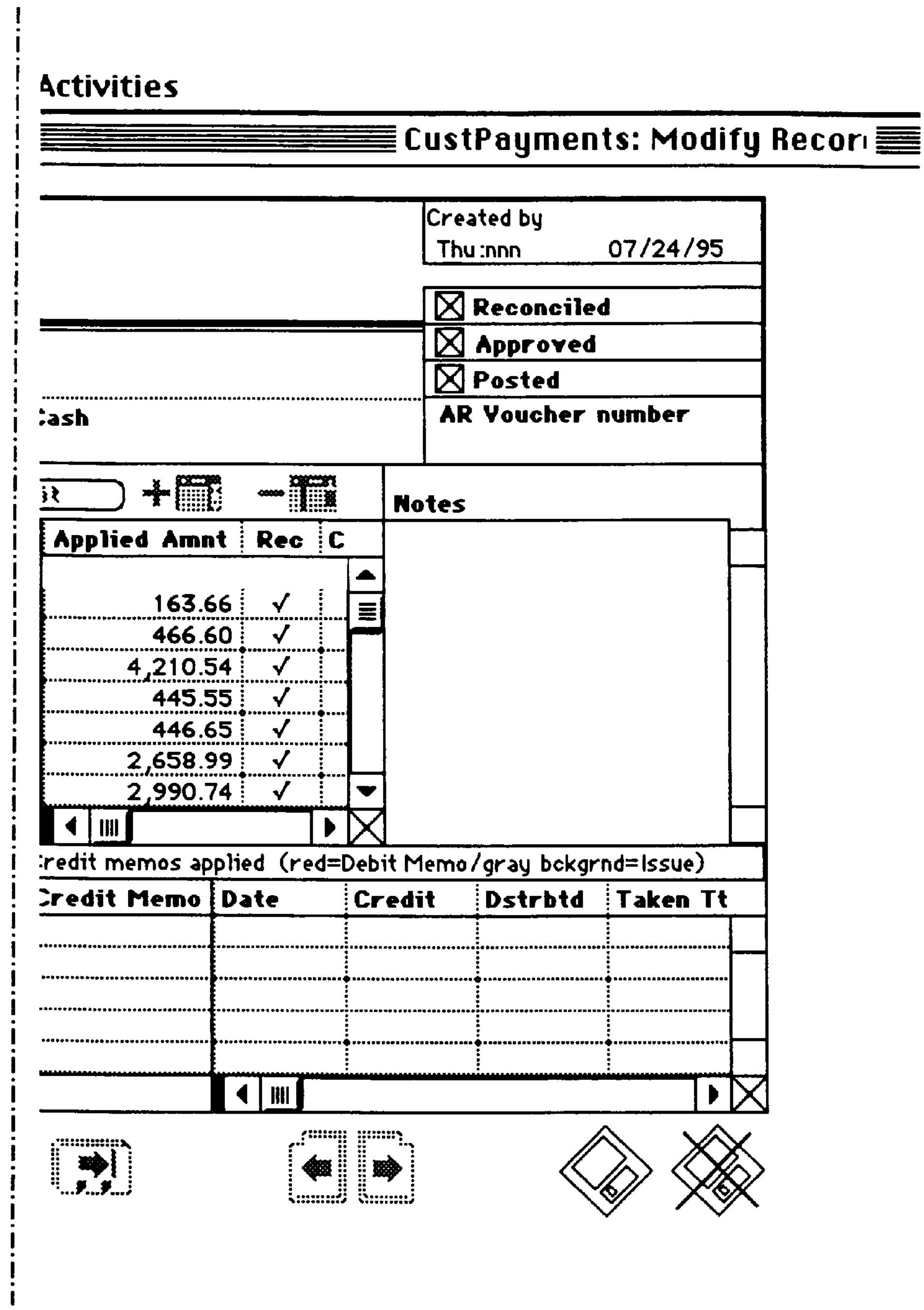

Discrepancies may occur between payment amounts and invoice amounts, i.e., both overpayment and underpayment may occur. An OverUnderPay file is used to track and resolve such discrepancies. An OverUnderPay screen display is shown in FIG. 87. A corresponding record detail screen display is shown in FIG. 88.

Business rules implemented by the AIR module include the following:

1. Invoices will be automatically created on shipment of products to customers.
2. Items can only be invoiced once.
3. Invoices must be issued by accounting before they are valid.
4. EDI invoices are provided for. EDI invoices will automatically be sent via EDI.
5. EDI invoices PID numbers must match PO PID numbers in the EDI file.
6. Customer invoice numbers indicated on the check stub must match with existing customer invoice numbers in the system. The amounts must correspond, else an overpay/underpay records is created as described above.

Accounts Payable

The accounts payable module is designed to ensure that invoices are timely paid but to prevent double payment, overpayment, etc., and to systematically resolve problems with invoices so that they may be paid. The payment policy may be more or less aggressive. On the aggressive side, for example, the system may provide that a vendor invoice is paid only after a corresponding customer payment has been received, thereby assuring a stable cash flow.

Figure 89:
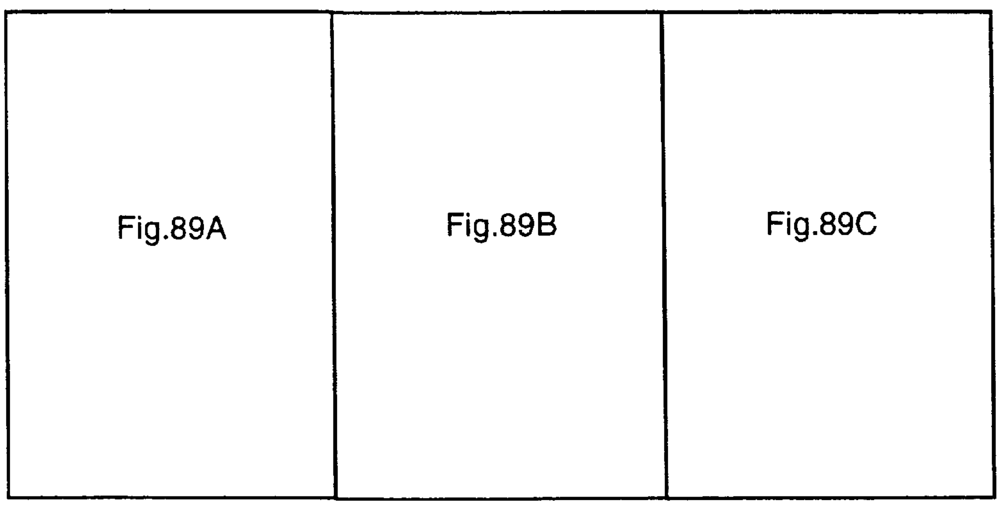
FIG. 89 is an illustration of a Vendor Invoices screen display.
Figure 89A:
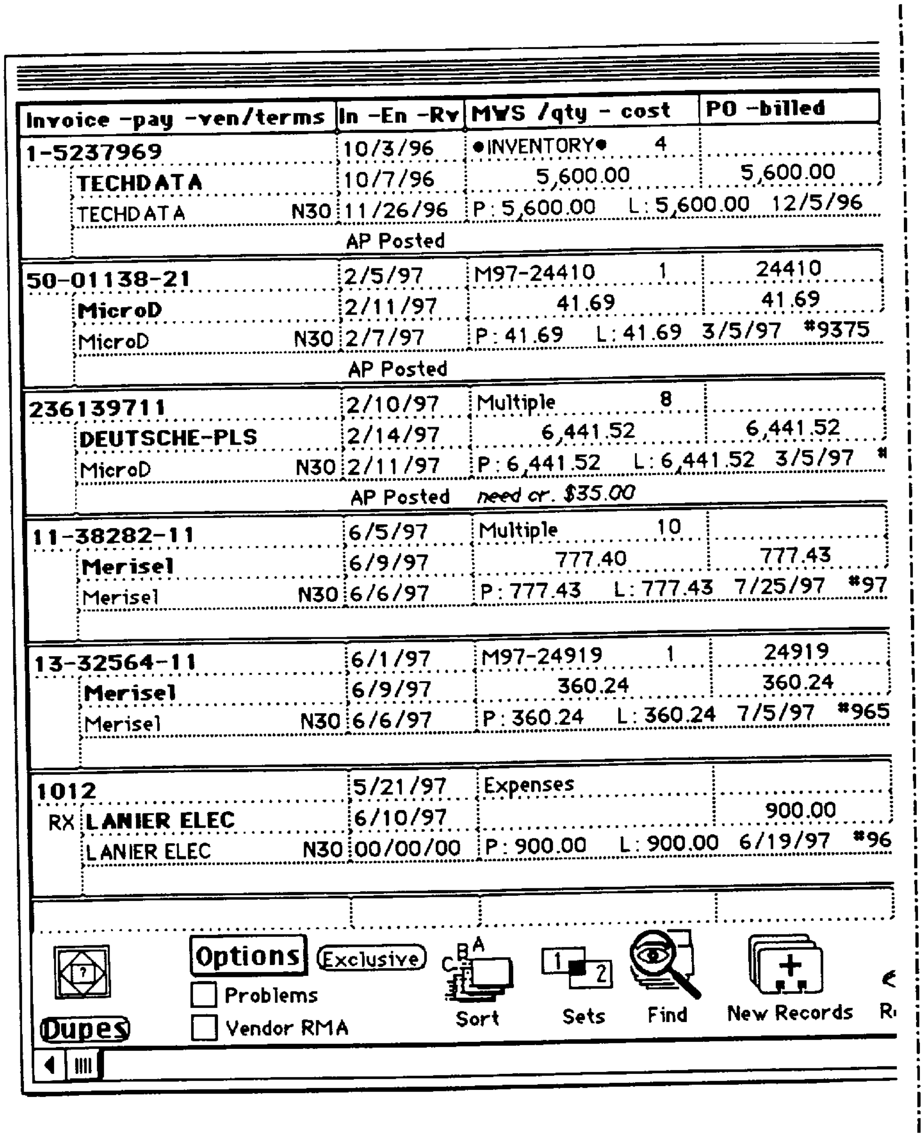
Figure 89B:
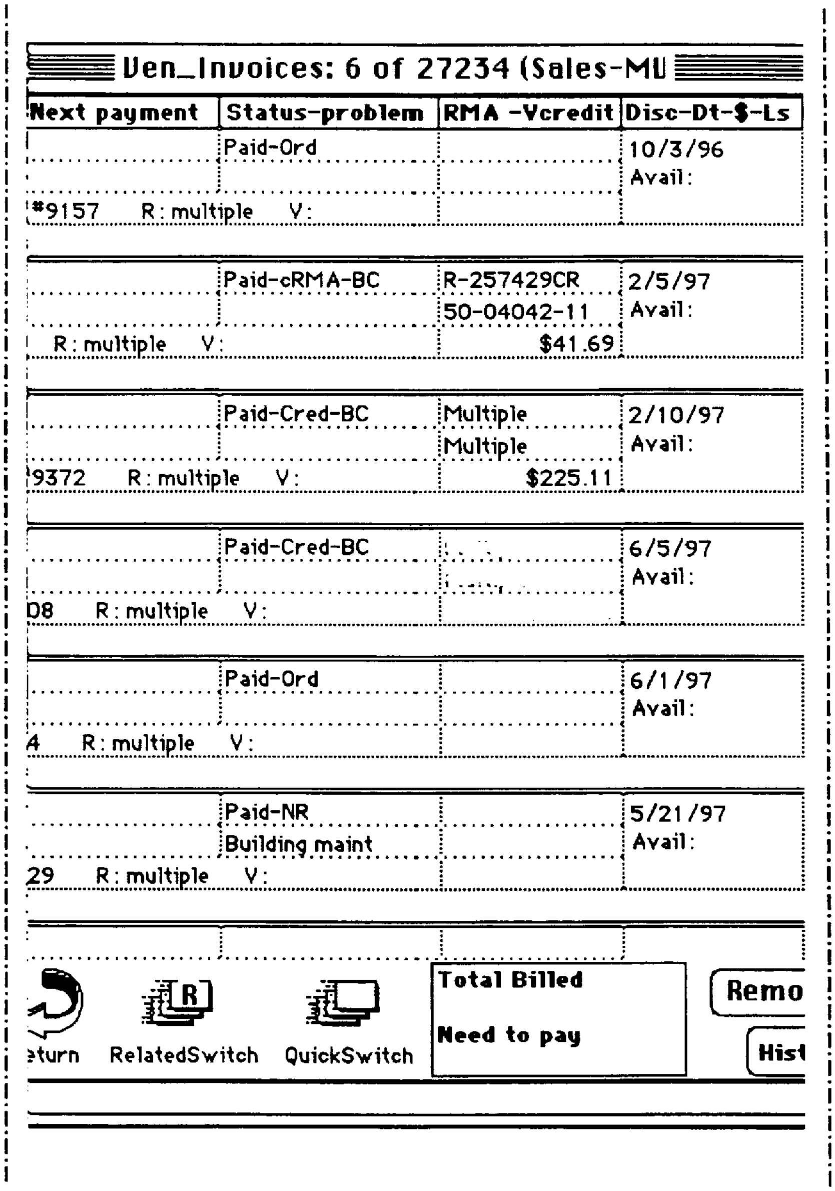
Figure 89C:
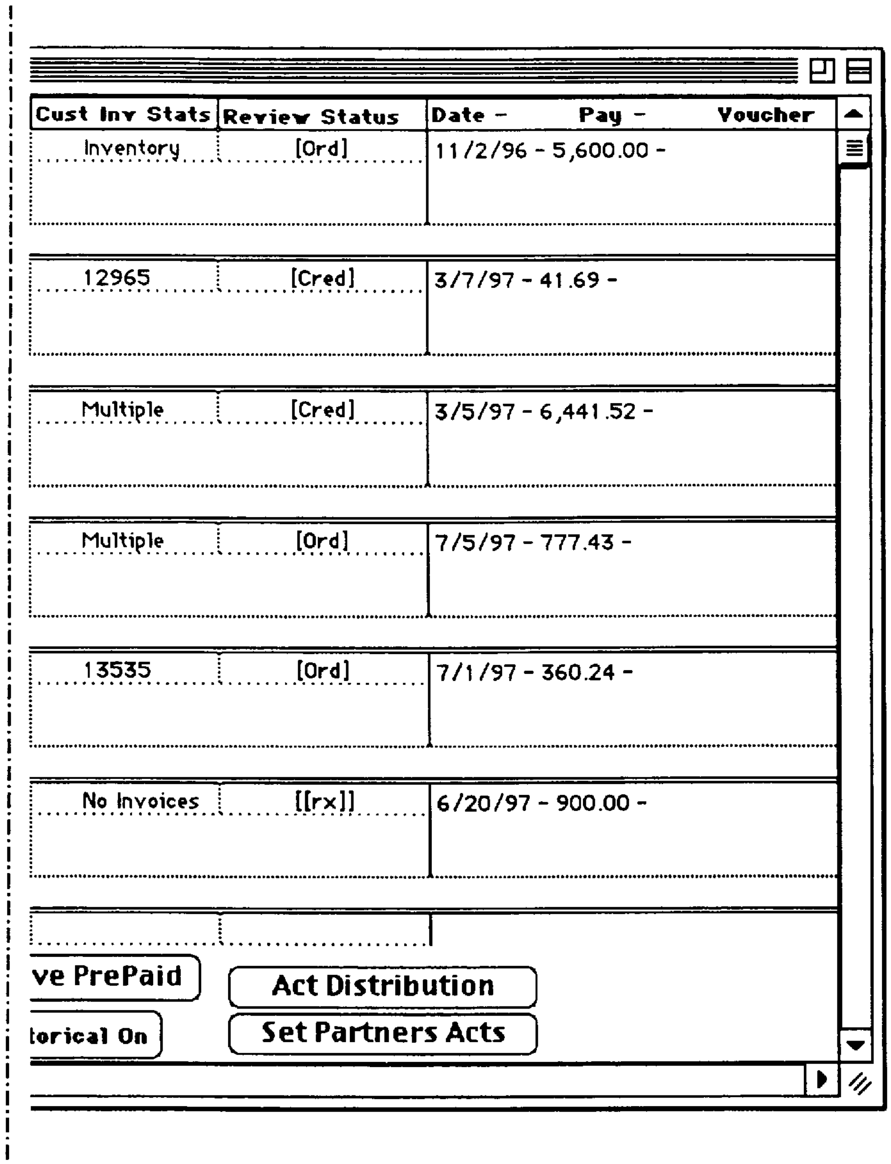
Figure 90:
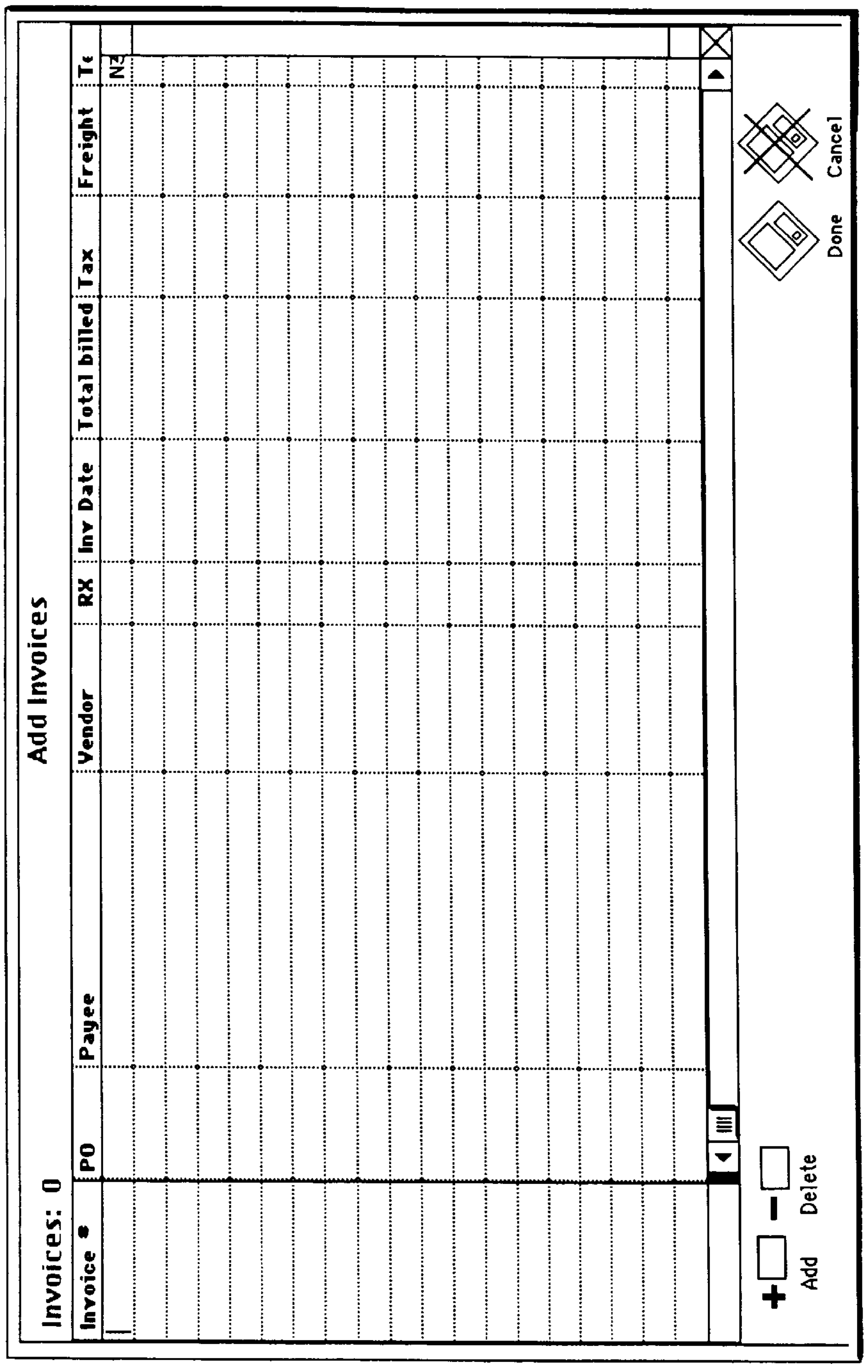
FIG. 90 is an illustration of an AP Add Invoices screen display.
Figure 91:
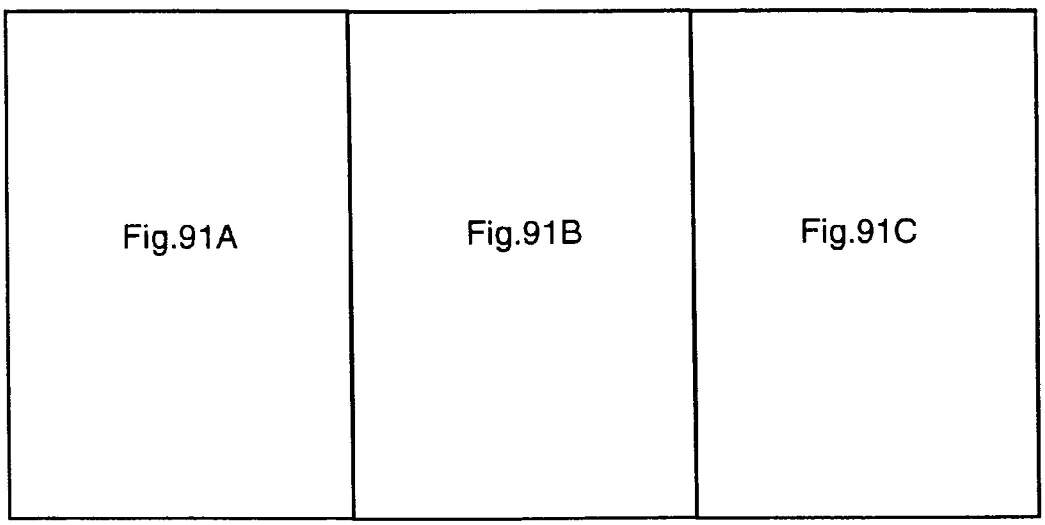
FIG. 91 is an illustration of a Vendor Invoice display.
Figure 91A:
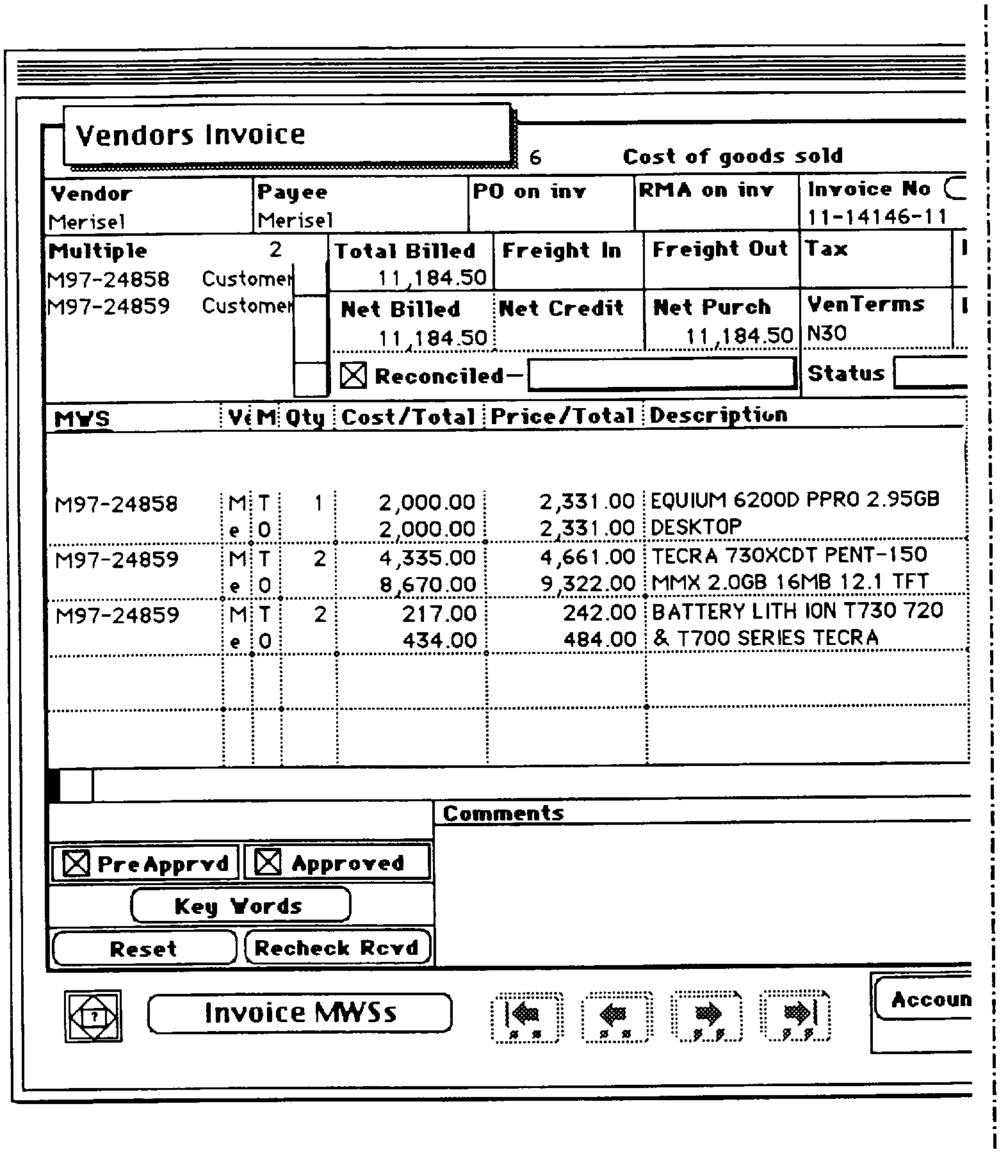
Figure 91B:
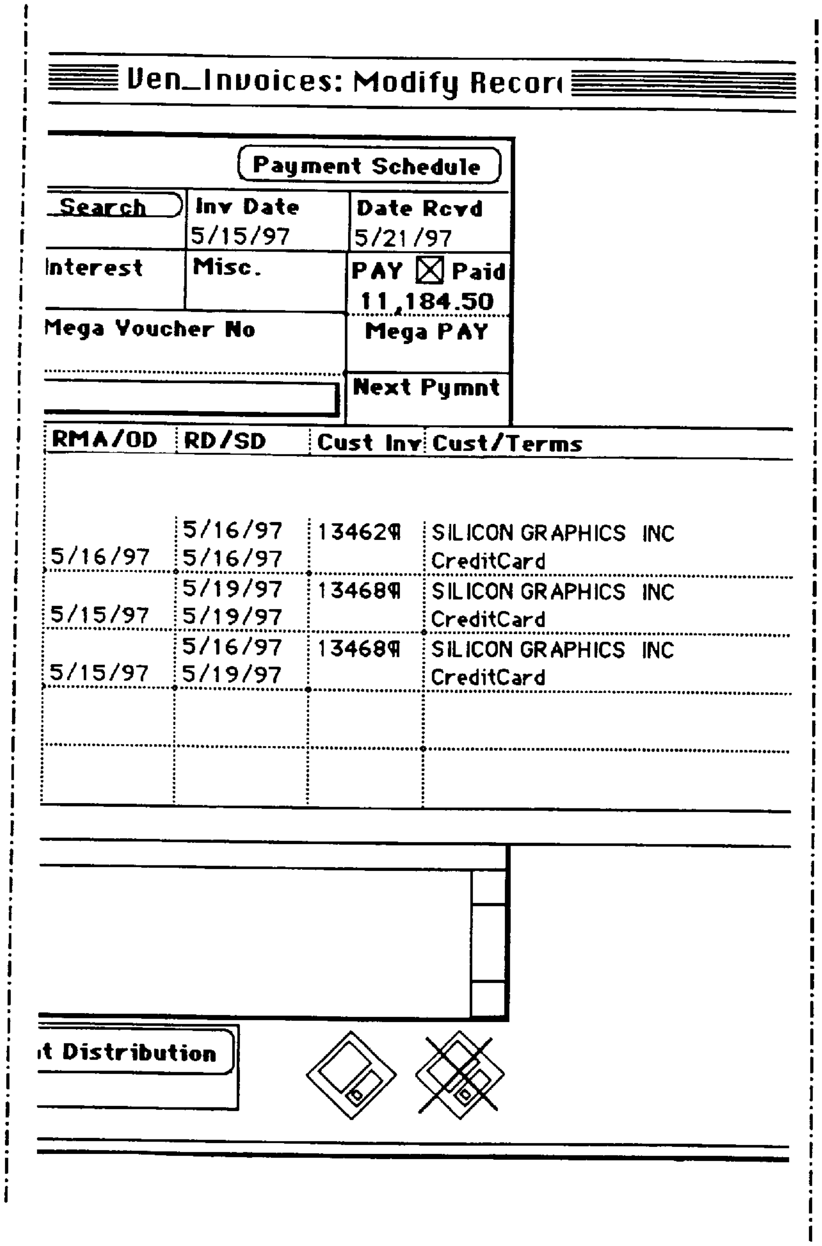
Figure 91C:
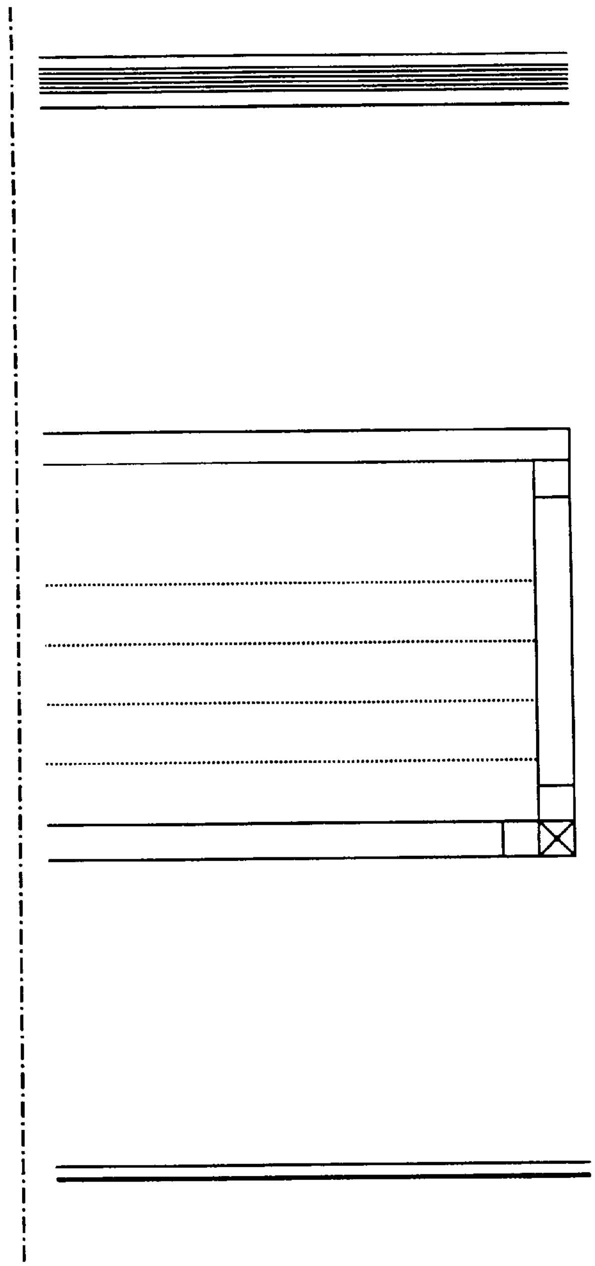

A vendor invoice screen display is shown in FIG. 89. When vendor invoices are received, they are entered within a grid such as that of FIG. 90. The invoice number and PO number are entered manually from the invoice. The payee and vendor are preferably selected from pick lists. The invoice date, total billed, tax and freight are entered manually from the invoice. For each entry within the Add Invoices screen, a vendor invoice such as that of FIG. 91 is created. Based on the PO number, the system displays items sold from the MWS (with or without addendum, or possibly even multiple addendums) to which the invoice pertains.

Figure 93:
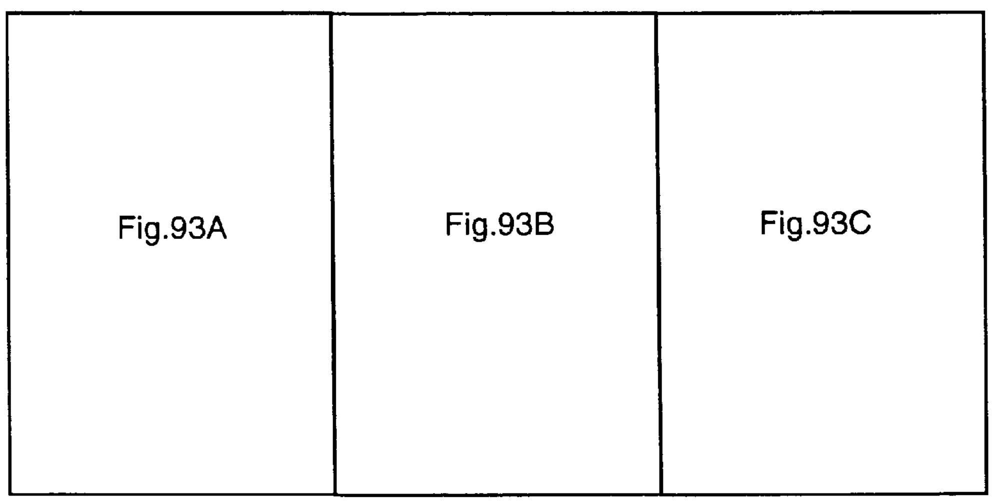
FIG. 93 is an illustration of a Vendor Payment Register screen display.
Figure 93A:
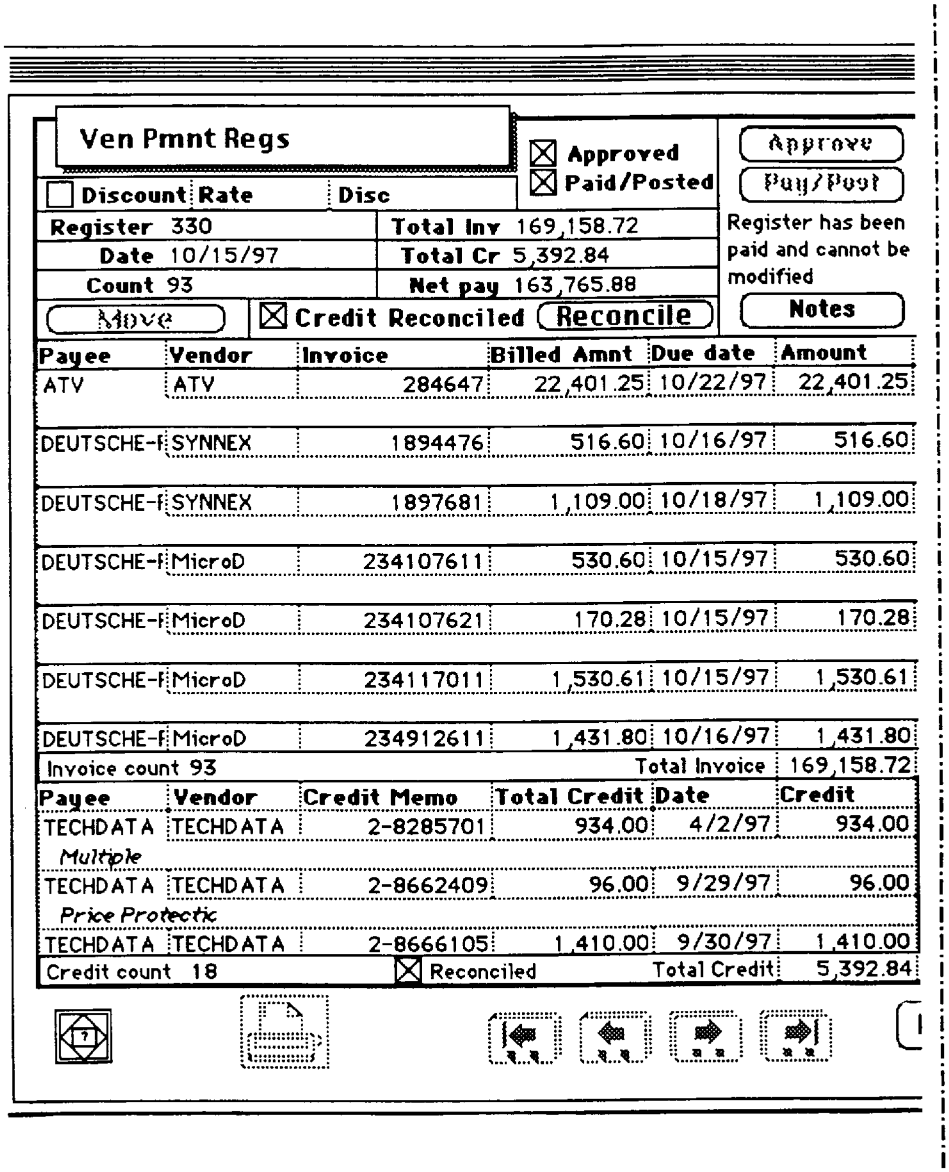
Figure 93B:
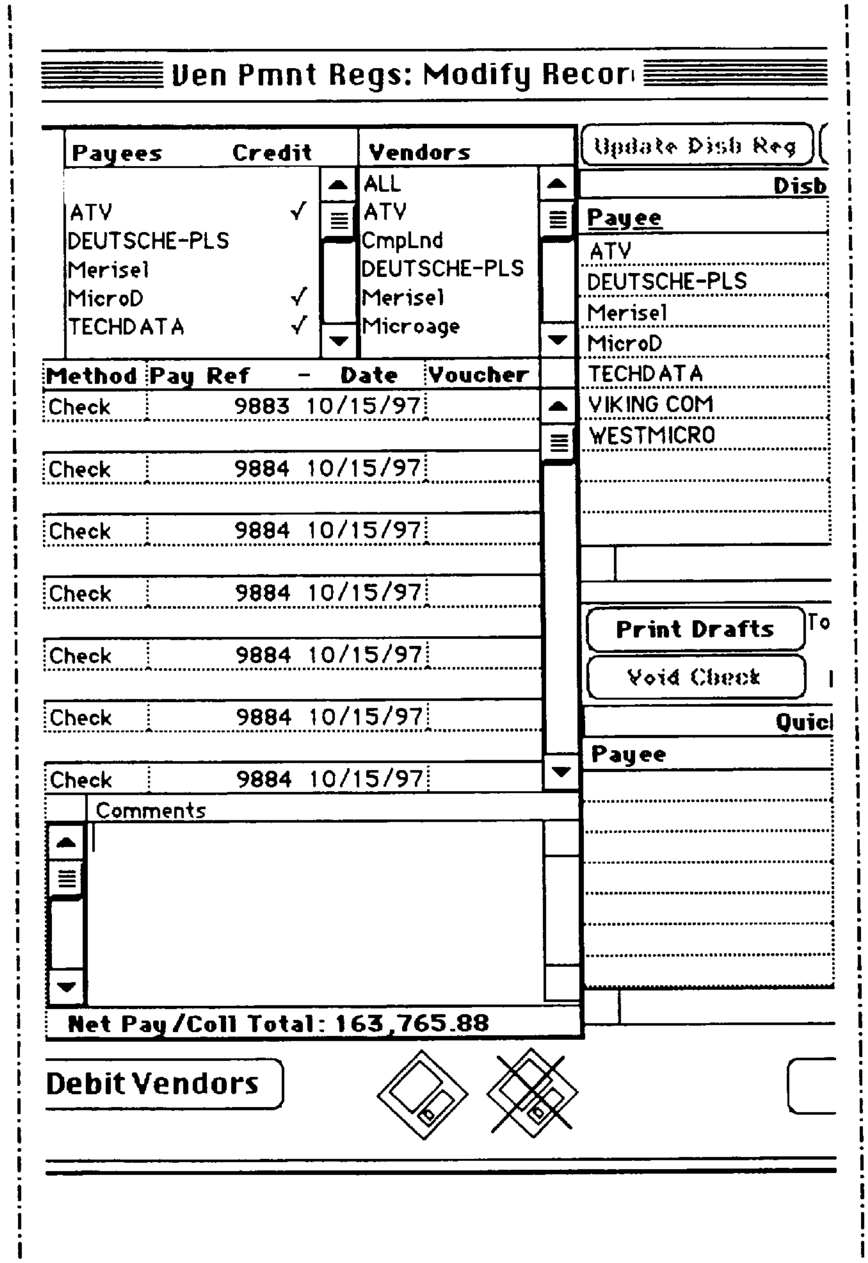
Figure 93C:
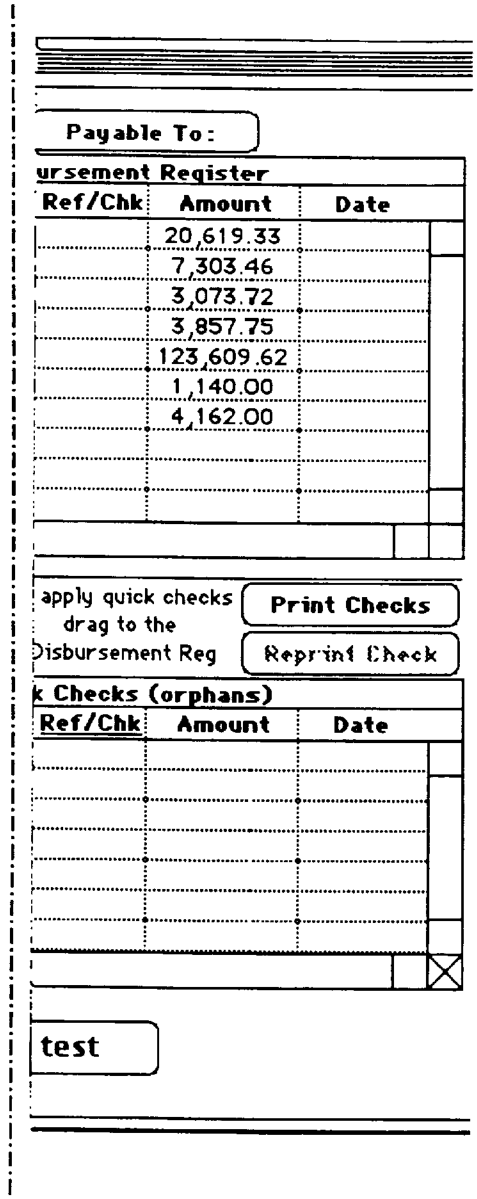

The vendor payment process begins by an accounts payable clerk invoking a Daily Vendor Verification option. Referring to FIG. 92, this option identifies all of the open vendor invoices and runs them through a "sieve" to determine which invoices are "clean," i.e., fully reconciled, and which invoices are not clean, i.e., have discrepancies. Within each the categories clean and not clean, there are numerous sub-categories arranged in order from most important to least important. A given clean invoice may in fact fall within several sub-categories, but is categorized at any given time into the highest sub-category to which it belongs. Similarly, a given invoice that is not clean is categorized at any given time into the highest sub-category to which it belongs. By double clicking on a particular category, invoices belonging to that category are displayed. Typically, the payables clerk will pre-approve clean invoices for approval by supervisory personnel having authority to approve payment. Invoices that have been approved are then scheduled by the payables clerk to a payment register, an example of which is shown in FIG. 93, for payment in accordance with their respective due dates.

For invoices that are not clean, the payables clerk displays invoices from the highest sub-category, investigates each invoice and attempts to fix the particular discrepancy involved with that sub-category. The same approach is followed with the invoices of each sub-category in turn. The verification is then re-run. Some invoices may have become clean, whereas other invoices may have passed to a next-lower sub-category but may still not be clean.

Figure 94:
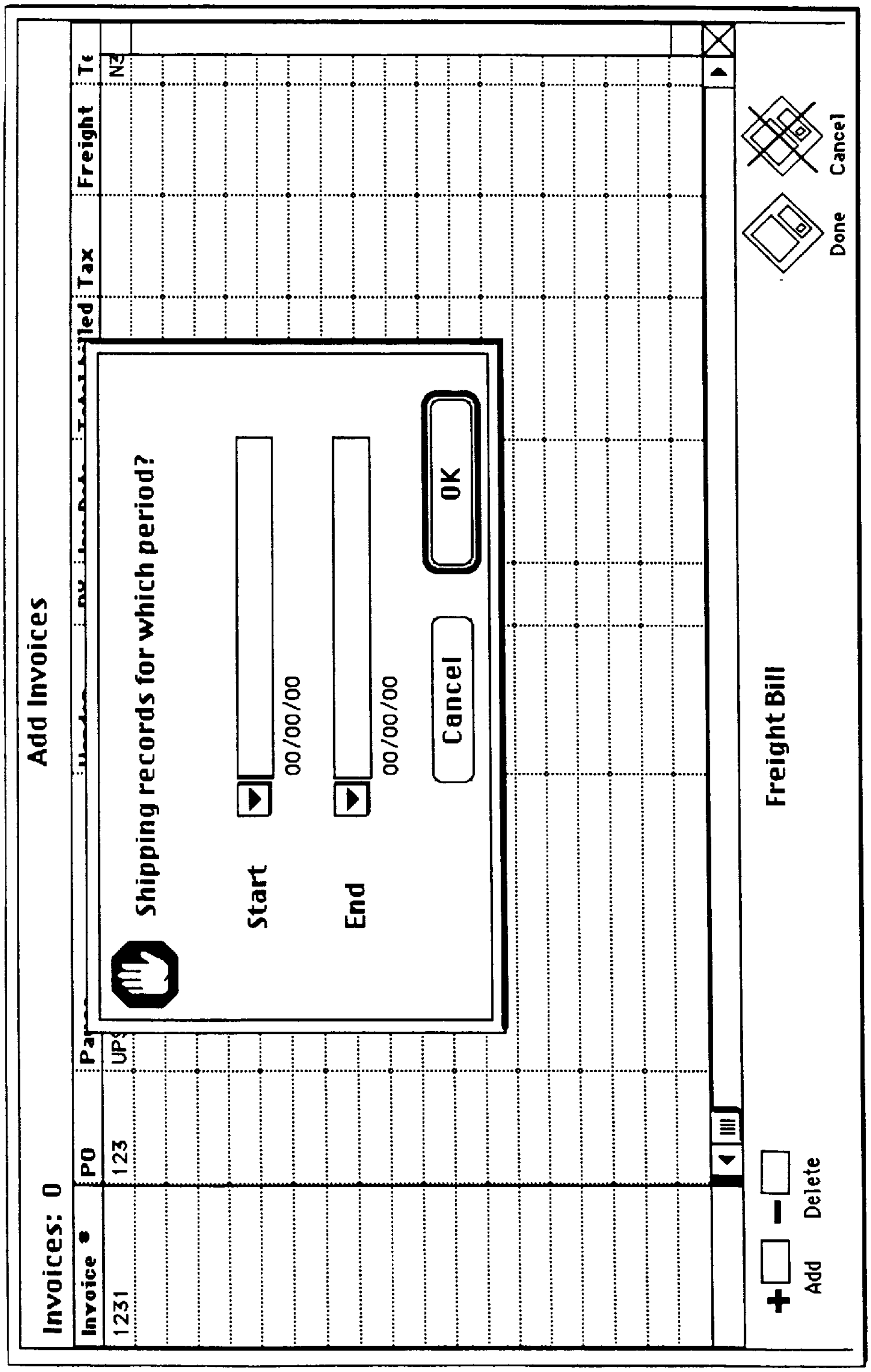
FIG. 94 is an illustration of an Add Invoices screen display having superimposed thereon a dialog window used to enter the period for a freight bill.

Referring again to FIG. 90, prior to entering invoices, the user is prompted as to which type of invoices to be entered, including as one possibility freight bills. When a freight bill is entered, the user enters the invoice number, PO number, and payee (the latter from a pick list), and instead of a vendor list, picks a carrier from a carrier list. The user is then prompted to enter a date range specifying a period to which the freight bill pertains (FIG. 94). Shipping records are then searched, and freight charges for shipments with the specified carrier during the specified period are totalled. Invoice entry is then completed in the usual manner. If the invoice amount entered from the invoice equals the expected total charges, then the resulting invoice record is marked reconciled. If not, then the invoice record is marked not reconciled.

Figure 121:
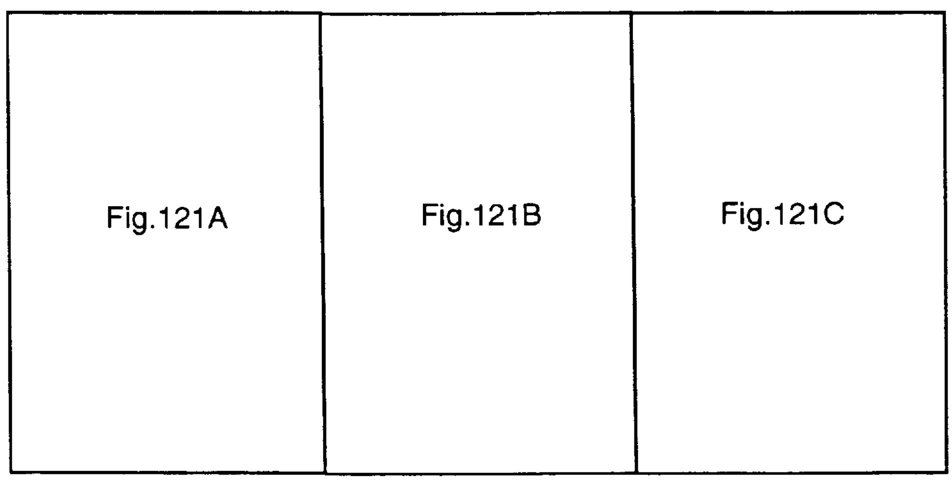
Figure 121A:
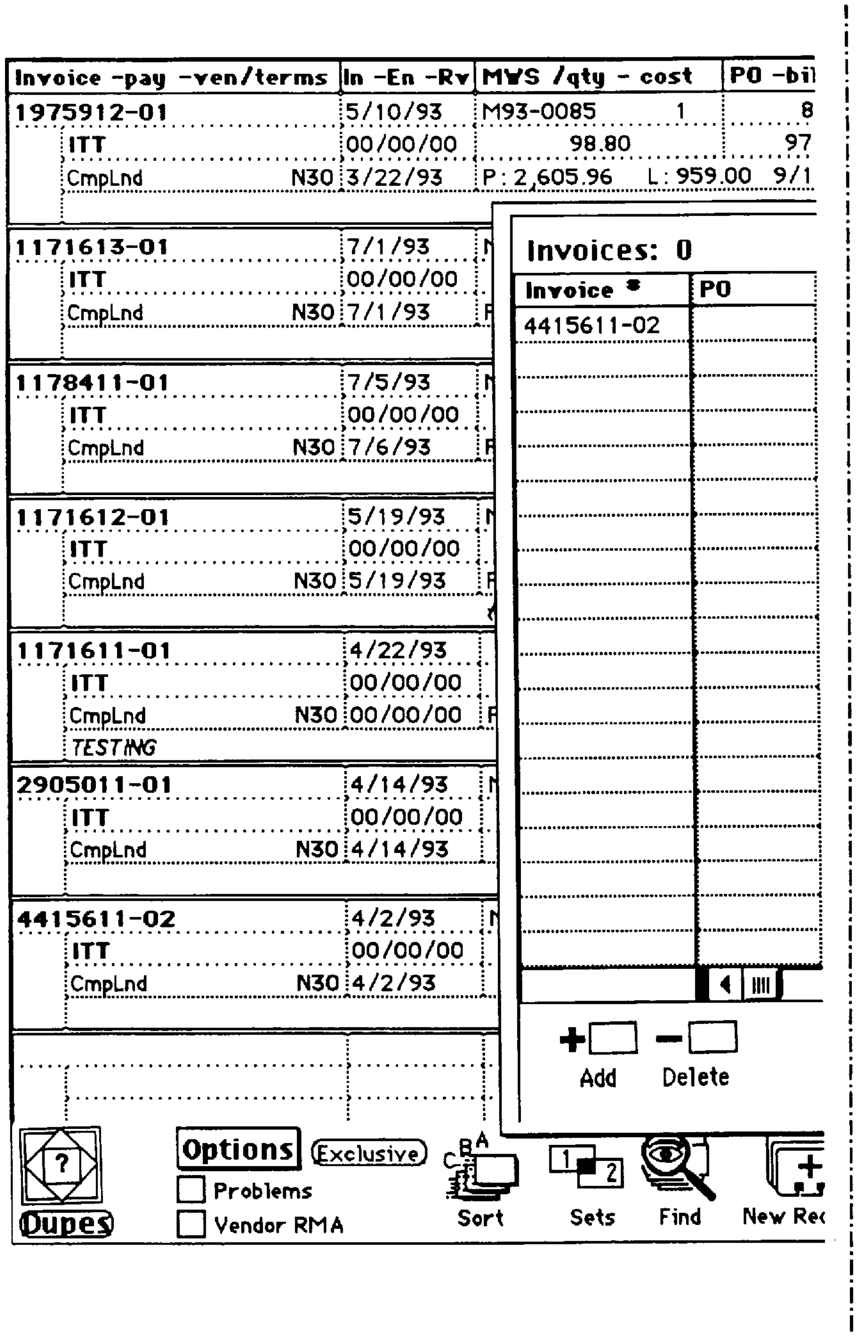
Figure 121B:
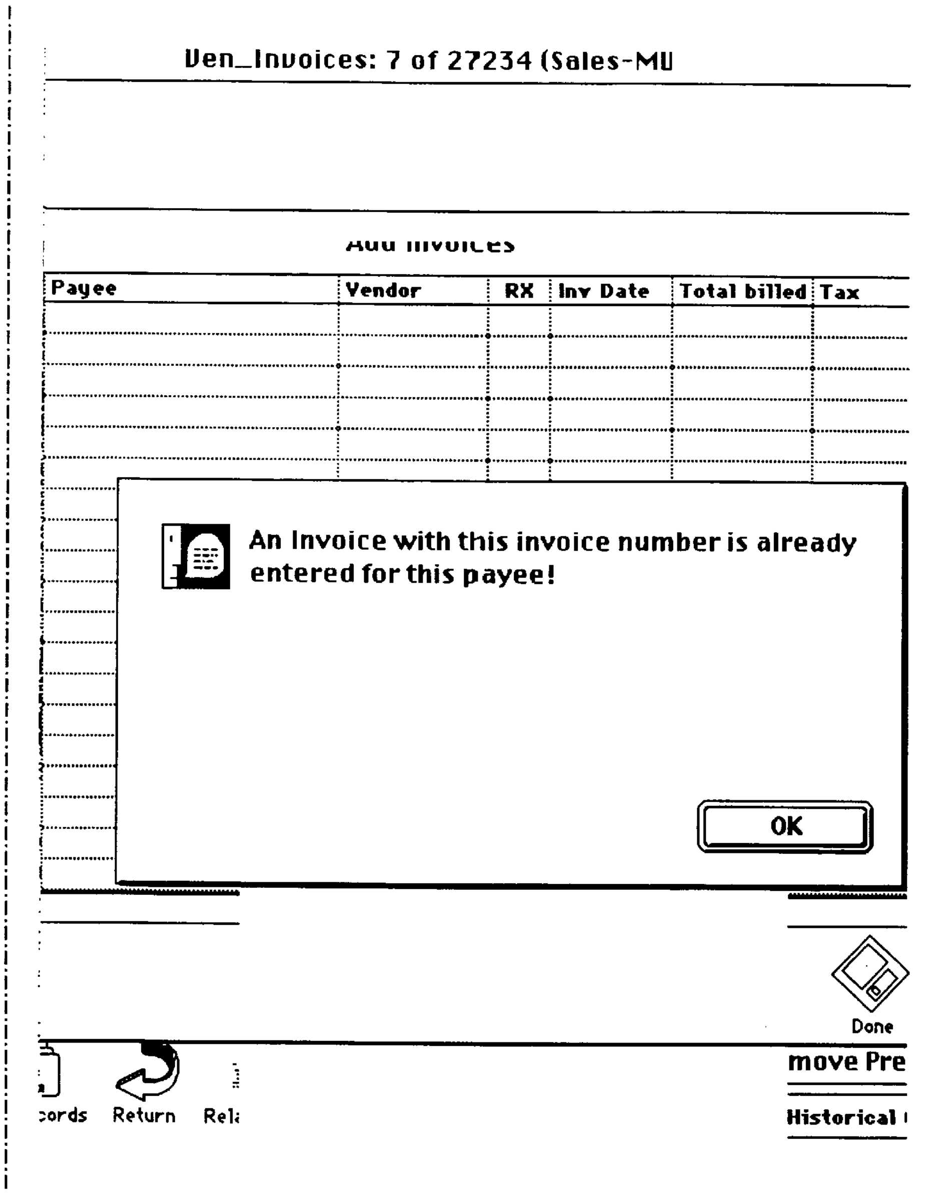
Figure 121C:
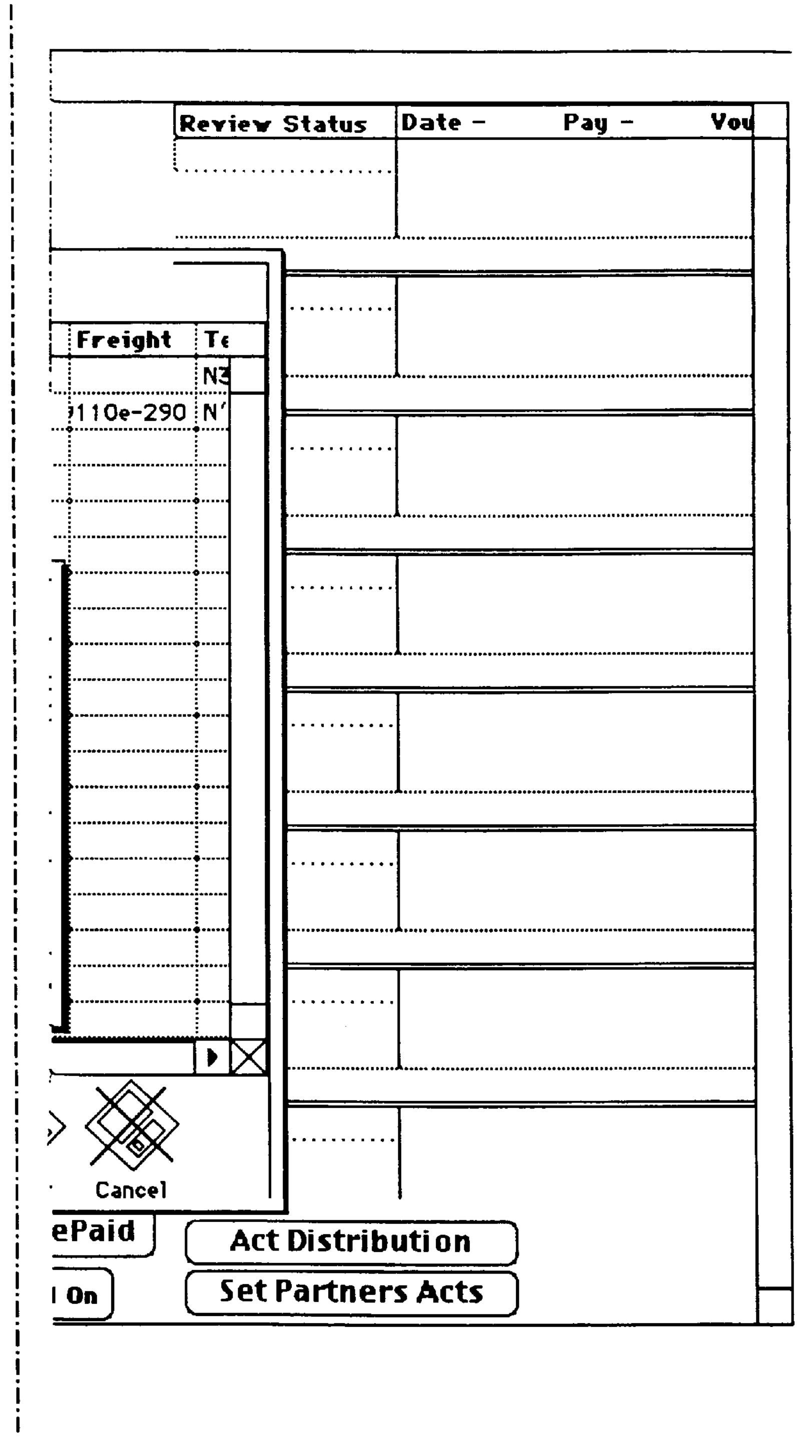
Figure 122:
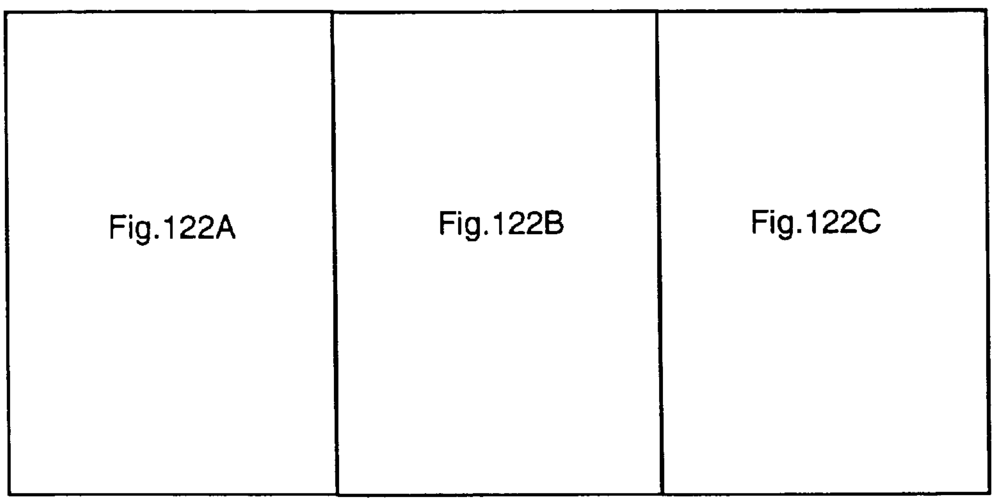
Figure 122A:
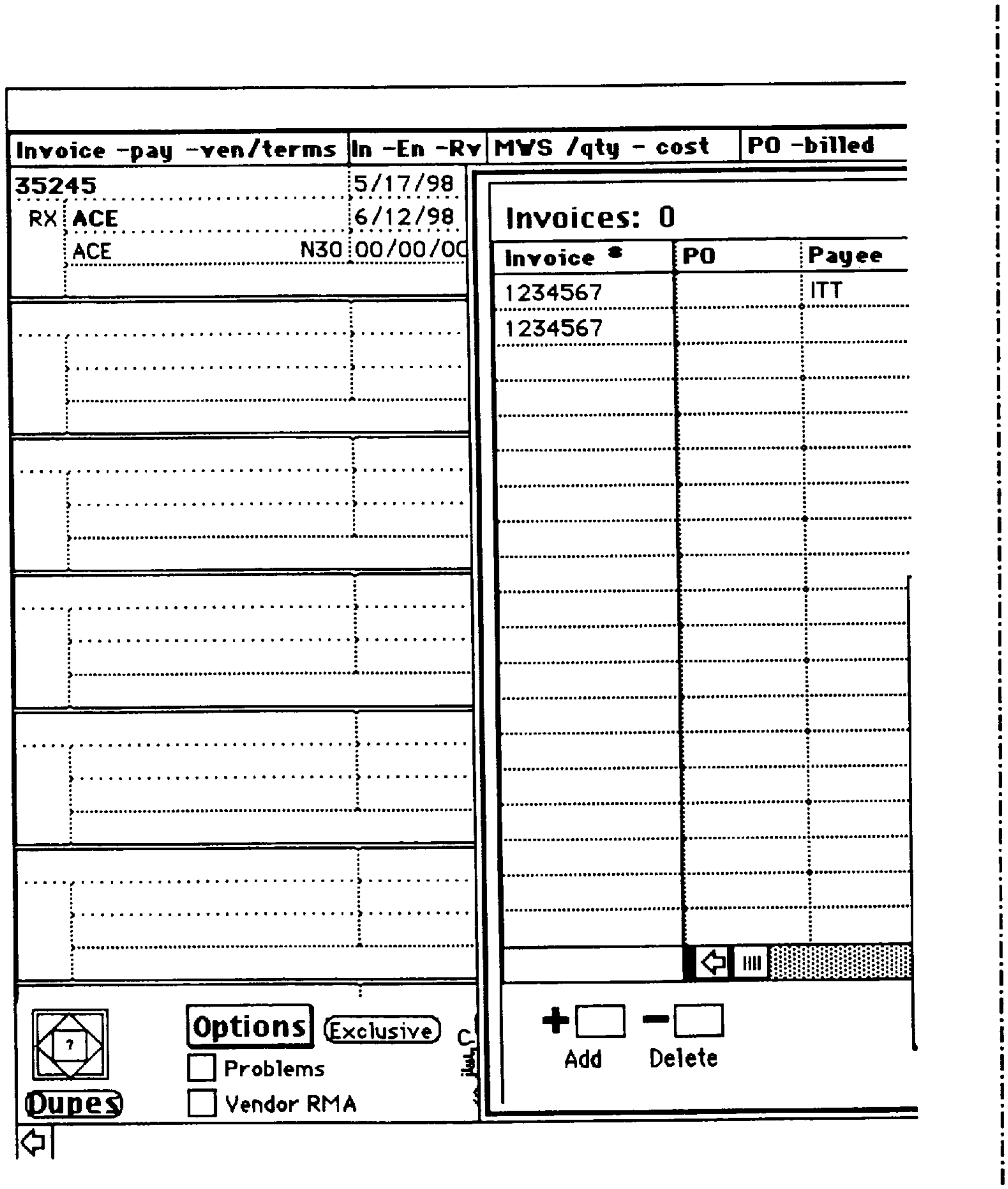
Figure 122B:
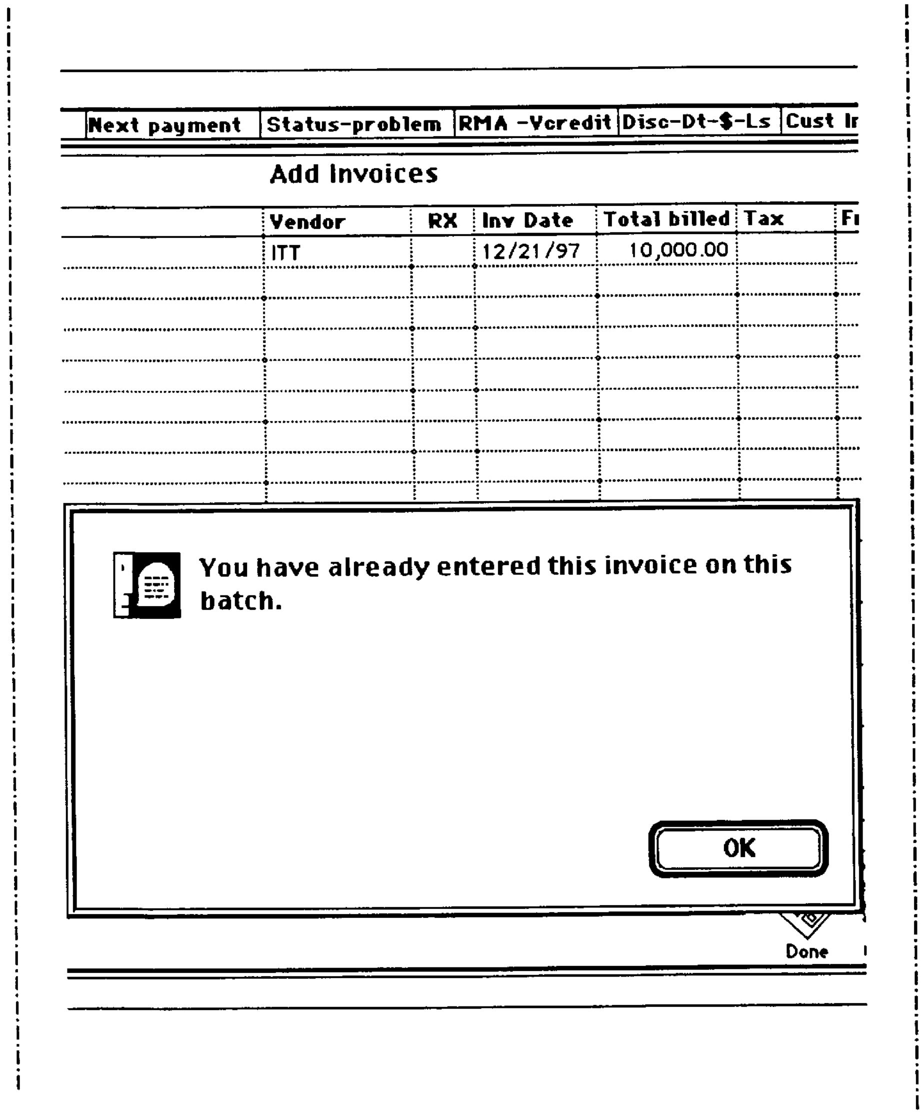
Figure 122C:
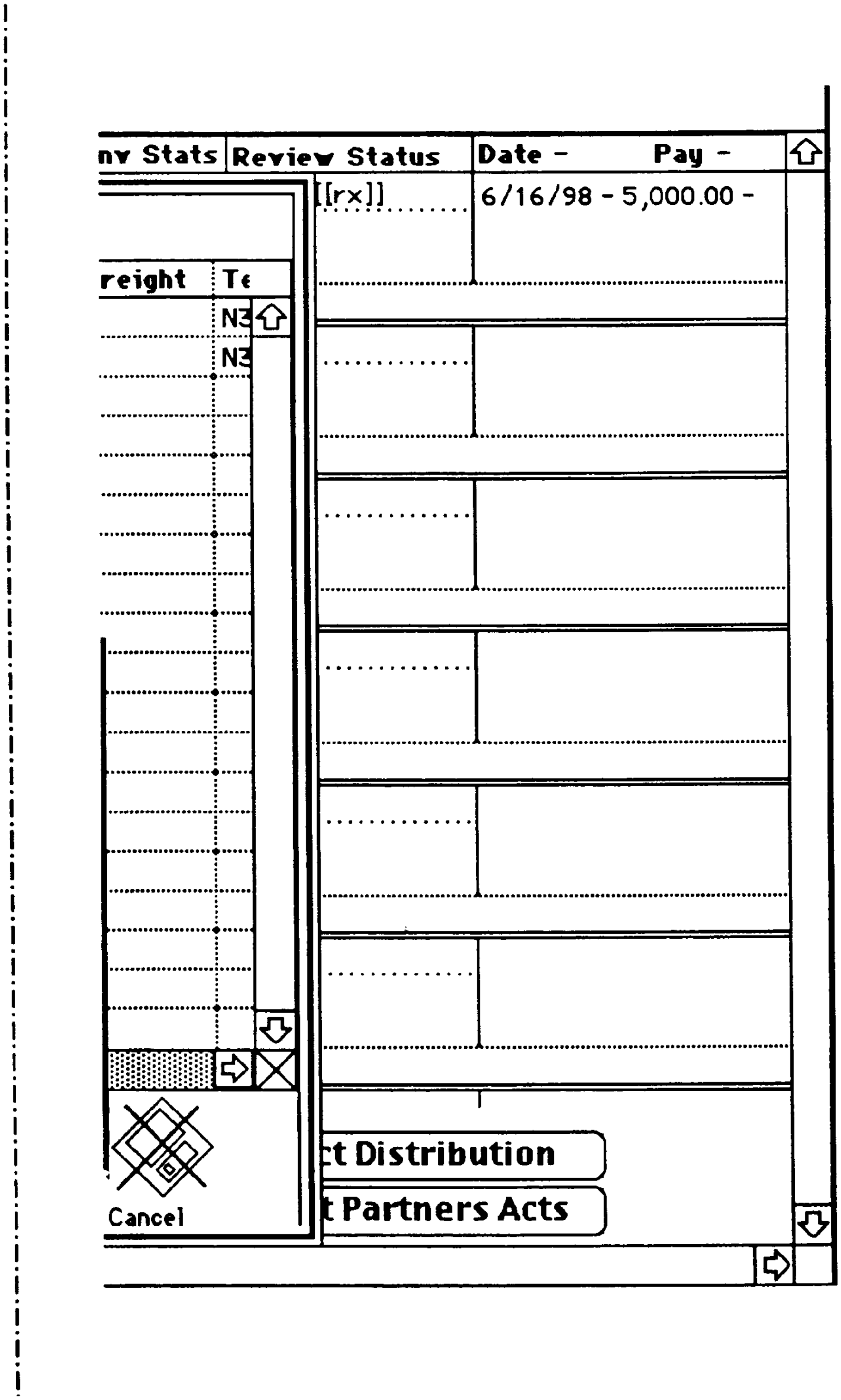
Figure 123:
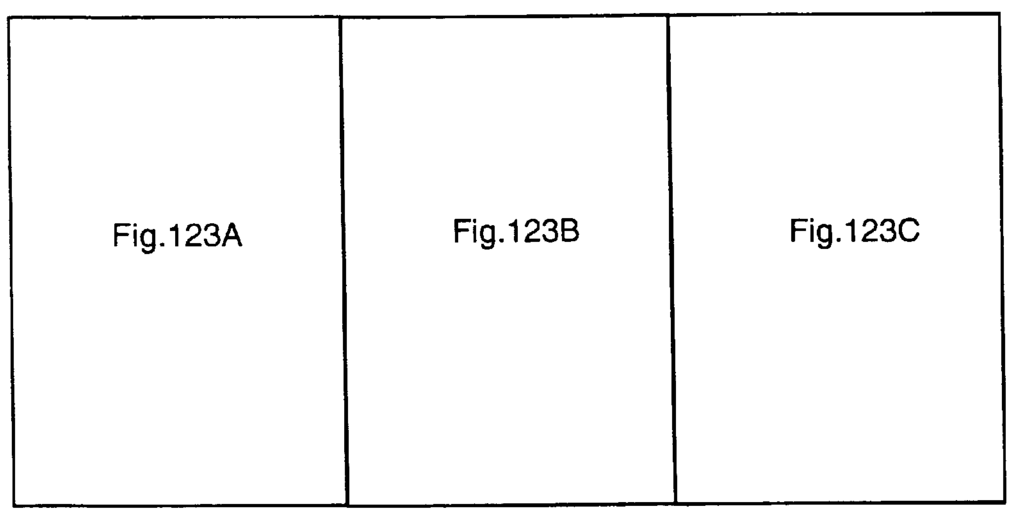
Figure 123A:
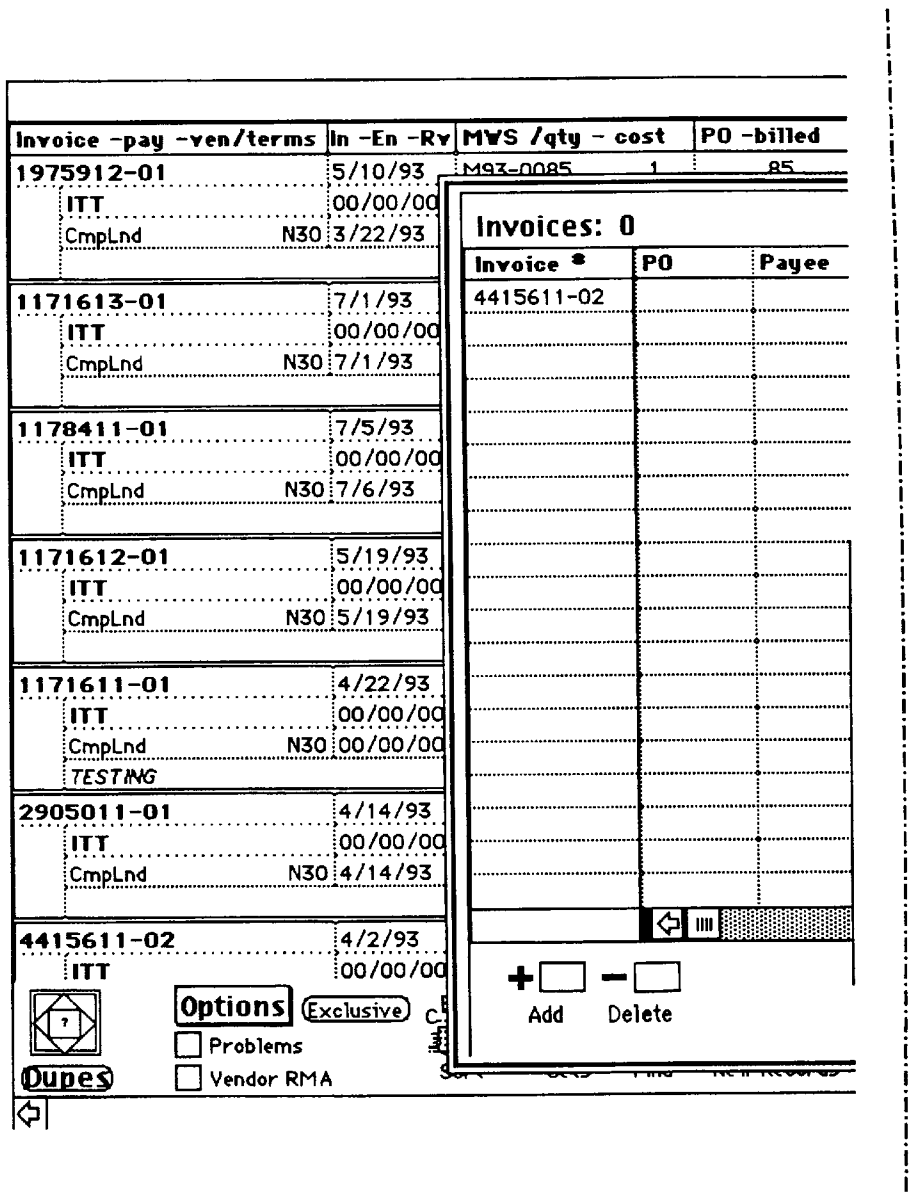
Figure 123B:
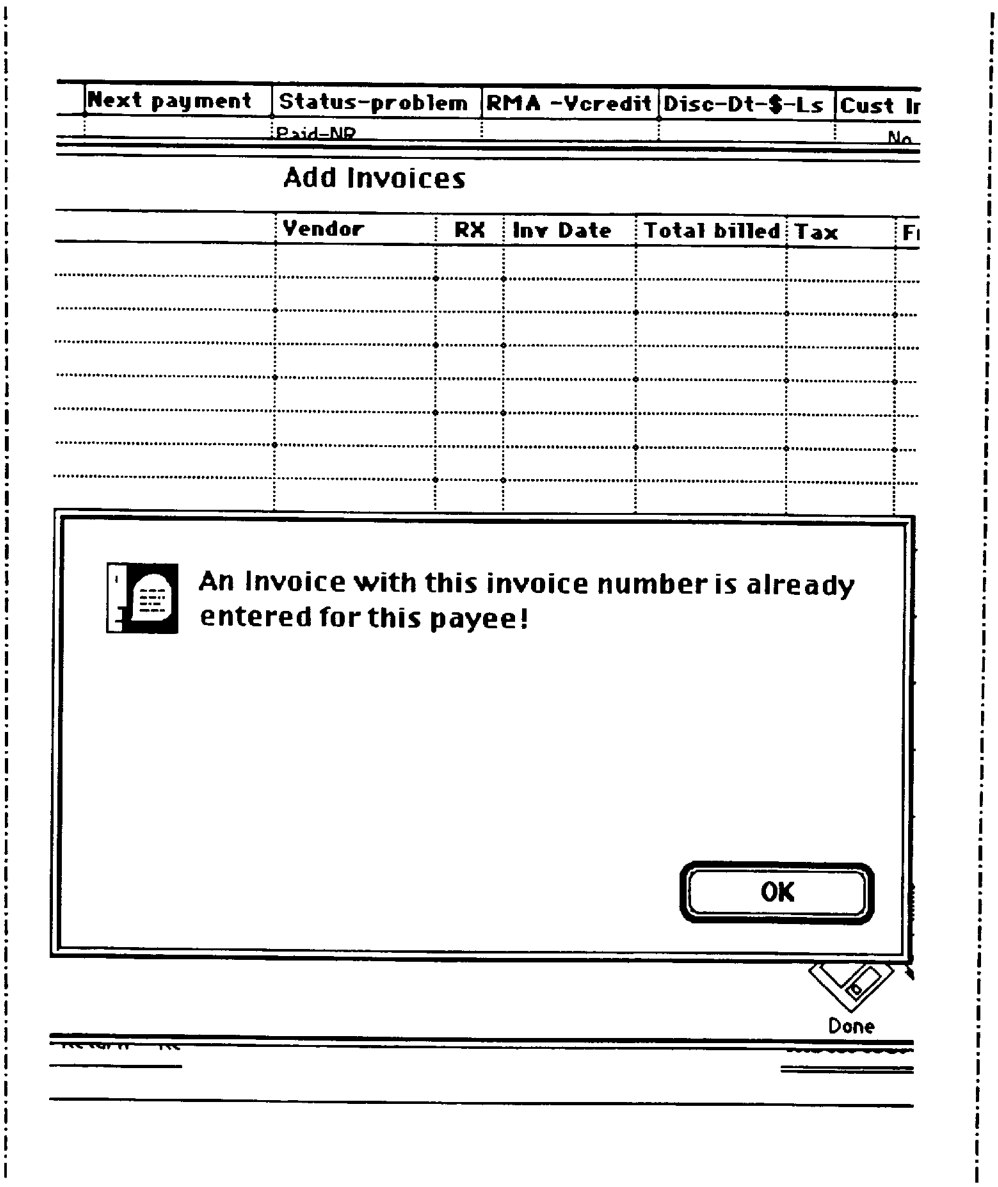
Figure 123C:
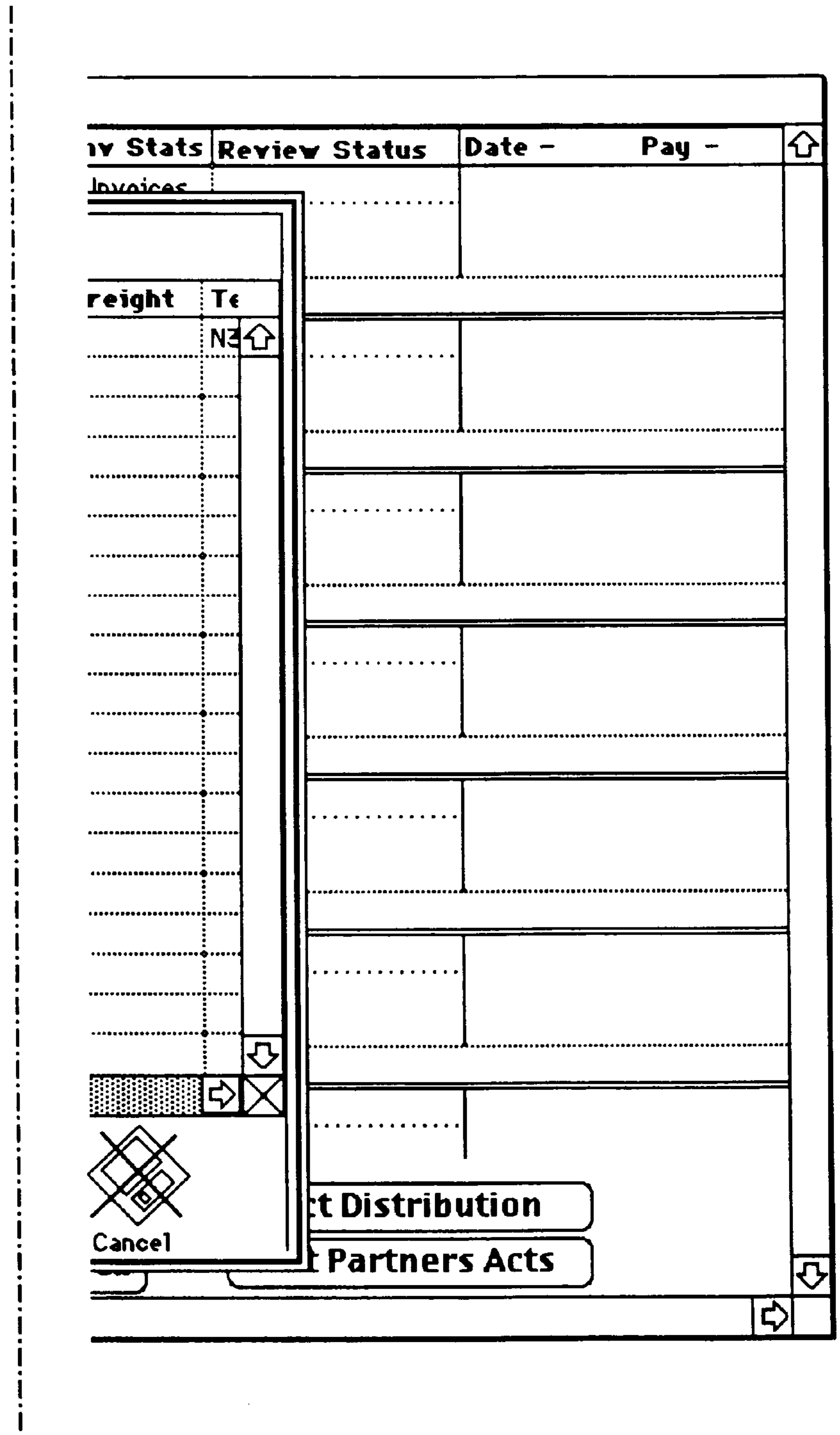
Figure 124:
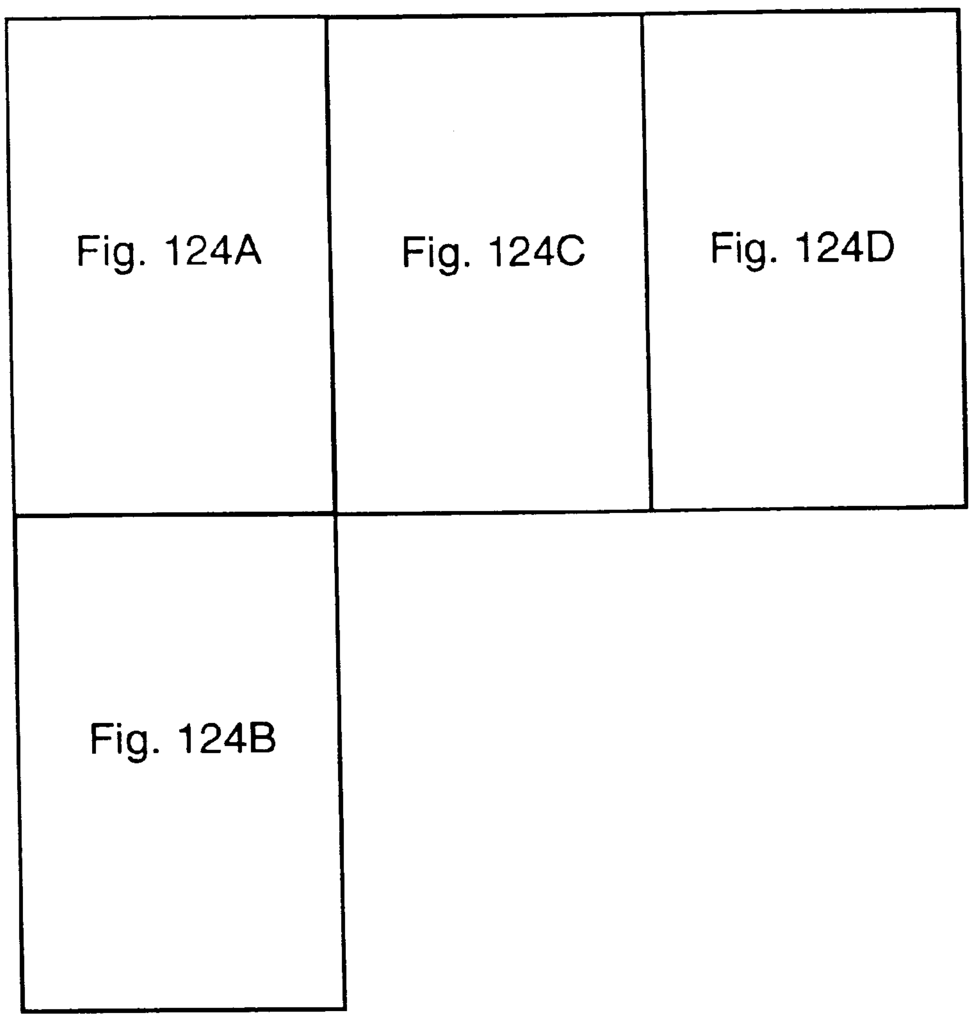
Figure 124A:
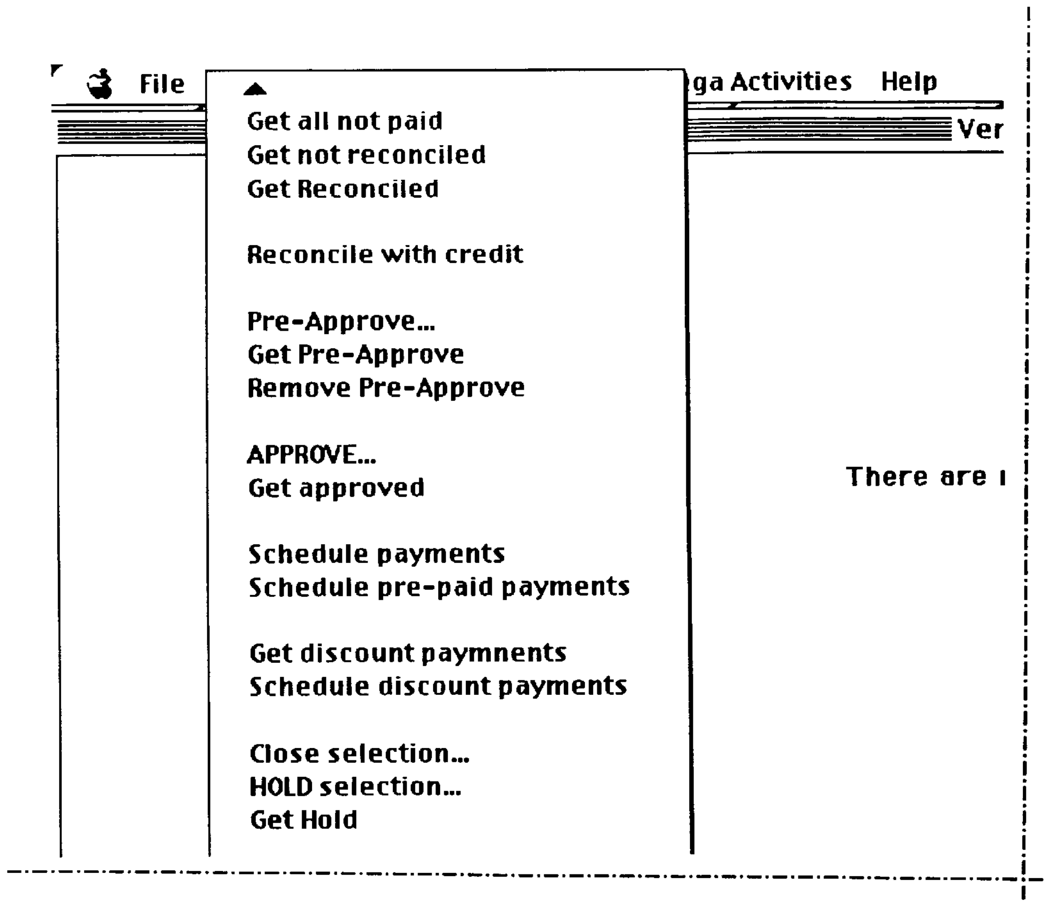
Figure 124B:
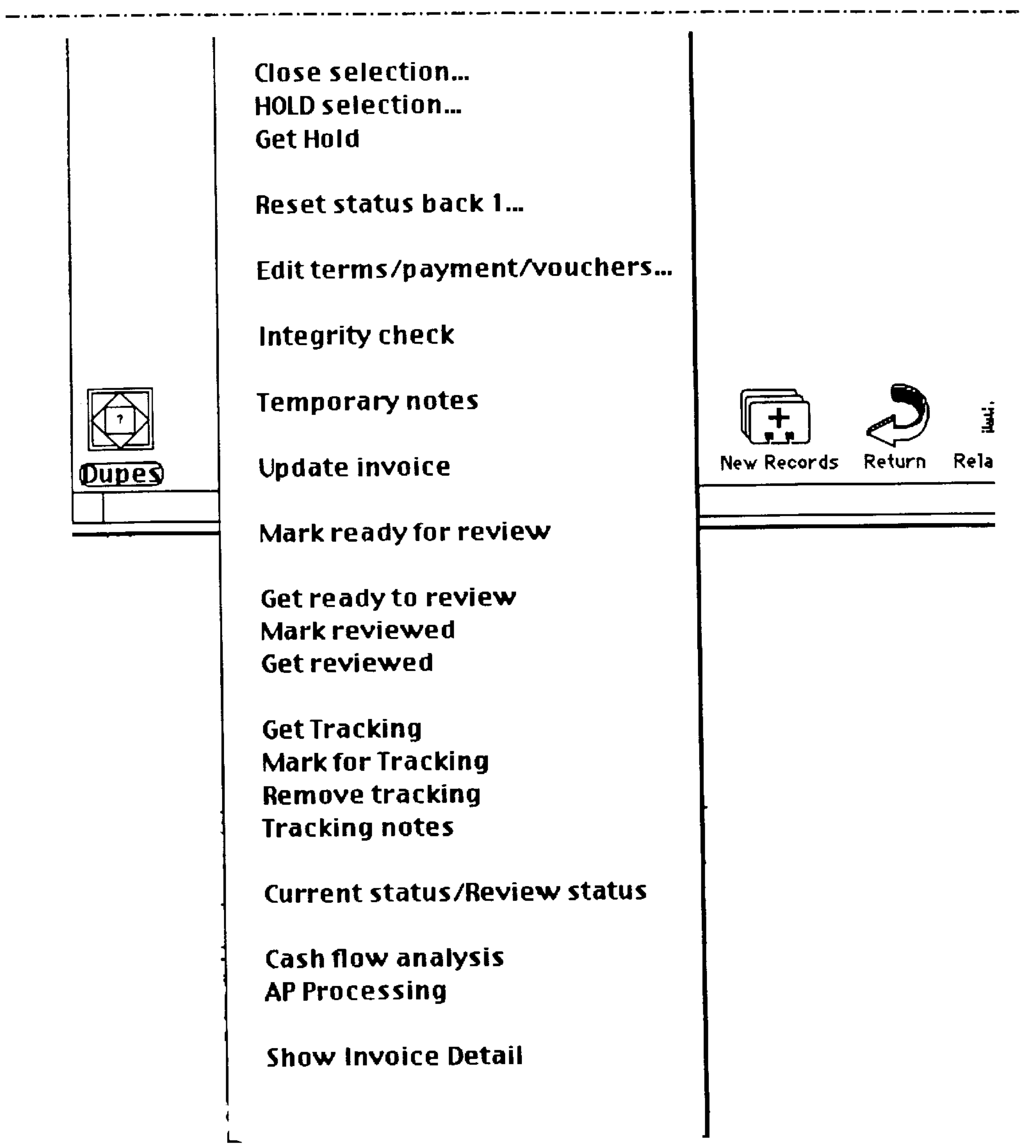
Figure 124C:
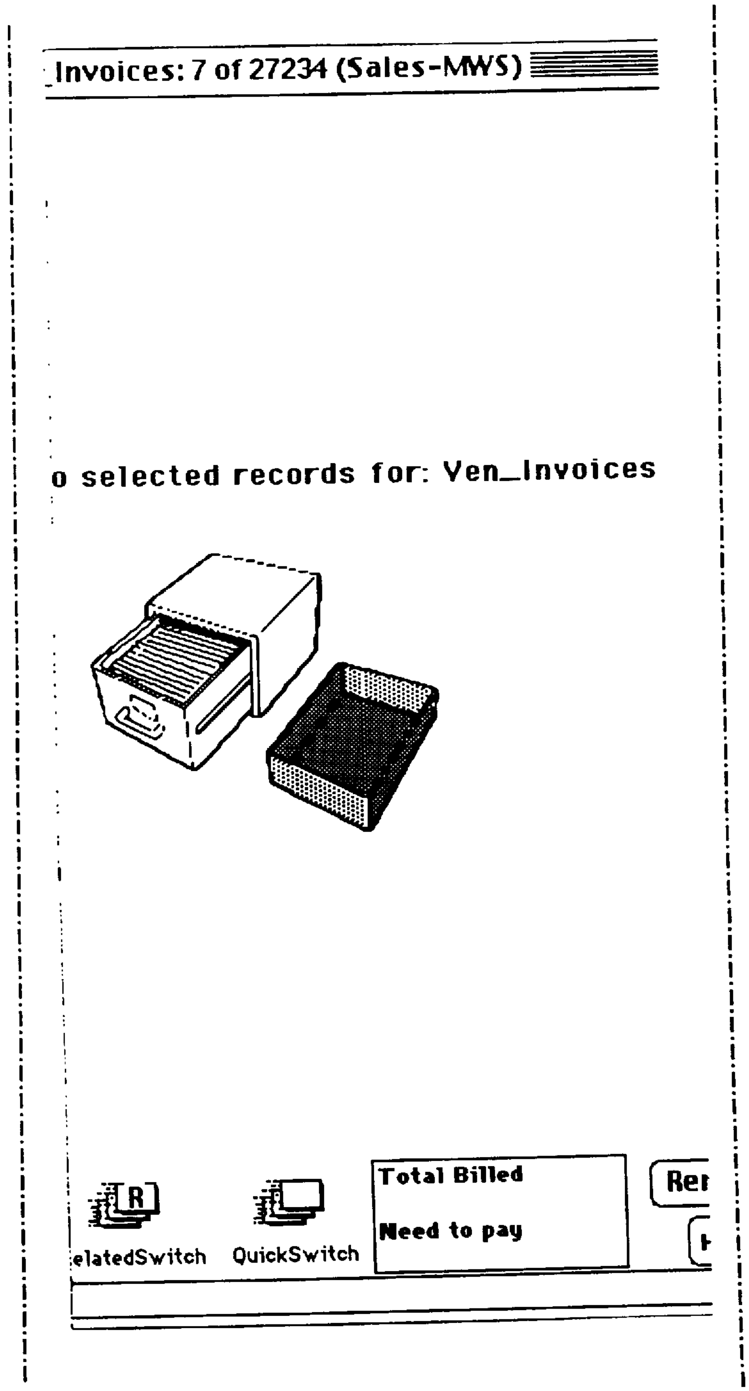
Figure 124D:
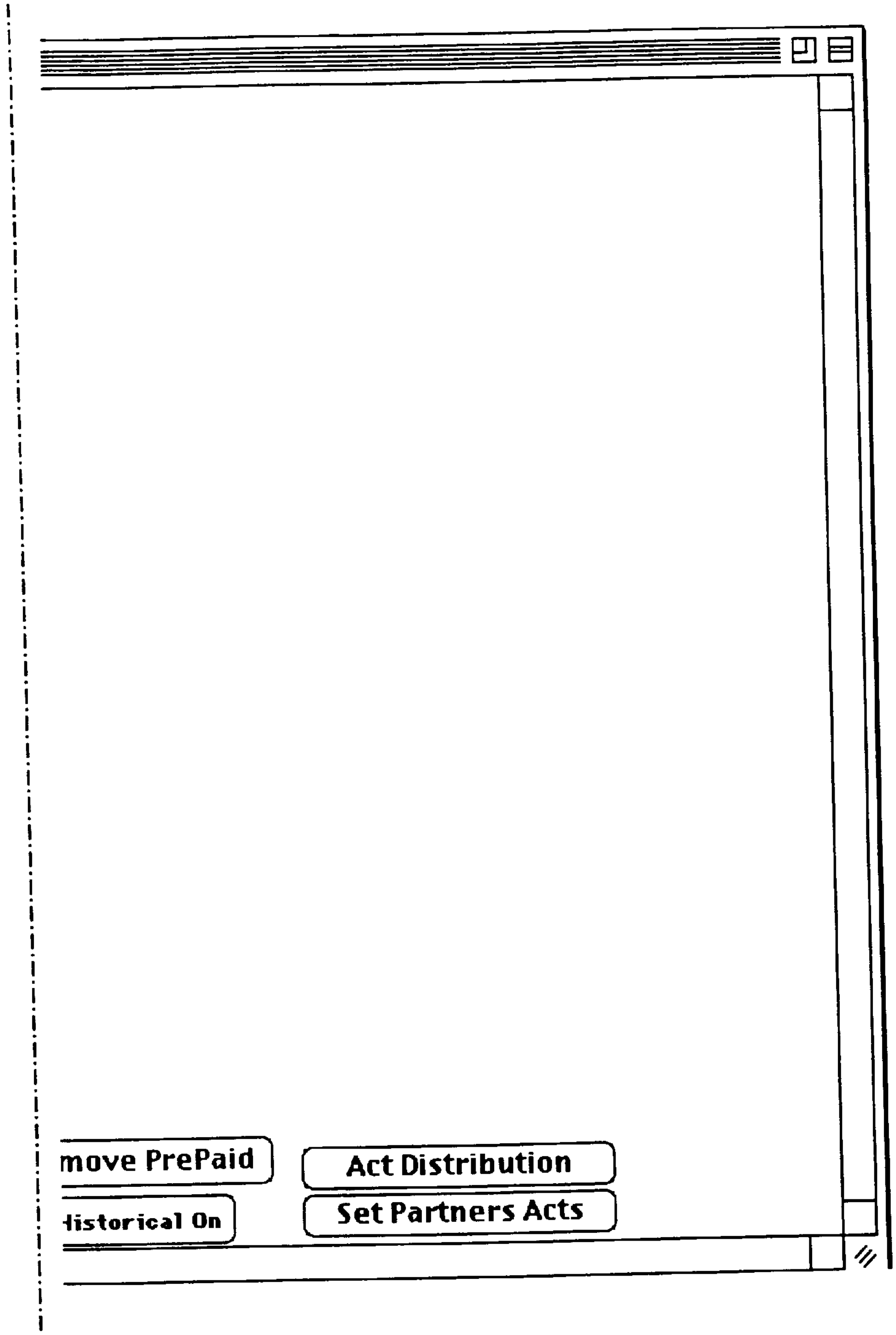
Figure 125:
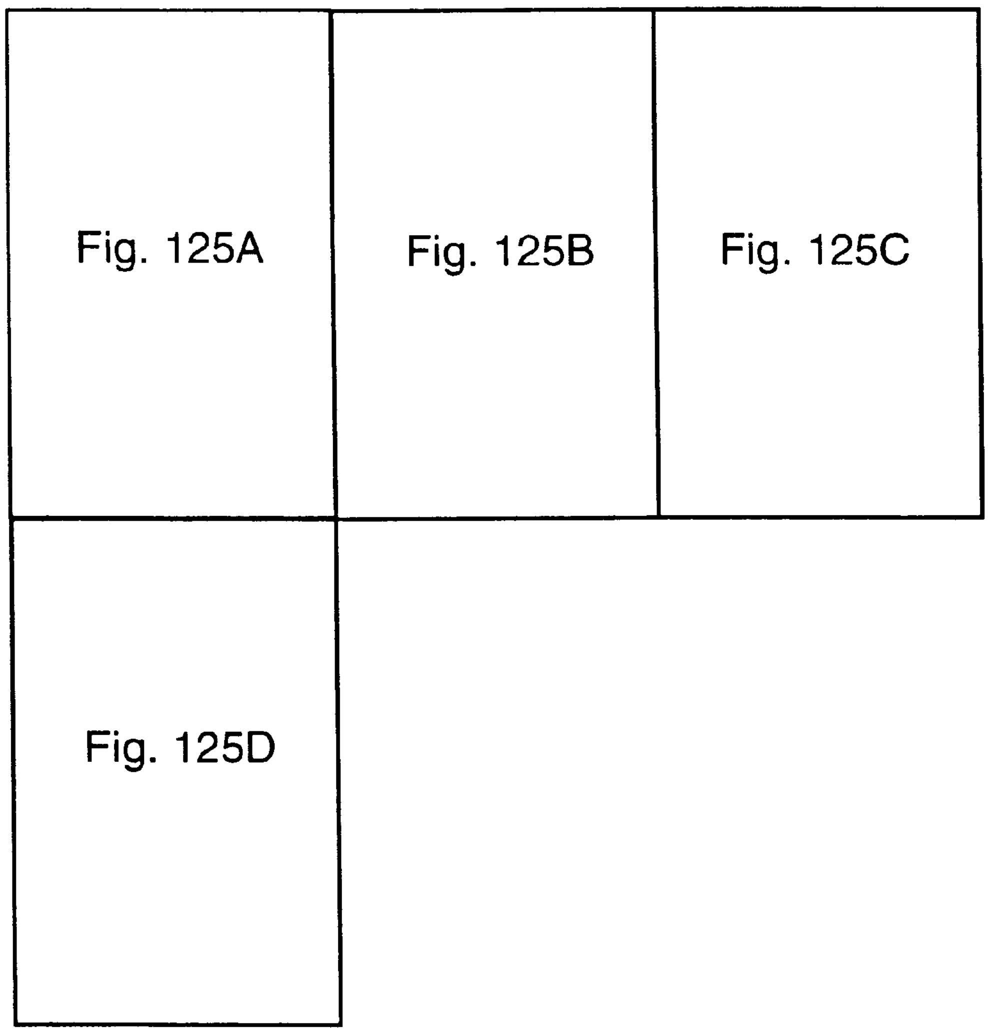
Figure 125A:
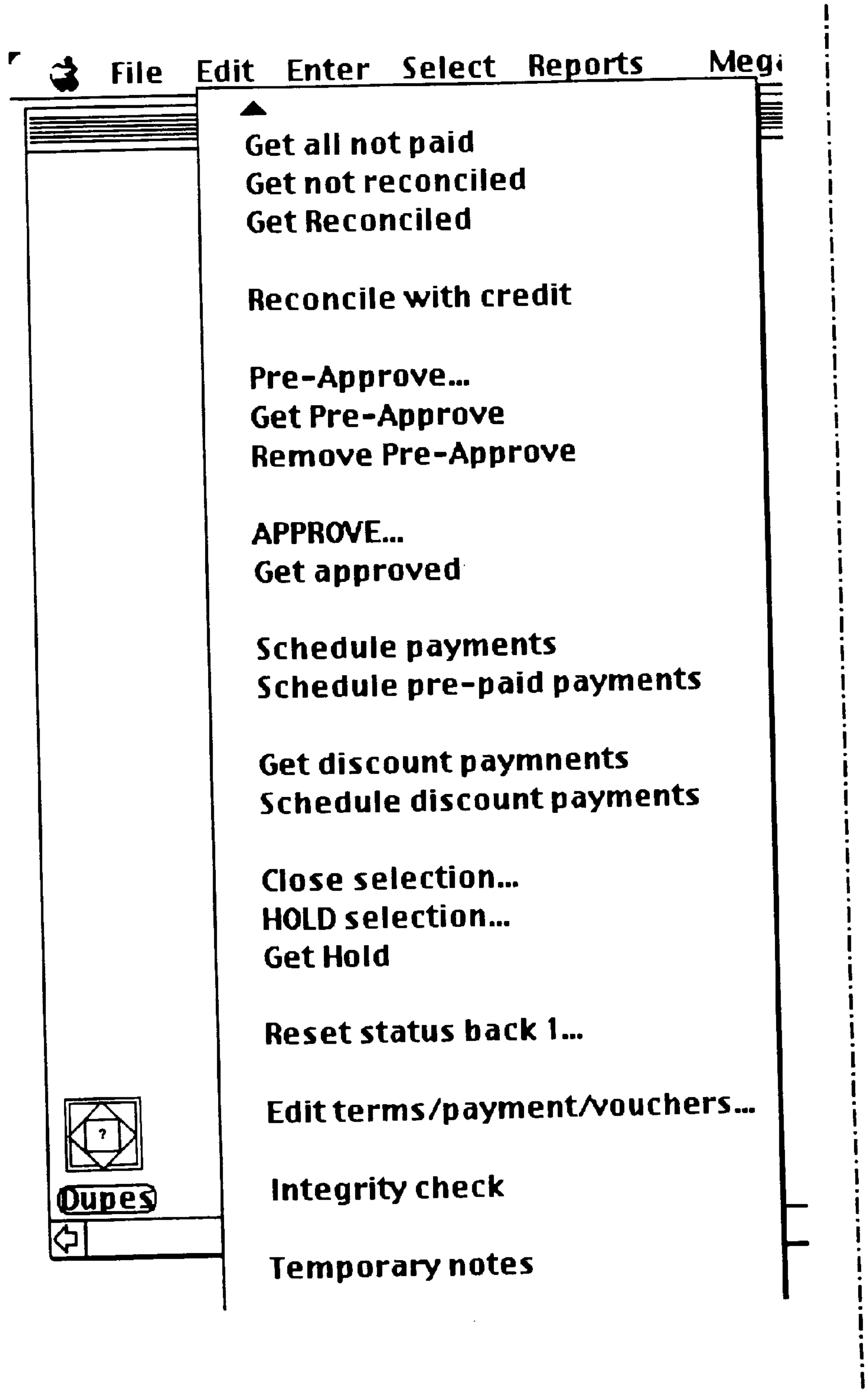
Figure 125B:
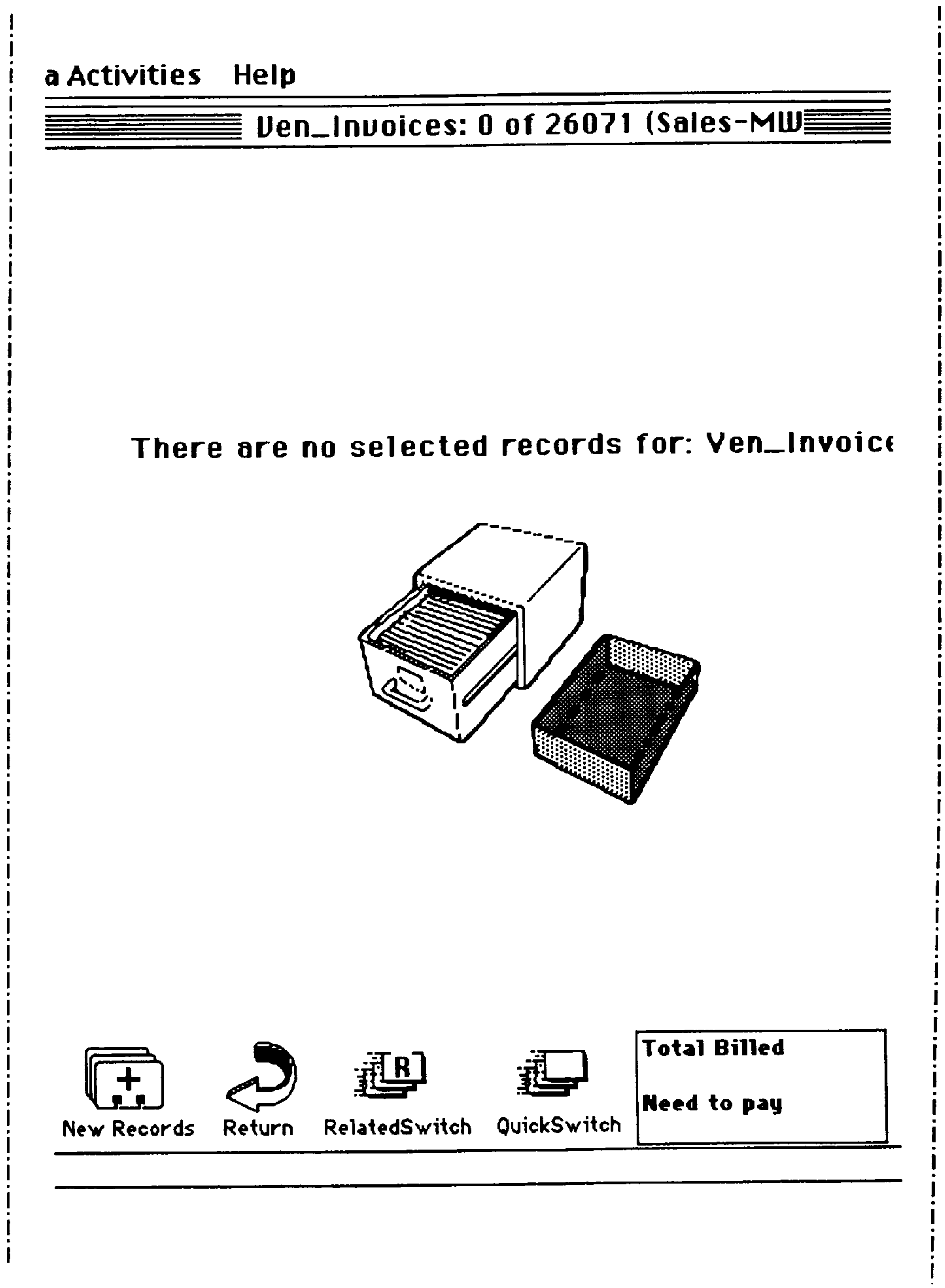
Figure 125C:
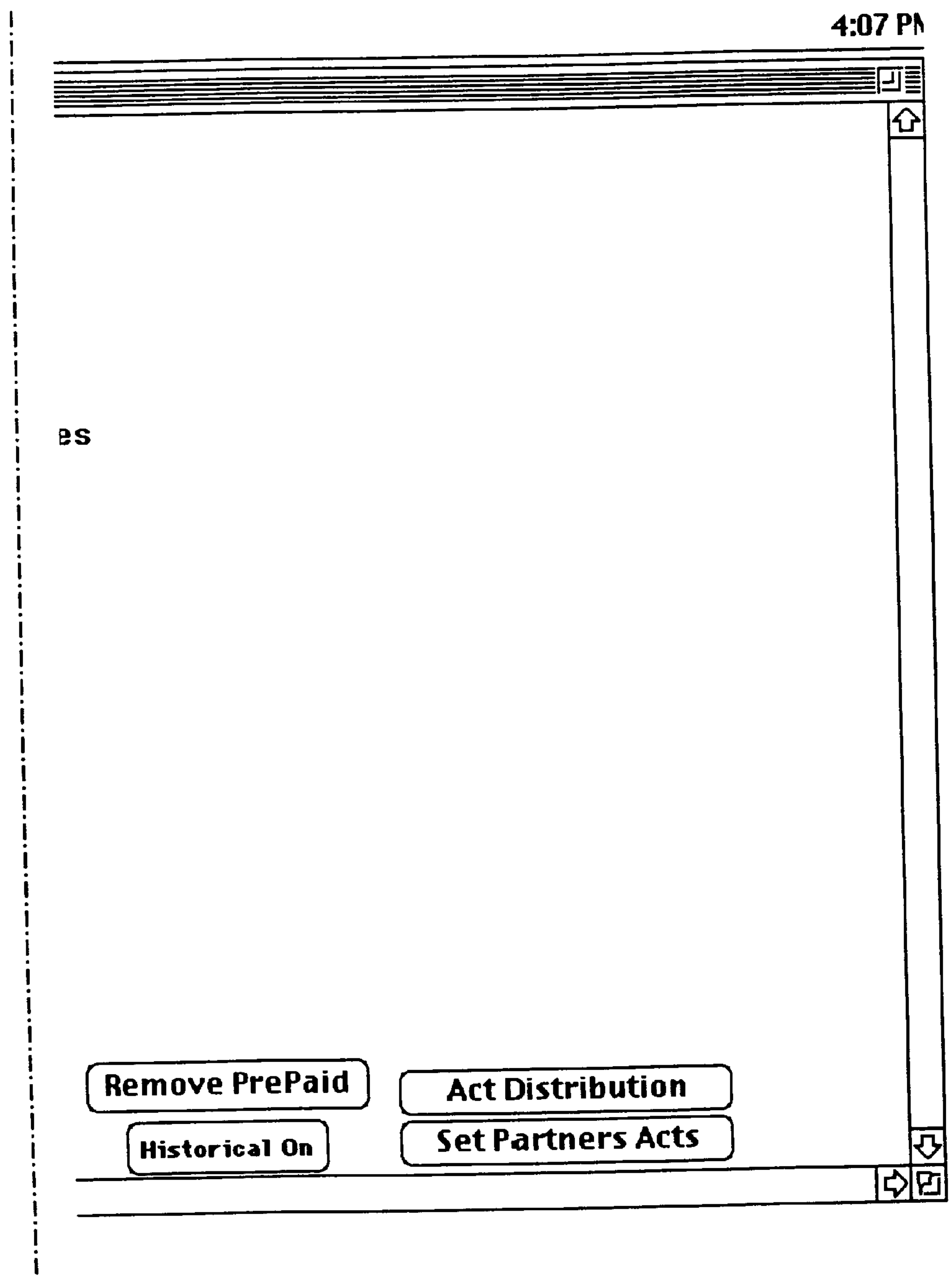
Figure 126:
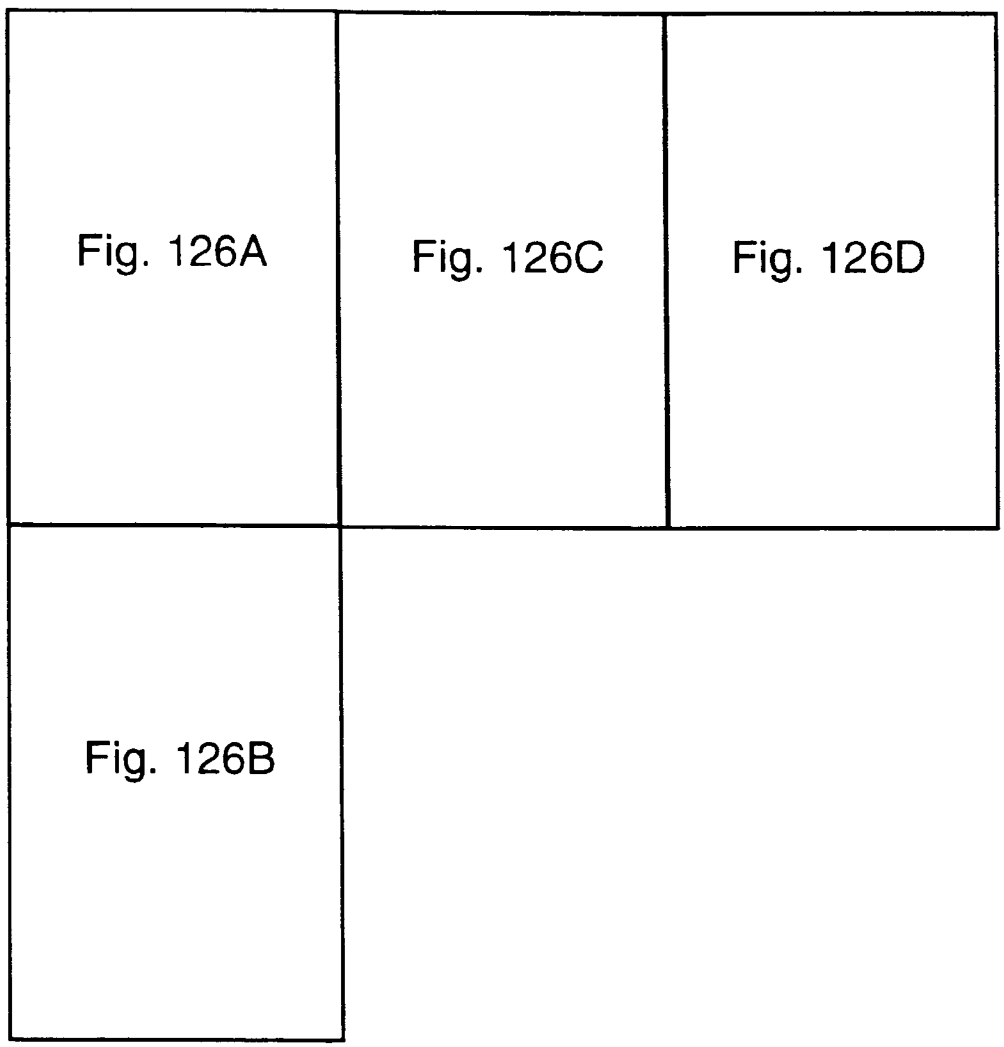
Figure 126A:
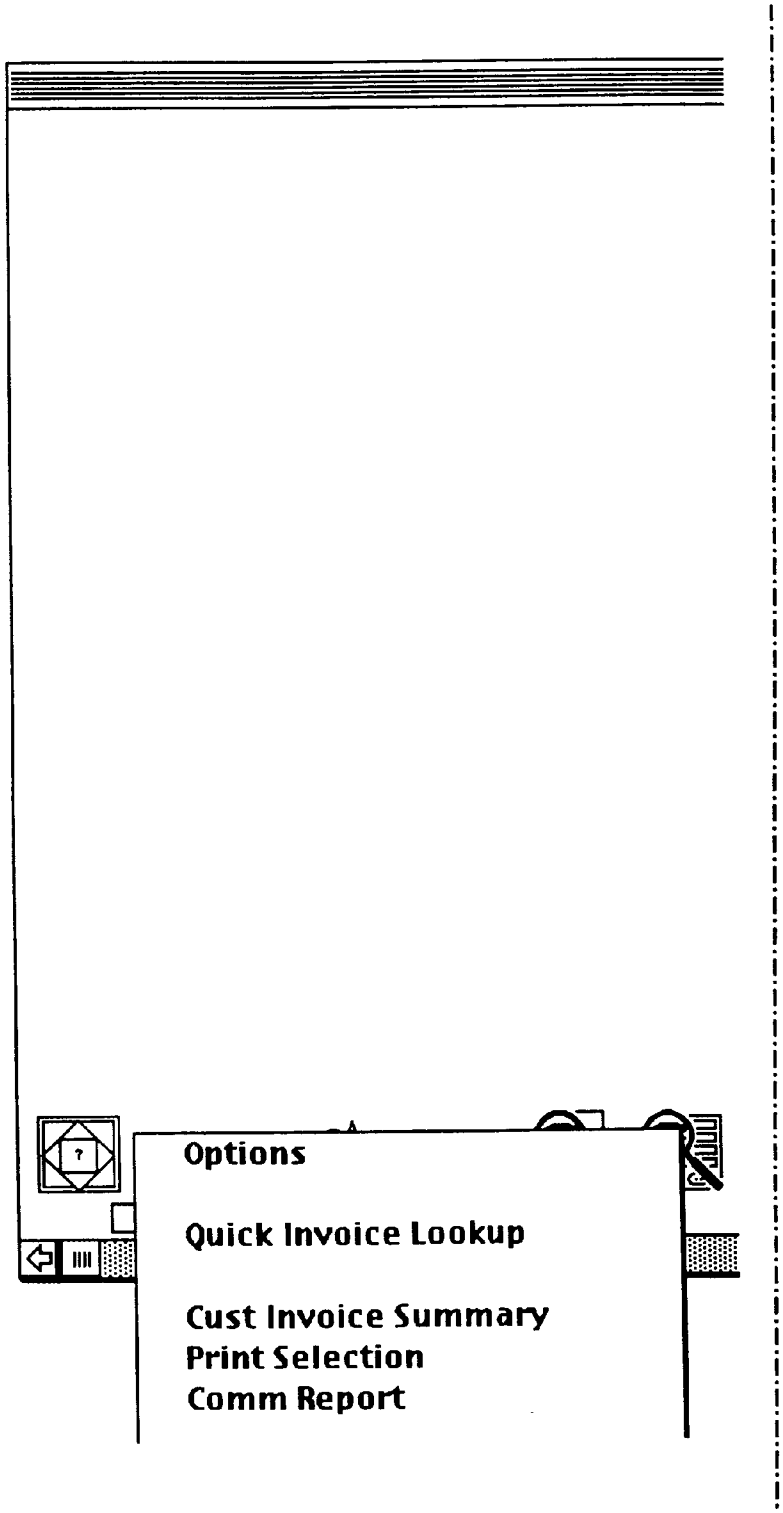
Figure 126C:
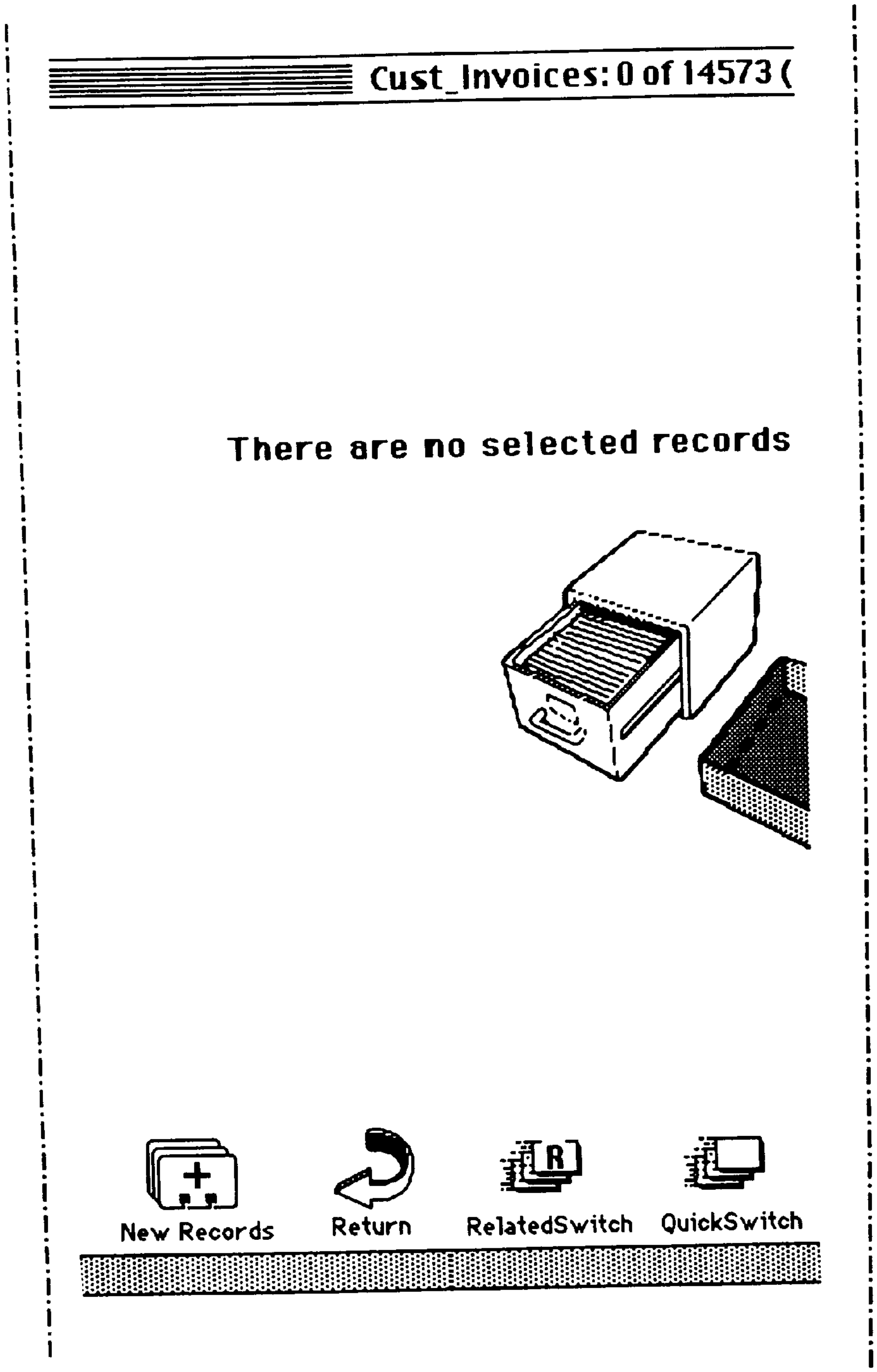
Figure 126D:
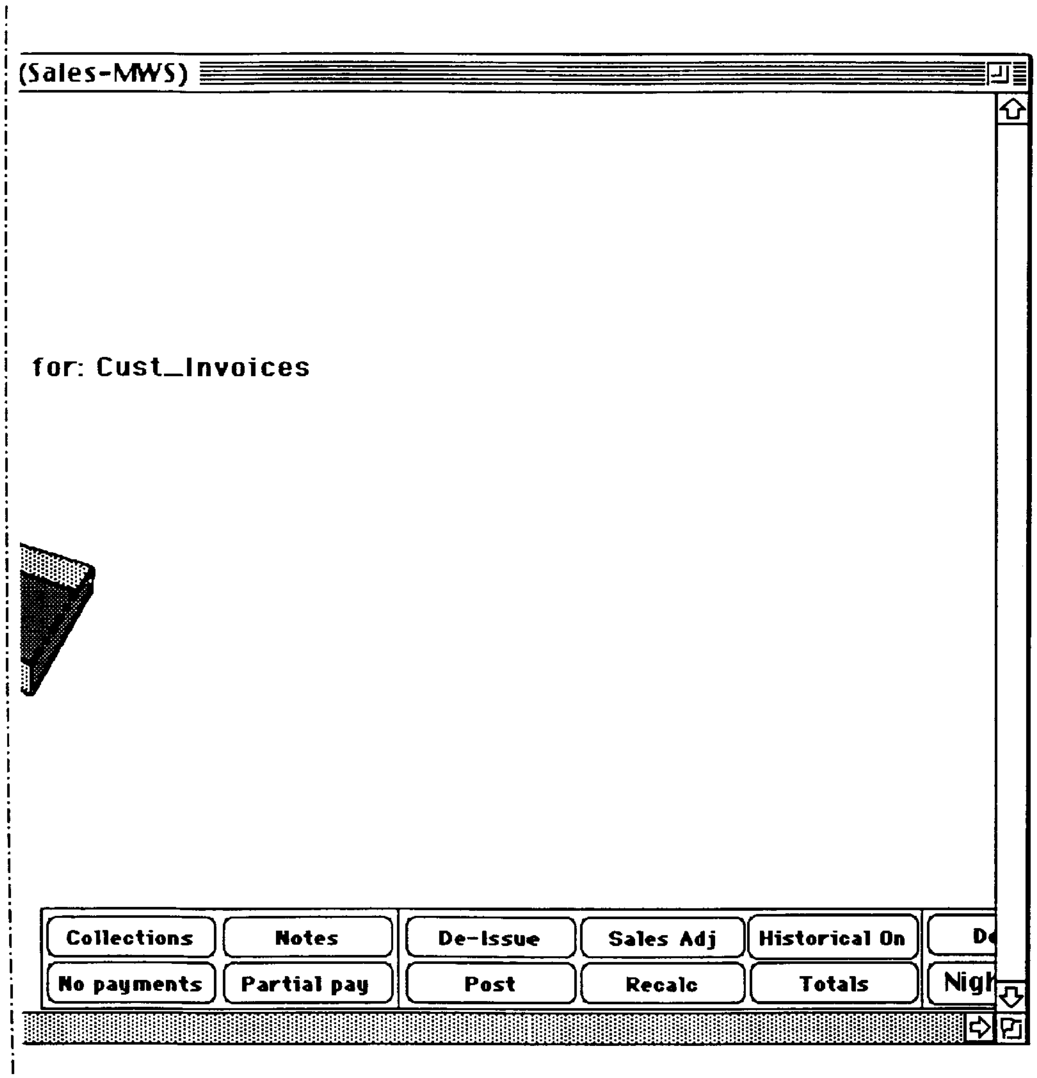
Figure 127:
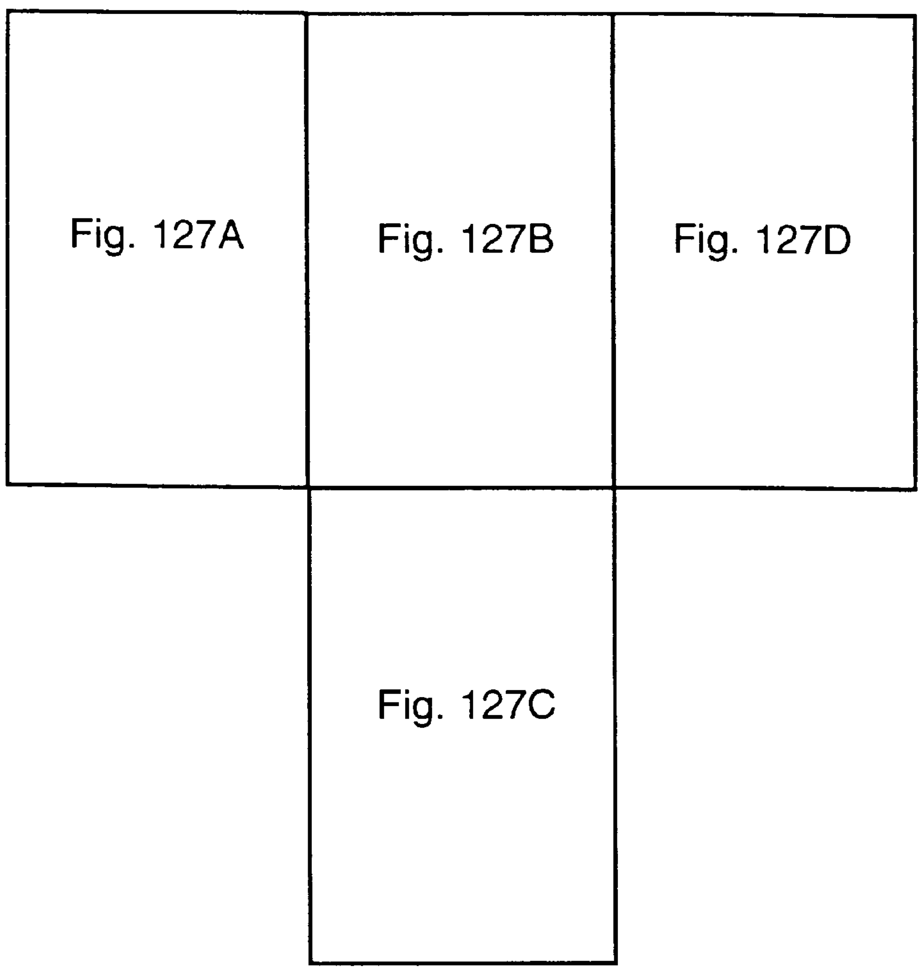
Figure 127A:
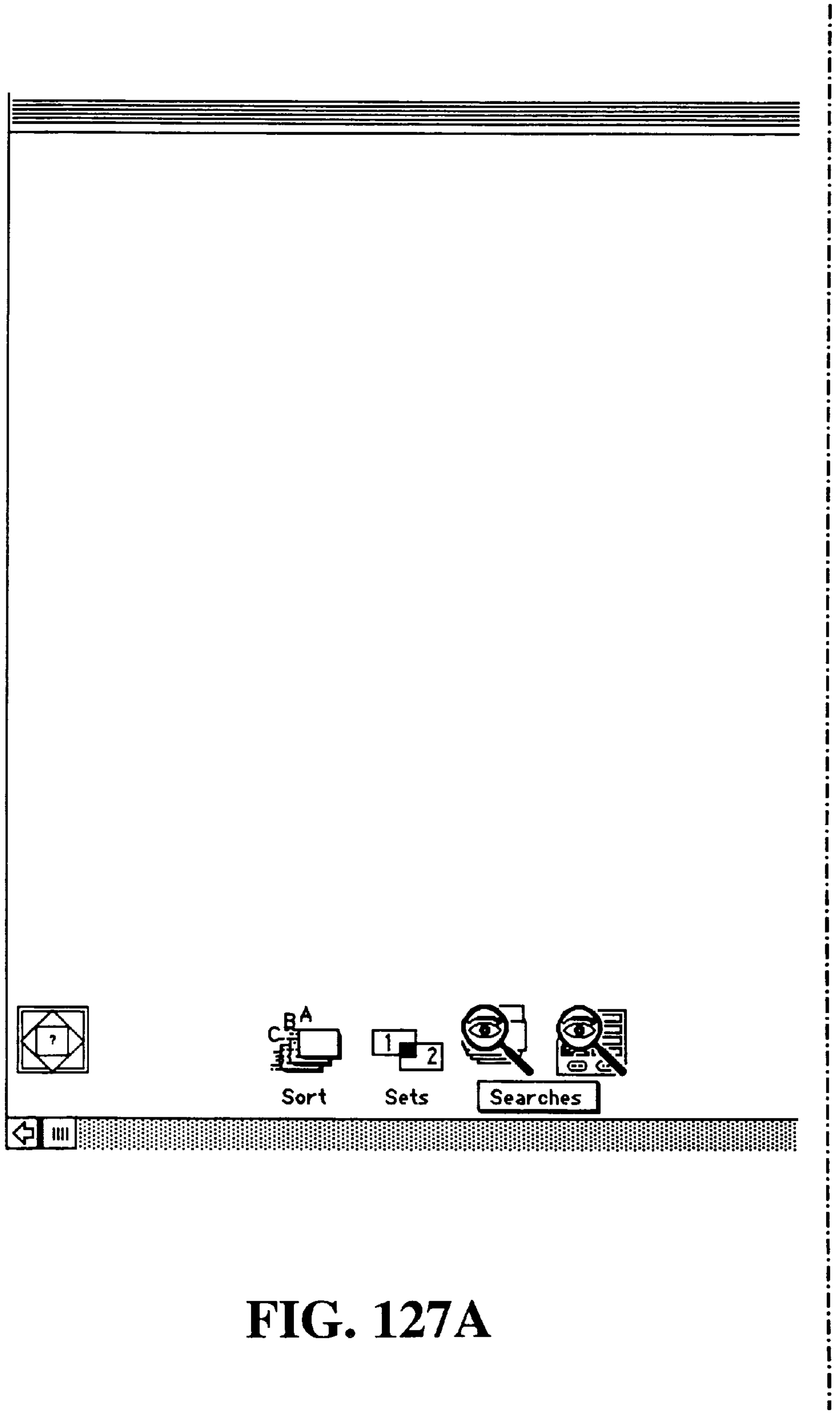
Figure 127B:
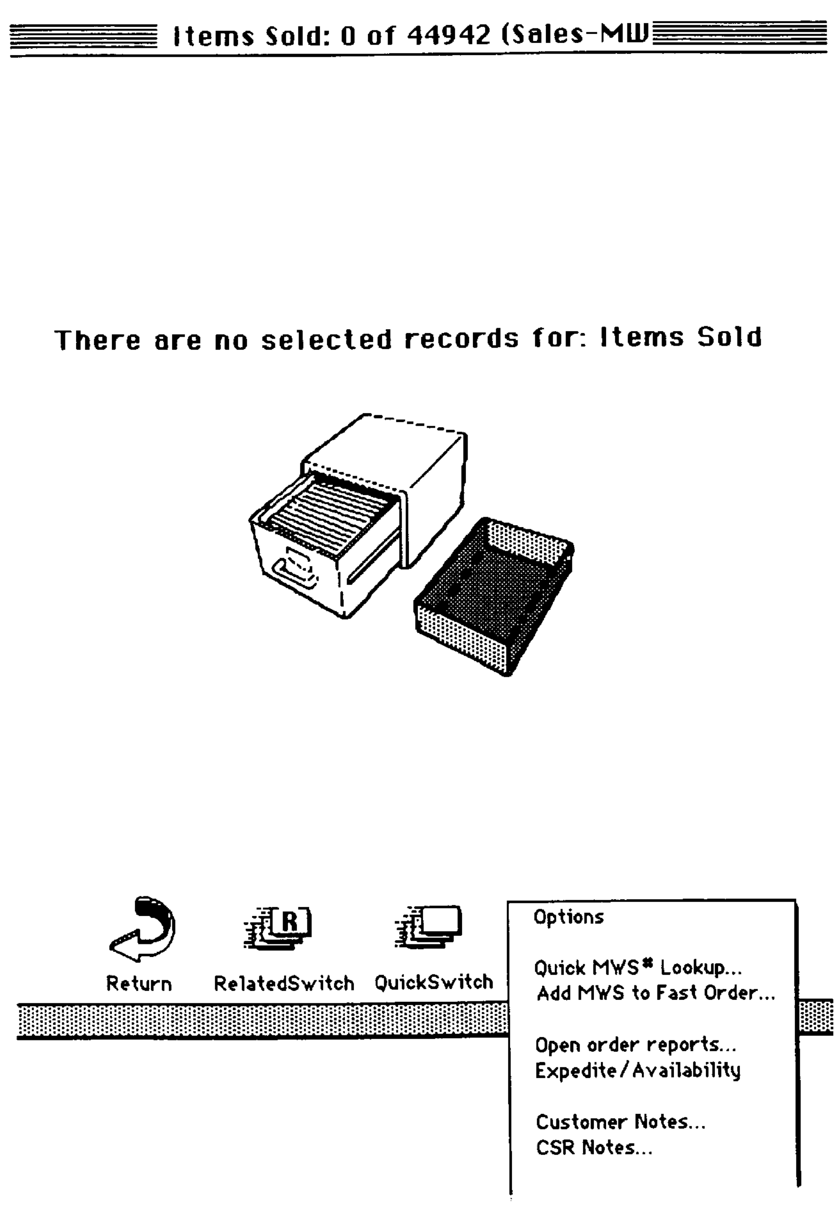
Figure 127C:
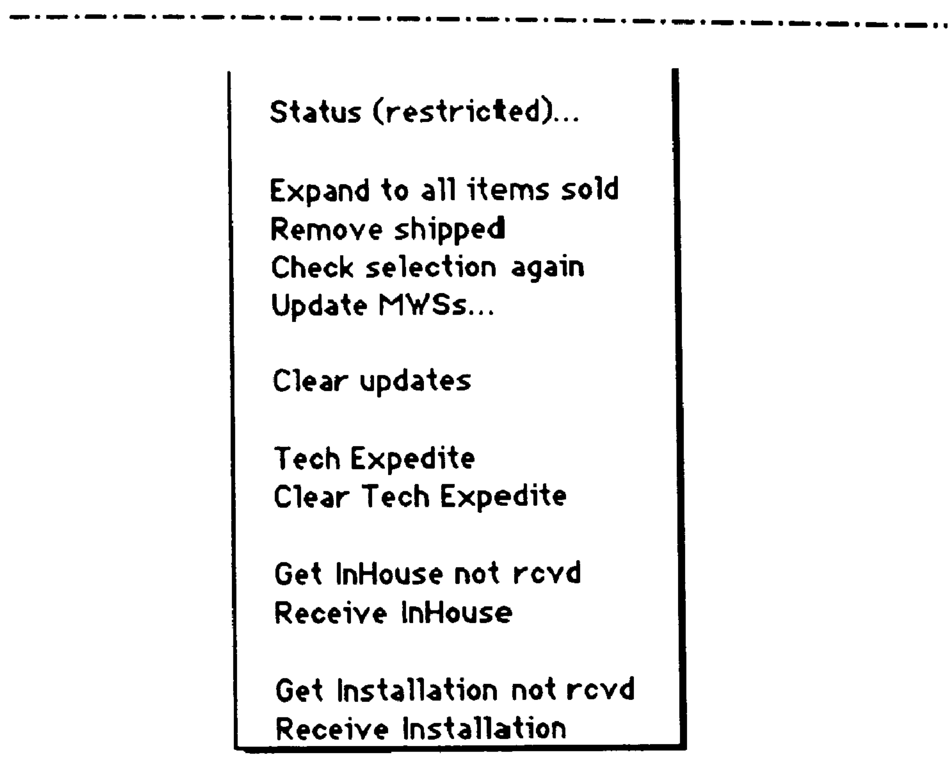
Figure 127D:
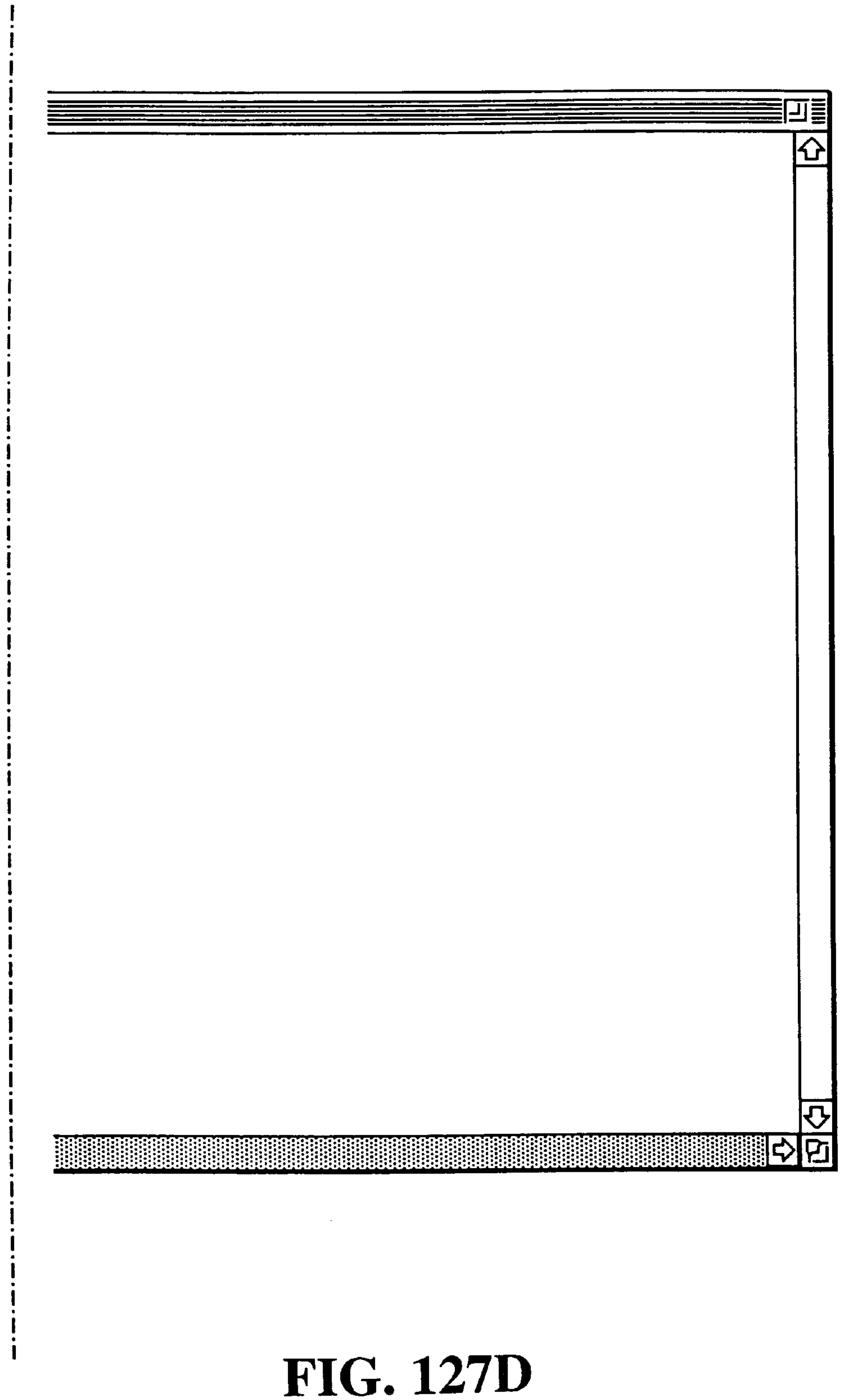
Figure 128:
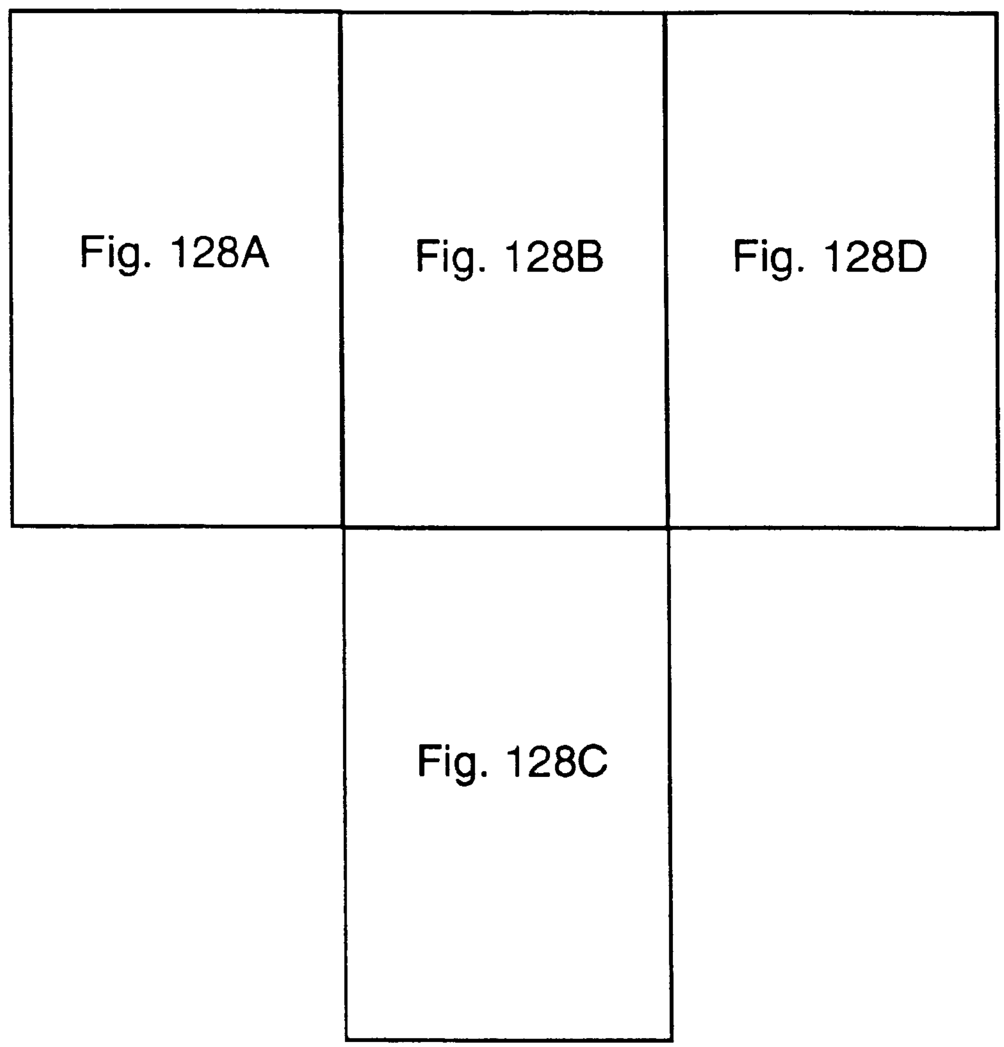
Figure 128A:
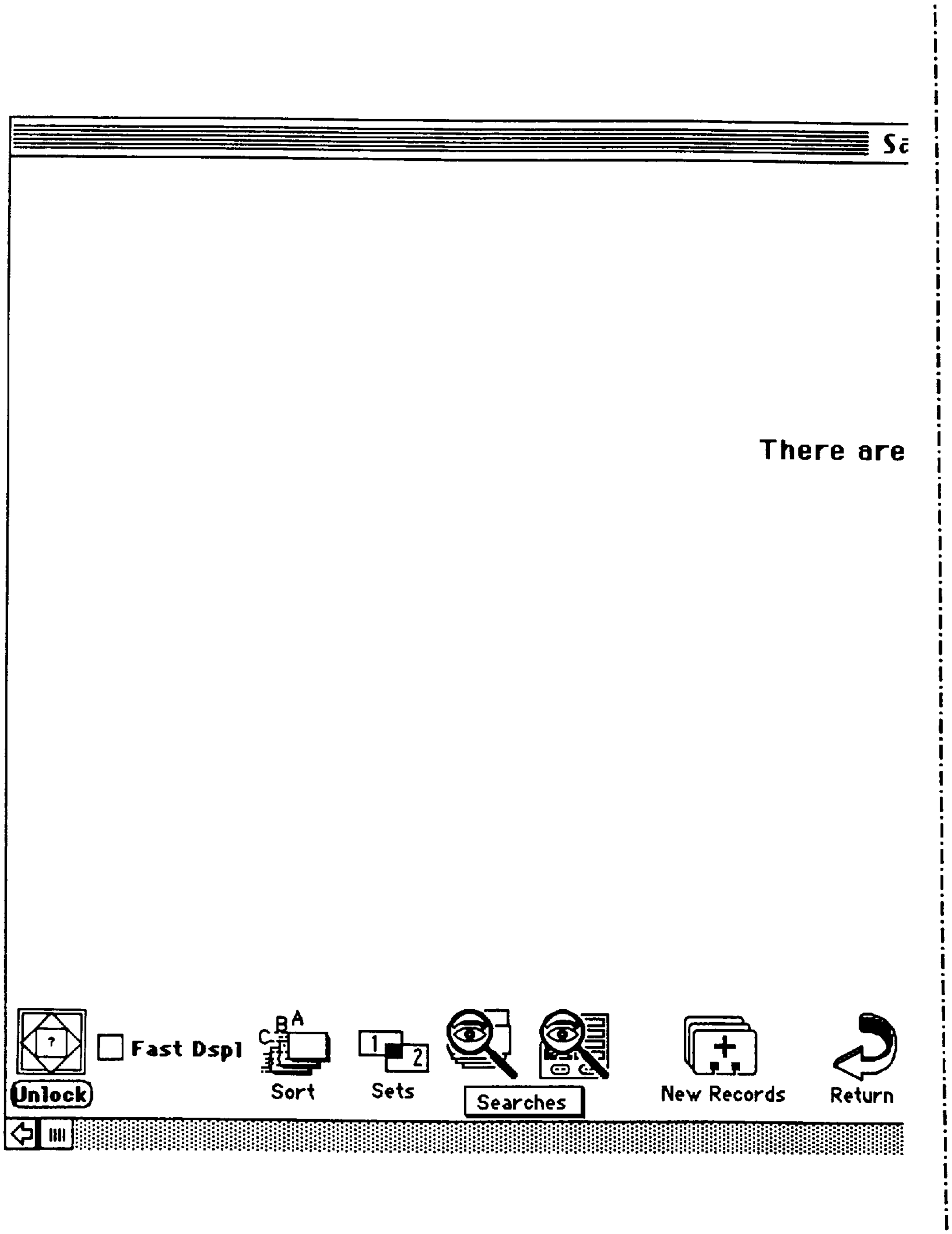
Figure 128B:
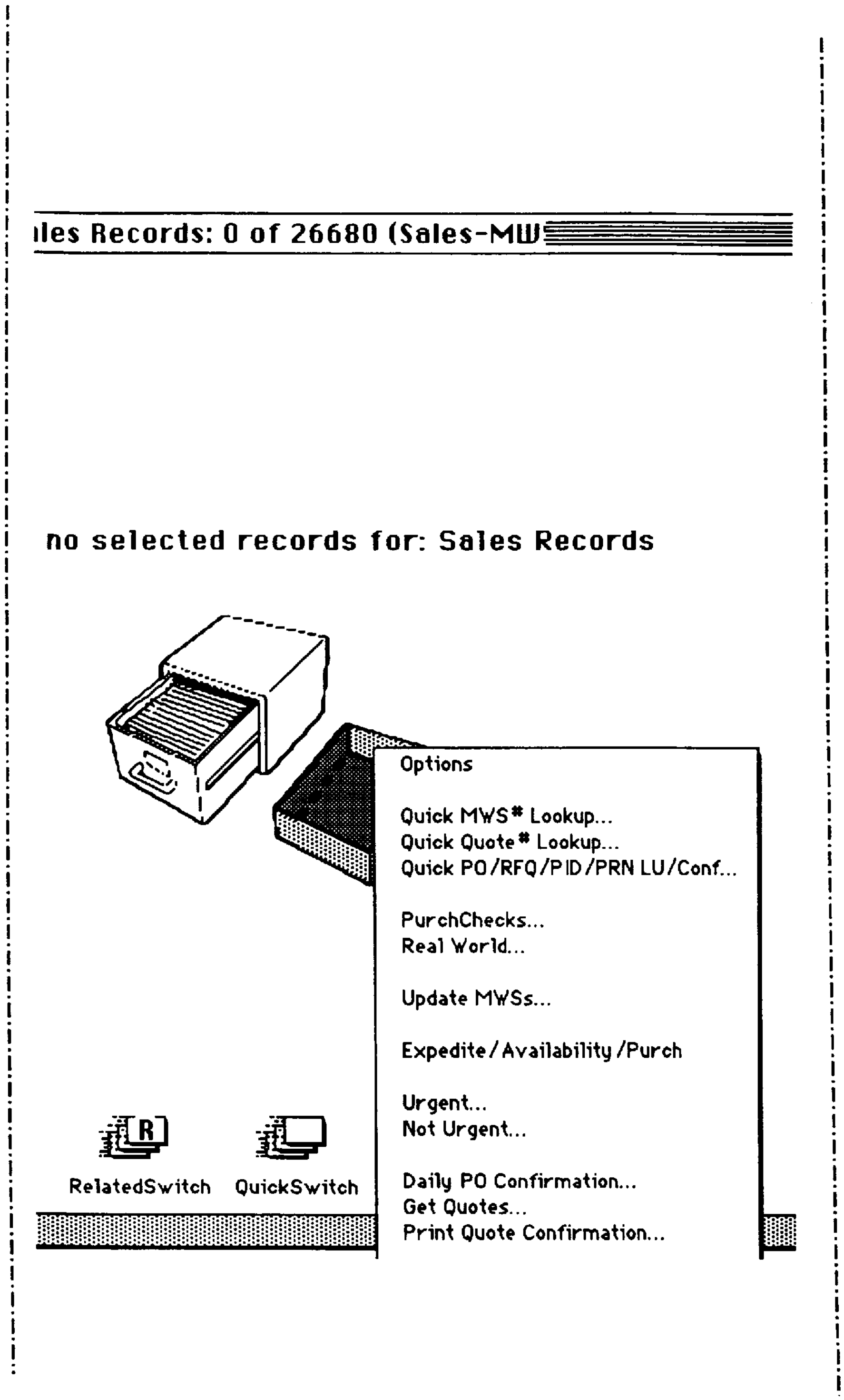
Figure 128C:
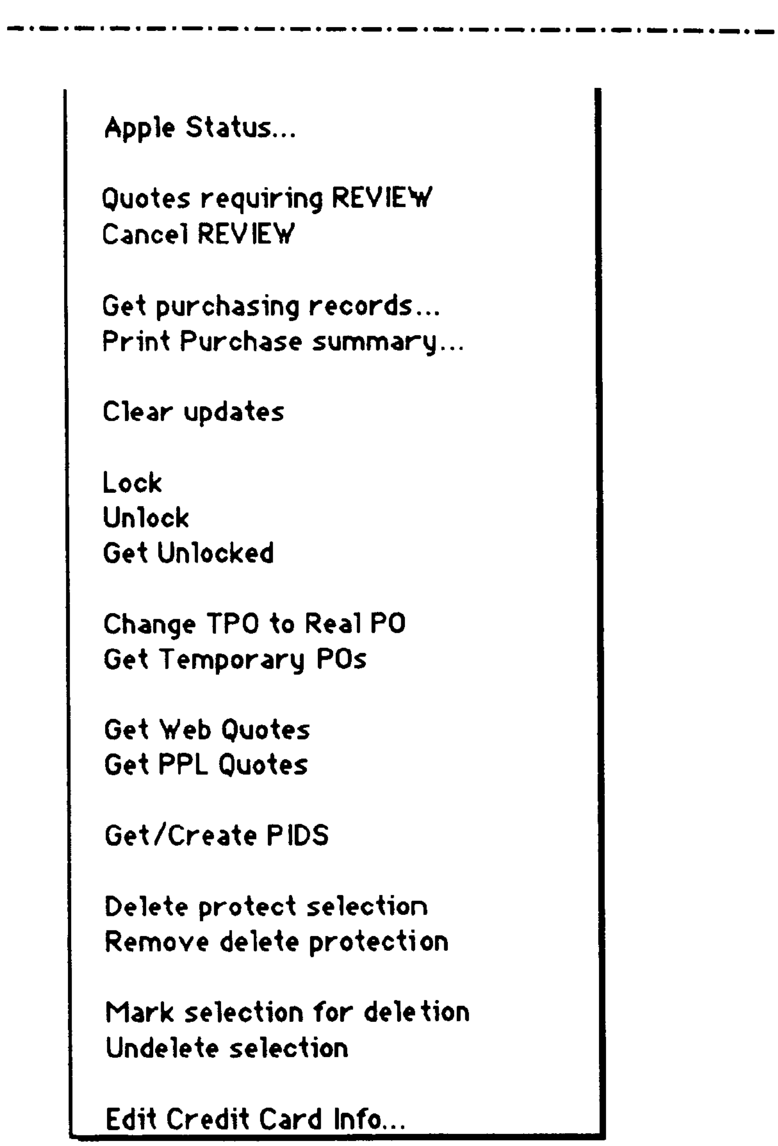
Figure 128D:
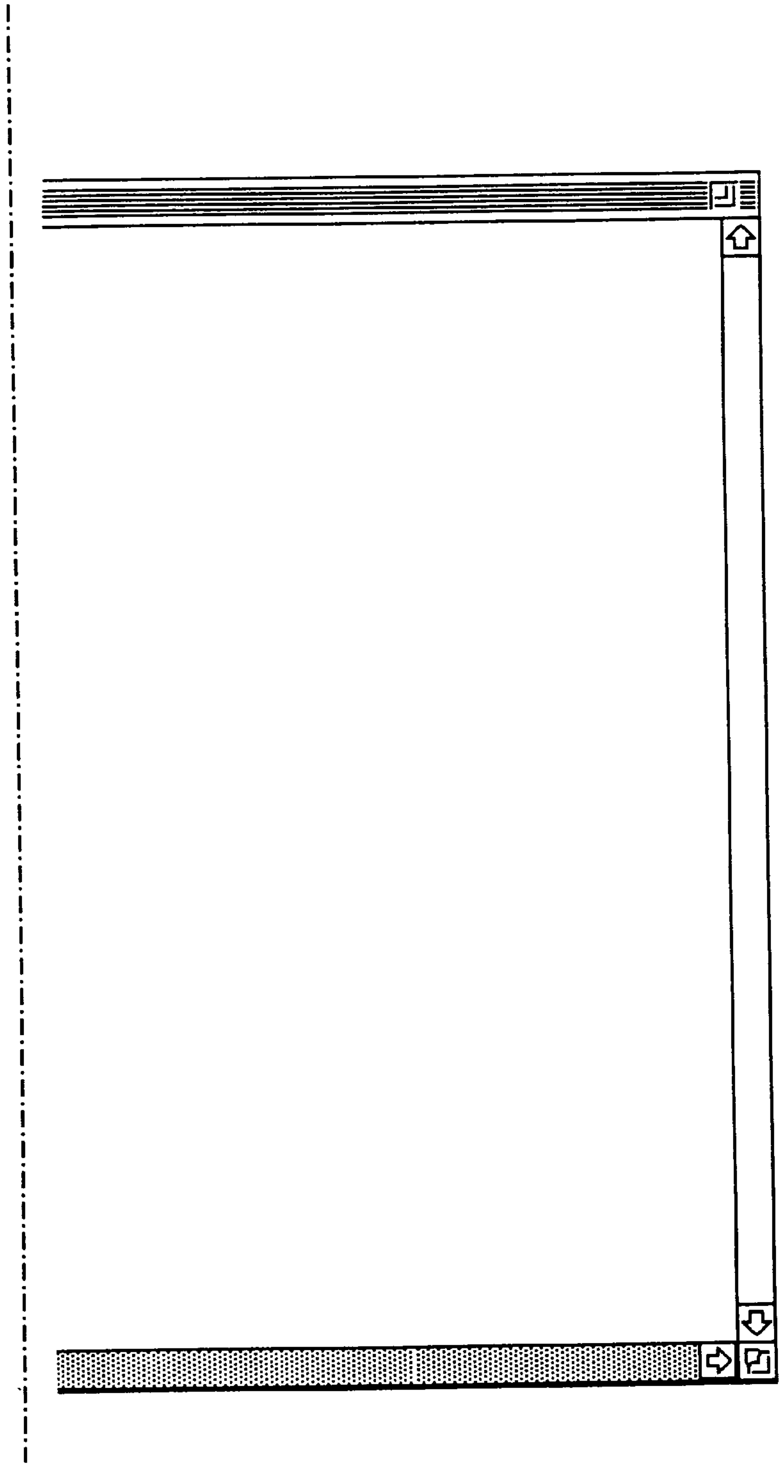

Qualification of user inputs, previously described, occurs at each entry point E1–E9 of FIG. 59 but is most readily illustrated with respect to invoice entry. FIG. 121, FIG. 122 and FIG. 123, respectively, illustrate various warning dialogs used to prevent entry of erroneous data. If entry of a duplicate invoice number is attempted, for example, a dialog such as that of FIG. 121 is displayed, and the system refuses to permit the duplicate entry. If an attempt is made to enter the same invoice twice during an entry session, then a dialog such as that of FIG. 122 is displayed. If the system detects that the same invoice number has been used previously but with respect to an apparently different vendor, then the user is notified (FIG. 123) and may choose whether or not to proceed.

Business rules implemented by the AP module include the following:

1. Items can only be billed once by a vendor.
2. Vendor invoices must reconcile with purchasing costs and terms (freight, tax, payment dates, etc.).
3. No duplicate vendor invoices are allowed. A vendor invoice is identified by a combination of vendor invoice number and MWS number. Hence, the same vendor invoice number may be billed against different MWS numbers (since some vendor's numbering systems may generate duplicate numbers), but not against the same MWS number.

Nightly or Periodic System Update

In addition to the foregoing business rules, or experiential constraints, implemented within each of the individual modules, recall that cross-checks between various domains are performed at intervals. Such cross-checks may be performed nightly or at other periods of low system activity. When performed nightly, the cross-check routine may be referred to as a nightly update. As a result of the nightly update, a nightly update report is generated, all or selected portions of which are automatically emailed to responsible individuals for receipt the following morning. An example of a nightly update report is provided as Appendix A.

General Ledger and Real-time Financials

Having described for an order the course of events in the payments domain, the course of events in the financial performance domain will now be described.

The most "tasking task" for most small- and medium-sized business is accounting. Accounting packages typically come in one of two flavors, packages for non-accountants that mask the complexity of generally-accepted accounting principles (GAAP) but do not provide information in "accountant-ready" form, and packages for accountants that are not readily understood or used by non-accountants. The need for real accounting documents coupled with the difficulty of producing them has necessitated considerable reliance on accountants, either outside accountants or full-time paid staff. If an outside accountant is used, the accountant brings the books up-to-date only at intervals. Even in the case of fill-time paid staff accountants, the books are typically brought up to date only monthly, or at most weekly, because of the arduousness of the process. Typically, invoices are reviewed and confirmed, then manually posted, then a trial balance is run, adjustments are made, etc.

Accounting information is presented in the form of financial statements. Information about each item appearing on the financial statements is gathered in an account. An account exist for each asset, liability, revenue, expense, and category of owner's equity of a company. More particularly, the classic accounting process involves the following steps:

1. Analyzing business and financial transaction to determine if they affect accounts;
2. Journalizing transactions affecting the accounts;
3. Posting journal entries to accounts;
4. Determining the balance in each account using incoming bank statements;
5. Preparing a total of all the account balances, called a trial balance;
6. Determining whether any adjusting entries are necessary and journalizing and posting such adjusting entries;
7. Preparing financial statements;
8. Closing income statement accounts and establishing ending balances for use in the next accounting cycle.

In classic accounting practice, the effects of a transaction are not recorded directly into the accounts. Rather, they are recorded in a journal entry in a general journal, or general ledger (GL). The process of transferring the information from the journal entry to the accounts is called posting. At the end of the fiscal period, before making any adjusting entries, an accountant prepares a schedule listing all the individual account titles and their respective debit or credit balances. Following the trial balance, various adjusting entries may be required to assure that revenues are reported in the period they were realized and that all expenses are matched with the revenues they produced. An adjusted trial balance is then produced. Financial statements are generally prepared on worksheets from the adjusted trial balance. Whereas balance sheet accounts are permanent (or real) accounts, income statement accounts are temporary (or nominal) accounts. Because the data collected in an income statement account is only for the current fiscal period, the balance is not carried forward but is eliminated at the end of each fiscal period. The process of eliminating the balance in each of the revenue and expense accounts (by transferring the balance to a different permanent account) is called closing the accounts.

As a result of the cumbersomeness of the foregoing process, management processes accommodate the limited availability of accounting-derived management information. In reality, however, the need for management information is constant and ongoing, and cannot be expected to synchronize itself to the availability of accounting information without sacrificing performance.

The present software takes a different approach to financial performance activity. Instead of manual posting of accounting entries, posting is automatic, either continuous or at user-specified intervals (e.g., nightly). For non-accountants, the complexities of accounting are hidden completely—users simply go about their usual activities of running the business. The automatic posting process, however, generates entries in GAAP format. Furthermore, instead of a limited number of "canned" reports, a GUI-based report-writer is provided that allows any kind of report to readily generated, either on command or on schedule. At any time, a user may simply press a button and obtain a real-time, accurate financial report. Because posting is automatic, posted entries are not guaranteed to be correct. (Because of the stringent qualification of user entries, however, errors are greatly minimized.) Therefore, unlike conventional accounting packages, entries are allowed to be modified. In the case of invoices, for example, invoices are allowed to be modified up until the time they are paid. As invoices and other records are viewed and modified, they are flagged to be checked by a centralized GL module to determine if the modification requires an adjusting entry. If so, the adjusting entry is made automatically alongside the original entry.

Although in an exemplary embodiment the GL module is a centralized module, the functionality of the GL module may be distributed among the various modules so as to operate continuously. For example, an AR portion of the GL functionality would make general ledger entries immediately to reflect payment information as it is input, a purchasing portion would make general ledger entries immediately to reflect obligations as incurred through purchase orders, etc.

Figure 95:
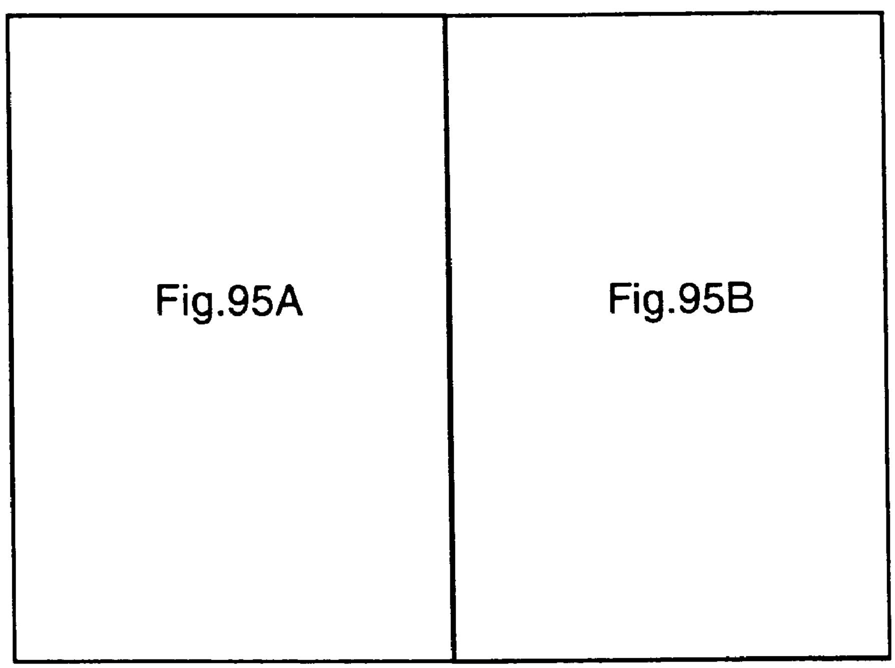
FIG. 95 is an illustration of an Accounting Setup defaults screen display.
Figure 95A:
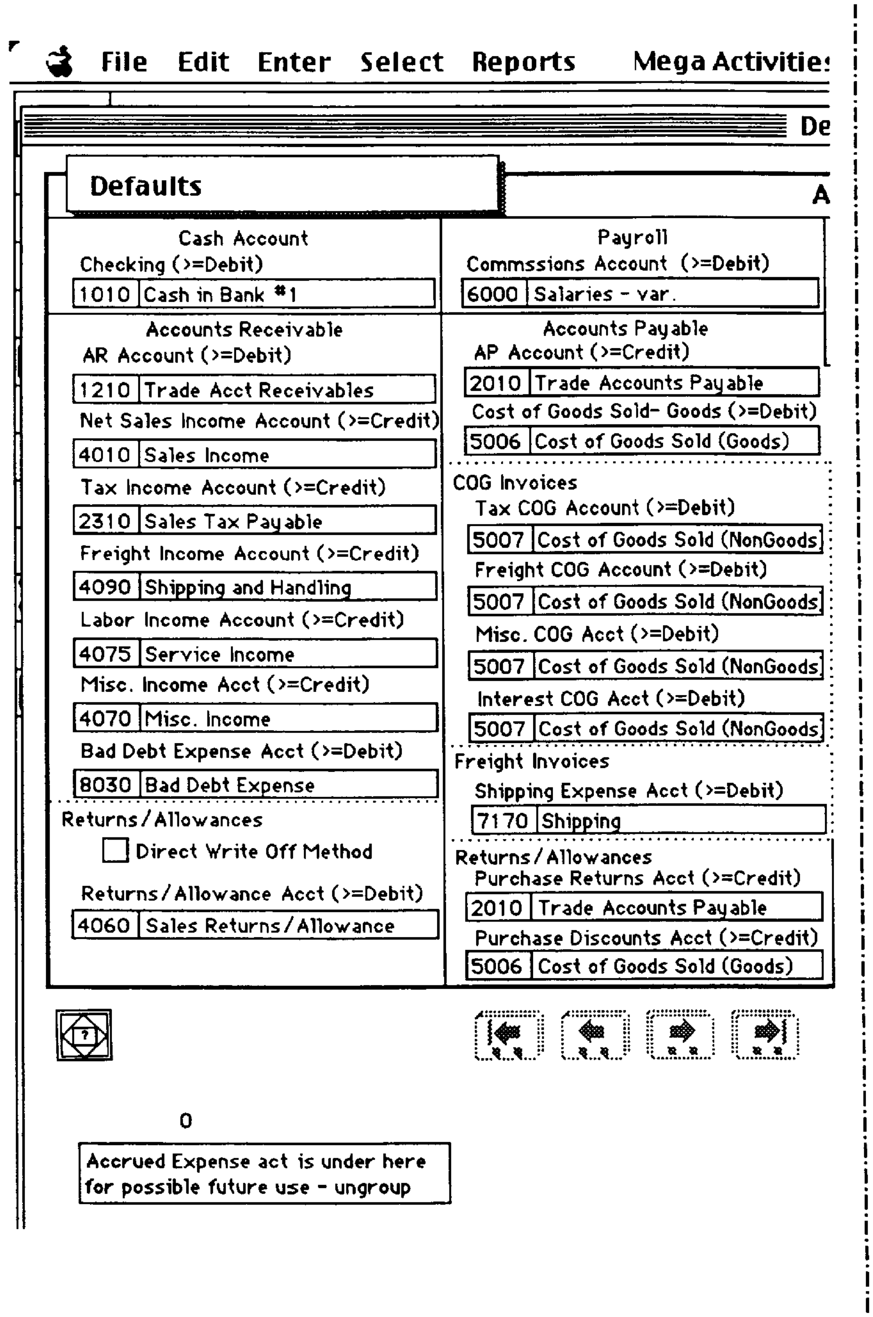
Figure 95B:
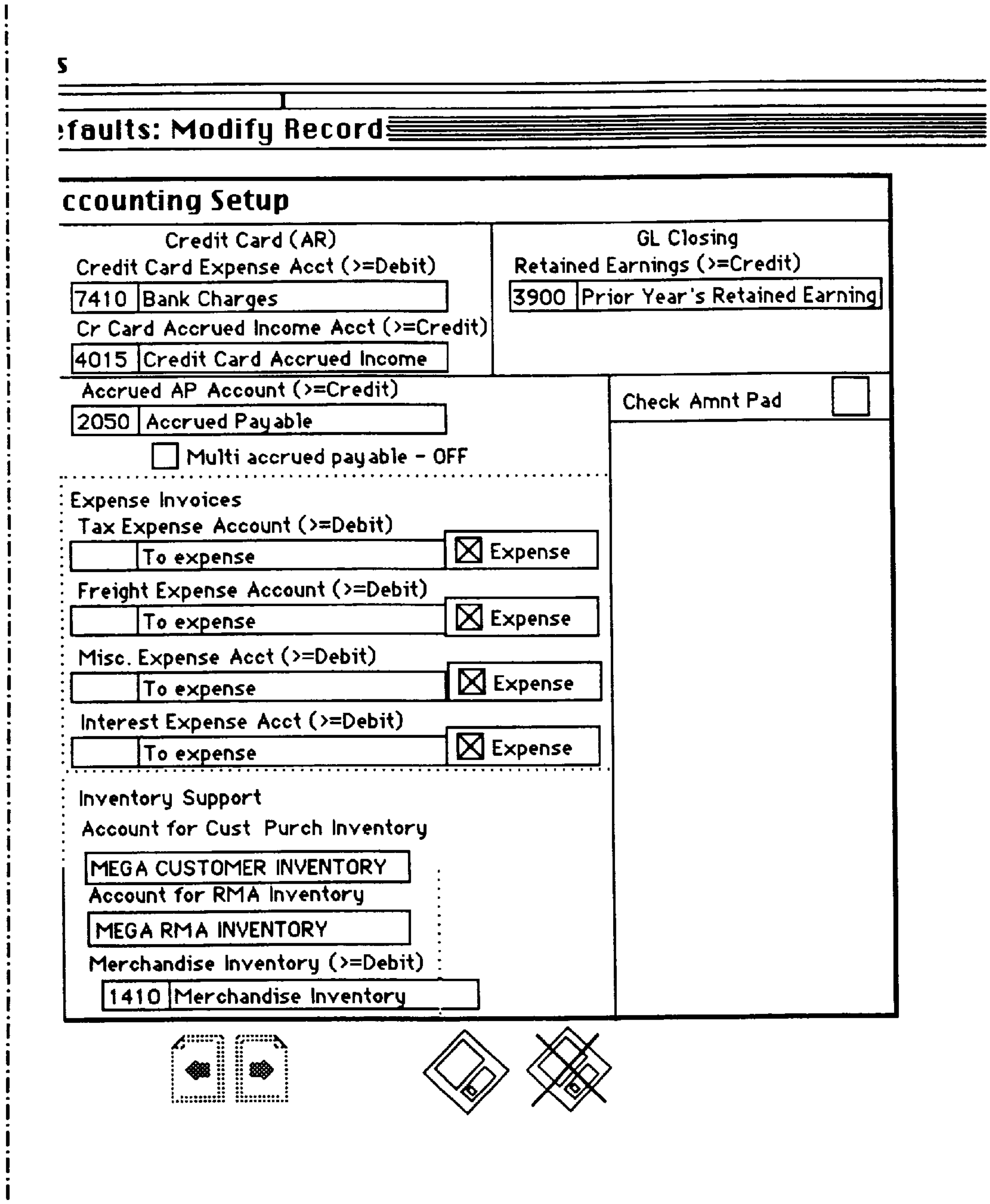

To use the real-time financial capabilities of the present system, the user sets up accounts, then assigns accounts to different line items of records within the system. More than one account may be assigned to a line item. If only one account (i.e., a single default account) is assigned to a line item and an automatic posting option is selected, then the line item is automatically posted to that account. Default accounts are set up for various different files, such as AP, AR, cash, credit card transactions, commissions, payroll, etc., as shown in FIG. 95. The manner in which these defaults are established will be described.

Figure 96:
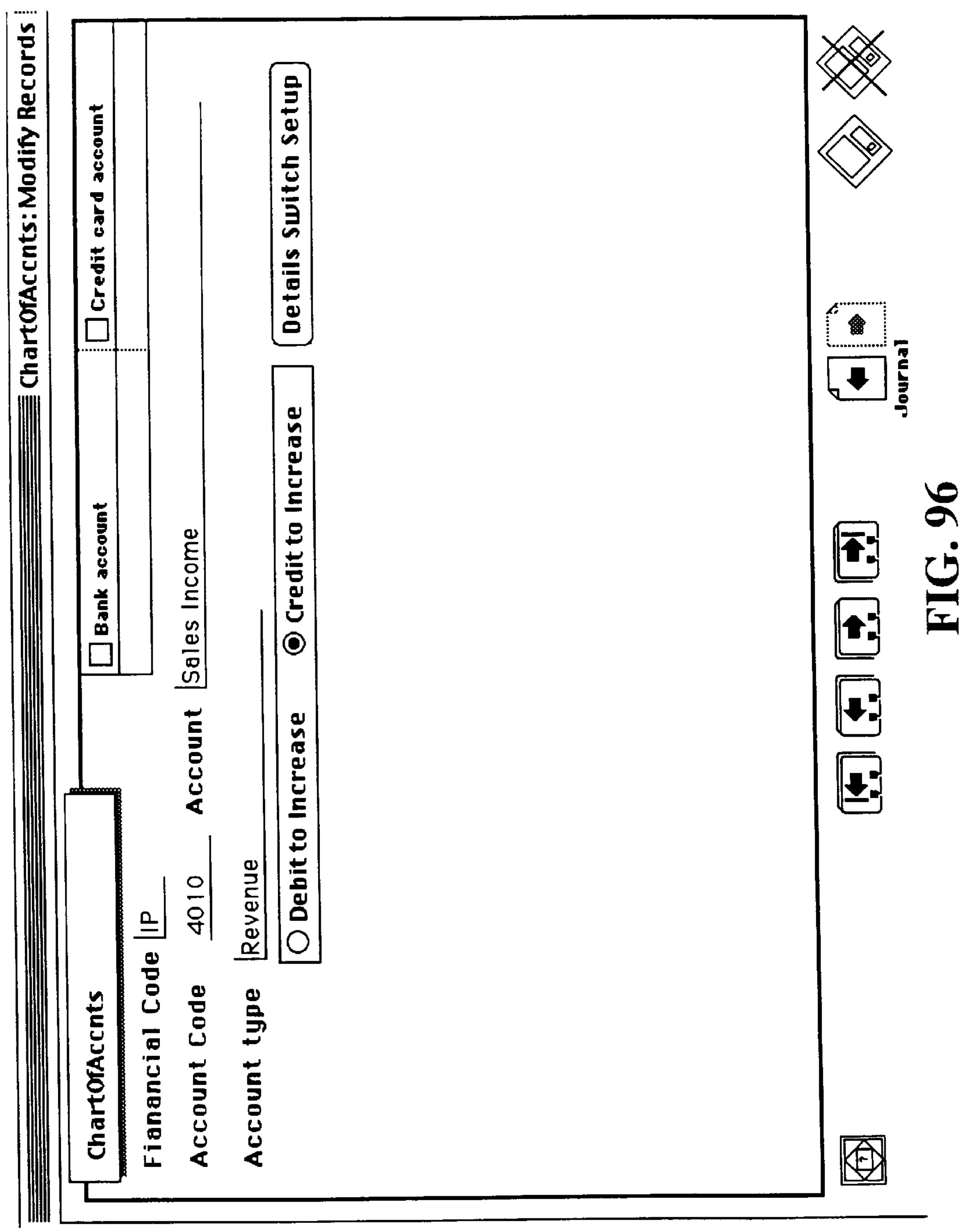
FIG. 96 is an illustration of a display screen used to add an account to a Chart of Accounts file.
Figure 97:
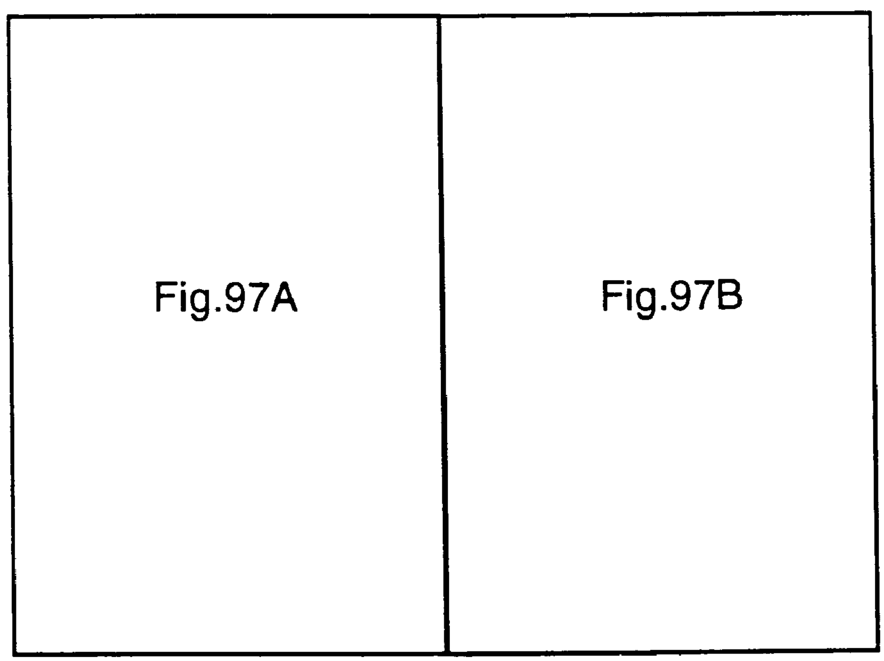
FIG. 97 is an illustration of a Chart of Accounts screen display.
Figure 98:
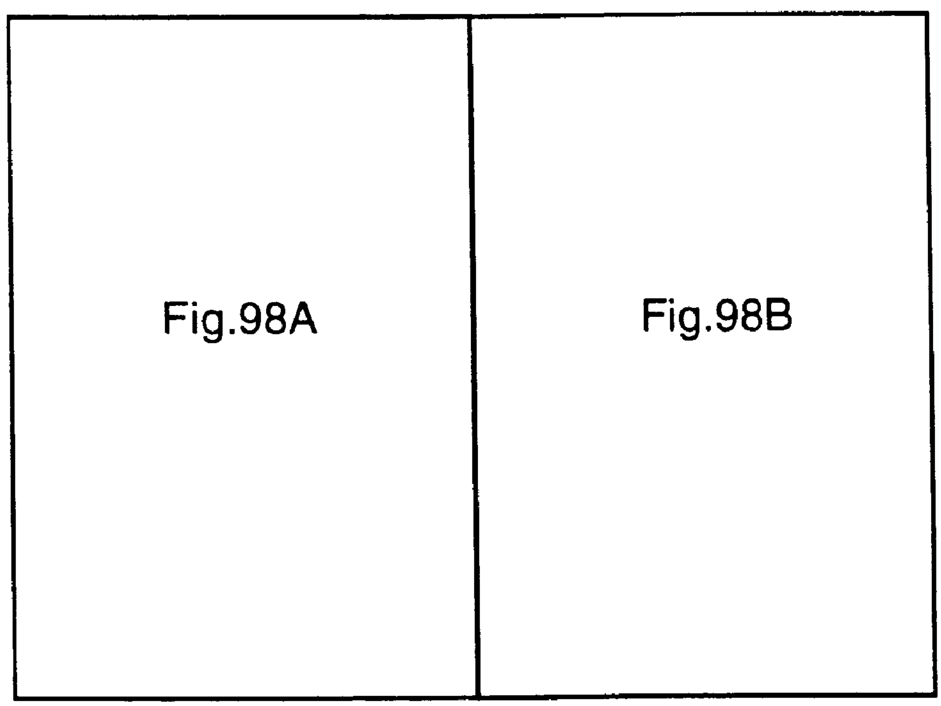
FIG. 98 is an illustration of a Chart of Accounts—Account Detail screen display.
Figure 98A:
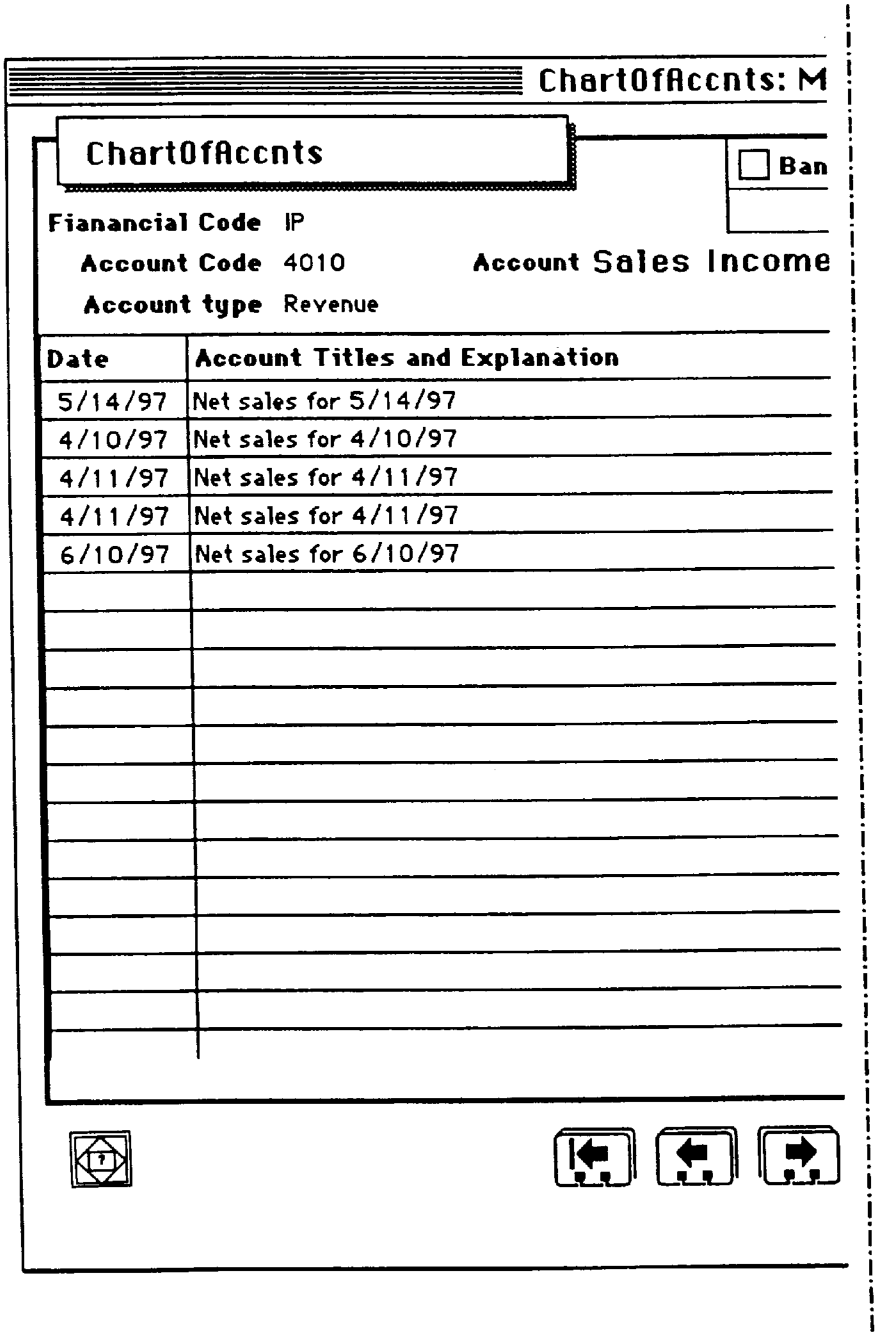
Figure 98B:
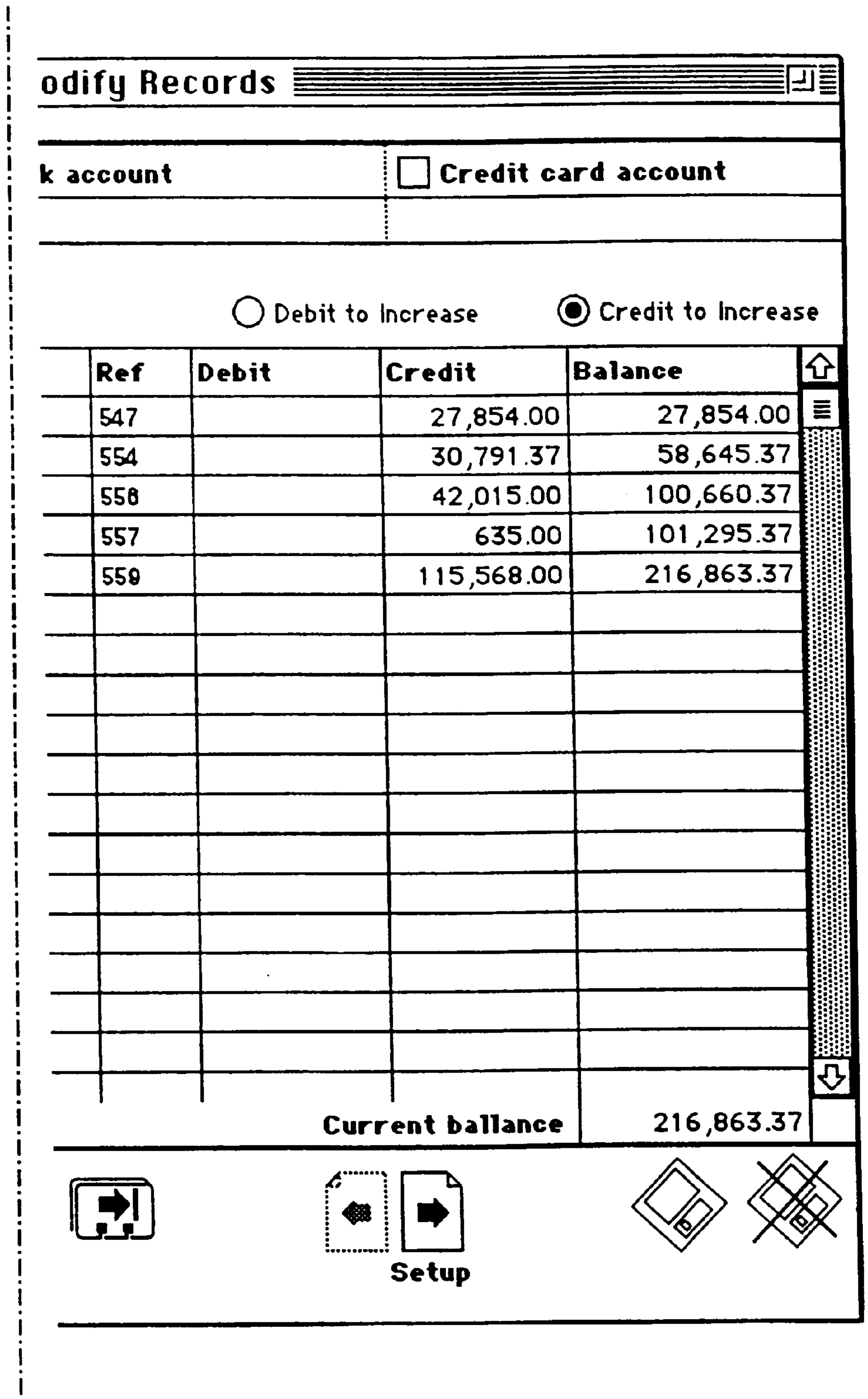

Accounts are set up within a chart of accounts. The chart of accounts keeps a record of each account including the name of the account, type of account, account code, etc. To add an account, the user enters information about the account within an entry screen such as that of FIG. 96. Whereas debits and credits are intelligible primarily to accountants, increasing and decreasing a balance are concepts easily understood by non-accountants. Hence, when an account is first established, a button is selected designating whether the account balance is increased by a debit or by a credit. Thereafter, user may use the more familiar concepts of increase and decrease. An exemplary chart of accounts display is shown in FIG. 97. Doubling clicking on a particular account results in a display such as that of FIG. 98. The date of each transaction contributing to the balance is shown, together with an explanation, the journal reference number, and the amount. This screen display may be used to modify account information as necessary.

Figure 99:
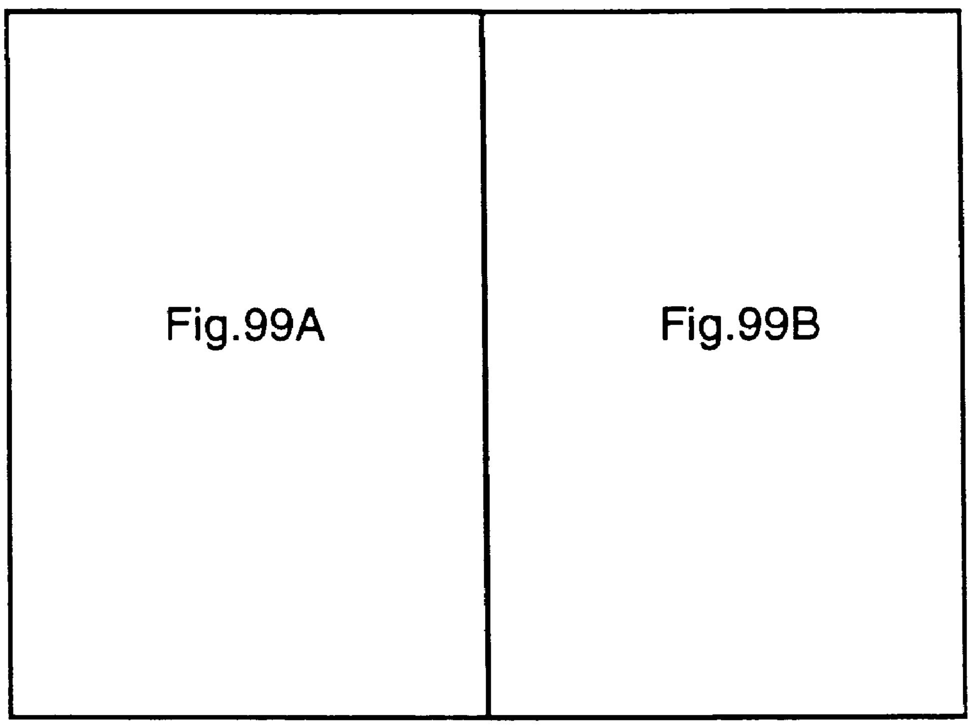
FIG. 99 is an illustration of an Accounts Receivable Customer Setup screen display.
Figure 99A:
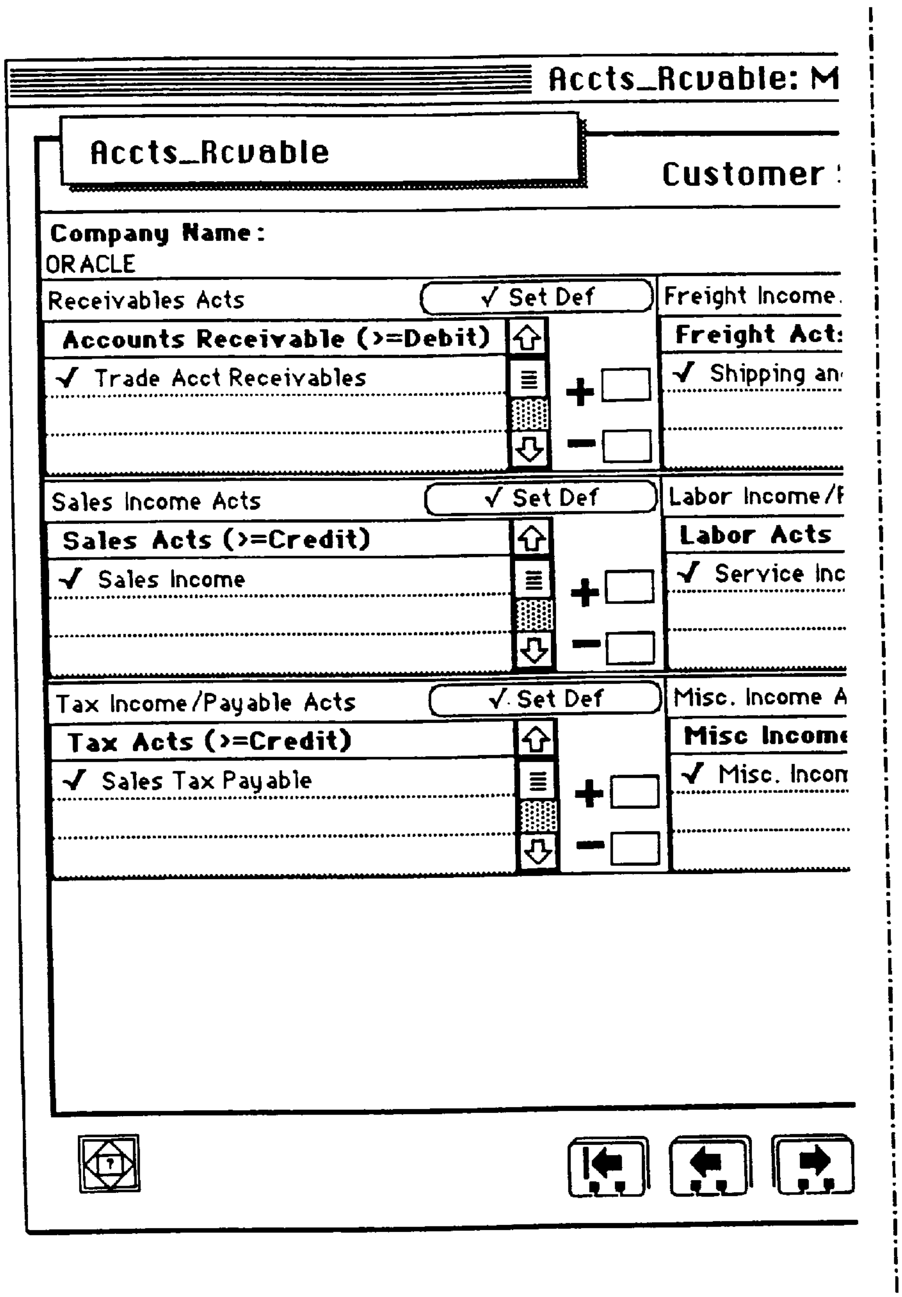
Figure 99B:
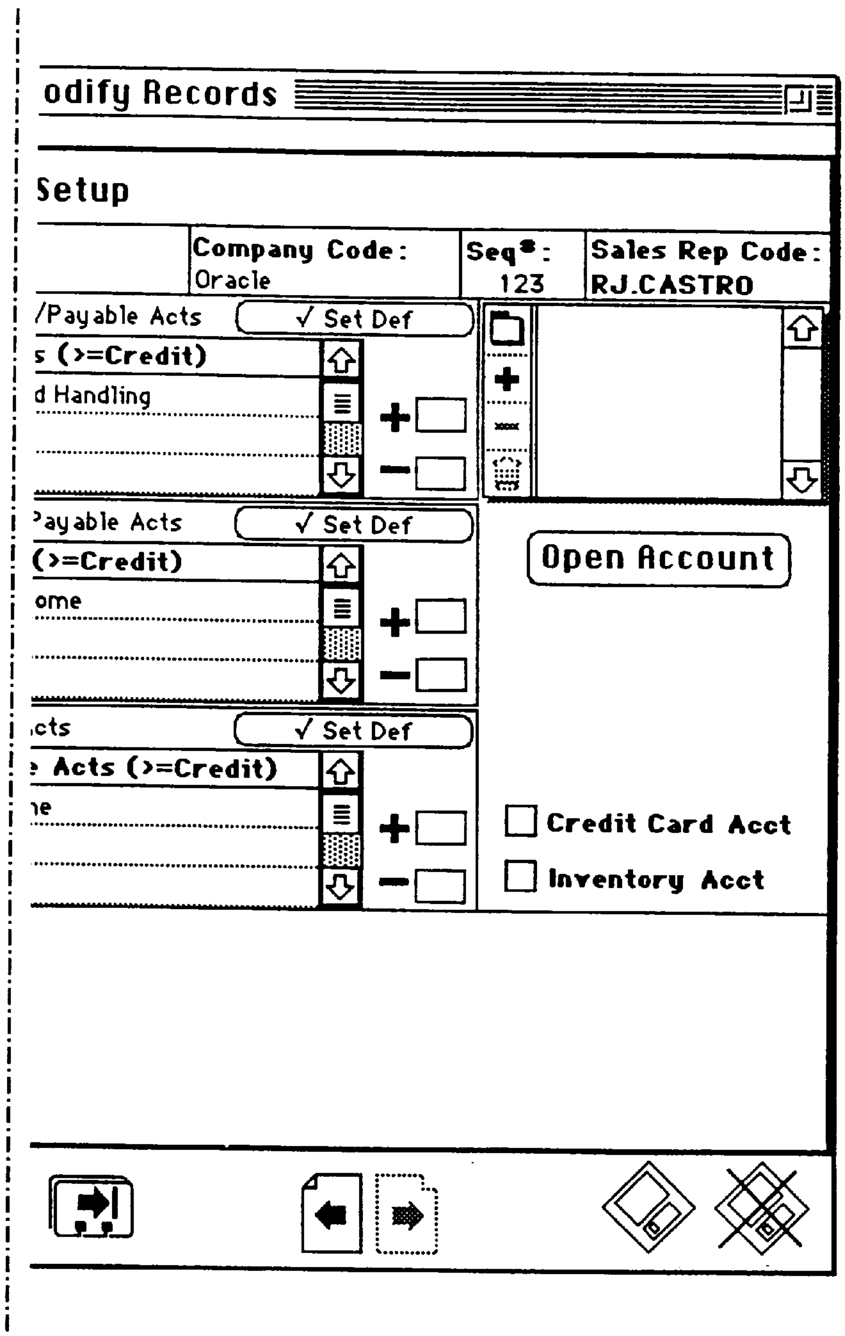

For accounts receivable, a correspondence between line items on a customer invoice and specific accounts is set up through a customer setup display, shown in FIG. 99. Generally speaking, each of the different list boxes corresponds to an amount that is (or is derivable from) a line item (or multiple line items) on the customer invoice or other record. The account or possible accounts to which the amount is to be or may be posted are specified by clicking the "+" button and selecting from a pop-up list of accounts of the appropriate type. If multiple accounts are selected, one may be selected as a default account, the effect of which is explained hereinafter. If for each list box only a single account is selected and is designated as the default account (using the Set Def button), then posting is automatic and is performed on a continuous basis or at regular intervals (e.g., daily). As a result, a truly up-to-date financial report can be run at any time.

Figure 100:
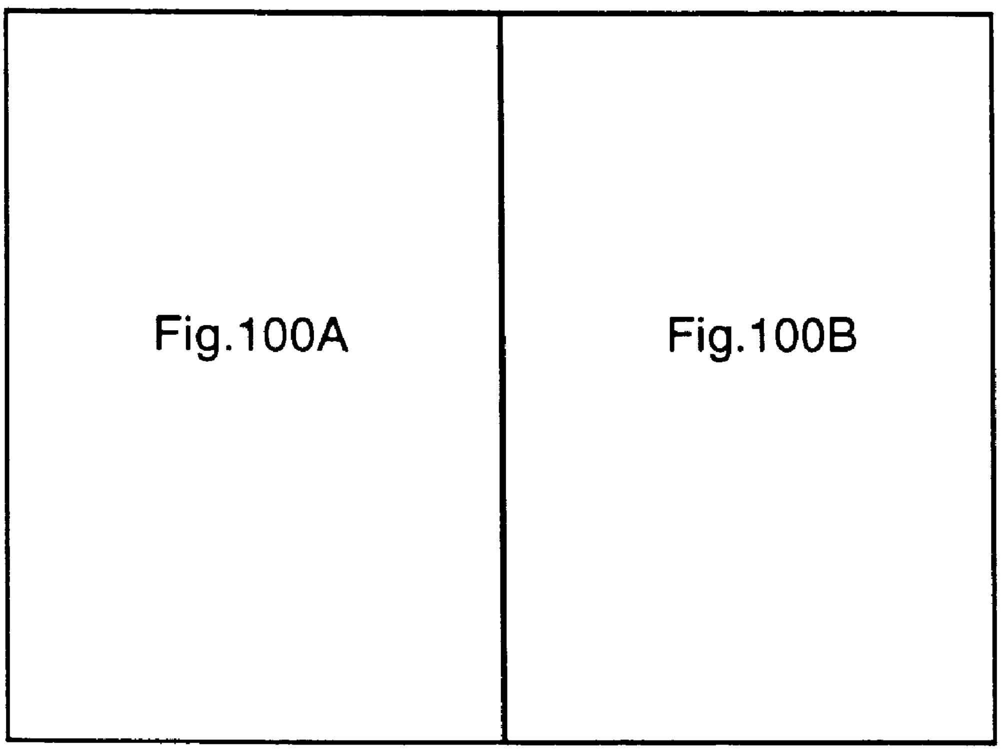
FIG. 100 is an illustration of an Accounts Receivable screen display.
Figure 100A:
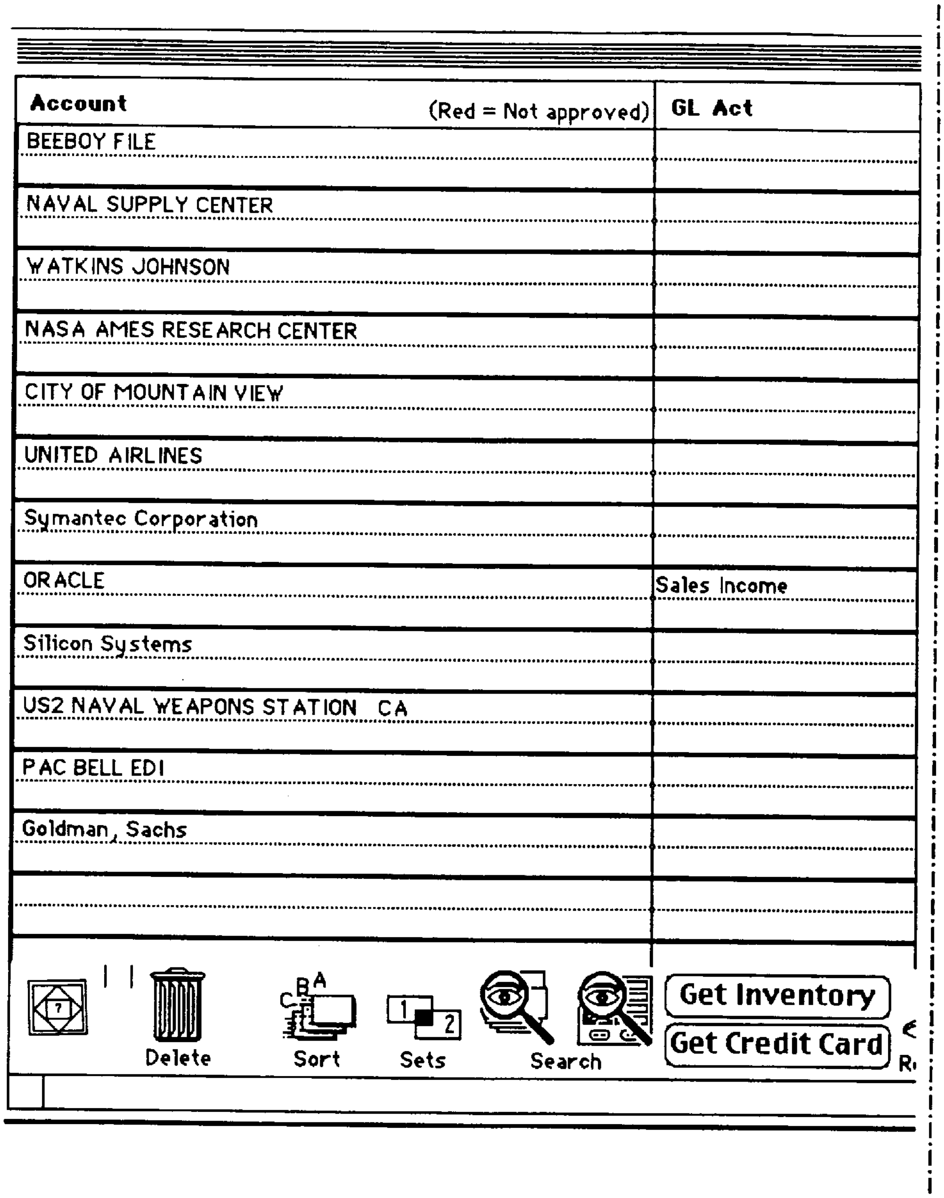

Referring to FIG. 100, an accounts receivable display is shown in accordance with an exemplary embodiment of the invention. For each customer account, there is shown the GL account to which balances are posted, the current account balance, and amounts 30, 60, and 90 days overdue, respectively. By double-clicking on a balance field, transactions records relating to that balance field are displayed. For example, double-clicking on the current balance of $2,712.75 shown in FIG. 100 results in a display such as that of FIG. 101. The date of each transaction contributing to the balance is shown, together with an explanation, the journal reference number, and the amount.

Figure 101:
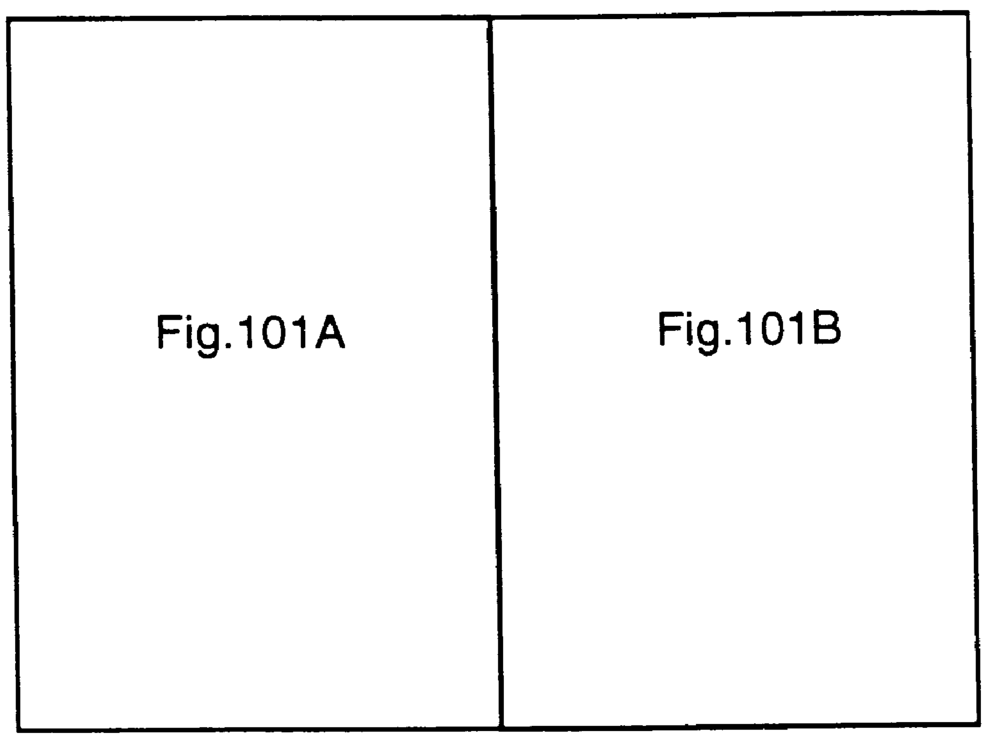
FIG. 101 is an illustration of an Accounts Receivable—Account Detail screen display.
Figure 101A:
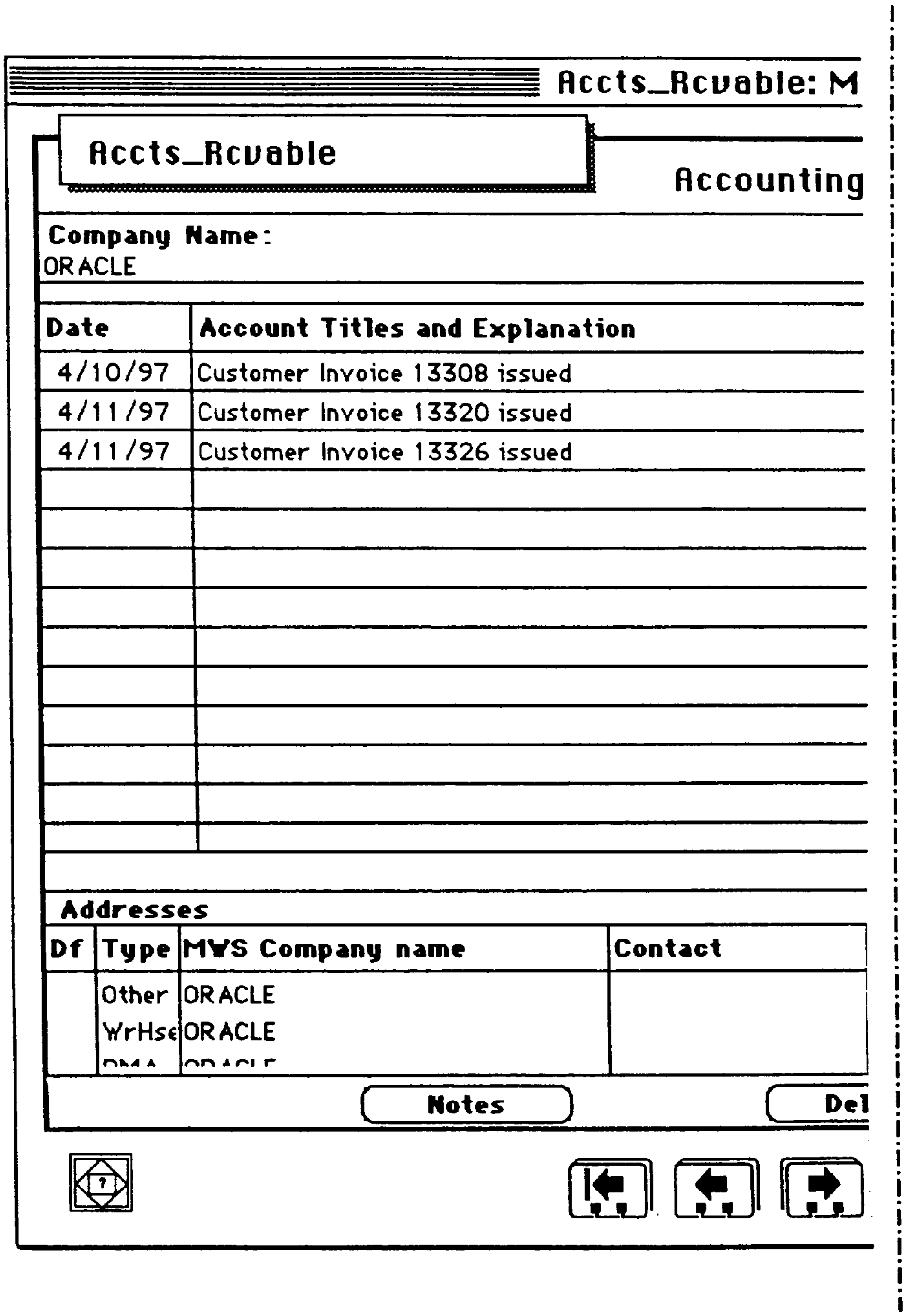
Figure 101B:
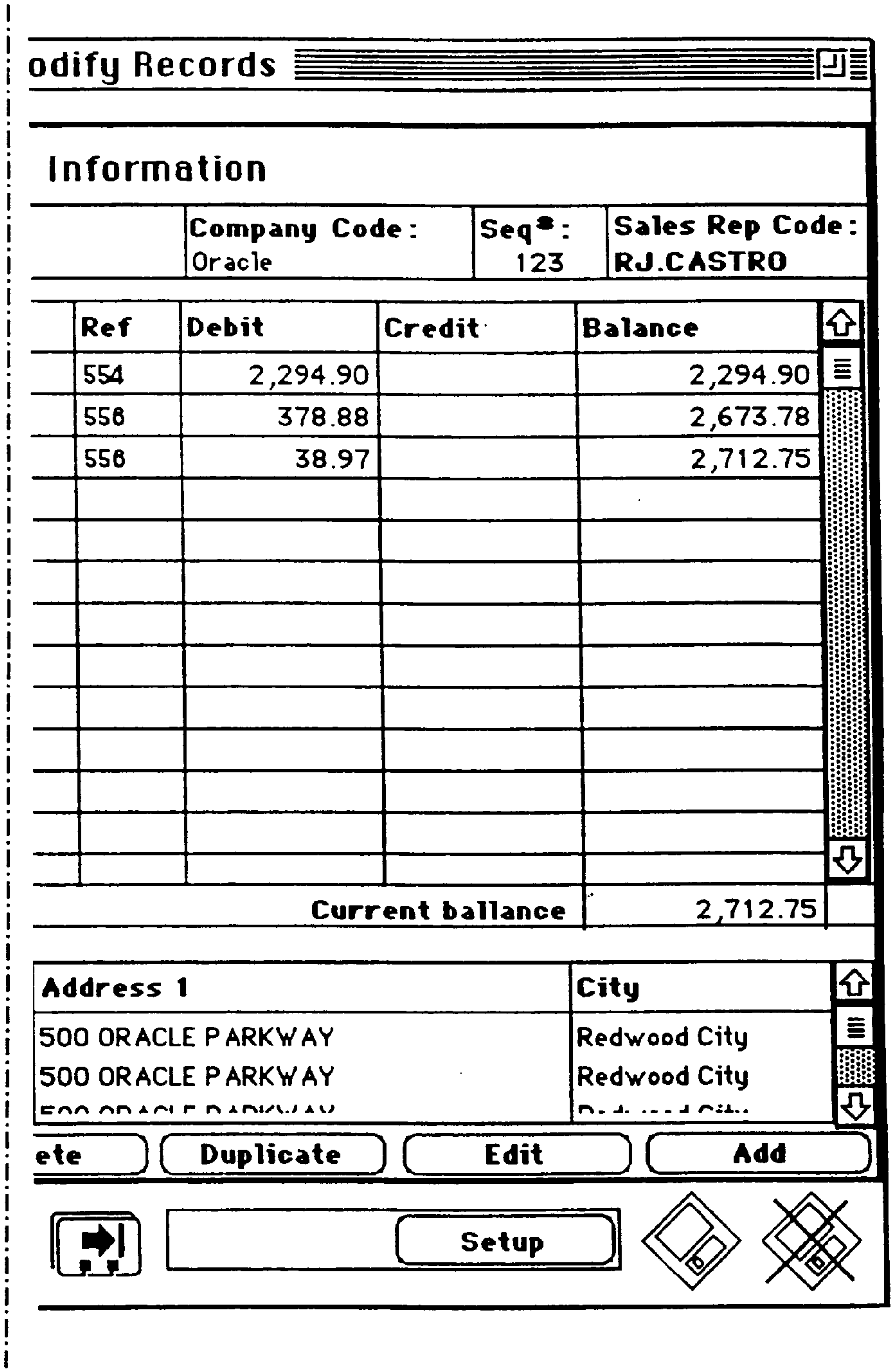
Figure 102:
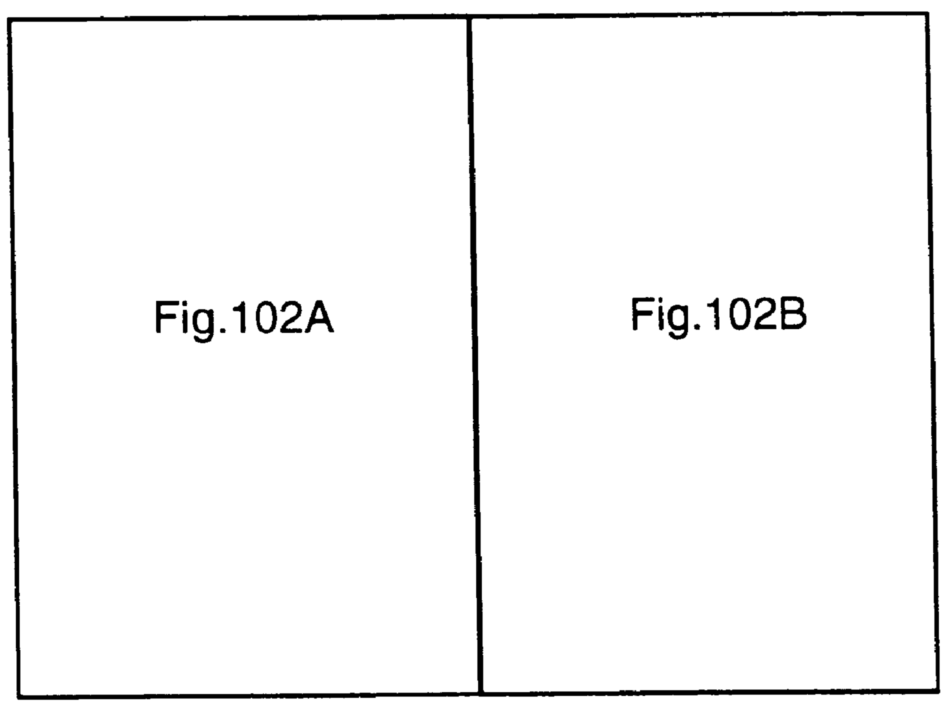
FIG. 102 is an illustration of an Accounts Payable Partner Setup screen display.
Figure 102A:
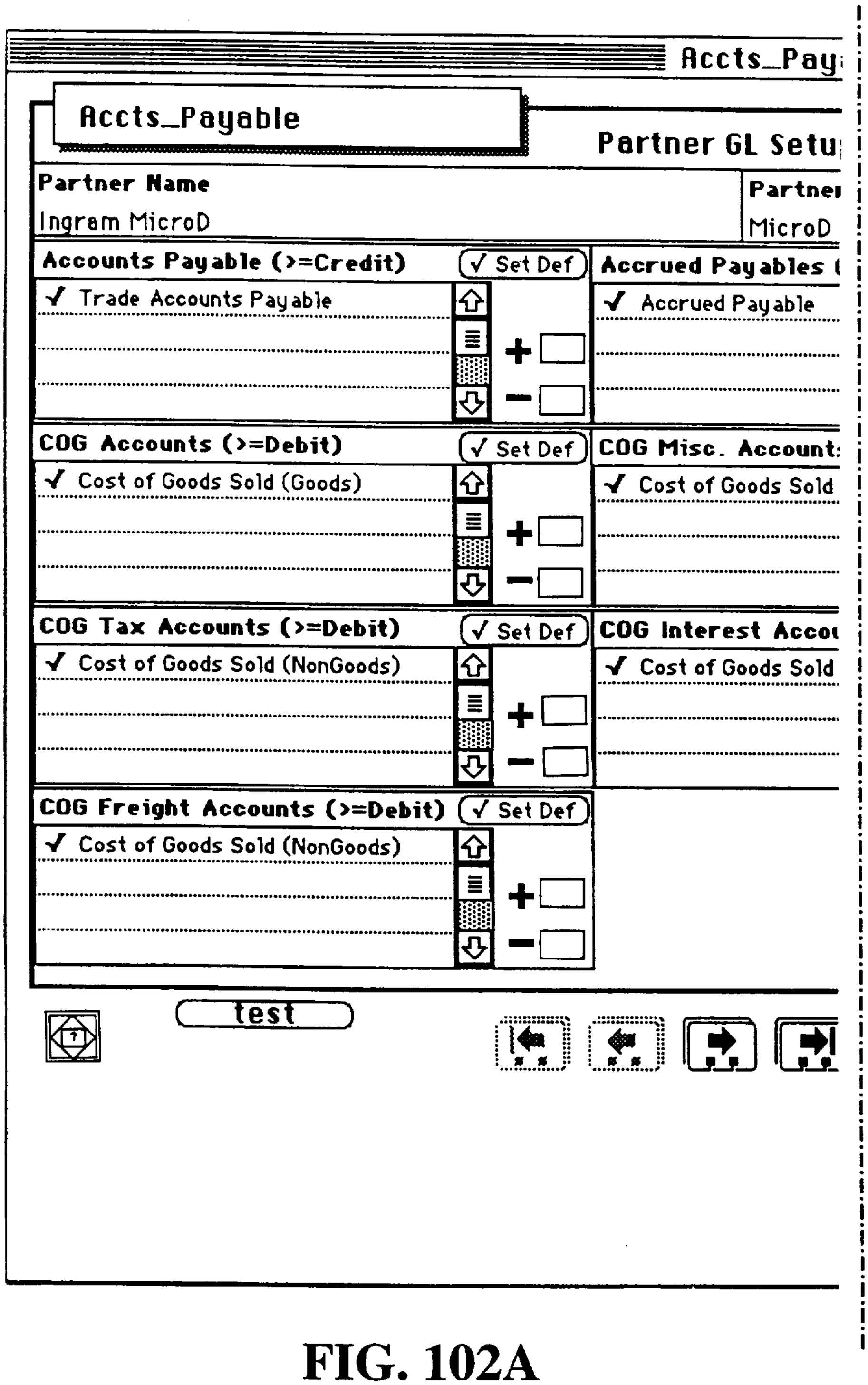
Figure 102B:
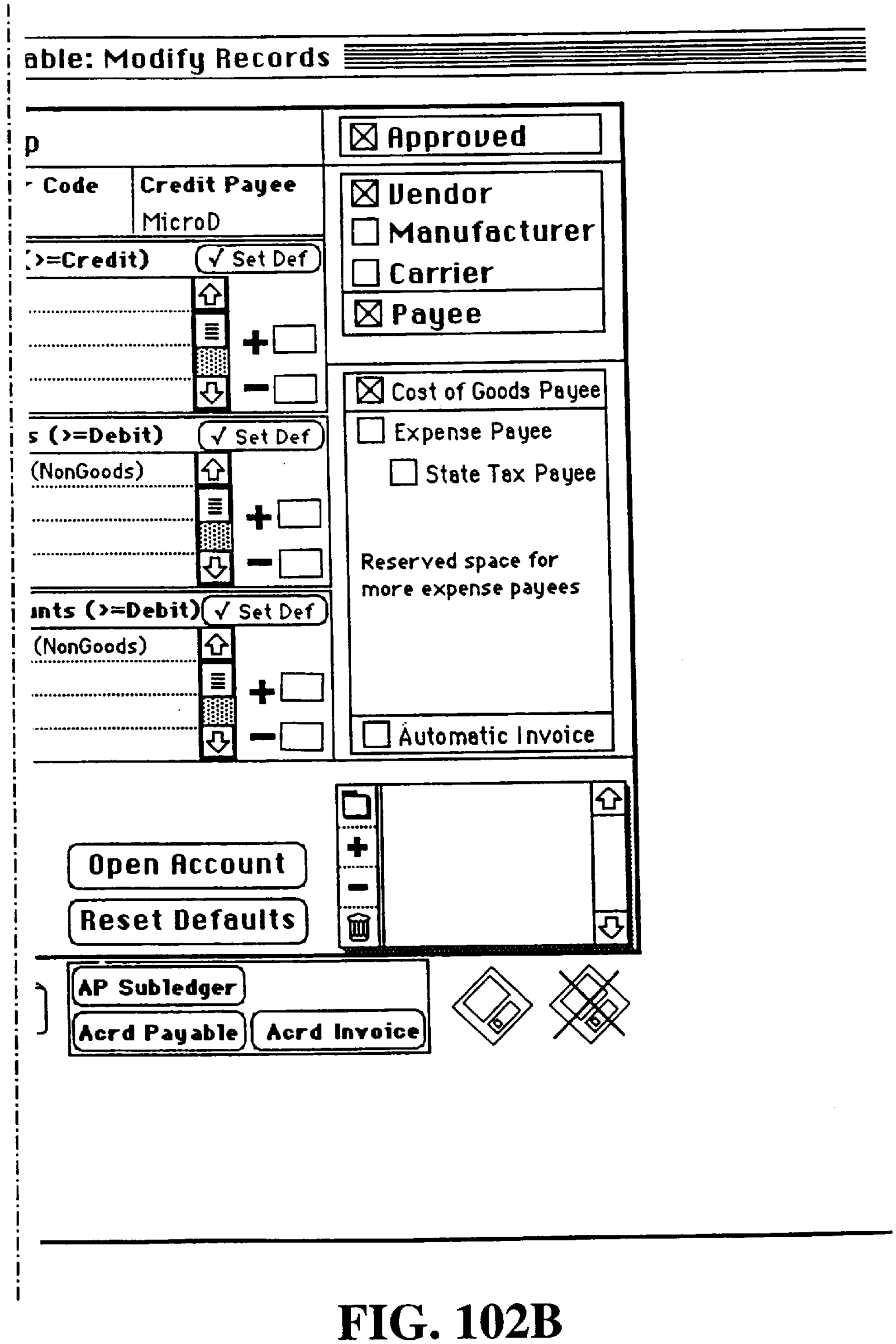
Figure 103:
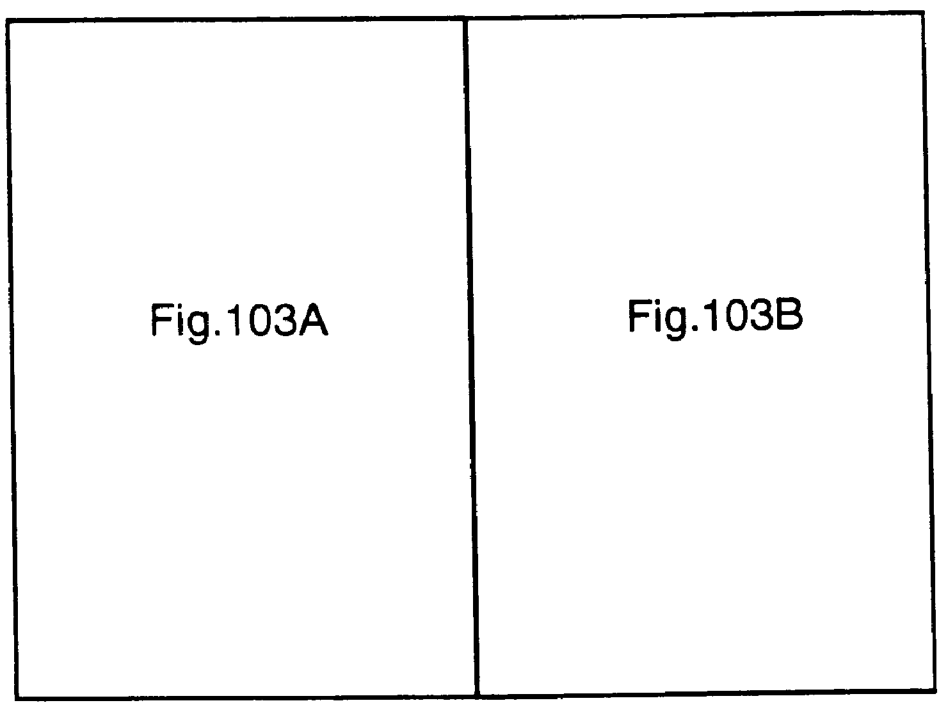
FIG. 103 is an illustration of an Accounts Payable screen display.
Figure 103B:
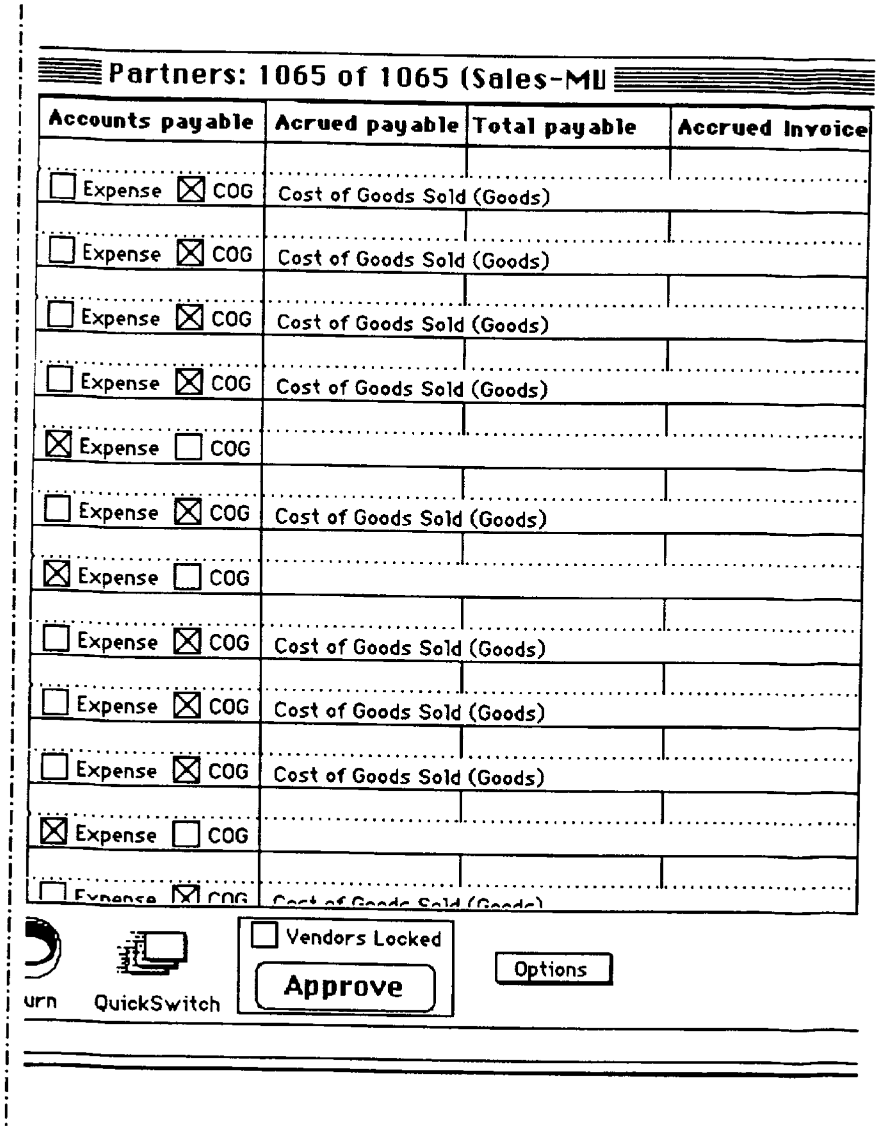
Figure 104:
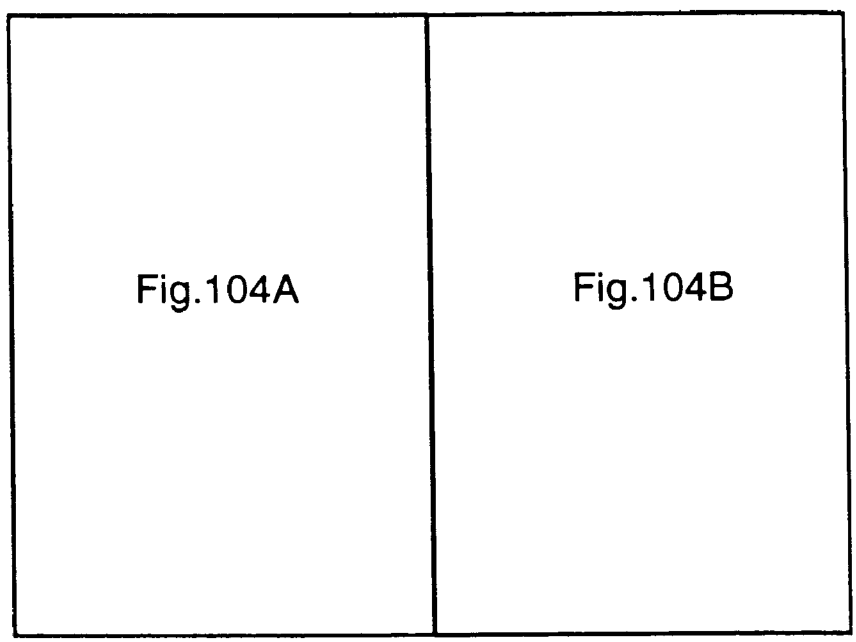
FIG. 104 is an illustration of an Accounts Payable—Account Detail screen display.
Figure 104A:
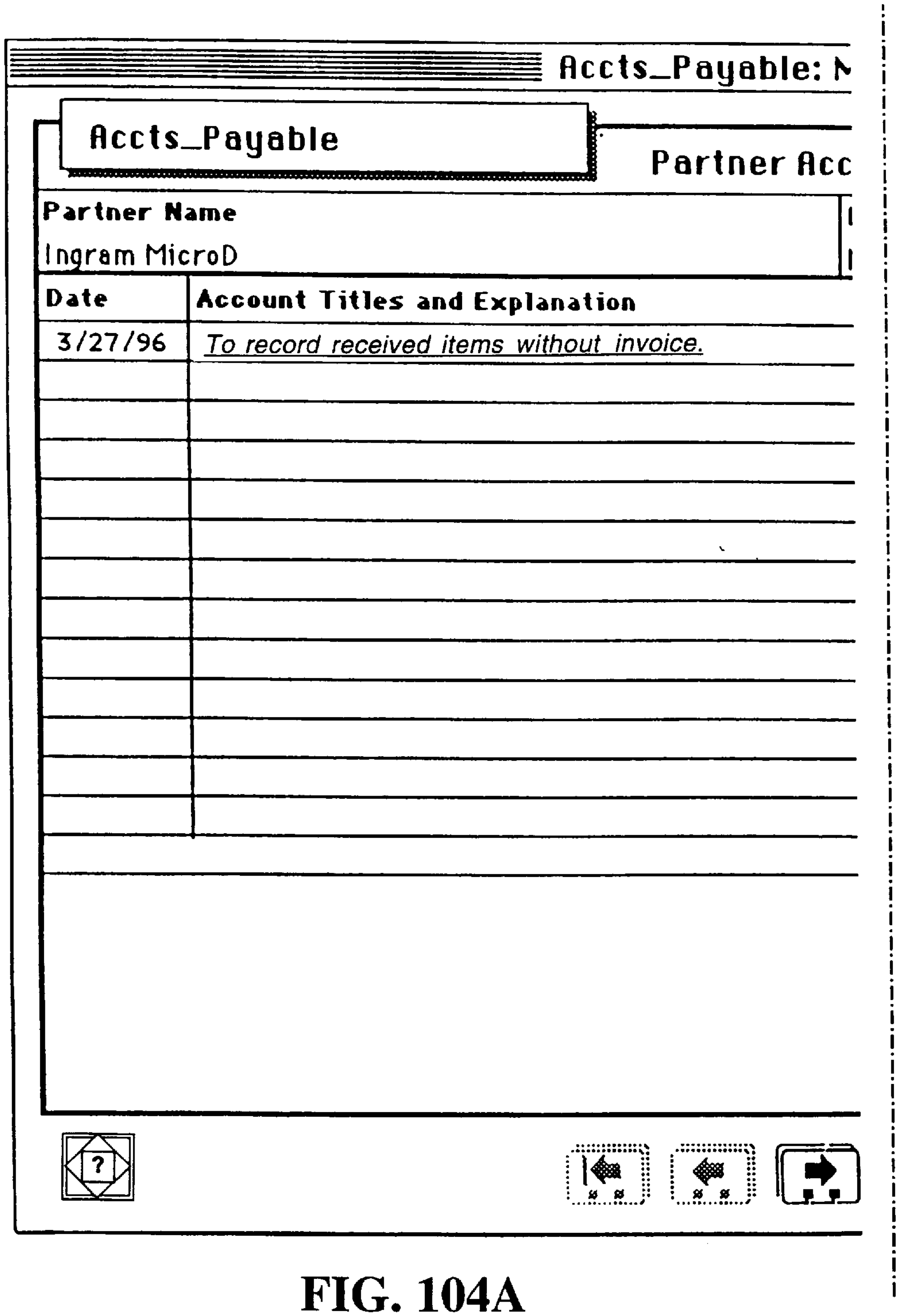
Figure 104B:
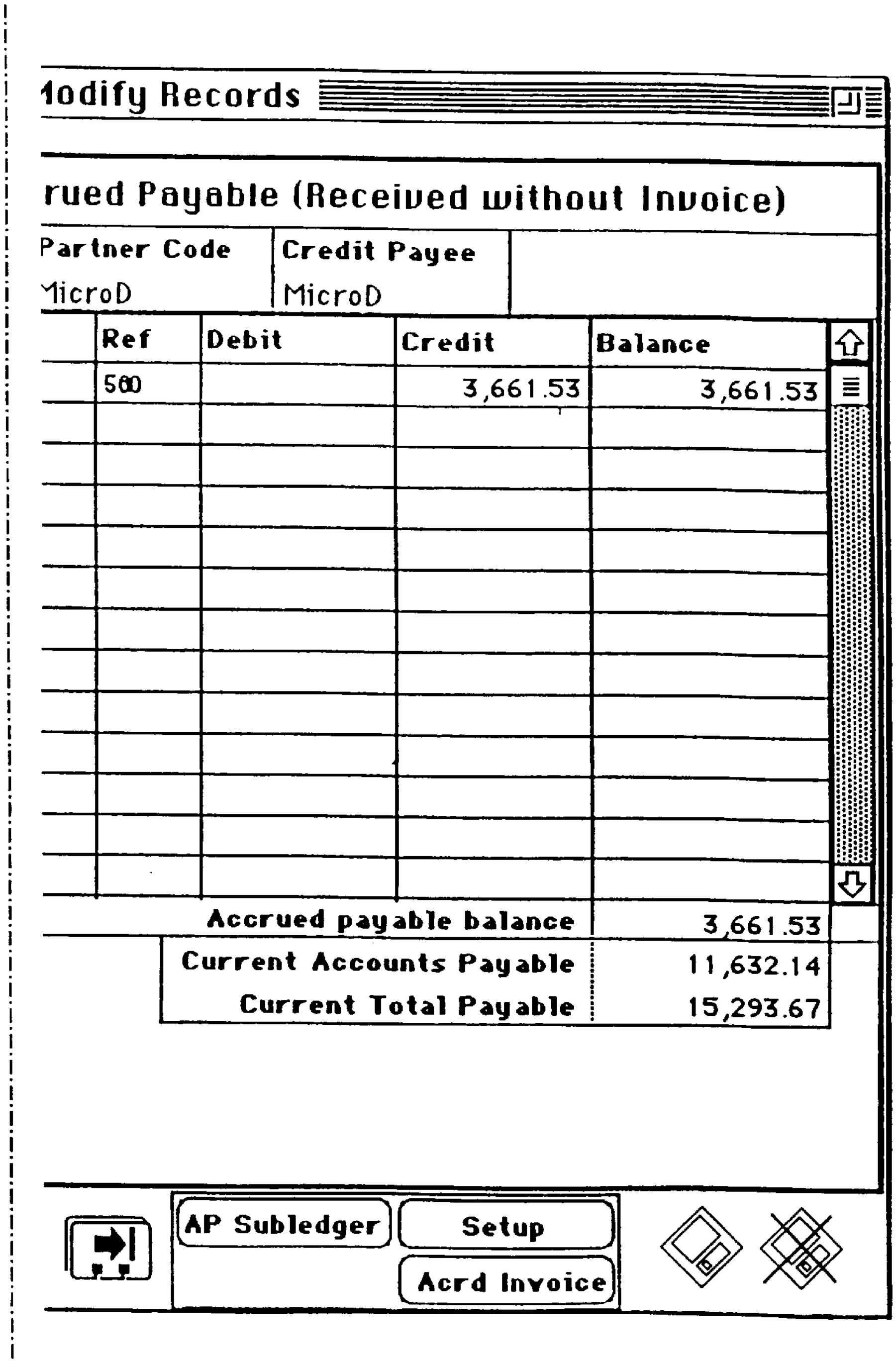

Corresponding screen displays for accounts payable as those of FIG. 99, FIG. 100 and FIG. 101 for accounts receivable are shown in FIG. 102, FIG. 103 and FIG. 104, respectively.

Figure 105A:
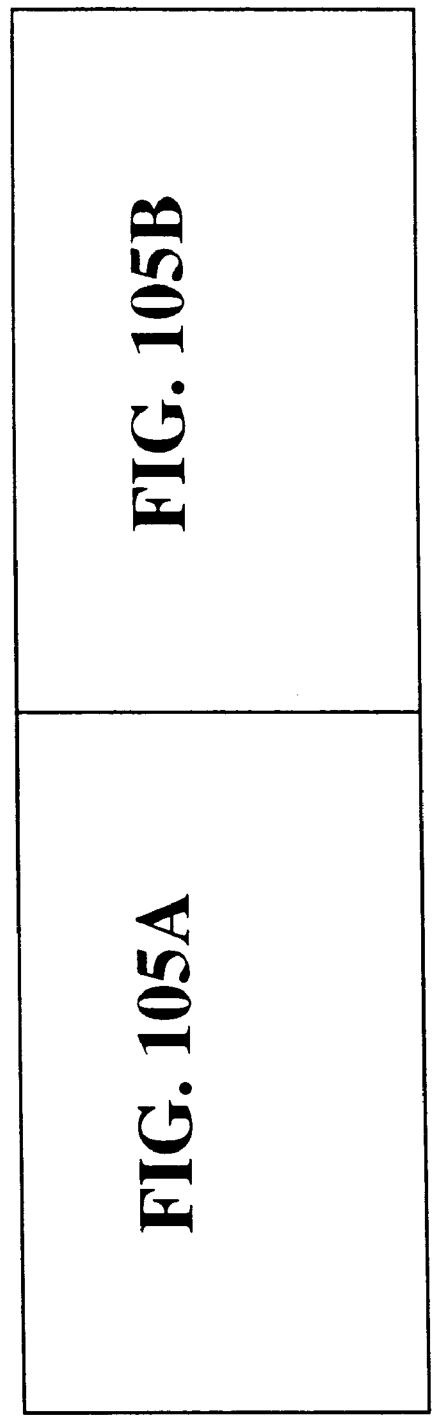
FIG. 105 is an illustration of an account distribution pop-up screen used to allocate an invoice amount between different accounts.
Figure 105A:
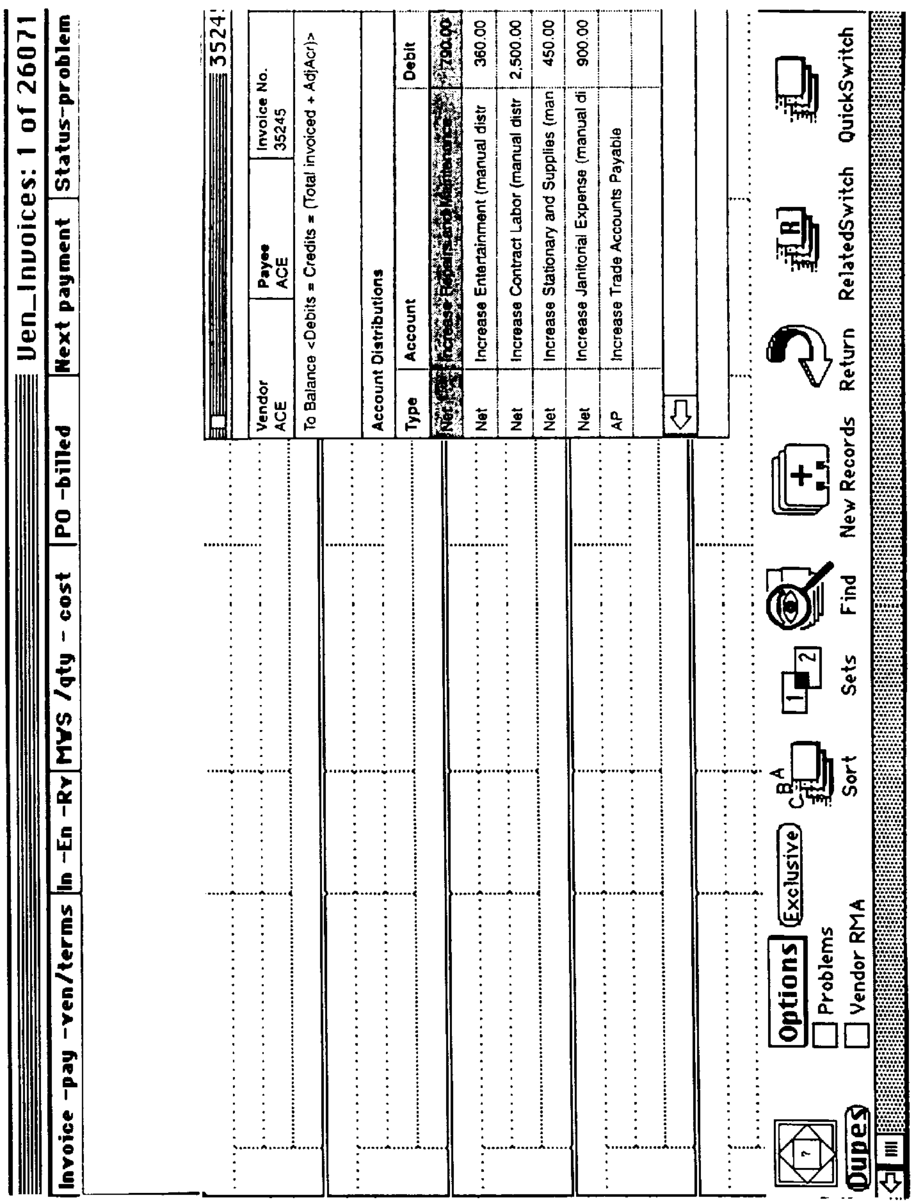
Figure 105B:
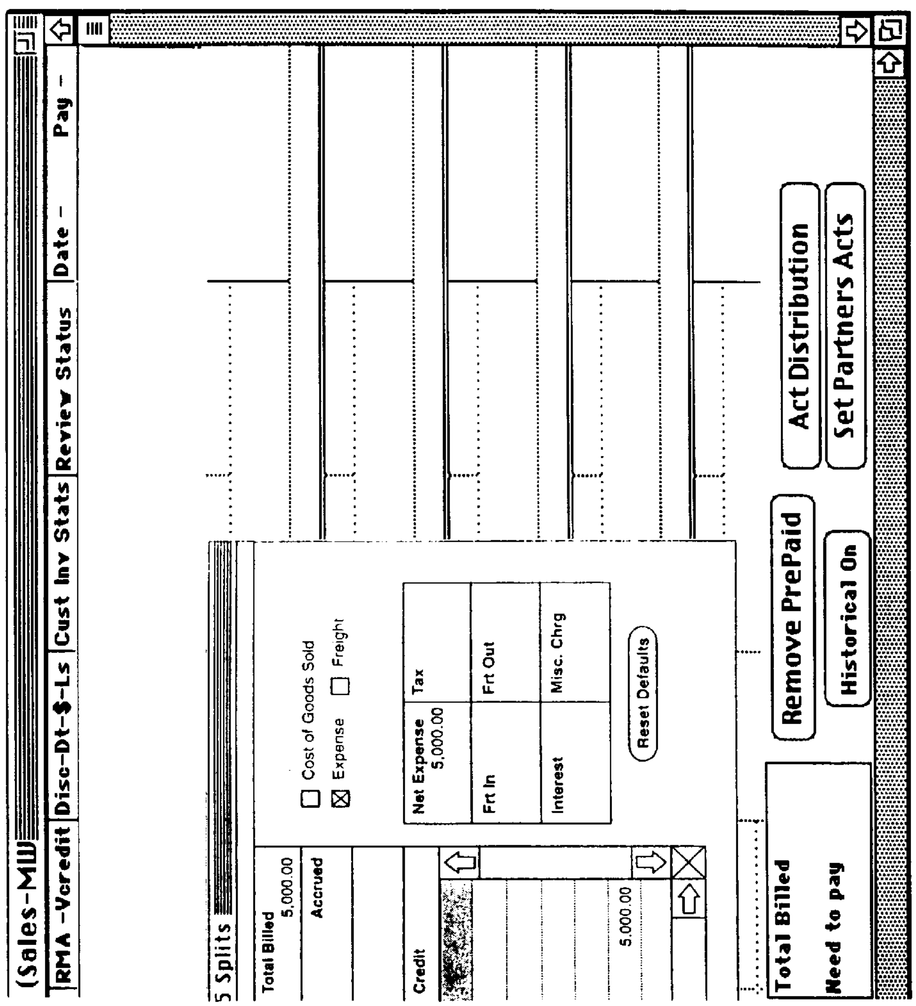

If the setup of accounts indicates that an amount may be posted to more than one account, then manual account distribution is required. Referring to FIG. 105, a pop-up screen display used for this purpose is shown. The assigned accounts are displayed, and the user enters debits or credits for the accounts as appropriate. The effect of a debit or credit (increase or decrease in the account) is displayed as an aid to the novice user.

Figure 106:
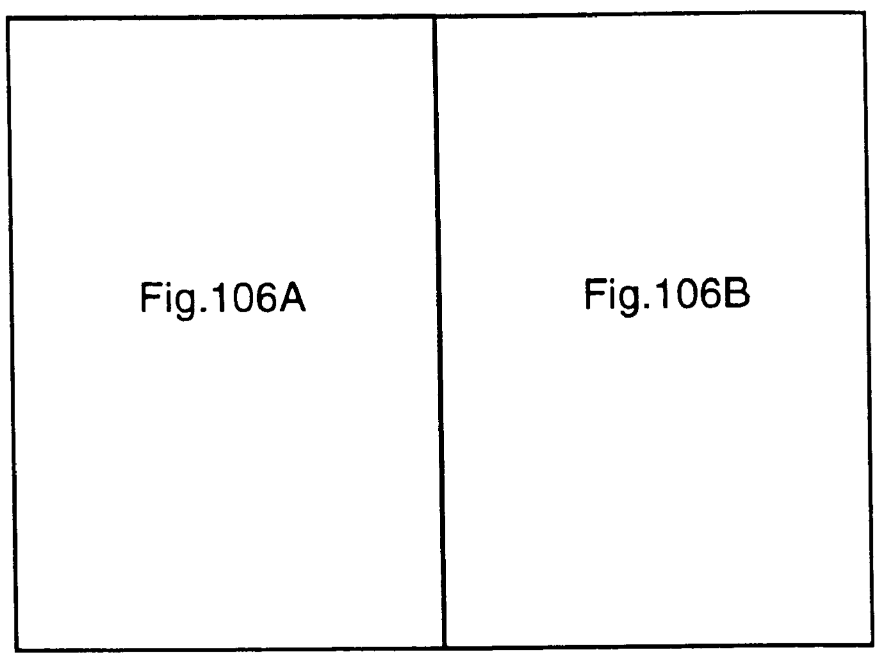
FIG. 106 is an illustration of a General Journal output screen display.
Figure 107:
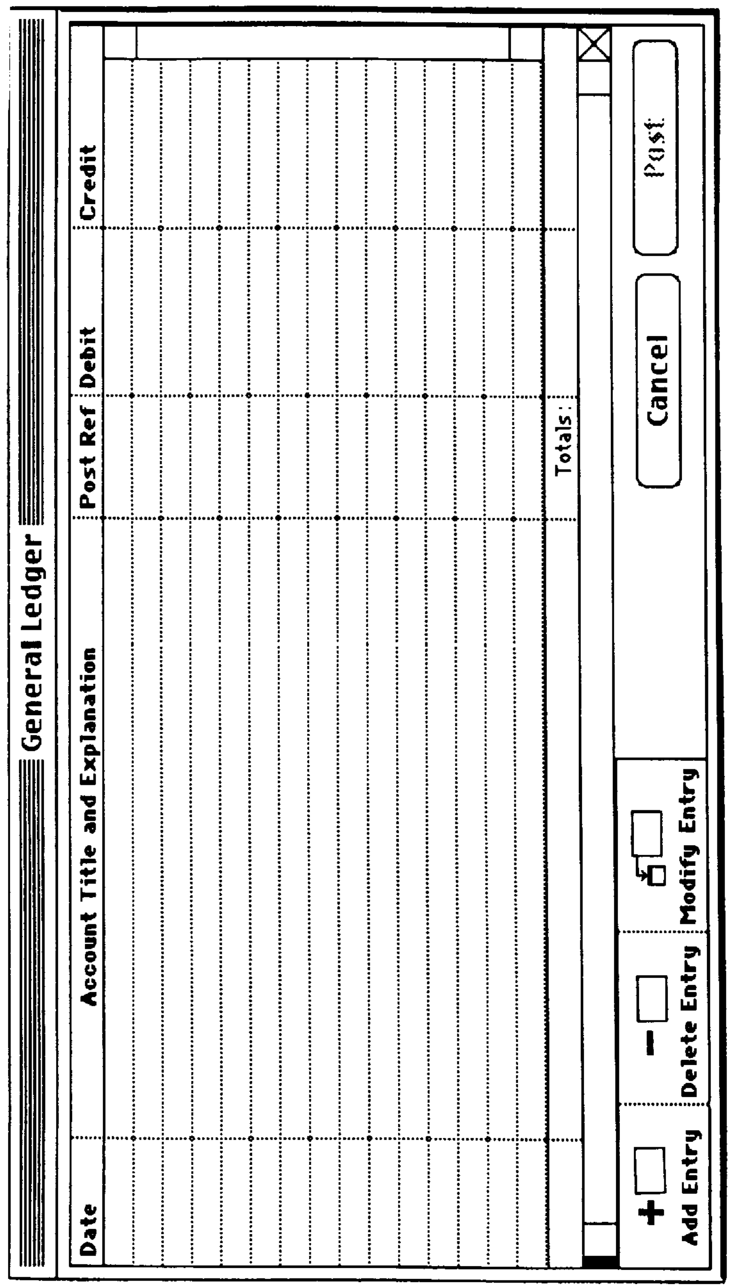
FIG. 107 is an illustration of General Journal input screen display.

Referring to FIG. 106, a general journal display is shown in accordance with an exemplary embodiment of the invention. For each transaction there is displayed a journal reference number, account titles and explanation, and posting reference to the account codes of the accounts debited or credited as result of the transaction. Doubling-clicking on a particular account results in a display such as that of FIG. 107. The date of each transaction contributing to the balance is shown, together with an explanation, the journal reference number, and the amount.

Figure 108A:
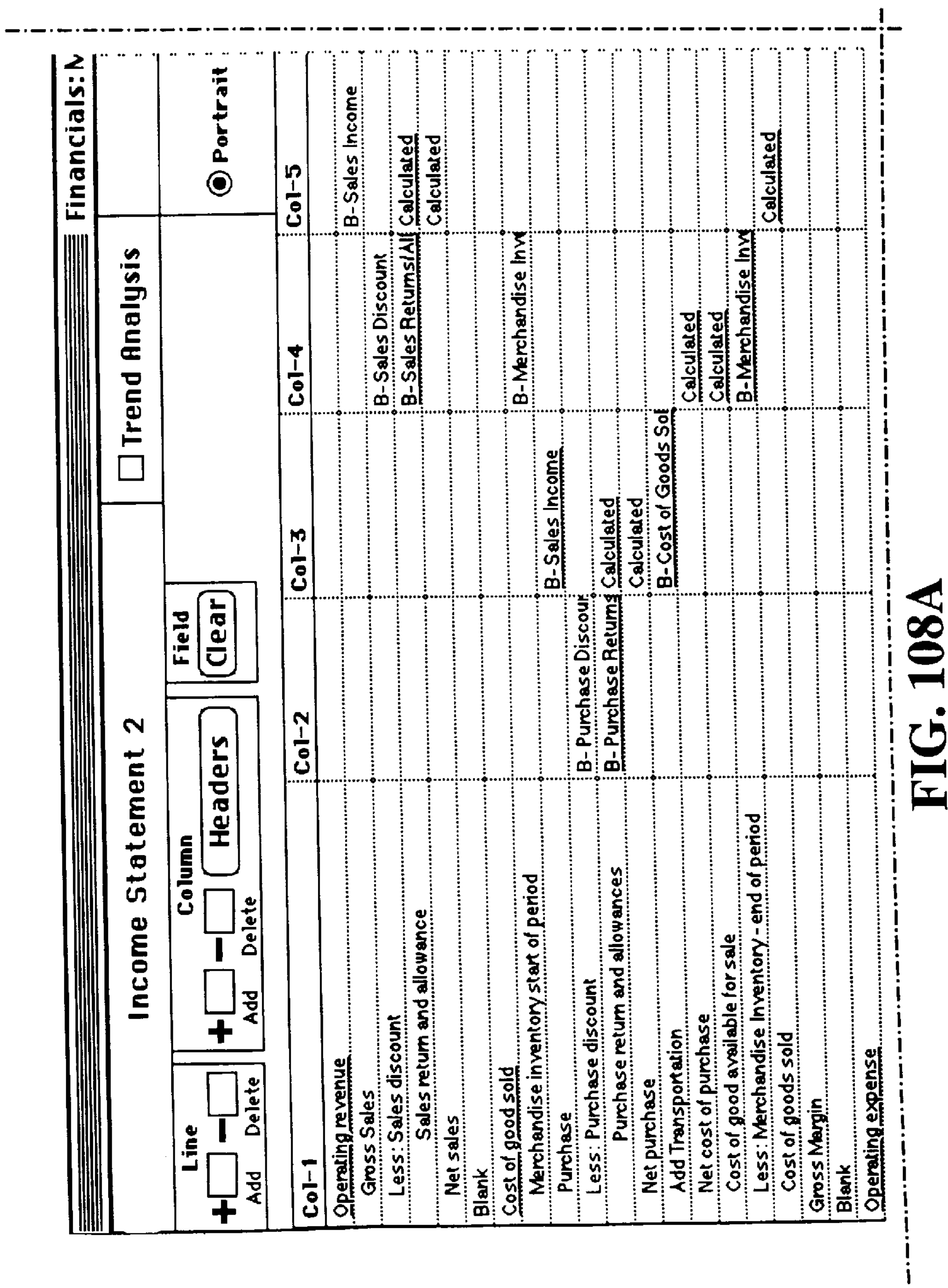
FIG. 108 is an illustration of a screen display used for financial report definition.
Figure 108B:
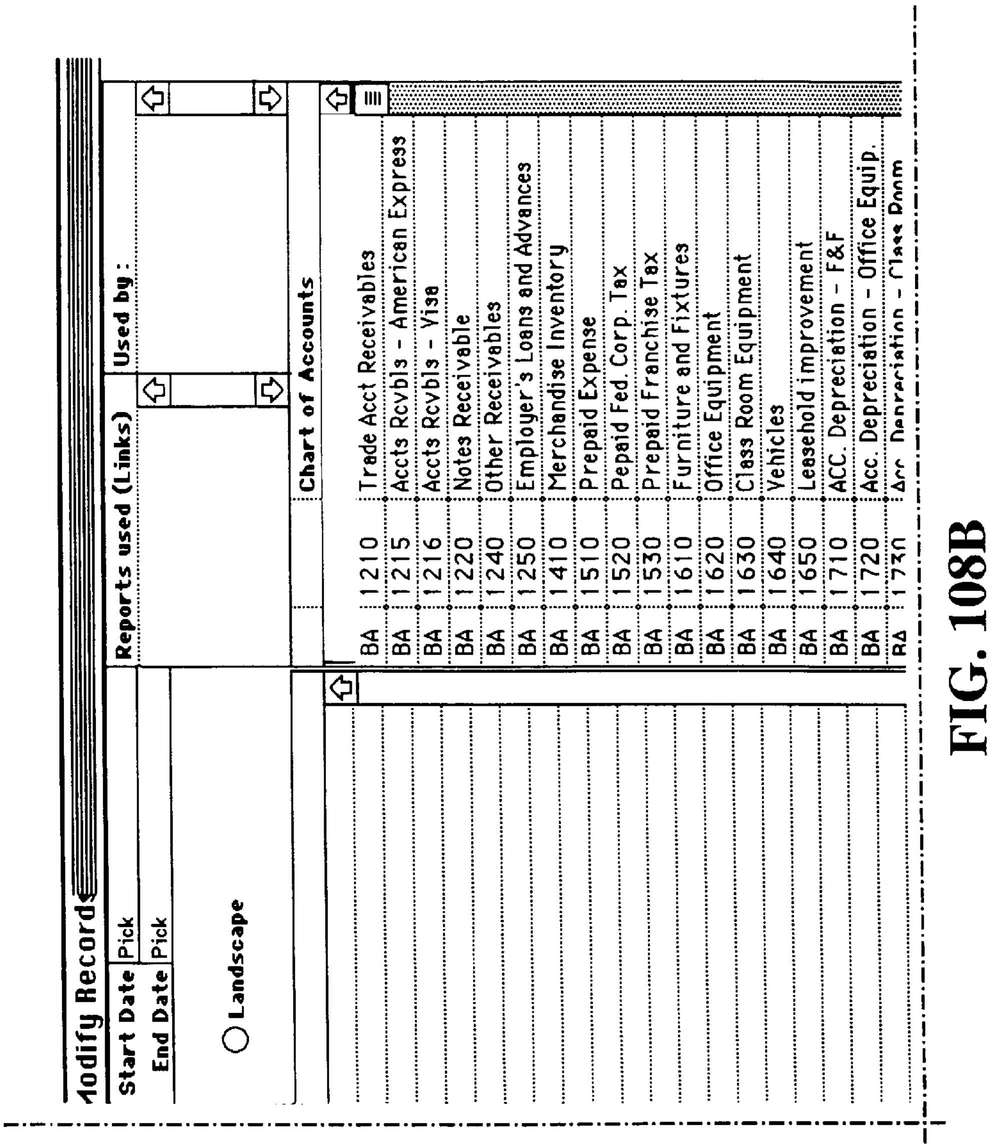
Figure 108D:
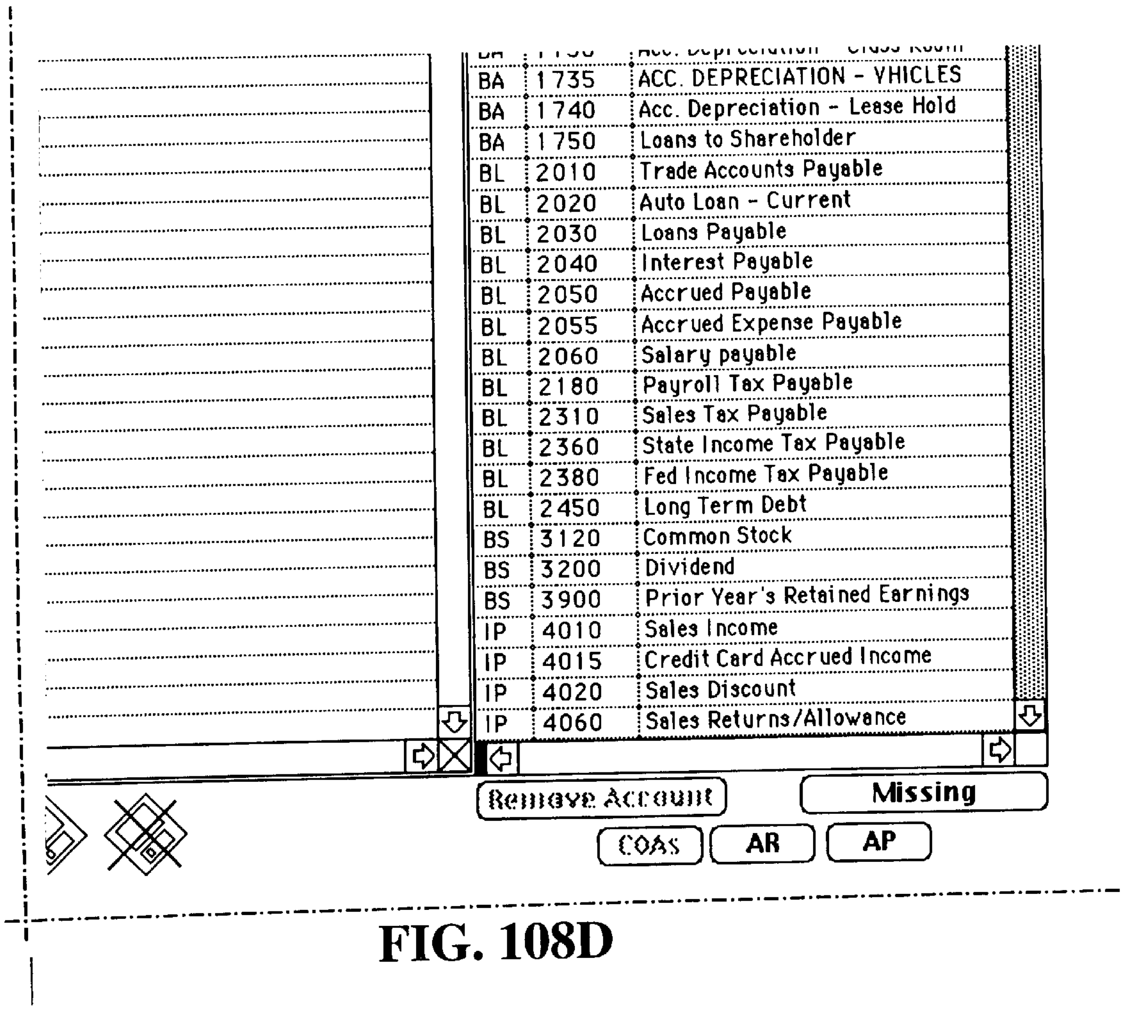

As a result of the continuous, automatic posting activity described, once a financial report has been defined, it may be run at any time (or at scheduled times) and is assured to be up-to-date. Moreover, it is verifiable, i.e., every supporting transaction may be readily retrieved and viewed. In an exemplary embodiment, a financial report is defined using a display screen such as that of FIG. 108. The display follows a familiar spread-sheet-like format. For each line of the report, a line item description is entered. Then, in the appropriate column, the user enters either an account (by selecting from the chart of accounts pop-up), a calculation formula, or even the result of another report. When a report is run that requires the result of another report, that other report is run first. An actual report generated using the report definition of FIG. 108 is shown in FIG. 109.

Figure 109:
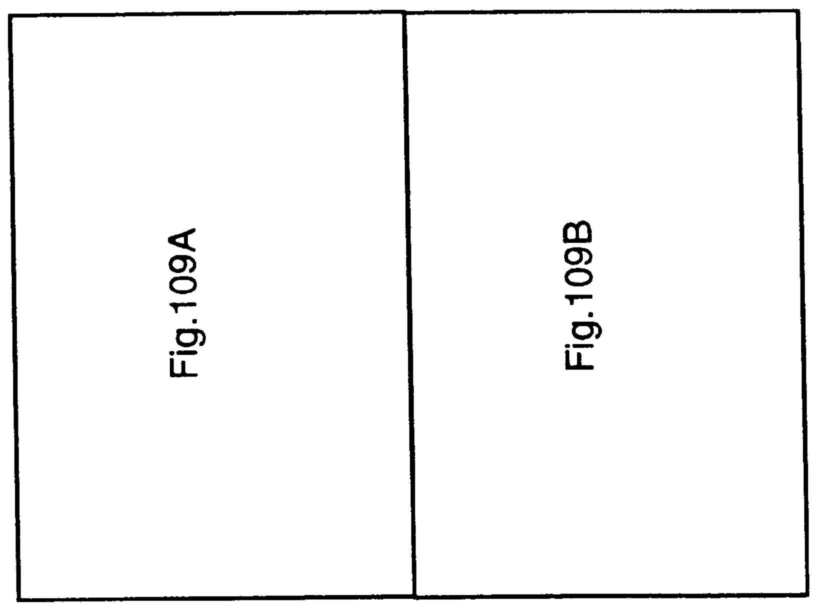
FIG. 109 is an illustration of a resulting financial report.
Figure 110A:
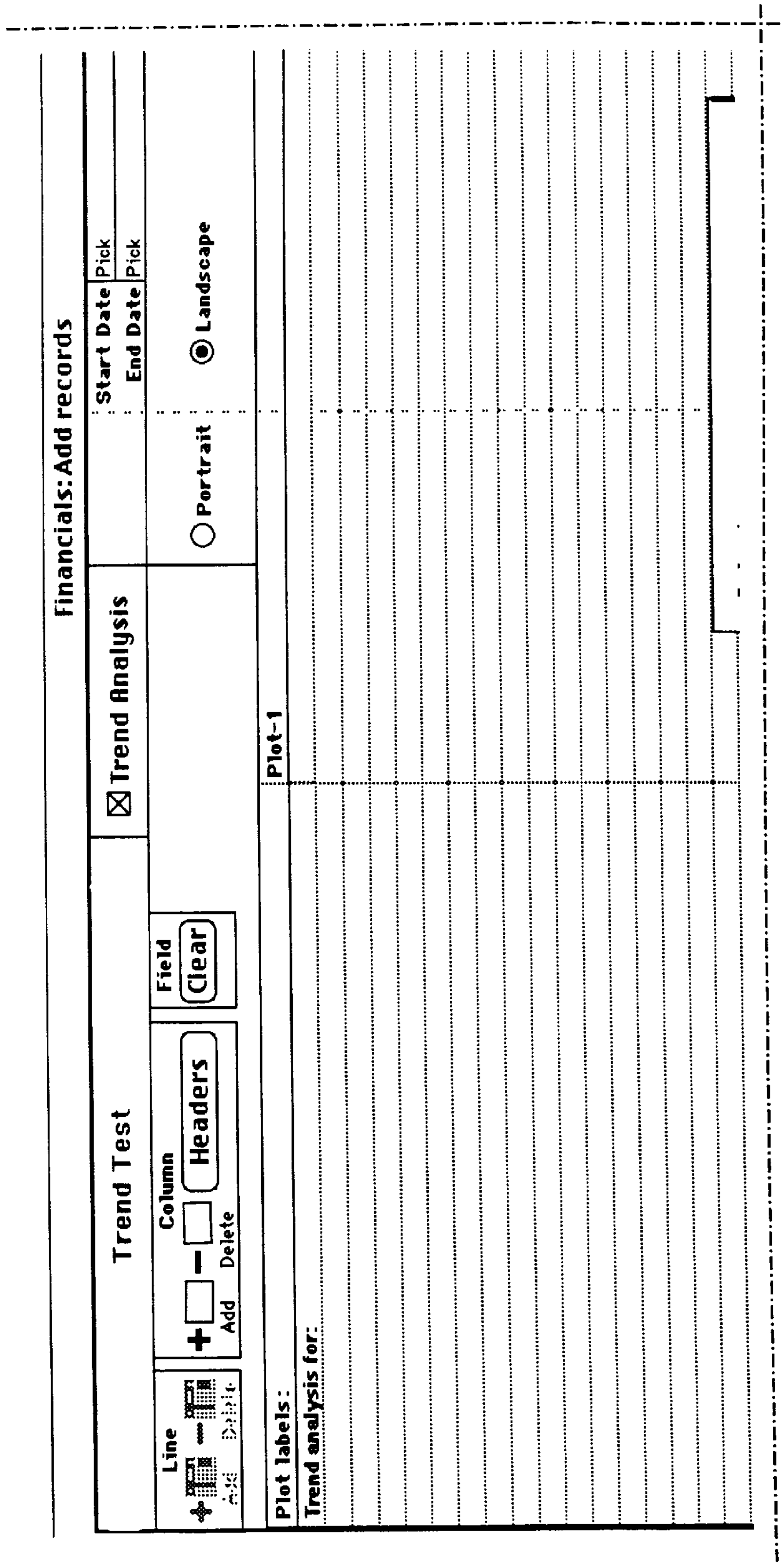
FIG. 110 is an illustration of a screen display used for trend report definition.
Figure 110B:
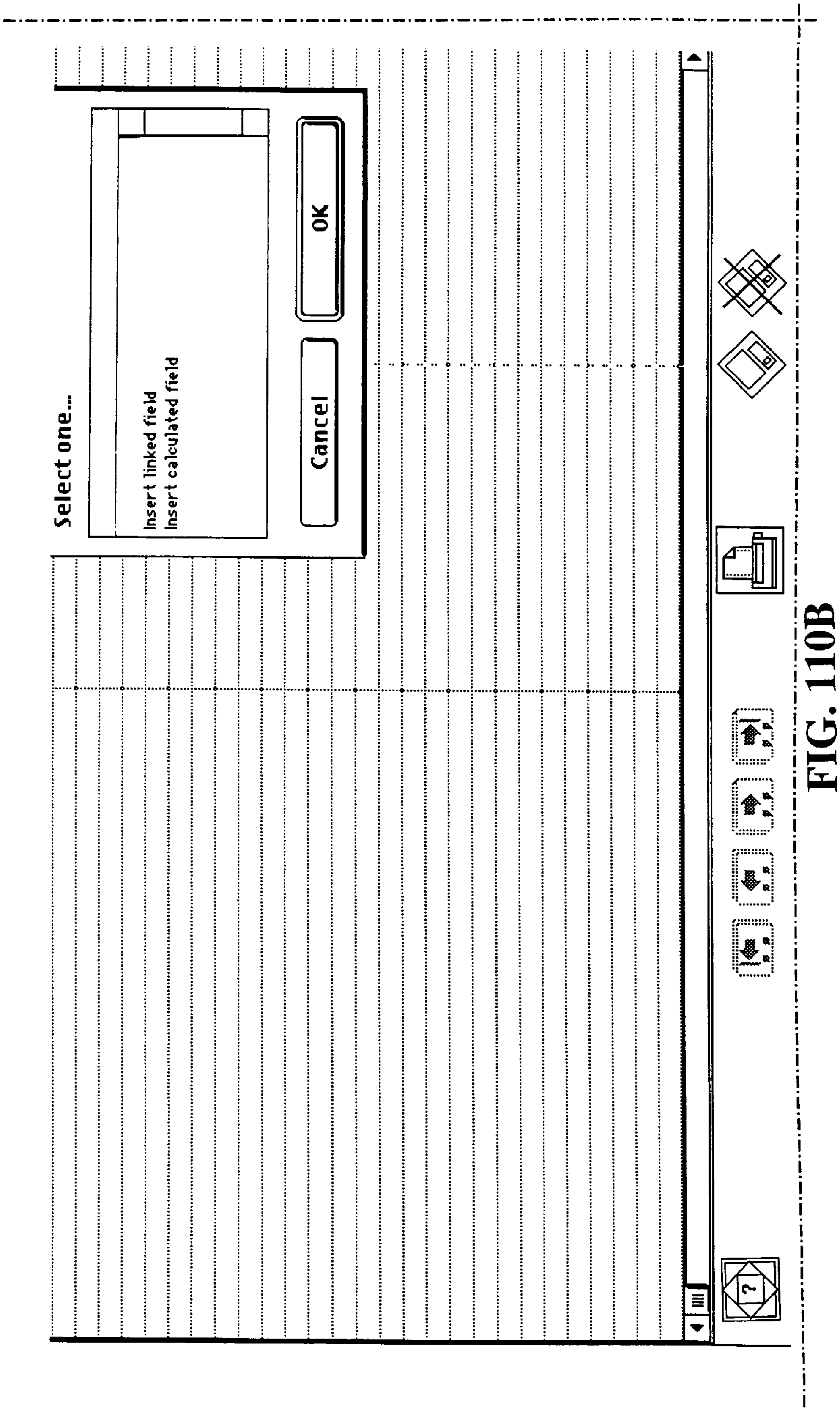
Figure 110C:
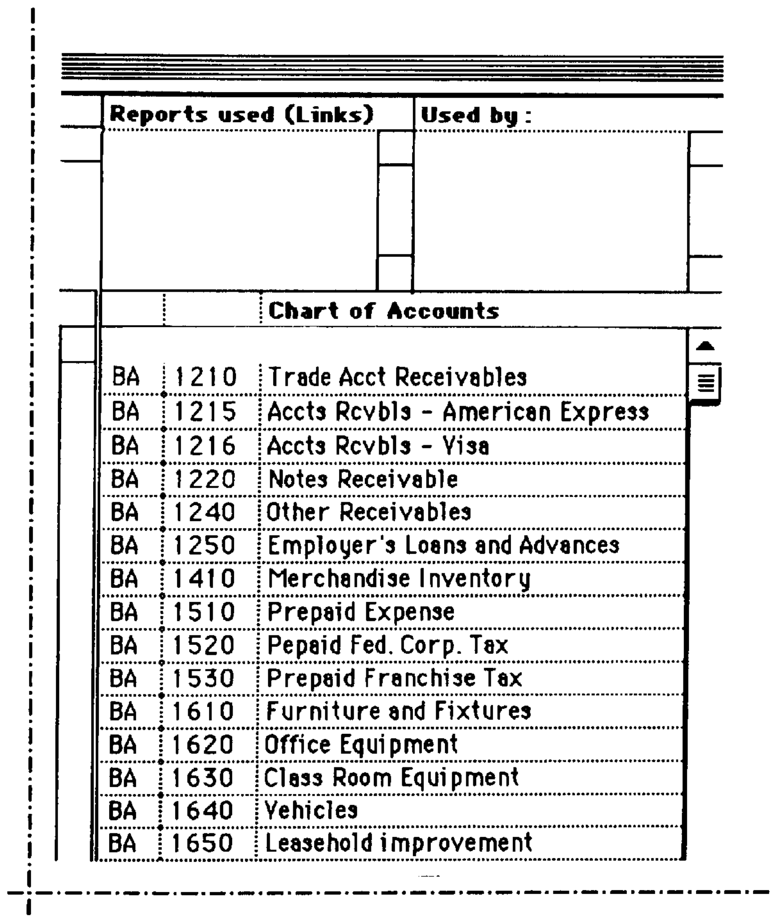
Figure 111:
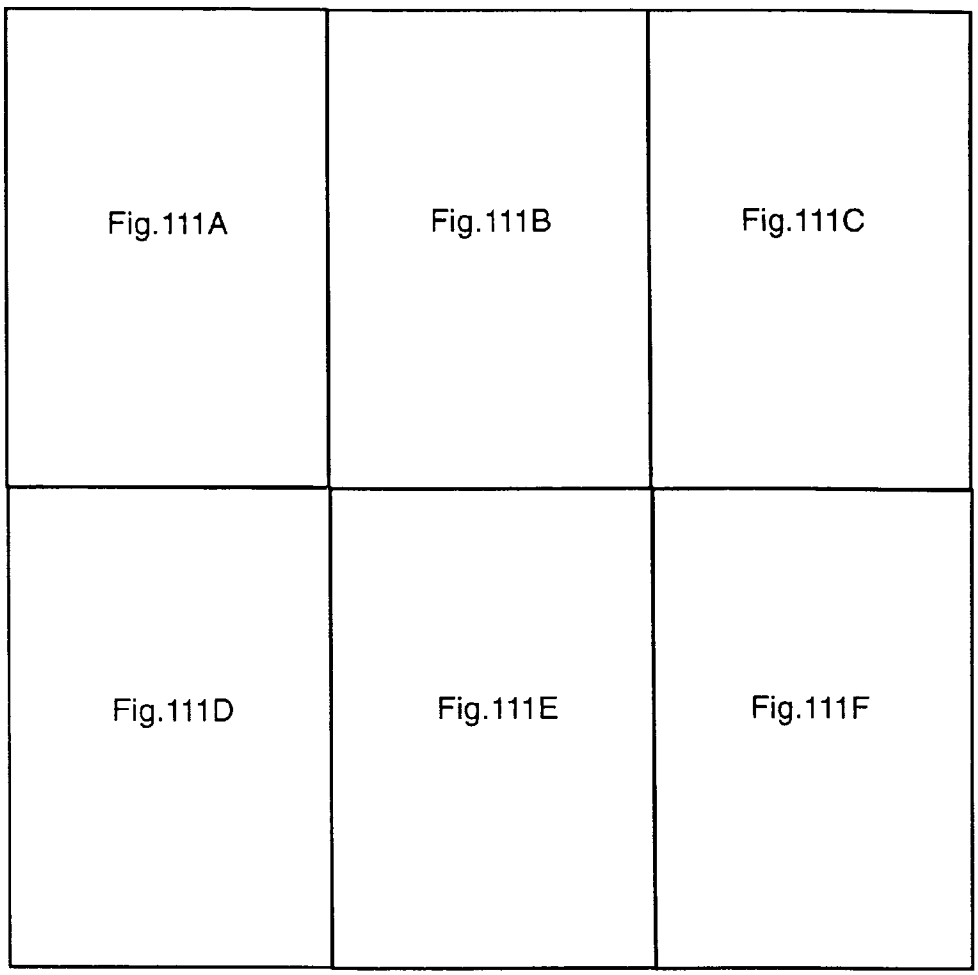
FIG. 111 is an illustration of screen display including a dialog used to select trend frequency.
Figure 111A:
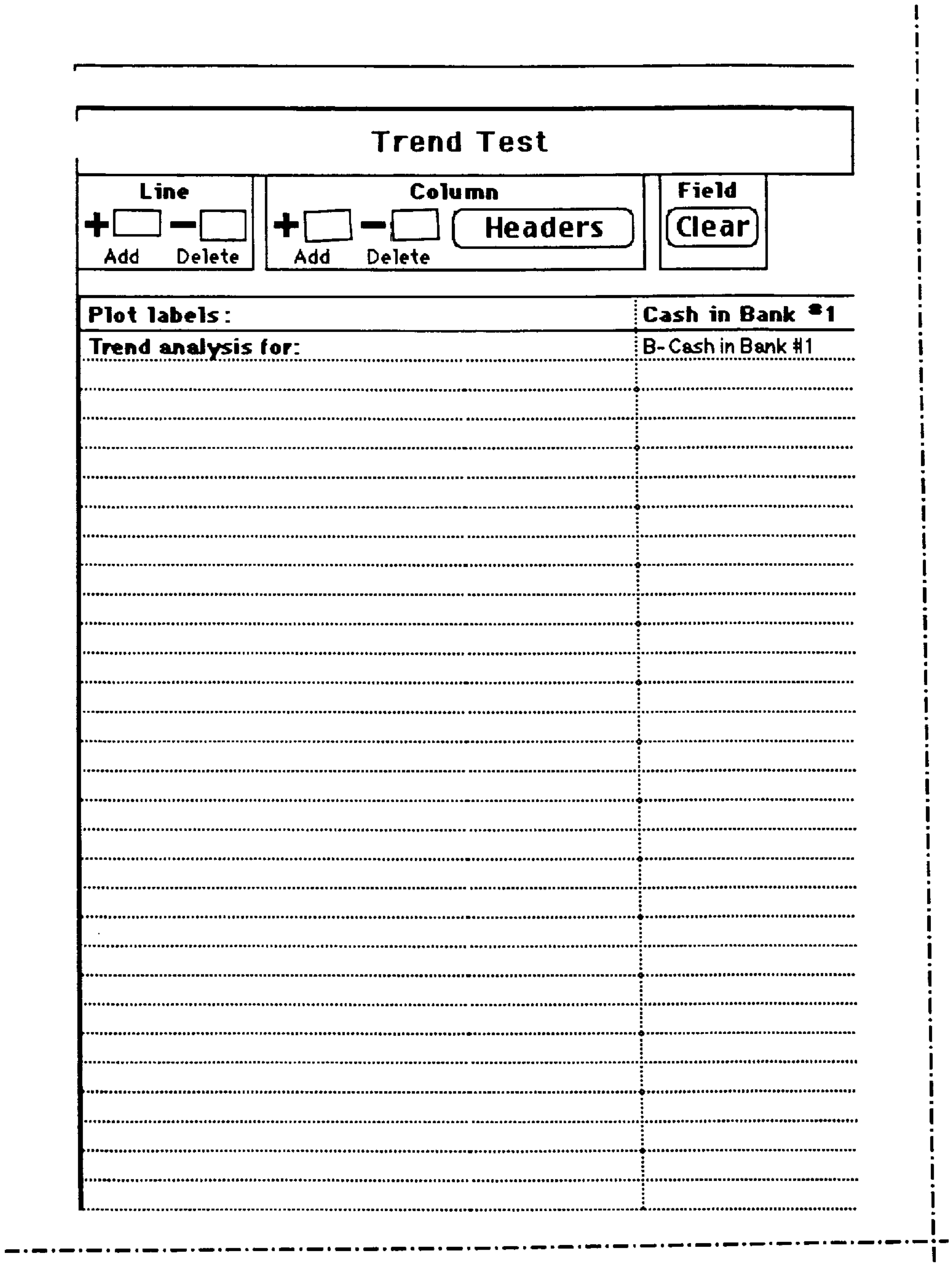
Figure 111B:
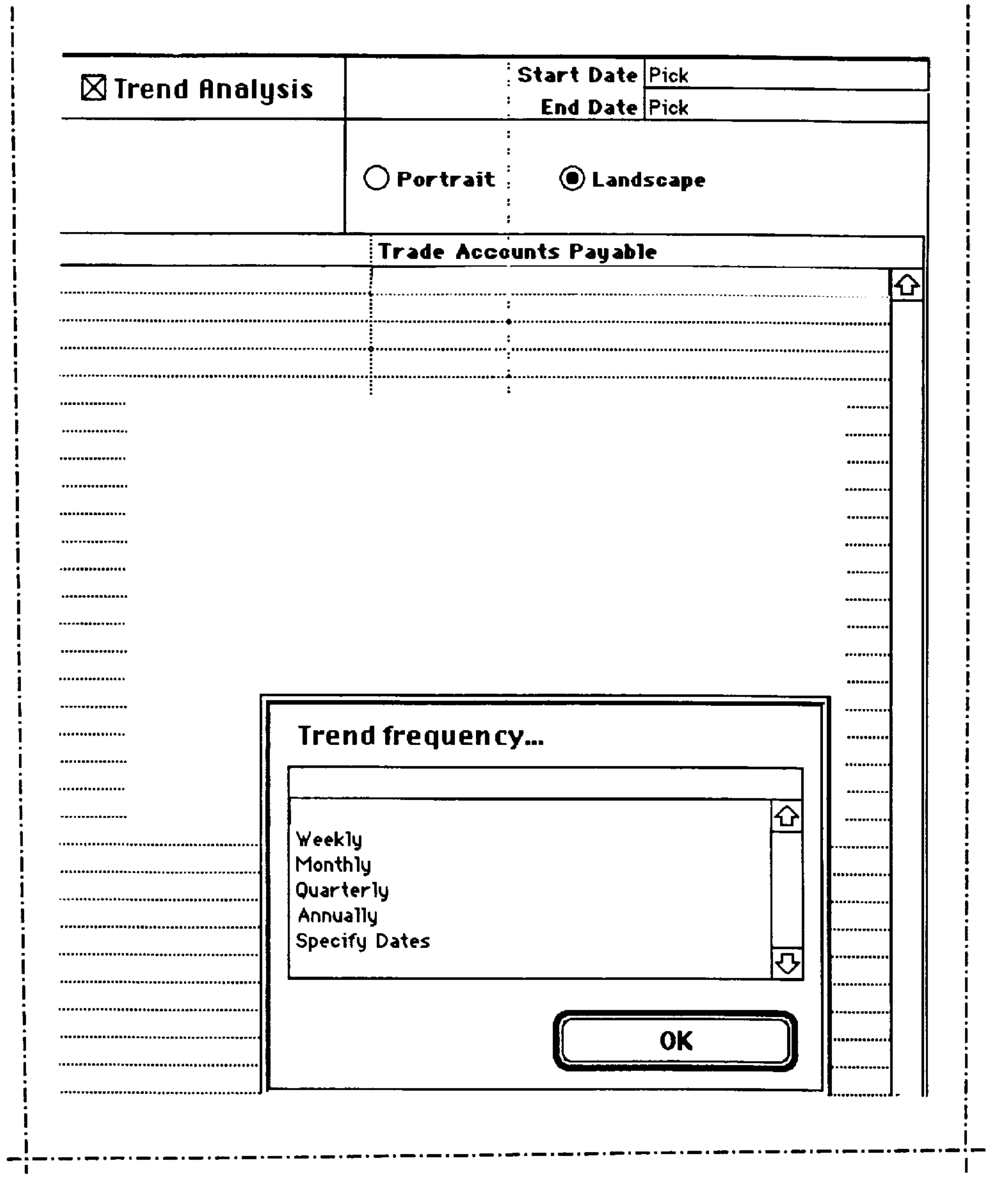
Figure 111D:
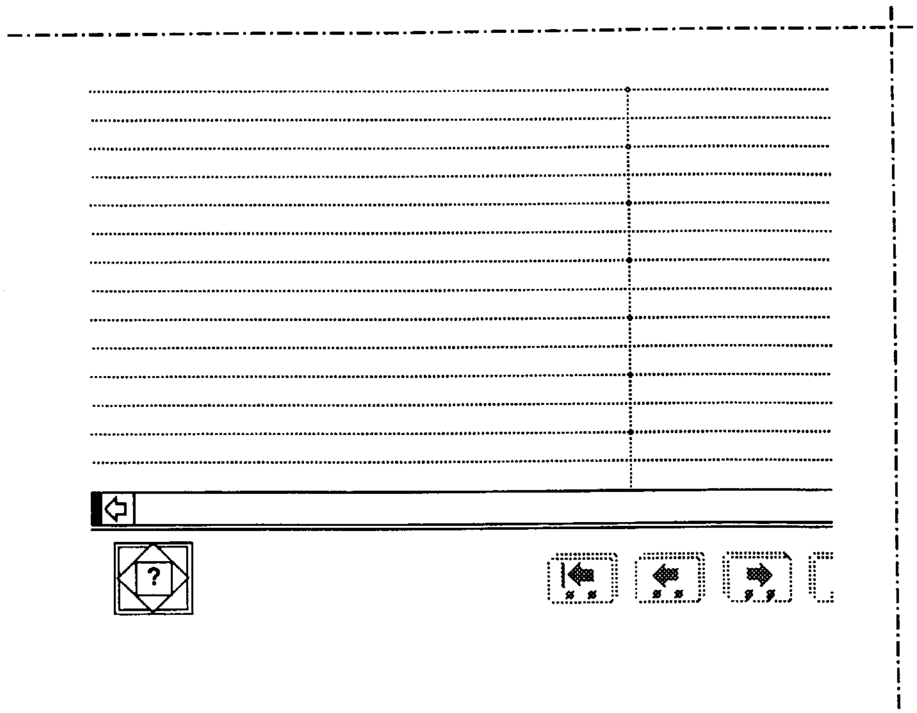
Figure 111E:
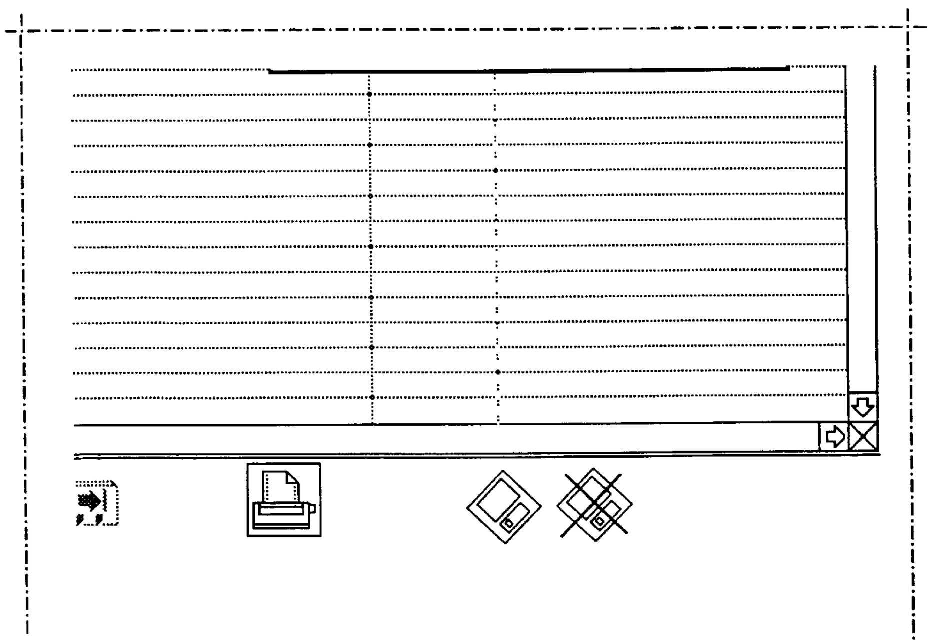
Figure 111F:
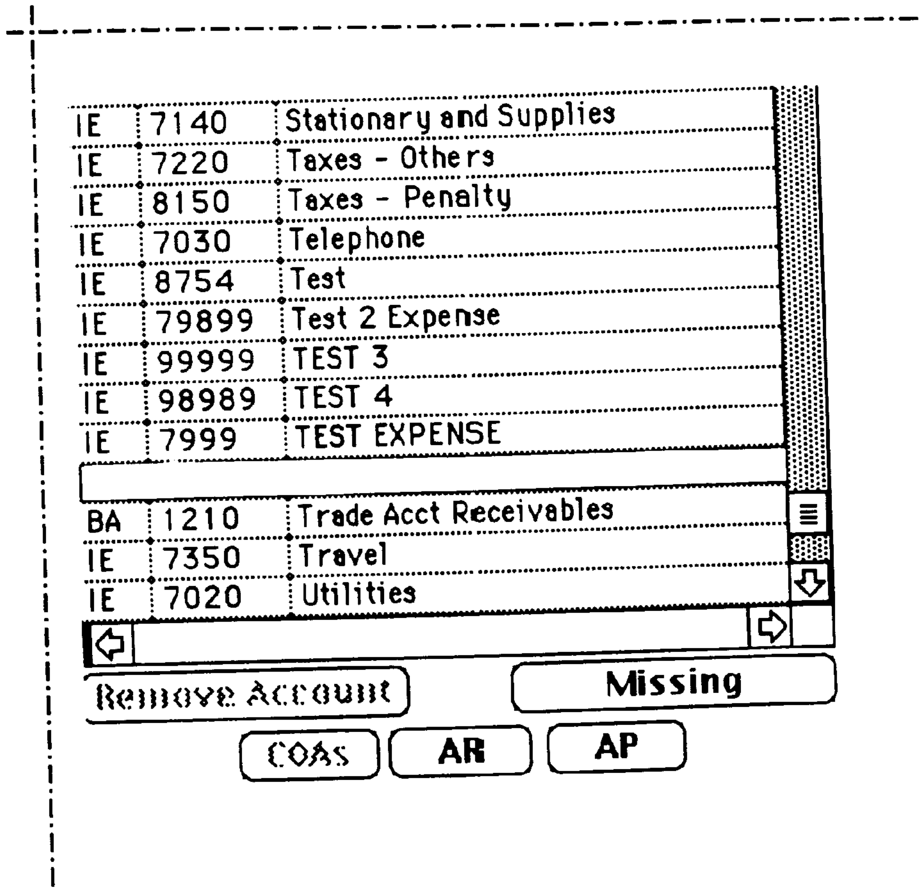
Figure 112:
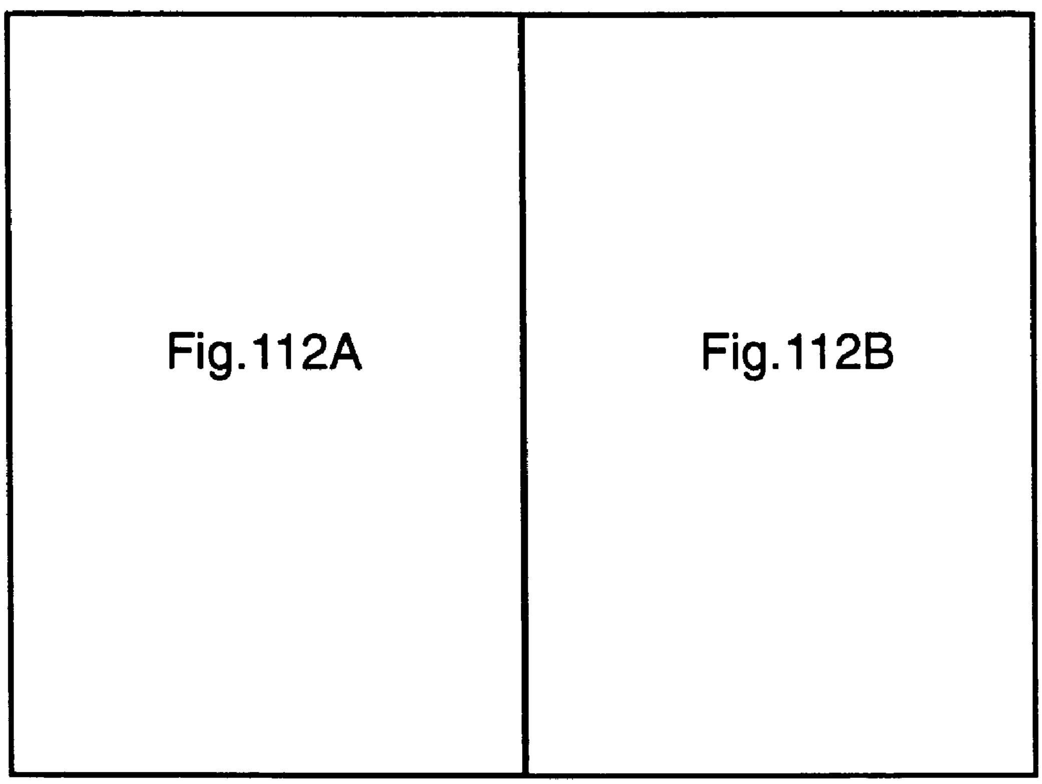
FIG. 112 is an illustration of screen display including a window in which trend report data are displayed.
Figure 112A:
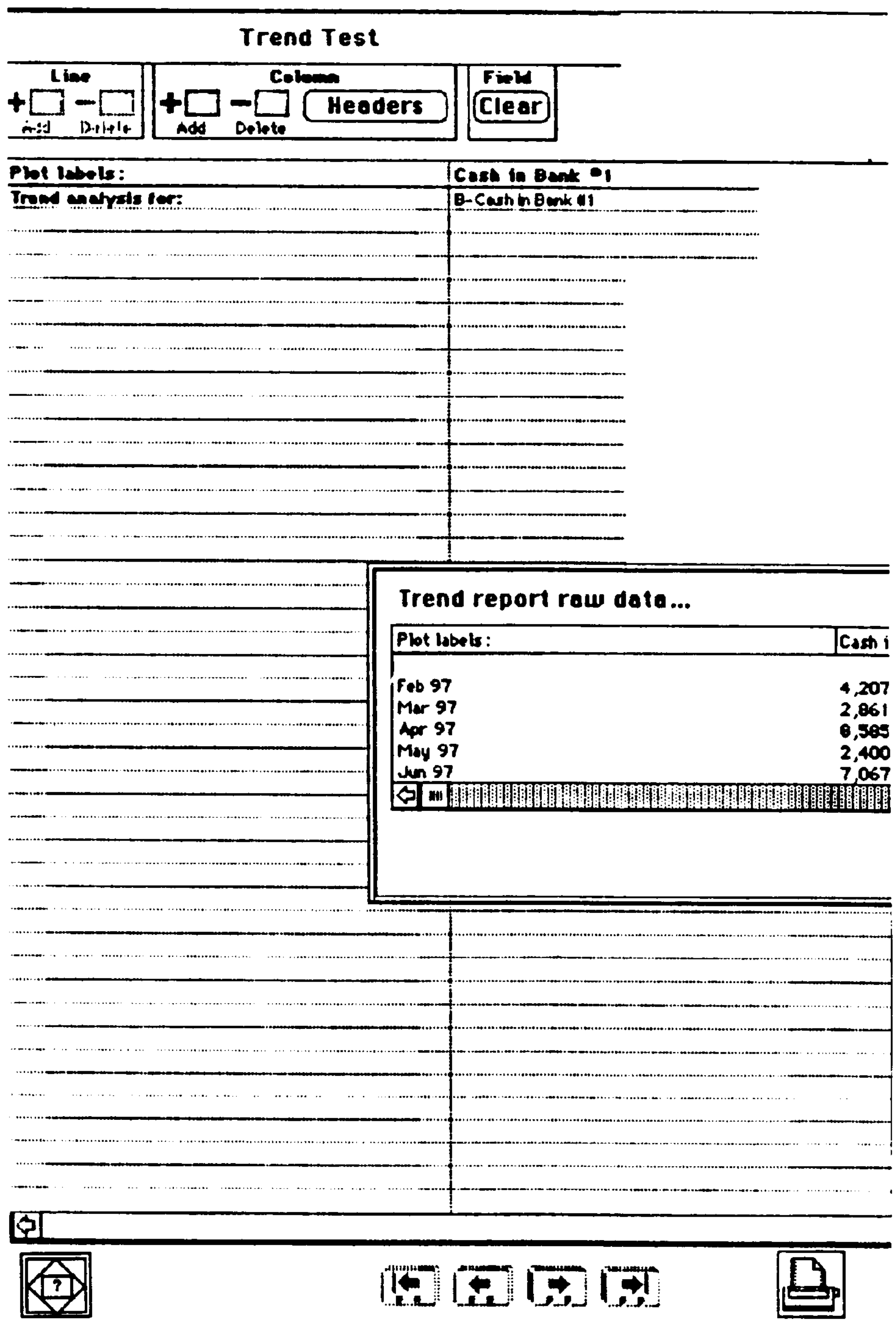
Figure 112B:
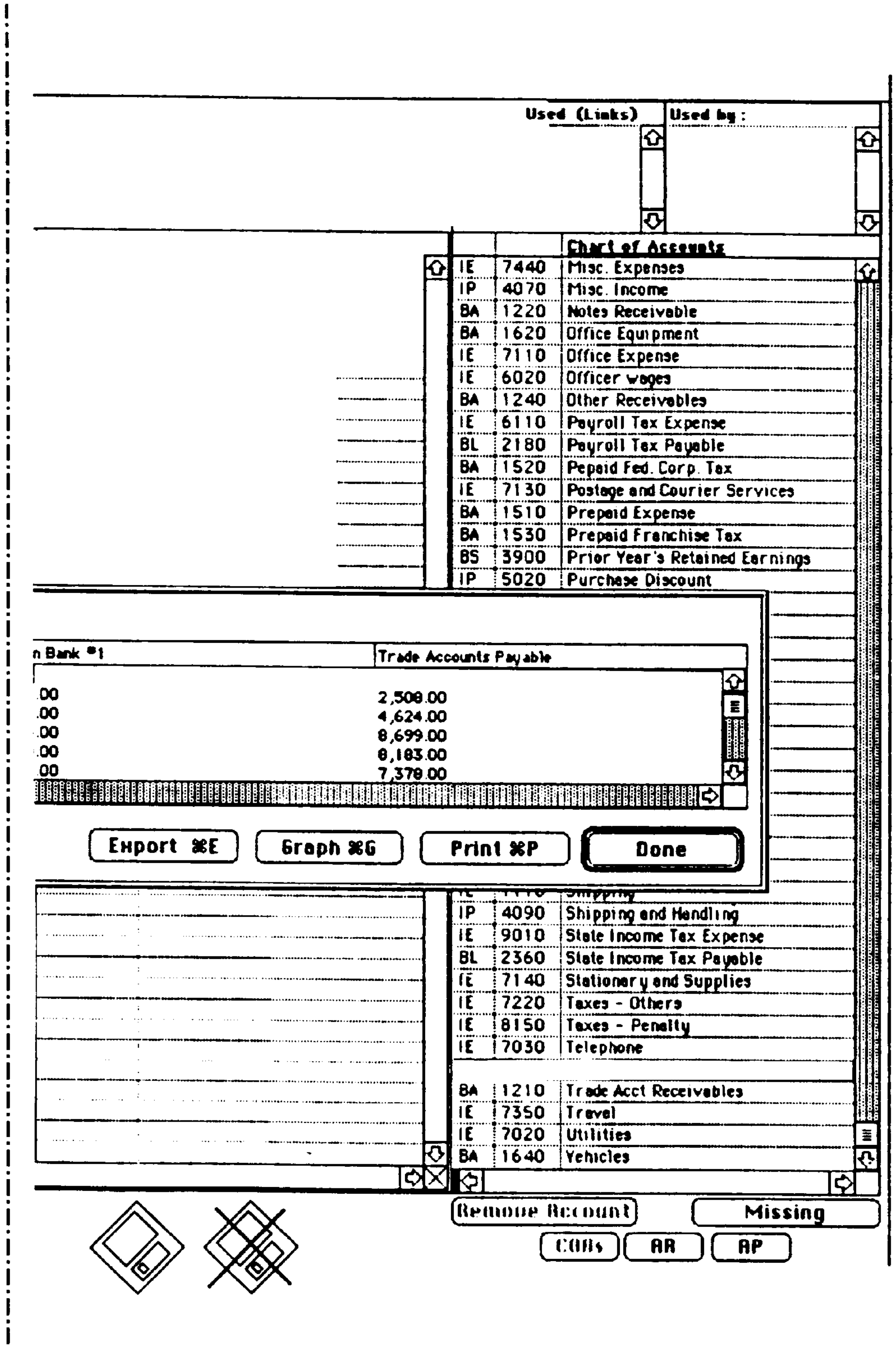
Figure 113:
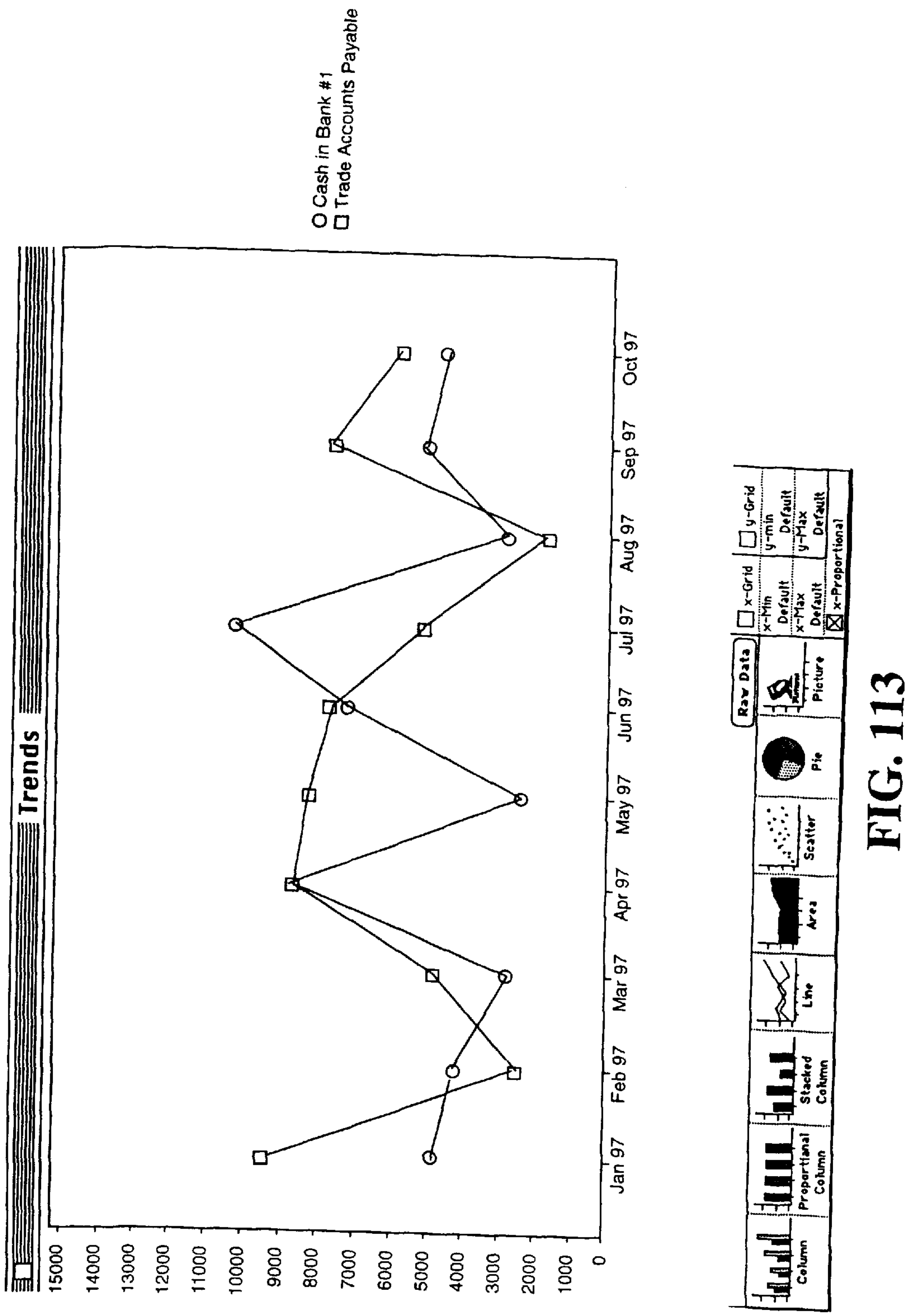
FIG. 113 is an illustration of a trend report graph screen display.

A report, instead of being the line-time type of FIG. 109, may be a trend analysis report. Trend analysis provides a powerful tool for understanding interrelationships between various aspects of a business. Referring to FIG. 110, a trend analysis report is defined in similar manner as an ordinary financial report. A cell is selected and the user is prompted as to whether the cell contents is to be a local balance, a linked field (from another report), or a calculated field. In the illustrated example, local balance is selected, and the user selects an account from the chart of accounts pop-up, in this instance Cash in Bank #1. To investigate the interrelation of different accounts, a further account would then be selected, say Trade Accounts Payable. Plot labels may be entered by the user that differ from the actual names of the accounts themselves. Referring to FIG. 111, a trend frequency is then selected. In the example of FIG. 111, the trend frequency has been set to daily. The trend analysis is then run and the raw data displayed as shown in FIG. 112. Referring to FIG. 113, various graphing options are provided. In the illustrated example, the data is presented in the form of line graphs.

Trend reports, aside from comparing one account to another over the identical period, may also compare the same account over different periods. Hence, in the case of both financial reports and trend analyses, an important feature is that the date range of the report is arbitrary. Historical data for all past periods (or at least a considerable number of past periods) is stored in the database, enabling reports to be run for any period of time, not just the current period.

Human, Group and Organization Performance

Having described for an order the course of events in the financial performance domain, the course of events in the personnel domain will now be described.

Figure 114:
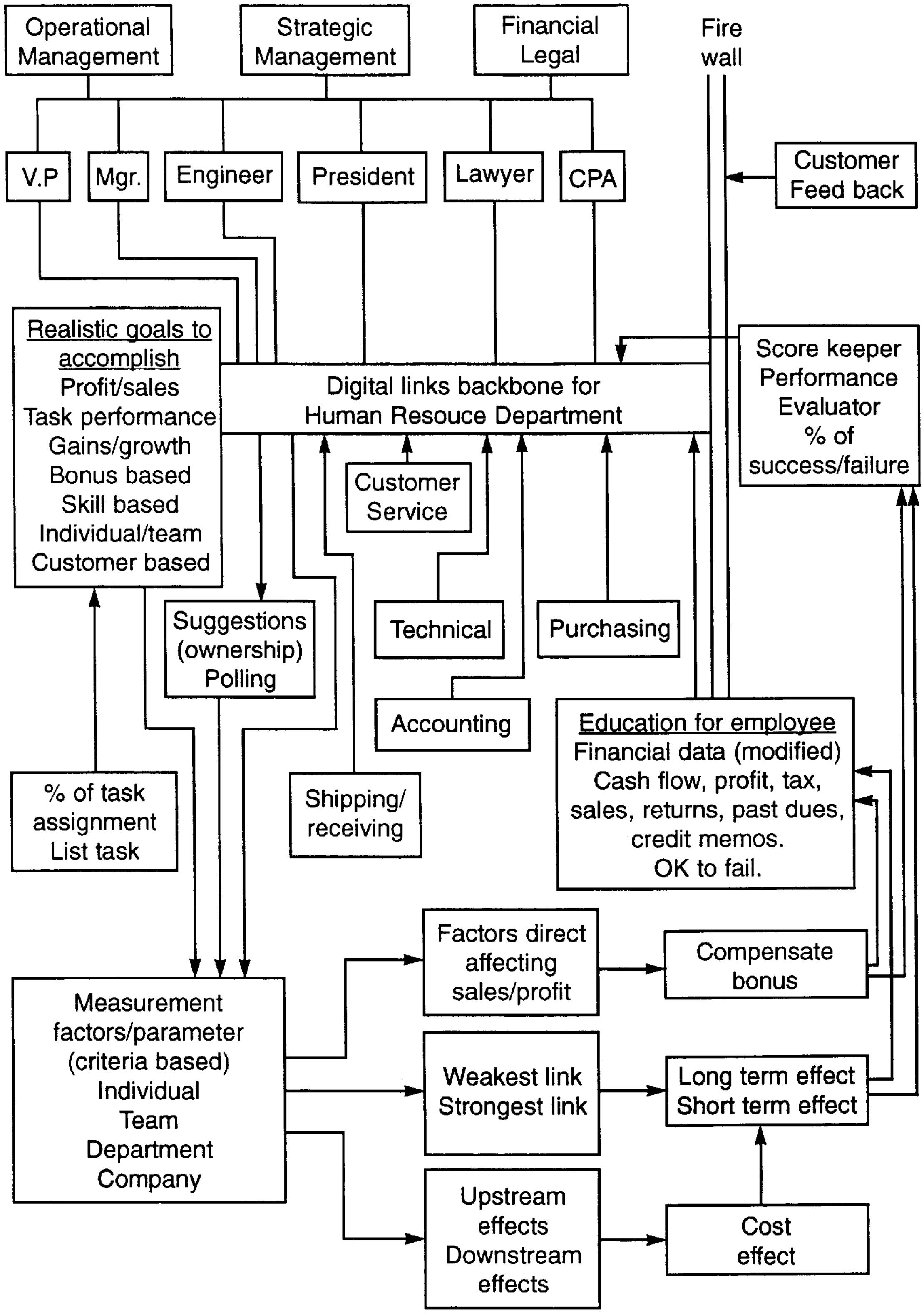
FIG. 114 is a block diagram of a human resource infrastructure for a virtual organization performance evaluation model.

Referring to FIG. 114, there is shown a human resource infrastructure for a virtual organization performance evaluation model. All company personnel are linked to a digital "HR backbone," including operational management (VP.s, managers), engineering, strategic management (president), financial and legal personnel (CPA, lawyer), and staff within various departments (customer service, shipping/receiving, technical, accounting, purchasing, etc.). In concept, the HR backbone could be any information conduit. In an exemplary embodiment, the HR backbone is realized by the same integrated, Web-enabled, client/server database as described heretofore. Various functional blocks manipulate data stored within the database and form a personnel module.

Two functional blocks in particular from the basis for performance evaluation, a Measurement Factors block and a Score Keeper block. For each individual whose performance is to be tracked, a list of tasks performed by the individual is compiled, together with an estimate of what percentage of the individual's overall assignment each particular task constitutes. Using this information, the individual participates in the setting of realistic goals within various categories. These goals are stored so as to readily accessible to the individual for frequent review. The goals in turn dictate measurement factors/parameters tracked by the "descriptive" Measurement Factors block. These factors/parameters form the answer to the question "What is the pertinent data within the database upon which to evaluate the performance of the individual?," both individually and as a team player. Suggestions received from within the organization may influence the pertinent measurement factors/parameters.

The question, "How should the data be viewed?" is answered by a group of "normative" functional blocks. These blocks generate outputs to the Score Keeper block, which measures the degree of success or failure with respect to each goal. The same outputs are input to a "presentation" block that serves to educate employees as to the effects of various normative performance measures on financial performance and on factors affecting customer satisfaction, to help employees identify trends, etc.

Customer feedback (both commendations and complaints) are preferably also be received by and input to the system. A firewall provides security for internal data and allows limited access by customers to provide feedback Customer feedback, although not strictly objective like the other factual measures of performance tracked by the database, can be an important indicator of performance.

Figure 115:
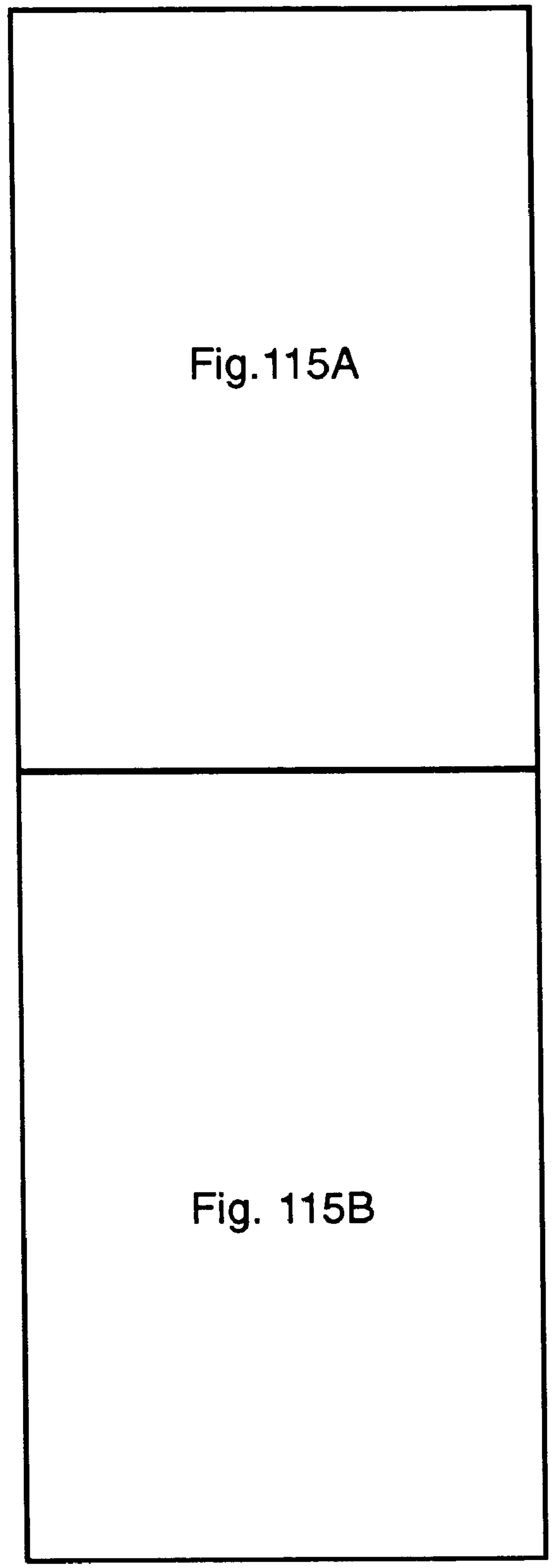
FIG. 115 is an illustration showing in greater detail portions of the human resource infrastructure of FIG. 114.
Figure 115A:
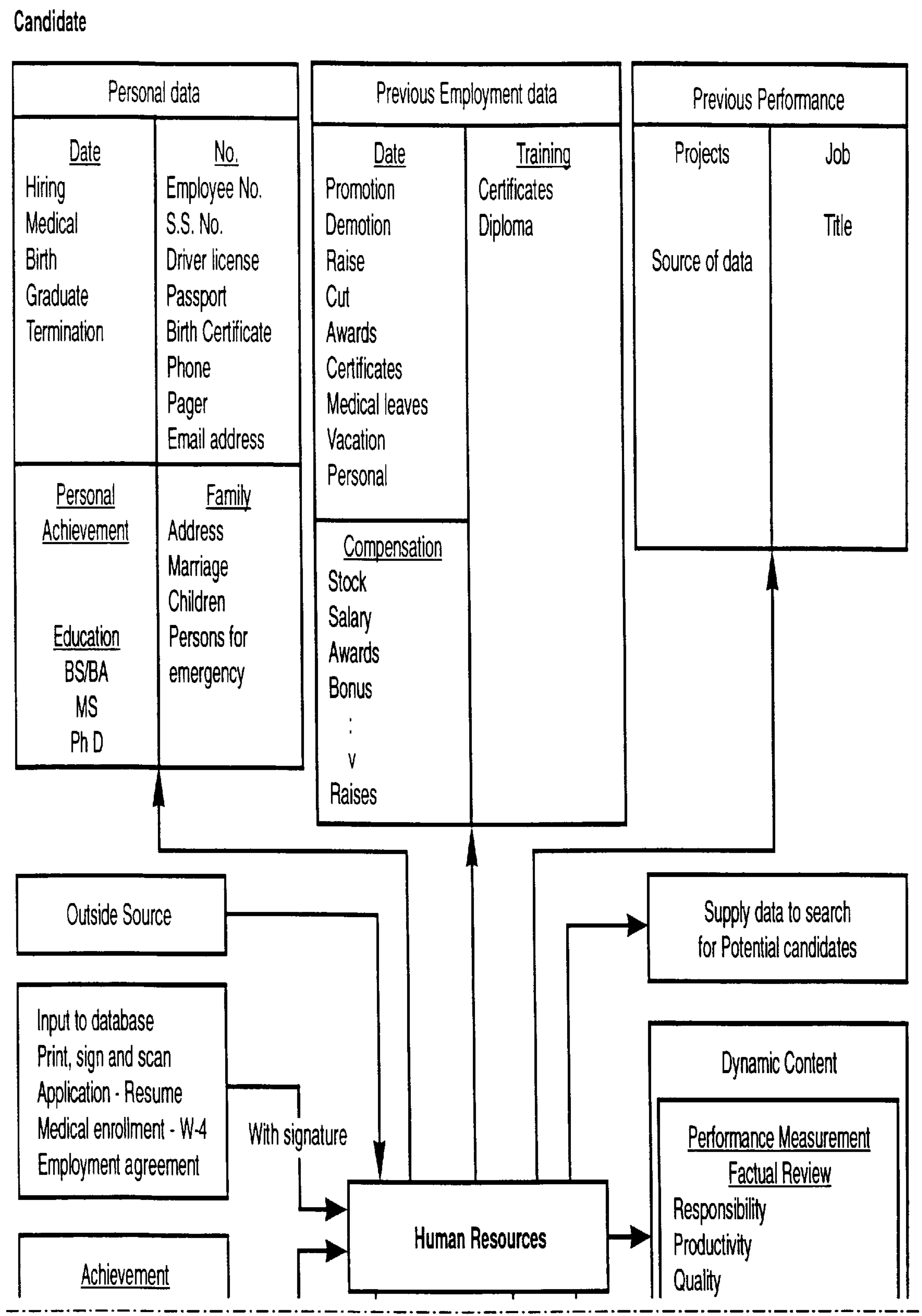
Figure 115B:
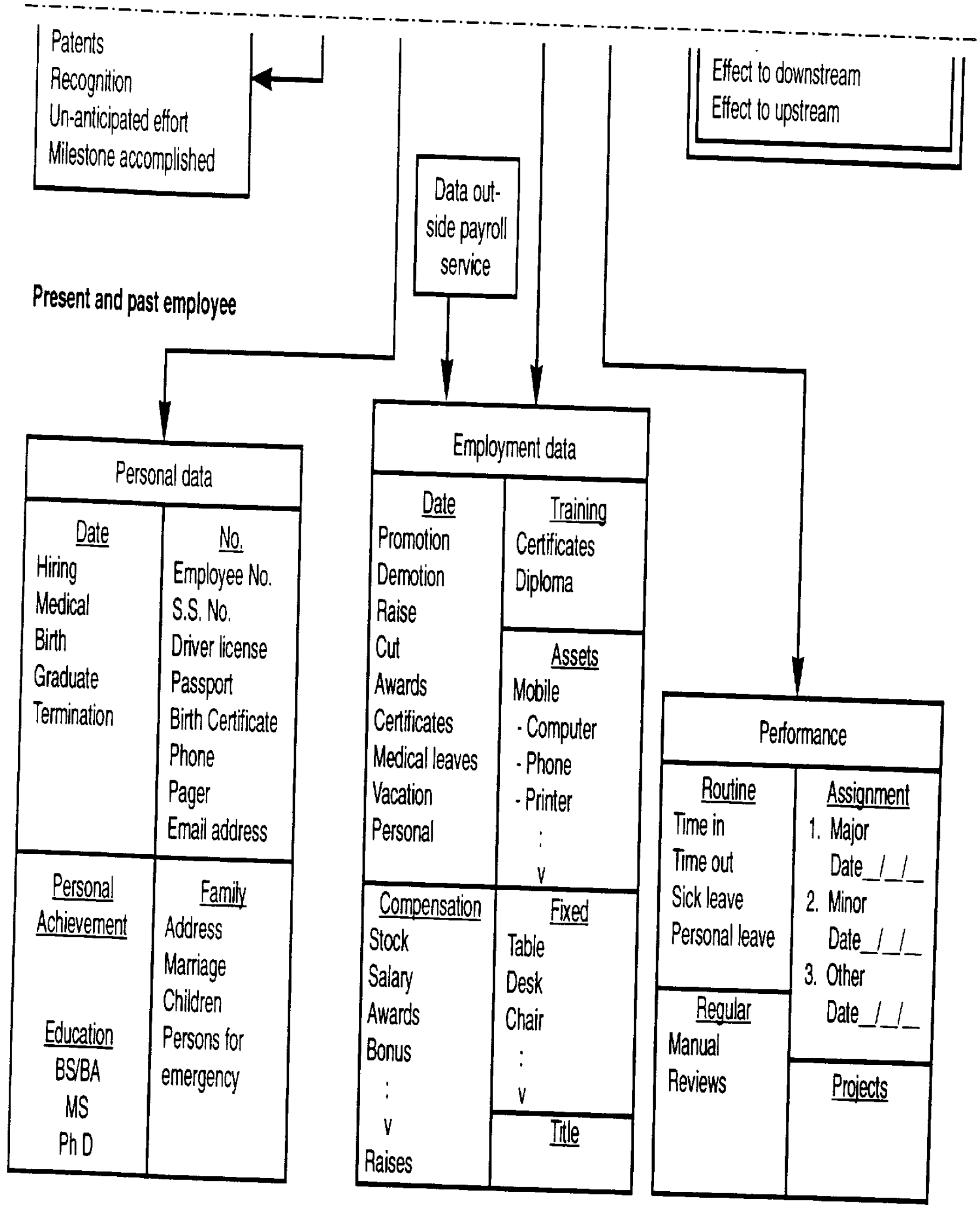

Referring to FIG. 115, a more detailed view is shown of the kinds of data stored in the human resources portion of the database. With the exception of data relating to performance measurement factual review, the data represented in FIG. 115 is static or semi-static data that changes relatively infrequently or not at all. The top portion of the figure relates to candidate data, whereas the bottom portion of the figure relates to employee data.

For candidates, data stored in the database includes personal data, previous employment data, and previous performance data. The data is obtained from the candidate and from other outside sources, and may also be made available to the candidate, e.g., through the Web. During the hiring process, employment documents are scanned (or input directly by the candidate during the application process) into the database. For employees, data stored in the database also includes personal data, employment data and performance data In addition, for employees, data regarding achievements and special recognition is stored.

Figure 116:
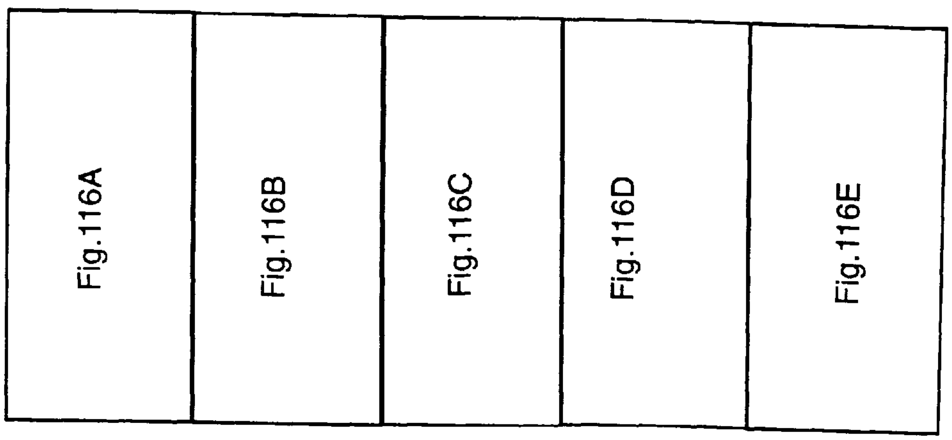
FIG. 116 is an illustration of a file structure used to track all performance metrics of interest.

Performance measurement factual review is dynamic in nature and may be performed in a manner illustrated in FIG. 116. Depending on the organizational level, performance measurement is either financial-oriented or assignment oriented. For branches, divisions, subsidiary companies and their parent company, for example, performance measurement is financial-oriented and uses financial analysis algorithms. In particular, using the universal financial report generator described previously, any desired financial ratio may be tracked, as well as any arbitrary combination of account codes in order to discover relationships. Cash flow statements and budget analyses may also be generated. Based on this information financial performance goals may be set and contributing goals may be accurately derived.

At the department, group and employee level, performance measurement is assignment oriented.

Referring to FIG. 116, evaluation of human performance is made possible by collecting an assemblage of activity data to which analysis algorithms may be applied. This assemblage of activity data is referred to as Algorithm of Activity Data. For each different assignment (e.g, Quotes, MWSs, Customer Invoices, etc.), activity is tracked in three principal ways: quantity per period, dollar volume by period, and time between stages of completion (e.g., time from posting of quote to conversion to MWS). The relevant period is preferably user-selectable. In addition, the responsible department and the upstream and downstream departments that affect and are affected by the assignment are identified (and refined, if necessary, as experience with the system is gained). RMAs affect all assignments and are therefore tracked in relation to each assignment. For example, quotes made during a period may total one million dollars but may have ultimately resulted in half a million dollars of RMAs.

Figure 117:
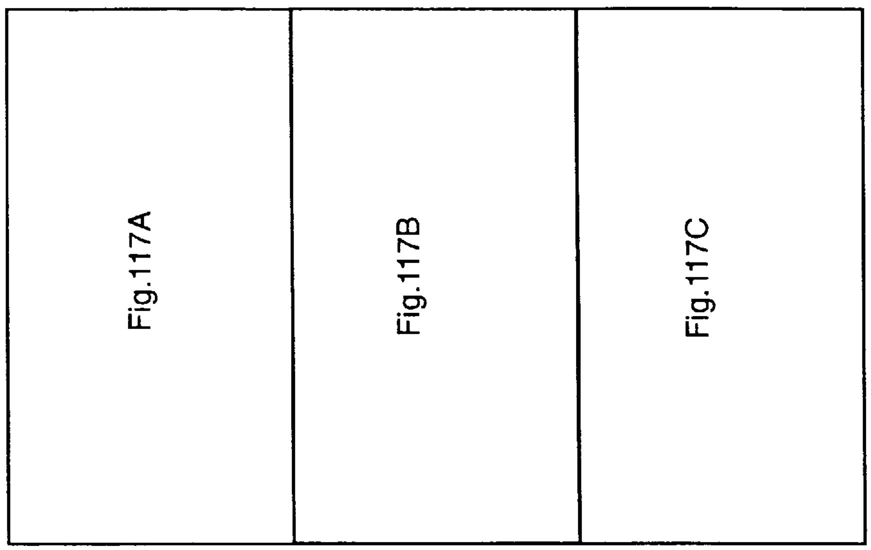
FIG. 117 is an illustration showing in greater detail the Factual Measurement Review process of FIG. 115.
Figure 117A:
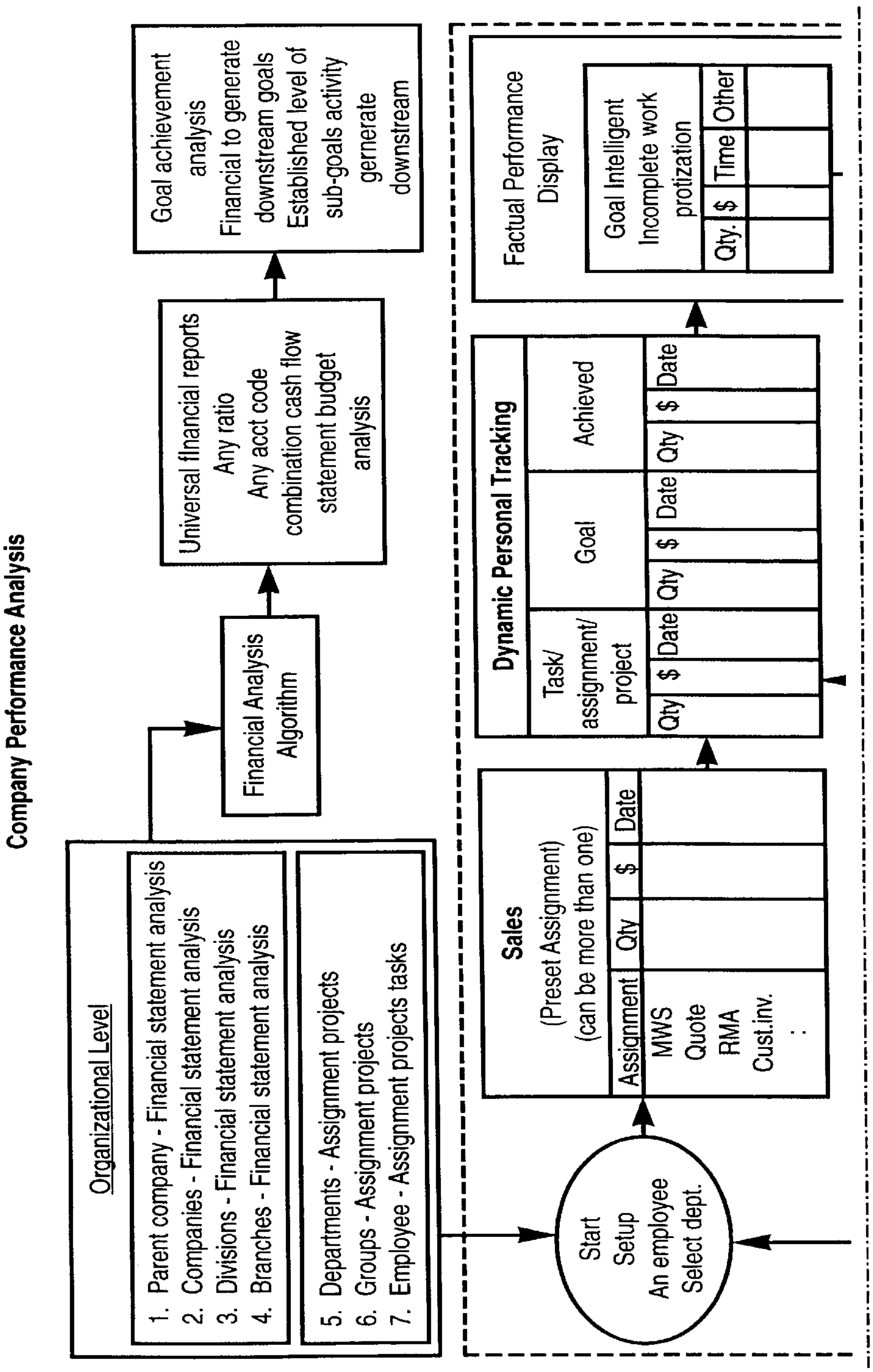
Figure 117B:
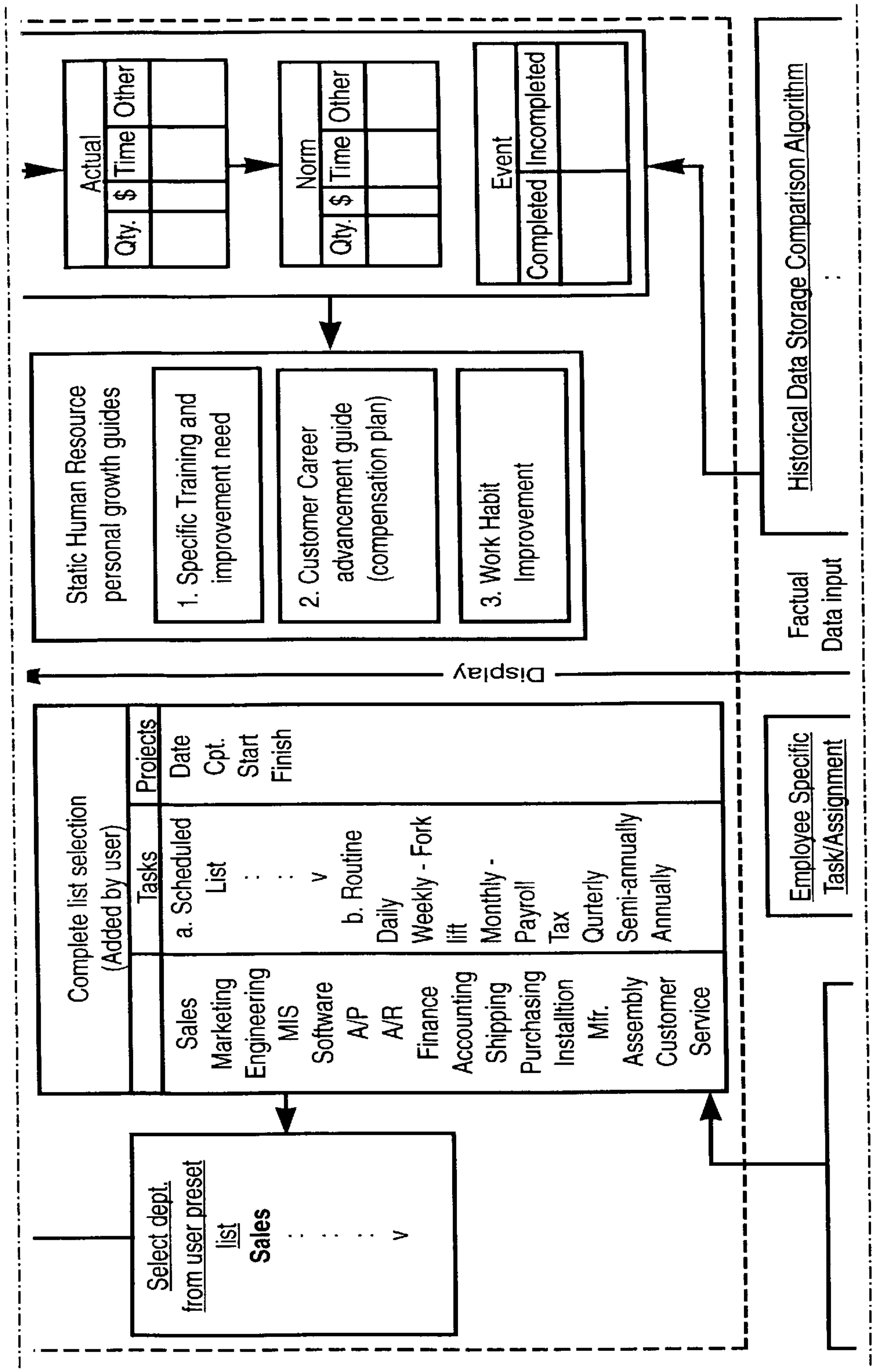
Figure 117C:
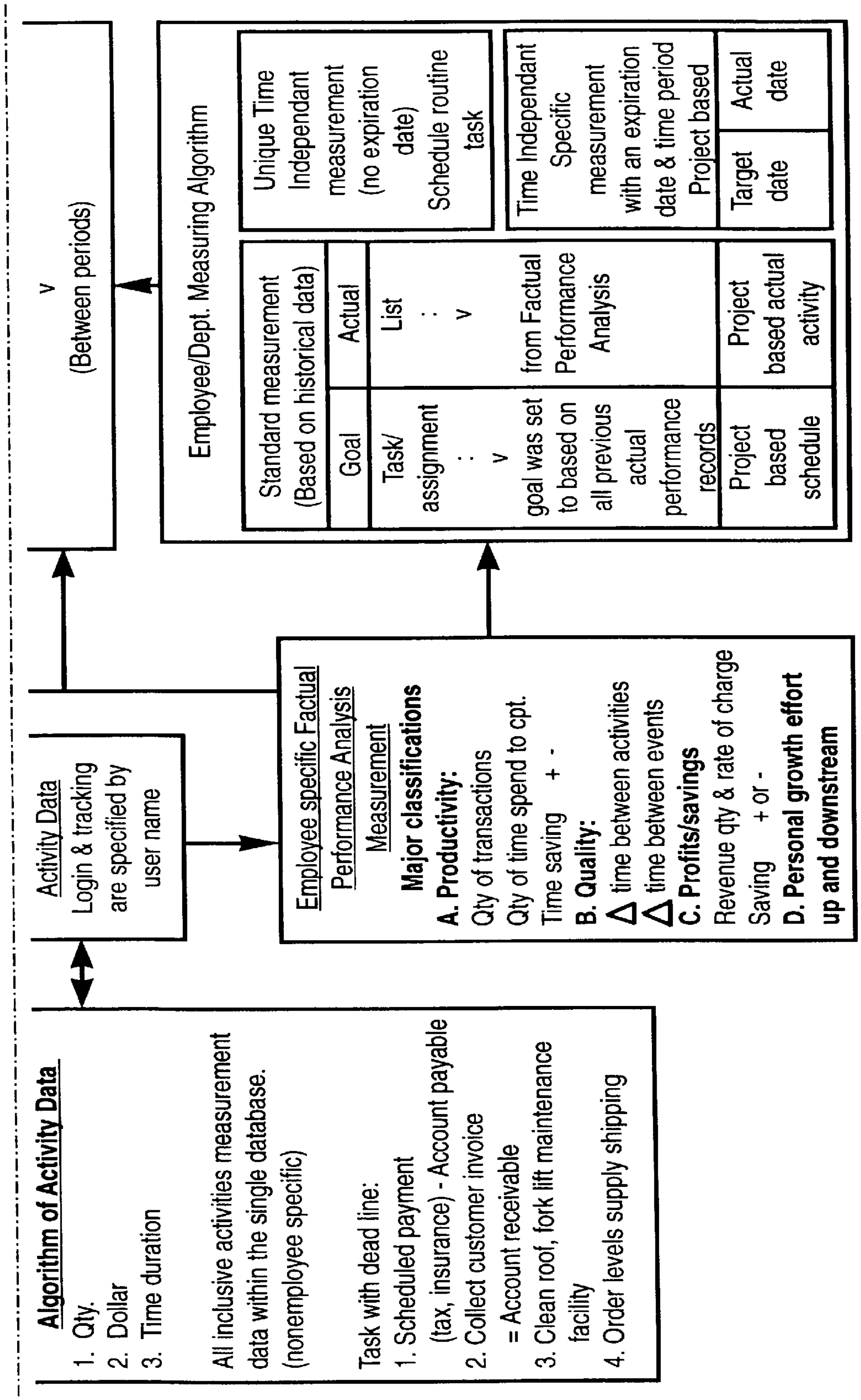

The Algorithm of Activity Data serves as a foundation for human performance evaluation. Referring to FIG. 117, for each individual employee to be evaluated, various metrics from the Algorithm of Activity Data are chosen and tracked for that employee, resulting in Employee Specific Task/Assignment Activity Data. Different aspects (e.g, quantity, dollar volume, completion times) of an assignment (e.g, Quotes, MWSs, Customer Invoices) may be chosen as metric for evaluation for a particular employee.

The Factual Performance Analysis Measurement process performs calculation on the Employee Specific Task/Assignment Activity Data, for example calculating time "deltas" between different stages of completion of an assignment. Resulting data is supplied to at least three destinations: a Measuring Algorithm, a Historical Data Comparison Algorithm, and an output display structure, indicated by dashed lines. The Measuring Algorithm compares actual performance to desired performance established by goals. Preferably, goals are set by employees in consultation with management. In an exemplary embodiment, the Measuring Algorithm compares actual performance to desired performance in three different categories: routine assignments (daily, on-going), scheduled tasks (not on-going) and special projects (typically short-lived). In addition, unique date-independent measurements may programmed, for example as alerts. For example, the user may program the Measuring Algorithm to alert the user whenever the time delta between creation of a quote and posting of the quote is seven days or greater. Various priorities may be established in accordance with corresponding parameters. For example, a particular order may be marked as critical, causing an alert to be displayed if there is any slippage in schedule.

The Historical Data Comparison Algorithm archives the daily output of the Factual Performance Analysis Measurement and the Measuring Algorithm blocks and allows for comparison of performance data for different dates.

Within the output display structure, a hierarchy of views is presented. A first view is a complete list, based on the Algorithm of Activity Data, of departments and the tasks and projects for which they are responsible. From this complete list, the user may create the users own "short list" of departments for performance review. Different layers of management, for example, may have different departments within their scope of review.

To display performance data, the user selects a department, causing performance data to be displayed for the department as a whole. The user may further select a specific individual within that department, in which case a Dynamic Personal Tracking view is displayed. The Dynamic Personal Tracking view displays all of the chosen metrics for the selected employee. From the Dynamic Personal Tracking view, the user may transition to a Factual Performance Display. The Factual Performance Display is a subset of the Dynamic Personal Tracking view and focuses on those metrics presently deemed by the user to be most important (e.g., metrics related to sales growth, metrics related to customer service, etc.)

The Factual Performance Display highlights strengths and weaknesses of the employee and is linked, either automatically or manually, to static human resources "personal growth guides." Based on the Factual Performance Display, it may be evident, for example, that the employee in question needs training in a certain area. In this manner, the system allows training efforts to be narrowly targeted where they will obtain greatest benefit. A career path may be charted for each employee that is calculated to maximize that employee's potential.

Figure 118:
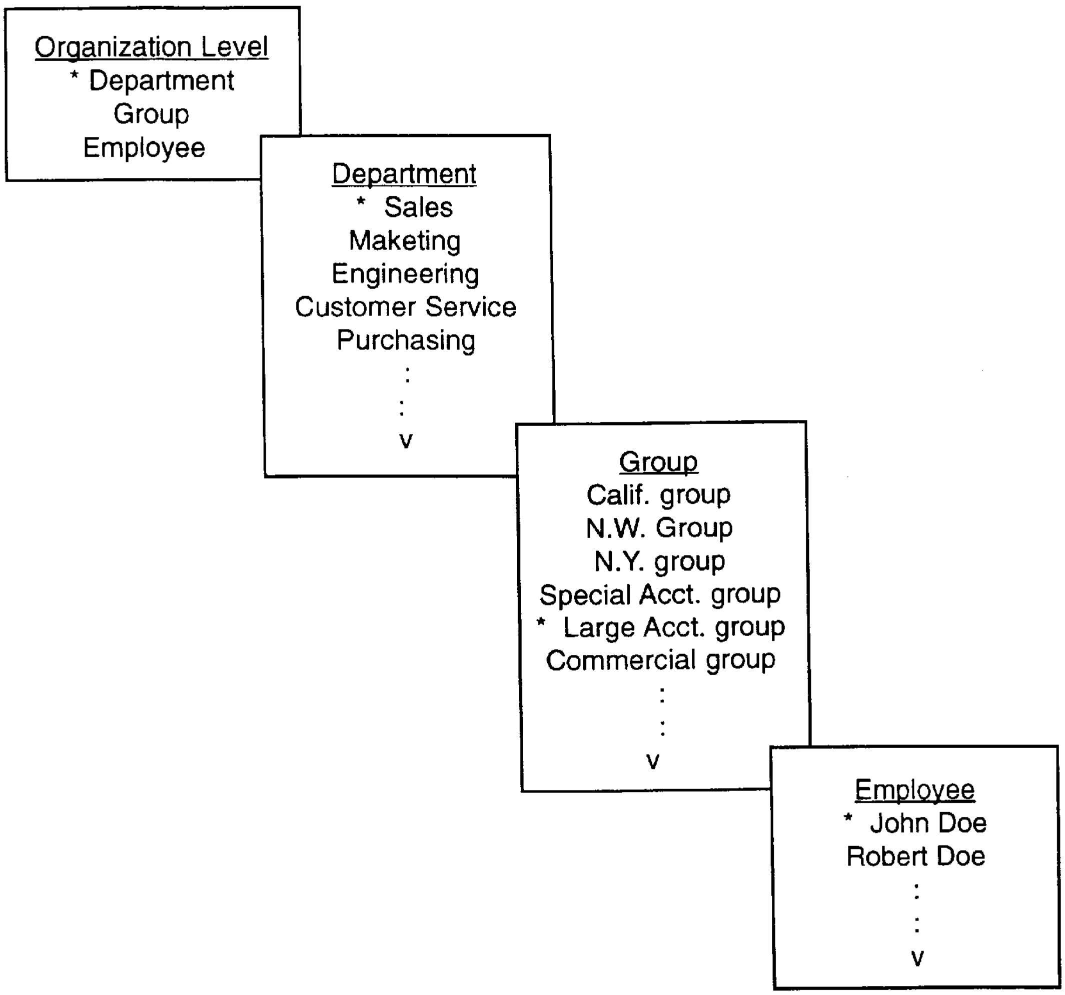
FIG. 118 is an illustration of a seris of selection menus used to select an employee for whom a factual employee evaluation report is to be displayed.
Figure 119:
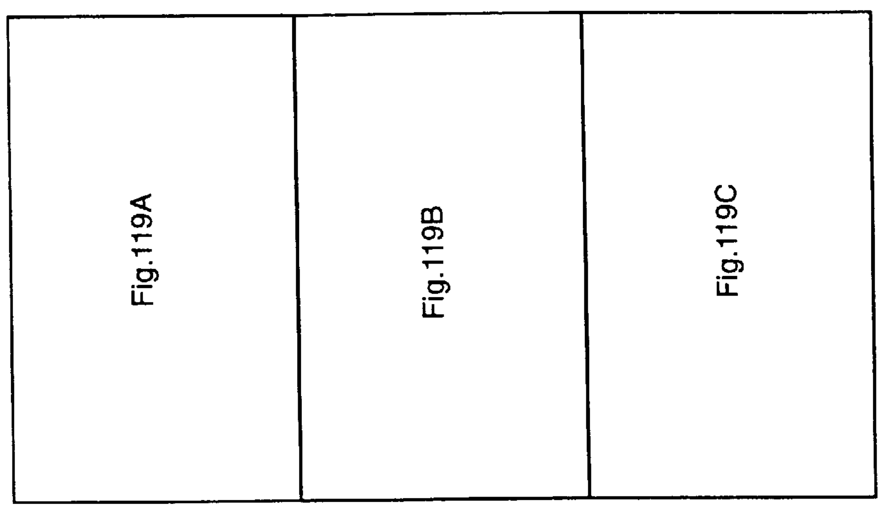
Figure 119B:
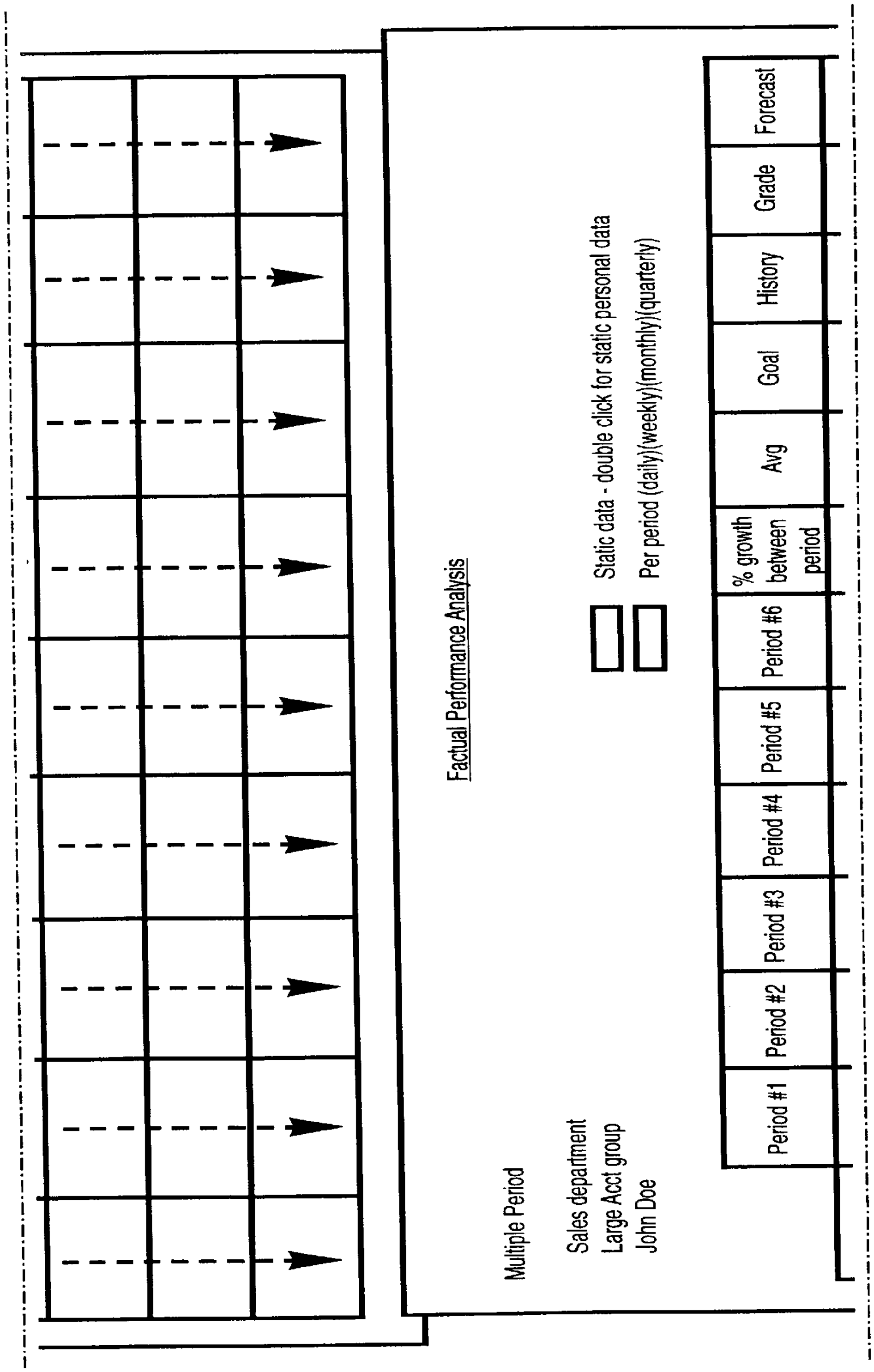
Figure 120:
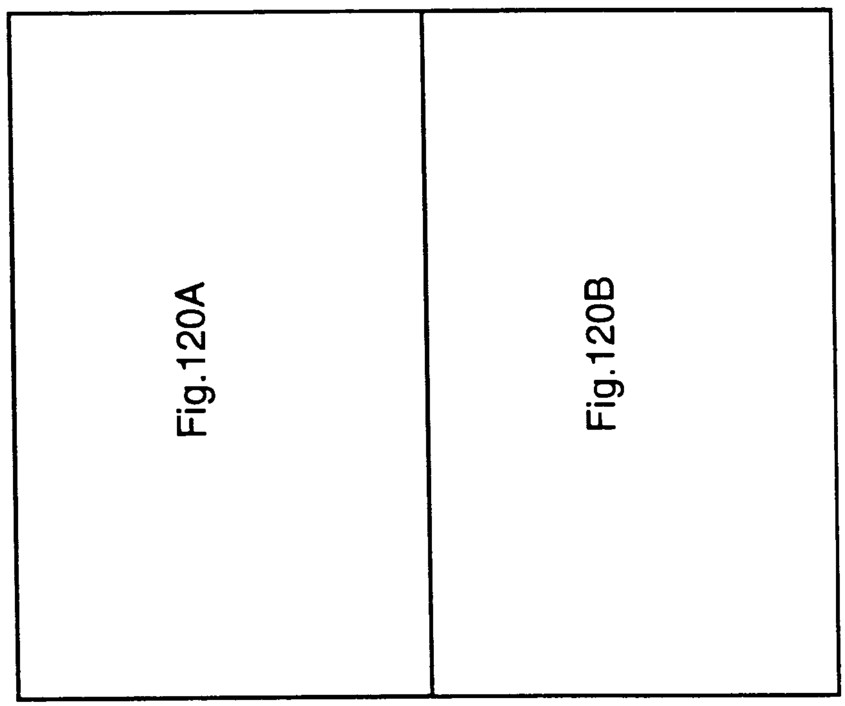
Figure 120B:
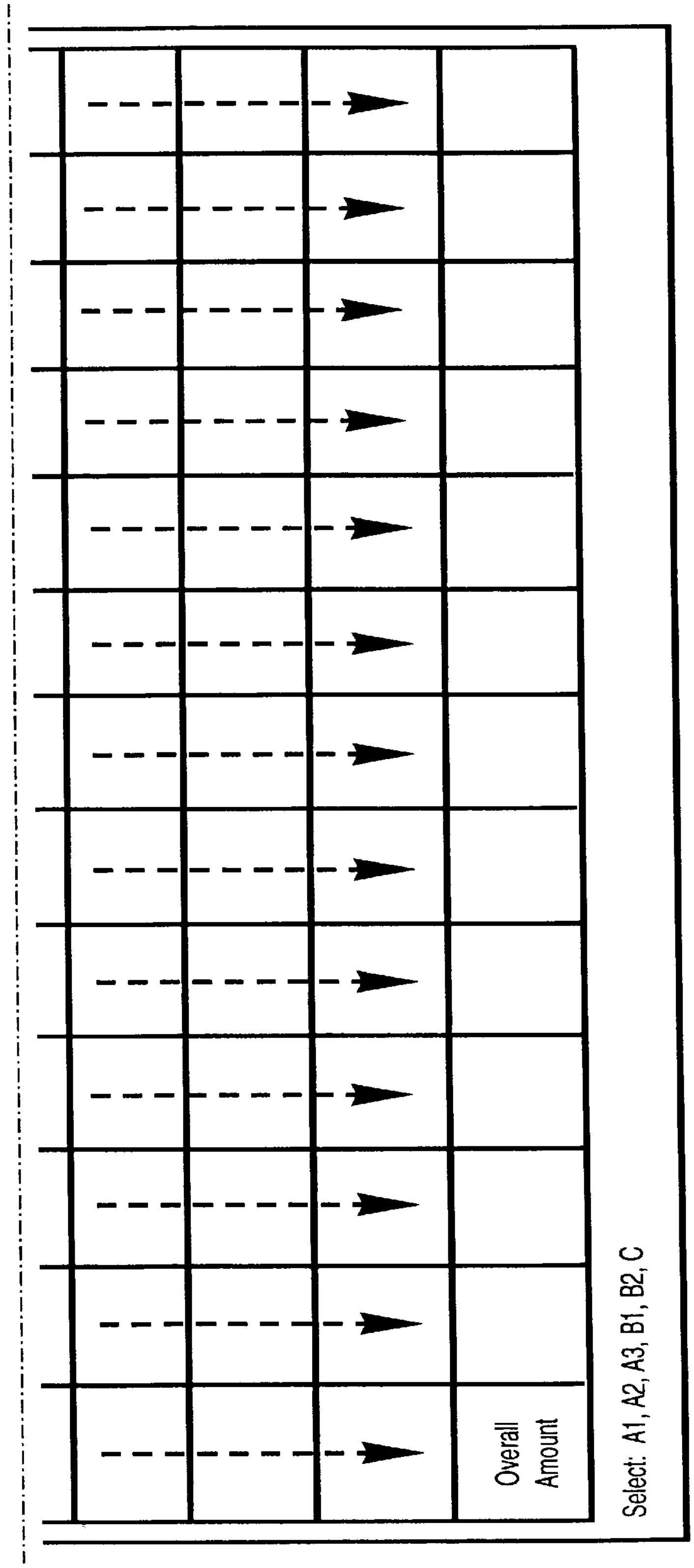

Screen displays used for factual performance evaluation in accordance with an exemplary embodiment of the invention are shown in FIG. 118, FIG. 119 and FIG. 120, respectively. Selection of an employee is accomplished as illustrated in FIG. 118. Referring to FIG. 119, performance results may be viewed for a single period or multiple periods, with the period being user selectable (a day, a week, a month, a quarter, etc.). In the case of the single period display, performance results for various performance metrics in different categories and sub-categories are displayed, for example: Productivity (A), including quantity per period (A1), dollar volume per period (A2) and percent profit per period (A3); Quality (B), including timliness (B1) and customer credit memos (B2); and Profitability (C). In the case of the multi-period display, the same information is viewable for multiple periods but, because of display contraints, not all of the information at the same time. Rather the user selects the categories and sub-categories of interest for viewing at any particular time. For example, if sub-category A2 is selected, then dollar volume per period is displayed for all of the periods (e.g., six).

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An automated end-to-end business process for product sales that uses a relational database management system, the process comprising the steps of:

- a first user inputting a sales record to the database for an order of a customer;
- automatically generating a customer invoice;
- a second user inputting a customer payment record to the database, wherein system privileges of the first user and the second user are at least partially mutually exclusive;
- automatically determining a status of the customer payment as reconciled or not reconciled; and
- during each of the foregoing inputting steps, qualifying user inputs using experiential constraints, based on the then-current state of the database as a whole.

2. The method of claim 1, wherein the process uses a single database described by a single database schema.

3. The method of claim 1, wherein the business process is based on a virtual-inventory model for the sale of tangible goods, the process comprising the further steps of:

- a third user placing a purchase order for goods in accordance with the sales record and inputting purchasing information to the database;
- automatically generating a vendor invoice record; and
- a fourth user receiving the goods.

4. The method of claim 3, comprising the further step of, during the inputting of purchasing information, qualifying user inputs using experiential constraints, based on the then-current state of the database as a whole.

5. The method of claim 3, wherein system privileges of the first, second, third and fourth users are at least partially mutually exclusive.

6. The method of claim 3, wherein the database contains a Sales Record file, a related Items Sold file containing a single consolidated record for a quantity of multiple identical items, and a related Item Details file containing a separate record for each separate item of said quantity, wherein receiving the goods comprises:

- automatically determining a group of Sales Records having Items Sold not yet fully received;
- selecting within the database a Sales Record from said group of Sales Records and selecting from the Sales Record a related Items Sold record; and
- for each separate item of said quantity, inputting a serial number from an item of the physical goods into a field within a separate Item Details record.

7. The method of claim 3, wherein the at least some of the goods require assembly or installation, the process comprising the further steps of:

- during order entry, the first user inputting installation instructions and identifying items required to be shipped together to the customer.

8. The method of claim 7, comprising the further step of, during the inputting of installation instructions, qualifying user inputs using experiential constraints, based on the then-current state of the database as a whole.

9. The method of claim 7, comprising the further step of automatically adding to the customer invoice an installation charge.

10. The method of claim 7, comprising the further step of, when an item together with any other item required to be shipped together with it to the customer have been received, automatically generating at least one of a shipping worksheet and a packing slip.

11. The method of claim 3, comprising the further steps of:

inputting to the database actual vendor invoice information; and automatically determining a status of the vendor invoice as reconciled or not reconciled.

12. The method of claim 11, comprising the further step of automatically determining a detailed status of non-reconciled vendor invoices in accordance with a plurality of categories of discrepancies.

13. The method of claim 12, wherein a vendor invoice may belong to a plurality of categories of discrepancies, the method comprising the further step of sorting vendor invoices in accordance with a hierarchy of discrepancies such that a vendor invoice having both a discrepancy higher in the hierarchy and a discrepancy lower in the hierarchy is sorted into a group of vendor invoices belonging to the discrepancy of the higher category.

14. The method of claim 13, comprising the further steps of:

for a non-reconciled vendor invoice, inputting to the database a Vendor Expected Credit record;

offsetting an amount of the Vendor Expected Credit against the non-reconciled vendor invoice; and changing the status of the non-reconciled vendor invoice to reconciled.

15. The method of claim 1, comprising the further steps of:

at intervals, performing a suite of database checks using experiential constraints;

detecting a condition requiring user attention;

identifying a user responsible for attending to the condition; and automatically reporting the condition to the identified user.

16. The method of claim 15, comprising the further steps of:

detecting an error;

troubleshooting the error; and adding to the system an additional experiential constraint to prevent future occurrences of the error.

17. The method of claim 1, comprising the further step of inputting to the database a Return Merchandise Authorization record relating to a sales record, the Return Merchandise Authorization record specifying one of a plurality of return types.

18. The method of claim 17, wherein return types includes a plurality of the following types: credit, replacement, and warranty.

19. The method of claim 17, comprising the further step of automatically completing selected fields of the Return Merchandise Authorization record as being not applicable in accordance with the specified return type.

20. The method of claim 17, comprising the further step of automatically grouping a sales record to which the Return Merchandise Authorization pertains with sales records having one or more items to be received.

21. The method of claim 20, comprising the further steps of:

receiving a returned item; and automatically generating a credit memo for said returned item.

22. The method of claim 1, comprising the further steps of:

receiving a Return Merchandise Authorization request via a global computer network, the request specifying return type;

evaluating the request based on a plurality of stored criteria in accordance with the return type; and if the applicable criteria are met, automatically assigning, and communicating to a user via the global computer network, a return authorization number.

23. The method of claim 1, wherein the sales record includes a ship-to address, the process comprising the further steps of:

automatically retrieving an applicable sales tax rate based on the ship-to address and generating a sales tax record; and from a multiplicity of sales tax records pertaining to a tax reporting period, automatically generating a tax return.

24. The method of claim 1, wherein the sales record identifies a sales representative, the process comprising the further steps of:

automatically retrieving an applicable commission rate based on the sales representative; and from a multiplicity of sales records pertaining to a pay period, automatically generating a commission total for each of a plurality of sales representatives.

25. The method of claim 1, comprising the further steps of:

identifying multiple persons each having a role in a sales transactions; and computing separate commissions for each of said multiple persons.

26. The method of claim 1, comprising the further steps of:

at periodic intervals automatically posting general ledger accounting entries for transactions posted since the previous interval, including sales and customer payments; and at a time determined by a user, automatically generating a financial statement indicative of at least one of profit/loss and cashflow.

27. The method of claim 26, wherein said periodic intervals are user-scheduled.

28. The method of claim 26, wherein said time is scheduled by the user in advance.

29. The method of claim 26, wherein said time is any time at which the user inputs a predetermined command.

30. The method of claim 1, comprising the further steps of, for each of said first user and said second user:

determining performance measurements quantifiable using data stored within the single database; and automatically calculating and maintaining a history of said performance measurements.

31. The method of claim 1, wherein sales record information is accessible remotely via a global computer network by authorized users.

32. The method of claim 1, wherein customer invoice information is accessible remotely via a global computer network by authorized users.

33. The method of claim 32, comprising the further step of displaying for an open invoice detailed payment status information.

34. The method of claim 32, comprising the further step of displaying for an open invoice detailed payment status information including a reason for non-payment.

35. The method of claim 1, wherein vendor invoice information is accessible remotely via a global computer network by authorized users.

36. A method of integrating business automation across multiple business domains and automatically reflecting automated business activities of one business domain within another business domain, the method comprising the steps of:

providing a Web-enabled, client/server relational database management system storing a database described by a single database schema including files belonging to each of a first business domain dealing with products and a second business domain dealing with payments; and a user making modifications to a record within a file belonging to the first business domain, the database management system in response thereto automatically reflecting said modifications within files belonging to the second business domain.

37. The method of claim 36, wherein the database further includes files belonging to a third business domain dealing with financial performance, the database management system, in response to a user making modifications to a record within a file belonging to one of the first and second business domains, automatically reflecting said modifications within a file belong to the third business domain.

38. The method of claim 37, wherein the database further includes files belonging to a fourth business domain dealing with personnel, wherein the database management system automatically alters a record of an employee or contractor having responsibilities within one or more of said first, second and third business domains by referencing records within files belong to said one or more of said first, second and third business domains.

39. The method of claim 36, comprising the further step of, at regular intervals, performing cross-checks between records of files belonging to different business domains.

40. The method of claim 39, wherein said cross-checks are performed during a nightly update routine.

41. The method of claim 36, comprising the further step of establishing and enforcing a division of responsibilities between different users of the database management system.

42. The method of claim 41, wherein each user within a group of users is assigned to a single business domain and is allowed to change only records of files belonging to that business domain.

43. A method of business-to-business Web commerce between a first business acting as supplier and a second business acting as purchaser, using a computer net including a relational database server, the method comprising the steps of:

storing user privileges for a plurality of user authorized by the purchaser to act on its behalf;

authenticating and determining a privilege level of a user;

the user entering product parameters;

identifying products in accordance with the product parameters and displaying product information for the products;

the user selecting at least one product from the displayed product information and requesting a price quote for the product;

producing and displaying a price quote for the product, the price quote including a quote number; and storing the price quote within the database for future reference.

44. The method of claim 43, wherein the process uses a single database described by a single database schema.

45. In a system for business-to-business Web commerce system between a first business acting as supplier and a second business acting as purchaser, using a computer net including a relational database server, a method of maintaining and updating a multi-vendor product list, comprising the steps of:

a user selecting a baseline vendor;

electronically retrieving product information from the baseline vendor;

electronically retrieving product information from at least one additional vendor;

comparing product information from said additional vendor with product information from the baseline vendor; and if an identical product is offered by both the baseline vendor and said additional vendor, consolidating information from both the baseline vendor and the additional vendor into a common record for display.

46. The method of claim 45, wherein the process uses a single database described by a single database schema.

47. The method of claim 45, further comprising:

producing a baseline electronic catalog;

updating the baseline electronic catalog to produce an updated baseline electronic catalog;

performing comparison of the updated baseline electronic catalog and a prior baseline electronic catalog; and based on the comparison flagging at least one of new products, products the price of which has changed, and discontinued products.

48. The method of claim 47, wherein the electronic catalog includes different categories of items including at least component items and items that receive component items.

49. The method of claim 47, wherein at least one of new products, products the price of which has changed, and discontinued products are flagged within an Approved Products List of a specific customer.

50. A method of business-to-business Web commerce between a first business acting as supplier and a second business acting as purchaser, using a computer net including a relational database server, the method providing for merchandise returns, comprising the steps of:

storing in the database a record for each item sold;

authenticating a user;

using a flexible product identification procedure, the user entering information identifying at least one item of merchandise to be returned for which a record is stored in the database;

using the record stored in the database, creating a return record and notifying a representative authorized by the supplier to approve returns;

approving the return and assigning a Return Merchandise Authorization number to the return record; and communicating to the user the Return Merchandise Authorization number.

51. The method of claim 50, wherein the process uses a single database described by a single database schema.

52. The method of claim 50, wherein communicating comprises sending to the user an electronic message including the Return Merchandise Authorization number.

53. The method of claim 50, wherein the user entering information identifying at least one item of merchandise to be returned occurs via the Web.

54. In a system for business-to-business Web commerce system between a first business acting as supplier and a second business acting as purchaser, using a computer net including a relational database server, a method of tracking financial information on a real-time basis and automatically generating a general ledger of accounts, the method comprising the steps of:

automatically posting transactions by making corresponding general ledger entries continuously or at programmed intervals; and automatically posting adjusting entries when records pertaining to transactions that have already been posted are modified.

55. The method of claim 54, wherein the process uses a single database described by a single database schema.

56. In a system for business-to-business Web commerce system between a first business acting as supplier and a second business acting as purchaser, using a computer net including a relational database server, a method of processing accounts, the method comprising the steps of:

storing in the database customer invoices and vendor invoices;

identifying open vendor invoices;

applying a set of rules to the open vendor invoices and related records, including classifying and grouping the open vendor invoices in accordance with a hierarchy of experiential classifications; and forming a determination based on the set of rules whether or not a group of open invoices should be paid.

57. The method of claim 56, wherein the process uses a single database described by a single database schema.

58. In a system for business-to-business Web commerce system between a first business acting as supplier and a second business acting as purchaser, using a computer net including a relational database server, a method of employee evaluation comprising the steps of:

collecting activity information as activities occur and storing it in the database;

determining a computer-generated, data-based performance norm for an individual or entity; and automatically producing an electronic evaluation report based on the activity information and the data-based norm.

59. The method of claim 58, wherein the process uses a single database described by a single database schema.

60. The method of claim 58, comprising the further step of communicating via a global computer network the electronic employee evaluation report via a global computer network to at least one of the employee to whom the electronic employee evaluation report pertains and authorized supervisory personnel.

61. The method of claim 58, further comprising displaying an evaluation report via the Web.

62. The method of claim 58, further comprising displaying for ready comparison activity information and resulting performance information, whereby the contribution of different activities to performance can be guaged by users.

63. In a relational database system, a method of displaying information, comprising the steps of:

for each of a plurality of base tables, identifying at least one related table;

providing a related switch GUI control displayed in conjunction with display of each of said plurality of base tables, for selecting a related table;

displaying records of one of said plurality of base tables;

a user selecting at least one record;

using said GUI control, said user selecting a related table;

performing a search to identify records in the related table that are related to said at least one record; and displaying records of said related table identified by said search.

64. In a relational database business automation system, a method of displaying information so as to facilitate user manipulation and interaction, comprising the steps of:

producing a workscope/workflow structured display of complex database records each comprising multiple lines of text and pertaining to both a first party to a business transaction and a second party to the business transaction, the structured display constituting an integrated decision-making environment for a particular business function; and providing a GUI control displayed in conjunctions with said workscope/workflow structured display of complex database records;

a user selecting at least one of said complex database records; and the user activating the GUI control, wherein activation of the GUI control has at least one of the following effects: taking a prescribed action in relation to the selected record and changing at least one field of said record within said database; changing the display to a functionally-related display; and bringing up a pop-up screen through which data may be entered, changing at least one field of said record within said database, the pop-up screen only partially obscuring said workscope/workflow structured display.

65. A method of order fulfillment using a relational database system in which customer order information and vendor order information are stored, comprising the steps of:

displaying customer order items for which vendor orders have not been placed;

enabling a user to, in accordance with a user command, sort customer order items by the following categories: item sold, vendor and availability;

grouping a plurality of customer order items;

placing a single vendor order corresponding to a group of customer order items; and refreshing the display so as to remove one or more groups of items from the display.

66. The method of claim 65, comprising the further steps of:

storing within the database information identifying items that must be shipped together;

grouping items having a backorder status;

placing vendor orders for customer order items having backorder status; and removing from the display items that must be shipped together with an ordered item having backorder status.

67. The method of claim 65, comprising the further step of preparing records of ordered items so that the ordered items can be received.

68. The method of claim 67, comprising the further steps of:

receiving ordered items and changing item records to reflect receipt; and preparing records of received items for installation.

69. The method of claim 68, comprising the further steps of:

installing received items; and preparing records of installed items for shipping.

70. The method of claim 69, comprising the further steps of:

shipping installed items; and changing item records to reflect shipment.

71. The method of claim 68, wherein placing the vendor order comprises communicating corresponding vendor order information to the appropriate vendor via a global computer network.

72. The method of claim 65, wherein said grouping includes both automatic grouping based on customer instructions obtained via the Web and manual grouping performed for convenience and efficiency in purchasing.

73. The method of claim 72, wherein said grouping includes logistics-derived. implicit grouping.

74. A method of handling sales returns over a global computer network, comprising the steps of:

receiving a Return Merchandise Authorization request via a global computer network, the request specifying return type;

evaluating the request based on a plurality of stored criteria in accordance with the return type; and if the applicable criteria are met, automatically assigning, and communicating to a user via the global computer network, a return authorization number.

75. In a business-to-business automated Web commerce system, a method of specifying complex installation instruction regarding a plurality of purchase items using a graphical user interface, the method comprising the steps of:

selecting a first primary item;

selecting one or more secondary items to be installed with said first primary item;

selecting a second primary item; and selecting one or more secondary items to be installed with said second primary item.

76. The method of claim 75 wherein selecting said items occurs via the Web.

77. An automated business process for product sales that uses a Web-enabled relational database management system to automate an integrated supply chain including a seller and a plurality of vendors, the process comprising the steps of:

a seller placing vendor orders and entering order information into the database, the orders being communicated to the vendors through a global computer network;

the seller receiving the orders in whole or in part and entering receiving information into the database;

the vendors accessing receiving information through the global computer network to ensure prompt receipt of orders;

the seller requesting return of selected order items; and the vendors accessing return information through the global computer network and in response thereto communicating return merchandise authorization numbers to the seller through the global computer network.

78. The method of claim 77, wherein the process uses a single database described by a single database schema.

79. The method of claim 77, comprising the further steps of:

customers placing customer orders with the seller through the global computer network; and customers accessing order tracking information through the global computer network.

80. The method of claim 79, comprising the further step of customers and vendors accessing invoice information through the global computer network.

81. A method of order fulfillment, comprising the steps of:

placing an order for a part;

entering the order within a Web-enabled relational database system;

tracking each significant event in the order fulfillment process within the relational database system; and communicating the order status to at least one party via the Web.

82. The method of claim 81, wherein the order status is communicated using Web pull technology.

83. The method of claim 81, wherein the order status is communicated using Web push technology.

84. A method of automating an end-to-end business process using a software program running on a relational database system, comprising the steps of:

as data is entered into the relational database system, qualifying data entries in accordance with a stored knowledge base;

producing a workscope/workflow structured display of complex database records, the structured display constituting a decision-making environment for a particular business function, and displaying data together with GUI controls in such as way as to allow a user to readily change the status of a record within the relational database system in way determined by the stored knowledge base; and based on the experience of users using the software program, altering the stored knowledge base so as to increase the stored knowledge base.

85. The method of claim 84, wherein data is entered only once at a limited number of controlled points of entry.

* * * * *